US012407661B2

(12) United States Patent
Miyamoto et al.

(10) Patent No.: US 12,407,661 B2
(45) Date of Patent: Sep. 2, 2025

(54) INFORMATION PROCESSING DEVICE, MOBILE DEVICE, AND COMMUNICATION SYSTEM

(71) Applicant: SONY SEMICONDUCTOR SOLUTIONS CORPORATION, Kanagawa (JP)

(72) Inventors: Takashi Miyamoto, Kanagawa (JP); Hiroo Takahashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 262 days.

(21) Appl. No.: 18/247,688

(22) PCT Filed: Sep. 24, 2021

(86) PCT No.: PCT/JP2021/034953
§ 371 (c)(1),
(2) Date: Apr. 3, 2023

(87) PCT Pub. No.: WO2022/075081
PCT Pub. Date: Apr. 14, 2022

(65) Prior Publication Data

US 2023/0412575 A1 Dec. 21, 2023

(30) Foreign Application Priority Data

Oct. 9, 2020 (JP) ................................ 2020-170968

(51) Int. Cl.
*H04L 9/40* (2022.01)
*G06T 7/00* (2017.01)
(Continued)

(52) U.S. Cl.
CPC ........ *H04L 63/0485* (2013.01); *G06T 7/0002* (2013.01); *H04L 43/10* (2013.01);
(Continued)

(58) Field of Classification Search
CPC ... G06T 7/0002; H04L 63/0485; H04L 65/70; H04L 65/1069; H04L 43/10; H04L 43/16
See application file for complete search history.

(56) References Cited

U.S. PATENT DOCUMENTS

2003/0041221 A1* 2/2003 Okada .............. G11B 20/00246 375/E7.009
2015/0372991 A1* 12/2015 Katz .................... H04L 9/0819 713/168
(Continued)

FOREIGN PATENT DOCUMENTS

CN 1925386 A * 3/2007
CN 110445809 A * 11/2019 ......... H04L 63/1408
(Continued)

OTHER PUBLICATIONS

Translation of CN-110445809-A (Year: 2019).*
(Continued)

*Primary Examiner* — Henry Tsai
*Assistant Examiner* — John B Roche
(74) *Attorney, Agent, or Firm* — CHIP LAW GROUP

(57) ABSTRACT

The present disclosure relates to an information processing device, a mobile device, and a communication system for enabling further enhancement of safety. When communication is performed with another information processing device to perform high-speed data transmission of transmitting data of a frame including image data, an extended packet including an extended packet header and packet data, and a unique message capable of notifying that at least one of an information processing device, the another information processing device, or the image data is in a state different from a normal time or a usual time are transmitted to the another information processing device or received from the another information processing device, a session key is derived and at least one of generation, verification, or
(Continued)

decryption of protection data of the unique message is executed, the image data is stored in the packet data, and the image data and the unique message are transmitted at different timings via a part or whole of a common communication path regarding the communication. The present technology can be applied to, for example, a communication system conforming to an MIPI standard.

20 Claims, 182 Drawing Sheets

(51) Int. Cl.

| | |
|---|---|
| ***H04L 43/10*** | (2022.01) |
| ***H04L 43/16*** | (2022.01) |
| ***H04L 65/1069*** | (2022.01) |
| ***H04L 65/70*** | (2022.01) |

(52) U.S. Cl.
CPC .......... *H04L 43/16* (2013.01); *H04L 65/1069* (2013.01); *H04L 65/70* (2022.05)

(56) References Cited

U.S. PATENT DOCUMENTS

| | | | |
|---|---|---|---|
| 2019/0026029 | A1 | 1/2019 | Lee |
| 2019/0149751 | A1 | 5/2019 | Wise |

FOREIGN PATENT DOCUMENTS

| | | | | |
|---|---|---|---|---|
| JP | 11-220495 | A | | 8/1999 |
| JP | 2004-064181 | A | | 2/2004 |
| JP | 2006-276093 | A | | 10/2006 |
| JP | 2010253327 | A | * | 11/2010 |
| TW | 202029002 | A | | 8/2020 |
| WO | 2020/129685 | A1 | | 6/2020 |

OTHER PUBLICATIONS

Translation of CN-1925386-A (Year: 2007).*

Translation of JP-2010253327-A (Year: 2010).*

International Search Report and Written Opinion of PCT Application No. PCT/JP2021/034953, issued on Nov. 22, 2021, 09 pages of ISRWO.

"Draft MIPI Alliance Specification for Camera Serial Interface 2 (CSI-2)", In: "Draft MIPI Alliance Specification for Camera Serial Interface 2 (CSI-2)", Apr. 2, 2009 (Apr. 2, 2009), XP055165978, p. 46.

* cited by examiner

FIG. 58

| bit assign | Name | Description | Remarks |
|---|---|---|---|
| ePH0[31:24] | eVC | extended Virtual Channel | ·eVC IN C-PHY AND D-PHY EXTENDED HEADERS<br>·UNUSE (FIXED TO 0) IN CCI-FS |
| ePH0[23:16] | eDT | extended Data Type | ADD CCI-FS (I2C, I3C) |
| ePH0[15] | eCONT | Control Code Indicator | 1'b0: USUAL DATA TRANSFER<br>1'b1: INDICATES CONTROL CODE OF I2C AND I3C.<br>·AT TIME OF I2C: INDICATES S/Sr/ACK/NACK/P AND LIKE.<br>·USED AT TIME OF Clock Stretch. |
| ePH0[14:10] | Reserved | Reserved for future definition | Reseved |
| ePH0[9:8] | ePFEN | extended Packet Footer (ePF) Enable bitmap | field FOR 32b, 64b, OR Footer EXTENSION |
| ePH0[7:0] | ePHEN | extended Packet Header (ePH) Enable bitmap | field FOR extended Packet Header EXTENSION |

| bit assign | Name | Description | Remarks |
|---|---|---|---|
| ePH1[31:16] | Source ID | Source ID. Device ID in which the packet is generated | |
| ePH1[15:0] | Packet Length | Length of Packet Data (unit: Byte) | DATA PACKET LENGTH |

| bit assign | Name | Description | Remarks |
|---|---|---|---|
| ePH2[31:24] | Security Descriptor | Security Descriptor | ADDED AT TIME OF Security USE<br>default : SET TO 0 |
| ePH2[23:16] | Reserved | Reserved for future definition | Reseved |
| ePH2[15:0] | Message Counter | Message Counter | · 16-bit ROUNDING COUNTER. COUNT UP FOR EACH PACKET HAVING First extended Packet Header, AND INITIAL VALUE=0.<br>· INDEPENDENT Message COUNTER IS USED IN C/D-PHY COMMUNICATION HAVING VC. |

FIG. 59

| bit assign | Name | Description | Remarks |
|---|---|---|---|
| ePH3[31:25] | Destination ID | Destination ID. Device ID in which the packet is received finally | ADDS Destination ID(CCI-FS)<br>SUPPORTS Slave Address (ADDRESSED TO FINAL DESTINATION) |
| ePH3[24] | Read/Write flag | Read/Write flag in which the packet is received finally | Read:1, Write: INDICATES 0. (CCI-FS) |
| ePH3[23:8] | Destination Address | Destination Address is to access register address finally. | STORES REGISTER ADDRESS VALUE OF FINAL DESTINATION. |

FIG. 60

| eDT | Description |
|---|---|
| 0x00 to 0x07 | synchronization Short Packet Data Types |
| 0x08 to 0x0F | Generic Short Packet Data Types |
| 0x10 to 0x17 | Generic Long Packet Data Types |
| 0x18 to 0x1F | YUV Data |
| 0x20 to 0x26 | RGB Data |
| 0x27 to 0x2F | RAW Data |
| 0x30 to 0x37 | User Defined Byte-based Data |
| 0x38 | USL Command |
| 0x39 to 0x3D | Reserved for future use |
| 0x3E | Extended Packet mode(Use in PH only. Do not use in ePH) |
| 0x3F | For CSI-2 over C-PHY:Reserved for future use<br>For CSI-2 over D-PHY:Reserved for future use |
| 0x40 to 0xBF | Reserved for future use |
| 0xC0 to 0xCF | User Defined Byte-based Data<br>0xC0:For I2C<br>0xC1:For I3C |

FIG. 66

| Addr | bit assign | initial Value | Setting Data | Attribute | Detail | Remarks |
|---|---|---|---|---|---|---|
| 0x000 | [0] | 1'b1 | CCI-FS Capability Register | RO | 1'b0:NO CCI-FS FUNCTION<br>1'b1:CCI-FS FUNCTION AVAILABLE | |
| 0x001 | [7:0] | 8'h10 | CCI-FS Version | RO | Ver1.0 | |
| 0x002 | [0] | 1'b0 | CCI-FS Enable | RW | CCI-FS FUNCTION ON/OFF SWITCHING | · AVAILABLE BY SWITCHING IN A-PHY DIRECT-COUPLED CONFIGURATION<br>· SET 1'b1 IN ADVANCE WHEN USED WITH A-PHY SerDes CONFIGURATION |
| 0x010 | [7:0] | 8'h0 | eVC | RW | ePH0 INFORMATION | |
| 0x011 | [7:0] | 8'h0 | eDT | RW | | |
| 0x012 | [1:0] | 2'h0 | ePFEN | RW | | |
| 0x013 | [7:0] | 8'h0 | ePHEN | RW | | |
| 0x020 | [7:1] | 7'h0 | Source ID | RO | ePH1 INFORMATION | INDICATES Device's OWN ID.<br>· AT TIME OF RO: FIXED VALUE IS REGISTERED AT IMPLEMENTATION.<br>· AT TIME OF RW: REGARDED AS ADDRESSED TO OWN DEVICE AT 7'h0. SETTING AT AP, SETTING OF Image Sensor IS FROM AP SIDE. |
| | [0] | 1'h0 | Read/Write Source | RW | ePH1 INFORMATION | Reserved |
| 0x030 | [7:1] | 7'h0 | Destination ID | RW | ePH3 INFORMATION | |
| | [0] | 1'h0 | Read/Write Dest | RW | ePH3 INFORMATION | |
| 0x031 | [7:0] | 8'h0 | Destination Address[7:0] | RW | ePH3 INFORMATION | |
| 0x032 | [7:0] | 8'h0 | Destination Address[15:8] | RW | ePH3 INFORMATION | |
| 0x033 | [7:0] | 8'h0 | payload Length[7:0] | RW | ePH3 INFORMATION | |
| 0x034 | [15:8] | 8'h0 | payload Length[15:0] | RW | ePH4 INFORMATION | |
| 0x102 | [7:0] | 8'h0 | Read Data Length[7:0] | RW | | (BASICALLY LIMITATION IS SET WITHIN RANGE OF A-PHY Payload) |
| 0x103 | [7:0] | 8'h0 | Read Data Length[15:8] | RW | | |
| 0x104 | [0] | 1'h0 | CMD Exec | RW | AUTOMATIC CLEARING AFTER EXECUTION COMPLETED | 1'b1:Read not Ready<br>1'b0:Read ready |
| 0x105 | [0] | 1'h0 | Read CMD Status | RO | 1'b1:Read Ready<br>1'b0:Read not ready | |
| 0x106 | [7:0] | 8'h0 | Read Data[7:0] | RO | | EXTENDABLE CONFIGURATION |
| 0x107 | [7:0] | 8'h0 | Read Data[15:8] | RO | | EXTENDABLE CONFIGURATION |
| 0x108 | [7:0] | 8'h0 | Read Data[23:16] | RO | | EXTENDABLE CONFIGURATION |
| 0x109 | [7:0] | 8'h0 | Read Data[31:24] | RO | | EXTENDABLE CONFIGURATION |

FIG. 67

| Addr | bit assign | initial Value | Setting Data Attribute | | Detail | Remarks |
|---|---|---|---|---|---|---|
| AT TIME OF Bridge CONFIGURATION : (REGISTER CONFIGURATION Compatible WITH CONVENTIONAL CCI, SUCH AS SERDES CONFIGURATION, CAN BE USED) | | | | | | |
| 0x110 | [7:1] | 7'h0 | Destination SID (CONNECTION DESTINATION) | RW | P2P CONNECTION INFORMATION | LOWER-LEVEL DEVICE OF #1<br>→ DISCARDED OR ERROR-DETECTED IF NO Destination REGISTRATION (NOTE THAT IN CASE OF End DEVICE, Source ID IS TRANSFERRED BY RETURN AND THUS UNUSED) |
| | [0] | 1'h0 | Read/Write | RW | P2P CONNECTION INFORMATION | 1Write IS INVALID WHEN CCI-FS IS Enable |
| 0x111 | [7:0] | 8'h0 | Address Register[15:8] (CONNECTION DESTINATION) | RW | P2P CONNECTION INFORMATION | |
| 0x112 | [7:0] | 8'h0 | Address Register[7:0] (CONNECTION DESTINATION) | RW | P2P CONNECTION INFORMATION | |
| 0x113 | [7:0] | 8'h0 | Attribution (CONNECTION DESTINATION) | RW | P2P CONNECTION INFORMATION | 0: I2C<br>1: I3C<br>2: A-PHY<br>OTHERS: Reserved |
| 0x114 | [7:0] | 8'h0 | Timeout_No1[15:8] | RW | | ACCESS TIMEOUT SETTING |
| 0x115 | [7:0] | 8'h10 | Timeout_No1[7:0] | RW | | ↑ |
| 0x120 | [7:1] | 8'h0 | Destination ID (CONNECTION DESTINATION) | RW | P2P CONNECTION INFORMATION | LOWER-LEVEL DEVICE OF #2 |
| | [0] | 1'h0 | Read/Write | RW | P2P CONNECTION INFORMATION | |
| 0x121 | [7:0] | 8'h0 | Address Register[15:8] (CONNECTION DESTINATION) | RW | P2P CONNECTION INFORMATION | |
| 0x122 | [7:0] | 8'h0 | Address Register[7:0] (CONNECTION DESTINATION) | RW | P2P CONNECTION INFORMATION | |
| 0x123 | [7:0] | 8'h0 | Attribution (CONNECTION DESTINATION) | RW | P2P CONNECTION INFORMATION | 0: I2C<br>1: I3C<br>2: A-PHY<br>OTHERS: Reserved |
| 0x124 | [7:0] | 8'h00 | Timeout_No2[15:8] | RW | | ACCESS TIMEOUT SETTING |
| 0x125 | [7:0] | 8'h10 | Timeout_No2[7:0] | RW | | ↑ |
| | | | | | | LOWER-LEVEL DEVICE OF #3 ... |

FIG. 68

| Addr | bit assign | initial Value | Setting Data | Attribute | Detail | Remarks |
|---|---|---|---|---|---|---|
| Error-RELATED REGISTER | | | | | | |
| 0x200 | [0] | 1'h0 | Error Register[0] (CRC) | RW1C | | |
| | [1] | 1'h0 | Error Register[1] (Security) | RW1C | | |
| | [2] | 1'h0 | Error Register[2] (Routing) | RW1C | | |
| | [3] | 1'h0 | Error Register[3] (Timeout) | RW1C | | WHEN Timeout CONFIGURATION IS INCLUDED.<br>(USED TOGETHER OR NOT INCLUDED AT CHECK WITH Polling) |
| | [4] | 1'h0 | Error Register[4] (MC) | RW1C | | |
| | [5] | 1'h0 | T. B. D. | RW1C | | |
| Error-RELATED REGISTER (debug) | | | | | | |
| 0x300 | | | | RO | STORE ERROR HEADER-RELATED INFORMATION (first Error) | Footer IS ALSO INCLUDED. (Payload MAY BE OMITTED ONLY IN ePH AND ePF) VALUE OF Error Register IS INITIALIZED WHEN CLEARING 1Write. |
| | | | | | | |
| | | | | | | |
| 0x400 | | | | RO | STORE ERROR HEADER-RELATED INFORMATION (Last Error) | Footer IS ALSO INCLUDED. (Payload MAY BE OMITTED ONLY IN ePH AND ePF) VALUE OF Error Register IS INITIALIZED WHEN CLEARING 1Write. |
| Error Injection-RELATED REGISTER (debug) | | | | | | |
| 0x800 | | | Error Injection Enable[0] (ePH0:3) | RW | Enable OF Error INSERTION IN ePH0 | |
| | | | Error Injection Enable[0] (ePH0:2) | RW | | |
| | | | Error Injection Enable[0] (ePH0:1) | RW | | |
| | | | Error Injection Enable[0] (ePH0 : 0) | RW | | |

| Embedded Data Format Code | Description |
|---|---|
| 0x00 | - |
| 0x07 | - |
| 0x0A | - |
| 0x0B | - |
| 0x0C | - |
| 0x0D | - |
| 0x0E-0x1F | Reserved for future use |
| 0x20-0x2F | Vendor specific |
| 0x30-0xFE | Reserved for future use |
| 0xFF | - |

FIG. 104

CSI-2/CCI extension format example

Enable/disable ePH0 → bit 15
Enable/disable ePH1 → bit 14
Enable/disable ePH4 → bit 2
Enable/disable ePH3 → bit 1
Enable/disable ePH2 → bit 0

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| ePH0 | Res | | eVC | | | | | | eDT | | | | | | | | ePFEN | | Reserved (Res) | | | | | | ePHEN | | | | | | | |
| ePH1 | Reserved | | | | | | | | | | | | | | | | Packet Length | | | | | | | | | | | | | | | |
| ePH2 | Security Descriptor | | | | | | | | Reserved | | | | | | | | Message Counter | | | | | | | | | | | | | | | |
| ePH3 | Reserved | | | | | | | | | | | | | | | | Reserved | | | | | | | | | | | | | | | |
| ePH4 | Final destination ID | | | | | | | | | | | | | | | | Source ID | | | | | | | | | | | | | | | |
| ... | ... | | | | | | | | | | | | | | | | | | | | | | | | | | | | | | | |
| ePF1 | MAC[k*32-1:0] | | | | | | | | | | | | | | | | | | | | | | | | | | | | | | | |
| ePF0 | CRC32 | | | | | | | | | | | | | | | | | | | | | | | | | | | | | | | |

FIG. 111

| Security MAC | Description |
|---|---|
| 0x00 | Reserved for future use |
| 0x01 | Line-MAC |
| 0x02 | Frame-MAC |
| 0x03 | Reserved for future use |

FIG. 112A

| MESSAGE COUNTER | ROLLOVER PERIOD WITH 60fps AND 2160 ROWS OF PIXELS |
|---|---|
| 16+16 bits | $2^{32} \div 60 \div 2163 \approx$ 9 HOURS |
| 20+16 bits | $2^{36} \div 60 \div 2163 \approx$ 6 DAYS |
| 24+16 bits | $2^{40} \div 60 \div 2163 \approx$ 98 DAYS |
| 28+16 bits | $2^{44} \div 60 \div 2163 \approx$ 4 YEARS |
| 32+16 bits | $2^{48} \div 60 \div 2163 \approx$ 69 YEARS |

FIG. 112B

| FRAME COUNTER | ROLLOVER PERIOD WITH 60fps AND INCREMENT OF 1 |
|---|---|
| 4+16 bits | $(2^{20}-1) \div 60 \approx$ 5 HOURS |
| 8+16 bits | $(2^{24}-1) \div 60 \approx$ 78 HOURS |
| 12+16 bits | $(2^{28}-1) \div 60 \approx$ 52 DAYS |
| 16+16 bits | $(2^{32}-1) \div 60 \approx$ 828 DAYS |
| 20+16 bits | $(2^{36}-1) \div 60 \approx$ 36 YEARS |
| 24+16 bits | $(2^{40}-1) \div 60 \approx$ 581 YEARS |

FIG. 116

| Security protocol | Description |
|---|---|
| 0x00 | Reserved for future use |
| 0x01 | SPDM |
| 0x02 | HDCP |
| 0x03 | Reserved for future use |

FIG. 149

HD : Hamming Distance

| HD≥1 COUNT | HD=1 COUNT |
|---|---|
| 0=0000 | 0=0000 |
| 1=0001 | 1=0001 |
| 2=0010 | 2≒0011 |
| 3=0011 | 3≒0010 |
| 4=0100 | 4≒0110 |
| 5=0101 | 5≒0111 |
| 6=0110 | 6≒0101 |
| 7=0111 | 7≒0100 |
| 8=1000 | 8≒1100 |
| 9=1001 | 9≒1101 |
| 10=1010 | 10≒1111 |
| 11=1011 | 11≒1110 |
| 12=1100 | 12≒1010 |
| 13=1101 | 13≒1011 |
| 14=1110 | 14≒1001 |
| 15=1111 | 15≒1000 |
| 16=0000 | 16=0000 |
| 17=0001 | 17=0001 |
| ... | ... |

FIG. 150

HD : Hamming Distance

| FIRST COUNTER HD ≥ 1 MODE INCREMENT | SECOND COUNTER HD ≥ 1 MODE DECREMENT | ADDED VALUE OF FIRST COUNTER AND SECOND COUNTER |
|---|---|---|
| 0000 | 1111 | 1111 |
| 0001 | 1110 | 1111 |
| 0010 | 1101 | 1111 |
| 0011 | 1100 | 1111 |
| 0100 | 1011 | 1111 |
| 0101 | 1010 | 1111 |
| 0110 | 1001 | 1111 |
| 0111 | 1000 | 1111 |
| 1000 | 0111 | 1111 |
| 1001 | 0110 | 1111 |
| 1010 | 0101 | 1111 |
| 1011 | 0100 | 1111 |
| 1100 | 0011 | 1111 |
| 1101 | 0010 | 1111 |
| 1110 | 0001 | 1111 |
| 1111 | 0000 | 1111 |
| 0000 | 1111 | 1111 |
| 0001 | 1110 | 1111 |
| ... | ... | ... |

FIG. 151

| FIRST COUNTER HD=1 MODE INCREMENT | SECOND COUNTER HD=1 MODE INCREMENT | SUBTRACTED VALUE OF FIRST COUNTER AND SECOND COUNTER |
|---|---|---|
| 0=0000 | 0=0000 | 0000 |
| 1=0001 | 1=0001 | 0000 |
| 2=0011 | 2=0011 | 0000 |
| 3=0010 | 3=0010 | 0000 |
| 4=0110 | 4=0110 | 0000 |
| 5=0111 | 5=0111 | 0000 |
| 6=0101 | 6=0101 | 0000 |
| 7=0100 | 7=0100 | 0000 |
| 8=1100 | 8=1100 | 0000 |
| 9=1101 | 9=1101 | 0000 |
| 10=1111 | 10=1111 | 0000 |
| 11=1110 | 11=1110 | 0000 |
| 12=1010 | 12=1010 | 0000 |
| 13=1011 | 13=1011 | 0000 |
| 14=1001 | 14=1001 | 0000 |
| 15=1000 | 15=1000 | 0000 |
| 16=0000 | 16=0000 | 0000 |
| 17=0001 | 17=0001 | 0000 |
| ... | ... | ... |

FIG. 153

| Bit | Name | Description |
|---|---|---|
| ePH2[31:24] | Security Descriptor | Define the encrypted image data and ePF1 block for security. |
| ePH2[23:16] | Warning Descriptor | Define the warning information. |
| ePH2[15:0] | Message Counter | 16 bit wrap counter. The value is set to 0 in the first extension packet. This counter increments the value on every transmission of extended packet. After $2^{16}-1$, the value is set to 0. Each virtual channel has each independent Message Counter. |

FIG. 154

| Bit | Description |
|---|---|
| ePH2[23] | 1'b1 : Fatal warning.<br>1'b0 : No fatal warning. |
| ePH2[22] | 1'b1 : Sensor-internal warning.<br>1'b0 : No sensor-internal warning. |
| ePH2[21] | 1'b1 : Sensor-external warning.<br>1'b0 : No sensor-external warning. |
| ePH2[20] | 1'b1 : Power-source warning.<br>1'b0 : No power-source warning. |
| ePH2[19] | 1'b1 : Clock-source warning.<br>1'b0 : No clock-source warning. |
| ePH2[18] | 1'b1 : The others warning.<br>1'b0 : No the others warning. |
| ePH2[17] | Reserved for future use. |
| ePH2[16] | Reserved for future use. |

FIG. 155

| Bit | Name | Description |
|---|---|---|
| ePH2[23] | Physical attack detection | 1'b1 : Physical attack was detected.<br>1'b0 : Physical attack was not detected. |

FIG. 159

| Bit | Description |
|---|---|
| ePH2[31] | 1'b1 : Transmit encrypted payload.<br>1'b0 : Transmit payload in the clear. |
| ePH2[30] | 1'b1 : Transmit MAC as ePF1.<br>1'b0 : Not transmit MAC as ePF1. |
| ePH2[29] | 1'b1 : Physical attack was detected.<br>1'b0 : Physical attack was not detected. |
| ePH2[28:24] | Reserved for future use. |

FIG. 165

Responder flag fields definitions

| Byte | Bit | Field | Value |
|---|---|---|---|
| 1 | 5 | HBEAT_CAP | If set, Responder supports HEARTBEAT messages |

FIG. 166

HEARTBEAT request message format

| Offset | Field | Bytes | Value |
|---|---|---|---|
| 0 | SPDMVersion | 1 | V1.1 = 0x11 |
| 1 | RequestResponseCode | 1 | 0xE8 = HEARTBEAT Request |
| 2 | Param1 | 1 | Reserved |
| 3 | Param2 | 1 | Reserved |

FIG. 167

HEARTBEAT_ACK response message format

| Offset | Field | Bytes | Value |
|---|---|---|---|
| 0 | SPDMVersion | 1 | V1.1 = 0x11 |
| 1 | RequestResponseCode | 1 | 0x68 = HEARTBEAT_ACK Response |
| 2 | Param1 | 1 | Reserved |
| 3 | Param2 | 1 | Reserved |

FIG. 168

HEARTBEAT_NAK response message format

| Offset | Field | Bytes | Value |
| --- | --- | --- | --- |
| 0 | SPDMVersion | 1 | TBD |
| 1 | RequestResponseCode | 1 | TBD = HEARTBEAT_NAK Response |
| 2 | Param1 | 1 | Reserved |
| 3 | Param2 | 1 | Reserved |

FIG. 169

END_SESSION_ACK response message format

| Offset | Field | Bytes | Value |
|---|---|---|---|
| 0 | SPDMVersion | 1 | V1.1 = 0x11 |
| 1 | RequestResponseCode | 1 | 0x6C = END_SESSION_ACK |
| 2 | Param1 | 1 | Reserved |
| 3 | Param2 | 1 | Reserved |

FIG. 171

END_SESSION_NAK response message format

| Offset | Field | Bytes | Value |
|---|---|---|---|
| 0 | SPDMVersion | 1 | TBD |
| 1 | RequestResponseCode | 1 | TBD = END_SESSION_NAK |
| 2 | Param1 | 1 | Reserved |
| 3 | Param2 | 1 | Reserved |

FIG. 176

ERROR response message format

| Offset | Field | Bytes | Value |
|---|---|---|---|
| 0 | SPDMVersion | 1 | TBD |
| 1 | RequestResponseCode | 1 | 0x7F = ERROR |
| 2 | Param1 | 1 | Error code |
| 3 | Param2 | 1 | Error data |
| 4 | ExtendedErrorData | 0~32 | Optional extended data |

FIG. 177

Error Code and Error Data

| Error code | Value | Description | Error data | ExtendedErrorData |
|---|---|---|---|---|
| Reserved | 0x00 | Reserved | Reserved | Reserved |
| Unspecified | 0x05 | Unspecified error occurred | 0x00 | No extended error data is provided |
| Reserved | 0x06-0x40 | Reserved | Reserved | Reserved |
| Reserved | 0x41-0xFE | Reserved | Reserved | Reserved |
| Vendor/Other Standards Defined | 0xFF | Vendor or Other Standards defined | Shall indicate the registry or standard body using one of the values in the ID column in the Registry or standards body ID table. | See the ExtendedErrorData format for vendor or other standards-defined ERROR response message table for format definition. |

FIG. 178

ExtendedErrorData format for vendor or other standards-defined ERROR response message

| Offset | Field | Bytes | Description |
|---|---|---|---|
| 0 | Len | 1 | Length of the VendorID field. If the ERROR is vendor defined, the value of this field shall equal the Vendor ID Len, as the Registry or standards body ID table describes, of the corresponding registry or standard body name. If the ERROR is defined by a registry or a standard, this field shall be zero (0), which also indicates that the VendorID field is not present. The Error Data field in the ERROR message indicates the registry or standards body name, such as Param2, and is one of the values in the ID column in the Registry or standards body ID table. |
| 1 | VendorID | Len | The value of this field shall indicate the Vendor ID, as assigned by the registry or standards body. The Registry or standards body ID table describes the length of this field. Shall be in little endian format. The registry or standards body name in the ERROR is indicated in the Error Data field, such as Param2, and is one of the values in the ID column in the Registry or standards body ID table. |
| 1+Len | OpaqueErrorData | Variable | Defined by the vendor or other standards. |

FIG. 179

Registry or standards body ID

| ID | Vendor ID length (bytes) | Registry or standards body name | Description |
|---|---|---|---|
| 0x6 | 2 | MIPI | The Manufacturer ID assigned by MIPI identifies the vendor. |

FIG. 180

VENDOR_DEFINED_REQUEST request message format

| Offset | Field | Bytes | Value |
|---|---|---|---|
| 0 | SPDMVersion | 1 | V1.1 = 0x11 |
| 1 | RequestResponseCode | 1 | 0xFE = VENDOR_DEFINED_REQUEST |
| 2 | Param1 | 1 | Reserved |
| 3 | Param2 | 1 | Reserved |
| 4 | StandardID | 2 | Shall indicate the registry or standards body by using one of the values in the ID column in the Registry or standards body ID table. |
| 6 | Len | 1 | Length of the Vendor ID field. If the VendorDefinedRequest is standard defined, Len shall be 0. If the VendorDefinedRequest is vendor-defined, Len shall equal Vendor ID Len, as the Registry or standards body ID table describes. |
| 7 | VendorID | Len | Vendor ID, as assigned by the registry or standards body. Shall be in little endian format. |
| 7+Len | ReqLength | 2 | Length of the VendorDefinedReqPayload. |
| 7+Len+2 | VendorDefinedReqPayload | ReqLength | The standard or vendor shall use this field to send the request payload. |

FIG. 181

VENDOR_DEFINED_RESPONSE response message

| Offset | Field | Bytes | Value |
|---|---|---|---|
| 0 | SPDMVersion | 1 | V1.1 = 0x11 |
| 1 | RequestResponseCode | 1 | 0x7E = VENDOR_DEFINED_RESPONSE |
| 2 | Param1 | 1 | Reserved |
| 3 | Param2 | 1 | Reserved |
| 4 | StandardID | 2 | Shall indicate the registry or standard body using one of the values in the ID column in the Registry or standards body ID table. |
| 6 | Len | 1 | Length of the Vendor ID field. If the VendorDefinedRequest is standards-defined, length shall be 0. If the VendorDefinedRequest is vendor-defined, length shall equal Vendor ID Len, as the Registry or standards body ID table describes. |
| 7 | VendorID | Len | Shall indicate the Vendor ID, as assigned by the registry or standards body. Shall be in little endian format. |
| 7+Len | ReqLength | 2 | Length of the VendorDefinedRespPayload. |
| 7+Len+2 | VendorDefinedRespPayload | ReqLength | Standard or vendor shall use this value to send the response payload. |

INFORMATION PROCESSING DEVICE, MOBILE DEVICE, AND COMMUNICATION SYSTEM

CROSS REFERENCE TO RELATED APPLICATIONS

This application is a U.S. National Phase of International Patent Application No. PCT/JP2021/034953 filed on Sep. 24, 2021, which claims priority benefit of Japanese Patent Application No. JP 2020-170968 filed in the Japan Patent Office on Oct. 9, 2020. Each of the above-referenced applications is hereby incorporated herein by reference in its entirety.

TECHNICAL FIELD

The present disclosure relates to an information processing device, a mobile device, and a communication system, and more particularly to an information processing device, a mobile device, and a communication system for enabling further enhancement of safety.

BACKGROUND ART

Currently, in camera serial interface (CSI)-2 ver4.0 in which standardization is in progress, two types of a packet structure using C-PHY for a physical layer and a packet structure using D-PHY for a physical layer are defined.

Furthermore, in recent years, the CSI-2 standard is not used only for mobile devices but has been widely used for various uses such as in-vehicle and Internet of things (IoT). As a result, it is assumed that the existing packet structures cannot support these applications. Therefore, the mobile industry processor interface (MIPI) alliance is examining an extended packet in which existing packet structures such as a packet header and a packet footer are extended in order to support various uses.

For example, as disclosed in Patent Document 1, a communication system that uses an extended packet header separately from a conventional packet header has been proposed.

CITATION LIST

Patent Document

Patent Document 1: International Publication No. 2020/129685

SUMMARY OF THE INVENTION

Problems to be Solved by the Invention

Meanwhile, as described above, a message count value for functional safety use to be stored in the extended packet under consideration can be diverted as a nonce value for security use. However, for example, since a nonce value for the same session key is prohibited from being rolled over for countermeasures against an attack, it is not suitable to apply a 16-bit message count value as it is as a nonce value. Therefore, it is required to enable use of the nonce value specifically and with higher safety.

The present disclosure has been made in view of such circumstances and is to enable further enhancement of safety.

Solutions to Problems

An information processing device, a mobile device, and a communication system of one aspect of the present disclosure are an information processing device, a mobile device, and a communication system including: a communication unit configured to transmit, to another information processing device, or receive, from the another information processing device, when performing communication with the another information processing device to perform high-speed data transmission of transmitting data of a frame including image data in a predetermined direction between the information processing device and the another information processing device, an extended packet including an extended packet header and packet data, and a unique message capable of notifying that at least one of the information processing device, the another information processing device, or the image data is in a state different from a normal time or a usual time, and a protection unit configured to derive a session key and execute at least one of generation, verification, or decryption of protection data of the unique message, in which the image data is stored in the packet data, and the image data and the unique message are transmitted at different timings via a part or whole of a common communication path regarding the communication.

In one aspect of the present disclosure, when communication is performed with another information processing device to perform high-speed data transmission of transmitting data of a frame including image data in a predetermined direction between an information processing device and the another information processing device, an extended packet including an extended packet header and packet data, and a unique message capable of notifying that at least one of the information processing device, the another information processing device, or the image data is in a state different from a normal time or a usual time are transmitted to the another information processing device or received from the another information processing device, a session key is derived and at least one of generation, verification, or decryption of protection data of the unique message is executed, the image data is stored in the packet data, and the image data and the unique message are transmitted at different timings via a part or whole of a common communication path regarding the communication.

BRIEF DESCRIPTION OF DRAWINGS

FIG. 58 is a diagram illustrating details of an extended packet header ePH0, an extended packet header ePH1, and an extended packet header ePH2.

FIG. 59 is a diagram illustrating details of an extended packet header ePH3.

FIG. 60 is a diagram illustrating details of an extended DT of an extended packet header ePH.

FIG. 66 is a diagram illustrating a register configuration example.

FIG. 67 is a diagram illustrating a register configuration example at the time of a Bridge configuration.

FIG. 68 is a diagram illustrating a register configuration example of an Error-related register.

FIG. 104 is a diagram illustrating an example of an extension format of CSI-2 or CCI.

FIG. 111 is a diagram illustrating an example of security MAC information.

FIGS. 112A and 112B are diagrams illustrating examples of rollover cycles of a message count value and a frame count value.

FIG. 116 is a diagram illustrating an example of a security protocol.

FIG. 120 is a diagram for describing a storage method when storing a light emission pattern (light receiving pattern) as a storage pattern when implementing a distance measuring sensor of a ToF method by an image sensor.

FIG. 121 is a diagram for describing a storage method when storing a light emission pattern (light receiving pattern) as a storage pattern when implementing a distance measuring sensor of a ToF method by an image sensor.

FIG. 122 is a flowchart for describing interference detection processing (part 2) by an interference detection unit.

FIG. 123 is a flowchart for describing an obstacle detection processing by an obstacle detection unit.

FIG. 124 is a flowchart for describing abnormality detection processing for a security unit by an invasion detection unit.

FIG. 125 is a flowchart illustrating abnormality detection processing by a temperature detection unit.

FIG. 126 is a block diagram illustrating a detailed configuration example of an application processor that detects presence or absence of abnormality of an image sensor.

FIG. 127 is a flowchart for describing processing of an image sensor when an application processor performs processing of detecting the presence or absence of abnormality of the image sensor.

FIG. 128 is a flowchart for describing processing of an application processor when the application processor performs processing of detecting the presence or absence of abnormality of an image sensor.

FIG. 129 is a diagram illustrating an example of a data structure of image data for describing a position where a unique message is stored when high-speed data transmission of the unique message is implemented without hindering high-speed data transmission of the image data.

FIG. 130 is a flowchart for describing processing in a case where high-speed data transmission of a unique message is executed without hindering high-speed data transmission of image data.

FIG. 131 is a flowchart for describing imaging transmission processing (part 1).

Figure 132:
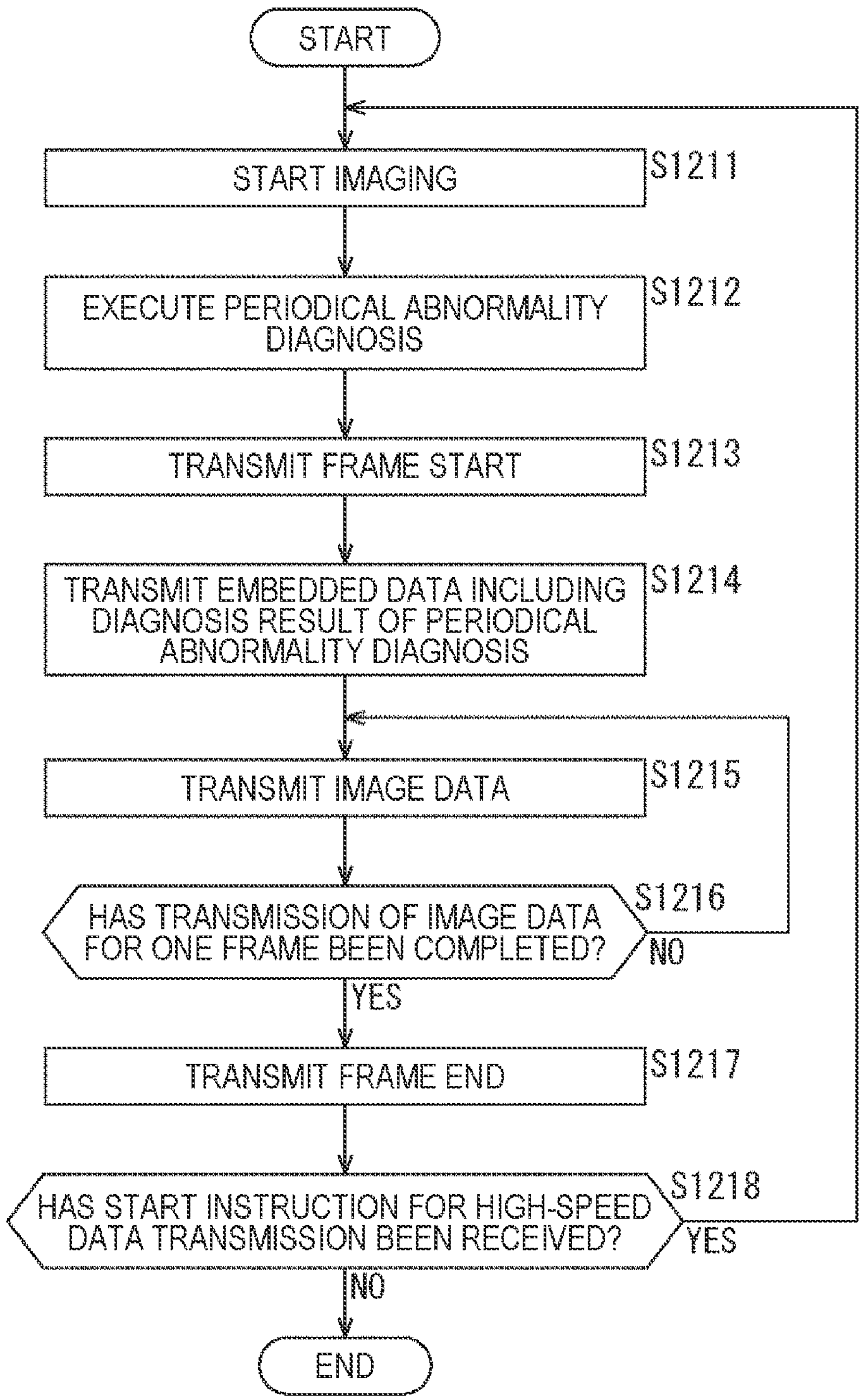

FIG. 132 is a flowchart for describing an application example of imaging transmission processing (part 1).

Figure 133:
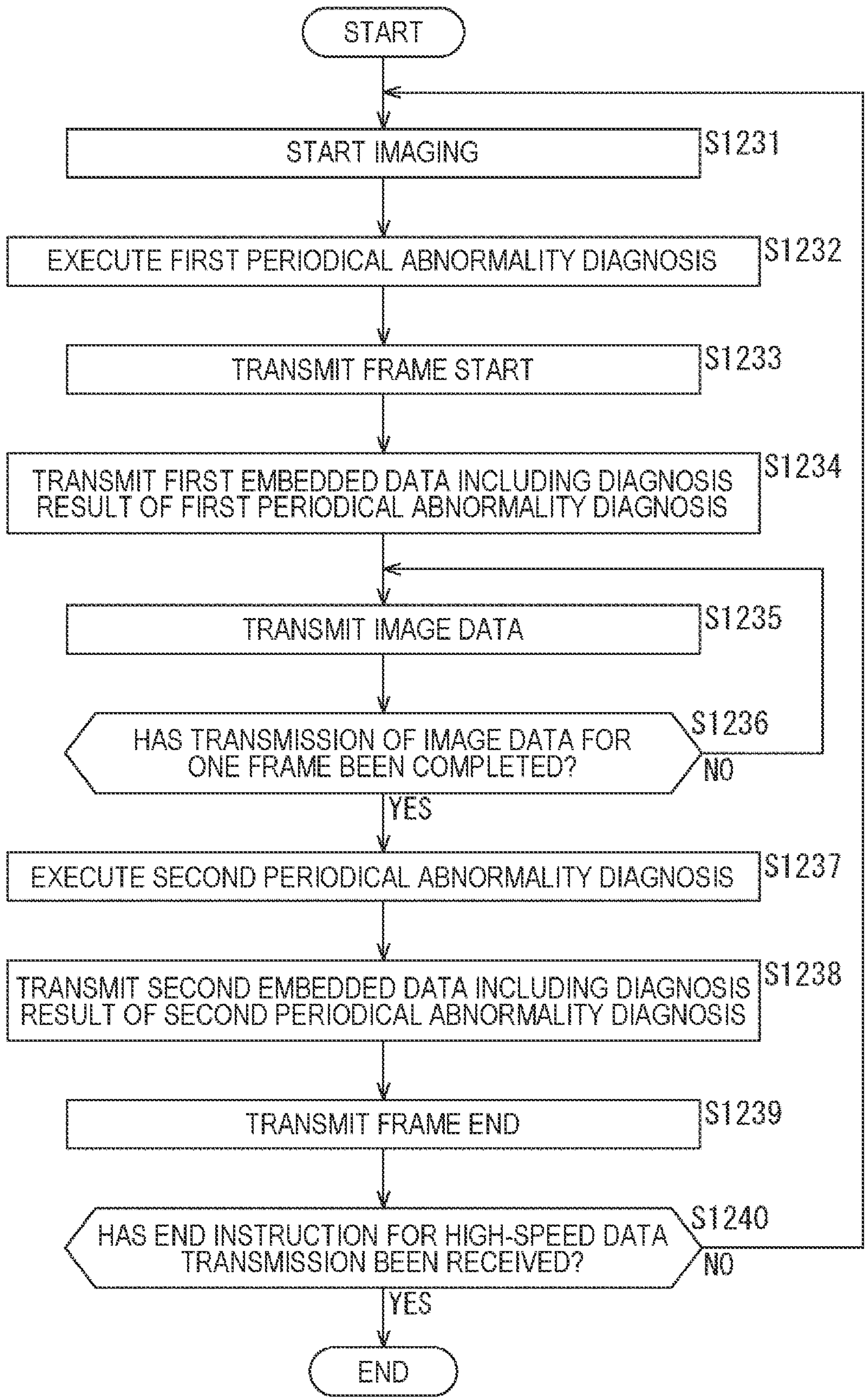

FIG. 133 is a flowchart for describing imaging transmission processing (part 2).

Figure 134:
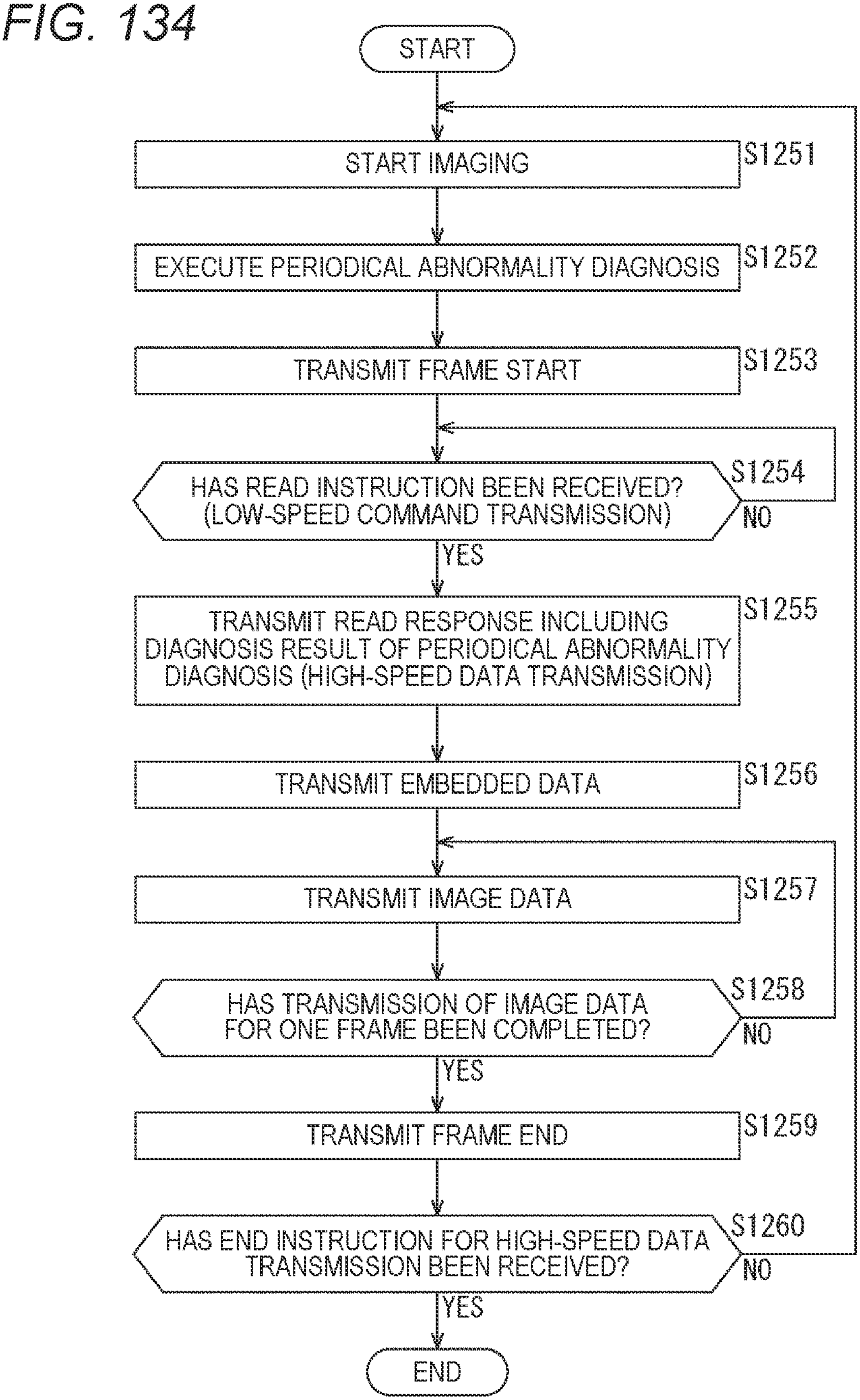

FIG. 134 is a flowchart for describing imaging transmission processing (part 3) by an image sensor.

Figure 135:
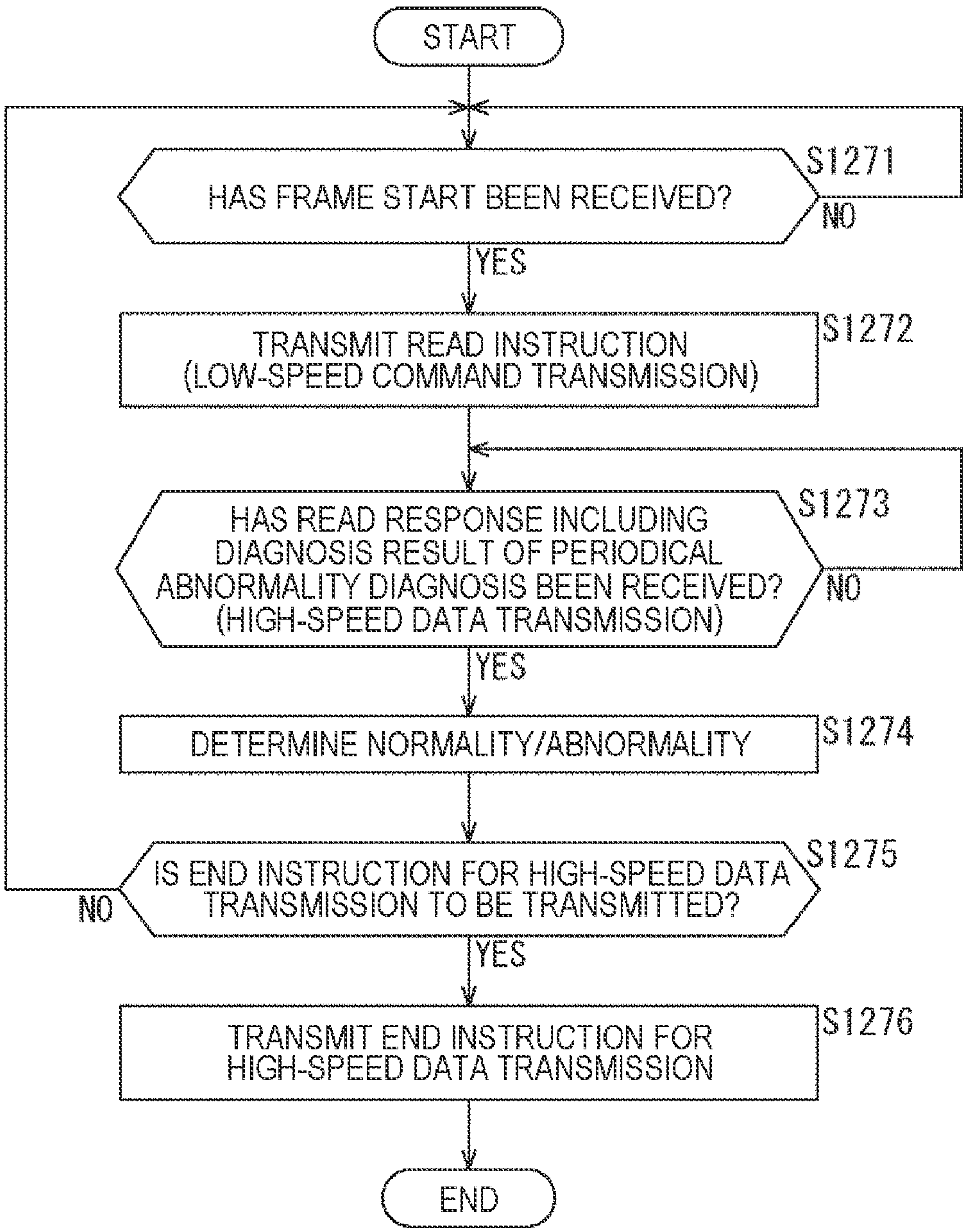

FIG. 135 is a flowchart for describing imaging transmission processing (part 3) by an application processor.

Figure 136:
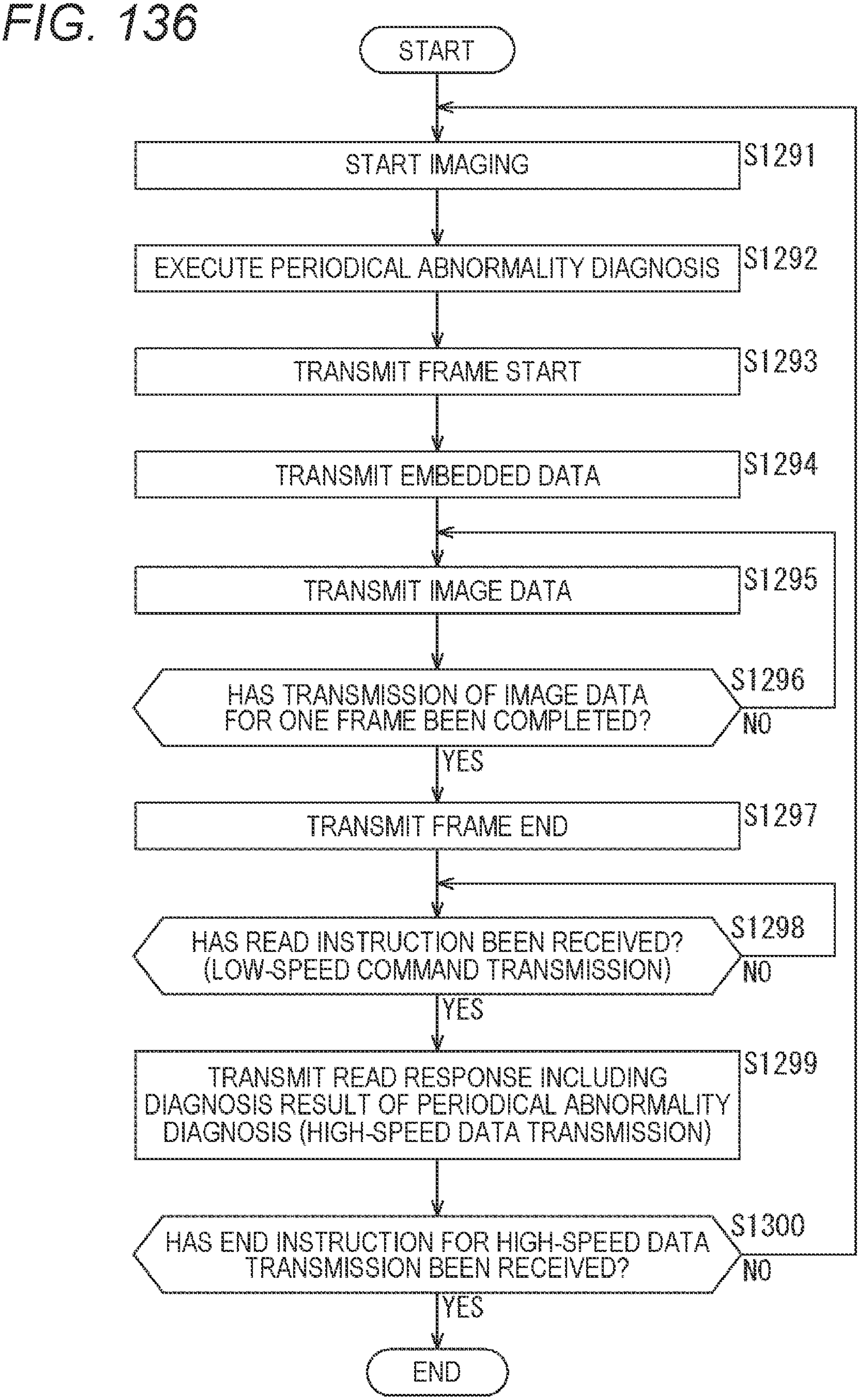

FIG. 136 is a flowchart for describing imaging transmission processing (part 4) by an image sensor.

Figure 137:
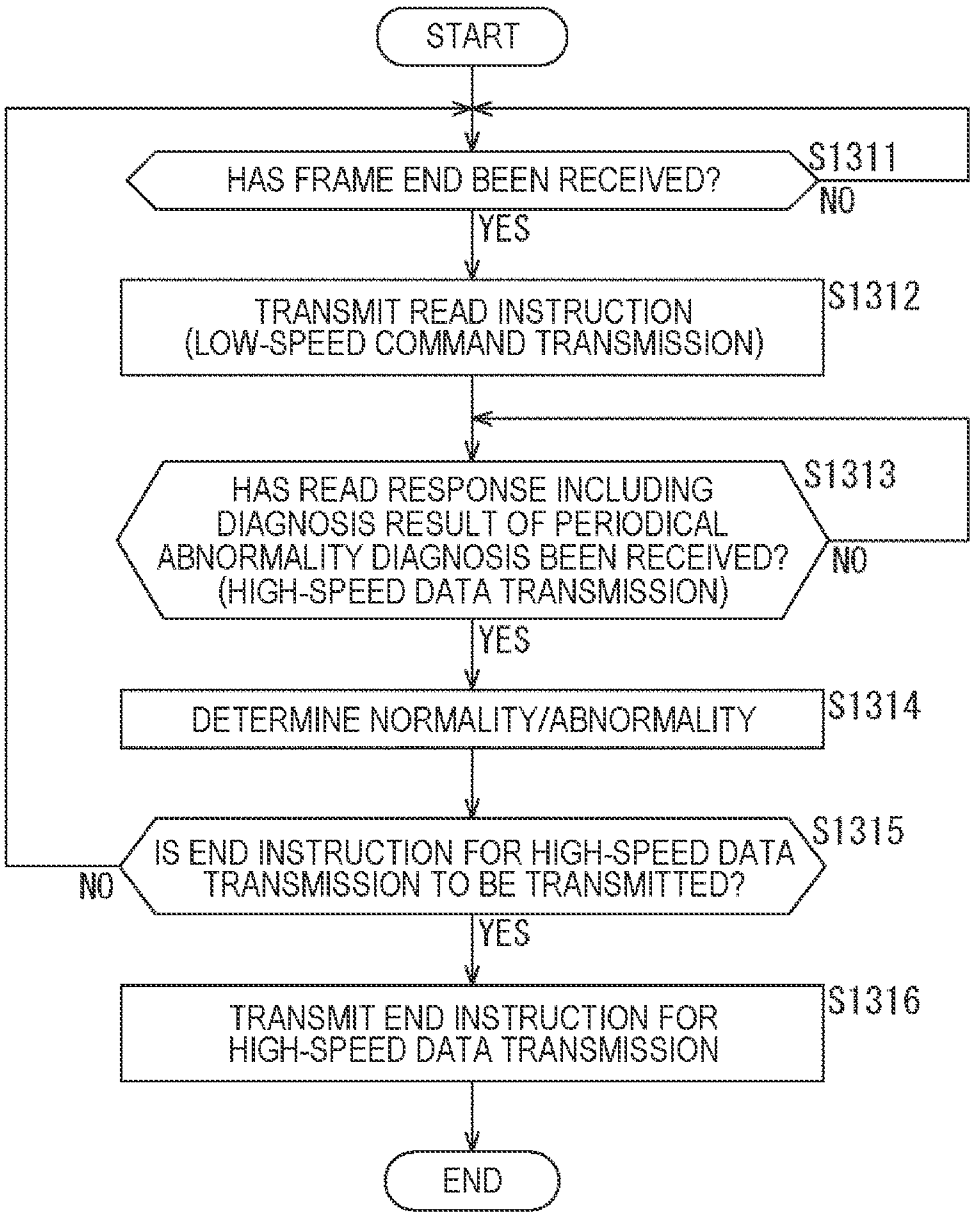

FIG. 137 is a flowchart for describing imaging transmission processing (part 4) by an application processor.

Figure 138:
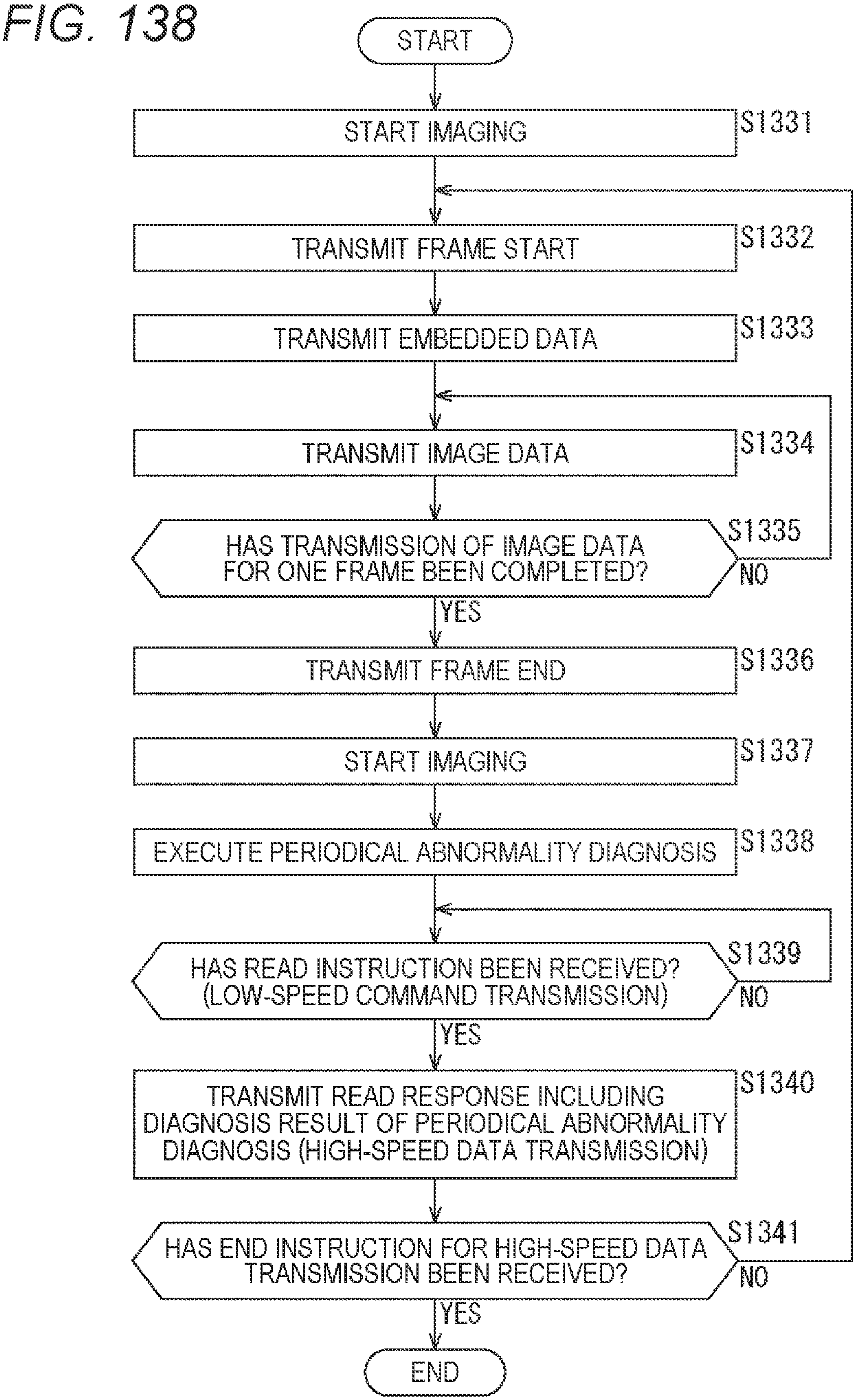

FIG. 138 is a flowchart for describing imaging transmission processing (part 5) by an image sensor.

Figure 139:
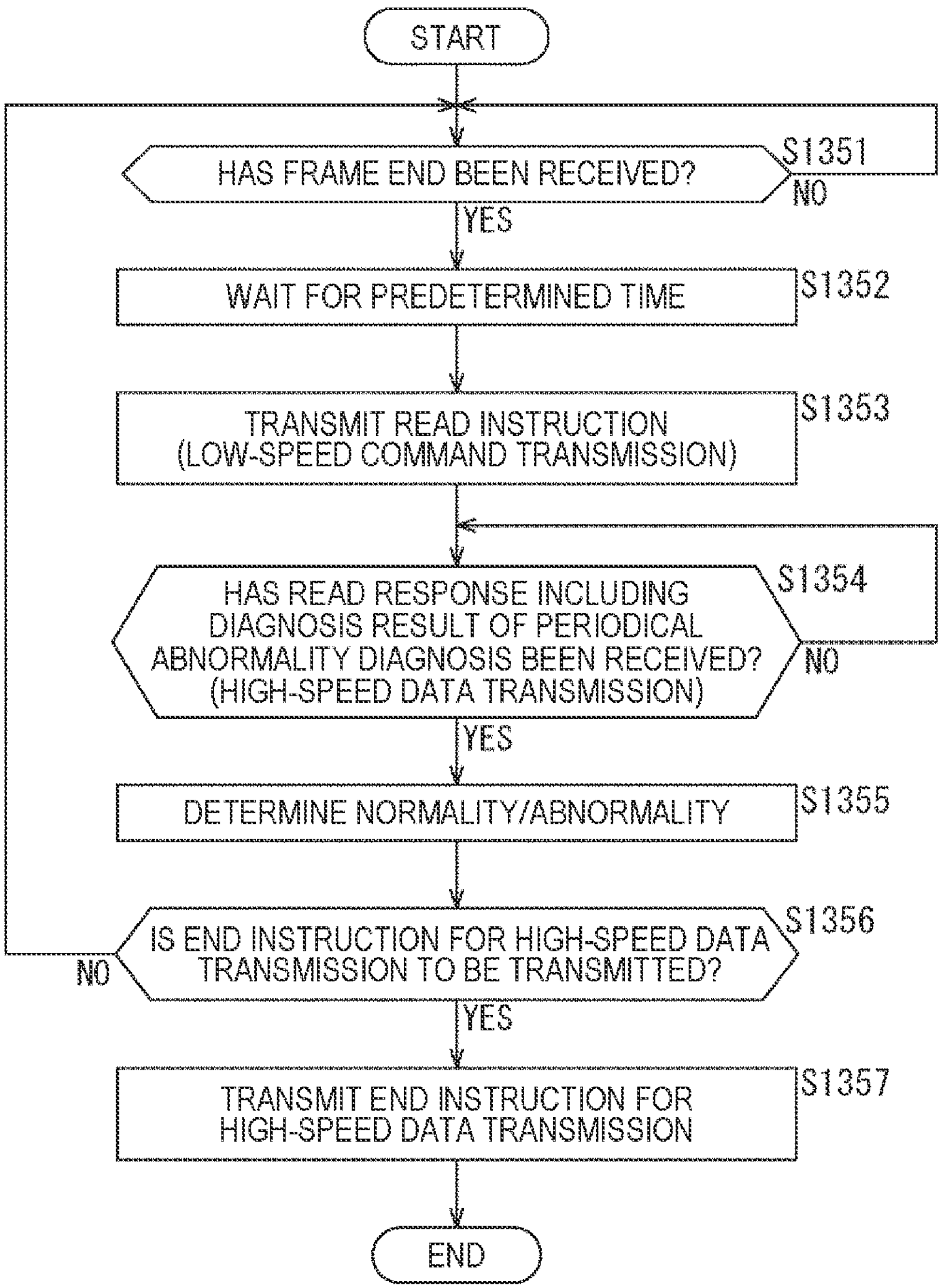

FIG. 139 is a flowchart for describing imaging transmission processing (part 5) by an application processor.

Figure 140:
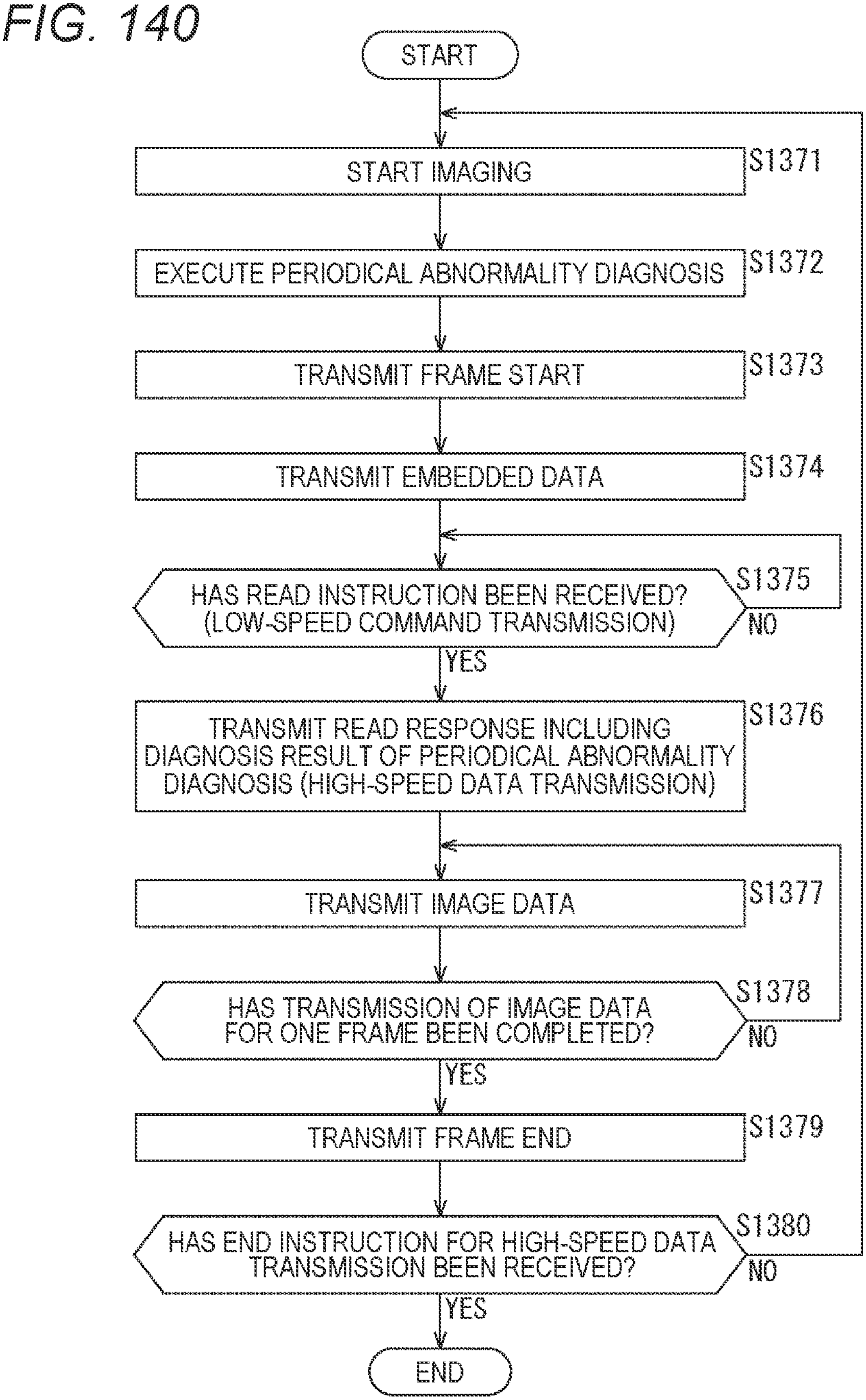

FIG. 140 is a flowchart for describing imaging transmission processing (part 6) by an image sensor.

Figure 141:
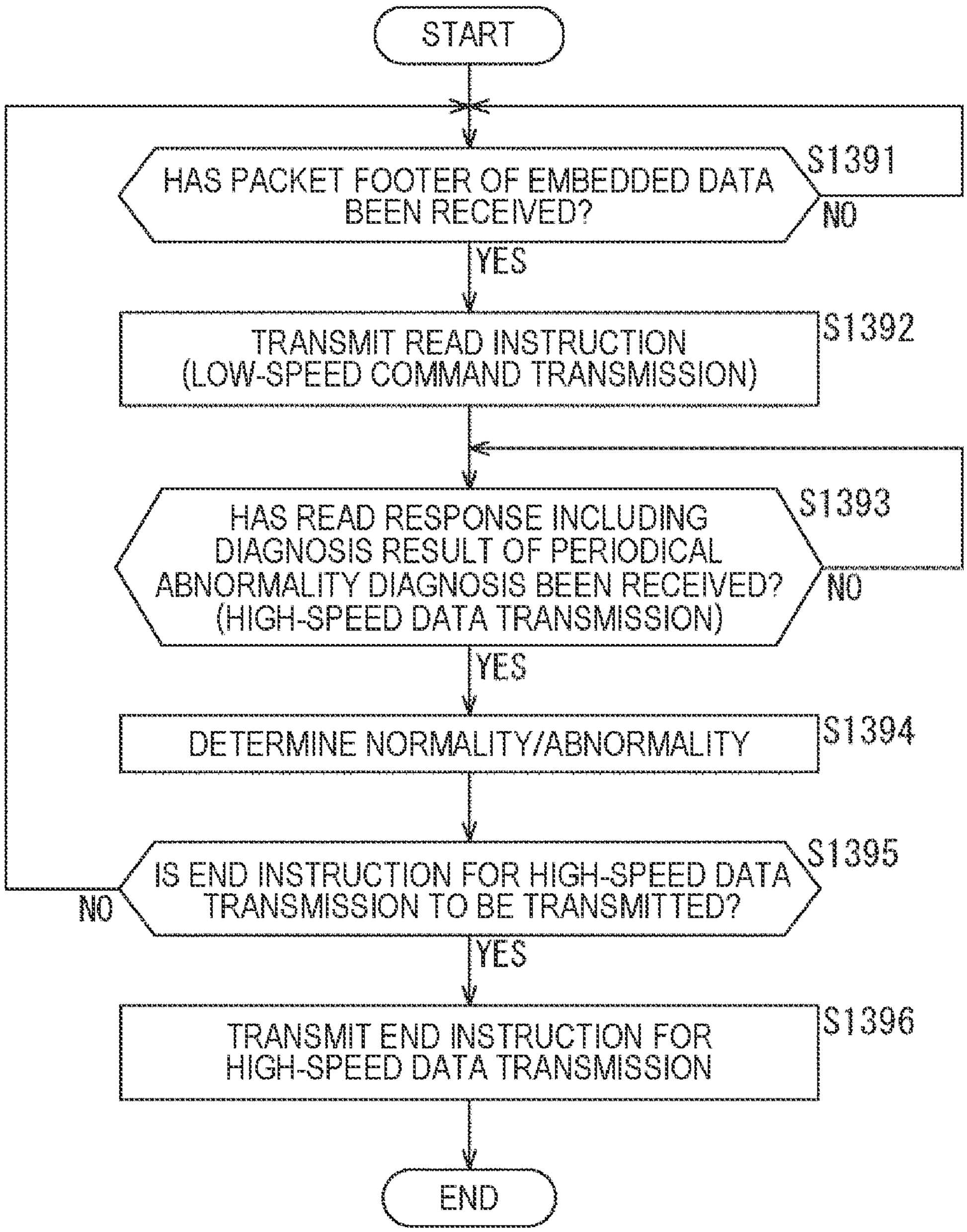

FIG. 141 is a flowchart for describing imaging transmission processing (part 6) by an application processor.

Figure 142:
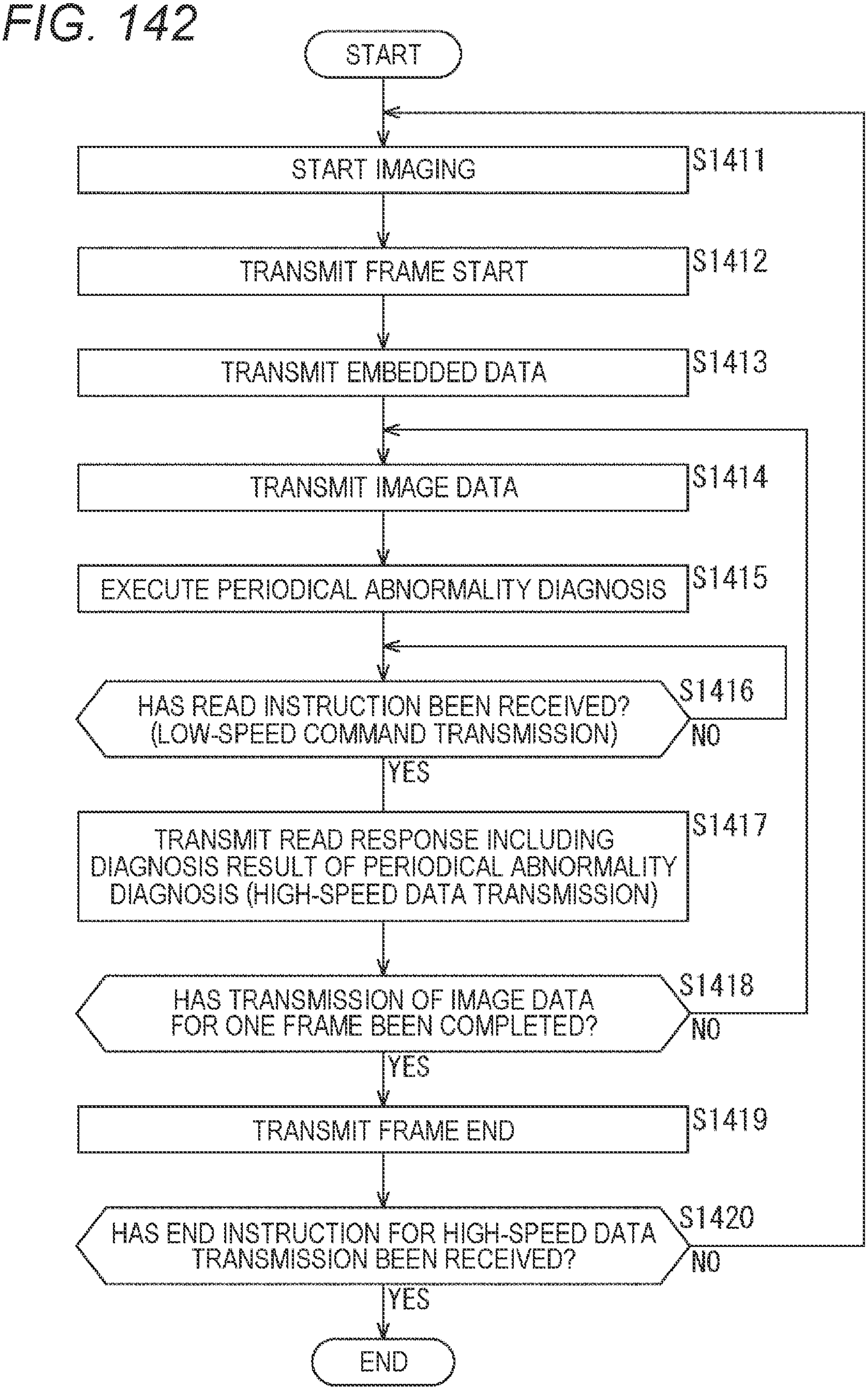

FIG. 142 is a flowchart for describing imaging transmission processing (part 7) by an image sensor.

Figure 143:
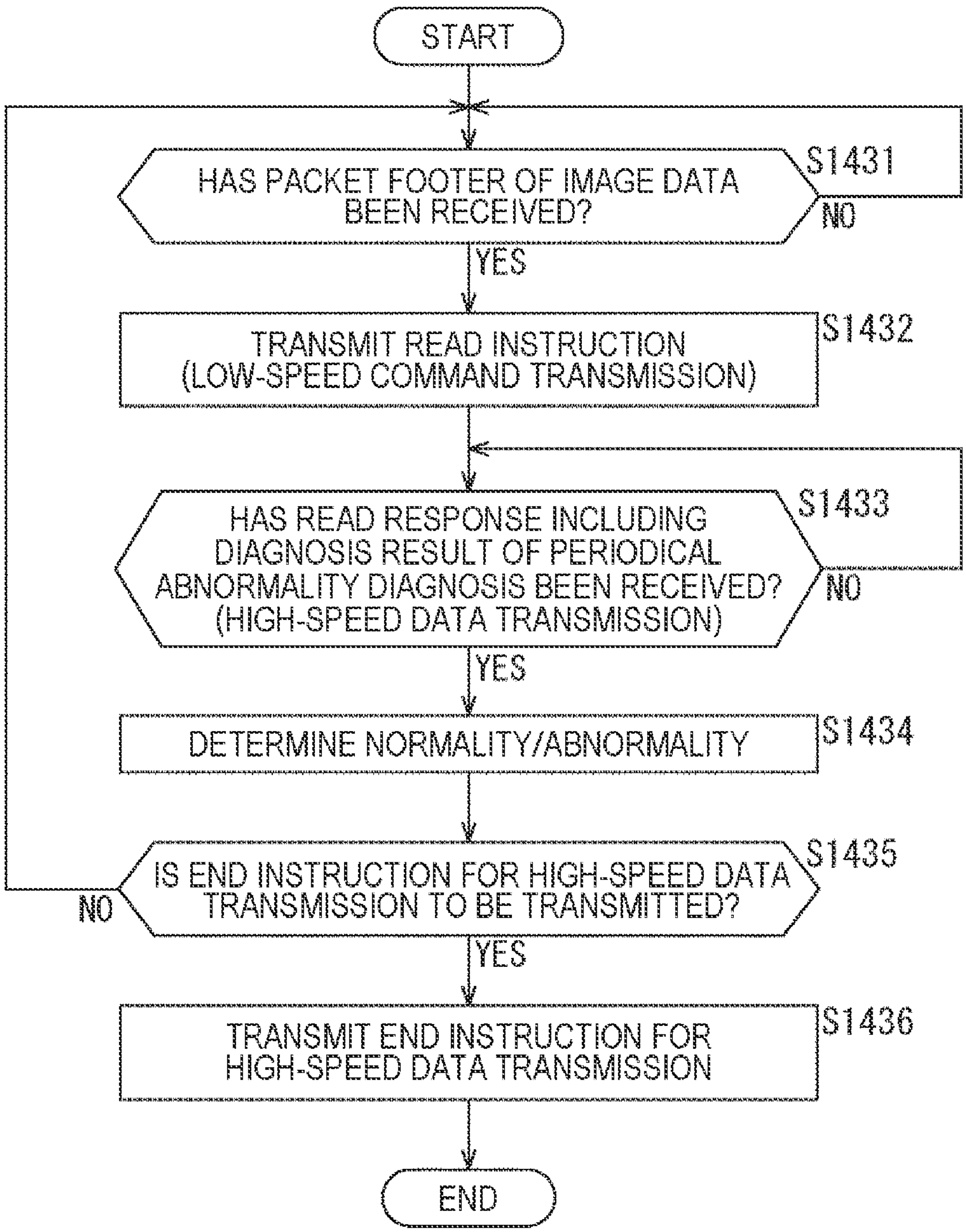

FIG. 143 is a flowchart for describing imaging transmission processing (part 7) by an application processor.

Figure 144:
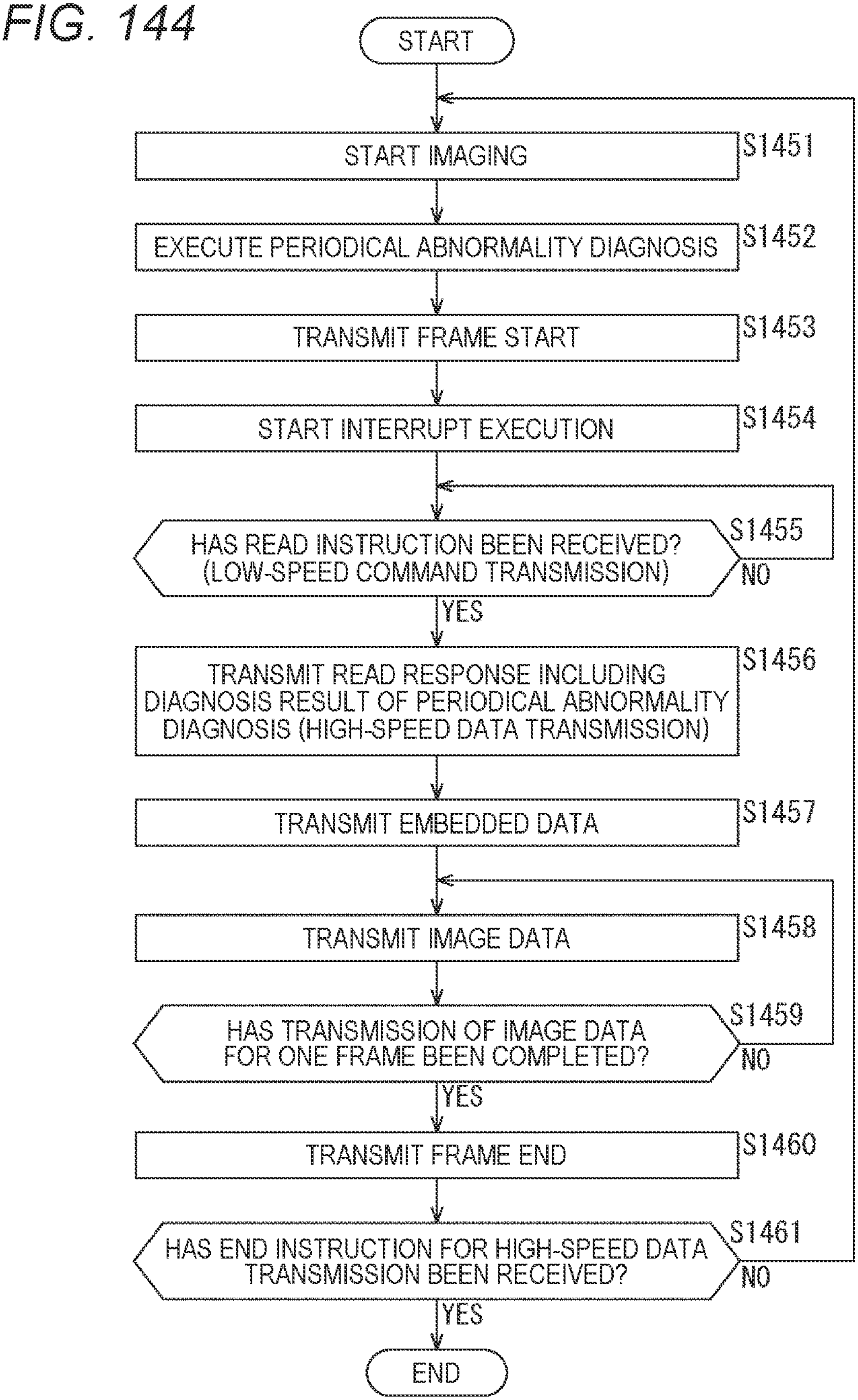

FIG. 144 is a flowchart for describing imaging transmission processing (part 8) by an image sensor.

Figure 145:
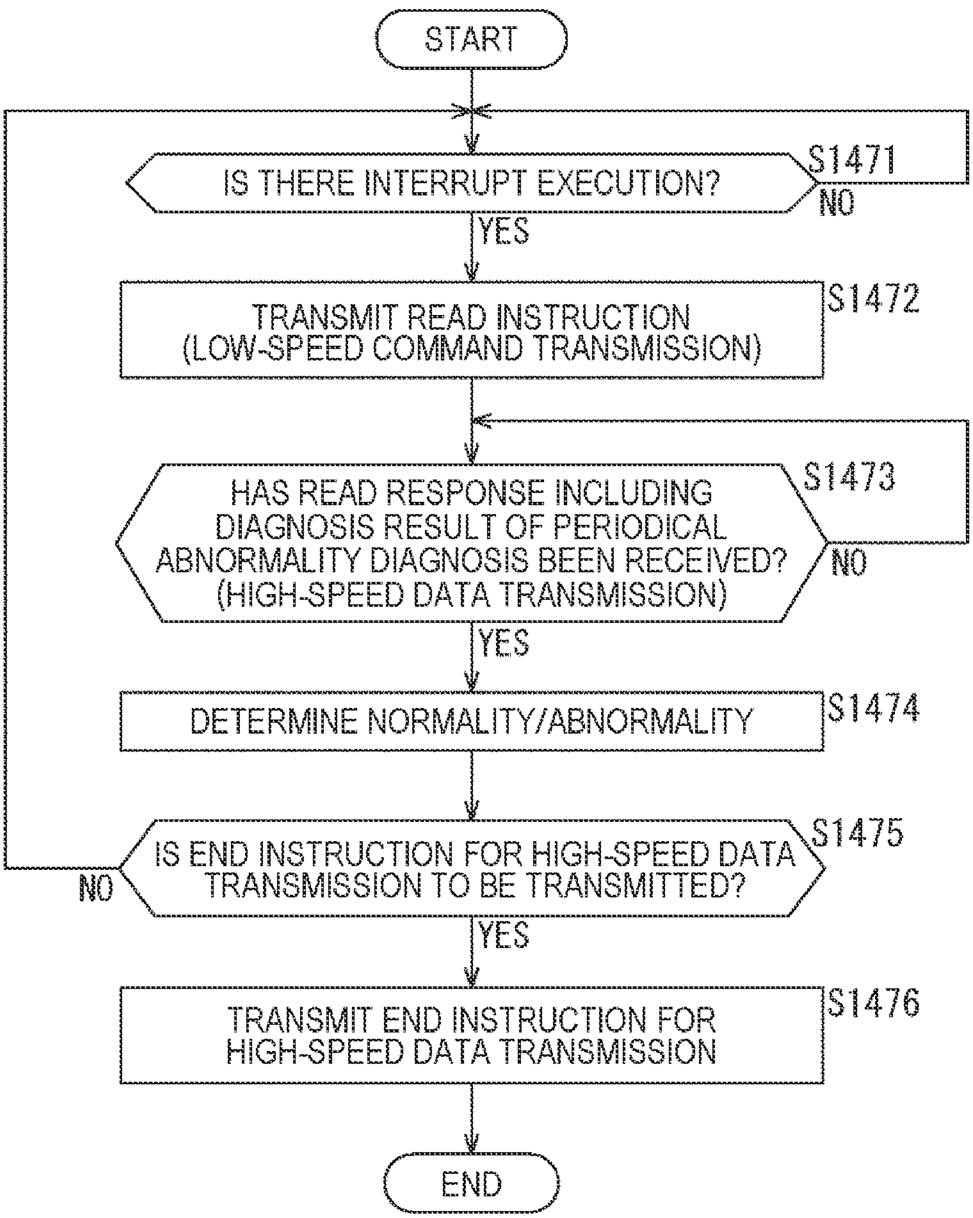

FIG. 145 is a flowchart for describing imaging transmission processing (part 8) by an application processor.

Figure 146:
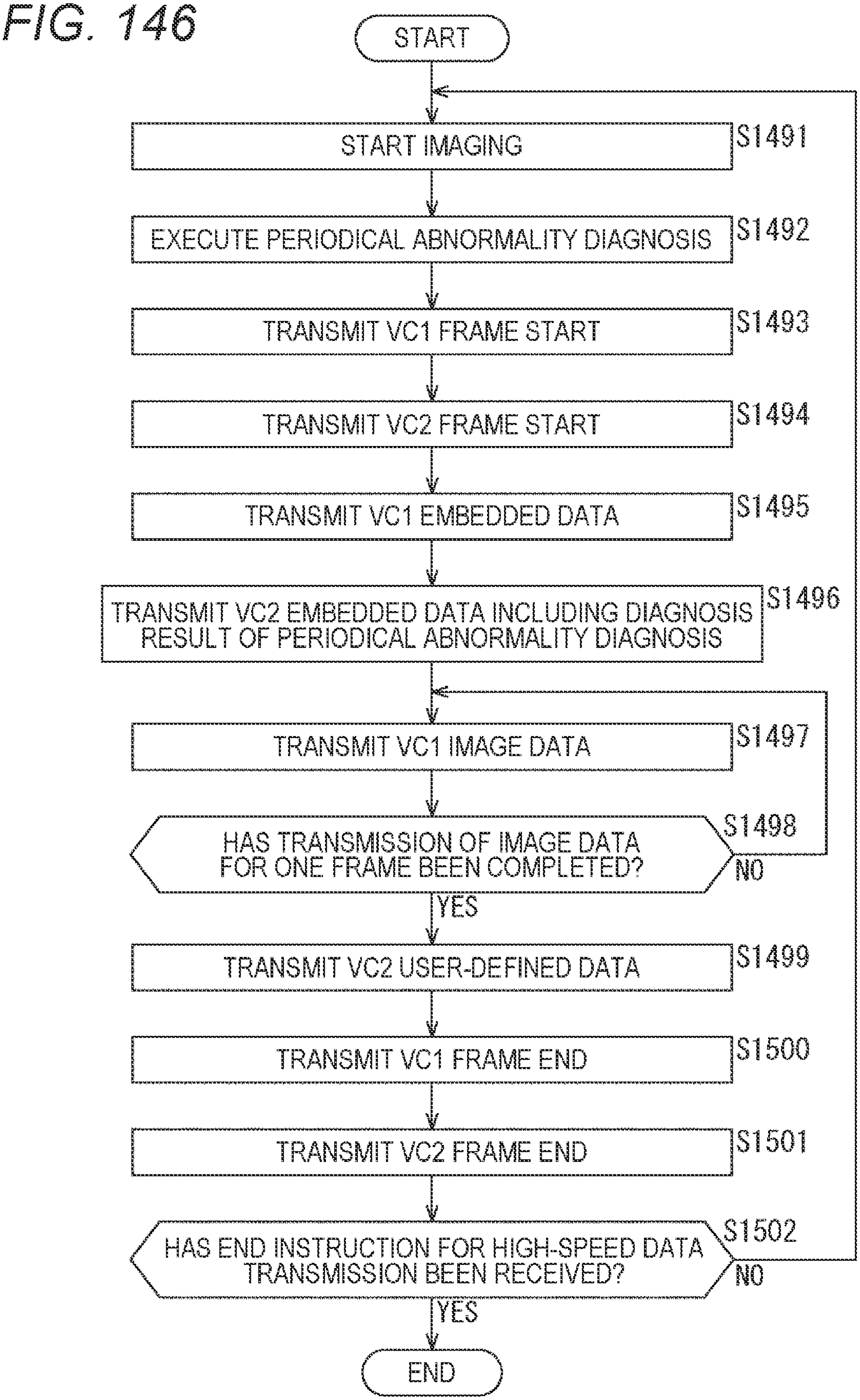

FIG. 146 is a flowchart for describing imaging transmission processing (part 9).

Figure 147:
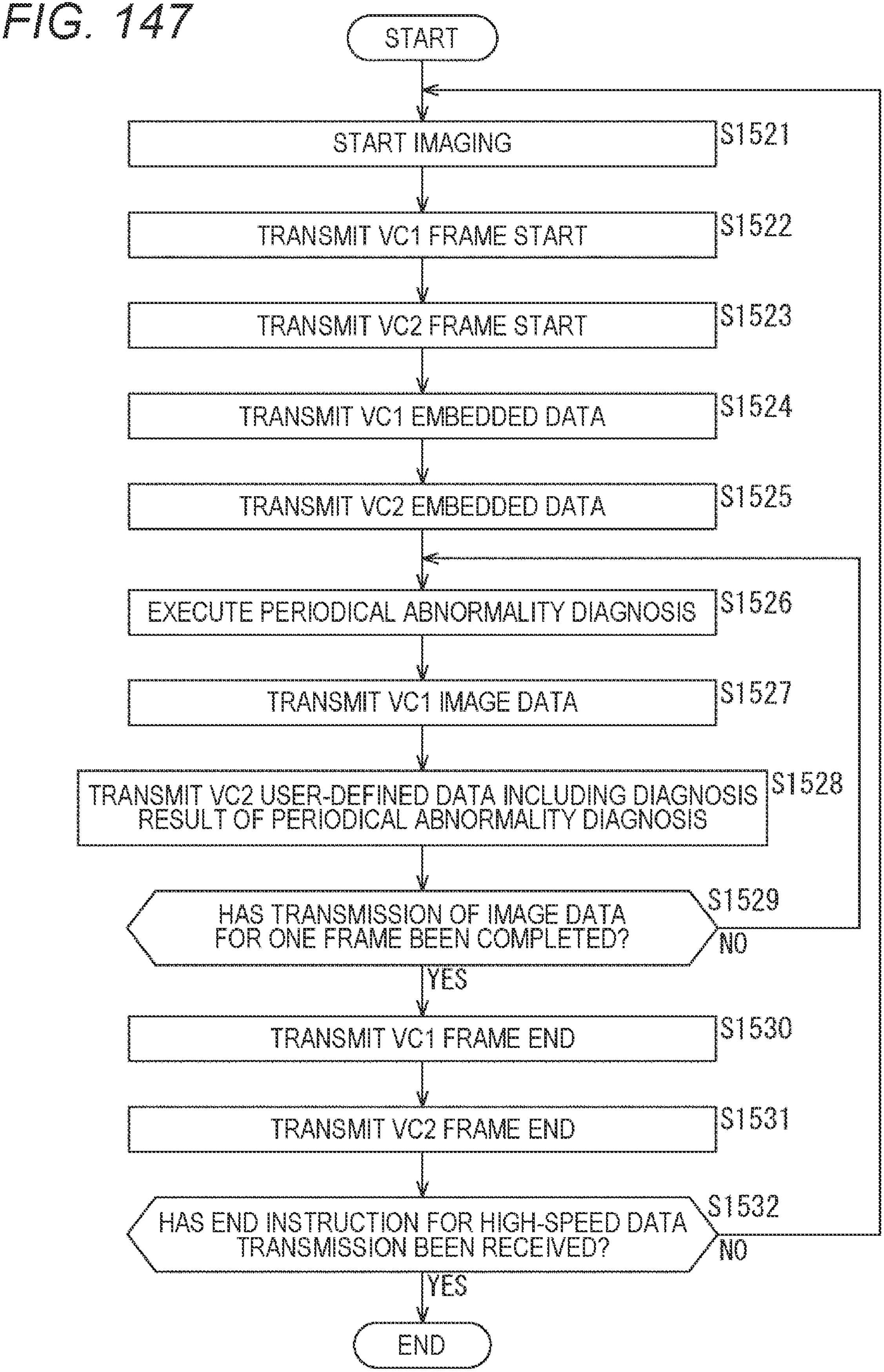

FIG. 147 is a flowchart for describing imaging transmission processing (part 10).

Figure 148:
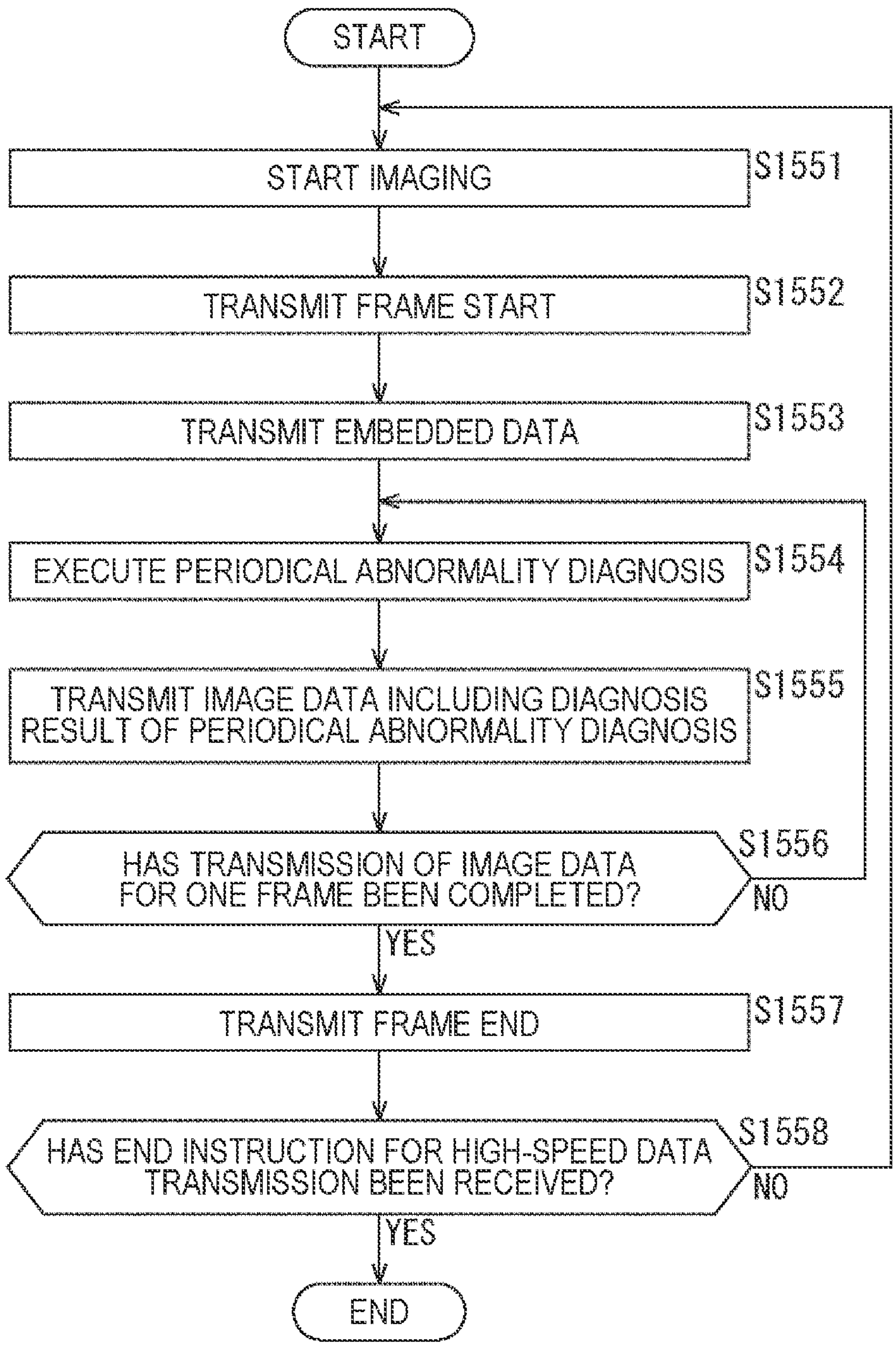

FIG. 148 is a flowchart for describing imaging transmission processing (part 11).

FIG. 149 is a diagram for describing message count values using two types of count values having different Hamming distances.

FIG. 150 is a diagram for describing a method of detecting presence or absence of a defect or falsification of a message count value, using two types of count values.

FIG. 151 is a diagram for describing a method of detecting presence or absence of a defect or falsification of a message count value, using two types of count values.

Figure 152:
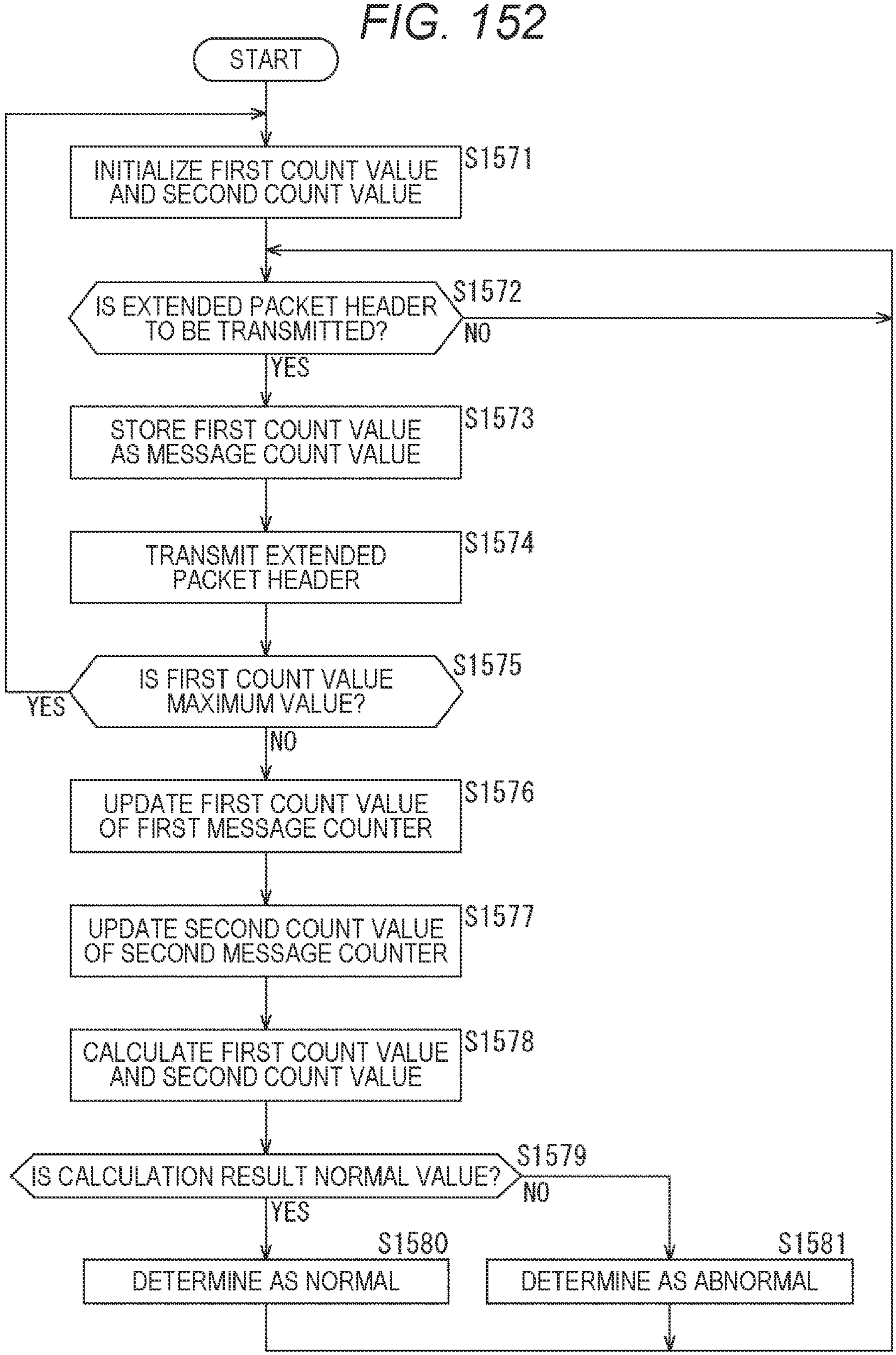

FIG. 152 is a flowchart for describing message counting processing.

FIG. 153 is a diagram for describing a configuration example of an extended packet header ePH2 when Warning Descriptor is set in a reserved area (Reserved) in the extended packet header ePH2.

FIG. 154 is a diagram for describing a description example of identification information using each bit of Warning Descriptor (unique message).

FIG. 155 is a diagram for describing a configuration example when warning flash (for example, Physical attack detection) is set as a first unique message in an extended packet header.

Figure 156:
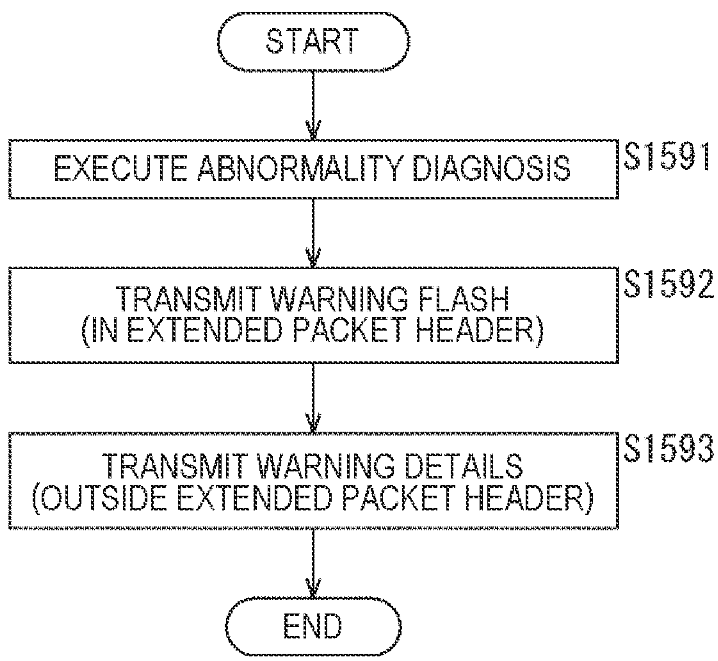

FIG. 156 is a flowchart for describing transmission processing of an image sensor when a unique message is separated and transmitted.

Figure 157:
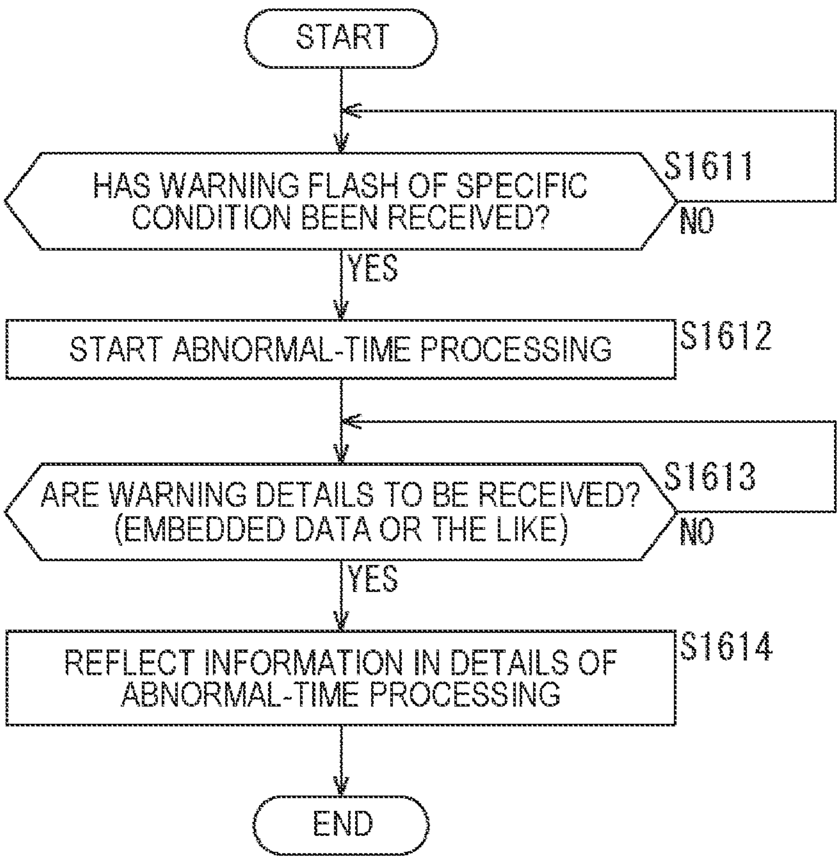

FIG. 157 is a flowchart for describing transmission processing of an application processor when a unique message is separated and transmitted.

Figure 158:
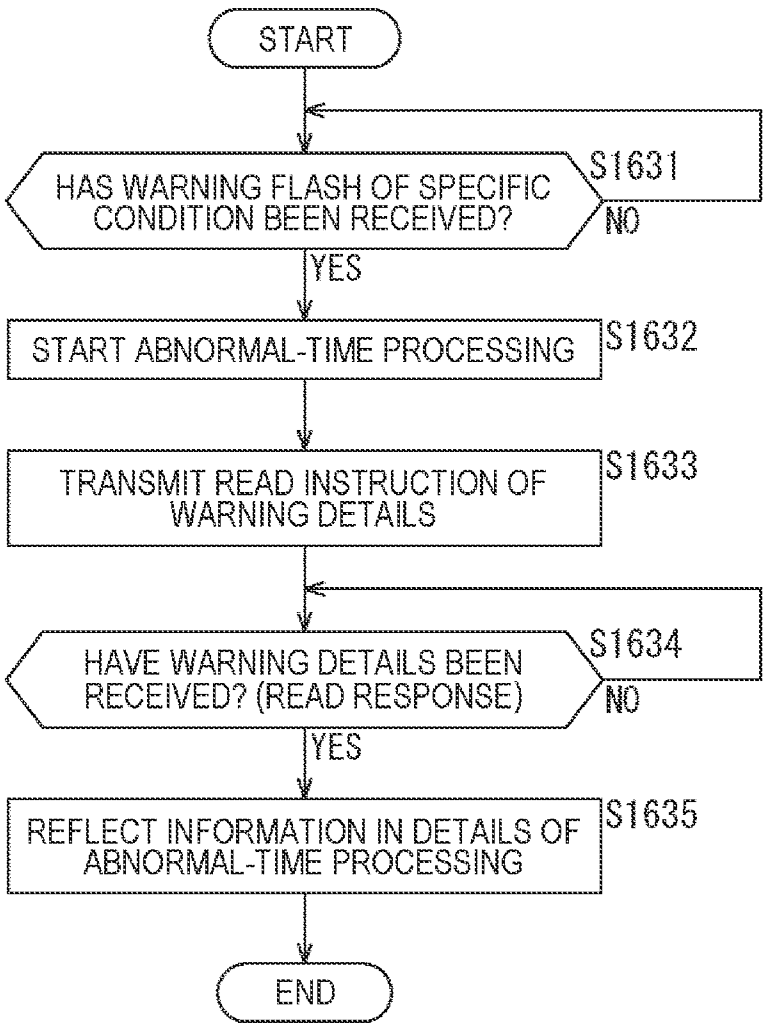

FIG. 158 is a flowchart for describing transmission processing when a unique message is separated and transmitted in a case where a read instruction of warning details is transmitted after warning flash is transmitted.

FIG. 159 is a diagram for describing a configuration example of Security Descriptor in which any unique message such as presence or absence of abnormality inside or outside the image sensor 1211, presence or absence of interference or attack on the image sensor 1211, or the like is set.

Figure 160:
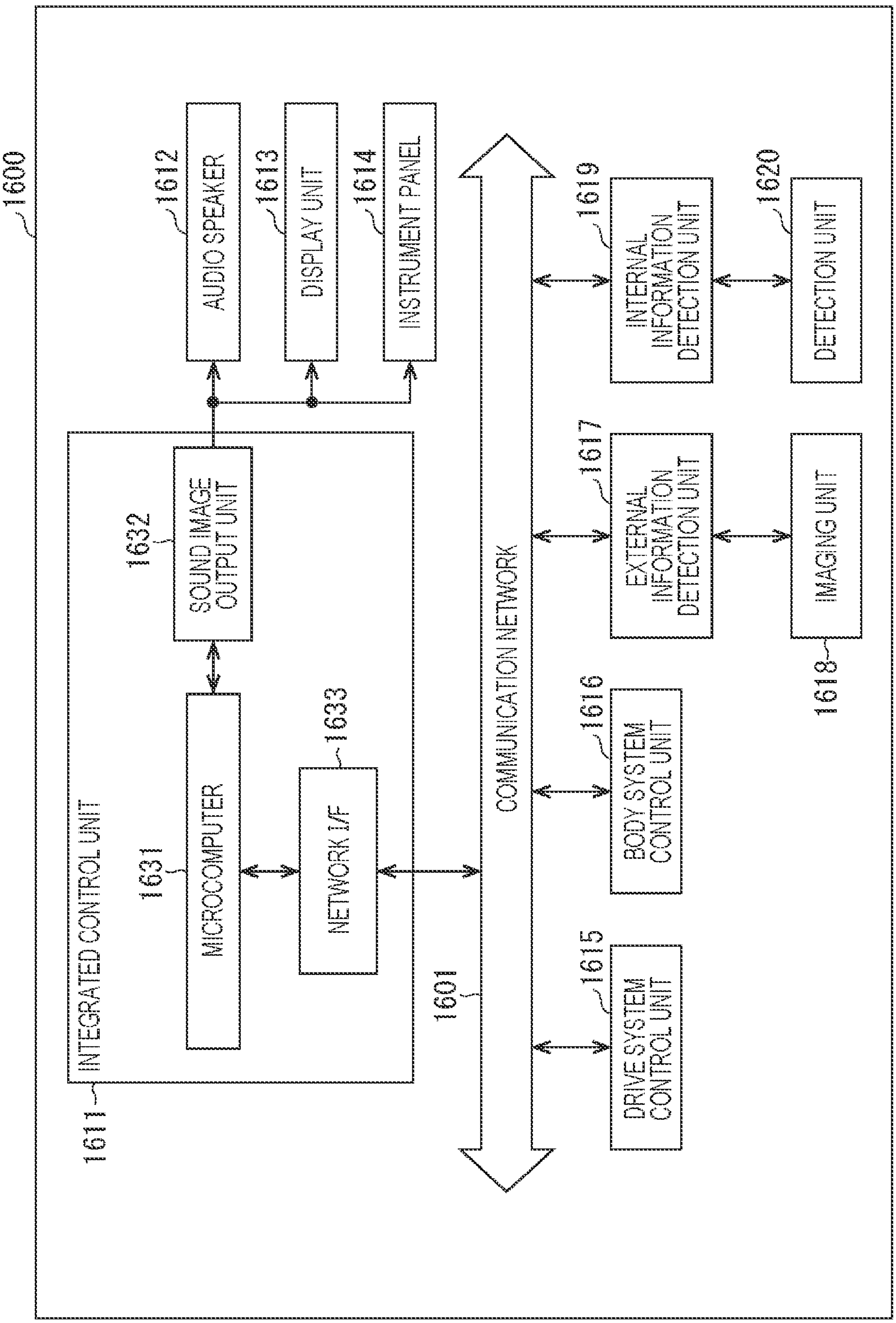

FIG. 160 is a block diagram illustrating a configuration example of a propulsion device in which an image sensor and an application processor are mounted.

Figure 161:
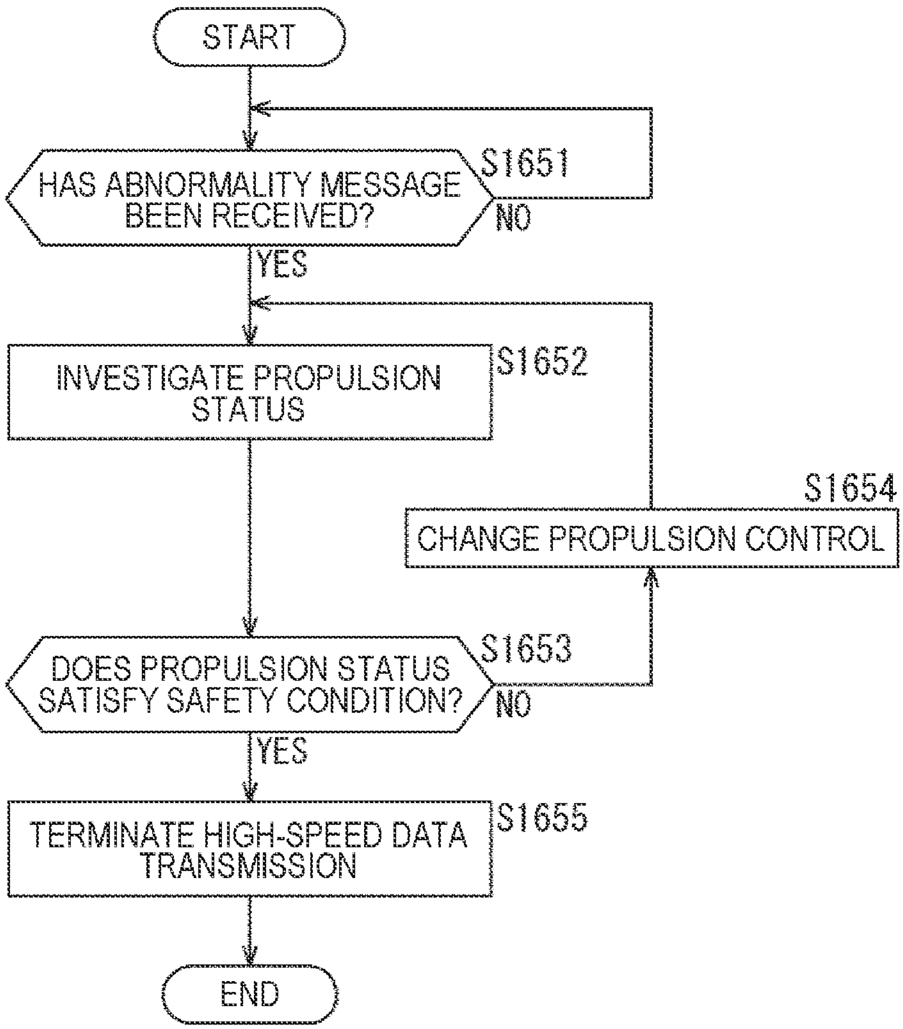

FIG. 161 is a diagram for describing propulsion control processing (part 1) for controlling propulsion of the propulsion device of FIG. 160.

Figure 162:
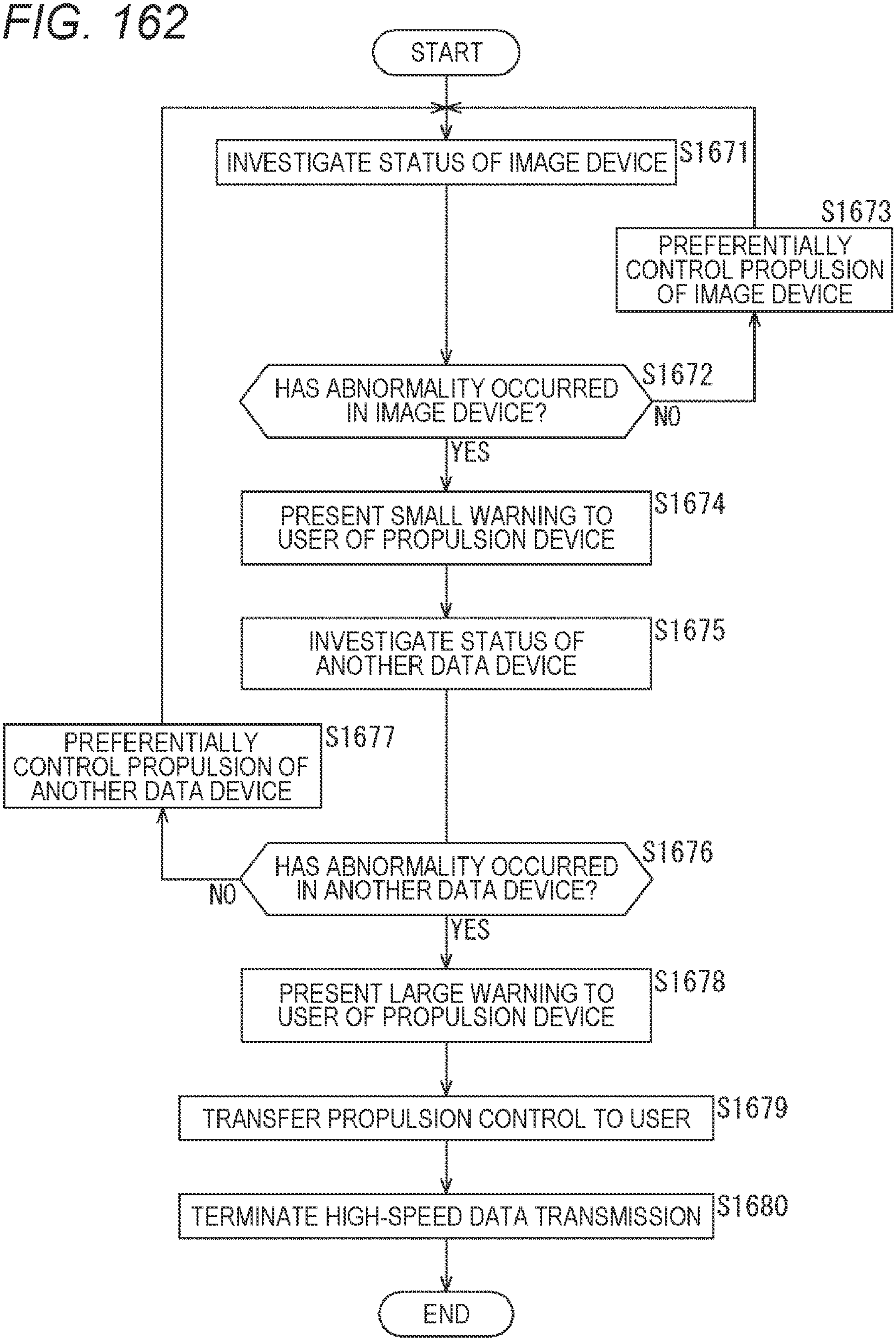

FIG. 162 is a diagram for describing propulsion control processing (part 2) for controlling propulsion of the propulsion device of FIG. 160.

Figure 163:
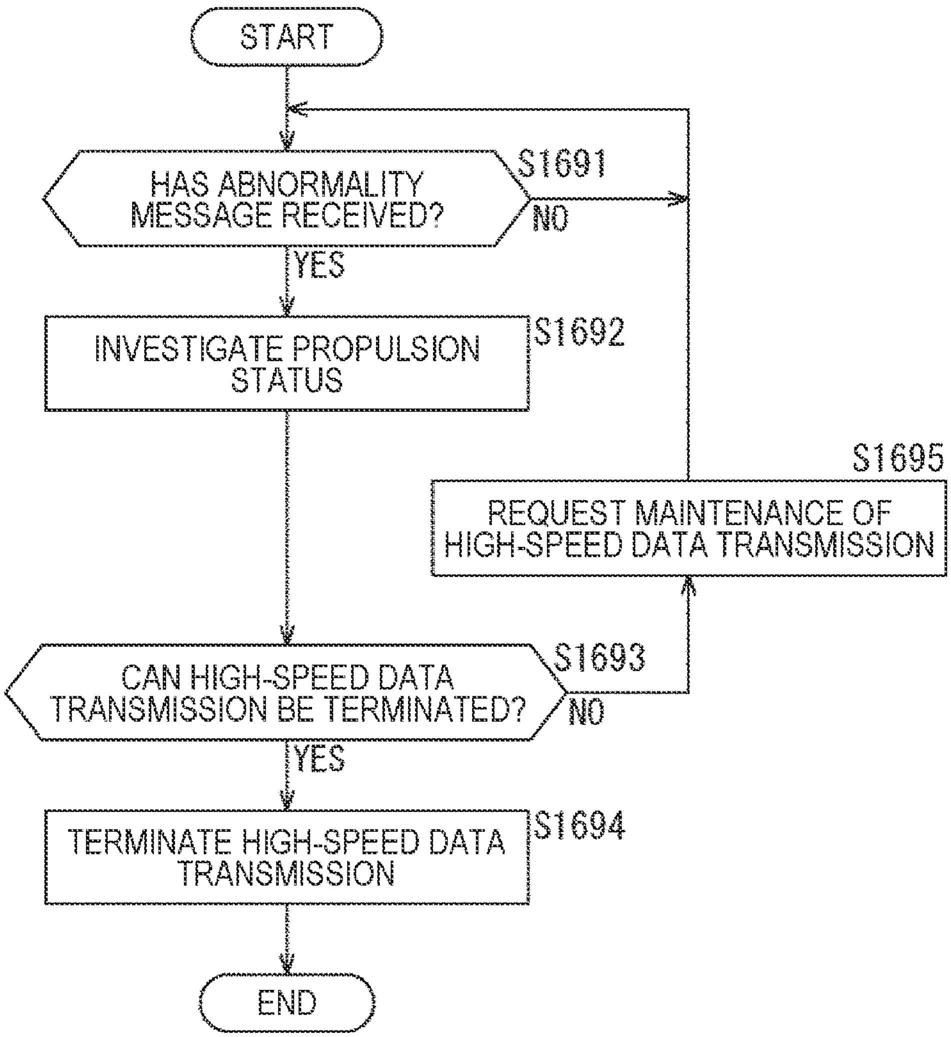

FIG. 163 is a diagram for describing propulsion control processing (part 3) by a microcomputer that controls propulsion of the propulsion device of FIG. 160.

Figure 164:
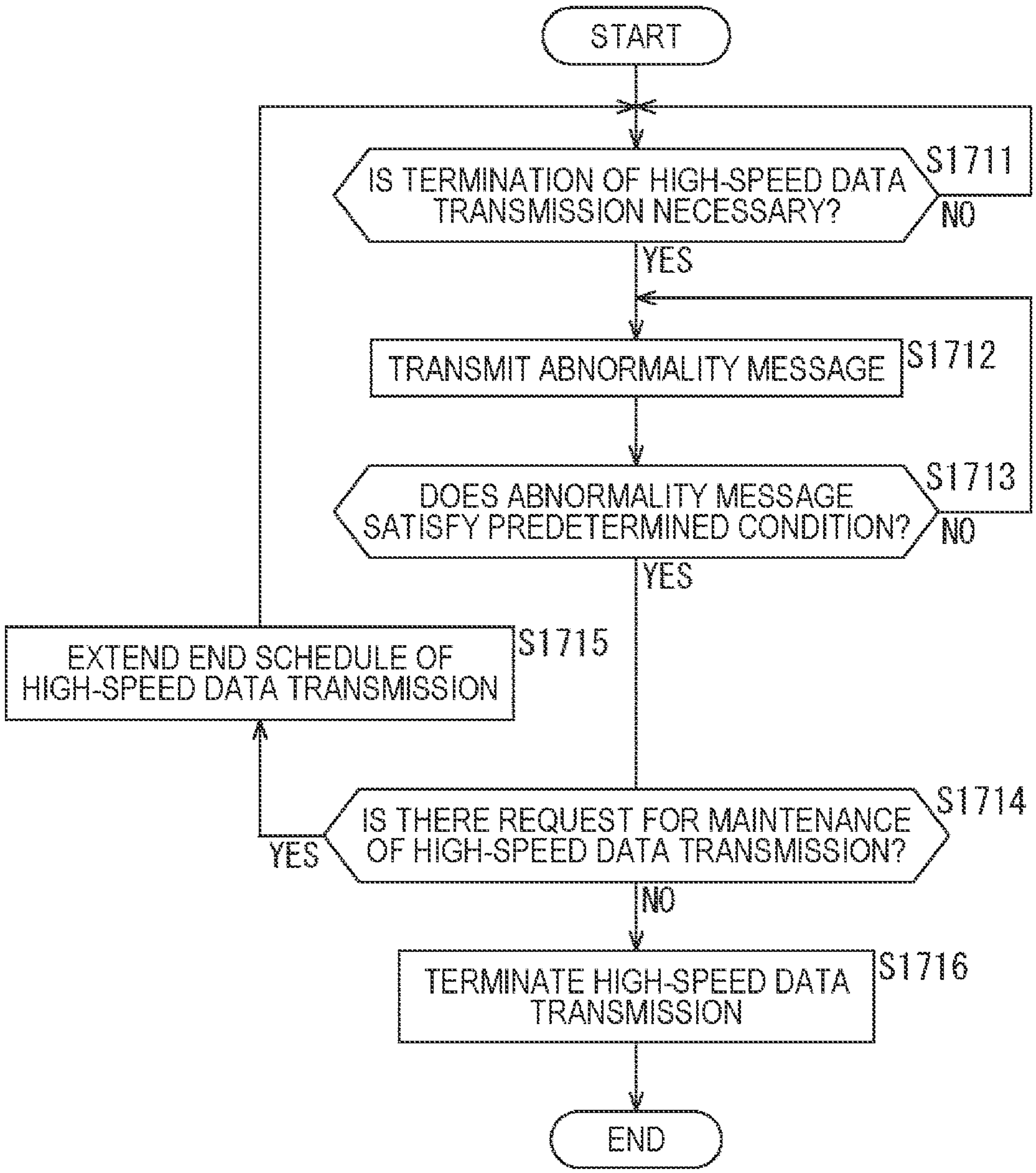

FIG. 164 is a diagram for describing propulsion control processing (part 3) by an imaging unit that controls propulsion of the propulsion device of FIG. 160.

FIG. 165 is a diagram for describing a configuration example of Responder flag fields definitions for setting enabling (HBEAT_CAP=1) or disabling (HBEAT_CAP=0) of HEARTBEAT function.

FIG. 166 is a diagram for describing a configuration example of a HEARTBEAT request message.

FIG. 167 is a diagram for describing a configuration example of a HEARTBEAT_ACK response message.

FIG. 168 is a diagram for describing a configuration example of a HEARTBEAT_NAK response message.

FIG. 169 is a diagram for describing a configuration example of an END_SESSION request message.

Figure 170:
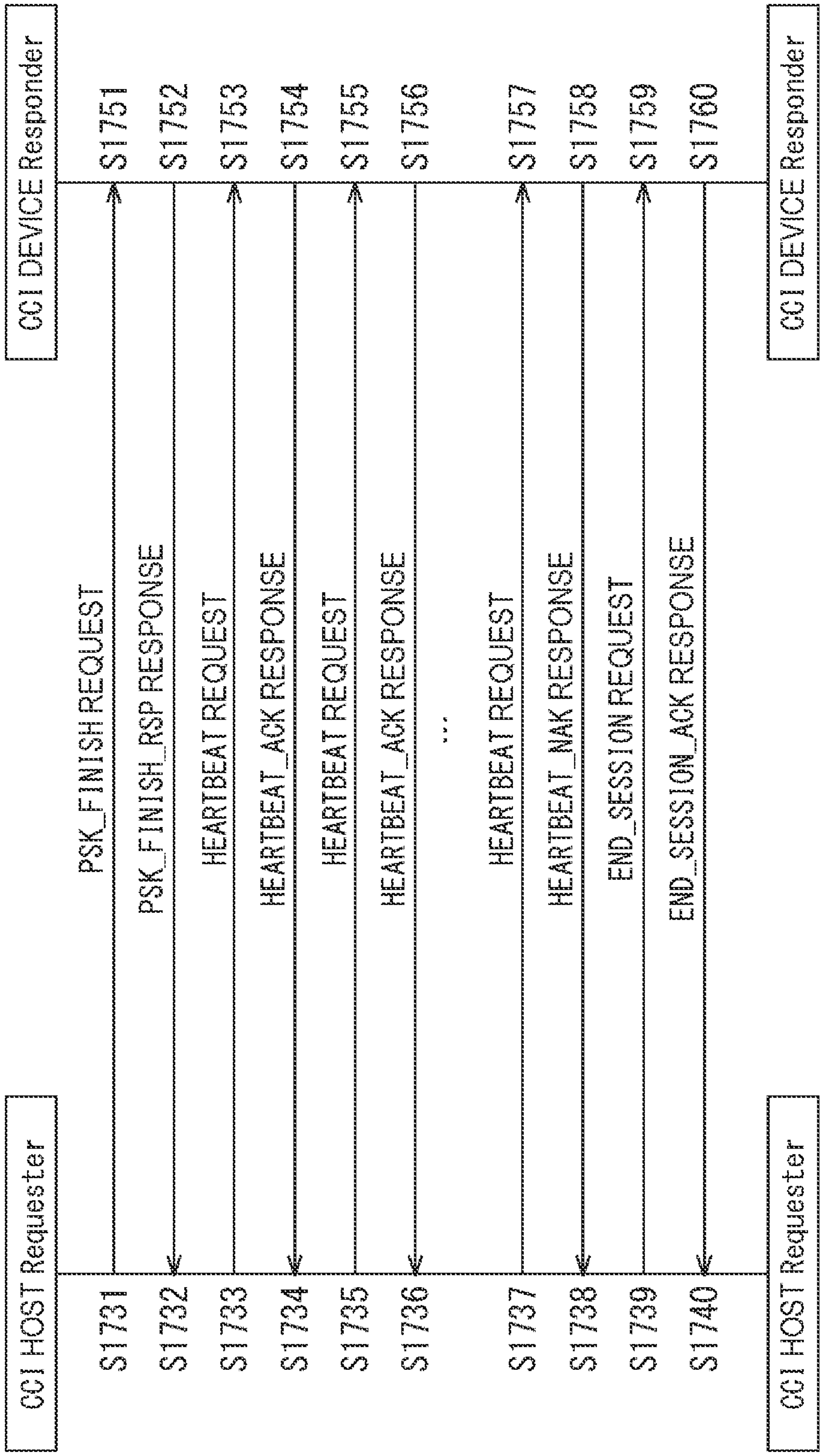

FIG. 170 is a flowchart for describing HEARTBEAT processing (part 1).

FIG. 171 is a diagram for describing a configuration example of an END_SESSION_NAK response message.

Figure 172:
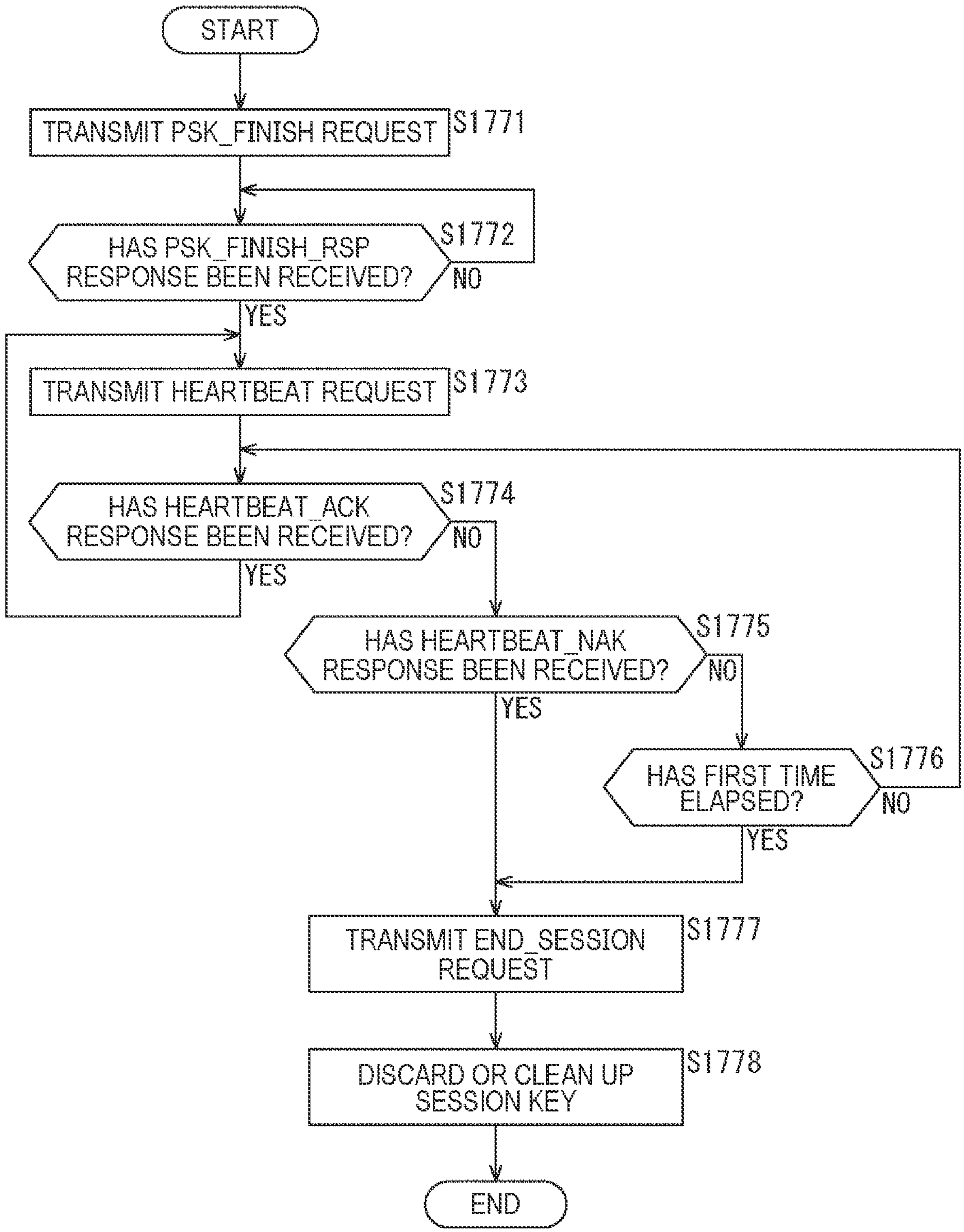

FIG. 172 is a flowchart for describing HEARTBEAT processing (part 2) of a CCI host (requester).

Figure 173:
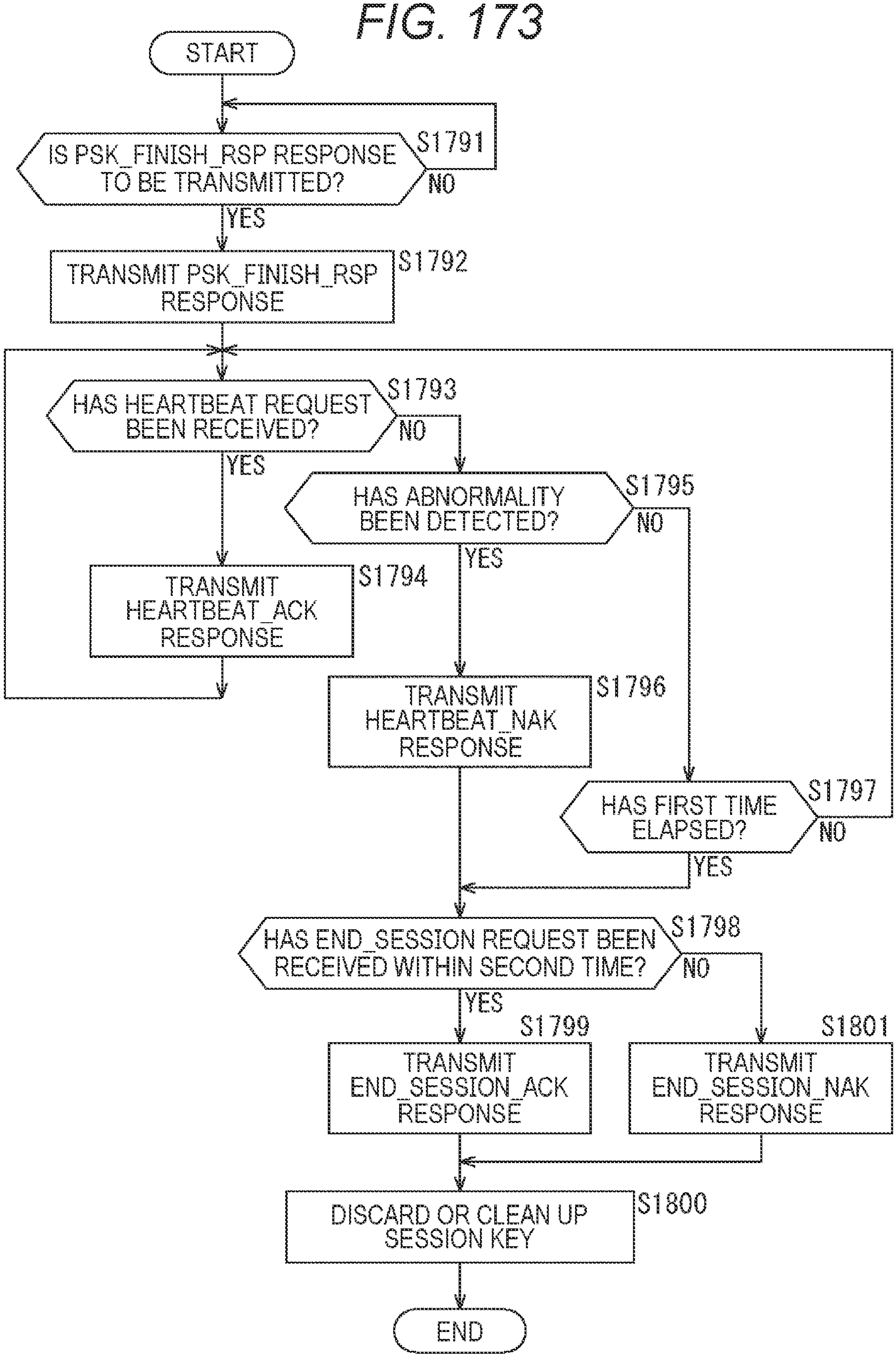

FIG. 173 is a flowchart for describing HEARTBEAT processing (part 2) of a CCI device (responder).

Figure 174:
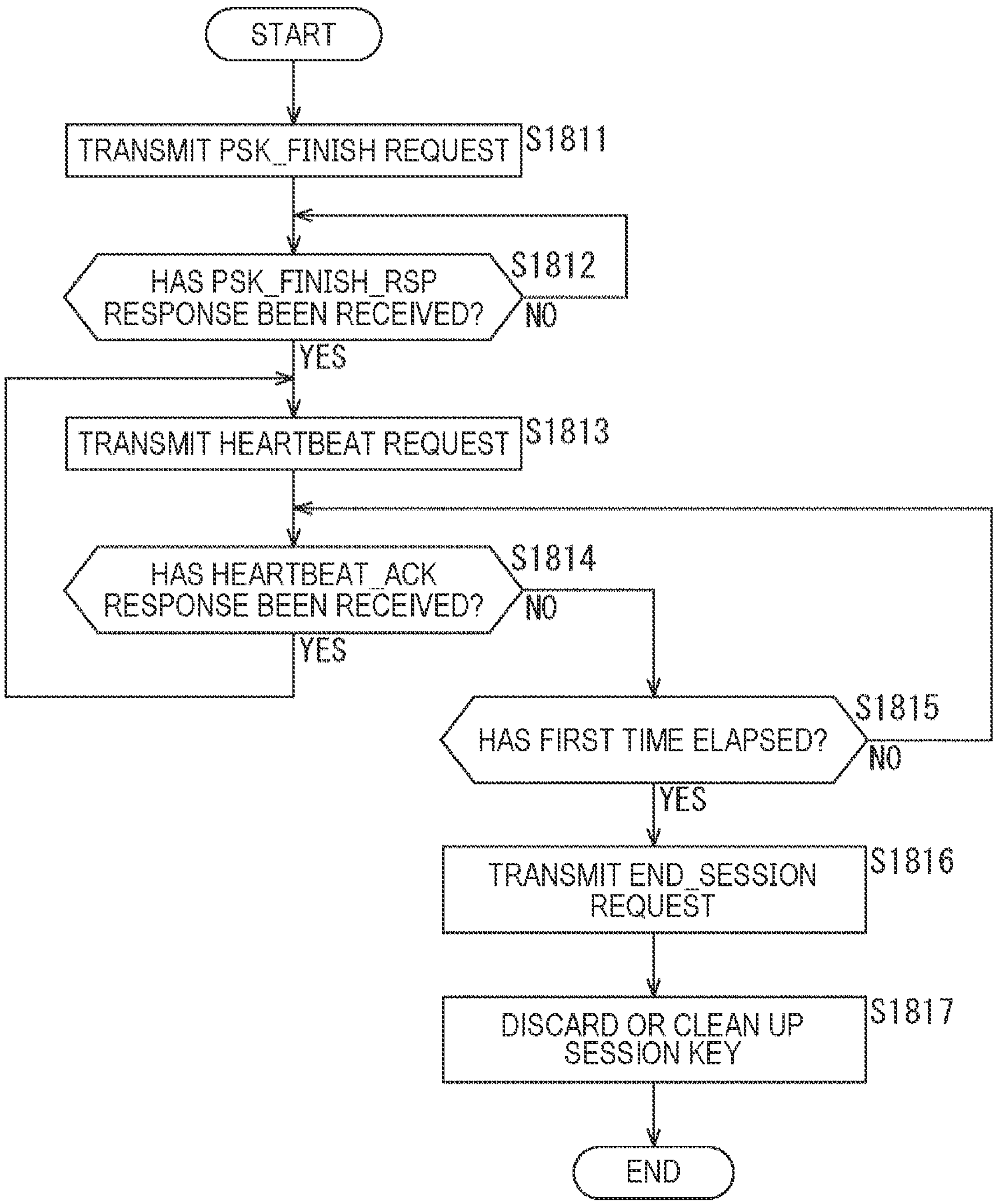

FIG. 174 is a flowchart for describing HEARTBEAT processing (part 3) of a CCI host (requester).

Figure 175:
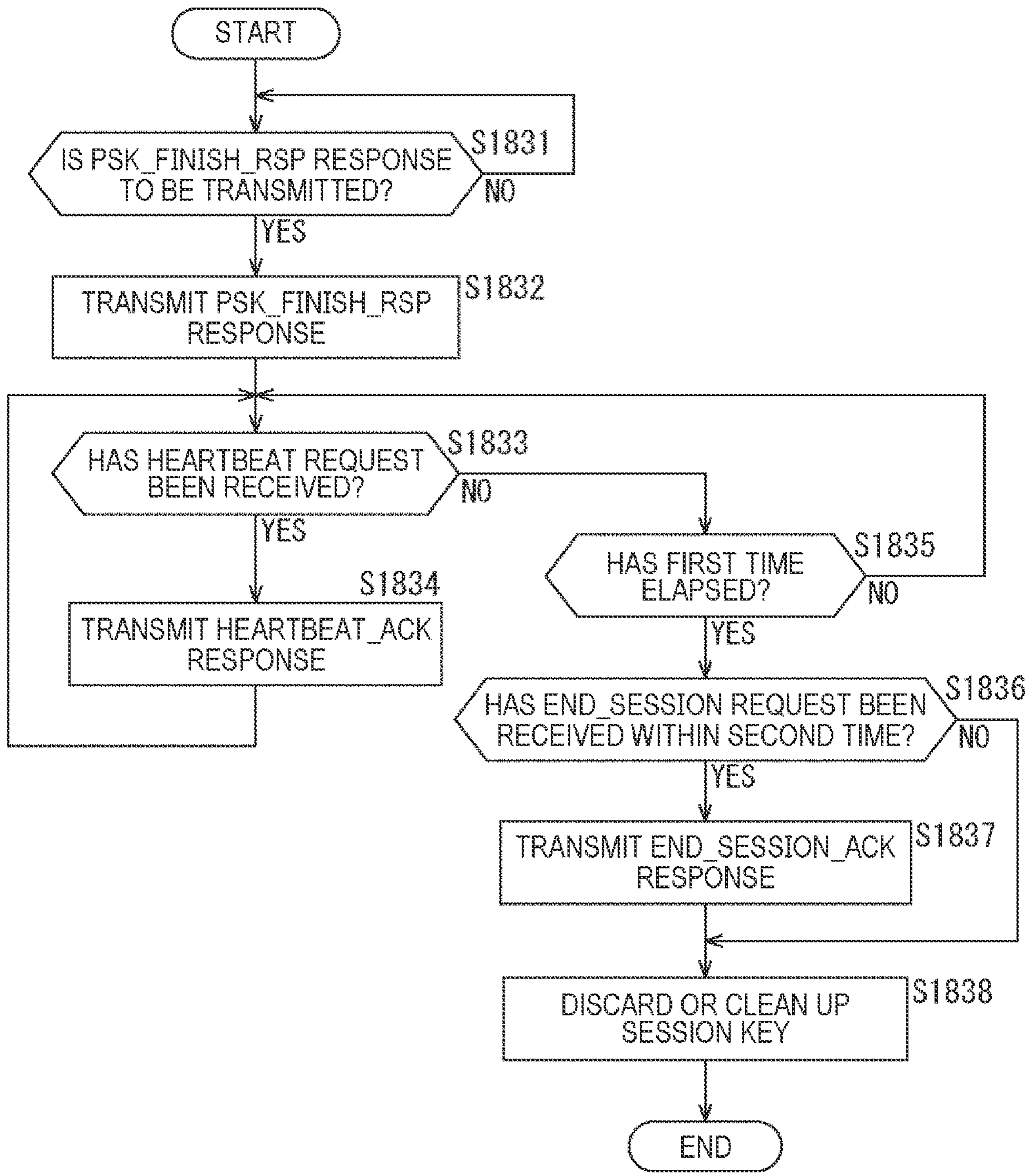

FIG. 175 is a flowchart for describing HEARTBEAT processing (part 3) of a CCI device (responder).

FIG. 176 is a diagram for describing a configuration example of an ERROR response message.

FIG. 177 is a diagram for describing a setting example of Error code and Error data.

FIG. 178 is a diagram for describing a setting example of ExtendedErrorData.

FIG. 179 is a diagram for describing a setting example of Registry or standards body ID in a case where a pseudo HEARTBEAT function is used.

FIG. 180 is a diagram for describing a setting example of a VENDOR_DEFINED_REQUEST request message.

FIG. 181 is a diagram for describing a setting example of a VENDOR_DEFINED_RESPONSE response message.

Figure 182:
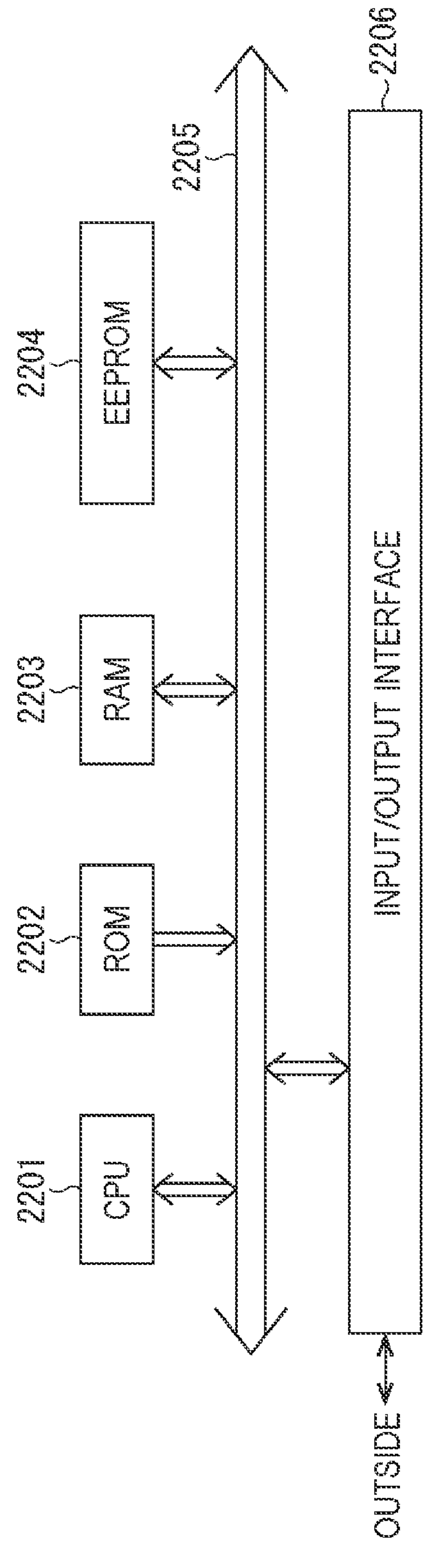

FIG. 182 is a block diagram illustrating a configuration example of an embodiment of a computer to which the present technology is applied.

MODE FOR CARRYING OUT THE INVENTION

Hereinafter, specific embodiments to which the present technology is applied will be described in detail with reference to the drawings.

<Configuration Example of Communication System>

Figure 1:
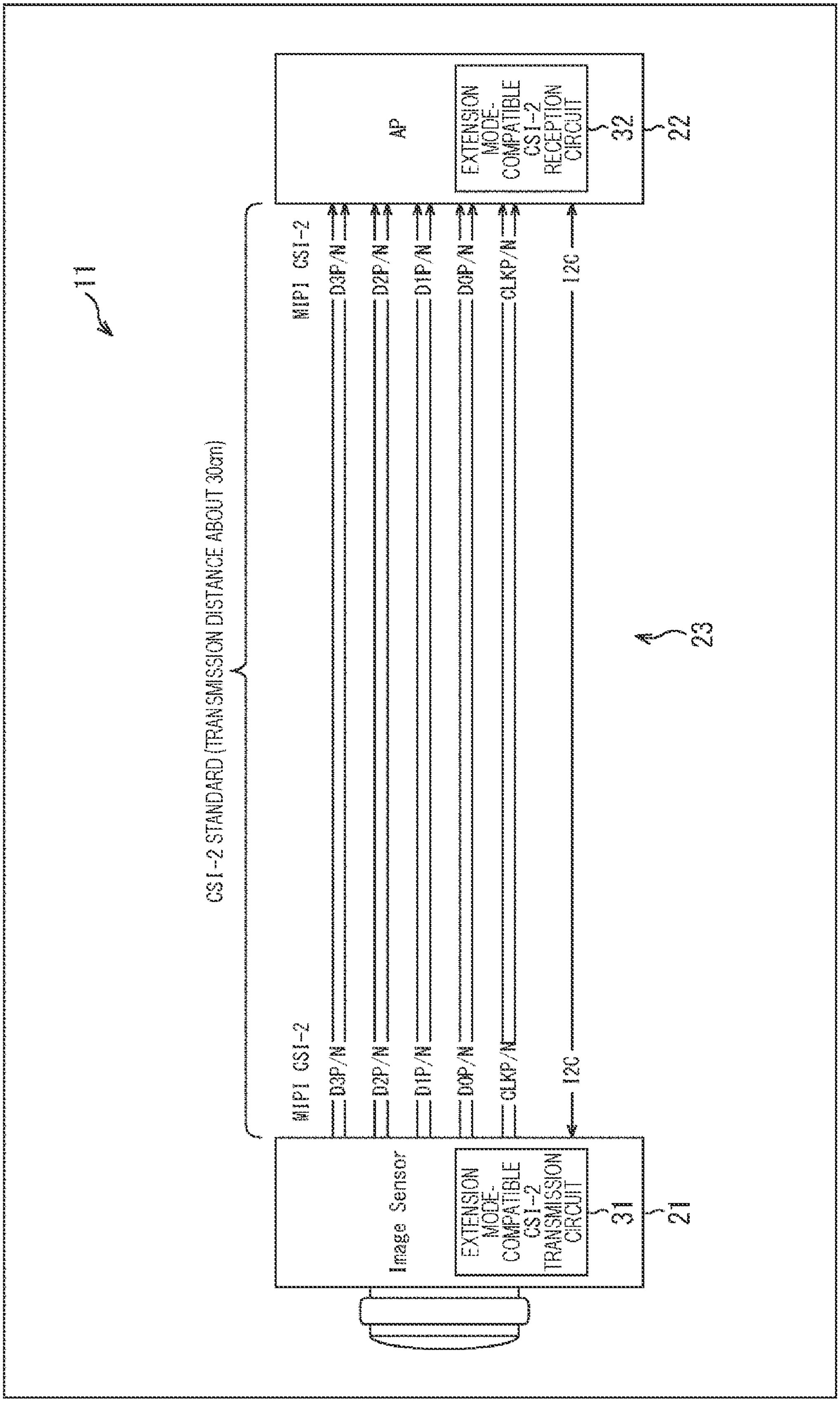
FIG. 1 is a block diagram illustrating a configuration example of a first embodiment of a communication system to which the present technology is applied.

FIG. 1 is a block diagram illustrating a configuration example of a first embodiment of a communication system to which the present technology is applied.

As illustrated in FIG. 1, a communication system 11 is configured by connecting an image sensor 21 and an application processor 22 via a bus 23. For example, the communication system 11 is used for CSI-2 connection inside an existing mobile device such as a so-called smartphone.

The image sensor 21 is configured by incorporating an extension mode-compatible CSI-2 transmission circuit 31 together with, for example, a lens, an imaging element (none of which are illustrated), and the like. For example, the image sensor 21 transmits image data of an image acquired by imaging by the imaging element to the application processor 22 by the extension mode-compatible CSI-2 transmission circuit 31.

The application processor 22 is configured by incorporating an extension mode-compatible CSI-2 reception circuit 32 together with a large scale integration (LSI) that performs processing according to various applications executed by a mobile device including the communication system 11. For example, the application processor 22 can receive the image data transmitted from the image sensor 21 by the extension mode-compatible CSI-2 reception circuit 32, and perform processing according to an application for the image data by the LSI.

The bus 23 is a communication path for transmitting a signal in conformity to the standard of CSI-2, and for example, a transmission distance capable of transmitting a signal is about 30 cm. Furthermore, as illustrated, the bus 23 connects the image sensor 21 and the application processor 22 by a plurality of signal lines (I2C, CLKP/N, D0P/N, D1P/N, D2P/N, and D3P/N).

The extension mode-compatible CSI-2 transmission circuit 31 and the extension mode-compatible CSI-2 reception circuit 32 are compatible with communication in an extension mode obtained by extending the standard of CSI-2, and can transmit and receive signals to and from each other. Note that the detailed configurations of the extension mode-compatible CSI-2 transmission circuit 31 and the extension mode-compatible CSI-2 reception circuit 32 will be described below with reference to FIGS. 9 and 10.

Figure 2:
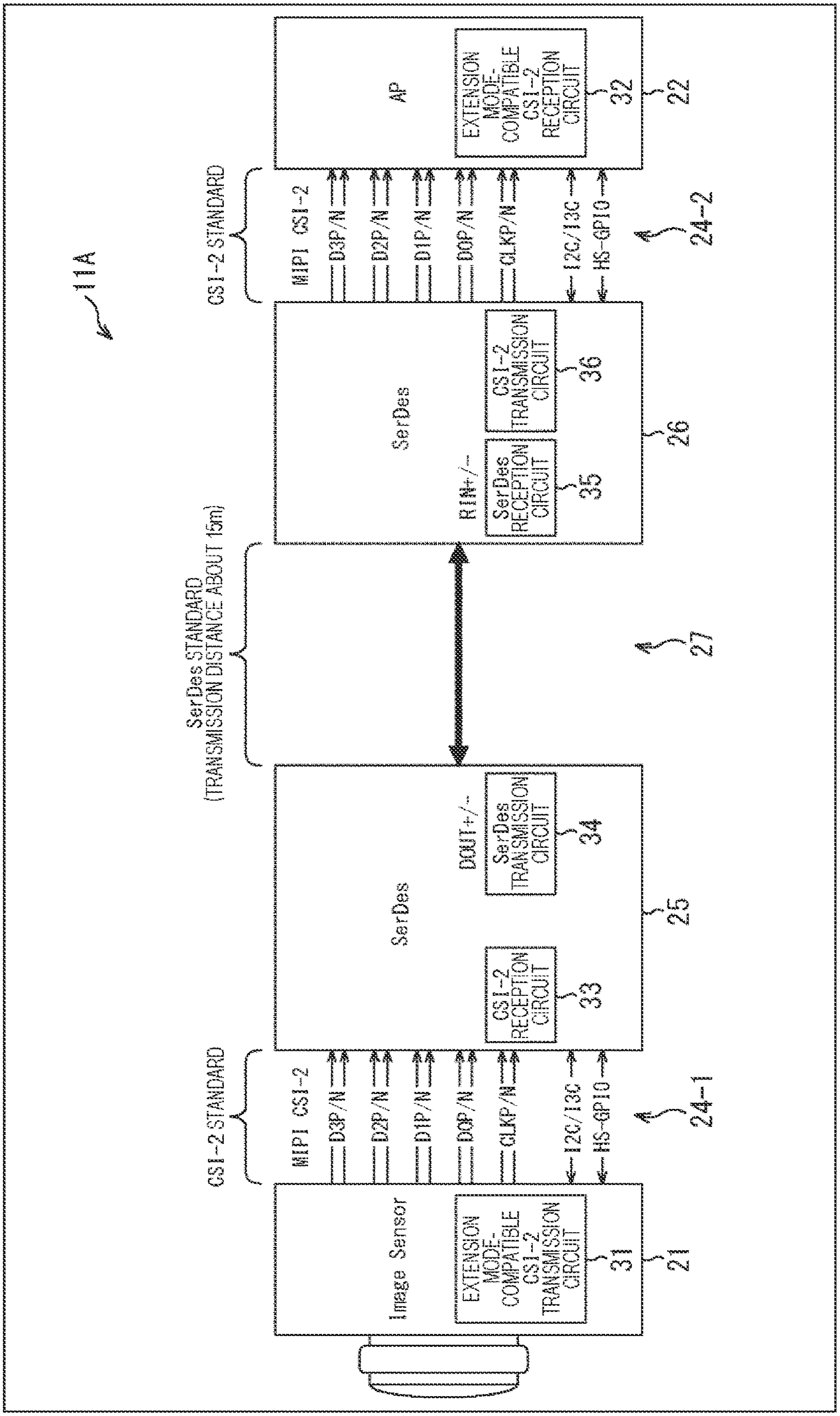
FIG. 2 is a block diagram illustrating a configuration example of a second embodiment of a communication system to which the present technology is applied.

FIG. 2 is a block diagram illustrating a configuration example of a second embodiment of a communication system to which the present technology is applied.

As illustrated in FIG. 2, a communication system 11A is configured by connecting an image sensor 21 and a SerDes device 25 via a bus 24-1, an application processor 22 and a SerDes device 26 via a bus 24-2, and the SerDes device 25 and the SerDes device 26 via a bus 27. For example, the communication system 11A is used for connection in an existing in-vehicle camera.

Here, the image sensor 21 and the application processor 22 are configured similarly to the image sensor 21 and the application processor 22 in FIG. 1, and detailed description thereof is omitted.

The buses 24-1 and 24-2 are communication paths for transmitting signals in conformity to the standard of CSI-2, similarly to the bus 23 in FIG. 1, and include a plurality of signal lines (HS-GPIO, I2C/I3C, CLKP/N, D0P/N, DIP/N, D2P/N, and D3P/N) as illustrated in the drawing.

The SerDes device 25 includes a CSI-2 reception circuit 33 and a serializer deserializer (SerDes) transmission circuit 34. For example, the SerDes device 25 acquires a bit-parallel signal transmitted from the image sensor 21 by the CSI-2 reception circuit 33 communicating with the extension mode-compatible CSI-2 transmission circuit 31 conforming to the standard of normal CSI-2. Then, the SerDes device 25 converts the acquired signal into a bit-series signal, and the SerDes transmission circuit 34 performs communication with a SerDes reception circuit 35 in one lane, thereby transmitting the signal to the SerDes device 26.

The SerDes device 26 includes the SerDes reception circuit 35 and a CSI-2 transmission circuit 36. For example, the SerDes device 26 acquires the bit-series signal transmitted when the SerDes reception circuit 35 communicates with the SerDes transmission circuit 34 in one lane. Then, the SerDes device 26 converts the acquired signal into a bit-parallel signal, and the CSI-2 transmission circuit 36 performs communication conforming to the standard of normal CSI-2 with the extension mode-compatible CSI-2 reception circuit 32, thereby transmitting the signal to the application processor 22.

The bus 27 is a communication path for transmitting a signal in conformity to the standard of A-PHY, a flat panel display (FPD)-LINK III, or the like, and for example, the transmission distance capable of transmitting a signal is a long distance of about 15 m.

These long-range transmittable physical layer interfaces allow the automotive industry to utilize advanced driver assistance systems (ADAS), automated driving systems (ADS), and other surround sensor applications including cameras and in-vehicle infotainment (IVI) displays. MIPI A-PHY has an asymmetric data link layer (asymmetric higher-level layer) in a point-to-point topology, allowing the same physical wiring to be shared in high-speed data transmission, control data, and power, and functions as a basis for an end-to-end system designed to simplify camera, sensor and display integration while also enabling incorporation of functional safety and security.

The communication systems 11 and 11A configured as described above can transmit and receive data using packets having an extended packet structure as described below by the extension mode-compatible CSI-2 transmission circuit 31 and the extension mode-compatible CSI-2 reception circuit 32. Thereby, it is possible to support more various uses, for example, RAW 24, SmartROI (Region of Interest), GLD (Graceful Link Degradation), and the like as described below.

<First Structure Example of Packet Structure>

A first structure example of a packet structure of a packet used for communication between the extension mode-compatible CSI-2 transmission circuit 31 and the extension mode-compatible CSI-2 reception circuit 32 will be described with reference to FIGS. 3 to 8.

Figure 3:
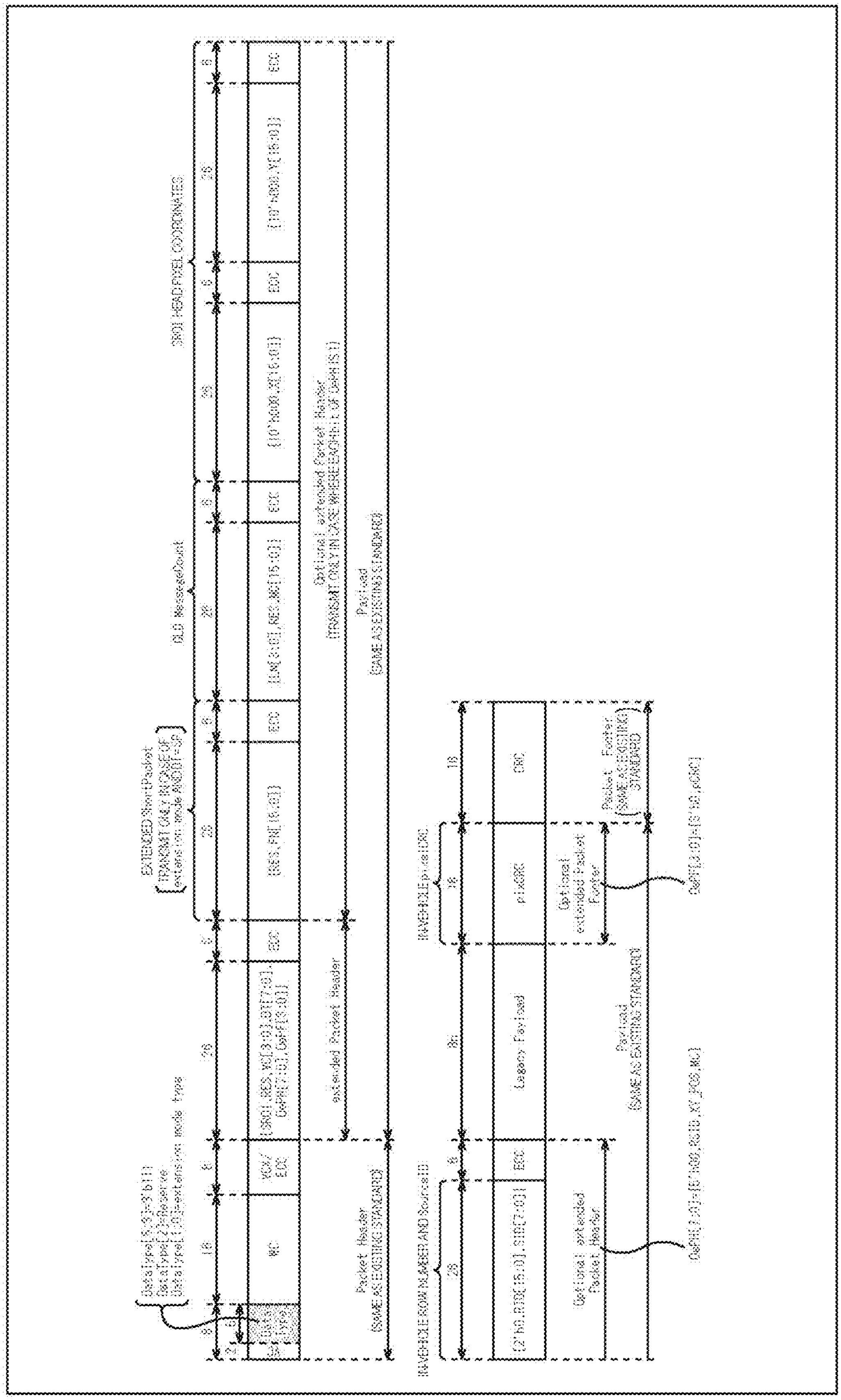
FIG. 3 is a diagram illustrating a first structure example of an overall packet structure of an extended packet for D-PHY.

FIG. 3 illustrates an overall packet structure of a packet (hereinafter referred to as an extended packet for D-PHY) used in the extension mode of CSI-2 in a case where the physical layer is D-PHY.

As illustrated in FIG. 3, the extended packet for D-PHY has a packet structure in which a packet header and a packet footer are the same as those of the existing CSI-2 standard. For example, VirtualChannel (VC) indicating the number of lines of virtual channels, a data type (DataType) indicating a type of data, word count (WC) indicating a data length of a payload, and VCX/ECC are stored in the packet header. Furthermore, a cyclic redundancy check (CRC) is stored in the packet footer.

Here, in the existing CSI-2 standard, as the data type transmitted in the packet header, 0x38 to 0x3F are defined as reserve. Therefore, in the extended packet for D-PHY, setting information for identifying the extension mode on the reception side is newly defined using the data type that is already reserve.

For example, as the data type, in the case of DataType[5:3]=3'b111, the extension mode, DataType[2]=Reserve (RES: reservation for future expansion), and DataType[1:0]=extension mode type (four extension modes are prepared) are defined.

That is, for example, DataType[5:3] is defined as an extension mode setting information and DataType[1:0] is defined as extension type setting information among 0x38 to 0x3F of the data types defined as reserve in the existing CSI-2 standard. The extension mode setting information indicates whether or not the data type is the extension mode, and for example, in a case where DataType[5:3] is 3'b111, the information indicates the extension mode. Furthermore, when four types of extension mode 0, extension mode 1, extension mode 2, and extension mode 3 are prepared as the types of extension modes, the extension type setting information indicates one of the four types of extension modes. For example, in a case where DataType[1:0] is 2'b00, the information indicates that the type of the extension mode is the extension mode 0.

Then, in the extension mode 0 (DataType[1:0]=2'b00), for example, a packet structure in which the payload is separated into four is defined. That is, as illustrated in FIG. 3, the payload in the extension mode 0 is separated into an extended packet header (ePH), an optional extended packet header (OePH), a legacy payload, and an optional extended packet footer (OePF). Note that the extended packet header may be repeatedly transmitted.

The extended packet header is arranged in a head corresponding to the payload of the existing CSI-2 standard, and needs to be always transmitted in the extension mode. For example, as illustrated, the extended packet header includes setting information such as an identification flag of SROI, an extended virtual channel (VC), an extended DataType, a selection flag of OePH, and a selection flag of OePF. Here, VC that has been four bits in the existing CSI-2 standard is extended to eight bits by the extended VC, and DataType that has been four bits in the existing CSI-2 standard is extended to eight bits by the extended DataType.

For example, in the packet for D-PHY, four bits of VC of the existing packet header already exist, and the total number of bits can be set to eight by defining the extended VC of the extended packet header as four bits. Specifically, OePH[7:0]={5'h00, RSID, XY POS, MC} and OePF[3:0]={3'h0, pCRC} can be defined, and ON/OFF of packet transmission required for each use can be controlled.

The optional extended packet header and the optional extended packet footer are selectively transmitted according to the use.

The legacy payload corresponds to the same payload as the existing CSI-2 standard.

In this way, by setting the extended packet header, the optional extended packet header, and the optional extended packet footer as necessary, data corresponding to various uses can be transmitted. Furthermore, the data transmitted in the extended packet header, the optional extended packet header, and the optional extended packet footer is twenty-six bits+six bits of error correction code (ECC). Thereby, it is possible to suppress an increase in circuit scale by diverting the circuit of the existing packet header and to improve error resistance.

Figure 4:
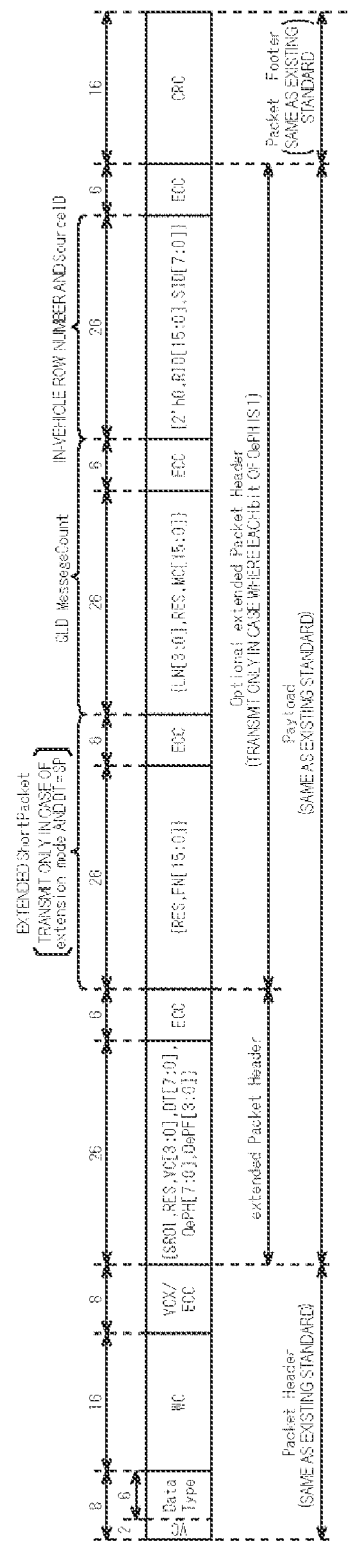
FIG. 4 is a diagram illustrating a first structure example of a packet structure of an extended short packet for D-PHY.
Figure 5:
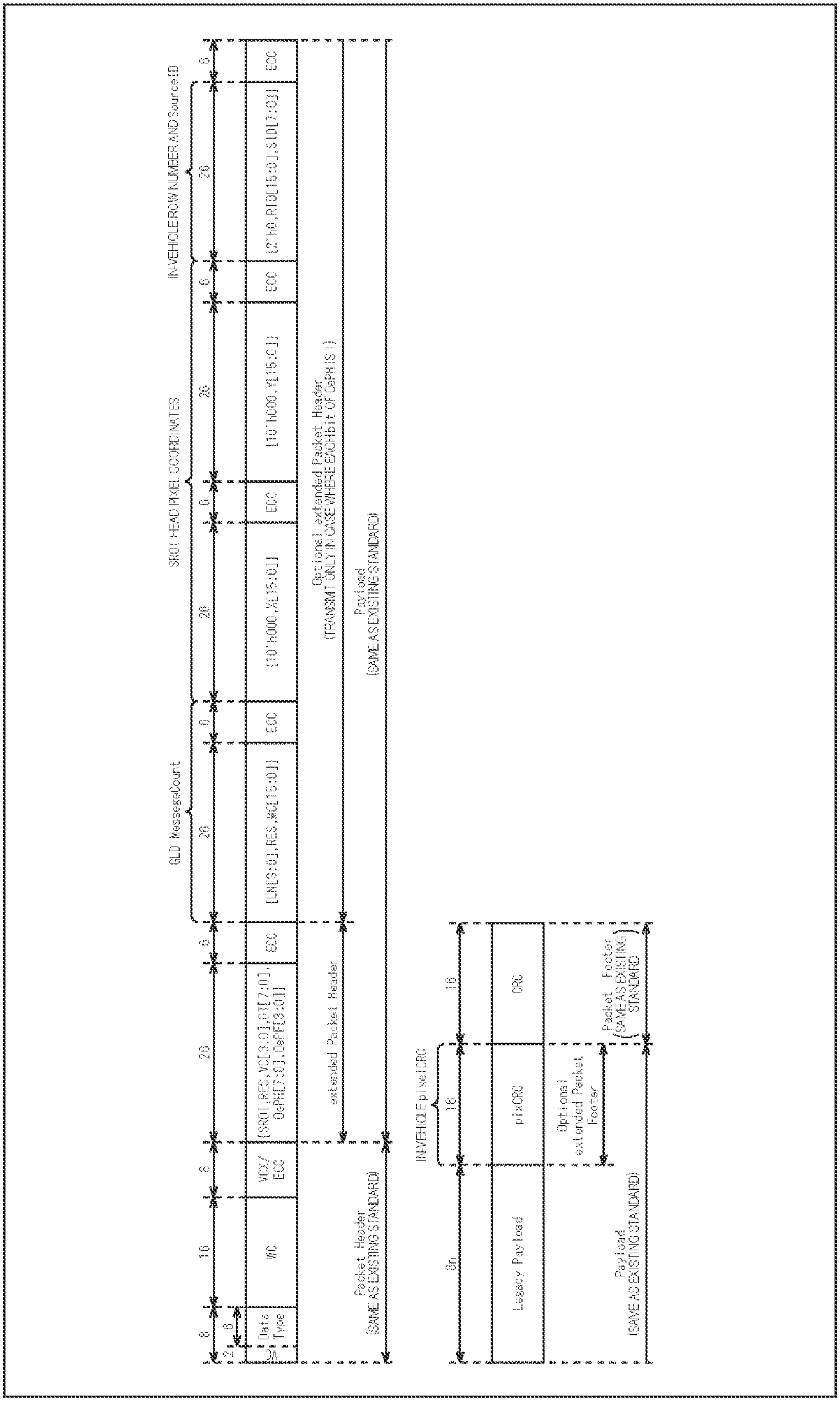
FIG. 5 is a diagram illustrating a first structure example of a packet structure of an extended long packet for D-PHY.

As a specific application example of such an extended packet for D-PHY, FIG. 4 illustrates a packet structure of a short packet (hereinafter referred to as an extended short packet for D-PHY) used in the extension mode of CSI-2 in the case where the physical layer is D-PHY. Similarly, FIG. 5 illustrates a packet structure of a long packet (hereinafter referred to as an extended long packet for D-PHY) used in the extension mode of CSI-2 in the case where the physical layer is D-PHY.

In the extended short packet for D-PHY as illustrated in FIG. 4, the extension type setting information of the data type stored in the packet header indicates that the type of the extension mode is the extension mode 0 (DT[5:0]=0x1C (5'b111_0_0)). Furthermore, short packet setting information of the data type stored in the extended packet header indicates that the packet is a short packet (DT[7:0]=0x00 (Frame Start Code (Short Packet))).

As described above, in the extension mode and in the case where the data type stored in the extended packet header is DT[7:0]=0x00 to 0x0F, the extended short packet is set, and data including Short Packet Data Field of the extended short packet is always transmitted to the optional extended packet header. The Short Packet Data Field is the same as that defined in the existing CSI-2 standard.

Note that, at the time of transmission of the extended short packet, MessageCount for GLD (MC), and an in-vehicle row number and SourceID (RSID) of the optional extended packet header may be transmitted, but legacy payload and pCRC are unnecessary and thus transmission is prohibited. If the legacy payload and pCRC are erroneously transmitted, they are ignored on the reception side.

Then, the extended short packet having the packet structure as illustrated in FIG. 4 can extend the data type and a bit width of the virtual channel as compared with the extended short packet conforming to the existing CSI-2 standard, and can support various uses defined in the optional extended packet header. Furthermore, in a case where these functions are not required, the extended short packet conforming to the existing CSI-2 standard may be transmitted together with the extended long packet.

In the extended long packet for D-PHY as illustrated in FIG. 5, the extension type setting information of the data type stored in the packet header indicates that the type of the extension mode is the extension mode 0 (DT[5:0]=0x1C (5'b111_0_0)). Furthermore, the short packet setting information of the data type stored in the extended packet header indicates that the packet is other than a short packet (DT[7:0] is other than 0x00 to 0x0F (=extended LongPackt)). Therefore, in the extended long packet, the data including Short Packet Data Field is not transmitted.

Furthermore, according to the setting of the extended packet header, the optional extended packet header, the legacy payload, and the optional extended packet footer are stored in the payload in the existing CSI-2 standard and transmitted. In this way, since the data is stored in the existing payload and transmitted, the data is recognized by the existing SerDes transmission circuit 34 and SerDes reception circuit 35 (FIG. 2) in a similar manner to image data transmitted in the existing payload and are transmitted as it is to a subsequent stage.

Then, the application processor 22 in the last stage can determine that the data type is the extension mode according to the data type DT[5:0] of the packet header. Therefore, the application processor 22 can sequentially interpret the content of the payload from the extended packet header and extract data of a desired extension mode.

Figure 6:
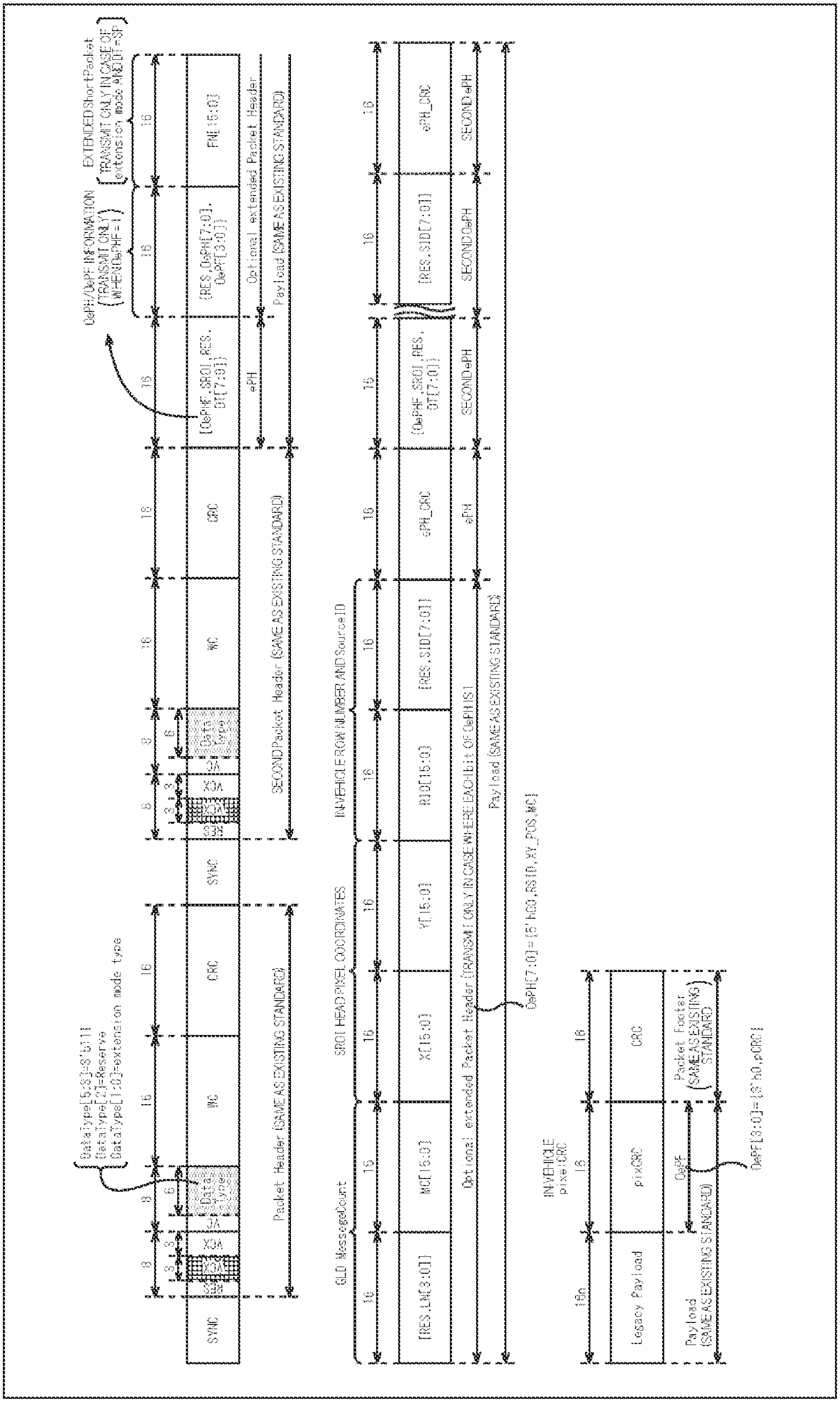
FIG. 6 is a diagram illustrating a first structure example of an overall packet structure of an extended packet for C-PHY.

FIG. 6 illustrates an overall packet structure of a packet (hereinafter referred to as an extended packet for C-PHY) used in the extension mode of CSI-2 in a case where the physical layer is C-PHY. Note that, in the extended packet for C-PHY illustrated in FIG. 6, description of configurations common to the extended packet for D-PHY in FIG. 3 is omitted, and different configurations will be described.

For example, in the extended packet for C-PHY, similarly to the extended packet for D-PHY in FIG. 3, the extension mode is identified by the data type, and all the data corresponding to each application executed by the application processor 22 are embedded in the payload and transmitted.

As illustrated in FIG. 6, the extended packet for C-PHY transmits the packet header twice, similarly to the packet for C-PHY conforming to the existing CSI-2 standard, and arranges the data in units of sixteen bits for convenience of conversion of sixteen bits into seven symbols by the C-PHY. Furthermore, the extended packet header is arranged in the head of the payload. Regarding the virtual channel, in the case of C-PHY, the head of the existing packet header is Reserved for this purpose. Therefore, the virtual channel is not stored in the extended packet header. Of course, the virtual channel may be stored in the extended packet header similarly to the extended packet for D-PHY.

Furthermore, since the optional extended packet header and the optional extended packet footer have a long bit depth, a flag OePHF is prepared, and in a case where the flag is 1, OePH/OePF information is transmitted to the next. Then, after the ePH information and the OePH information, CRC is transmitted as the extended packet header, and a packet header similarly configured is repeatedly transmitted twice. In this manner, by making the structure the same as the mechanism in which the existing packet header is transmitted twice, it is possible to achieve both circuit reusability and error resistance.

Figure 7:
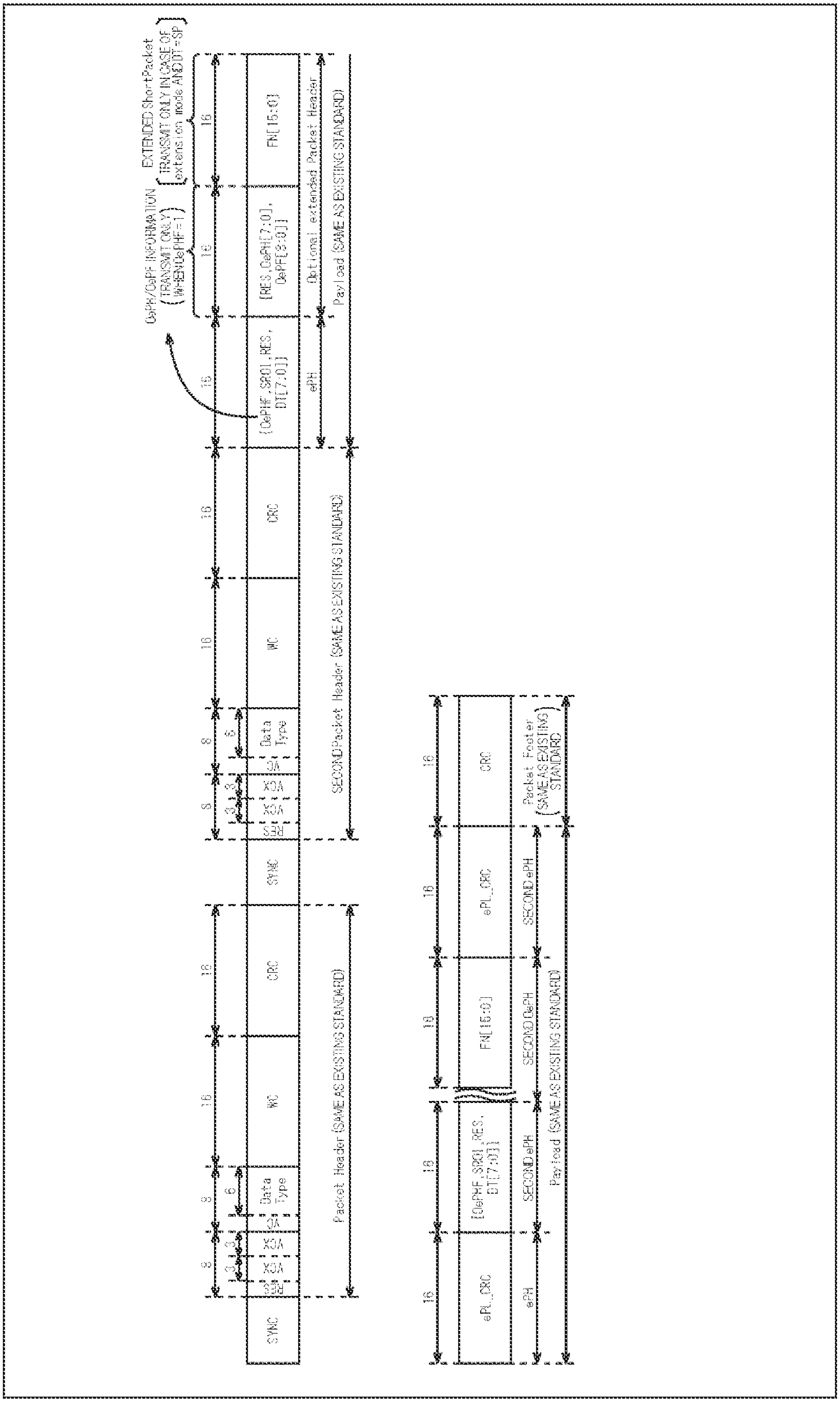
FIG. 7 is a diagram illustrating a first structure example of a packet structure of an extended short packet for C-PHY.

As a specific application example of such an extended packet for C-PHY, FIG. 7 illustrates a packet structure of a short packet (hereinafter referred to as an extended short packet for C-PHY) used in the extension mode of CSI-2 in the case where the physical layer is C-PHY. Similarly, FIG. 8 illustrates a packet structure of a long packet (hereinafter referred to as an extended long packet for C-PHY) used in the extension mode of CSI-2 in the case where the physical layer is C-PHY.

Figure 8:
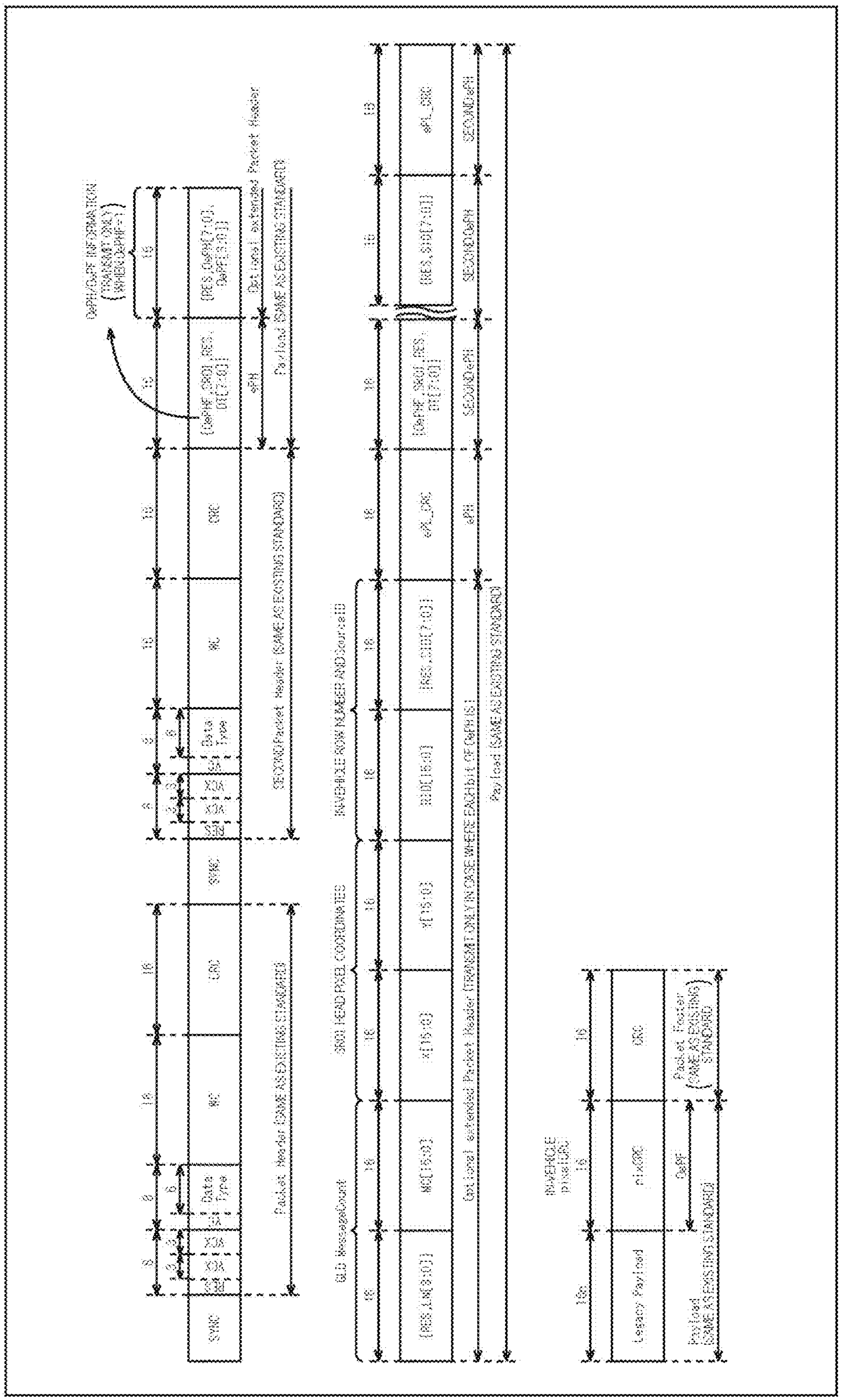
FIG. 8 is a diagram illustrating a first structure example of a packet structure of an extended long packet for C-PHY.

Note that the extended short packet for C-PHY illustrated in FIG. 7 does not have a large difference in packet structure from the extended short packet for D-PHY illustrated in FIG. 4, and the extended long packet for C-PHY illustrated in FIG. 8 does not have a large difference in packet structure from the extended long packet for D-PHY illustrated in FIG. 5.

<Configuration Example of Image Sensor and Application Processor>

(Configuration Example of Image Sensor)

Figure 9:
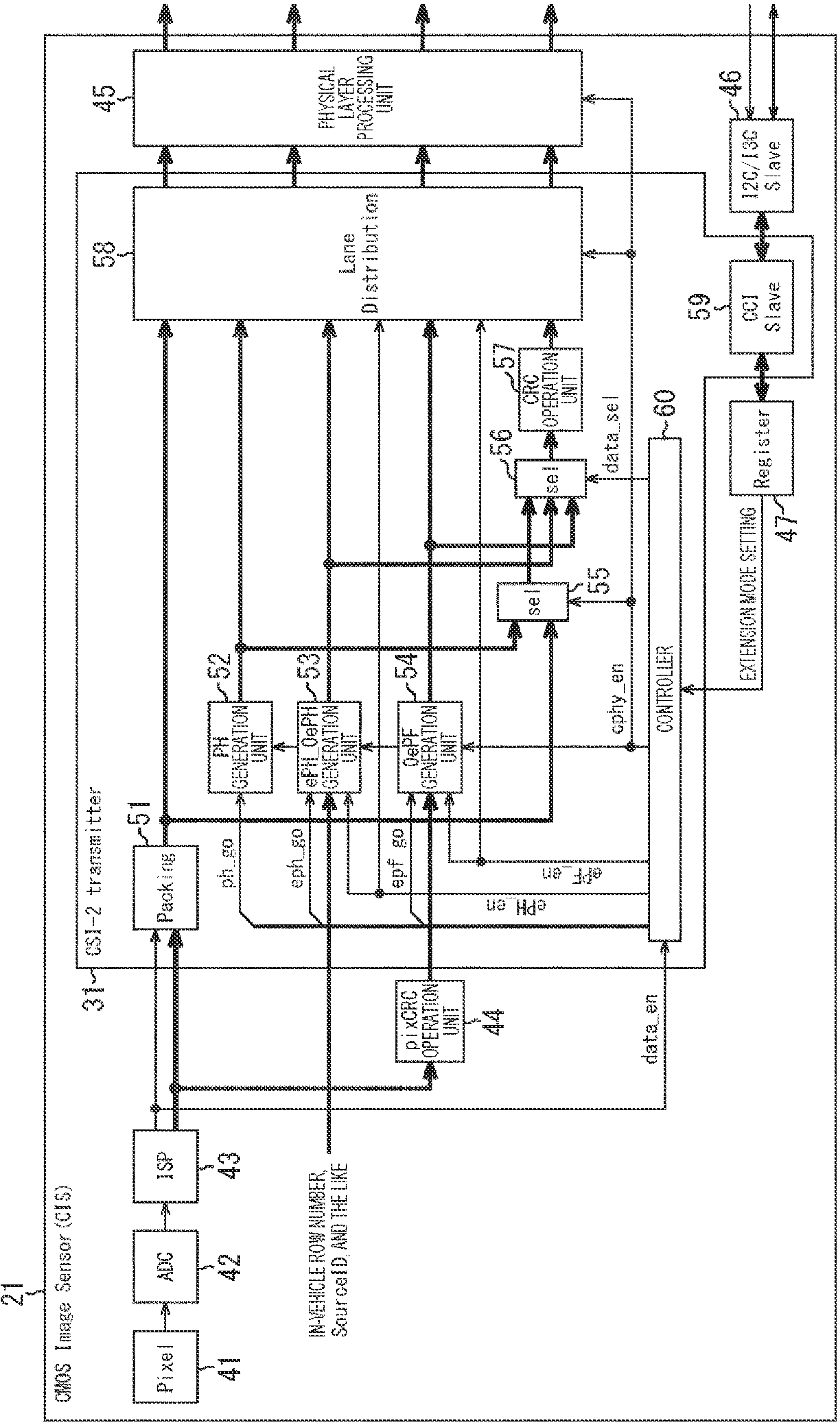
FIG. 9 is a block diagram illustrating a configuration example of an image sensor.

FIG. 9 is a block diagram illustrating a configuration example of the image sensor 21 including the extension mode-compatible CSI-2 transmission circuit 31.

As illustrated in FIG. 9, the image sensor 21 includes a pixel 41, an AD converter 42, an image processing unit 43, a pixel CRC operation unit 44, a physical layer processing unit 45, an I2C/I3C slave 46, and a register 47 in addition to the extension mode-compatible CSI-2 transmission circuit 31. Furthermore, the extension mode-compatible CSI-2 transmission circuit 31 includes a packing unit 51, a packet header generation unit 52, an extended packet header generation unit 53, an extended packet footer generation unit 54, selection units 55 and 56, a CRC operation unit 57, a lane distribution unit 58, a CCI slave 59, and a controller 60.

The pixel 41 outputs an analog pixel signal corresponding to an amount of received light, and an analog-to-digital converter (ADC) 42 digitally converts the pixel signal output from the pixel 41 and supplies the pixel signal to the image processing unit 43. The image processing unit (image signal processor: ISP) 43 supplies image data obtained by applying various types of image processing to an image based on the pixel signal to the pixel CRC operation unit 44 and the packing unit 51. Furthermore, the image processing unit 43 supplies a data enable signal data_en indicating whether or not the image data is valid to the packing unit 51 and the controller 60.

The pixel CRC operation unit 44 calculates and obtains CRC for each pixel in the image data supplied from the image processing unit 43, and supplies the CRC to the extended packet footer generation unit 54.

The physical layer processing unit 45 can execute physical layer processing of both C-PHY and D-PHY. For example, the physical layer processing unit 45 executes the physical layer processing of C-PHY in a case where a C-layer enable signal cphy_en supplied from the controller 60 is valid, and executes the physical layer processing of D-PHY in a case where the C-layer enable signal cphy_en is invalid. Then, the physical layer processing unit 45 transmits the packet divided into four lanes by the lane distribution unit 58 to the application processor 22.

The I2C/I3C slave 46 performs communication under the initiative of an I2C/I3C master 72 (FIG. 10) of the application processor 22 on the basis of inter-integrated circuit (I2C) or improved inter integrated circuit (I3C) standard.

Various settings transmitted from the application processor 22 are written to the register 47 via the I2C/I3C slave 46 and the CCI slave 59. Here, examples of the settings written to the register 47 include a communication setting conforming to the CSI-2 standard, an extension mode setting indicating the presence or absence of use of the extension, and a fixed communication setting necessary for communication in the extension mode.

The packing unit 51 performs packing processing of storing the image data supplied from the image processing unit 43 in the payload of the packet, and supplies the payload to the selection unit 55 and the lane distribution unit 58.

When generation of the packet header is instructed according to a packet header generation instruction signal ph_go supplied from the controller 60, the packet header generation unit 52 generates the packet header and supplies the packet header to the selection unit 55 and the lane distribution unit 58.

That is, the packet header generation unit 52 generates the packet header that stores setting information indicating a condition set for the data transmitted in the packet, for example, the data type indicating the type of the data according to the existing CSI-2 standard. Furthermore, the packet header generation unit 52 stores the extension mode setting information indicating whether or not the mode is the extension mode for using an extended header in an unused area defined as unused in the existing CSI-2 standard in the data type that is the setting information indicating the type of data transmitted in the packet. Moreover, the packet header generation unit 52 stores the extension type setting information indicating one of the plurality of types of extension modes prepared as the extension modes is in the unused area.

The extended packet header generation unit 53 generates each of the extended packet header and the optional extended packet header according to the extended packet header generation instruction signal eph_go and an extended packet header enable signal ePH_en supplied from the controller 60, and supplies the extended packet header and the optional extended packet header to the selection unit 56 and the lane distribution unit 58. Furthermore, the in-vehicle row number, the source ID (identification), and the like are supplied to the extended packet header generation unit 53 according to the use of the image sensor 21, and are stored in the extended packet header or the optional extended packet header as necessary.

In other words, the extended packet header generation unit 53 generates the extended packet header that stores the setting information as illustrated in FIG. 3, for example, separately from the packet header generated by the packet header generation unit 52. Moreover, in the case of transmitting the optional extended packet header, the extended packet header generation unit 53 stores optional extended packet header setting information indicating transmission of the optional extended packet header in the extended packet header as the optional extended packet header setting information (OePH[7:0]) indicating whether or not to transmit the optional extended packet header, and generates the optional extended packet header following the extended packet header.

The extended packet footer generation unit 54 generates the optional extended packet footer according to an extended packet footer generation instruction signal epf_go and an extended packet header enable signal ePF_en supplied from the controller 60, and supplies the optional extended packet footer to the selection unit 56 and the lane distribution unit 58.

That is, in a case where the packet transmitted in the extension mode is the extended long packet that stores data to be transmitted as the payload in the existing CSI-2 standard, the extended packet footer generation unit 54 generates the optional extended packet footer arranged following the legacy payload in which data is stored.

Furthermore, the C-layer enable signal cphy_en is supplied from the controller 60 to the packet header generation unit 52, the extended packet header generation unit 53, and the extended packet footer generation unit 54. Then, in the case where the C-layer enable signal cphy_en indicates valid, the packet header generation unit 52 generates the packet header for C-PHY, the extended packet header generation unit 53 generates the extended packet header and the optional extended packet header for C-PHY, and the extended packet footer generation unit 54 generates the optional extended packet footer for C-PHY. On the other hand, in the case where the C-layer enable signal cphy_en indicates invalid, the packet header generation unit 52 generates the packet header for D-PHY, the extended packet header generation unit 53 generates the extended packet header and the optional extended packet header for D-PHY, and the extended packet footer generation unit 54 generates the optional extended packet footer for D-PHY.

In the case where the C-layer enable signal cphy_en is valid according to the C-layer enable signal cphy_en supplied from the controller 60, the selection unit 55 selects the packet header supplied from the packet header generation unit 52 and supplies the packet header to the selection unit 56. On the other hand, in the case where the C-layer enable signal cphy_en is invalid, the selection unit 55 selects the payload supplied from the packing unit 51 and supplies the payload to the selection unit 56.

The selection unit 56 selects, according to a data selection signal data_sel supplied from the controller 60, any one of the packet header or the payload selectively supplied via the selection unit 55, the extended packet header and the optional extended packet header supplied from the extended packet header generation unit 53, or the optional extended packet footer supplied from the extended packet footer generation unit 54, and supplies the selected one to the CRC operation unit 57.

The CRC operation unit 57 calculates and obtains CRC of the packet header, the payload, the extended packet header, the optional extended packet header, or the optional extended packet footer selectively supplied via the selection unit 56, and supplies the CRC to the lane distribution unit 58.

The lane distribution unit 58 distributes, under the control of the controller 60, the payload supplied from the packing unit 51, the packet header supplied from the packet header generation unit 52, the extended packet header and the optional extended packet header supplied from the extended packet header generation unit 53, the optional extended packet footer supplied from the extended packet footer generation unit 54, and the CRC supplied from the CRC operation unit 57 to four lanes conforming to the CSI-2 standard, and supplies them to the physical layer processing unit 45.

The camera control interface (CCI) slave 59 performs communication under the initiative of a CCI master 88 (FIG. 10) of the application processor 22 on the basis of the CSI-2 standard.

The controller 60 reads the various settings stored in the register 47, and controls each block constituting the extension mode-compatible CSI-2 transmission circuit 31 according to the settings. For example, the controller 60 controls switching between transmission of the packet having the packet structure conforming to the existing CSI-2 standard and transmission of the packet having the packet structure in the extension mode according to content of data to be transmitted.

The image sensor 21 is configured in this manner, and can generate the extended packet having the packet structure as described with reference to FIGS. 3 to 8 and transmit the extended packet to the application processor 22.

(Configuration Example of Application Processor)

Figure 10:
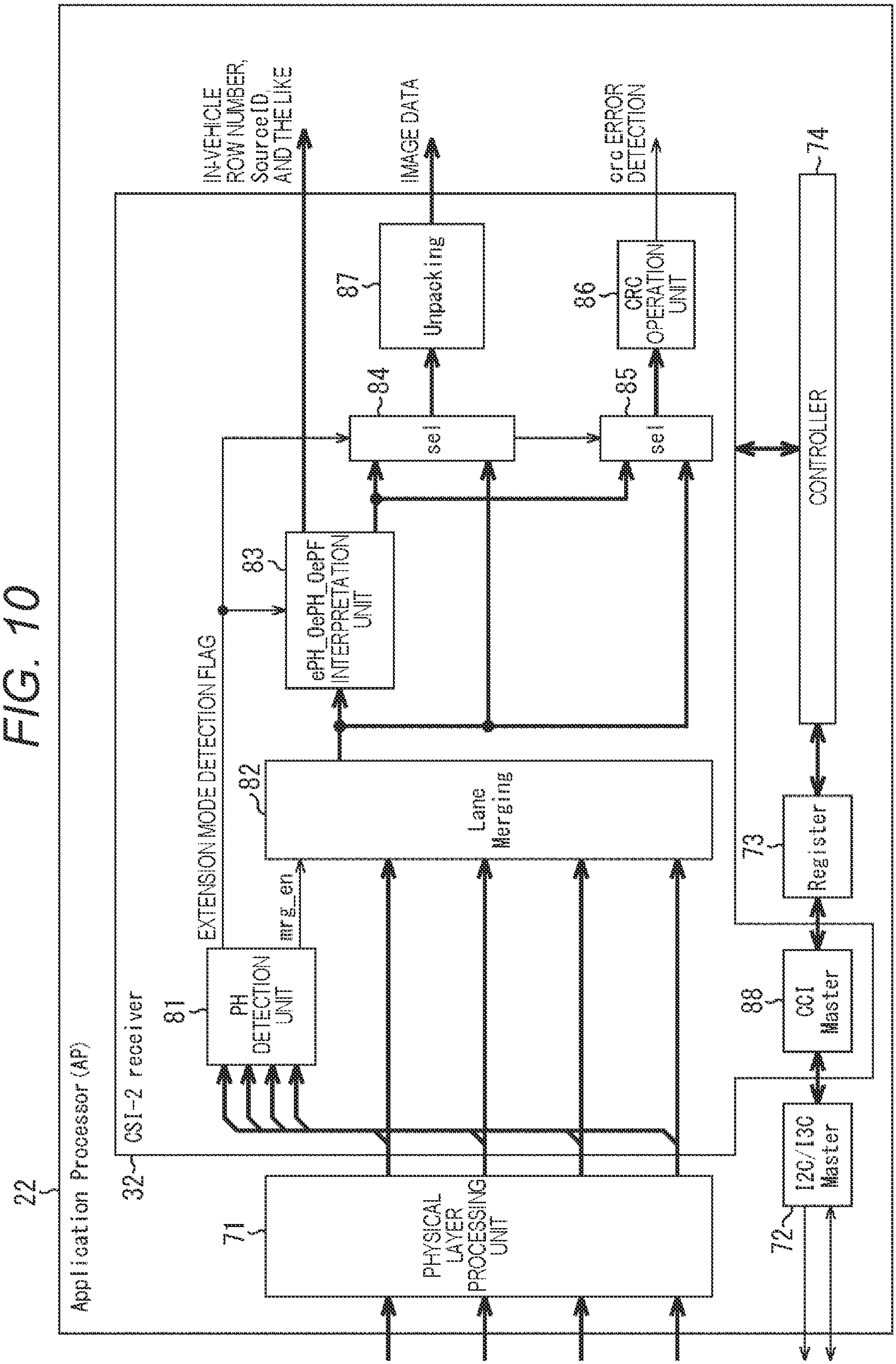
FIG. 10 is a block diagram illustrating a configuration example of an application processor.

FIG. 10 is a block diagram illustrating a configuration example of the application processor 22 including the extension mode-compatible CSI-2 reception circuit 32.

As illustrated in FIG. 10, the application processor 22 includes a physical layer processing unit 71, an I2C/I3C master 72, a register 73, and a controller 74 in addition to the extension mode-compatible CSI-2 reception circuit 32. Furthermore, the extension mode-compatible CSI-2 reception circuit 32 includes a packet header detection unit 81, a lane merging unit 82, an interpretation unit 83, selection units 84 and 85, a CRC operation unit 86, an unpacking unit 87, and a CCI master 88.

The physical layer processing unit 71 can execute physical layer processing of both C-PHY and D-PHY. As described above, the physical layer processing unit 45 of the image sensor 21 performs the physical layer processing of either C-PHY or D-PHY, and the physical layer processing unit 71 executes the same physical layer processing as that executed in the physical layer processing unit 45.

The I2C/I3C master 72 leads communication with the I2C/I3C slave 46 (FIG. 9) of the image sensor 21 on the basis of the I2C or I3C standard.

Various settings to be written into the register 47 of the image sensor 21 are recorded in the register 73 by the controller 74.

The controller 74 controls each block constituting the application processor 22.

The packet header detection unit 81 detects the packet header from the packet supplied from the physical layer processing unit 71 and checks the data type stored in the packet header. Then, in a case where the extension mode setting information indicates the extension mode in the data type of the packet header (DataType[5:3]=3'b111), the packet header detection unit 81 supplies an extension mode detection flag indicating the extension mode to the interpretation unit 83, the selection unit 84, and the selection unit 85. Furthermore, the packet header detection unit 81 supplies a merging enable signal mrg_en indicating whether or not merging of the divided four lanes is enabled to the lane merging unit 82 on the basis of the packet header.

That is, the packet header detection unit 81 detects the packet header in which the setting information (the data type or the like) indicating the condition set for the data to be transmitted in the packet is stored according to the existing CSI-2 standard. At this point, the packet header detection unit 81 outputs the extension mode detection flag according to the extension mode setting information indicating whether or not the mode is the extension mode for using the extended header stored in the unused area defined as unused in the existing CSI-2 standard in the data type that is the setting information indicating the type of data transmitted in the packet, thereby switching reception of the packet having the packet structure conforming to the existing CSI-2 standard and reception of the packet having the packet structure in the extension mode. Furthermore, the packet header detection unit 81 recognizes one of the plurality of types of extension modes prepared as the extension modes according to extension mode type information stored in the unused area of the data type defined as unused in the existing CSI-2 standard.

In a case where the merging enable signal mrg_en supplied from the packet header detection unit 81 is valid, the lane merging unit 82 merges the packets divided into four lanes and supplied from the physical layer processing unit 71. Then, the lane merging unit 82 supplies the packet of one lane to the interpretation unit 83, the selection unit 84, and the selection unit 85.

In a case where the extension mode detection flag supplied from the packet header detection unit 81 indicates the extension mode, the interpretation unit 83 reads the extended packet header, the optional extended packet header, and the optional extended packet footer from the packet supplied from the lane merging unit 82 on the basis of the packet structure of the extension mode. Then, the interpretation unit 83 interprets the setting information stored in the extended packet header, the optional extended packet header, and the optional extended packet footer.

That is, the interpretation unit 83 receives, as the extended header, the extended packet header disposed in the head of the payload conforming to the existing CSI-2 standard, and interprets the setting information stored in the extended packet header. Furthermore, in a case where the optional extended packet header setting information stored in the extended packet header indicates transmission of the optional extended packet header that is selectively transmitted according to the use, the interpretation unit 83 receives the optional extended packet header following the extended packet header, and interprets the setting information stored in the optional extended packet header. Moreover, in the case where the packet transmitted in the extension mode is the extended long packet that stores data to be transmitted as the payload in the existing CSI-2 standard, the interpretation unit 83 generates the optional extended packet footer arranged following the legacy payload in which data is stored and interprets the optional extended packet footer.

Then, for example, the interpretation unit 83 reads the in-vehicle row number, the source ID, and the like stored in the optional extended packet header, and outputs the read information to a subsequent LSI (not illustrated).

Note that, in a case where the extension mode detection flag supplied from the packet header detection unit 81 does not indicate the extension mode, that is, in a case where a packet having an existing packet structure is supplied, the interpretation unit 83 stops without performing the above-described processing.

The selection unit 84 selectively supplies data to the unpacking unit 87 on the basis of the packet structure of the existing packet or the packet structure of the extended packet according to the extension mode detection flag supplied from the packet header detection unit 81.

The selection unit 85 selectively supplies data to the CRC operation unit 86 on the basis of the packet structure of the existing packet or the packet structure of the extended packet according to the extension mode detection flag supplied from the packet header detection unit 81.

The CRC operation unit 86 calculates CRC of the packet header, the payload, the extended packet header, the optional extended packet header, or the optional extended packet footer selectively supplied via the selection unit 85. Then, in a case where a CRC error is detected, the CRC operation unit 86 outputs a crcCRC error detection signal indicating detection of the CRC error to a subsequent LSI (not illustrated).

The unpacking unit 87 performs unpacking processing of extracting the image data stored in the payload selectively supplied via the selection unit 84, and outputs the acquired image data to a subsequent LSI (not illustrated).

The CCI master 88 leads communication with the CCI slave 59 (FIG. 9) of the image sensor 21 on the basis of the CSI-2 standard.

The application processor 22 is configured in this manner, and can receive the extended packet transmitted from the image sensor 21, interpret the setting information stored in the extended packet header, the optional extended packet header, and the optional extended packet footer, and acquire the image data.

<Communication Processing>

Communication processing performed by the image sensor 21 and the application processor 22 will be described with reference to FIGS. 11 to 14.

Figure 11:
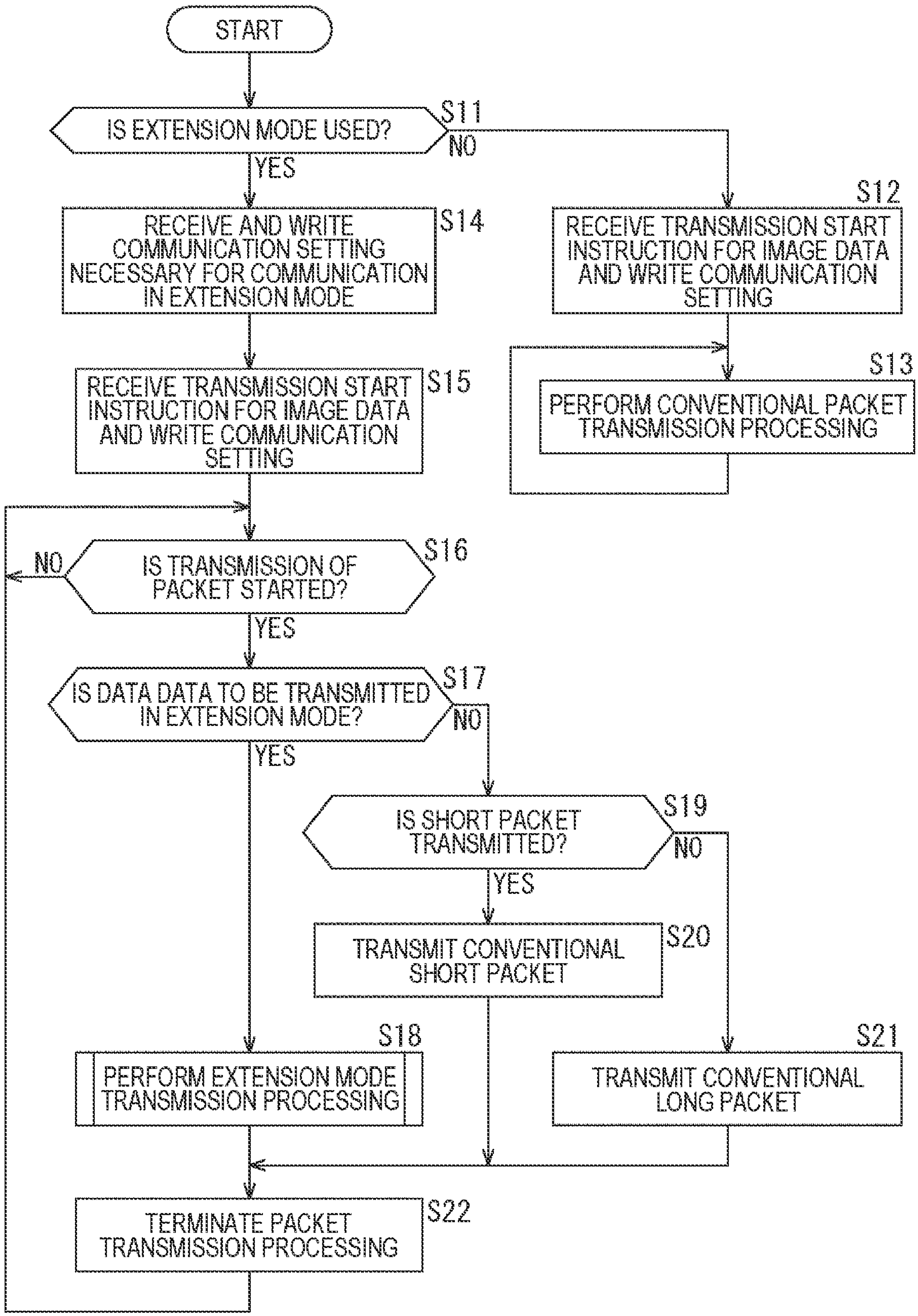
FIG. 11 is a flowchart for describing processing in which an image sensor transmits a packet.

FIG. 11 is a flowchart for describing processing in which the image sensor 21 transmits a packet.

For example, when the image sensor 21 is connected to the application processor 22 via the bus 23, the processing is started. In step S11, the controller 60 determines whether or not to use the extension mode in starting communication with the application processor 22. For example, the controller 60 checks the extension mode setting stored in the register 47 and determines to use the extension mode in the case where the extension mode setting indicating use of the extension mode is written by the application processor 22.

In the case where the controller 60 determines not to use the extension mode in step S11, the processing proceeds to step S12.

In step S12, the I2C/I3C slave 46 receives a transmission start instruction for the image data transmitted from the application processor 22 (in step S54 in FIG. 13 to be described below). Moreover, the I2C/I3C slave 46 receives the communication setting conforming to the CSI-2 standard transmitted together with the transmission start instruction, and writes the communication setting in the register 47 via the CCI slave 59.

In step S13, the image sensor 21 performs conventional packet transmission processing of transmitting the packet having the packet structure conforming to the existing CSI-2 standard to the application processor 22 on the basis of the communication setting stored in the register 47.

On the other hand, in the case where the controller 60 determines to use the extension mode in step S11, the processing proceeds to step S14.

In step S14, the I2C/I3C slave 46 receives the fixed communication setting (for example, copy of PH/PF for every lane at the time of GLD, or the like) required for communication in the extension mode, and writes the fixed communication setting in the register 47 via the CCI slave 59.

In step S15, the I2C/I3C slave 46 receives the transmission start instruction for the image data transmitted from the application processor 22 (in step S57 in FIG. 13 to be described below). Moreover, the I2C/I3C slave 46 receives the communication setting conforming to the CSI-2 standard transmitted together with the transmission start instruction, and writes the communication setting in the register 47 via the CCI slave 59.

In step S16, the controller 60 determines whether or not to start packet transmission, and waits until it is determined to start packet transmission.

Then, in step S16, in the case where it is determined to start packet transmission, the processing proceeds to step S17, and the controller 60 determines whether or not the data is to be transmitted in the extension mode. Here, in a case where the data is to be transmitted in a use case of an application example as described below, for example, the controller 60 determines that the data is to be transmitted in the extension mode, according to the content of the data to be transmitted.

In step S17, in the case where the controller 60 determines that the data is to be transmitted in the extension mode, the processing proceeds to step S18, and extension mode transmission processing of transmitting the extended packet corresponding to the extension mode (see FIG. 12) is performed.

On the other hand, in step S17, in the case where the controller 60 determines that the data is not to be transmitted in the extension mode, the processing proceeds to step S19.

In step S19, the controller 60 determines whether or not to transmit a short packet. For example, the controller 60 determines to transmit the short packet at the start of a frame and at the end of the frame.

In step S19, in the case where the controller 60 determines to transmit the short packet, the processing proceeds to step S20. In step S20, the packet header generation unit 52 generates the packet header and transmits the short packet having a conventional packet structure to the application processor 22.

On the other hand, in step S19, in the case where the controller 60 determines not to transmit the short packet (that is, to transmit the long packet), the processing proceeds to step S21. In step S21, the packing unit 51 stores the image data in the payload, and the CRC operation unit 57 obtains the CRC, and generates the long packet having a conventional packet structure and transmits the long packet to the application processor 22.

After the processing of step S18, step S20, or step S21, the processing proceeds to step S22, and the controller 60 terminates the packet transmission processing. Thereafter, the processing returns to step S16, and processing of transmitting a packet for the next packet is similarly repeatedly performed.

Figure 12:
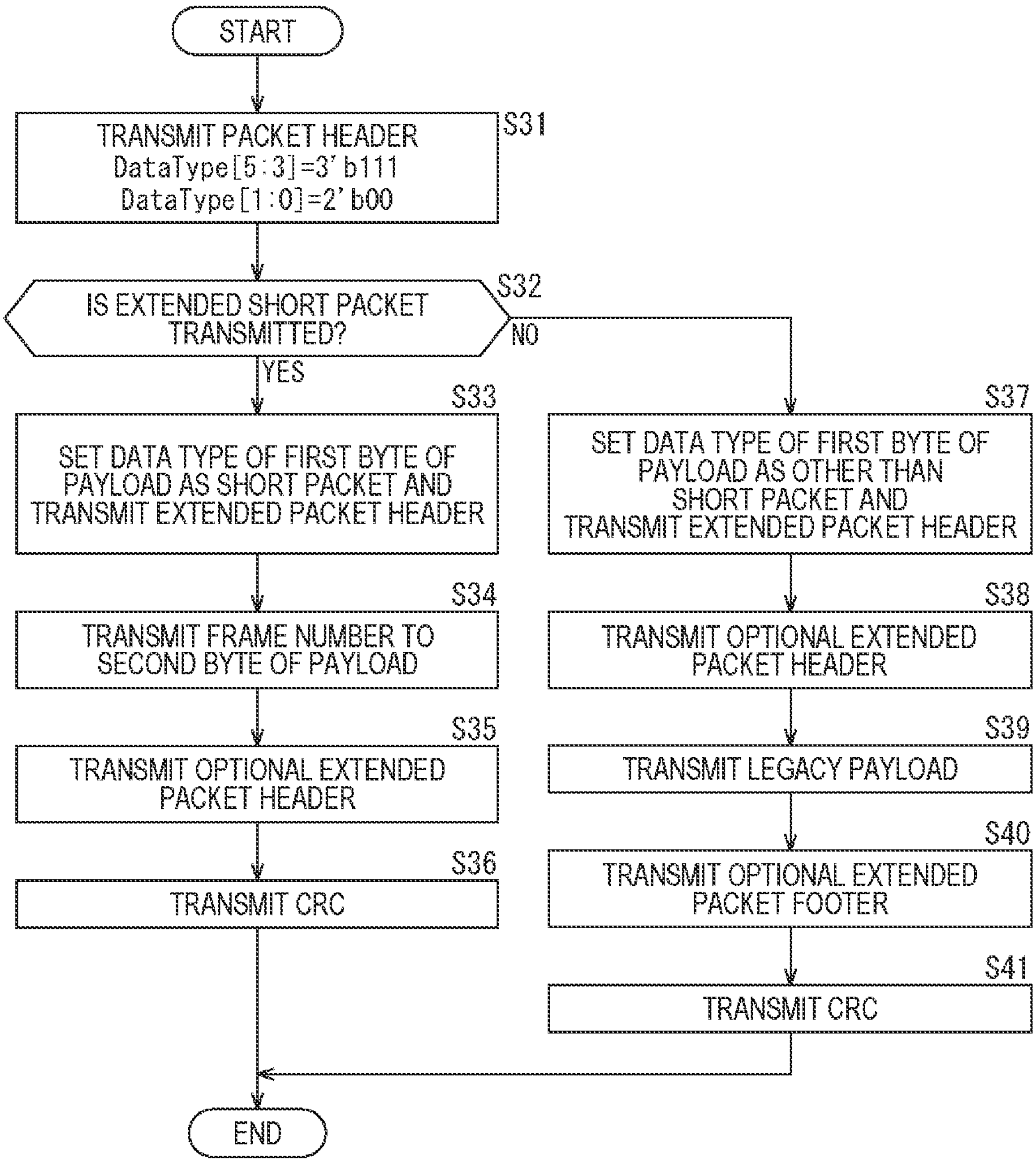
FIG. 12 is a flowchart for describing extension mode transmission processing.

FIG. 12 is a flowchart illustrating the extension mode transmission processing performed in the processing in step S18 in FIG. 11.

In step S31, the packet header generation unit 52 generates the packet header storing the VC, data type, WC, and the like, and transmits the packet header to the application processor 22. At this time, the packet header generation unit 52 writes the extension mode setting information (DataType[5:3]=3'b111) indicating that the mode is the extension mode and the extension type setting information (DataType[1:0]=2'b00) identifying that the mode setting of the extension mode is the extension mode 0 to the data type of the packet header.

In step S32, the application processor 22 determines whether or not to transmit the extended short packet. For example, the controller 60 determines to transmit the extended short packet at the start of the frame and at the end of the frame.

In step S32, in the case where the application processor 22 determines to transmit the extended short packet, the processing proceeds to step S33.

In step S33, the extended packet header generation unit 53 transmits the extended packet header in which the data type (DataType[7:0]) is set as the short packet in the first byte of the payload. At this time, the extended packet header generation unit 53 performs various settings (for example, OePH[7:0], OePF[3:0], and the like) to be stored in the extended packet header.

In step S34, the extended packet header generation unit 53 stores a frame number (FrameNumber: FN) in the second byte of the payload and transmits the payload.

In step S35, the extended packet header generation unit 53 generates and transmits the optional extended packet header as illustrated in FIG. 4 according to the setting (OePH[7:0]) performed in step S33.

In step S36, the CRC operation unit 57 obtains CRC and transmits the CRC as the packet footer.

On the other hand, in step S32, in the case where the application processor 22 determines not to transmit the extended short packet (that is, to transmit the long packet), the processing proceeds to step S37.

In step S37, the extended packet header generation unit 53 transmits the extended packet header in which the data type (DataType[7:0]) is set as a packet other than the short packet in the first byte of the payload. At this time, the extended packet header generation unit 53 performs various settings (for example, OePH[7:0], OePF[3:0], and the like) to be stored in the extended packet header.

In step S38, the extended packet header generation unit 53 generates and transmits the optional extended packet header as illustrated in FIG. 5 according to the setting (OePH[7:0]) performed in step S37.

In step S39, the packing unit 51 packs the image data supplied from the image processing unit 43, and generates and transmits the legacy payload.

In step S40, the extended packet footer generation unit 54 generates and transmits the optional extended packet footer as illustrated in FIG. 4 according to the setting (OePF[3:0]) performed in step S37.

In step S41, the CRC operation unit 57 obtains CRC and transmits the CRC as the packet footer.

Then, after the processing of step S36 or step S41, the extension mode transmission processing is terminated.

As described above, the image sensor 21 can generate and transmit the extended short packet or the extended long packet.

Figure 13:
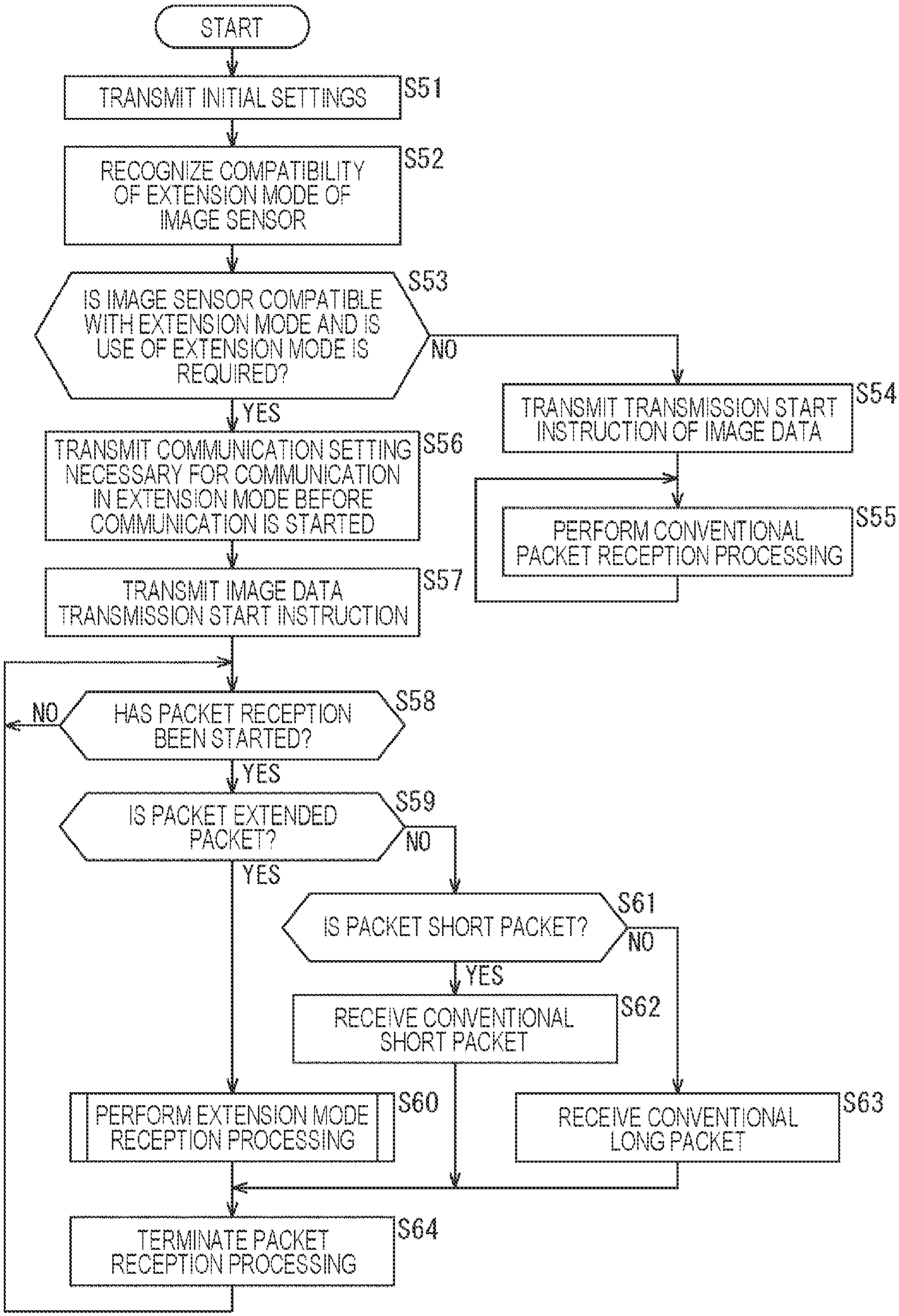
FIG. 13 is a flowchart for describing processing in which an application processor receives a packet.

FIG. 13 is a flowchart for describing processing in which the application processor 22 receives the packet.

For example, when the image sensor 21 is connected to the application processor 22 via the bus 23, the processing is started. In step S51, the controller 74 writes initial settings (for example, which one of C-PHY and D-PHY is used as the physical layer, and the like) of image sensor 21 into the register 73, and transmits the initial settings to the image sensor 21 by the I2C/I3C master 72 via the CCI master 88. Thereby, the initial settings are written in the register 47 of the image sensor 21.

In step S52, the controller 74 recognizes whether or not the image sensor 21 is compatible with the extension mode. For example, the controller 74 can recognize whether or not the image sensor 21 supports the extension mode by acquiring the set value (for example, the extended PH/PF-compatible capability) stored in the register 47 of the image sensor 21 by the I2C/I3C master 72. Alternatively, the controller 74 can recognize whether or not the image sensor 21 is compatible with the extension mode in advance on the basis of, for example, an input of a manual or the like.

In step S53, the controller 74 determines whether or not the image sensor 21 is compatible with the extension mode and whether or not the use of the extension mode is required by the application executed by the application processor 22.

In step S53, in a case where the controller 74 determines that the image sensor 21 is not compatible with the extension mode or the use of the extension mode is not required, the processing proceeds to step S54.

In step S54, the controller 74 causes I2C/I3C master 72 to transmit the transmission start instruction for the image data to the image sensor 21. At this time, the controller 74 causes the communication setting conforming to the CSI-2 standard to be transmitted.

In step S55, the application processor 22 performs conventional packet reception processing of receiving the packet having the packet structure conforming to the existing CSI-2 standard on the basis of the communication setting transmitted in step S54.

On the other hand, in step S53, in the case where the controller 74 determines that the image sensor 21 is compatible with the extension mode and the use of the extension mode is required by the application executed by the application processor 22, the processing proceeds to step S56.

In step S56, the I2C/I3C master 72 transmits the fixed communication setting required for communication in the extension mode before the communication in the extension mode is started. Thereby, the fixed communication setting is written in the register 47 of the image sensor 21 (step S14 in FIG. 11).

In step S57, the controller 74 causes I2C/I3C master 72 to transmit the transmission start instruction for the image data to the image sensor 21. At this time, the controller 74 causes the communication setting conforming to the CSI-2 standard to be transmitted.

In step S58, the packet header detection unit 81 determines whether or not the reception of the packet has been started by checking the data supplied from the physical layer processing unit 71, and waits until it is determined that the reception of the packet has been started. For example, in the case of detecting the packet header from the data supplied from the physical layer processing unit 71, the packet header detection unit 81 determines that the reception of the packet has been started.

In step S58, in the case where the packet header detection unit 81 determines that the reception of the packet has been started, the processing proceeds to step S59.

In step S59, the packet header detection unit 81 checks the data type of the packet header detected in step S58, and determines whether or not the packet whose reception has been started is the extended packet compatible with the extension mode. Then, for example, in the case where the extension mode setting information indicates the extension mode in the data type of the packet header (DataType[5:3]=3'b111), the packet header detection unit 81 determines that the packet whose reception has been started is the extended packet.

In step S59, in the case where the packet header detection unit 81 determines that the packet whose reception has been started is the extended packet, the processing proceeds to step S60, and extension mode reception processing of receiving the extended packet (see FIG. 14) is performed.

On the other hand, in step S59, in the case where the packet header detection unit 81 determines that the packet whose reception has been started is not the extended packet, the processing proceeds to step S61.

In step S61, the packet header detection unit 81 checks the data type (DataType[5:0]) of the packet header detected in step S58, and determines whether or not the packet whose reception has been started is the short packet.

In step S61, in the case where the packet header detection unit 81 determines that the packet whose reception has been started is the short packet, the processing proceeds to step S62. In step S62, the packet header detection unit 81 receives the short packet having a conventional packet structure transmitted from the image sensor 21.

On the other hand, in step S61, in the case where the packet header detection unit 81 determines that the packet whose reception has been started is not the short packet (that is, the reception of the long packet has been started), the processing proceeds to step S63. In step S63, the unpacking unit 87 receives the payload of the long packet having a conventional packet structure transmitted from the image sensor 21 and extracts the image data, and the CRC operation unit 86 receives the (WC+1)th byte transmitted following the packet header as the CRC.

After the processing of step S60, step S62, or step S63, the processing proceeds to step S64, and the controller 74 terminates the packet reception processing. Thereafter, the processing returns to step S58, and processing of receiving a packet for the next packet is similarly repeatedly performed.

Figure 14:
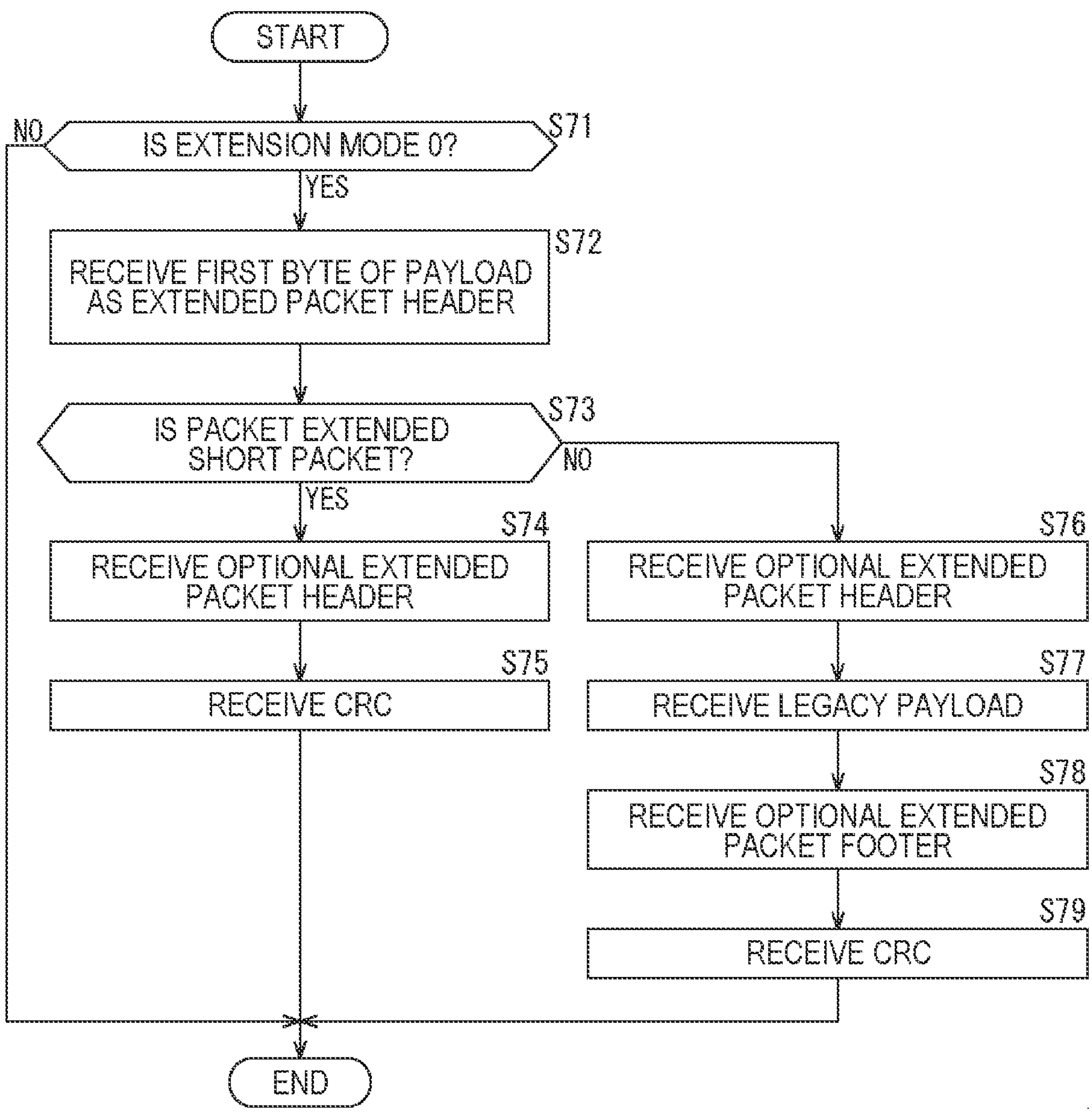
FIG. 14 is a flowchart for describing extension mode reception processing.

FIG. 14 is a flowchart illustrating the extension mode reception processing performed in the processing of step S60 of FIG. 13.

In step S71, the packet header detection unit 81 determines whether or not the mode setting of the extension mode is the extension mode 0. For example, in the case where the extension type setting information indicates the extension mode 0 in the data type of the packet header (DataType[1:0]=2'b00), the packet header detection unit 81 determines that the mode setting of the extension mode is the extension mode 0.

In step S71, in the case where the packet header detection unit 81 determines that the mode setting of the extension mode is the extension mode 0, the processing proceeds to step S72. In step S72, the interpretation unit 83 receives the first byte of the payload as the extended packet header.

In step S73, the interpretation unit 83 checks the data type (DataType[7:0]) of the extended packet header received in step S72, and determines whether or not the packet whose reception has been started is the extended short packet.

In step S73, in a case where the interpretation unit 83 determines that the packet is the extended short packet, the processing proceeds to step S74. In step S74, the interpretation unit 83 receives the optional extended packet header according to the setting (OePH[7:0]) stored in the extended packet header received in step S72.

In step S75, the CRC operation unit 86 receives the (WC+1)th byte transmitted following the optional extended packet header as the CRC.

On the other hand, in step S73, in the case where the interpretation unit 83 determines that the packet is not the extended short packet (that is, the reception of the extended long packet has been started), the processing proceeds to step S76. In step S76, the interpretation unit 83 receives the optional extended packet header according to the setting (OePH[7:0]) stored in the extended packet header received in step S72.

In step S77, the unpacking unit 87 receives the legacy payload of the extended long packet transmitted from the image sensor 21 and extracts the image data.

In step S78, the interpretation unit 83 receives the optional extended packet footer according to the setting (OePF[3:0]) stored in the extended packet header received in step S72.

In step S79, the CRC operation unit 86 receives the (WC+1)th byte transmitted following the optional extended packet footer as the CRC.

Then, in step S71, in the case where it is determined that the mode setting of the extension mode is not the extension mode 0, the extension mode reception processing is terminated after the processing of step S75 or after the processing of step S79.

As described above, the application processor 22 can acquire data by receiving the extended short packet or the extended long packet.

<Second Structure Example of Packet Structure>

A second structure example of the packet structure of the packet used for communication between the extension mode-compatible CSI-2 transmission circuit 31 and the extension mode-compatible CSI-2 reception circuit 32 will be described with reference to FIGS. 15 to 18.

In the first structure example illustrated in FIGS. 3 to 8, the packet header and the packet footer have the same packet structure as those of the existing CSI-2 standard, placing a significance on maintaining compatibility with the existing CSI-2 standard, and the packet structure is extended by the extended packet header, the optional extended packet header, and the optional extended packet footer. Meanwhile, in the second structure example to be described below, the packet header and the packet footer are different from those of the existing CSI-2 standard, and the packet structure is extended by the extended packet header and the extended packet footer.

Figure 15:
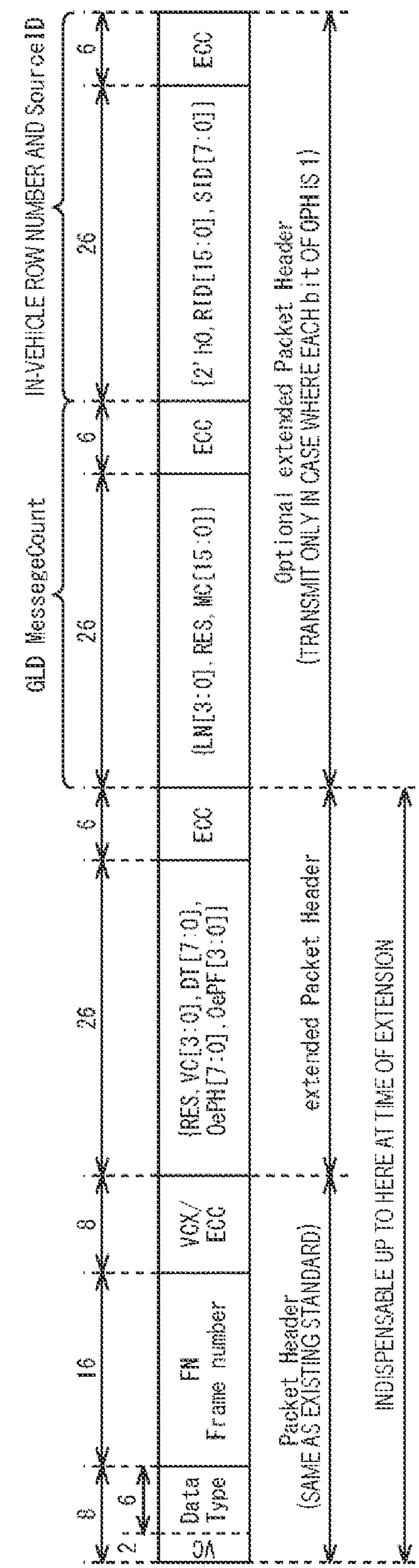
FIG. 15 is a diagram illustrating a second structure example of an overall packet structure of an extended packet for D-PHY.

FIG. 15 illustrates a packet structure of a short packet (hereinafter an extended short packet for D-PHY) used in the extension mode of CSI-2 in the case where the physical layer is D-PHY.

In the extended short packet for D-PHY illustrated in FIG. 15, the extension mode is identified by the data type to be stored in the same packet header as that of the existing CSI-2 standard, similarly to the extended short packet for D-PHY of the first structure example illustrated in FIG. 4.

Meanwhile, in the extended short packet for D-PHY illustrated in FIG. 15, the frame number is stored in a short packet data field in the next sixteen bits of the data type of the packet header, similarly to the short packet conforming to the existing CSI-2 standard. Then, following the packet header, an extended packet header configured similarly to the extended packet header illustrated in FIG. 4 is transmitted.

Therefore, the application processor 22 on the reception side can interpret the data type stored in the extended packet header and determine that the frame number is stored in the data field of the packet header in the case where the packet is the extended short packet.

Note that the optional extended packet header in the extended short packet for D-PHY illustrated in FIG. 15 is configured similarly to the optional extended packet header in the extended short packet for D-PHY of the first structure example illustrated in FIG. 4. However, since the optional extended packet header has a packet structure that is not embedded in the payload, it is not necessary to add CRC at the end.

Figure 16:
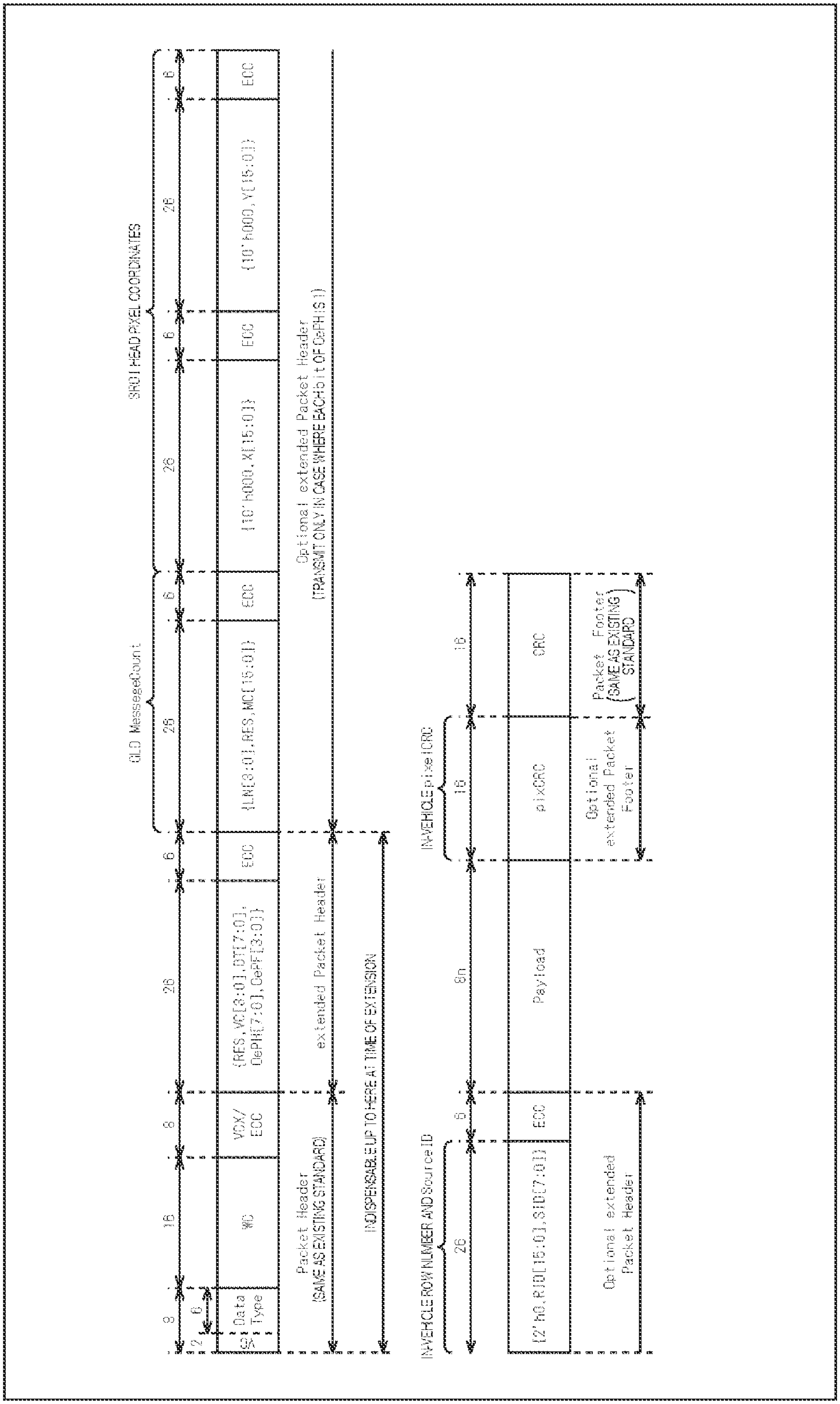
FIG. 16 is a diagram illustrating a second structure example of a packet structure of an extended long packet for D-PHY.

FIG. 16 illustrates a packet structure of a long packet (hereinafter an extended long packet for D-PHY) used in the extension mode of CSI-2 in the case where the physical layer is D-PHY.

In the extended long packet for D-PHY illustrated in FIG. 16, the extension data is transmitted as a part of the packet header or of the packet footer without being embedded in the payload. Therefore, WC of the head packet header merely indicates the byte length of the payload, similarly to the existing standard.

Figure 17:
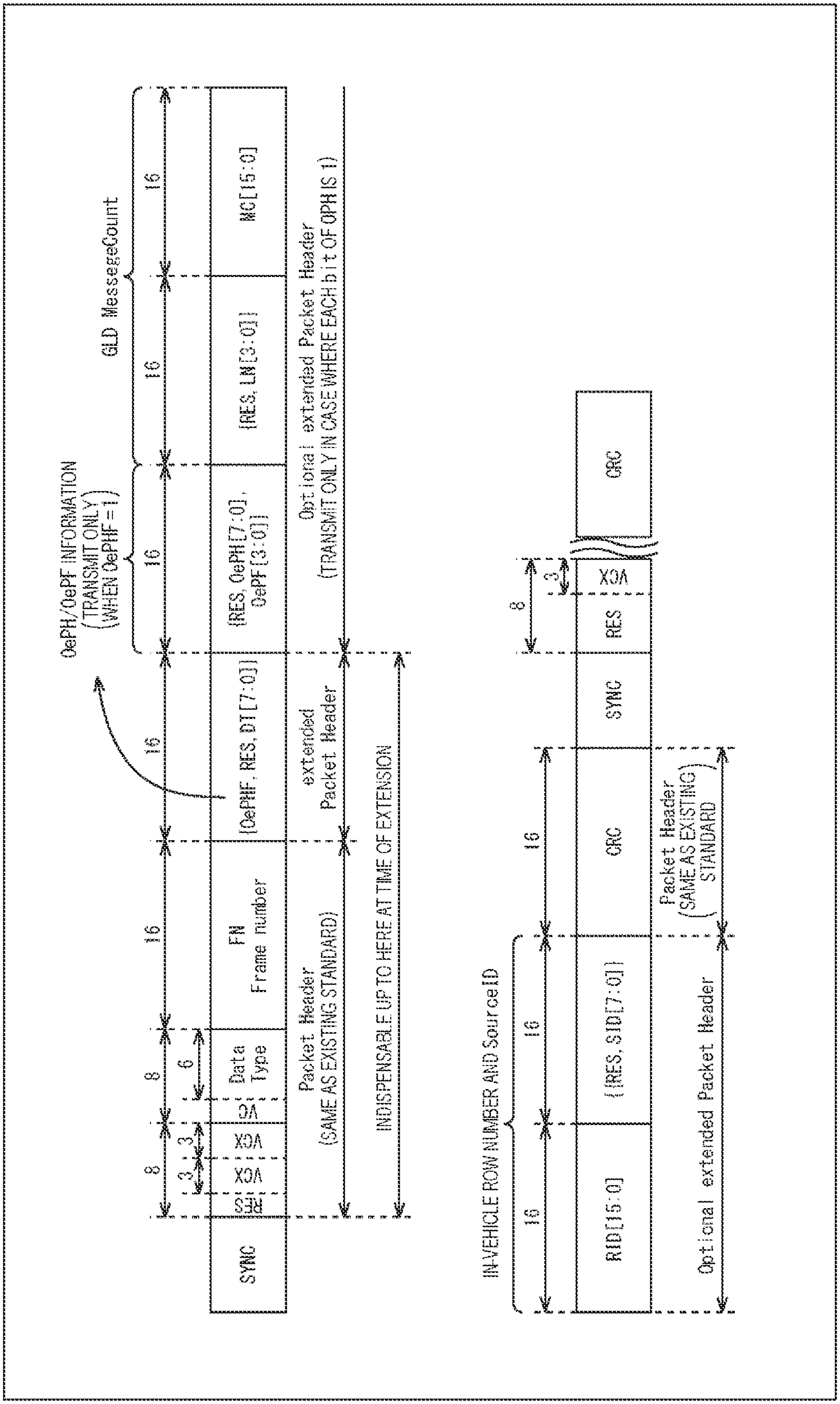
FIG. 17 is a diagram illustrating a second structure example of a packet structure of an extended short packet for C-PHY.

FIG. 17 illustrates a packet structure of a short packet (hereinafter an extended short packet for C-PHY) used in the extension mode of CSI-2 in the case where the physical layer is C-PHY.

Since the extended portion in the extended short packet for C-PHY illustrated in FIG. 17 is transmitted as extension of the packet header conforming to the existing CSI-2 standard, the extended portion such as the extended packet header is inserted after the frame number. Then, the packet header ends with CRC, similarly to the existing CSI-2 standard. Moreover, the packet structure by which the packet header is transmitted twice with SYNC interposed is similar to the short packet conforming to the existing CSI-2 standard.

Figure 18:
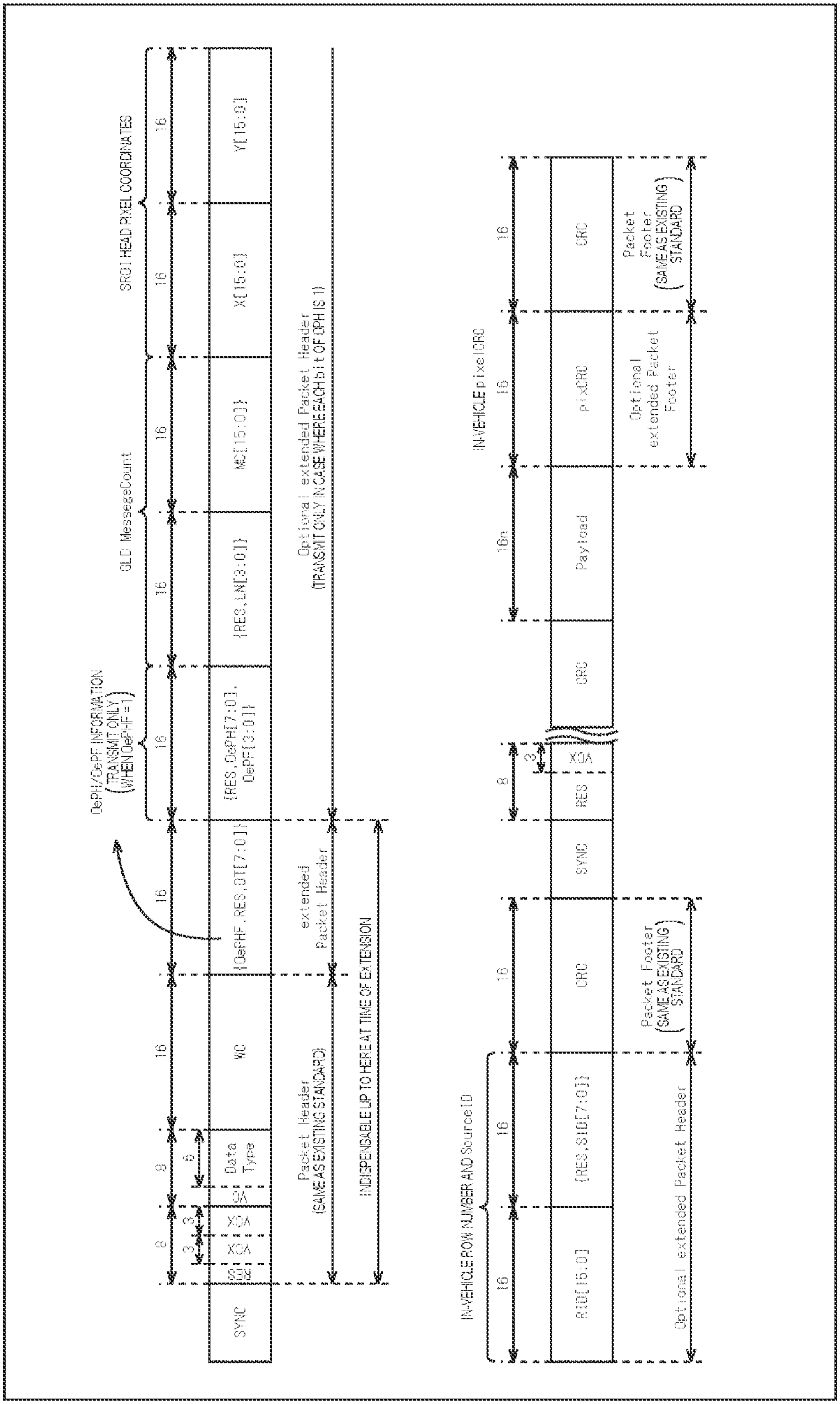
FIG. 18 is a diagram illustrating a second structure example of a packet structure of an extended long packet for C-PHY.

FIG. 18 illustrates a packet structure of a long packet (hereinafter an extended long packet for C-PHY) used in the extension mode of CSI-2 in the case where the physical layer is C-PHY.

As described above, the extended long packet for C-PHY illustrated in FIG. 18 is different from the extended long packet for C-PHY of the first structure example illustrated in FIG. 8 in that WC of the head packet header merely indicates the byte length of the payload, similarly to the existing standard.

As described above, with the packet structure of the extended packet of the second structure example illustrated in FIGS. 15 to 18, it is possible to support various uses as compared with conventional structures, similarly to the packet structure (FIGS. 3 to 8) of the extended packet of the first structure example.

Note that the extended packet of the second structure example has a packet structure in which the existing packet header and footer are extended without the extension data being embedded in the existing payload. Therefore, in the case of adopting the packet structure of the extended packet of the second structure example, it is not possible to minimize the influence that a change is required from a conventionally used communication system, as compared with the case of adopting the packet structure of the extended packet of the first structure example. That is, for example, the existing SerDes transmission circuit 34 needs to be changed with respect to the SerDes reception circuit 35 (FIG. 2).

As described above, by adopting the extended packet of the first structure example, it is possible to support various uses such as in-vehicle use, and it is possible to construct an in-vehicle system while minimizing the influence that a change is required from the conventionally used communication system.

Furthermore, by adopting the extended packet of the second structure example, it is possible to support various uses such as in-vehicle use although a change is required from the conventionally used communication system.

<Modification of Image Sensor and Application Processor>

(Modification of Image Sensor)

A modification of the image sensor and the application processor will be described with reference to FIGS. 19A and 19B.

Each block constituting the image sensor 21 in FIG. 9 or the application processor 22 in FIG. 10 described above is configured to be able to perform processing corresponding to both the packet for D-PHY and the packet for C-PHY. In contrast, for example, both a block for exclusively processing the packet for D-PHY and a block for exclusively processing the packet for C-PHY may be provided, and the processing may be switched in each block.

Figure 19A:
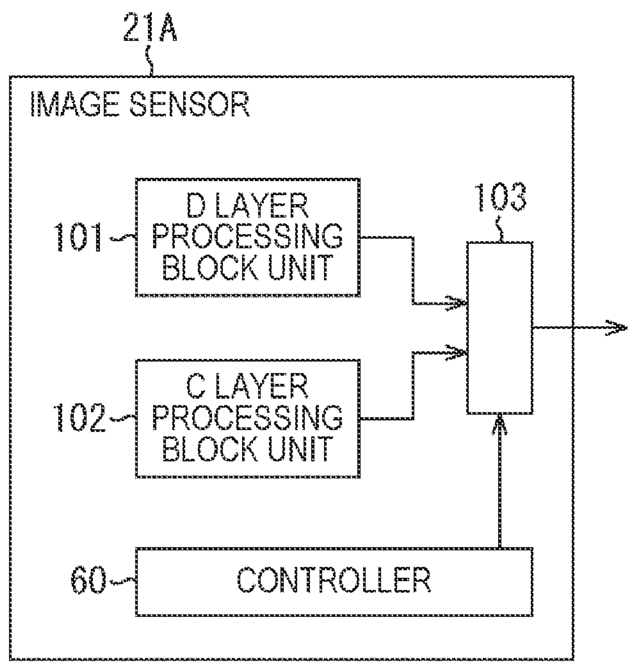
FIGS. 19A and 19B are block diagrams illustrating a modification of a configuration for switching D-PHY and C-PHY.

An image sensor 21A illustrated in FIG. 19A includes a D layer processing block unit 101, a C layer processing block unit 102, a switching unit 103, and a controller 60.

The D layer processing block unit 101 includes a block that exclusively performs processing of the packet for D-PHY among blocks constituting the image sensor 21 in FIG. 9. The C layer processing block unit 102 includes a block that exclusively performs processing of the packet for C-PHY among blocks constituting the image sensor 21 in FIG. 9. The switching unit 103 performs switching so as to output the packet for D-PHY generated in the D layer processing block unit 101 in the case of using the D-PHY for the physical layer, and to output the packet for C-PHY generated in the C layer processing block unit 102 in the case of using the C-PHY for the physical layer under the control of the controller 60.

(Modification of Application Processor)

Figure 19B:
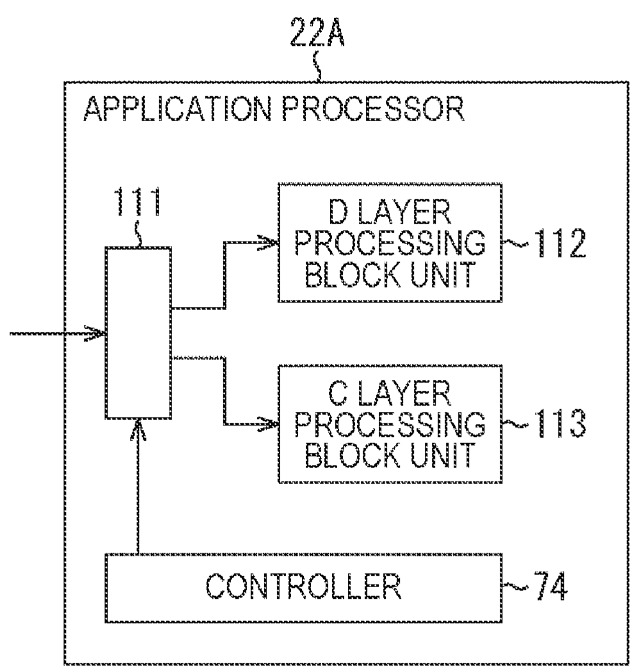

An application processor 22A illustrated in FIG. 19B includes a switching unit 111, a D layer processing block unit 112, a C layer processing block unit 113, and a controller 74.

The switching unit 111 performs switching so as to supply the packet transmitted from the image sensor 21A to one of the D layer processing block unit 112 and the C layer processing block unit 113 under the control of the controller 74. The D layer processing block unit 112 includes a block that exclusively performs processing of the packet for D-PHY among blocks constituting the application processor 22 in FIG. 10. The C layer processing block unit 113 includes a block that exclusively performs processing of the packet for C-PHY among blocks constituting the application processor 22 in FIG. 10.

In the image sensor 21A and the application processor 22A configured as described above, a physical layer to be used can be set between the controller 60 and the controller 74 before communication is started. Then, for example, in the case of using the D-PHY for the physical layer, the packet for D-PHY generated in the D layer processing block unit 101 is transmitted via the switching unit 103, supplied to the D layer processing block unit 112 via the switching unit 111, and processed. Furthermore, for example, in the case of using C-PHY for the physical layer, the packet for C-PHY generated in the C layer processing block unit 102 is transmitted via the switching unit 103, supplied to the C layer processing block unit 113 via the switching unit 111, and processed.

<Application Example of Extended Packet>

Application of the above-described extended packet to, for example, the following use cases has been examined.

For example, application of the extended packet to a use case of transmitting a higher-definition image (RAW24) has been examined.

For example, when image data is transmitted in RAW format, RAW6, RAW7, RAW8, RAW10, RAW12, RAW14, RAW16, and RAW20 are defined as the data types to be stored in the packet header conforming to the existing CSI-2 standard. Meanwhile, in recent years, transmission of a higher-definition image is expected in order to support automated driving using an in-vehicle camera. Therefore, by extending the bit depth of the data type by applying the extended packet, it is possible to define higher-definition RAW24 as the data type of the extended packet header, for example.

Furthermore, application of the extended packet to SmartROI that is a technique for transmitting only an image region of interest on a screen has been examined.

For example, a large number of cameras is currently installed in a stadium, an airport, or the like. In a case where the entire images captured by these cameras are transmitted from the cameras to a cloud server via a network such as the Internet, it is assumed that a band shortage of the Internet, an increase in calculation amount or data amount on the cloud side, or the like. Therefore, by cutting out only the image region of interest at an edge (camera side) and transmitting the image region of interest, it is expected to suppress the band shortage on the Internet, the increase in calculation amount or data amount on the cloud side, or the like.

In the case of transmitting such an SROI, it is necessary to transmit upper left coordinates of a rectangular region (ROI) together in order to notify the reception side which part on the entire screen the image region of interest corresponds to. Furthermore, it is necessary to transmit data of the entire imaging screen at predetermined timing by an instruction from the reception side. Therefore, for example, the SROI image and the data of the entire image (existing packet header) are mixed in units of frames.

Therefore, by applying the extended packet, for example, coordinate data of sixteen bits or more of each of an X coordinate and a Y coordinate can be transmitted.

Moreover, a use case of applying the extended packet GLD that continues communication by reducing the band and the number of lanes even in a case where channel deterioration occurs is examined. Note that GLD is a proposal examined in CSI-2 ver3.0.

For example, in automated driving, even if a part of a cable connecting cameras is disconnected at the time of collision, it is required to continue communication using a cable that is not disconnected, automatically retreat to a safety zone, and then stop a vehicle. Therefore, an in-vehicle camera interface has at least a disconnection detection function, and information such as a row number (sixteen bits) indicating information of which row on the screen, SourceID (eight bits) indicating which camera has transmitted the information, and a message counter (sixteen bits) indicating a transmission number is required. Moreover, in a case of being used in combination with the SROI as described above, it is conceivable that these pieces of information are transmitted in units of frames.

Therefore, by applying the extended packet, these pieces of information can be transmitted.

<First Configuration Example Adapted to E2E Protection>

A configuration example adapted to a rule for prohibiting packet modification and the like on a transmission path will be described with reference to FIGS. 20 to 26.

For example, in the communication system 11A having the configuration described with reference to FIG. 2, in a case where interfaces are different between the image sensor 21 and the application processor 22, the packet needs to be converted on the transmission path. That is, in a case where the physical layer of the image sensor 21 is D-PHY and the physical layer of the application processor 22 is C-PHY, for example, the SerDes device 26 needs to convert the packet for D-PHY into the packet for C-PHY.

As described above, in the configuration in which the packet conversion is performed in the SerDes device 26, for example, the rule defined by ISO 26262 (Functional Safety), that is, the rule for prohibiting packet modification and the like on the transmission path (hereinafter referred to as end-to-end (E2E) protection) is violated.

Figure 20:
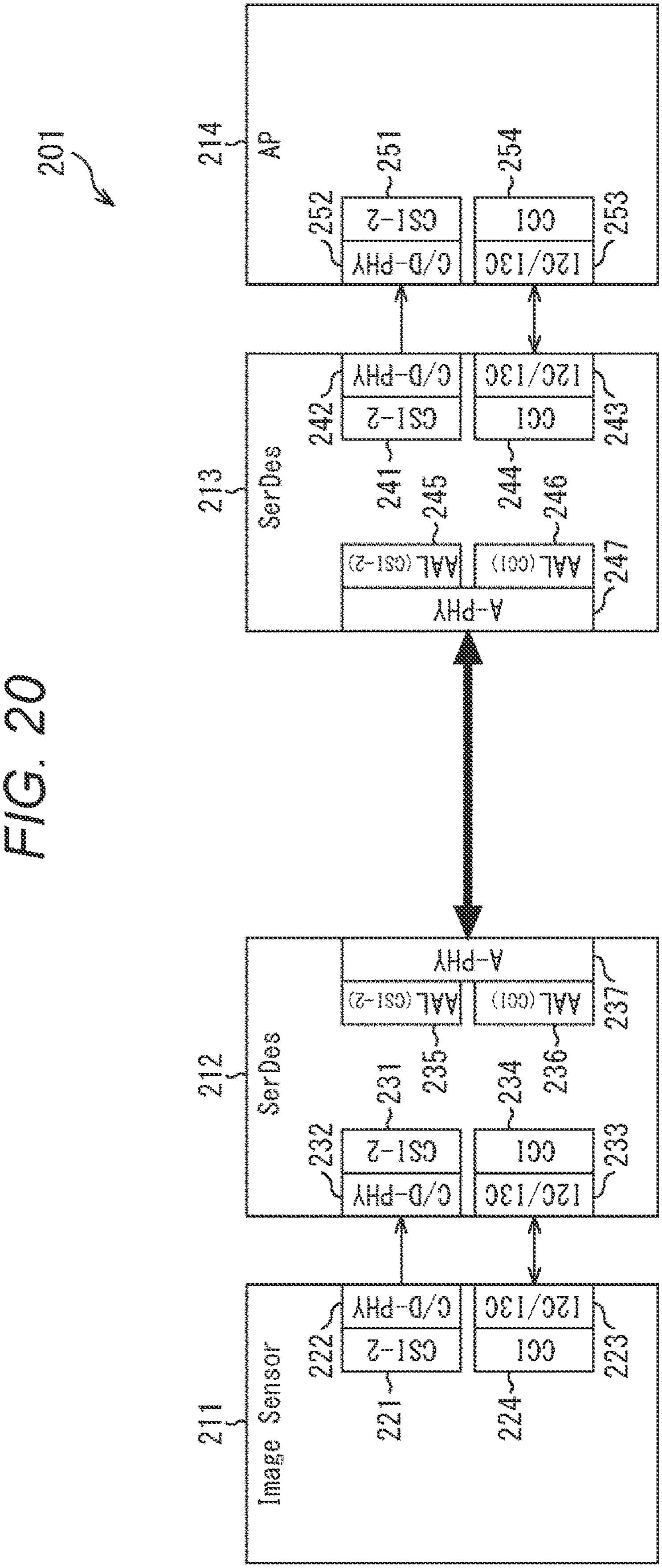
FIG. 20 is a block diagram illustrating a configuration example of a third embodiment of a communication system to which the present technology is applied.

FIG. 20 is a block diagram illustrating a configuration example of a communication system 201 adapted to E2E protection as a third embodiment of the communication system to which the present technology is applied.

As illustrated in FIG. 20, the communication system 201 is configured by connecting an image sensor 211, a SerDes device 212, a SerDes device 213, and an application processor 214. Note that FIG. 20 illustrates a case where SERDES is A-PHY as an example, and cases of connection using other SERDES standards such as FPD-LINK 3 are also included. In addition, in the SERDES standard, communication may be performed on the basis of the SERDES standard while maintaining the format of the CIS-2 (at least application specific payload). Furthermore, in SERDES, physical layer processing units 237 and 247 may include a plurality of physical layer processing units of other SERDES standards in addition to A-PHY, and the physical layer processing units can be switched according to the application.

The image sensor 211 includes at least an extension mode-compatible CSI-2 transmission circuit 221, a physical layer processing unit (hereinafter referred to as a C/D-PHY physical layer processing unit) 222 corresponding to C-PHY or D-PHY or both, a slave (hereinafter referred to as an I2C/I3C slave) 223 corresponding to I2C or I3C or both, and a CCI slave 224.

The SerDes device 212 includes at least a CSI-2 reception circuit 231, a C/D-PHY physical layer processing unit 232, an I2C/I3C master 233, a CCI master 234, an A-PHY packet for CSI-2 generation unit 235, an A-PHY packet for CCI transmission/reception unit 236, and a physical layer processing unit 237 compatible with A-PHY. For example, in the SerDes device 212, a packet for C-PHY or D-PHY is converted into a packet for A-PHY, and this conversion is determined on the basis of register setting or the like.

The SerDes device 213 includes at least a CSI-2 transmission circuit 241, a C/D-PHY physical layer processing unit 242, an I2C/I3C slave 243, a CCI slave 244, an A-PHY packet for CSI-2 reception unit 245, an A-PHY packet for CCI transmission/reception unit 246, and a physical layer processing unit 247 compatible with the A-PHY. For example, in the SerDes device 213, the packet for A-PHY is converted into the packet for C-PHY or D-PHY, and this conversion is determined on the basis of register setting or the like.

The application processor 214 includes at least an extension mode-compatible CSI-2 reception circuit 251, a C/D-PHY physical layer processing unit 252, an I2C/I3C master 253, and a CCI master 254.

The communication system 201 is configured in this manner, and an extended packet having the above-described structure is transmitted from the image sensor 211 and received by the application processor 214. Here, when the communication system 201 is configured such that the physical layer processing unit 222 of the image sensor 211 is compatible with D-PHY and the physical layer processing unit 252 of the application processor 22 is compatible with C-PHY, it is necessary not to violate E2E protection.

Therefore, the communication system 201 limits a protection range of E2E protection to an application specific payload (hereinafter referred to as an AS payload), which is a payload specific to an application, so as to be adapted to E2E protection. That is, the AS payload is prohibited from being changed at the time of conversion from the packet for A-PHY into the packet for C-PHY or for D-PHY or at the time of conversion from the packet for C-PHY or for D-PHY into the packet for A-PHY.

Figure 21:
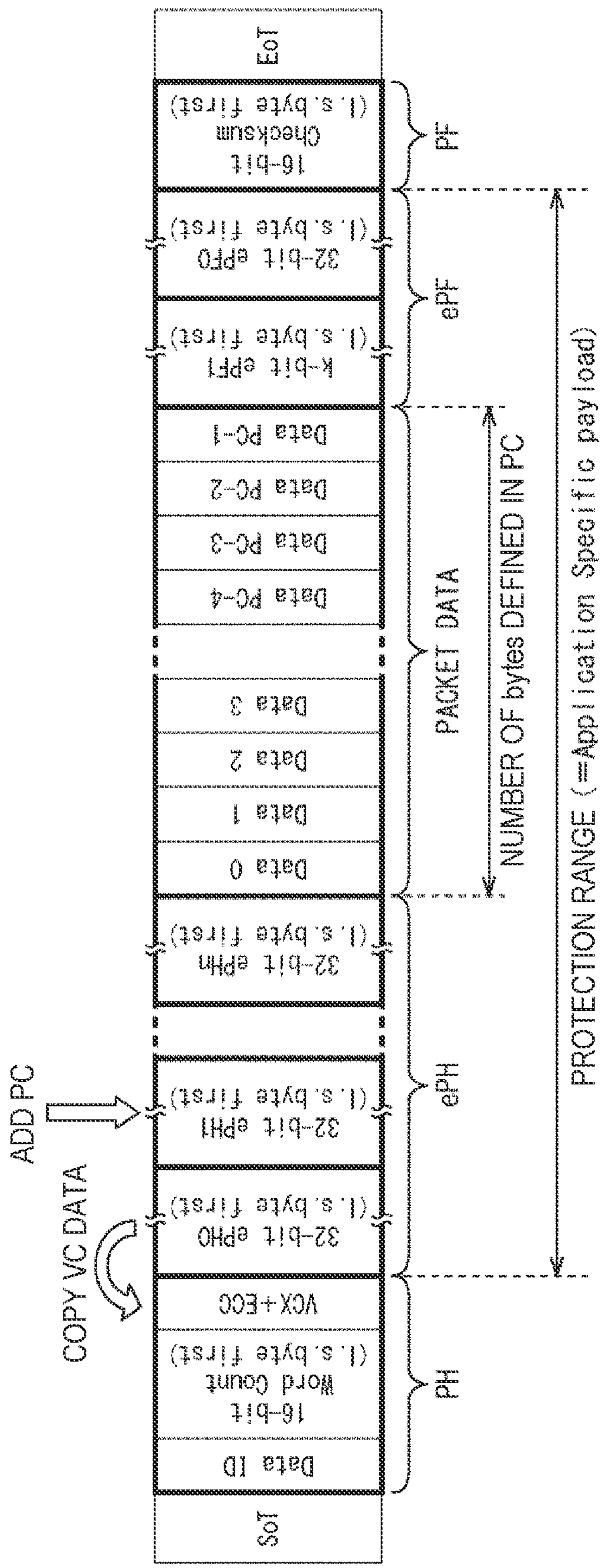
FIG. 21 is a diagram illustrating a structure example of an extended packet for D-PHY compatible with a rule of packet modification prohibition.

FIG. 21 illustrates a structure example of the extended packet for D-PHY extended to be compatible with E2E protection.

As illustrated, in the extended packet for D-PHY, the AS payload including an extended packet header (ePH), packet data, and an extended packet footer (ePF) is limited as the protection range of E2E protection.

Then, in the extended packet header, predetermined information necessary in a case where the protection range of E2E protection is limited to the AS payload is described. For example, a packet count PC indicating a data length of data to be stored in the AS payload is added as the predetermined information described in the extended packet header so as to identify the data length of the packet data. That is, the packet data has the number of bytes determined by the packet count PC. Furthermore, a virtual channel VC indicating the number of lines of virtual channels is copied to an existing packet header as the predetermined information described in the extended packet header.

Figure 22:
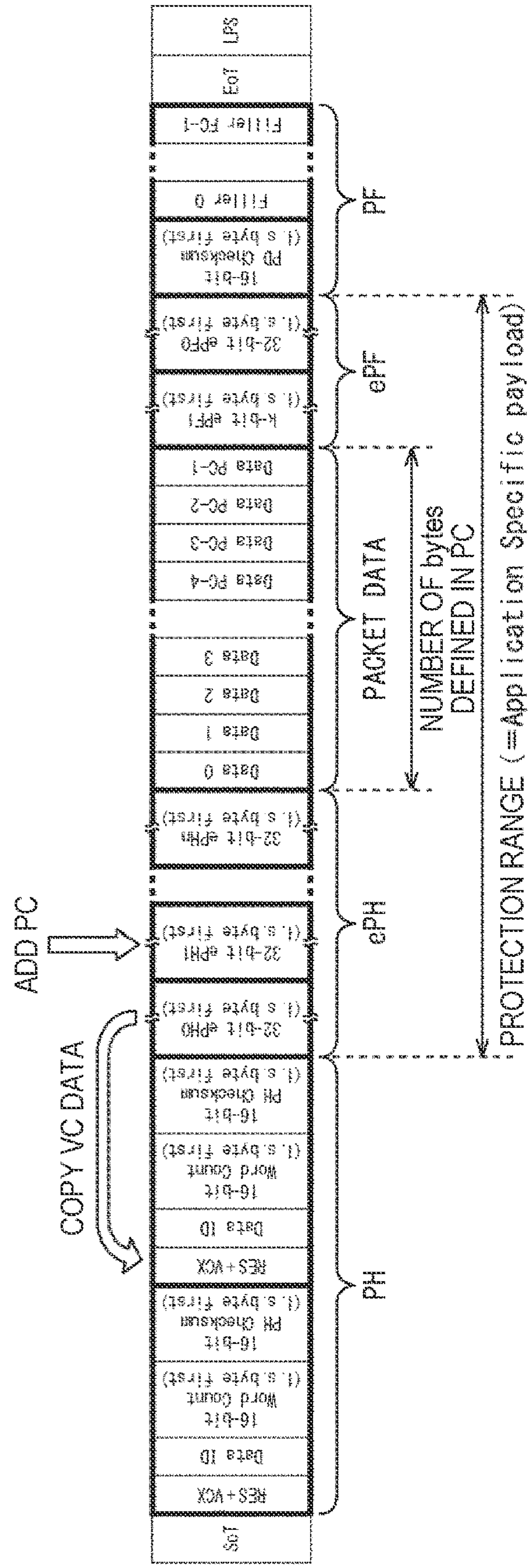
FIG. 22 is a diagram illustrating a structure example of an extended packet for C-PHY compatible with a rule of packet modification prohibition.

FIG. 22 illustrates a structure example of the extended packet for C-PHY extended to be compatible with E2E protection.

As illustrated, in the extended packet for C-PHY, the AS payload including an extended packet header (ePH), packet data, and an extended packet footer (ePF) is limited as the protection range of E2E protection, similarly to the extended packet for D-PHY. Then, the packet count PC and the virtual channel VC are described in the extended packet header as the predetermined information necessary in the case where the protection range of E2E protection is limited to the AS payload, similarly to the extended packet for D-PHY.

Figure 23:
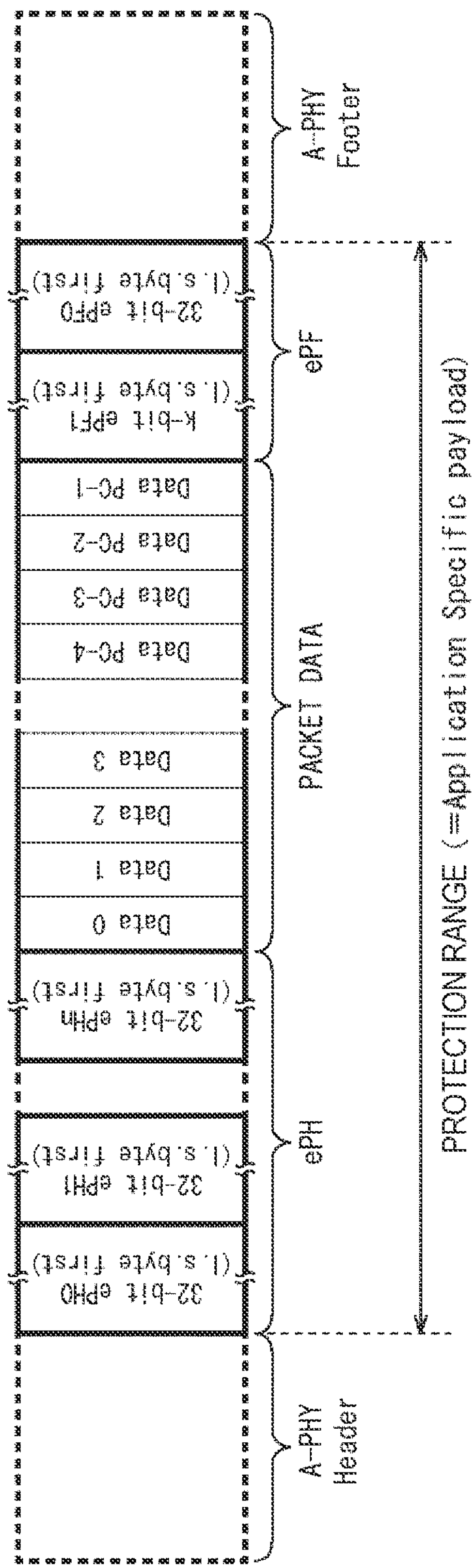
FIG. 23 is a diagram illustrating a structure example of an extended packet for A-PHY compatible with a rule of packet modification prohibition.

FIG. 23 illustrates a structure example of the extended packet for A-PHY extended to be compatible with E2E protection.

As illustrated, even in the extended packet for A-PHY, the AS payload including an extended packet header (ePH), packet data, and an extended packet footer (ePF) is limited as the protection range of E2E protection.

Here, as described with reference to FIG. 20, the communication system 201 generates the extended packet for A-PHY from the extended packet for D-PHY or C-PHY transmitted from the image sensor 211 to the SerDes device 212. Therefore, the packet count PC and the virtual channel VC are already described in the extended packet header of the extended packet for A-PHY.

By adopting such a packet structure, the communication system 201 can avoid modification of the AS payload on the transmission path and can observe E2E protection. Note that the packet structures illustrated in FIGS. 21 to 23 can be used by being partially replaced with corresponding packets of the packet structures as illustrated in FIGS. 3 to 8 and FIGS. 15 to 18, and a part of packet generation is replaced.

<Packet Transmission/Reception Processing Adapted to E2E Protection>

Figure 24:
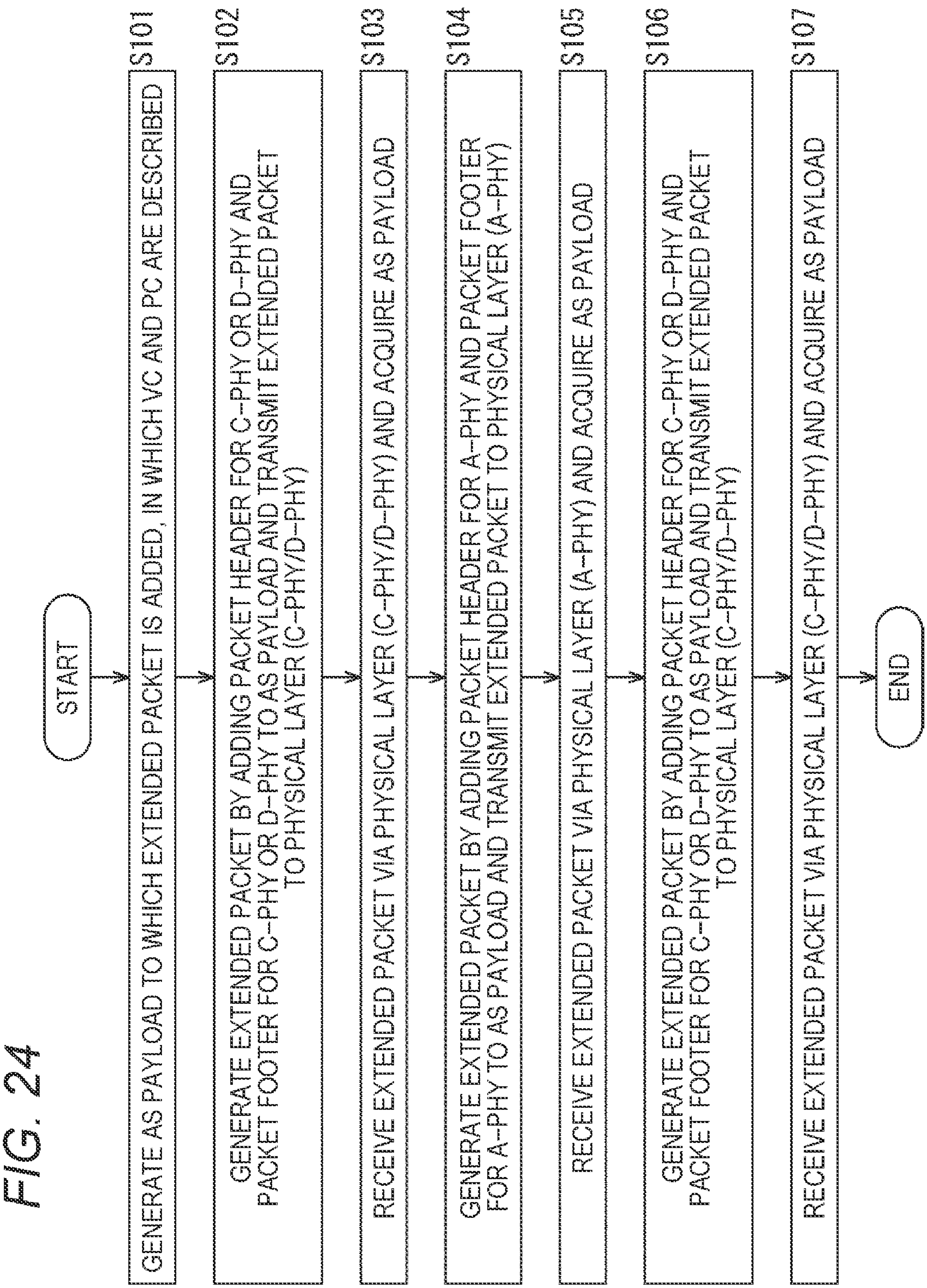
FIG. 24 is a flowchart for describing packet transmission/reception processing adapted to the rule of packet modification prohibition.

FIG. 24 is a flowchart for describing packet transmission/reception processing adapted to E2E protection.

For example, when data (for example, image data or the like) stored in the packet data is supplied to the extension mode-compatible CSI-2 transmission circuit 221, the processing is started. Then, in step S101, in the image sensor 211, the extension mode-compatible CSI-2 transmission circuit 221 stores the supplied data in the packet data. Moreover, the extension mode-compatible CSI-2 transmission circuit 221 generates the extended packet header describing the virtual channel VC and the packet count PC as illustrated in FIG. 21 or 22. Then, the extension mode-compatible CSI-2 transmission circuit 221 generates the AS payload by adding the extended packet header and the extended packet footer to the packet data.

In step S102, the extension mode-compatible CSI-2 transmission circuit 221 generates the extended packet for C-PHY or D-PHY by adding the packet header for C-PHY or D-PHY and the packet footer for C-PHY or D-PHY to the AS payload generated in step S101. Then, the extension mode-compatible CSI-2 transmission circuit 221 transmits the extended packet for C-PHY or D-PHY to the SerDes device 212 via the C/D-PHY physical layer processing unit 222.

In step S103, in the SerDes device 212, the CSI-2 reception circuit 231 receives the extended packet for C-PHY or D-PHY transmitted from the image sensor 211 in step S102 via the C/D-PHY physical layer processing unit 232. Then, the CSI-2 reception circuit 231 acquires the AS payload excluding the packet header and the packet footer from the received extended packet, and supplies the AS payload as it is to the A-PHY packet for CSI-2 generation unit 235.

In step S104, in the SerDes device 212, the A-PHY packet for CSI-2 generation unit 235 generates the extended packet for A-PHY by adding the packet header for A-PHY and the packet footer for A-PHY to the AS payload supplied from the CSI-2 reception circuit 231. Then, the A-PHY packet for CSI-2 generation unit 235 transmits the extended packet for A-PHY to the SerDes device 213 via the physical layer processing unit 237 compatible with A-PHY.

In step S105, in the SerDes device 213, the A-PHY packet for CSI-2 reception unit 245 receives the extended packet for A-PHY transmitted from the SerDes device 212 in step S104 via the physical layer processing unit 247 compatible with A-PHY. Then, the A-PHY packet for CSI-2 reception unit 245 acquires the AS payload excluding the packet header and the packet footer from the received extended packet, and supplies the AS payload as it is to the CSI-2 transmission circuit 241.

In step S106, the CSI-2 transmission circuit 241 generates the extended packet for C-PHY or D-PHY by adding the packet header for C-PHY or D-PHY and the packet footer for C-PHY or D-PHY to the AS payload supplied from the A-PHY packet for CSI-2 reception unit 245 in step S105. Then, the CSI-2 transmission circuit 241 transmits the extended packet for C-PHY or D-PHY to the application processor 214 via the C/D-PHY physical layer processing unit 242.

In step S107, in the application processor 214, the extension mode-compatible CSI-2 reception circuit 251 receives the extended packet for C-PHY or D-PHY transmitted from the SerDes device 213 in step S106 via the C/D-PHY physical layer processing unit 252. Then, the extension mode-compatible CSI-2 reception circuit 251 acquires the AS payload excluding the packet header and the packet footer from the received extended packet, and outputs various data stored in the packet data of the AS payload to a subsequent LSI (not illustrated). Thereafter, the packet transmission/reception processing adapted to E2E protection is terminated, and similar processing is repeatedly performed for the next extended packet.

As described above, the communication system 201 can transmit and receive the extended packet without modifying the AS payload on the transmission path by executing the packet transmission/reception processing adapted to E2E protection. At this time, for example, even in the case where the physical layer of the image sensor 211 is D-PHY and the physical layer of the application processor 214 is C-PHY, that is, even in the case where the respective interfaces are different, E2E protection can be observed.

<Detailed Configuration Example of Image Sensor 211>

Figure 25:
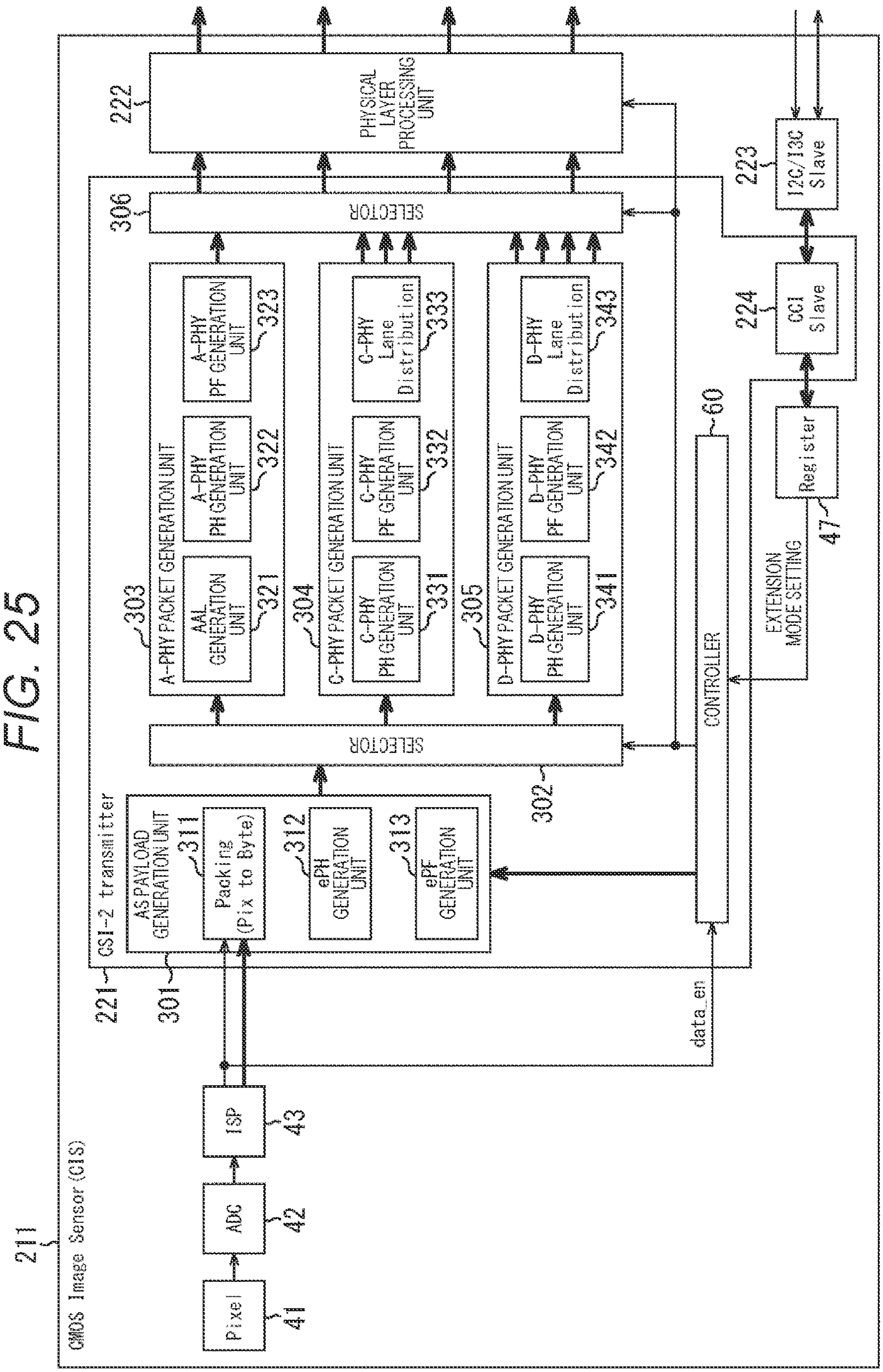
FIG. 25 is a block diagram illustrating a configuration example of an image sensor adapted to the rule of packet modification prohibition.

FIG. 25 is a block diagram illustrating a detailed configuration example of the image sensor 211. Note that, in the image sensor 211 illustrated in FIG. 25, configurations common to those of the image sensor 21 in FIG. 9 are denoted by the same reference numerals, and detailed description thereof is omitted.

That is, the image sensor 211 includes a pixel 41, an AD converter 42, an image processing unit 43, a register 47, and a controller 60, similarly to the image sensor 21 in FIG. 9. Furthermore, the I2C/I3C slave 223 and the CCI slave 224 included in the image sensor 211 correspond to the I2C/I3C slave 46 and the CCI slave 59 in FIG. 9, respectively.

Then, the image sensor 211 includes the extension mode-compatible CSI-2 transmission circuit 221 and the physical layer processing unit 222, and the physical layer processing unit 222 is compatible with A-PHY, C-PHY, and D-PHY.

The extension mode-compatible CSI-2 transmission circuit 221 includes an AS payload generation unit 301, a selector 302, an A-PHY packet generation unit 303, a C-PHY packet generation unit 304, a D-PHY packet generation unit 305, and a selector 306 in addition to the controller 60 and the CCI slave 224.

The AS payload generation unit 301 generates the AS payload limited as the protection range of E2E protection, and outputs the AS payload to the selector 302. For example, the AS payload generation unit 301 includes a packing unit 311, an extended packet header generation unit 312, and an extended packet footer generation unit 313.

The packing unit 311 packs the image data supplied from the image processing unit 43 as data to be transmitted, and generates packet data of the number of bytes determined by the packet count PC. For example, the controller 60 can control the number of bytes of the packet data generated by the packing unit 311 according to a setting value (for example, an image size or the like) stored in the register 47.

For example, as described with reference to FIGS. 21 to 23, the extended packet header generation unit 312 generates the extended packet header in which the packet count PC and the virtual channel VC are described, and adds the extended packet header to the packet data. The extended packet footer generation unit 313 generates and adds the extended packet footer to the packet data.

The selector 302 selects one of the A-PHY packet generation unit 303, the C-PHY packet generation unit 304, and the D-PHY packet generation unit 305 provided in parallel, as an output destination of the AS payload supplied from the AS payload generation unit 301 under the control of the controller 60.

The A-PHY packet generation unit 303 generates the extended packet for A-PHY from the AS payload supplied via the selector 302, and outputs the extended packet to the selector 306. For example, the A-PHY packet generation unit 303 includes an AAL generation unit 321, an A-PHY packet header generation unit 322, and an A-PHY packet footer generation unit 323.

For example, the A-PHY adaptation layer (AAL) generation unit 321 divides the AS payload generated by the AS payload generation unit 301 for every 380 bytes in a hierarchy called adaptation layer. Then, the A-PHY packet header generation unit 322 adds the packet header for A-PHY and the A-PHY packet footer generation unit 323 adds the packet footer for A-PHY to the divided AS payload.

The C-PHY packet generation unit 304 generates the extended packet for C-PHY from the AS payload supplied via the selector 302, and outputs the extended packet to the selector 306. For example, the C-PHY packet generation unit 304 includes a C-PHY packet header generation unit 331, a C-PHY packet footer generation unit 332, and a C-PHY lane distribution unit 333.

For example, the C-PHY packet header generation unit 331 adds the packet header for C-PHY and the C-PHY packet footer generation unit 332 adds the packet footer for C-PHY to the AS payload generated in the AS payload generation unit 301. Then, the C-PHY lane distribution unit 333 distributes the extended packet for C-PHY to three lanes conforming to the CSI-2 standard.

The D-PHY packet generation unit 305 generates the extended packet for D-PHY from the AS payload supplied via the selector 302, and outputs the extended packet to the selector 306. For example, the D-PHY packet generation unit 305 includes a D-PHY packet header generation unit 341, a D-PHY packet footer generation unit 342, and a D-PHY lane distribution unit 343.

For example, the D-PHY packet header generation unit 341 adds the packet header for D-PHY and the D-PHY packet footer generation unit 342 adds the packet footer for D-PHY to the AS payload generated in the AS payload generation unit 301. Then, the D-PHY lane distribution unit 343 distributes the extended packet for D-PHY to four lanes conforming to the CSI-2 standard.

The selector 306 selects one of the A-PHY packet generation unit 303, the C-PHY packet generation unit 304, and the D-PHY packet generation unit 305 provided in parallel, as an output source of the extended packet to be supplied to the physical layer processing unit 222 under the control of the controller 60.

Then, in a case where the extended packet for A-PHY is supplied from the A-PHY packet generation unit 303, the physical layer processing unit 222 transmits the extended packet for A-PHY in one lane. Furthermore, in a case where the extended packet for C-PHY is supplied from the C-PHY packet generation unit 304, the physical layer processing unit 222 transmits the extended packet for C-PHY in three lanes. Furthermore, in a case where the extended packet for D-PHY is supplied from the D-PHY packet generation unit 305, the physical layer processing unit 222 transmits the extended packet for D-PHY in four lanes.

In the image sensor 211 configured as described above, the extension mode-compatible CSI-2 transmission circuit 221 is configured such that the AS payload generation unit 301 is connected to the A-PHY packet generation unit 303, the C-PHY packet generation unit 304, and the D-PHY packet generation unit 305 via the selector 302. Thereby, the image sensor 211 can generate the AS payload common to the extended packet for A-PHY, the extended packet for C-PHY, and the extended packet for D-PHY by one AS payload generation unit 301. That is, the AS payload generation unit 301 can be shared by the A-PHY packet generation unit 303, the C-PHY packet generation unit 304, and the D-PHY packet generation unit 305, whereby the circuit scale can be reduced. Therefore, downsizing of the image sensor 211 can be implemented.

<Detailed Configuration Example of Application Processor 214>

Figure 26:
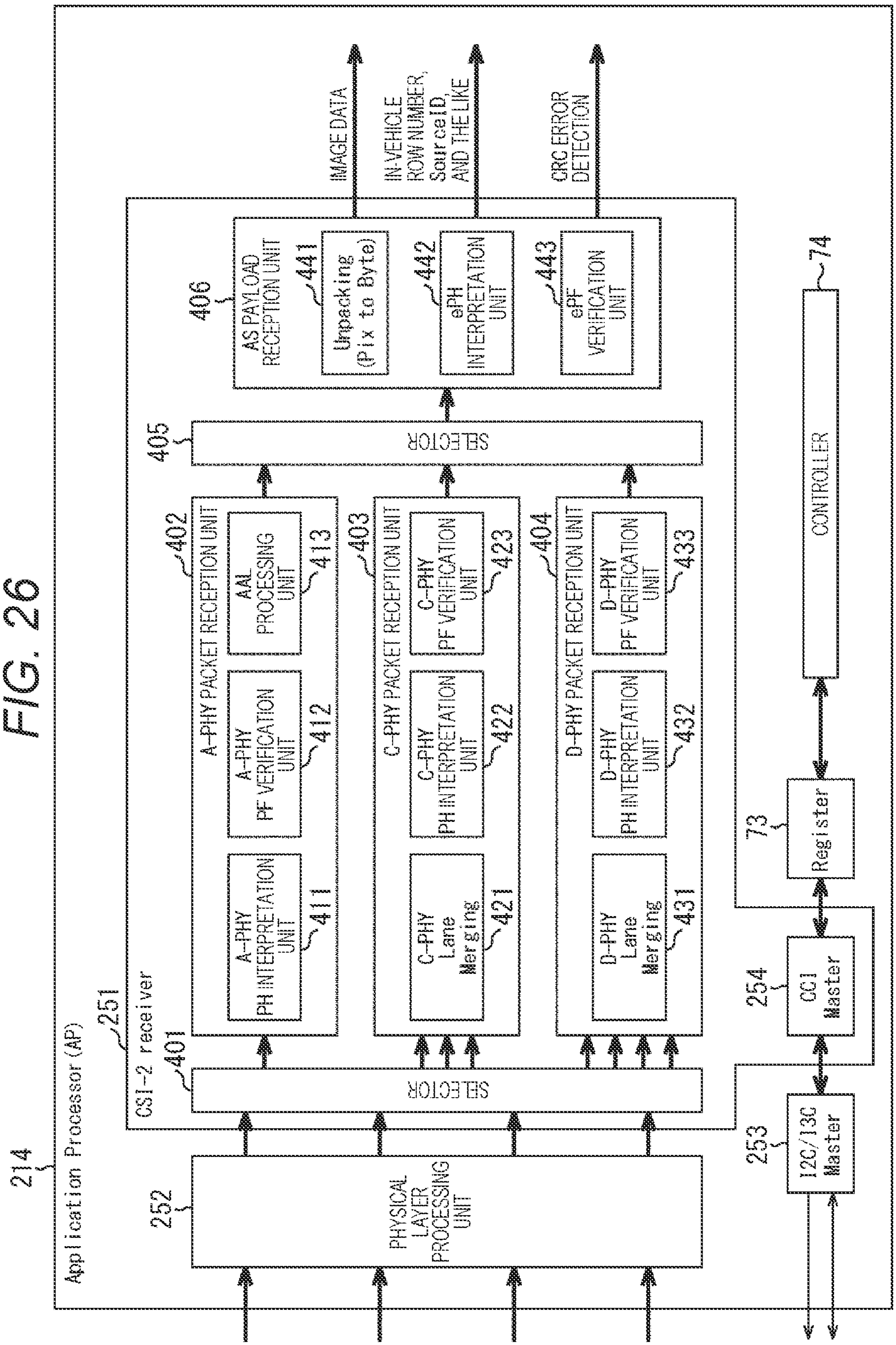
FIG. 26 is a block diagram illustrating a configuration example of an application processor adapted to the rule of packet modification prohibition.

FIG. 26 is a block diagram illustrating a detailed configuration example of the application processor 214. Note that, in the application processor 214 illustrated in FIG. 26, configurations common to those of the application processor 22 in FIG. 10 are denoted by the same reference numerals, and detailed description thereof is omitted.

That is, the application processor 214 includes a register 73 and a controller 74, similarly to the application processor 22 in FIG. 10. Note that the controller 74 may be implemented by software. Furthermore, the I2C/I3C master 253 and the CCI master 254 included in the application processor 214 correspond to the I2C/I3C master 72 and the CCI master 88 in FIG. 10, respectively.

Then, the application processor 214 includes the extension mode-compatible CSI-2 reception circuit 251 and the physical layer processing unit 252, and the physical layer processing unit 252 is compatible with A-PHY, C-PHY, and D-PHY.

The extension mode-compatible CSI-2 reception circuit 251 includes a selector 401, an A-PHY packet reception unit 402, a C-PHY packet reception unit 403, a D-PHY packet reception unit 404, a selector 405, and an AS payload reception unit 406 in addition to the CCI master 254.

The selector 401 selects one of the A-PHY packet reception unit 402, the C-PHY packet reception unit 403, and the D-PHY packet reception unit 404 provided in parallel, as an output destination of the extended packet supplied from the physical layer processing unit 252.

The A-PHY packet reception unit 402 receives the extended packet for A-PHY supplied via the selector 401 and outputs the extended packet to the selector 405. For example, the A-PHY packet reception unit 402 includes an A-PHY packet header interpretation unit 411, an A-PHY packet footer verification unit 412, and an AAL processing unit 413.

For example, the A-PHY packet header interpretation unit 411 interprets content described in the packet header for A-PHY and performs processing necessary for receiving the extended packet for A-PHY, and the A-PHY packet footer verification unit 412 verifies the presence or absence of an error using the packet footer for A-PHY. Then, the AAL processing unit 413 performs processing of combining the adaptation layers divided by the AAL generation unit 321 in FIG. 25.

The C-PHY packet reception unit 403 receives the extended packet for C-PHY supplied via the selector 401 and outputs the extended packet to the selector 405. For example, the C-PHY packet reception unit 403 includes a C-PHY lane merging unit 421, a C-PHY packet header interpretation unit 422, and a C-PHY packet footer verification unit 423.

For example, the C-PHY lane merging unit 421 merges the extended packets for C-PHY distributed to three lanes conforming to the CSI-2 standard and supplied via the physical layer processing unit 252. Then, the C-PHY packet header interpretation unit 422 interprets content described in the packet header for C-PHY and performs processing necessary for receiving the extended packet for C-PHY, and the C-PHY packet footer verification unit 423 verifies the presence or absence of an error using the packet footer for C-PHY.

The D-PHY packet reception unit 404 receives the extended packet for D-PHY supplied via the selector 401 and outputs the extended packet to the selector 405. For example, the D-PHY packet reception unit 404 includes a D-PHY lane merging unit 431, a D-PHY packet header interpretation unit 432, and a D-PHY packet footer verification unit 433.

For example, the D-PHY lane merging unit 431 merges the extended packets for D-PHY distributed to four lanes conforming to the CSI-2 standard and supplied via the physical layer processing unit 252. Then, the D-PHY packet header interpretation unit 432 interprets content described in the packet header for D-PHY and performs processing necessary for receiving the extended packet for D-PHY, and the D-PHY packet footer verification unit 433 verifies the presence or absence of an error using the packet footer for D-PHY.

The selector 405 selects one of the A-PHY packet reception unit 402, the C-PHY packet reception unit 403, and the D-PHY packet reception unit 404 provided in parallel, as an output source of the extended packet to be supplied to the AS payload reception unit 406.

The AS payload reception unit 406 includes an unpacking unit 441, an extended packet header interpretation unit 442, and an extended packet footer verification unit 443 corresponding to the AS payload generation unit 301 in FIG. 25. The unpacking unit 441 unpacks the image data packed by the packing unit 311. The extended packet header interpretation unit 442 interprets the extended packet header generated by the extended packet header generation unit 312, and reads, for example, the packet count PC and the virtual channel VC. The extended packet footer verification unit 443 verifies the presence or absence of an error using the extended packet footer added by the extended packet footer generation unit 313. Then, the AS payload reception unit 406 outputs various types of data stored in the packet data supplied via the selector 405, for example, image data, an in-vehicle row number, a CRC error, SourceID, and the like to a subsequent LSI (not illustrated).

In the application processor 214 configured as described above, the extension mode-compatible CSI-2 reception circuit 251 is configured such that the AS payload reception unit 406 is connected to the A-PHY packet reception unit 402, the C-PHY packet reception unit 403, and the D-PHY packet reception unit 404 via the selector 405. Thereby, the application processor 214 can receive the AS payload common to the extended packet for A-PHY, the extended packet for C-PHY, and the extended packet for D-PHY by one AS payload reception unit 406. That is, the AS payload reception unit 406 can be shared by the A-PHY packet reception unit 402, the C-PHY packet reception unit 403, and the D-PHY packet reception unit 404, whereby the circuit scale can be reduced. Therefore, downsizing of the application processor 214 can be implemented.

<Second Configuration Example Adapted to E2E Protection>

A second configuration example adapted to E2E Protection will be described with reference to FIGS. 27 to 74.

<Configuration Example of A-PHY Direct-Coupled Configuration>

A communication system 501 illustrated in FIG. 27 has a direct-coupled configuration in which an image sensor 511 and an application processor 512 are directly connected by A-PHY (not via a SerDes device as will be described with reference to FIG. 40 to be described below).

The image sensor 511 includes an A-PHY processing unit 521, a CSIA processing unit 522, a CSI2 processing unit 523, a CSI2-FS processing unit 524, a CCI processing unit 525, a CCI-FS processing unit 526, and a register 527.

The A-PHY processing unit 521 has the CCI processing unit 525 implemented as a higher-level layer, and performs MIPI A-PHY connection with the A-PHY processing unit 531 of the application processor 512 and transmits and receives data including an extended packet header ePH and an extended packet footer ePF.

For example, the CCI-FS processing unit 526 compares a Desination ID included in the extended packet header ePH with an ID (source ID) of the image sensor 511, and determines whether or not an access is made to the image sensor 511.

The application processor 512 includes an A-PHY processing unit 531, a CSIA processing unit 532, a CSI2 processing unit 533, a CSI2-FS processing unit 534, a CCI processing unit 535, a CCI-FS processing unit 536, a register 537, and a CCI-FS switch 538.

The A-PHY processing unit 531 has the CCI processing unit 535 implemented as a higher-level layer, and performs MIPI A-PHY connection with the A-PHY processing unit 521 of the image sensor 511 and transmits and receives data including the extended packet header ePH and the extended packet footer ePF.

For example, the CCI-FS processing unit 536 compares a Desination ID included in the extended packet header ePH with an ID (source ID) included in the application processor 512, and determines whether or not an access is made to the application processor 512.

The CCI-FS switch 538 performs switching such that data is transmitted and received via the CCI-FS processing unit 536 in a case where the CCI-FS processing unit 536 is valid, and data is transmitted and received without the CCI-FS processing unit 536 in a case where the CCI-FS processing unit 536 is invalid.

Transfer of a read command and read data in the communication system 501 will be described with reference to FIGS. 28 to 32.

Figure 28:
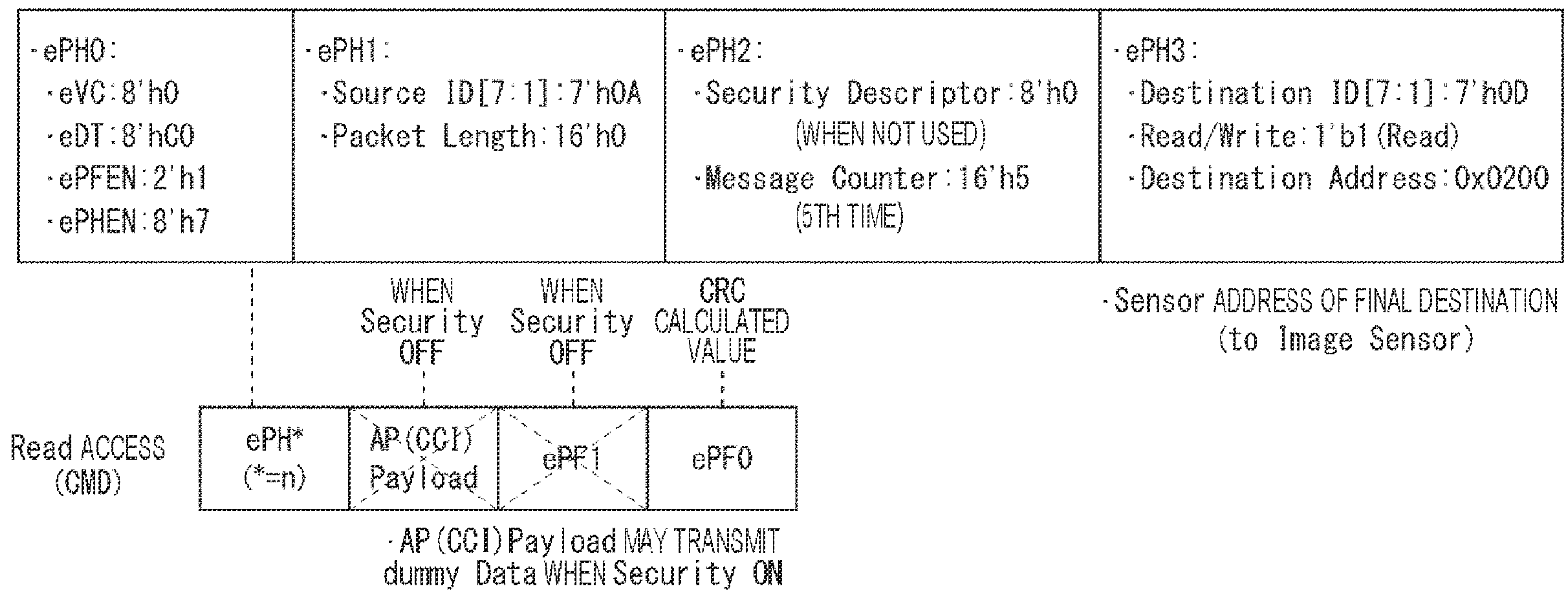
FIG. 28 is a diagram illustrating an example of a packet configuration of a read command generated on an application processor side.

FIG. 28 illustrates an example of a packet configuration of a read command generated in the CCI-FS processing unit 536 of the application processor 512 at the time of read access.

As illustrated in FIG. 28, the read command includes an extended packet header ePH*(*=n), an AP (CCI) payload, an extended packet footer ePF1, and an extended packet footer ePF0.

As illustrated, the extended packet header ePH*(*=n) includes extended packet headers ePH0 to ePH3.

The extended VC, an extended DT, an extended PFEN, and an extended PHEN are stored in the extended packet header ePH0. For example, the extended DT is information indicating the CCI protocol (I2C), and routing processing is performed using the extended DT.

Source ID[7:1] and Packet Length are stored in the extended packet header ePH1. For example, the Source ID is information indicating a transmission source of the CCI protocol (I2C), and response processing is performed on the basis of the Source ID. The Packet Length is information indicating a data length.

Security Descriptor and Message Counter are stored in the extended packet header ePH2. The Security Descriptor indicates whether or not to use security and indicates "8'h0" in a case of not using security. The Message Counter is information indicating a bucket order and indicates a count value obtained by counting messages, and indicates "16'h5" when the message is the fifth message.

Destination ID[7:1], Read/Write, and Destination Address are stored in the extended packet header ePH3. The Destination ID[7:1] indicates a slave address of the CCI processing unit 525 of the image sensor 511, and is "7'h0D" in the illustrated example. For example, the Destination ID is information indicating a transmission destination of the CCI protocol (I2C), and routing is performed on the basis of the Destination ID and the communication path is referred to. The Read/Write indicates read or write of data, and indicates "1'b1" in the case of read. The Destination Address indicates an address of the register 527 of the image sensor 511 as a final destination, and is "0x0200" in the illustrated example.

Various types of data (Data0[7:0]) are stored in the AP (CCI) payload, for example. The AP (CCI) payload may not be transmitted when security is off, and dummy data may be stored and transmitted when the security is on.

The extended packet footer ePF1 is not transmitted when the security is off.

A CRC calculated value is stored in the extended packet footer ePF0.

In the application processor 512, the read command having such a packet structure is generated in the CCI-FS processing unit 536 and supplied to the A-PHY processing unit 531.

Figure 29:
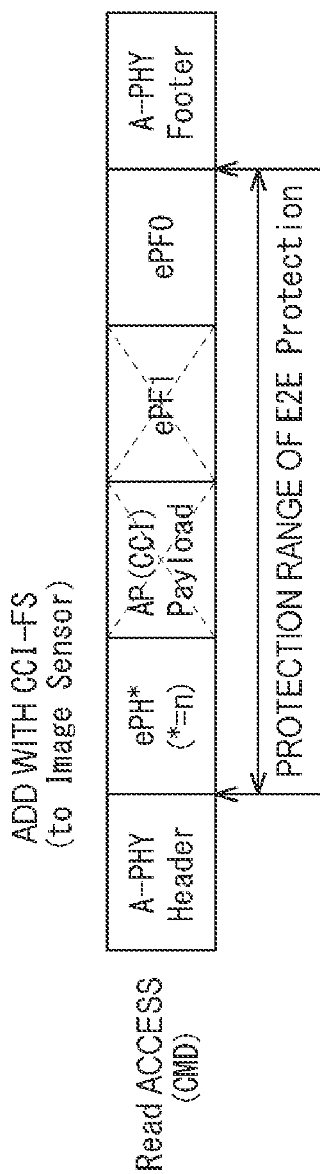
FIG. 29 is a diagram illustrating an example of a packet configuration of a read command to be A-PHY transferred.

FIG. 29 illustrates an example of a packet configuration of a read command output from the A-PHY processing unit 531 of the application processor 512 at the time of read access.

As illustrated in FIG. 29, the A-PHY processing unit 531 adds an A-PHY header and an A-PHY footer, setting the read command supplied from the CCI-FS processing unit 536 as the protection range of E2E Protection.

The read command having such a packet structure is A-PHY transferred by the A-PHY processing unit 531 of the application processor 512. Then, in the image sensor 511, the A-PHY processing unit 521 removes the A-PHY header and the A-PHY footer from the read command. Thereafter, the read command is supplied to the CCI-FS processing unit 526 via the CCI processing unit 525 of the slave address "7'h0D" indicated by the Destination ID.

Figure 30:
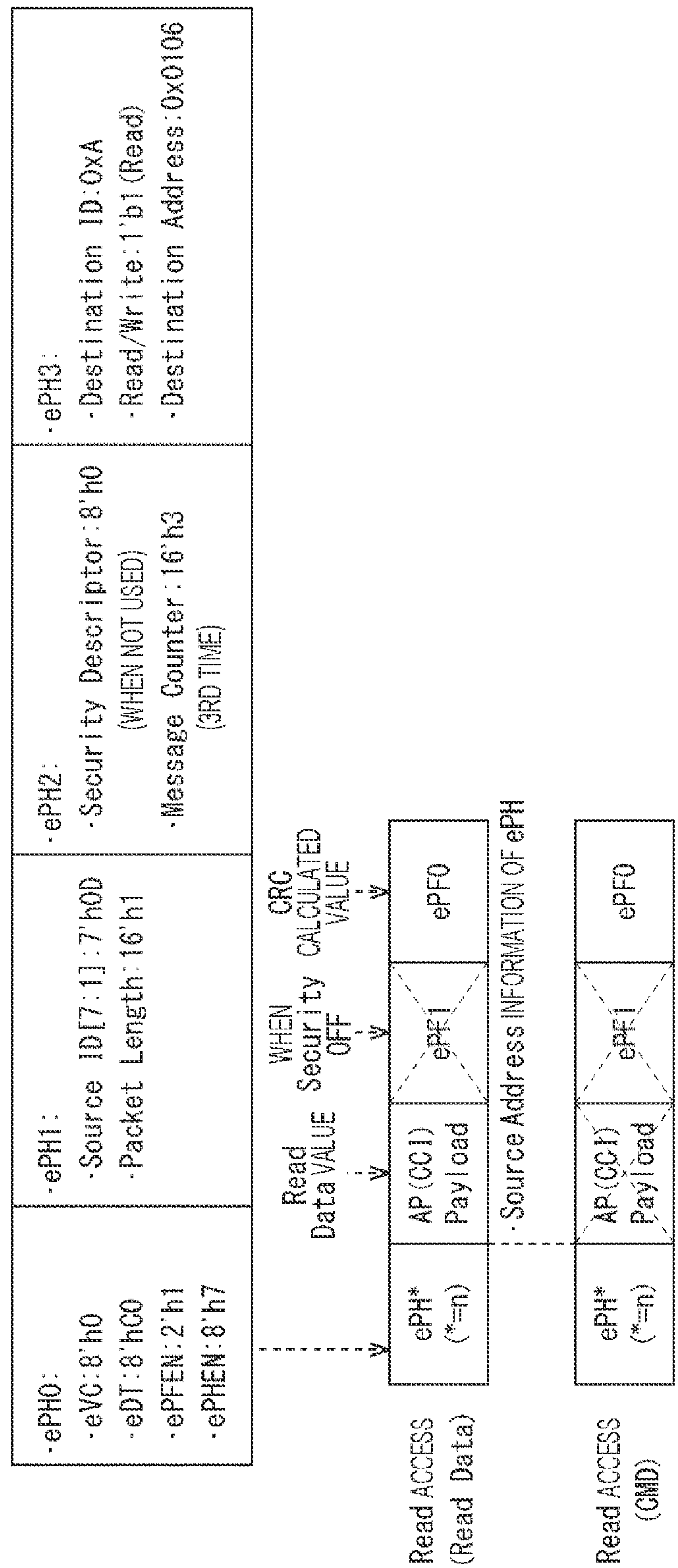
FIG. 30 is a diagram illustrating an example of a packet configuration of a read command and read data on an image sensor side.

FIG. 30 illustrates an example of packet structures of a read command supplied to the CCI-FS processing unit 526 and read data generated in the CCI-FS processing unit 526 at the time of read access.

As illustrated in FIG. 30, the read command keeping the packet structure illustrated in FIG. 28, that is, the read command set as the protection range of E2E Protection in the A-PHY transfer, is supplied to the CCI-FS processing unit 526.

As illustrated, the read data includes the extended packet header ePH*(*=n), the AP (CCI) payload, the extended packet footer ePF1, and the extended packet footer ePF0. Then, a read data value read from an address "0x0200" of the register 527 indicated by source address information (Destination Address) of the extended packet header ePH of the read command is stored in the AP (CCI) payload.

In the image sensor 511, the read data having such a packet structure is generated in the CCI-FS processing unit 526 and supplied to the A-PHY processing unit 521.

Figure 31:
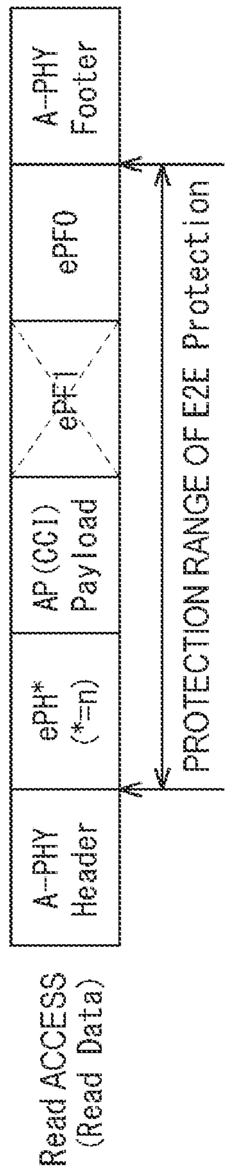
FIG. 31 is a diagram illustrating an example of a packet configuration of read data to be A-PHY transferred.

FIG. 31 illustrates an example of a packet configuration of read data output from the A-PHY processing unit 521 of the image sensor 511 at the time of read access.

As illustrated in FIG. 31, the A-PHY processing unit 521 adds an A-PHY header and an A-PHY footer, setting the read data supplied from the CCI-FS processing unit 526 as the protection range of E2E Protection.

The read data having such a packet structure is A-PHY transferred by the A-PHY processing unit 521 of the image sensor 511. Then, in the application processor 512, the A-PHY processing unit 531 removes the A-PHY header and the A-PHY footer from the read data, and supplies the read data to the CCI-FS processing unit 536.

Figure 32:
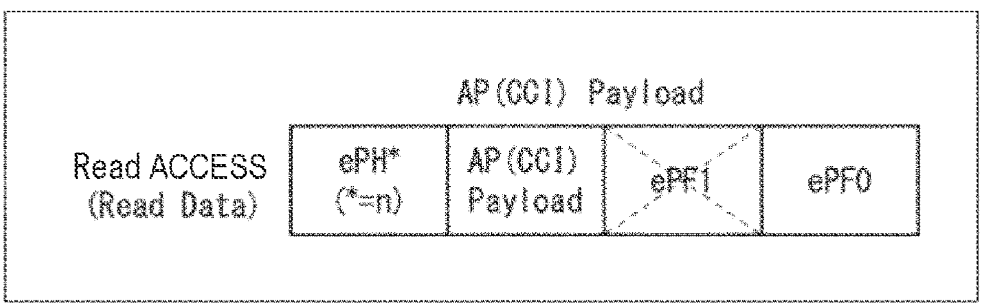
FIG. 32 is a diagram illustrating an example of a packet configuration of read data acquired on the application processor side.

FIG. 32 illustrates an example of a packet structure of read data supplied to the CCI-FS processing unit 536 at the time of read access.

As illustrated in FIG. 32, the read data keeping the packet structure illustrated in FIG. 30, that is, the read data set as the protection range of E2E Protection in the A-PHY transfer, is supplied to the CCI-FS processing unit 536.

Transfer of write data in the communication system 501 will be described with reference to FIGS. 33 to 35. Note that description will be given assuming an access of the CCI-FS processing unit 526 on the image sensor 511 side from an enabled state.

Figure 33:
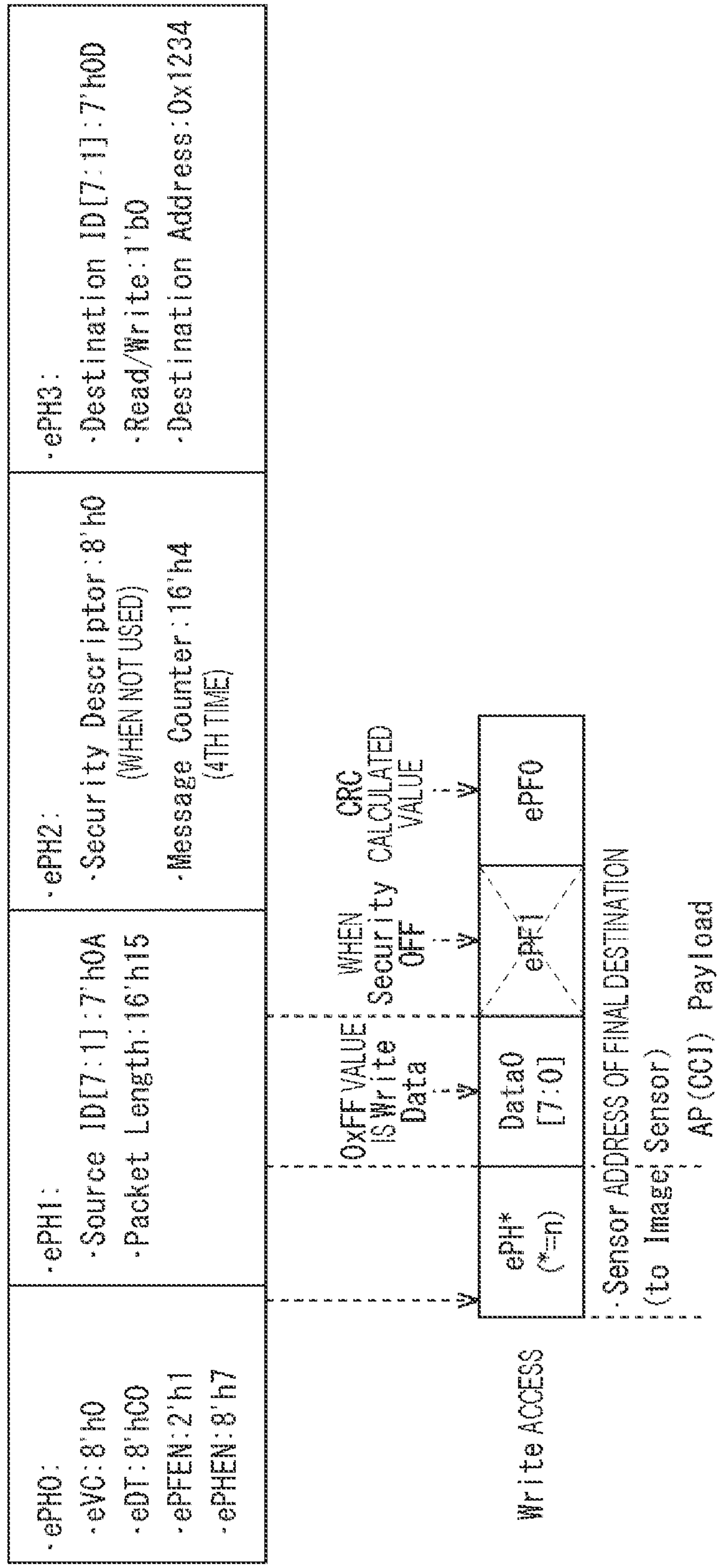
FIG. 33 is a diagram illustrating an example of a packet configuration of write data generated on the application processor side.

FIG. 33 illustrates an example of a packet configuration of write data generated in the CCI-FS processing unit 536 of the application processor 512 at the time of write access.

As illustrated in FIG. 33, the write data includes the extended packet header ePH*(*=n), the AP (CCI) payload (write data), the extended packet footer ePF1, and the extended packet footer ePF0.

As illustrated, the extended packet header ePH*(*=n) includes extended packet headers ePH0 to ePH3.

The extended VC, an extended DT, an extended PFEN, and an extended PHEN are stored in the extended packet header ePH0.

Source ID[7:1] and Packet Length are stored in the extended packet header ePH1.

Security Descriptor and Message Counter are stored in the extended packet header ePH2. The Security Descriptor indicates whether or not to use security and indicates "8'h0" in a case of not using security. The Message Counter indicates a count value obtained by counting messages, and indicates "16'h4" when the message is the fourth message.

Destination ID[7:1], Read/Write, and Destination Address are stored in the extended packet header ePH3. The Destination ID[7:1] indicates a slave address of the CCI processing unit 525 of the image sensor 511, and is "7'h0D" in the illustrated example. The Read/Write indicates read or write of data, and indicates "1'b0" in the case of write. The Destination Address indicates the address of the register 527 of the image sensor 511 as the final destination, and is "0x1234" in the illustrated example.

In the AP (CCI) payload, data (Data0[7:0]) to be written to the image sensor 511 is stored, and a 0xFF value is write data.

The extended packet footer ePF1 is not transmitted when the security is off.

A CRC calculated value is stored in the extended packet footer ePF0.

In the application processor 512, the write data having such a packet structure is generated in the CCI-FS processing unit 536 and supplied to the A-PHY processing unit 531.

Figure 34:
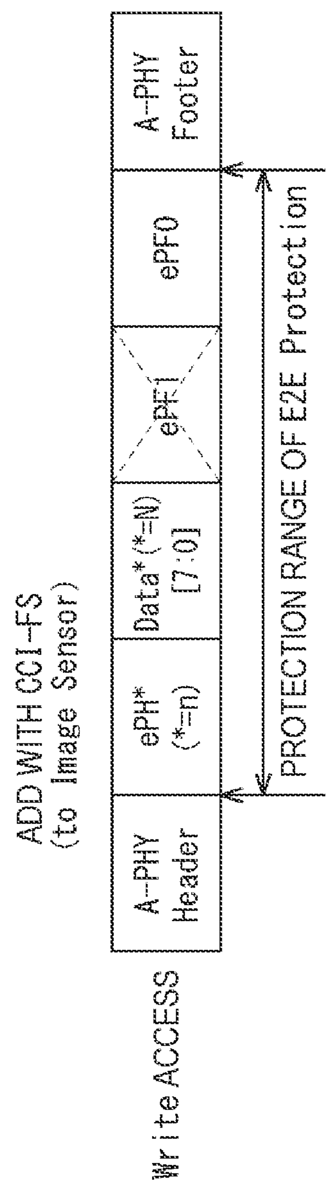
FIG. 34 is a diagram illustrating an example of a packet configuration of write data to be A-PHY transferred.

FIG. 34 illustrates an example of a packet configuration of write data output from the A-PHY processing unit 531 of the application processor 512 at the time of write access.

As illustrated in FIG. 34, the A-PHY processing unit 531 adds an A-PHY header and an A-PHY footer, setting the write data supplied from the CCI-FS processing unit 536 as the protection range of E2E Protection.

The write data having such a packet structure is A-PHY transferred by the A-PHY processing unit 531 of the application processor 512. Then, in the image sensor 511, the A-PHY processing unit 521 removes the A-PHY header and the A-PHY footer from the write data. Thereafter, the write data is supplied to the CCI-FS processing unit 526 via the CCI processing unit 525 of the slave address "7'h0D" indicated by the Destination ID.

Figure 35:
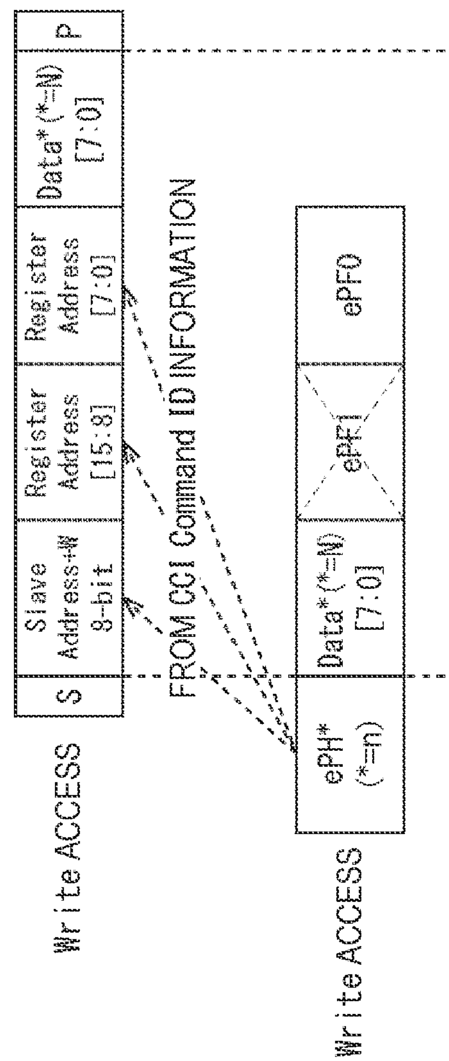
FIG. 35 is a diagram illustrating an example of a packet configuration of write data acquired on the image sensor side.

FIG. 35 illustrates an example of a packet structure of write data supplied to the CCI-FS processing unit 526 at the time of write access.

As illustrated in FIG. 35, the write data keeping the packet structure illustrated in FIG. 33, that is, the write data set as the protection range of E2E Protection in the A-PHY transfer, is supplied to the CCI-FS processing unit 526. Then, the CCI-FS processing unit 526 writes the data stored in the AP (CCI) payload from the address "0x1234" of the register 527 indicated by the CCI command ID information, that is, the source address information (Destination Address) of the extended packet header ePH of the read command.

An overview of the extended packet header ePH and the extended packet footer ePF will be described with reference to FIG. 36.

Figure 36:
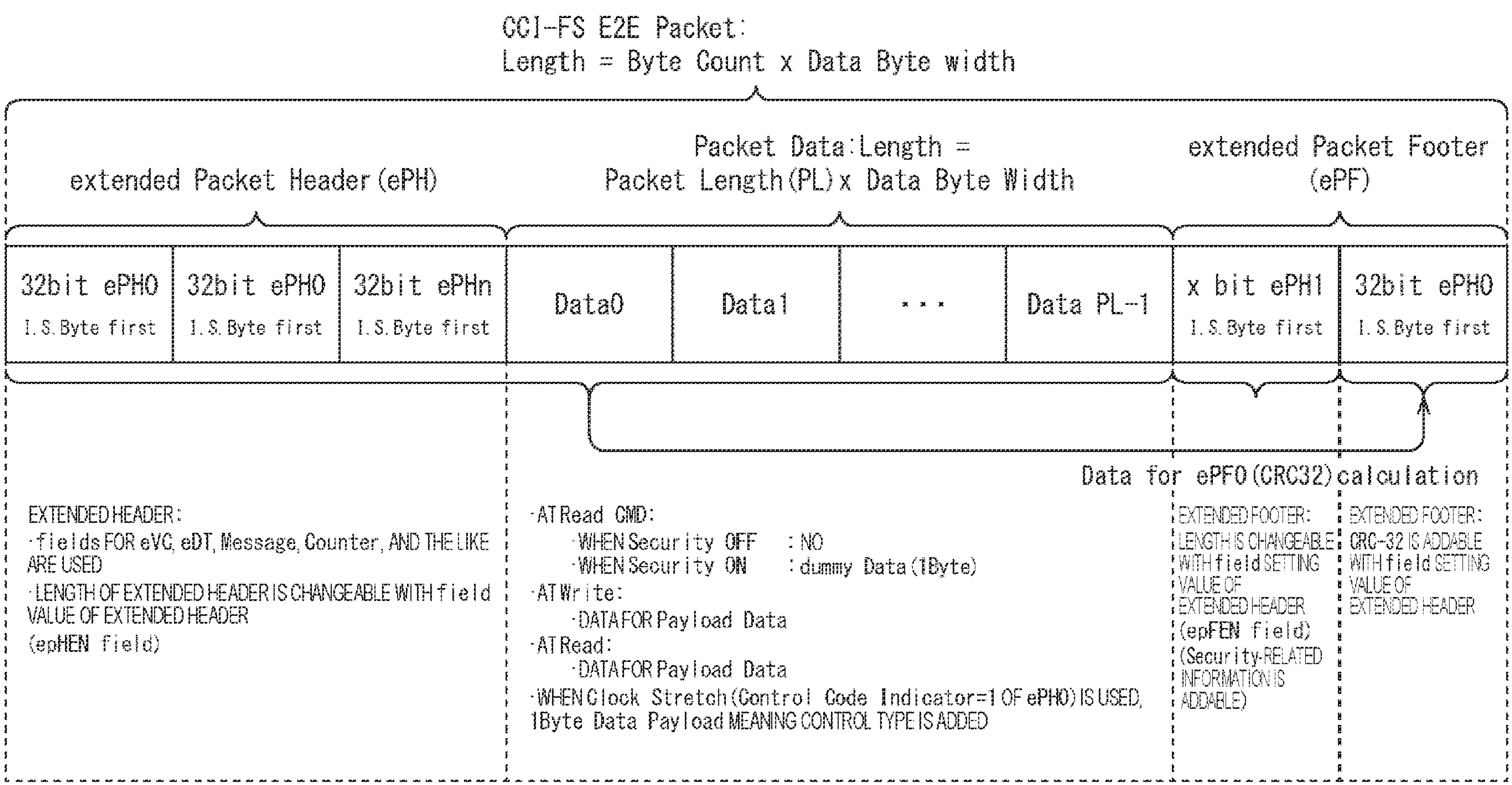
FIG. 36 is a diagram for describing an outline of an extended packet header ePH and an extended packet footer ePF.

As illustrated in FIG. 36, the CCI-FS E2E packet includes the extended packet header ePH, the packet data, and the extended packet footer ePF, and the packet length thereof is Length=Byte Count×Data Byte width.

As the extended packet header ePH, fields of the extended VC, extended DT, and Message Counter are used. The length of the extended packet header ePH can be changed with a field value (epFEN field) of the extended packet header ePH.

The packet data includes, for example, PL pieces of data (Data 0 to Data PL-1), and the length thereof is Length=Packet Length (PL)×Data Byte Width. In the case of the read command, data is not stored in the packet data when the security is off, and 1-byte dummy data is stored in the packet data when the security is on. In the case of write access, write data corresponding to payload data is stored in the packet data. In the case of read access, read data corresponding to the payload data is stored in the packet data. When Clock Stretch (Control Code Indicator=1 of ePH0) is used, a 1-byte data payload indicating a type of control is attached to the packet data.

The length of the extended packet footer ePF1 can be changed with a field setting value (epFEN field) of the extended packet header ePH. Furthermore, security-related information can be added.

To the extended packet footer ePF0, CRC-32 calculated from the packet data can be added with the field setting value of the extended packet header ePH.

<Processing Example of Communication Processing>

Communication processing using CCI-FS performed in the communication system 501 illustrated in FIG. 27 will be described with reference to the flowcharts of FIGS. 37 to 39.

Figure 37:
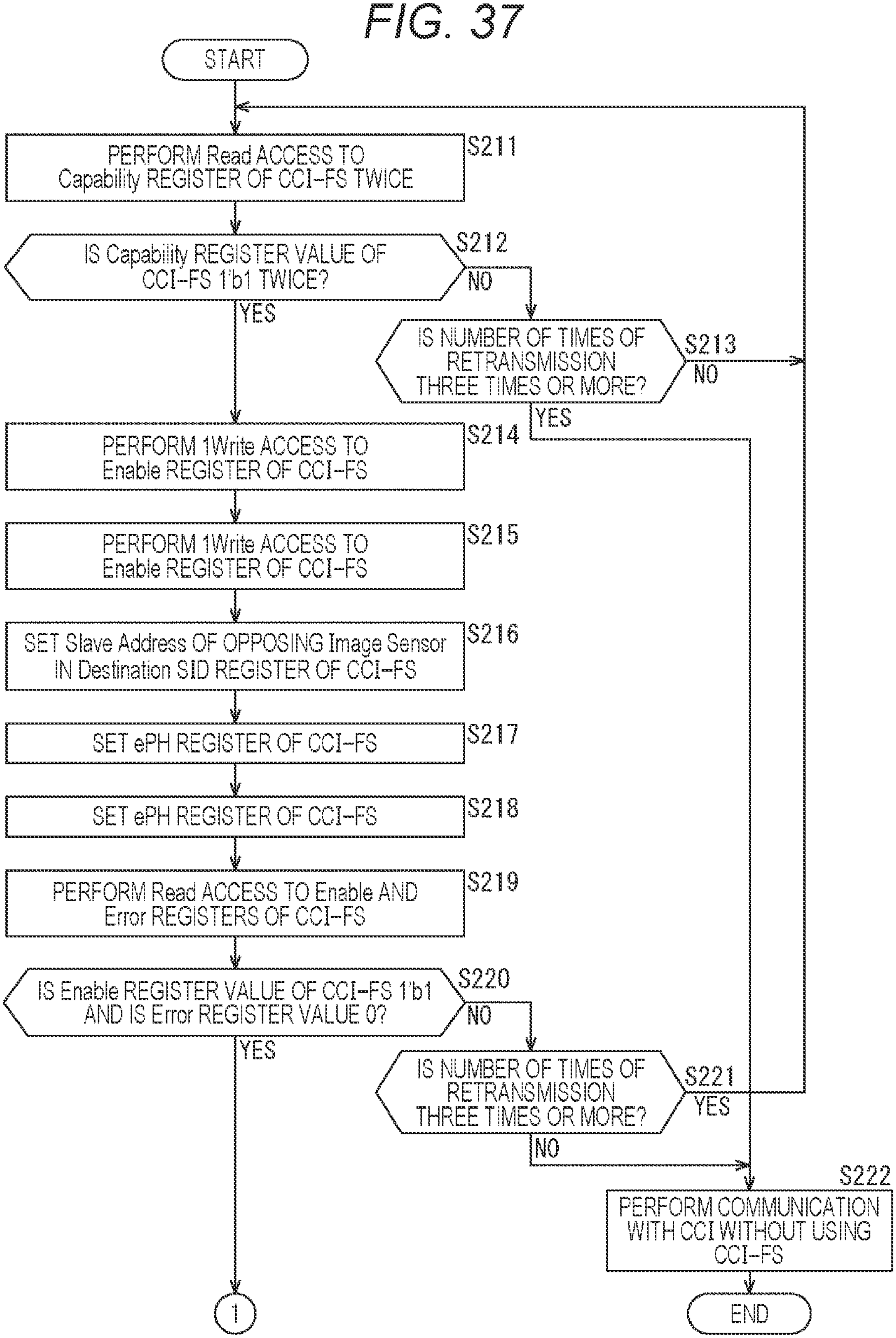
FIG. 37 is a flowchart for describing initial setting and check operation of communication processing using CCI-FS.

As illustrated in FIG. 37, in steps S211 to S222, initial setting and check operation are performed.

In step S211, the read access is performed twice from the application processor 512 to a Capability register of the CCI-FS processing unit 526 of the image sensor 511. Note that the number of times of performing the read access is not limited to twice and can be arbitrarily set in terms of functional safety, for example, and may be once or three or more times.

In step S212, in the application processor 512, the CSI2-FS processing unit 524 determines whether or not a Capability register value of the CCI-FS processing unit 526 is 1'b1 twice for a result of the read access in step S211. In step S212, in a case where it is determined that the Capability register value of the CCI-FS processing unit 526 is not 1'b1 twice, the processing proceeds to step S213.

In step S213, in the application processor 512, the CSI2-FS processing unit 524 determines whether or not the number of times of retransmission is three times or more. Note that the number of times of retransmission is not limited to three times and can be set to any number of times, and the same similarly applies to the number of times of retransmission to be described below. In step S213, in a case where it is determined that the number of times of retransmission is not three times or more (is once or twice), the processing returns to step S211, and similar processing is repeatedly performed thereafter.

Meanwhile, in step S212, in a case where it is determined that the Capability register value of the CCI-FS processing unit 526 is 1'b1 twice, the processing proceeds to 214.

In step S214, one write access is performed from the application processor 512 to an Enable register of the CCI-FS processing unit 526 of the image sensor 511.

In step S215, in the image sensor 511, the CCI-FS processing unit 526 performs one write access to the Enable register of the CCI-FS processing unit 536 of the application processor 512.

In step S216, the slave address of the opposing image sensor 511 is set in a Destination SID register of the CCI-FS processing unit 536 of the application processor 512.

In step S217, an ePH register of the CCI-FS processing unit 536 of the application processor 512 is set.

In step S218, the ePH register of the CCI-FS processing unit 526 is set from the application processor 512 to the image sensor 511.

In step S219, the read access to the Enable register and an Error register of the CCI-FS processing unit 526 is performed from the application processor 512 to the image sensor 511.

In step S220, in the application processor 512, the CCI-FS processing unit 536 determines whether or not an Enable register value of the CCI-FS processing unit 526 is 1'b1 and an Error register value is 0 for the result of the read access in step S219.

In step S220, in a case where it is determined that the Enable register value of the CCI-FS processing unit 526 is not 1'b1 or the Error register value is not 0, the processing proceeds to step S221.

In step S221, in the application processor 512, the CSI2-FS processing unit 524 determines whether or not the number of times of retransmission is three times or more. In step S221, in a case where it is determined that the number of times of retransmission is three times or more, the processing returns to step S211, and similar processing is repeatedly performed thereafter.

Meanwhile, in the case where it is determined that the number of times of retransmission is three times or more in step S213, or in a case where it is determined that the number of times of retransmission is not three times or more (once or twice) in step S221, the processing proceeds to step S222.

In step S222, communication using the CCI is performed without using the CCI-FS, and then the communication processing is terminated.

Meanwhile, in step S220, in a case where it is determined that the Enable register value of the CCI-FS processing unit 526 is 1'b1 and the Error register value is 0, the processing proceeds to step S223.

Figure 38:
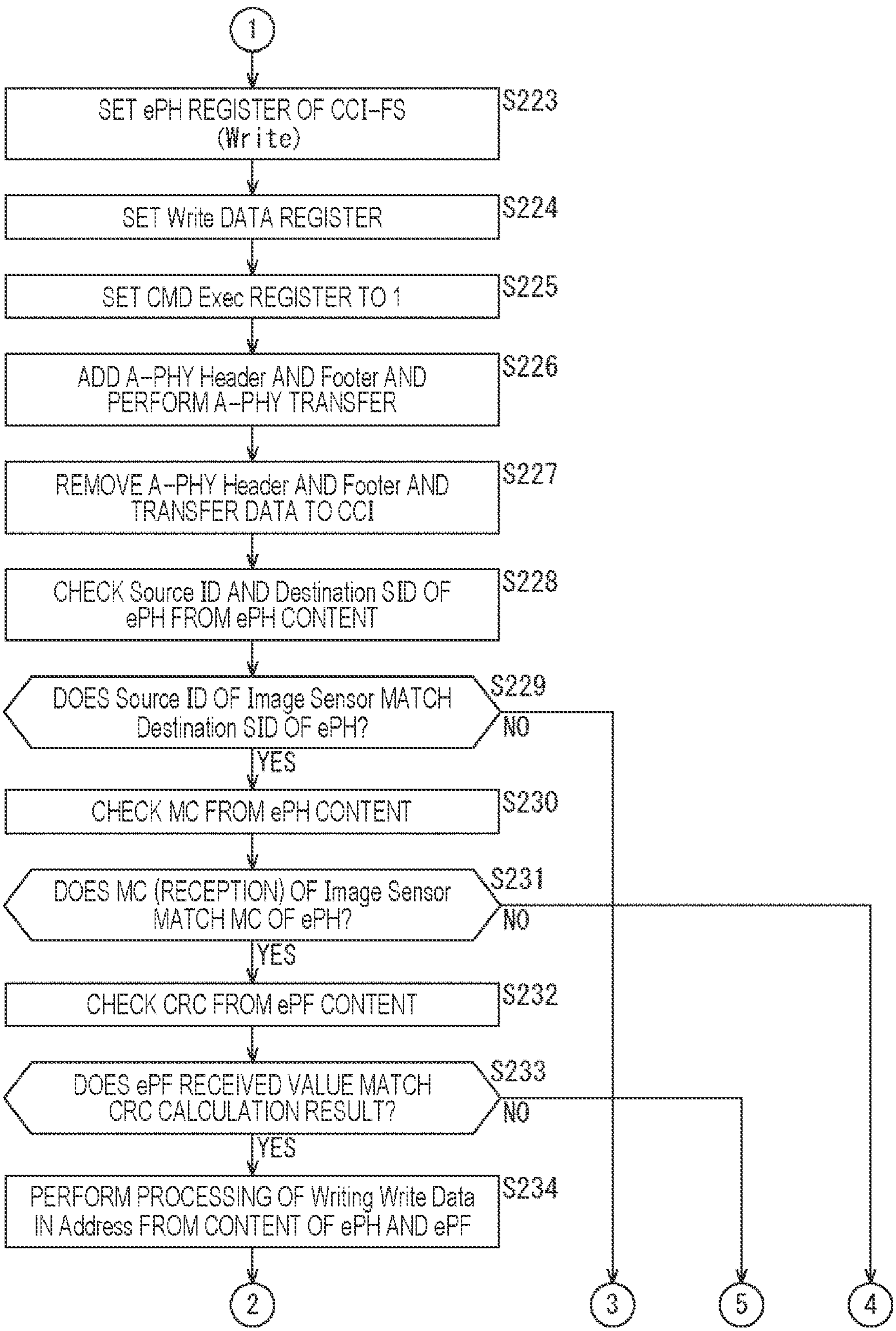
FIG. 38 is a flowchart for describing a write operation using CCI-FS.

As illustrated in FIG. 38, in steps S223 to S234, the write operation using the CCI-FS is performed.

In step S223, the CCI-FS processing unit 536 of the application processor 512 sets the ePH register so as to perform the write operation.

In step S224, the CCI-FS processing unit 536 of the application processor 512 sets a write data register.

In step S225, the CCI-FS processing unit 536 of the application processor 512 sets a command execution register to 1.

In step S226, in the application processor 512, the A-PHY processing unit 531 adds the A-PHY header and the A-PHY footer, setting the write data generated by the CCI-FS processing unit 536 as the protection range of E2E Protection, and performs the A-PHY transfer, as illustrated in FIG. 34 described above.

In step S227, in the image sensor 511, the A-PHY processing unit 521 removes the A-PHY header and the A-PHY footer from the write data, and supplies the protection range of E2E Protection to the CCI-FS processing unit 526.

In step S228, in the image sensor 511, the CCI-FS processing unit 526 checks the Source ID of the image sensor 511 and the Destination SID of the extended packet header ePH from the content of the extended packet header ePH.

In step S229, in the image sensor 511, the CCI-FS processing unit 526 determines whether or not the Source ID of the image sensor 511 checked in step S228 matches the Destination SID of the extended packet header ePH.

In step S229, in a case where it is determined that the Source ID of the image sensor 511 matches the Destination SID of the extended packet header ePH, the processing proceeds to step S230.

In step S230, in the image sensor 511, the CCI-FS processing unit 526 checks the Message Counter from the content of the extended packet header ePH.

In step S231, in the image sensor 511, the CCI-FS processing unit 526 determines whether or not the Message Counter (reception) of the image sensor 511 checked in step S230 matches the Message Counter of the extended packet header ePH.

In step S231, in a case where it is determined that the Message Counter (reception) of the image sensor 511 matches the Message Counter of the extended packet header ePH match, the processing proceeds to step S232.

In step S232, in the image sensor 511, the CCI-FS processing unit 526 checks the CRC from the content of the extended packet footer ePF.

In step S233, in the image sensor 511, the CCI-FS processing unit 526 determines whether or not a received value (ePF0) of the extended packet footer ePF checked in step S232 matches a CRC calculation result calculated in the CCI-FS processing unit 526.

In step S233, in a case where it is determined that the received value (ePF0) of the extended packet footer ePF matches the CRC calculation result, the processing proceeds to step S234.

In step S234, in the image sensor 511, the CCI-FS processing unit 526 performs write processing of writing the write data to the address of the register 527 from the content of the extended packet header ePH and the extended packet footer ePF. Thereafter, the processing proceeds to step S235.

Figure 39:
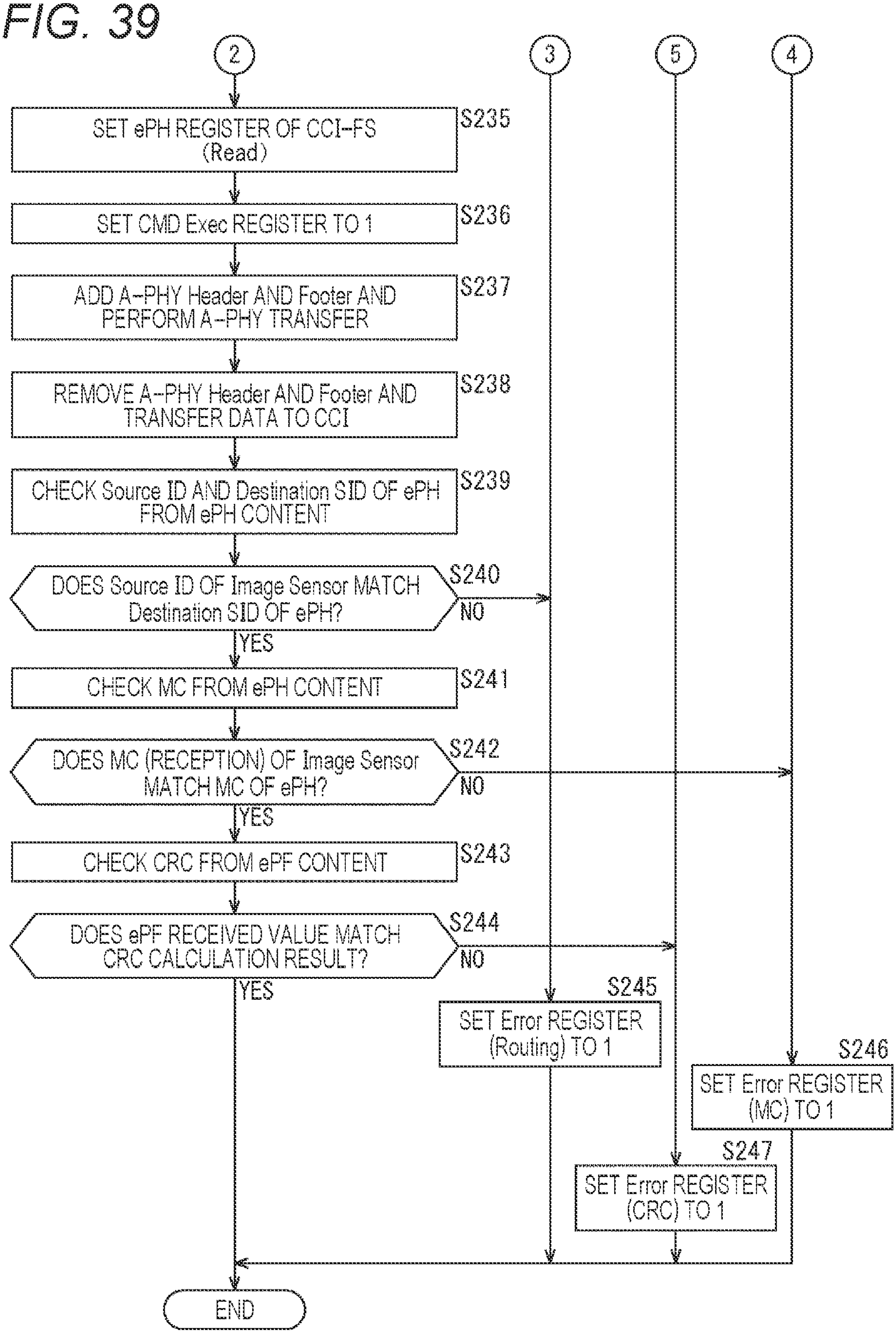
FIG. 39 is a flowchart for describing a read operation using CCI-FS.

As illustrated in FIG. 39, in steps S235 to S247, the read operation using the CCI-FS is performed.

In step S235, in the application processor 512, the CCI-FS processing unit 536 sets the ePH register so that the read operation is performed.

In step S236, in the application processor 512, the CCI-FS processing unit 536 sets the command execution register to 1.

In step S237, in the application processor 512, the A-PHY processing unit 531 adds the A-PHY header and the A-PHY footer, setting the write data generated by the CCI-FS processing unit 536 as the protection range of E2E Protection, and performs the A-PHY transfer, as illustrated in FIG. 29 described above.

In step S238, in the image sensor 511, the A-PHY processing unit 521 removes the A-PHY header and the A-PHY footer from the write data, and supplies the protection range of E2E Protection to the CCI-FS processing unit 526.

In step S239, in the image sensor 511, the CCI-FS processing unit 526 checks the Source ID of the image sensor 511 and the Destination SID of the extended packet header ePH from the content of the extended packet header ePH.

In step S240, in the image sensor 511, the CCI-FS processing unit 526 determines whether or not the Source ID of the image sensor 511 checked in step S239 matches the Destination SID of the extended packet header ePH.

In step S240, in a case where it is determined that the Source ID of the image sensor 511 matches the Destination SID of the extended packet header ePH, the processing proceeds to step S241.

In step S241, in the image sensor 511, the CCI-FS processing unit 526 checks the Message Counter from the content of the extended packet header ePH.

In step S242, in the image sensor 511, the CCI-FS processing unit 526 determines whether or not the Message Counter (reception) of the image sensor 511 checked in step S241 matches the Message Counter of the extended packet header ePH.

In step S242, in a case where it is determined that the Message Counter (reception) of the image sensor 511 matches the Message Counter of the extended packet header ePH match, the processing proceeds to step S243.

In step S243, in the image sensor 511, the CCI-FS processing unit 526 checks the CRC from the content of the extended packet footer ePF.

In step S244, in the image sensor 511, the CCI-FS processing unit 526 determines whether or not a received value (ePF0) of the extended packet footer ePF checked in step S243 matches a CRC calculation result calculated in the CCI-FS processing unit 526.

In step S244, in a case where it is determined that the received value (ePF0) of the extended packet footer ePF matches the CRC calculation result, the processing is terminated.

Meanwhile, in step S229 of FIG. 38 or in step S240 of FIG. 39, in a case where it is determined that the Source ID of the image sensor 511 does not match the Destination SID of the extended packet header ePH, the processing proceeds to step S245.

In step S245, the error register (Routing) on the image sensor 511 side is set to 1, and thereafter the processing is terminated.

Meanwhile, in step S231 of FIG. 38 or in step S242 of FIG. 39, in a case where it is determined that the Message Counter (reception) of the image sensor 511 does not match the Message Counter of the extended packet header ePH match, the processing proceeds to step S246.

In step S246, the error register (MC) on the image sensor 511 side is set to 1, and thereafter the processing is terminated.

Meanwhile, in step S233 of FIG. 38 or in step S244 of FIG. 39, in a case where it is determined that the received value (ePF0) of the extended packet footer ePF does not match the CRC calculation result, the processing proceeds to step S247.

In step S247, the error register (CRC) on the image sensor 511 side is set to 1, and thereafter the processing is terminated.

<Configuration Example of SerDes Connection Configuration>

Figure 40:
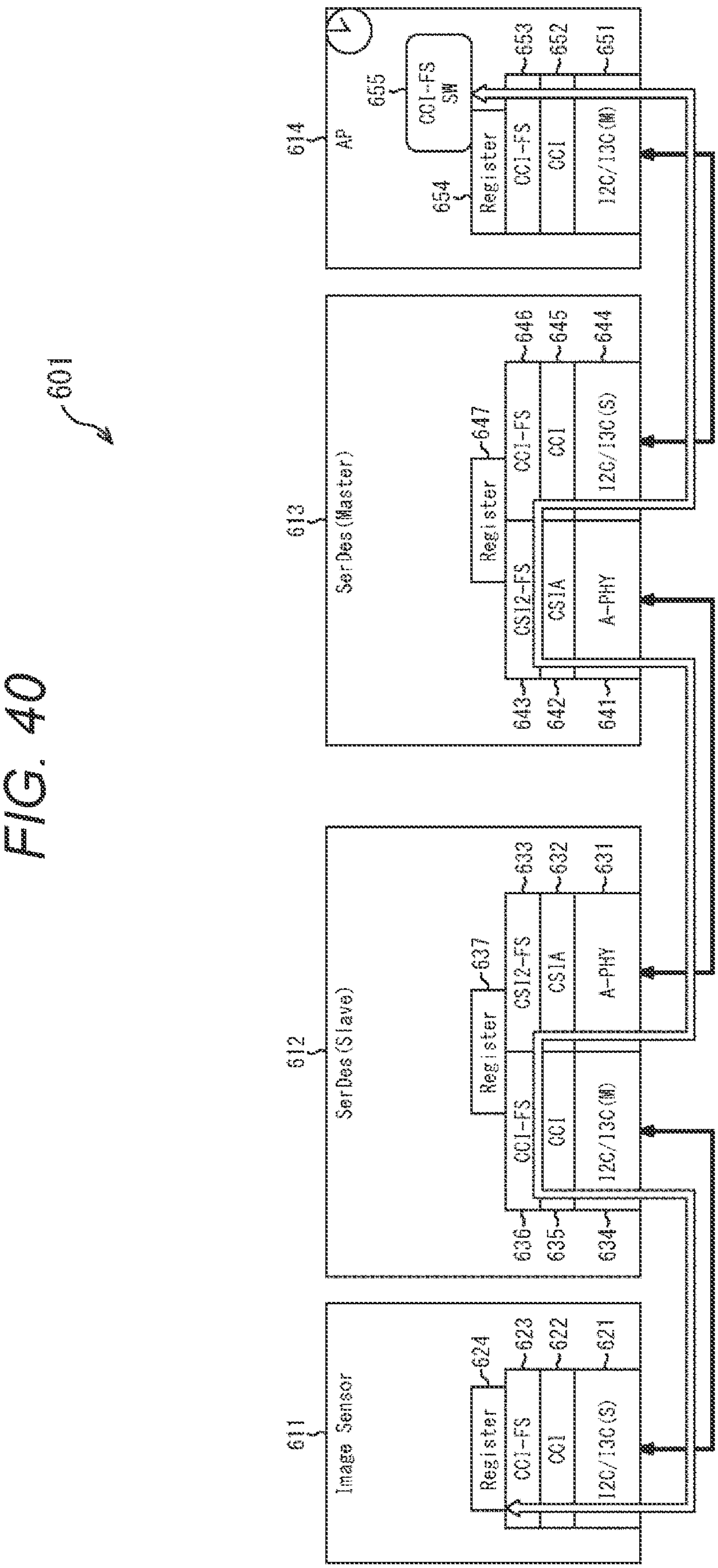
FIG. 40 is a block diagram illustrating a configuration example of a communication system in which an image sensor and an application processor have a SerDes connection configuration.

A communication system 601 illustrated in FIG. 40 has a SerDes connection configuration in which an image sensor 611 and an application processor 614 are connected via a SerDes device 612 on the slave side and a SerDes device 613 on the master side.

The image sensor 611 includes an I2C/I3C slave 621, a CCI processing unit 622, a CSI2-FS processing unit 623, and a register 624.

The slave-side SerDes device 612 includes an A-PHY processing unit 631, a CSIA processing unit 632, a CSI2-FS processing unit 633, an I2C/I3C master 634, a CCI processing unit 635, a CCI-FS processing unit 636, and a register 637.

The master-side SerDes device 613 includes an A-PHY processing unit 641, a CSIA processing unit 642, a CSI2-FS processing unit 643, an I2C/I3C slave 644, a CCI processing unit 645, a CCI-FS processing unit 646, and a register 647.

The application processor 614 includes an I2C/I3C master 651, a CCI processing unit 652, a CCI-FS processing unit 653, a register 654, and a CCI-FS switch 655.

Note that, in the SerDes connection configuration as illustrated in FIG. 40, in a case where the CCI configuration or the CCI-FS configuration is implemented as a higher-level protocol, another SerDes standard may be used. For example, by implementing the configurations of the extended packet header ePH, the extended packet footer ePF1, and the extended packet footer ePF0 as illustrated in FIG. 41 in a payload from Application Layer or a higher-level layer corresponding to a layer below the Application Layer, various SerDes-related standards such as PCIE, USB, DisplayPort, HDMI (registered trademark), LVDS, and FPD-LINK are applicable.

Transfer of a read command and read data in the communication system 601 will be described with reference to FIGS. 41 to 49.

Figure 41:
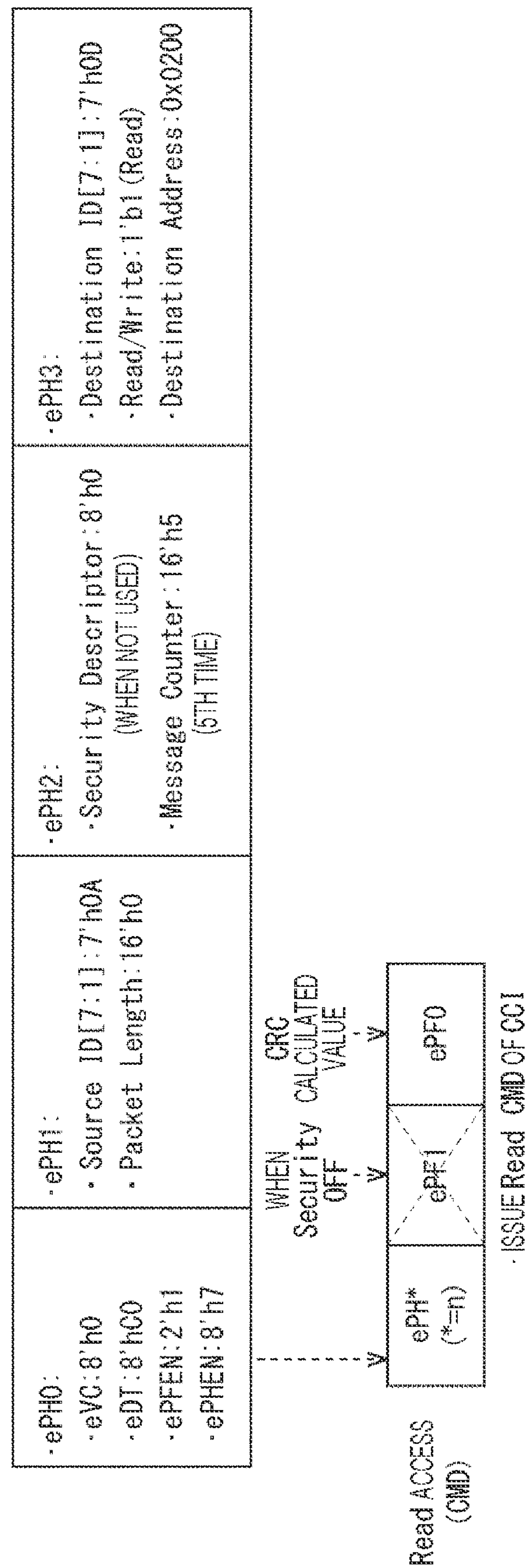
FIG. 41 is a diagram illustrating an example of a packet configuration of a read command generated on the application processor side.

FIG. 41 illustrates an example of a packet configuration of a read command generated in the CCI-FS processing unit 653 of the application processor 614 at the time of read access.

As illustrated in FIG. 41, the read command includes the extended packet header ePH*(*=n), the extended packet footer ePF1, and the extended packet footer ePF0. Note that details thereof are similar to those of the read command described with reference to FIG. 28.

In the application processor 614, the read command having such a packet structure is generated in the CCI-FS processing unit 653 and supplied to the I2C/I3C master 651.

Figure 42:
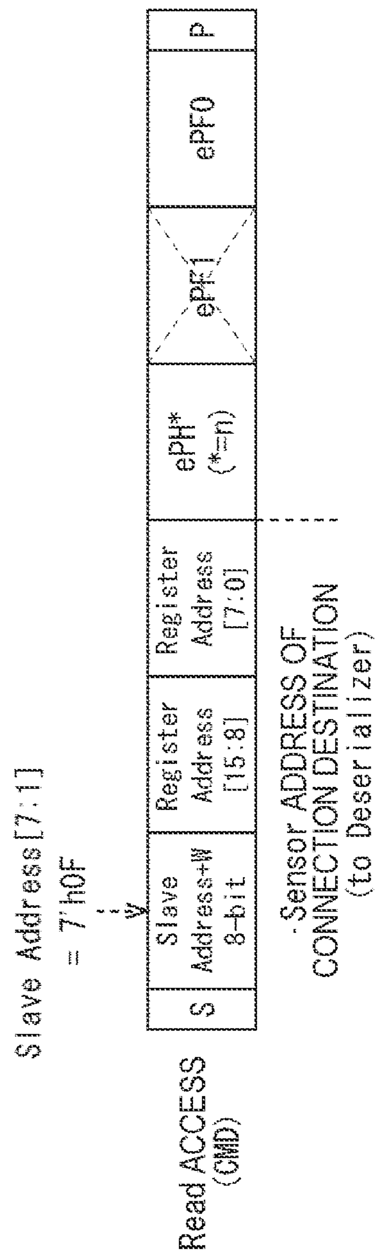
FIG. 42 is a diagram illustrating an example of a packet configuration of a read command output by I2C/I3C.

FIG. 42 illustrates an example of a packet configuration of the read command output from the I2C/I3C master 651 of the application processor 614 at the time of read access.

As illustrated in FIG. 42, the I2C/I3C master 651 transmits a sensor address of a connection destination, that is, an address (Slave Address+W 8-bit) of the CCI processing unit 645 of the master-side SerDes device 613 in the configuration illustrated in FIG. 40, following start condition S. In the example illustrated in FIG. 42, the address of the CCI processing unit 645 is Slave Address[7:1]=7'h0F. Following the address, register addresses (Register Address [15:8] and Register Address [7:0] of the register 647 of the master-side SerDes device 613 are transmitted. The I2C/I3C master 651 finally transmits stop condition P following the extended packet header ePH*(*=n), the extended packet footer ePF1, and the extended packet footer ePF0.

The read command having such a packet structure is transferred by I2C/I3C from the I2C/I3C master 651 of the application processor 614. In the master-side SerDes device 613, the I2C/I3C slave 644 acquires the read command (the extended packet header ePH*(*=n), the extended packet footer ePF1, and the extended packet footer ePF0). The read command is supplied to the CCI processing unit 645 of Slave Address[7:1]=7'h0F, and then supplied to the A-PHY processing unit 641 via the CCI-FS processing unit 646, the CSI2-FS processing unit 643, and the CSIA processing unit 642.

Figure 43:
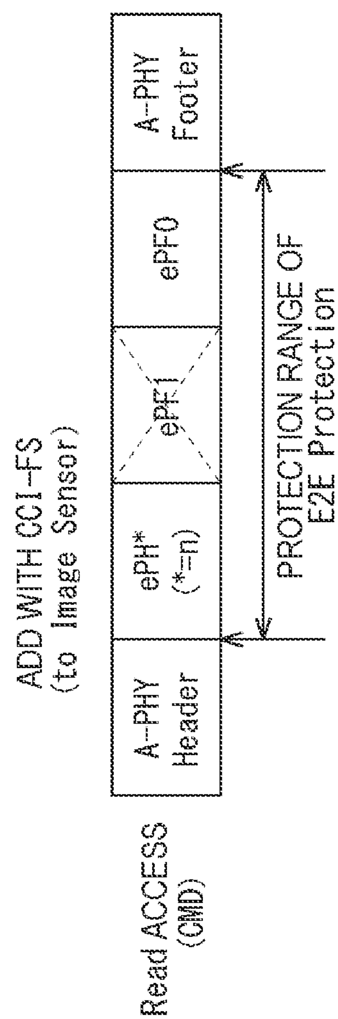
FIG. 43 is a diagram illustrating an example of a packet configuration of a read command to be A-PHY transferred.

FIG. 43 illustrates an example of a packet configuration of a read command output from the A-PHY processing unit 641 of the master-side SerDes device 613 at the time of read access.

As illustrated in FIG. 43, the A-PHY processing unit 641 adds an A-PHY header and an A-PHY footer, setting the read command acquired by the I2C/I3C slave 644 as the protection range of E2E Protection. Note that the address of the CCI processing unit 635 of the master-side SerDes device 613, for example, Slave Address[7:1]=7'h0E is added to the extended packet header ePH*(*=n) in the CSI2-FS processing unit 643.

The read command having such a packet structure is A-PHY transferred by the A-PHY processing unit 641 of the master-side SerDes device 613. In the slave-side SerDes device 612, the A-PHY processing unit 631 removes the A-PHY header and the A-PHY footer from the read command. The read command is supplied to the CCI processing unit 635 of the slave address "7'h0E" indicated by the Destination ID via the CSIA processing unit 632, the CSI2-FS processing unit 633, and the CCI-FS processing unit 636, and then supplied to the I2C/I3C master 634.

Figure 44:
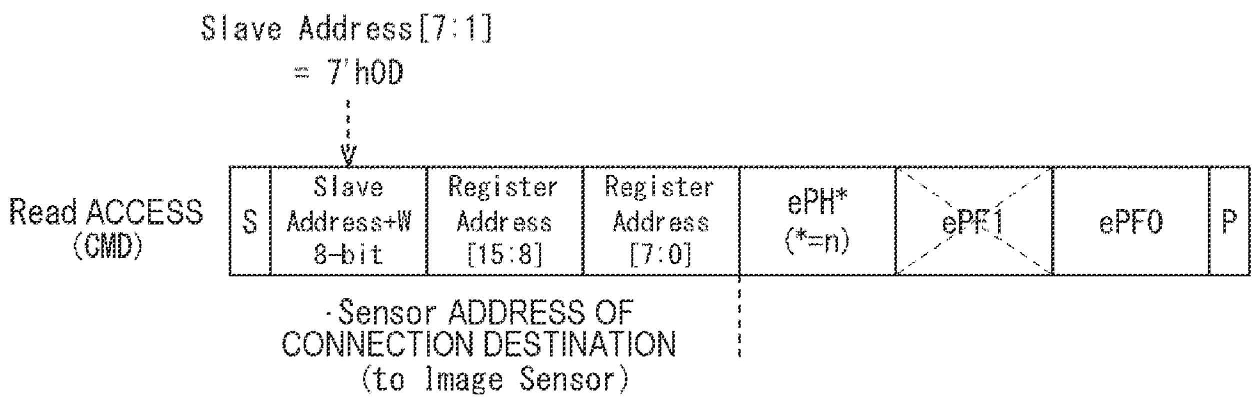
FIG. 44 is a diagram illustrating an example of a packet configuration of read data generated by a slave-side SerDes device.

FIG. 44 illustrates an example of a packet configuration of the read command output from the I2C/I3C master 634 at the time of read access.

As illustrated in FIG. 44, the I2C/I3C master 634 transmits the sensor address of the connection destination, that is, the address (Slave Address+W 8-bit) of the CCI processing unit 622 of the image sensor 611 in the configuration illustrated in FIG. 40, following the start condition S. In the example illustrated in FIG. 44, the address of the CCI processing unit 622 is Slave Address[7:1]=7'h0D. Following the address, the register addresses (Register Address [15:8] and Register Address [7:0] of the register 624 of the image sensor 611 are transmitted. The I2C/I3C master 634 finally transmits the stop condition P following the extended packet header ePH*(*=n), the extended packet footer ePF1, and the extended packet footer ePF0.

The read command having such a packet structure is transferred by I2C/I3C from the I2C/I3C master 634 of the slave-side SerDes device 612. Then, in the image sensor 611, the I2C/I3C slave 621 acquires the read command (the extended packet header ePH*(*=n), the extended packet footer ePF1, and the extended packet footer ePF0). The read command is supplied to the CSI2-FS processing unit 623 via the CCI processing unit 622 of the Slave Address[7:1]=7'h0D.

Figure 45:
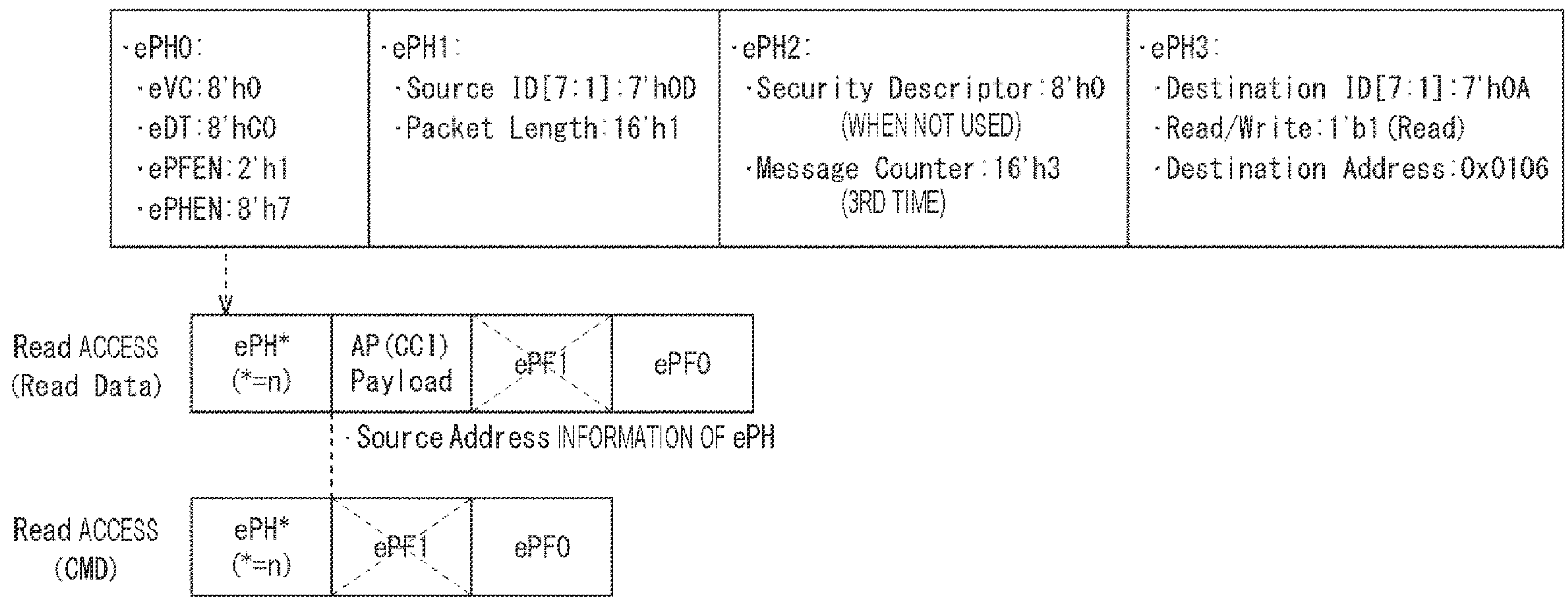
FIG. 45 is a diagram illustrating an example of a packet configuration of a read command and read data on the image sensor side.

FIG. 45 illustrates an example of packet structures of a read command supplied to the CSI2-FS processing unit 623 and read data generated in the CSI2-FS processing unit 623 at the time of read access.

As illustrated in FIG. 45, the read command keeping the packet structure illustrated in FIG. 41, that is, the read command set as the protection range of E2E Protection in the A-PHY transfer, is supplied to the CSI2-FS processing unit 623.

As illustrated, the read data includes the extended packet header ePH*(*=n), the AP (CCI) payload, the extended packet footer ePF1, and the extended packet footer ePF0. Then, the read data value read from the address "0x0200" of the register 624 indicated by the source address information (Destination Address) of the extended packet header ePH of the read command is stored in the AP (CCI) payload.

In the image sensor 611, the read data having such a packet structure is generated in the CCI-FS processing unit 623 and supplied to the I2C/I3C slave 621 via the CCI processing unit 622.

Figure 46:
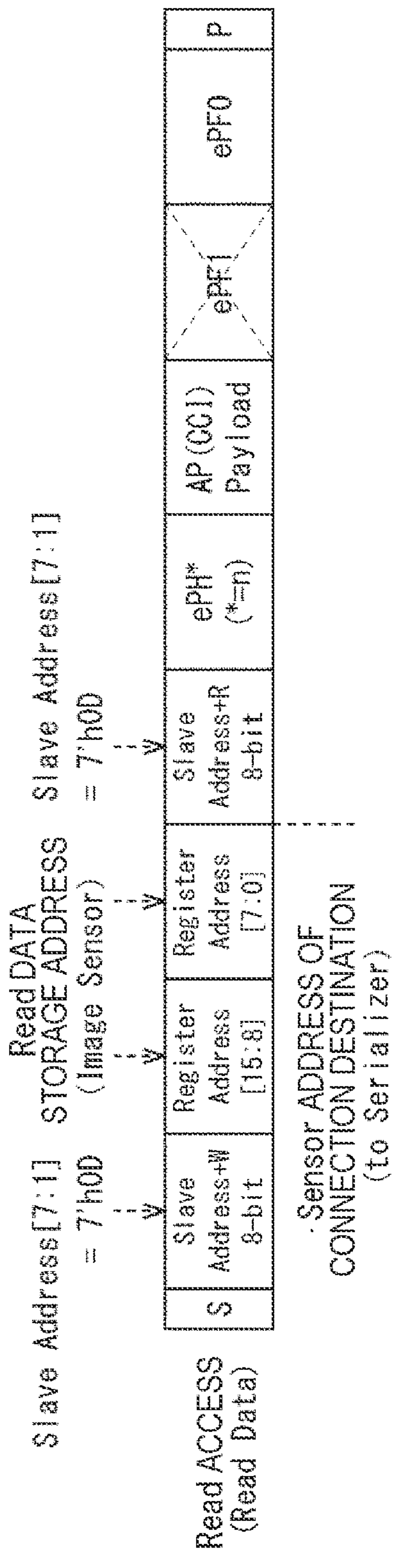
FIG. 46 is a diagram illustrating an example of a packet configuration of read data output by I2C/I3C.

FIG. 46 illustrates an example of a packet configuration of read data output from the I2C/I3C slave 621 of the image sensor 611 at the time of read access.

As illustrated in FIG. 46, the I2C/I3C slave 621 transmits the sensor address of the connection destination, that is, the address (Slave Address+W 8-bit) of the I2C/I3C master 634 of the slave-side SerDes device 612 in the configuration illustrated in FIG. 40, following the start condition S. In the example illustrated in FIG. 46, the address of the I2C/I3C master 634 is Slave Address[7:1]=7'h0D. Following the address, the storage address of the read data (the address of the register 624 of the image sensor 611) is transmitted, and the address (Slave Address+R 8-bit) of the I2C/I3C master 634 of the slave-side SerDes device 612 is transmitted. The stop condition P is transmitted at the end after the I2C/I3C slave 621 transmits the extended packet header ePH*(*=n), the AP (CCI) payload, the extended packet footer ePF1, and the extended packet footer ePF0.

The read command having such a packet structure is transferred by I2C/I3C from the I2C/I3C slave 621 of the image sensor 611. In the slave-side SerDes device 612, the I2C/I3C master 634 acquires the read data (the extended packet header ePH*(*=n), the AP (CCI) payload, the extended packet footer ePF1, and the extended packet footer ePF0). The read data is supplied to the CCI processing unit 635 of the Slave Address[7:1]=7'h0E, and then supplied to the A-PHY processing unit 631 via the CCI-FS processing unit 636, the CSI2-FS processing unit 633, and the CSIA processing unit 632.

Figure 47:
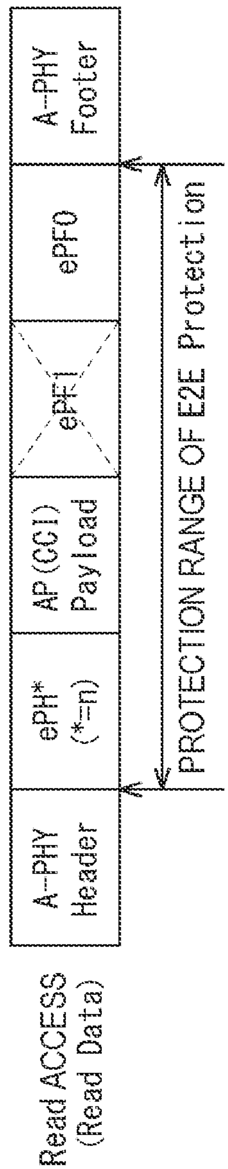
FIG. 47 is a diagram illustrating an example of a packet configuration of read data to be A-PHY transferred.

FIG. 47 illustrates an example of a packet configuration of read data output from the A-PHY processing unit 631 of the slave-side SerDes device 612 at the time of read access.

As illustrated in FIG. 47, the A-PHY processing unit 631 adds an A-PHY header and an A-PHY footer, setting the read data acquired by the I2C/I3C master 634 as the protection range of E2E Protection.

The read data having such a packet structure is A-PHY transferred by the A-PHY processing unit 631 of the slave-side SerDes device 612. Then, in the master-side SerDes device 613, the A-PHY processing unit 641 removes the A-PHY header and the A-PHY footer from the read data. The read data is supplied to the I2C/I3C slave 644 via the CSIA processing unit 642, the CSI2-FS processing unit 643, the CCI-FS processing unit 646, and the CCI processing unit 635.

Figure 48:
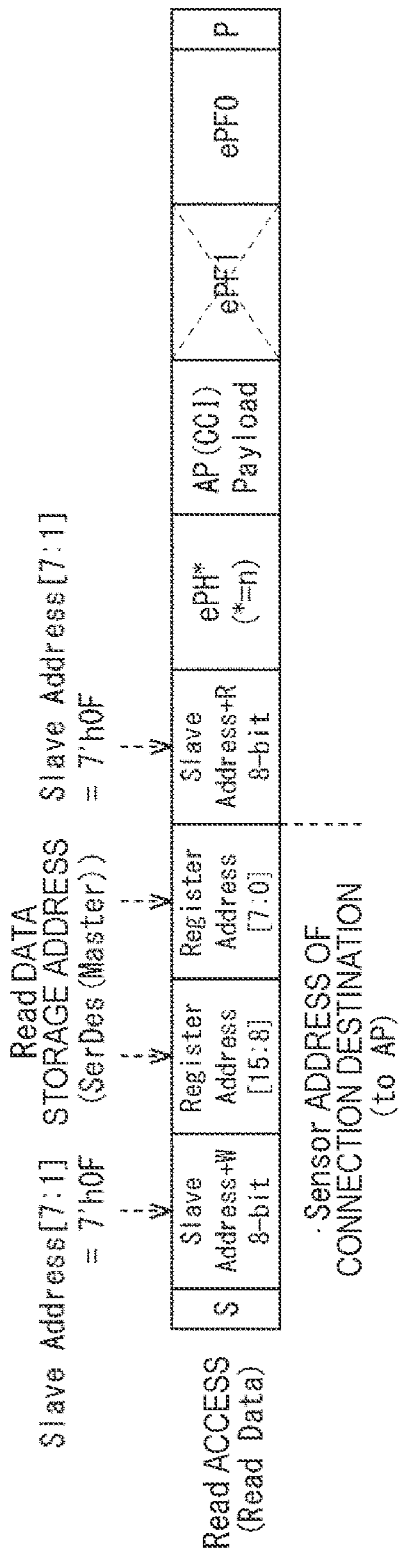
FIG. 48 is a diagram illustrating an example of a packet configuration of read data output by I2C/I3C.

FIG. 48 illustrates an example of a packet configuration of read data output from the I2C/I3C slave 644 of the master-side SerDes device 613 at the time of read access.

As illustrated in FIG. 48, the I2C/I3C slave 644 transmits the sensor address of the connection destination, that is, the address (Slave Address+W 8-bit) of the CCI processing unit 635 of the master-side SerDes device 613 in the configuration illustrated in FIG. 40, following the start condition S. In the example illustrated in FIG. 48, the address of the CCI processing unit 635 is Slave Address[7:1]=7'h0F. Following the address, the register addresses (Register Address [15:8] and Register Address [7:0] of the register 647 of the master-side SerDes device 613 are transmitted, and the address (Slave Address+R 8-bit) of the CCI processing unit 635 is transmitted. Then, the stop condition P is transmitted at the end after the I2C/I3C slave 644 transmits the extended packet header ePH*(*=n), the AP (CCI) payload, the extended packet footer ePF1, and the extended packet footer ePF0.

The read data having such a packet structure is transferred by I2C/I3C from the I2C/I3C slave 644 of the master-side SerDes device 613. Then, in the application processor 614, the I2C/I3C master 651 acquires the read command (the extended packet header ePH*(*=n), the extended packet footer ePF1, and the extended packet footer ePF0) and supplies the read command to the CCI-FS processing unit 653.

Figure 49:
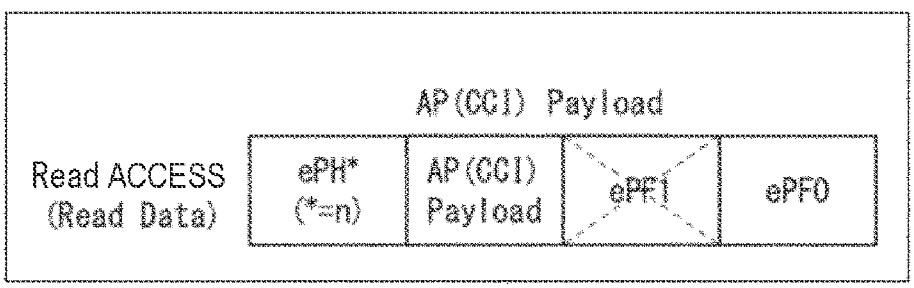
FIG. 49 is a diagram illustrating an example of a packet configuration of read data acquired on the application processor side.

FIG. 49 illustrates an example of a packet structure of read data supplied to the CCI-FS processing unit 653 at the time of read access.

As illustrated in FIG. 49, the read data keeping the packet structure illustrated in FIG. 45, that is, the read data set as the protection range of E2E Protection in the A-PHY transfer, is supplied to the CCI-FS processing unit 653.

<Processing Example of Communication Processing>

Communication processing using CCI-FS performed in the communication system 601 illustrated in FIG. 40 will be described with reference to the flowcharts of FIGS. 50 to 57.

Figure 50:
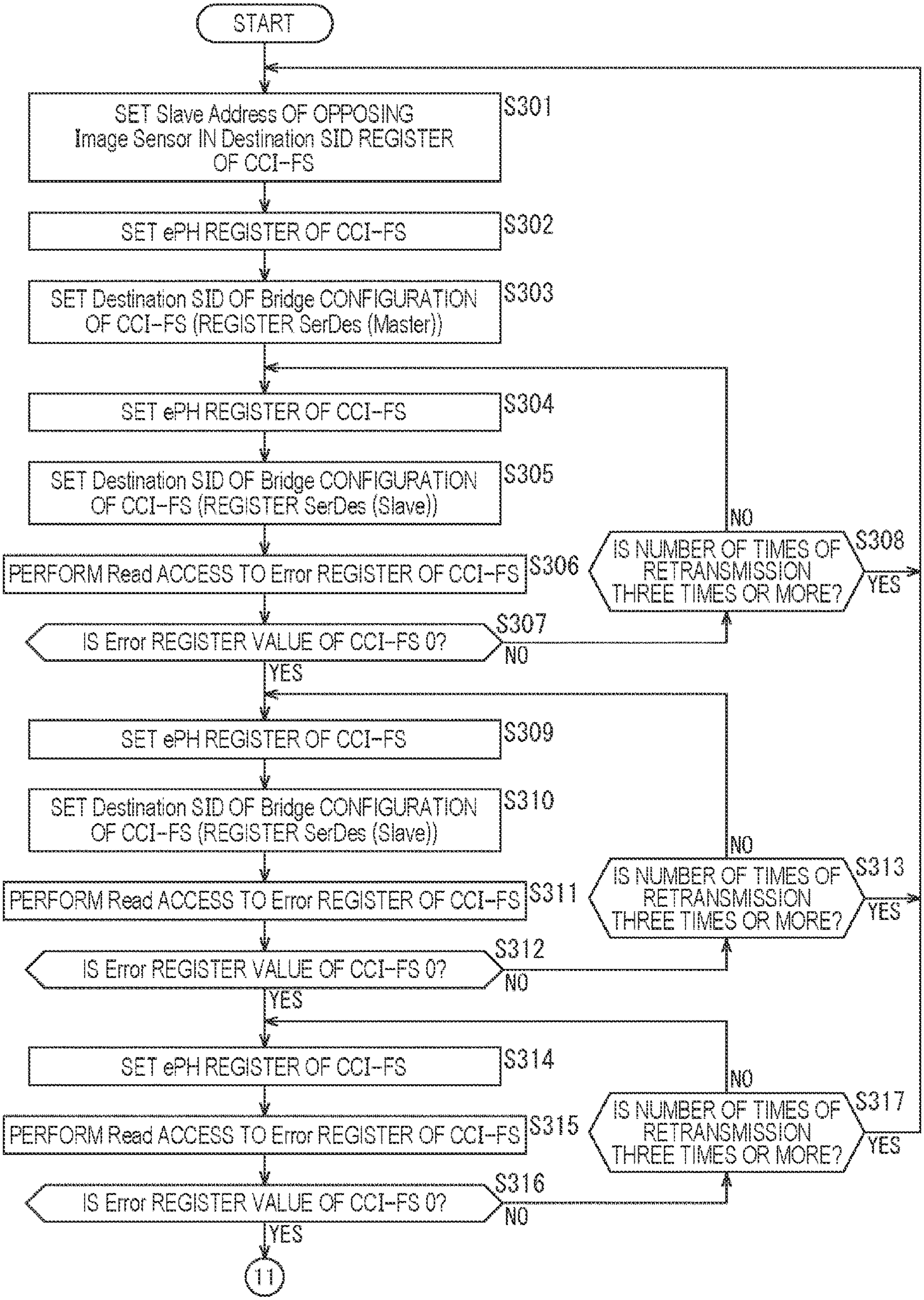
FIG. 50 is a flowchart for describing initial setting and check operation of communication processing using CCI-FS.

As illustrated in FIG. 50, in steps S301 to S317, initial setting and check operation are performed.

In step S301, the slave address of the opposing image sensor 611 is set in the Destination SID register of the CCI-FS processing unit 653 of the application processor 614.

In step S302, the ePH register of the CCI-FS processing unit 653 of the application processor 614 is set.

In step S303, the Destination SID of a Bridge configuration of the CCI-FS processing unit 653 of the application processor 614 is set, and the master-side SerDes device 613 is registered. Here, it is assumed that Address, attribution, and Timeout nol register are set in a similar manner and hereinafter the setting is similarly performed.

In step S304, the ePH register of the CCI-FS processing unit 643 is set from the application processor 614 to the master-side SerDes device 613.

In step S305, the Destination SID of the Bridge configuration of the CCI-FS processing unit 643 is set from the application processor 614 to the master-side SerDes device 613, and the slave-side SerDes device 612 is registered.

In step S306, the read access to the Error register of the CCI-FS processing unit 643 is performed from the application processor 614 to the master-side SerDes device 613.

In step S307, in the application processor 614, the CCI-FS processing unit 653 determines whether or not the register value of the Error register of the CCI-FS processing unit 643 of the master-side SerDes device 613 is 0 as a result of the read access in step S306.

In step S307, in a case where it is determined that the register value of the Error register of the CCI-FS processing unit 643 of the master-side SerDes device 613 is not 0 (is other than 0), the processing proceeds to step S308.

In step S308, in the application processor 614, the CCI-FS processing unit 653 determines whether or not the number of times of retransmission is three times or more, and in a case where it is determined that the number of times of retransmission is not three times or more (is once or twice), the processing returns to step S304, and similar processing is repeatedly performed thereafter.

On the other hand, in step S307, in a case where it is determined that the register value of the Error register of the CCI-FS processing unit 643 of the master-side SerDes device 613 is 0, the processing proceeds to step S309.

In step S309, the ePH register of the CCI-FS processing unit 636 is set from the application processor 614 to the slave-side SerDes device 612.

In step S310, the Destination SID of the Bridge configuration of the CCI-FS processing unit 636 is set from the application processor 614 to the slave-side SerDes device 612, and the slave-side SerDes device 612 is registered.

In step S311, the read access to the Error register of the CCI-FS processing unit 636 is performed from the application processor 614 to the slave-side SerDes device 612.

In step S312, in the application processor 614, the CCI-FS processing unit 653 determines whether or not the register value of the Error register of the CCI-FS processing unit 636 of the slave-side SerDes device 612 is 0 as a result of the read access in step S311.

In step S312, in a case where it is determined that the register value of the Error register of the CCI-FS processing unit 636 of the slave-side SerDes device 612 is not 0 (is other than 0), the processing proceeds to step S313.

In step S313, in the application processor 614, the CCI-FS processing unit 653 determines whether or not the number of times of retransmission is three times or more, and in a case where it is determined that the number of times of retransmission is not three times or more (is once or twice), the processing returns to step S309, and similar processing is repeatedly performed thereafter.

On the other hand, in step S312, in a case where it is determined that the register value of the Error register of the CCI-FS processing unit 636 of the slave-side SerDes device 612 is 0, the processing proceeds to step S314.

In step S314, the ePH register of the CCI-FS processing unit 623 is set from the application processor 614 to the image sensor 611.

In step S315, the read access to the Error register of the CCI-FS processing unit 623 is performed from the application processor 614 to the image sensor 611.

In step S316, in the application processor 614, the CCI-FS processing unit 653 determines whether or not the register value of the Error register of the CCI-FS processing unit 623 of the image sensor 611 is 0 as a result of the read access in step S315.

In step S316, in a case where it is determined that the register value of the Error register of the CCI-FS processing unit 623 of the image sensor 611 is not 0 (is other than 0), the processing proceeds to step S317.

In step S317, in the application processor 614, the CCI-FS processing unit 653 determines whether or not the number of times of retransmission is three times or more, and in a case where it is determined that the number of times of retransmission is not three times or more (is once or twice), the processing returns to step S314, and similar processing is repeatedly performed thereafter.

Here, in step S308, step S313, or step S317, in a case where it is determined that the number of times of retransmission is three times or more, the processing returns to step S301, and similar processing is repeatedly performed thereafter.

On the other hand, in step S316, in a case where it is determined that the register value of the Error register of the CCI-FS processing unit 623 of the image sensor 611 is 0, the processing proceeds to step S318.

Figure 51:
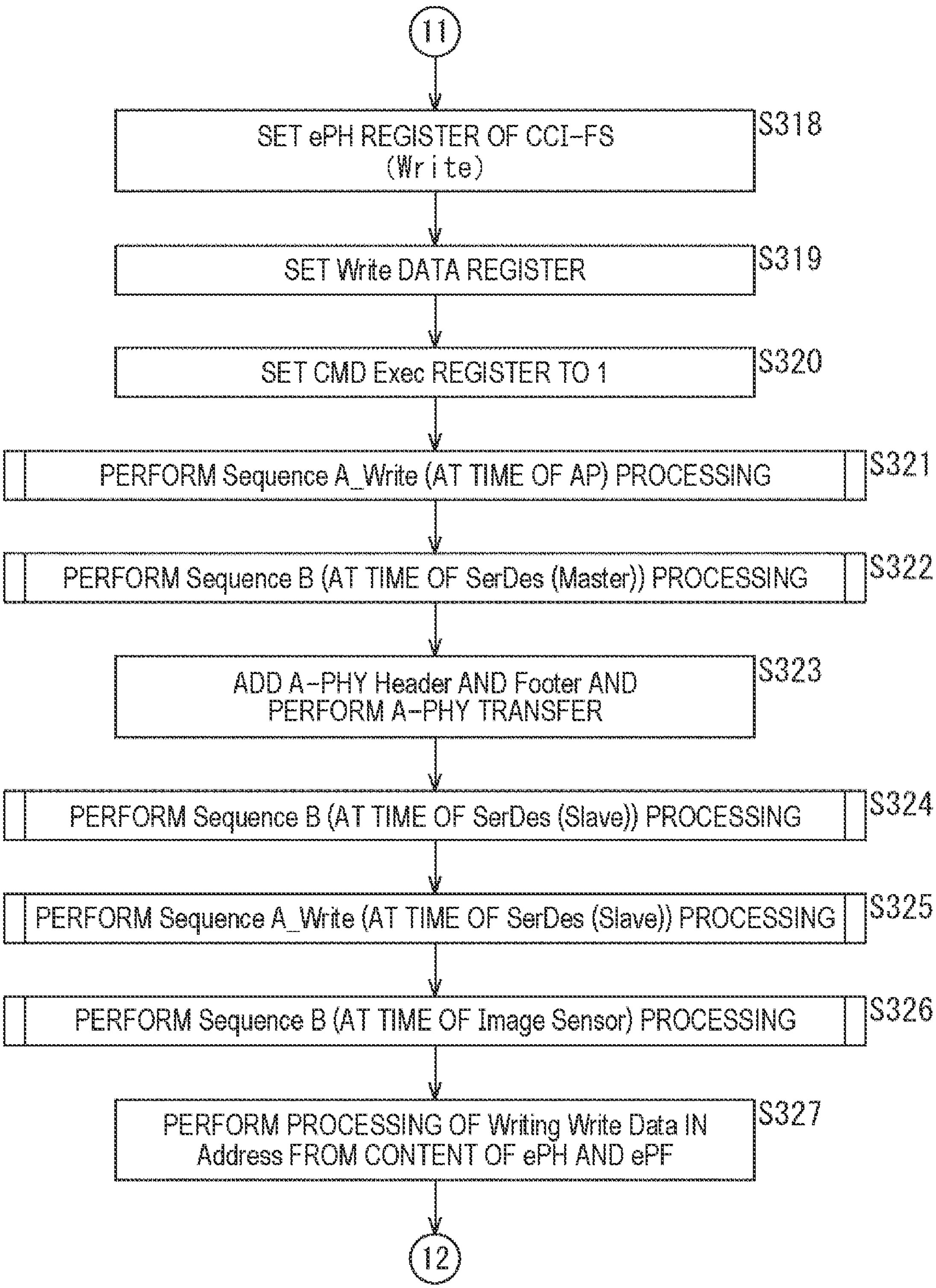
FIG. 51 is a flowchart for describing a write operation using CCI-FS.

As illustrated in FIG. 51, in steps S318 to S327, the write operation using the CCI-FS is performed.

In step S318, the CCI-FS processing unit 653 of the application processor 614 sets the ePH register so as to perform the write operation.

In step S319, the CCI-FS processing unit 653 of the application processor 614 sets the write data register.

In step S320, the CCI-FS processing unit 653 of the application processor 614 sets the command execution register to 1 and issues the write command.

In step S321, the application processor 614 performs Sequence A_Write (at the time of AP) processing to be described below with reference to FIG. 53.

In step S322, the master-side SerDes device 613 performs Sequence B (at the time of SerDes (Master)) processing to be described below with reference to FIG. 56. Note that, in FIG. 56, the Sequence B (at the time of SerDes (Slave)) processing executed by the slave-side SerDes device 612 is described, but similar processing can also be executed by each corresponding block in the master-side SerDes device 613.

In step S323, the A-PHY processing unit 641 adds the A-PHY header and the A-PHY footer and performs the A-PHY transfer from the extended DT of the extended packet header ePH of the master-side SerDes device 613 via the CSI2-FS processing unit 643 and the CSIA processing unit 642.

In step S324, the slave-side SerDes device 612 performs Sequence B (at the time of SerDes (Slave)) processing to be described below with reference to FIG. 56.

In step S325, the slave-side SerDes device 612 performs Sequence A_Write (at the time of SerDes (Slave)) processing to be described below with reference to FIG. 53. Note that, in FIG. 53, the Sequence A_Write (at the time of AP) processing executed by the application processor 614 is described, but similar processing can be executed by each corresponding block in the slave-side SerDes device 612.

In step S326, the image sensor 611 performs Sequence B (at the time of Image Sensor) processing to be described below with reference to FIG. 56. Note that, in FIG. 56, the Sequence B (at the time of SerDes (Slave)) processing executed by the slave-side SerDes device 612 is described, but similar processing can also be executed by each corresponding block in the image sensor 611.

In step S327, in the image sensor 611, the CCI-FS processing unit 623 performs write processing of writing the write data to the address of the register 624 from the content of the extended packet header ePH and the extended packet footer ePF. Thereafter, the processing proceeds to step S328.

Figure 52:
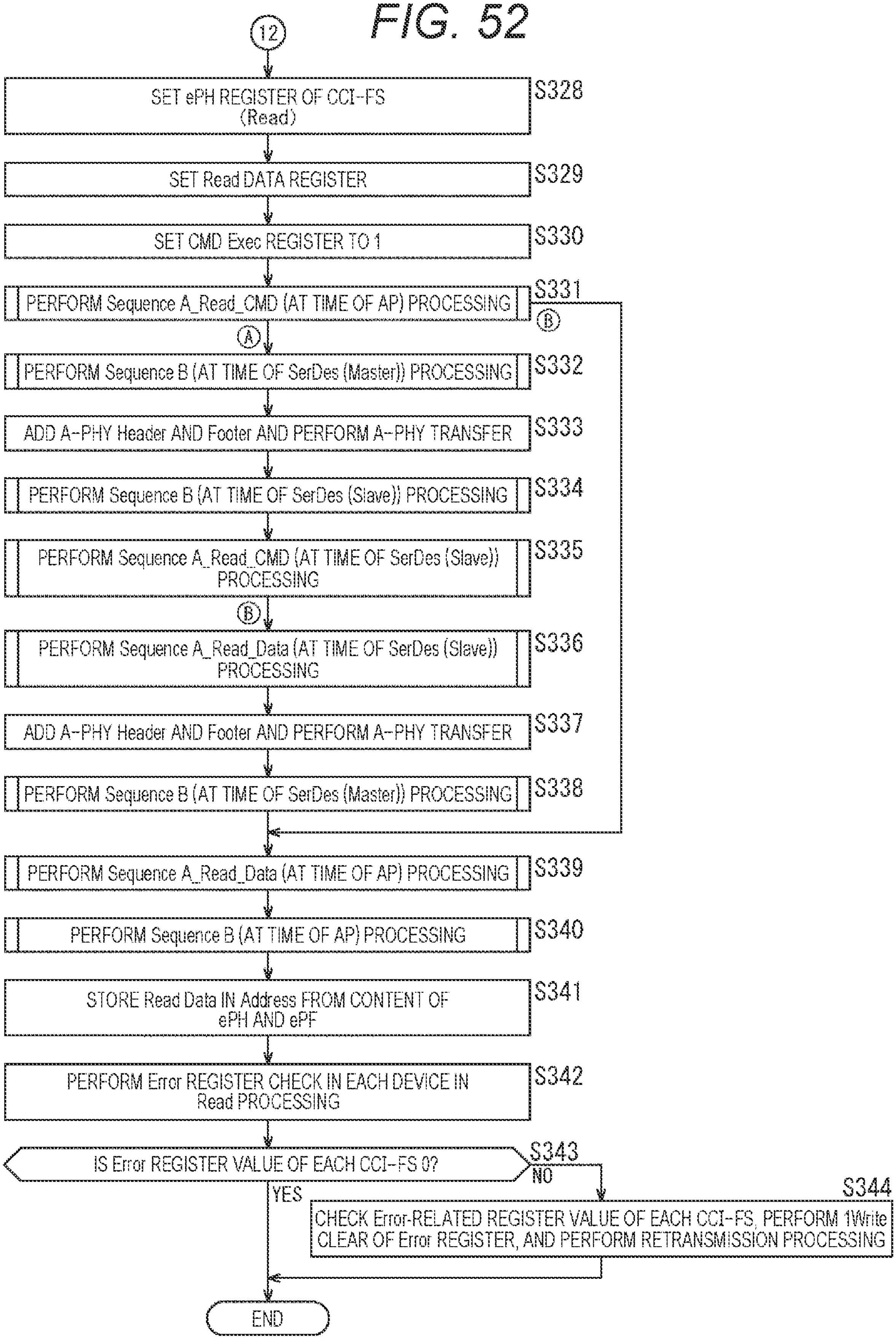
FIG. 52 is a flowchart for describing a read operation using CCI-FS.

As illustrated in FIG. 52, in steps S328 to S344, the read operation using the CCI-FS is performed.

In step S328, the CCI-FS processing unit 653 of the application processor 614 sets the ePH register so as to perform the read operation.

In step S329, the CCI-FS processing unit 653 of the application processor 614 sets the read data register.

In step S330, the CCI-FS processing unit 653 of the application processor 614 sets the command execution register to 1 and issues the read command.

In step S331, the application processor 614 performs Sequence A_Read_CMD (at the time of AP) processing to be described below with reference to FIG. 54. Here, in the Sequence A_Read_CMD (at the time of AP) processing, two branched pieces of processing are performed in parallel, the processing proceeds to step S332 according to a branch A and the processing proceeds to step S339 according to a branch B.

In step S332, the master-side SerDes device 613 performs Sequence B (at the time of SerDes (Master)) processing to be described below with reference to FIG. 56. Note that, in FIG. 56, the Sequence B (at the time of SerDes (Slave)) processing executed by the slave-side SerDes device 612 is described, but similar processing can also be executed by each corresponding block in the master-side SerDes device 613.

In step S333, the A-PHY processing unit 641 adds the A-PHY header and the A-PHY footer and performs the A-PHY transfer from the extended DT of the extended packet header ePH of the master-side SerDes device 613 via the CSI2-FS processing unit 643 and the CSIA processing unit 642.

In step S334, the slave-side SerDes device 612 performs Sequence B (at the time of SerDes (Slave)) processing to be described below with reference to FIG. 56.

In step S335, the slave-side SerDes device 612 performs Sequence A_Read_CMD (at the time of SerDes (Slave)) processing to be described below with reference to FIG. 54. Note that, in FIG. 54, the Sequence A_Read_CMD (at the time of AP) processing executed in the application processor 614 is described, but similar processing can be executed by each corresponding block in the slave-side SerDes device 612. Here, in the Sequence ARead_CMD (at the time of SerDes (Slave)) processing, the processing does not proceed to the branch A of the two branched pieces of processing, and the processing proceeds to step S336 according to the branch B.

In step S336, the slave-side SerDes device 612 performs Sequence A_Read_Data (at the time of SerDes (Slave)) processing to be described below with reference to FIG. 57. Note that, in FIG. 57, the Sequence A_Read_Data (at the time of AP) processing executed in the application processor 614 is described, but similar processing can be executed by each corresponding block in the slave-side SerDes device 612.

In step S337, the A-PHY processing unit 631 adds the A-PHY header and the A-PHY footer and performs the A-PHY transfer from the extended DT of the extended packet header ePH of the slave-side SerDes device 612 via the CSI2-FS processing unit 633 and the CSIA processing unit 632.

In step S338, the master-side SerDes device 613 performs Sequence B (at the time of SerDes (Master)) processing to be described below with reference to FIG. 56. Note that, in FIG. 56, the Sequence B (at the time of SerDes (Slave)) processing executed in the slave-side SerDes device 612 is described, but similar processing can also be executed by each corresponding block in the master-side SerDes device 613.

In step S339, the application processor 614 performs Sequence A_Read_Data (at the time of AP) processing to be described below with reference to FIG. 57.

In step S340, the application processor 614 performs Sequence B (at the time of AP) processing to be described below with reference to FIG. 56. Note that, in FIG. 56, the Sequence B (at the time of SerDes (Slave)) processing executed in the slave-side SerDes device 612 is described, but similar processing can also be executed by each corresponding block in the application processor 614.

In step S341, in the application processor 614, the CCI-FS processing unit 653 stores the read data in the address of the register 654 from the content of the extended packet header ePH and the extended packet footer ePF.

In step S342, in the above-described read processing, the image sensor 611, the slave-side SerDes device 612, the master-side SerDes device 613, and the application processor 614 check the Error register.

In step S343, the image sensor 611 and each of the devices (the slave-side SerDes device 612, the master-side SerDes device 613, and the application processor 614) determine whether or not the register value of the Error register of each CCI-FS processing unit is 0.

In step S343, in a case where it is determined that the register values of all the CCI-FS processing units are not 0 (there is a register value other than 0 in any of them), the processing proceeds to step S344.

In step S344, the Error-related register value of the CCI-FS processing unit in which the register value is not 0 is checked, the Error register is cleared by one write, and the retransmission processing is performed.

On the other hand, in a case where it is determined in step S343 that the register values of all the CCI-FS processing units are 0, or after the processing of step S344, the processing is terminated.

Figure 53:
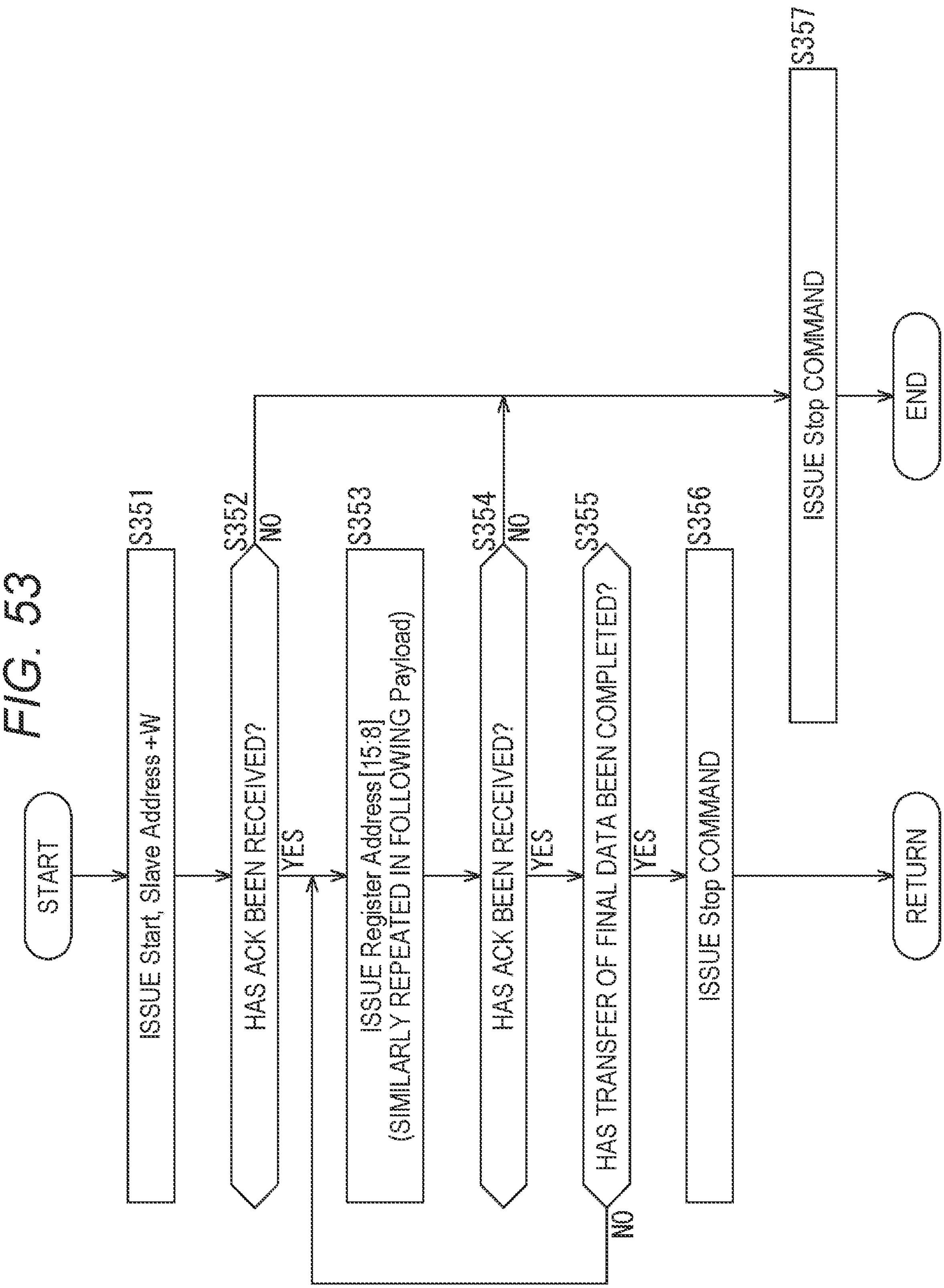
FIG. 53 is a flowchart for describing Sequence A_Write (at the time of AP) processing.

FIG. 53 is a flowchart for describing the Sequence A_Write (at the time of AP) processing performed in step S321 in FIG. 51. Note that, in FIG. 53, the processing performed by the application processor 614 will be described as an example, but the Sequence A_Write (at the time of SerDes (Slave)) processing in step S325 in FIG. 51 is similarly performed.

In step S351, in the application processor 614, the I2C/I3C master 651 issues a start command and a slave address (Slave Address+W 8-bit illustrated in FIG. 42).

In step S352, in the application processor 614, the I2C/I3C master 651 determines whether or not an ACK response from the I2C/I3C slave 644 of the master-side SerDes device 613 has been received. In step S352, in a case where it is determined that the ACK response from the I2C/I3C slave 644 of the master-side SerDes device 613 has been received, the processing proceeds to step S353.

In step S353, in the application processor 614, the I2C/I3C master 651 issues the register address (Register Address [15:8] illustrated in FIG. 42). Here, every time the processing of step S353 is repeatedly performed, a payload of this or after this register address is transmitted, as illustrated in FIG. 42.

In step S354, in the application processor 614, the I2C/I3C master 651 determines whether or not an ACK response from the I2C/I3C slave 644 of the master-side SerDes device 613 has been received. In step S354, in a case where it is determined that the ACK response from the I2C/I3C slave 644 of the master-side SerDes device 613 has been received, the processing proceeds to step S355.

In step S355, in the application processor 614, the I2C/I3C master 651 determines whether or not transfer of final data has been completed. In step S355, in a case where it is determined that the transfer of final data has not been completed, the processing returns to step S353, and similar processing is repeatedly performed thereafter.

On the other hand, in step S355, in a case where it is determined that the transfer of final data has been completed, the processing proceeds to step S356. In step S356, in the application processor 614, the I2C/I3C master 651 issues a stop command. Therefore, the Sequence A_Write (at the time of AP) processing ends, and the processing returns to step S322 in FIG. 51.

On the other hand, in step S352 or step S354, in a case where it is determined that the ACK response from the I2C/I3C slave 644 of the master-side SerDes device 613 has not been received, the processing proceeds to step S357. In step S357, in the application processor 614, the I2C/I3C master 651 issues the stop command. In this case, the Sequence A_Write (at the time of AP) processing ends, and the communication processing itself is terminated.

Figure 54:
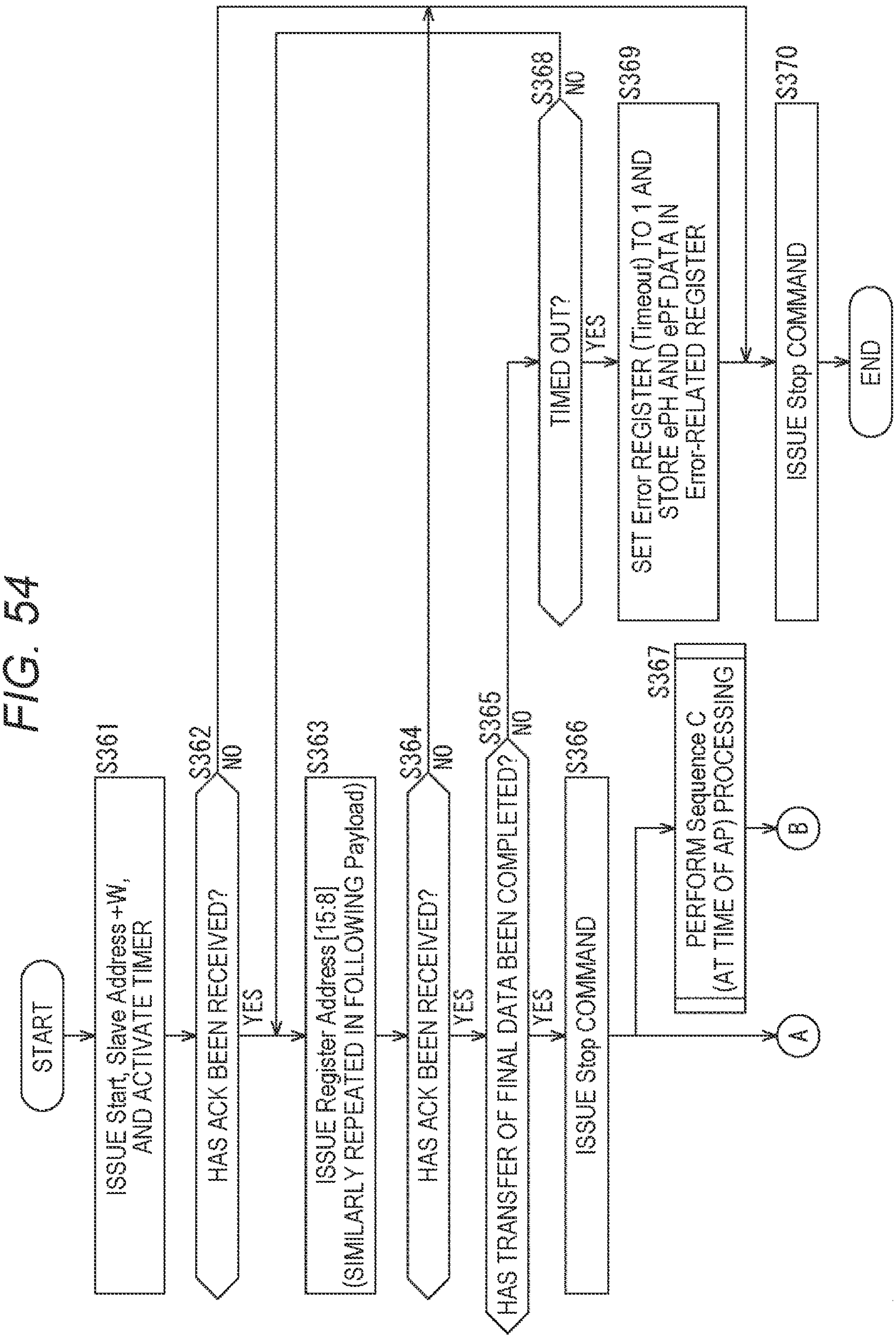
FIG. 54 is a flowchart for describing Sequence A_Read_CMD (at the time of AP) processing.

FIG. 54 is a flowchart for describing the Sequence A_Read_CMD (at the time of AP) processing performed in step S331 of FIG. 52. Note that, in FIG. 54, the processing performed by the application processor 614 will be described as an example, but the Sequence A_Read_CMD (at the time of SerDes(Slave)) processing in step S335 in FIG. 52 is similarly performed.

In step S361, in the application processor 614, the I2C/I3C master 651 issues the start command and a slave address (Slave Address+W 8-bit illustrated in FIG. 42) and starts a timer.

In step S362, in the application processor 614, the I2C/I3C master 651 determines whether or not the ACK response from the I2C/I3C slave 644 of the master-side SerDes device 613 has been received. In step S362, in a case where it is determined that the ACK response from the I2C/I3C slave 644 of the master-side SerDes device 613 has been received, the processing proceeds to step S363.

In step S363, in the application processor 614, the I2C/I3C master 651 issues the register address (Register Address [15:8] illustrated in FIG. 42). Here, every time the processing of step S363 is repeatedly performed, the payload of this or after this register address is transmitted, as illustrated in FIG. 42.

In step S364, in the application processor 614, the I2C/I3C master 651 determines whether or not the ACK response from the I2C/I3C slave 644 of the master-side SerDes device 613 has been received.

In step S364, in a case where it is determined that the ACK response from the I2C/I3C slave 644 of the master-side SerDes device 613 has been received, the processing proceeds to step S365.

In step S365, in the application processor 614, the I2C/I3C master 651 determines whether or not transfer of final data has been completed.

In step S365, in a case where it is determined that the transfer of final data has been completed, the processing proceeds to step S366.

In step S366, in the application processor 614, the I2C/I3C master 651 issues the stop command. Thereafter, the processing branches into two pieces, and the processing proceeds to step S332 in FIG. 52 according to the branch A. Meanwhile, according to the branch B, Sequence C (at the time of AP) processing (see FIG. 55 to be described below) is performed in step S367, and then the processing proceeds to step S339 in FIG. 52.

On the other hand, in step S365, in a case where it is determined that the transfer of final data has not been completed, the processing proceeds to step S368.

In step S368, in the application processor 614, the I2C/I3C master 651 determines whether or not the timer started in step S361 has timed out. In step S368, in a case where it is determined that the timer has not been timed out, the processing returns to step S363, and similar processing is repeatedly performed thereafter.

On the other hand, in step S368, in a case where it is determined that the timer has timed out, the processing proceeds to step S369.

In step S369, the application processor 614 sets 1 in the Error register (Timeout), and stores the data of the extended packet header ePH and the extended packet footer ePF in the Error-related register.

After the processing in step S369, or in step S362 or step S364, in a case where it is determined that the ACK response from the I2C/I3C slave 644 of the master-side SerDes device 613 has not been received, the processing proceeds to step S370.

In step S370, in the application processor 614, the I2C/I3C master 651 issues the stop command. In this case, the Sequence A_Read_CMD (at the time of AP) processing ends, and the communication processing itself is terminated.

Figure 55:
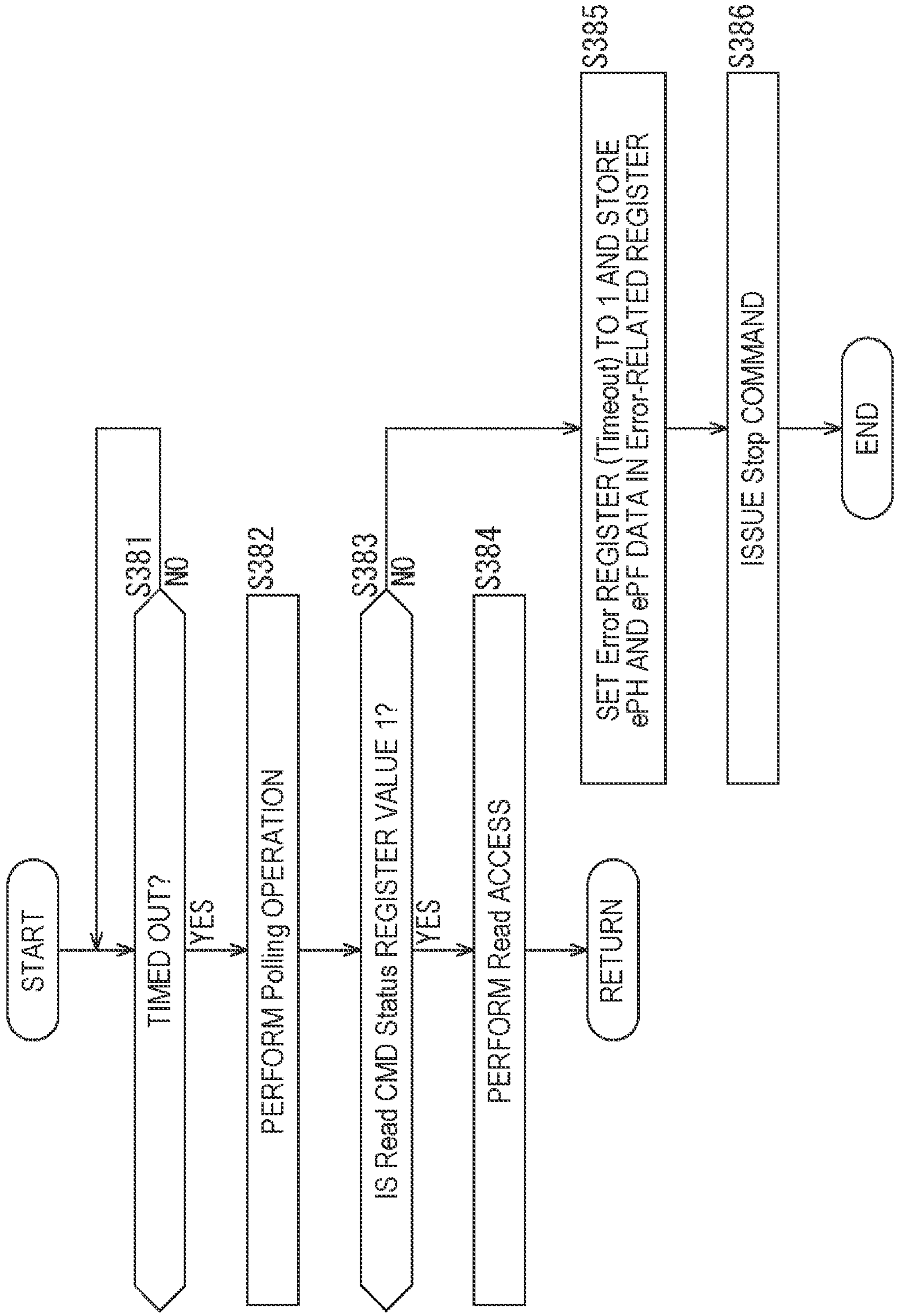
FIG. 55 is a flowchart for describing Sequence C (at the time of AP) processing.

FIG. 55 is a flowchart for describing the Sequence C (at the time of AP) processing performed in step S367 in FIG. 54. Note that, in FIG. 55, the processing performed by the application processor 614 will be described as an example, but similar processing can also be performed in the slave-side SerDes device 612.

In step S381, in the application processor 614, the I2C/I3C master 651 determines whether or not the timer started in step S361 of FIG. 54 has timed out, and the processing waits until it is determined that the timer has timed out. In step S381, when it is determined that the timer has timed out, the processing proceeds to step S382, and in the application processor 614, the I2C/I3C master 651 performs a polling operation.

In step S383, in the application processor 614, the I2C/I3C master 651 determines whether or not a Status register value of the read command is 1.

In step S383, in a case where it is determined that the Status register value of the read command is 1, the processing proceeds to step S384. In step S384, after performing the read access, the application processor 614 returns the processing to step S339 in FIG. 52.

On the other hand, in step S383, in a case where it is determined that the Status register value of the read command is not 1 (is other than 1), the processing proceeds to step S385. In step S385, the application processor 614 sets 1 in the Error register (Timeout), and stores the data of the extended packet header ePH and the extended packet footer ePF in the Error-related register.

In step S386, in the application processor 614, the I2C/I3C master 651 issues the stop command. In this case, the Sequence C (at the time of AP) processing ends, and the communication processing itself is terminated.

Figure 56:
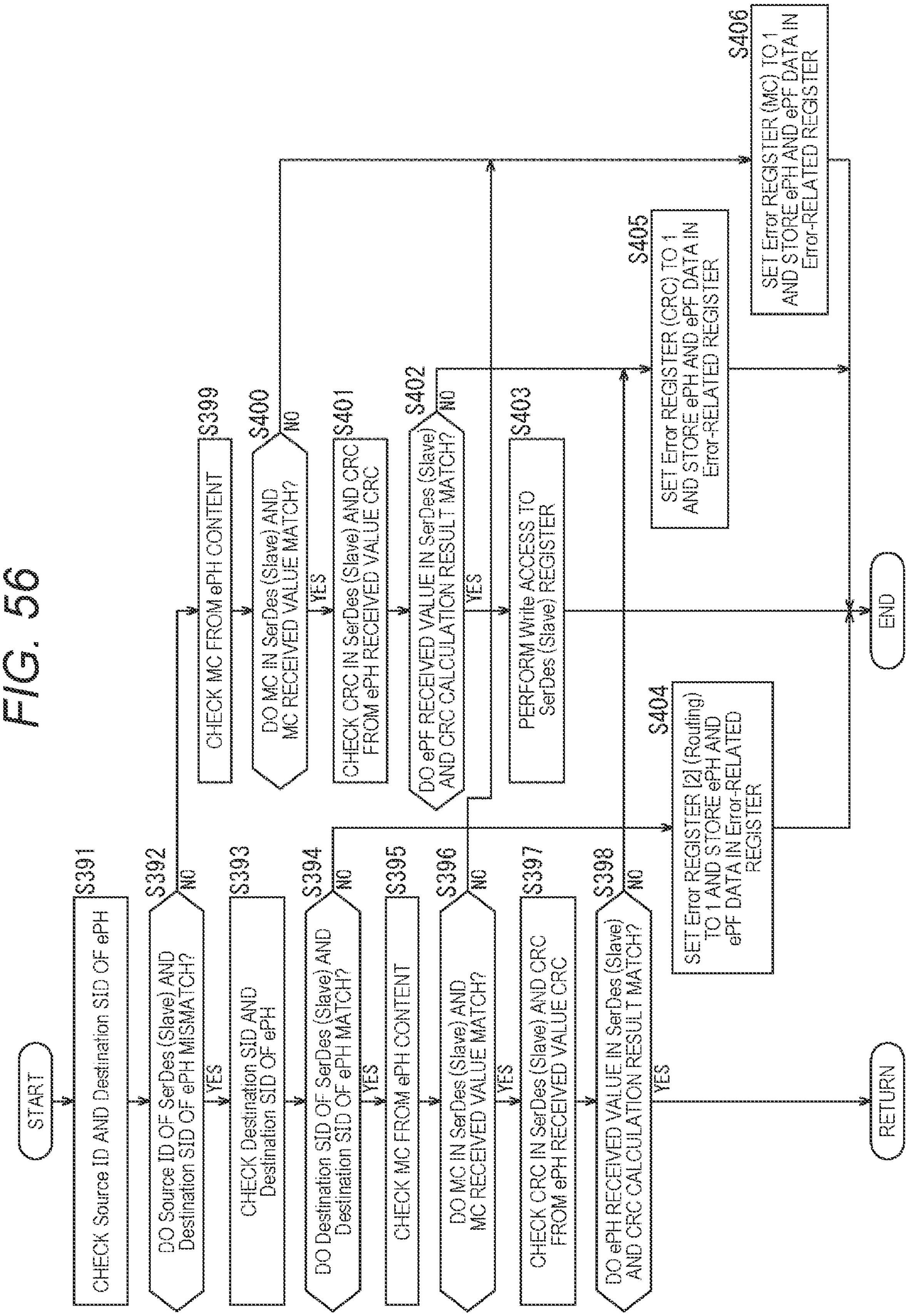
FIG. 56 is a flowchart for describing Sequence B (at the time of SerDes (Slave)) processing.

FIG. 56 is a flowchart for describing the Sequence B (at the time of SerDes (Slave)) processing performed in steps S324 and S334 in FIG. 51. Note that, in FIG. 56, the processing performed by the slave-side SerDes device 612 will be described as an example, but the Sequence B (at the time of SerDes(Master)) processing in step S322 in FIG. 51, the Sequence B (at the time of Image Sensor) processing in step S326 in FIG. 51, and the Sequence B (at the time of SerDes(Master)) processing in step S332 in FIG. 52 are similarly performed.

In step S391, in the slave-side SerDes device 612, the CCI-FS processing unit 636 checks the Source ID of the slave-side SerDes device 612 and the Destination SID of the extended packet header ePH.

In step S392, in the slave-side SerDes device 612, the CCI-FS processing unit 636 determines whether or not the Source ID of the slave-side SerDes device 612 and the Destination SID of the extended packet header ePH do not match.

In step S392, in a case where it is determined that the Source ID of the slave-side SerDes device 612 and the Destination SID of the extended packet header ePH do not match, the processing proceeds to step S393.

In step S393, in the slave-side SerDes device 612, the CCI-FS processing unit 636 checks the Destination SID of the slave-side SerDes device 612 and the Destination SID of the extended packet header ePH.

In step S394, in the slave-side SerDes device 612, the CCI-FS processing unit 636 determines whether or not the Source ID of the slave-side SerDes device 612 matches the Destination SID of the extended packet header ePH.

In step S394, in a case where it is determined that the Source ID of the slave-side SerDes device 612 matches the Destination SID of the extended packet header ePH, the processing proceeds to step S395.

In step S395, in the slave-side SerDes device 612, the CCI-FS processing unit 636 checks the Message Counter from the content of the extended packet header ePH.

In step S396, in the slave-side SerDes device 612, the CCI-FS processing unit 636 determines whether or not the Message Counter in the slave-side SerDes device 612 matches the received value of the Message Counter checked from the content of the extended packet header ePH.

In step S396, in a case where it is determined that the Message Counter in the slave-side SerDes device 612 matches the received value of the Message Counter checked from the content of the extended packet header ePH, the processing proceeds to step S397.

In step S397, in the slave-side SerDes device 612, the CCI-FS processing unit 636 checks the CRC calculation result calculated from the extended packet header ePH by the slave-side SerDes device 612 and the received value (ePF0) of the extended packet footer ePF.

In step S398, whether or not the received value (ePF0) of the extended packet footer ePF and the CRC calculation result match, and in a case where it is determined that the received value (ePF0) and the CRC calculation result match, the processing returns to step S325 in FIG. 51.

On the other hand, in step S392, in a case where it is determined that the Source ID of the slave-side SerDes device 612 and the Destination SID of the extended packet header ePH does not mismatch (do match), the processing proceeds to step S399.

In steps S399 to S402, processing similar to that in steps S395 to S398 is performed.

In step S402, in a case where it is determined that the received value (ePF0) of the extended packet footer ePF matches the CRC calculation result, the processing proceeds to step S403. In step S403, the write access is made to the register 637 of the slave-side SerDes device 612.

In step S394, in a case where it is determined that the Source ID of the slave-side SerDes device 612 does not match the Destination SID of the extended packet header ePH, the processing proceeds to step S404. In step S404, in the slave-side SerDes device 612, the CCI-FS processing unit 636 sets 1 in the Error register[2] (Routing), and stores the data of the extended packet header ePH and the extended packet footer ePF in the Error-related register.

In step S398 or step S402, in a case where it is determined that the received value (ePF0) of the extended packet footer ePF does not match the CRC calculation result, the processing proceeds to step S405 In step S405, in the slave-side SerDes device 612, the CCI-FS processing unit 636 sets 1 in the Error register (CRC), and stores the data of the extended packet header ePH and the extended packet footer ePF in the Error-related register.

In step S396 or step S400, in a case where it is determined that the Message Counter in the slave-side SerDes device 612 does not match the received value of the Message Counter checked from the content of the extended packet header ePH, the processing proceeds to step S406. In step S406, in the slave-side SerDes device 612, the CCI-FS processing unit 636 sets 1 in the Error register (MC), and stores the data of the extended packet header ePH and the extended packet footer ePF in the Error-related register.

After the processing of steps S403 to S406, the Sequence B (at the time of SerDes (Slave)) processing ends, and the communication processing itself is terminated.

Note that combinations of the following matters are assumed: the CRC calculation may be performed only for E2E Protection; an error is detected in each device; and the packet is discarded or not discarded.

Figure 57:
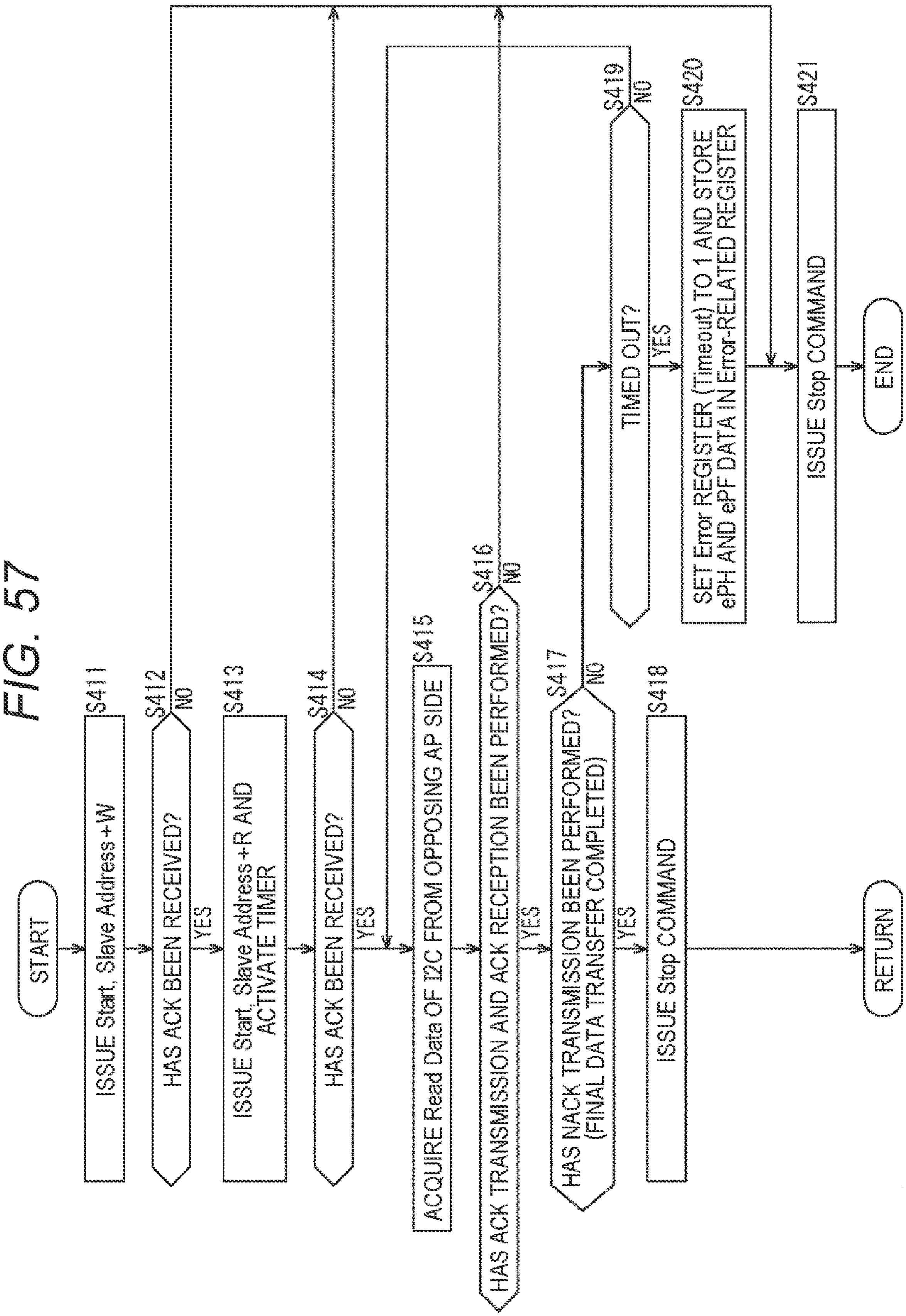
FIG. 57 is a flowchart for describing Sequence A_Read_Data (at the time of AP) processing.

FIG. 57 is a flowchart for describing the Sequence A_Read_Data (at the time of AP) processing performed in step S339 of FIG. 52. Note that, in FIG. 57, the processing performed by the application processor 614 will be described as an example, but the Sequence A_Read_Data (at the time of SerDes (Slave)) processing in step S336 in FIG. 52 is similarly performed.

In step S411, in the application processor 614, the I2C/I3C master 651 issues the start command and the slave address (Slave Address+W 8-bit illustrated in FIG. 48).

In step S412, in the application processor 614, the I2C/I3C master 651 determines whether or not the ACK response from the I2C/I3C slave 644 of the master-side SerDes device 613 has been received. In step S412, in a case where it is determined that the ACK response from the I2C/I3C slave 644 of the master-side SerDes device 613 has been received, the processing proceeds to step S413.

In step S413, in the application processor 614, the I2C/I3C master 651 issues the start command and the slave address (Slave Address+R 8-bit illustrated in FIG. 48) and starts a timer.

In step S414, in the application processor 614, the I2C/I3C master 651 determines whether or not the ACK response from the I2C/I3C slave 644 of the master-side SerDes device 613 has been received. In step S414, in a case where it is determined that the ACK response from the I2C/I3C slave 644 of the master-side SerDes device 613 has been received, the processing proceeds to step S415.

In step S415, in the application processor 614, the I2C/I3C master 651 acquires the read data from the opposing I2C/I3C slave 644 on the application processor 614 side.

In step S416, it is determined whether or not the I2C/I3C master 651 of the application processor 614 has transmitted the ACK and the opposing I2C/I3C slave 644 on the application processor 614 side has received the ACK.

In step S416, in a case where it is determined that the I2C/I3C master 651 of the application processor 614 has transmitted the ACK and the opposing I2C/I3C slave 644 on the application processor 614 side has received the ACK, the processing proceeds to step S417.

In step S417, whether or not the I2C/I3C master 651 of the application processor 614 has performed the NACK transmission along with the completion of the transfer of final data.

In step S417, in a case where it is determined that the NACK transmission has been performed, the processing proceeds to step S418. In step S418, in the application processor 614, the I2C/I3C master 651 issues the stop command. Therefore, the Sequence A_Read_Data (at the time of AP) processing ends, and the processing returns to step S340 in FIG. 52.

On the other hand, in step S417, in a case where it is determined that the NACK transmission has not been performed, the processing proceeds to step S419.

In step S419, in the application processor 614, the I2C/I3C master 651 determines whether or not the timer started in step S413 has timed out. In step S419, in a case where it is determined that the timer has not been timed out, the processing returns to step S415, and similar processing is repeatedly performed thereafter.

On the other hand, in step S419, in a case where it is determined that the timer has timed out, the processing proceeds to step S420.

In step S420, the application processor 614 sets 1 in the Error register (Timeout), and stores the data of the extended packet header ePH and the extended packet footer ePF in the Error-related register.

After the processing in step S420 or in step S414, in a case where it is determined that the ACK response from the I2C/I3C slave 644 of the master-side SerDes device 613 has not been received, the processing proceeds to step S421. Similarly, in step S416, in a case where it is determined that the I2C/I3C master 651 of the application processor 614 has not transmitted the ACK or the opposing I2C/I3C slave 644 on the application processor 614 side has not received the ACK, the processing proceeds to step S421.

In step S421, in the application processor 614, the I2C/I3C master 651 issues the stop command. In this case, the Sequence A_Read_Data (at the time of AP) processing ends, and the communication processing itself is terminated.

Here, there are three combinations to be described below for access timing from the I2C/I3C master 634 to the I2C/I3C slave 621 when the I2C/I3C slave 621 performs output (see FIG. 46) and access timing from the I2C/I3C master 651 to the I2C/I3C slave 644 when the I2C/I3C slave 644 of the master-side SerDes device 613 performs output (see FIG. 48).

In the first access timing, polling is performed until the read data is acquired, and the I2C/I3C master starts read processing after preparation for reading the read data is completed.

In the second access timing, the I2C/I3C master starts the read processing after a lapse of a certain period of time.

As the third access timing, there are a mode in which the I2C/I3C master starts the read processing after a lapse of a certain period of time using a Clock Stretch method (see FIG. 72 to be described below), and at that time, the read data is transmitted in a lump, and a mode in which the read data is transmitted in a scattered manner (Clock Stretch Mode signal is asserted).

<Configuration Example of Extended Packet Header ePH>

FIGS. 58 to 60 are diagrams illustrating configuration examples of the extended packet header ePH.

FIG. 58 illustrates detailed configuration examples of the extended packet header ePH0, the extended packet header ePH1, and the extended packet header ePH2. For addition of the extended packet header ePH as illustrated, the content of the extended packet header ePH is specified for CCI-FS by diverting the ePH structures of the C-PHY and the D-PHY.

FIG. 59 illustrates a detailed configuration example of the extended packet header ePH3. For addition of the extended packet header ePH as illustrated, the content of the extended packet header ePH is specified for CCI-FS.

FIG. 60 illustrates a detailed configuration of the extended DT of the extended packet header ePH. For example, to support the CCI-FS, "0xC0:For I2C" and "0xC1:For I3C" are added to the data type of the extended packet header ePH.

<Circuit Configuration Example of I2C>

Figure 61:
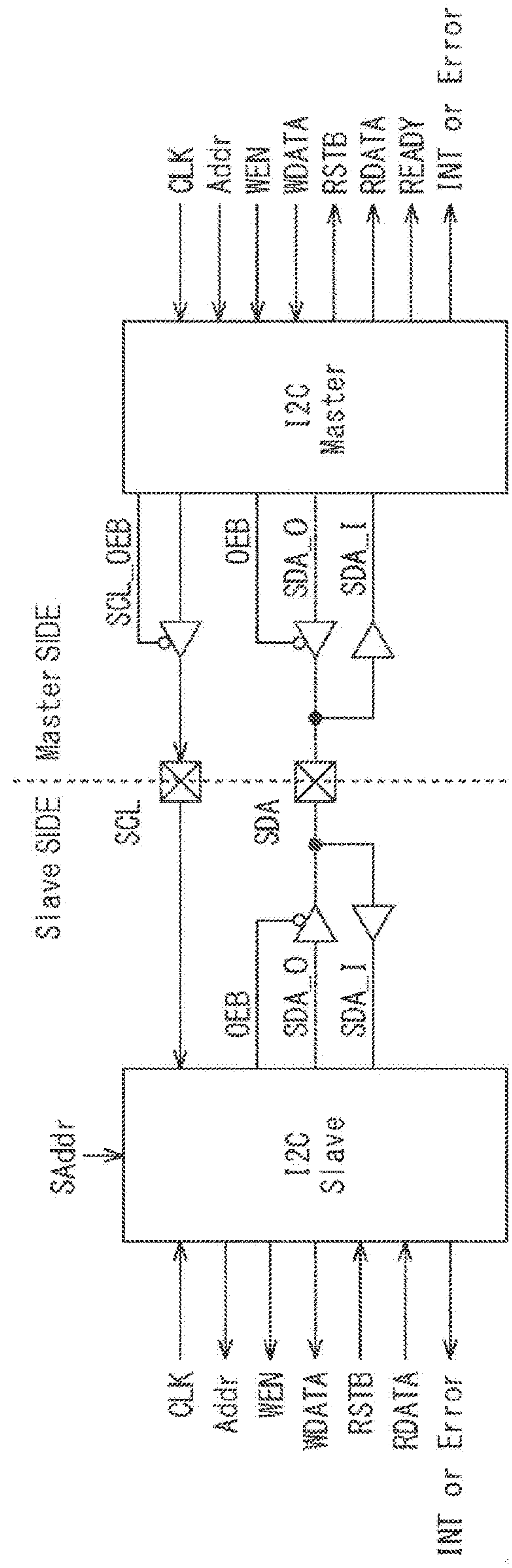
FIG. 61 is a block diagram illustrating a configuration example in conventional I2C hardware.

FIG. 61 illustrates a configuration example in conventional I2C hardware. For example, a configuration example of I2C in a case of a higher-level bus connection configuration is illustrated in hardware implementation, and the slave side may be configured to be able to receive ACK/NACK from the higher level. Of course, the figure merely illustrates an example, and the higher-level bus configurations do not necessarily match.

Figure 62:
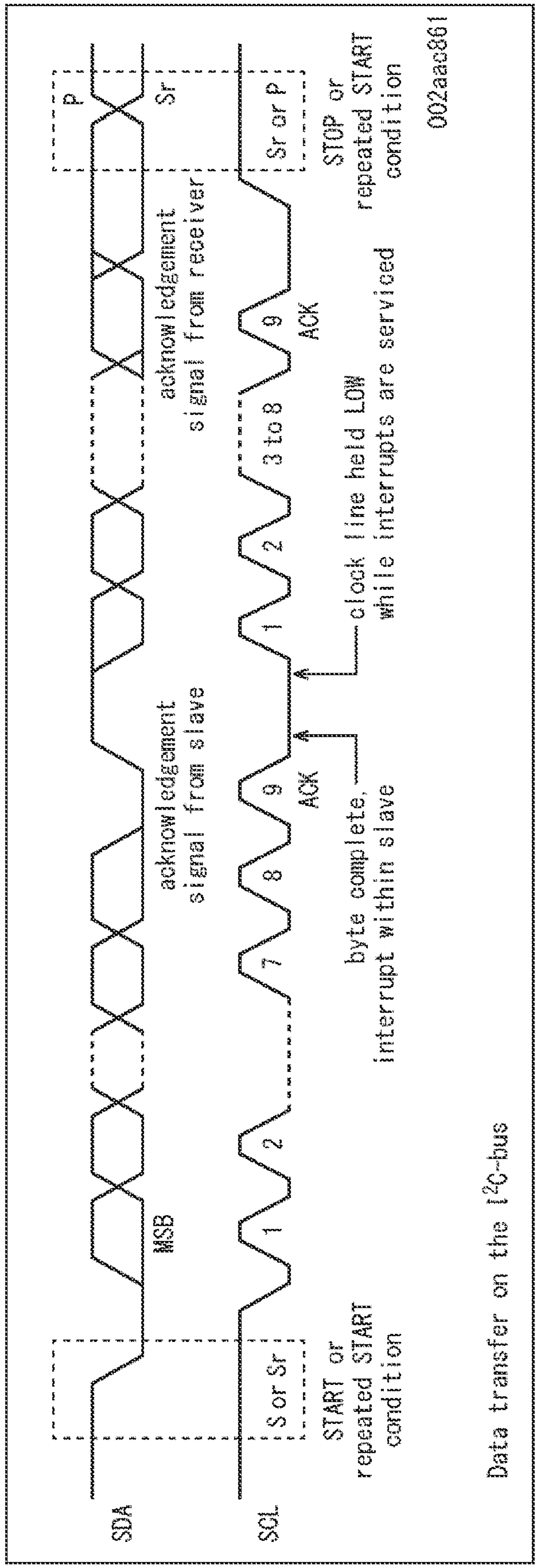
FIG. 62 is a diagram illustrating an example of a waveform at the time of data transfer on an I2C bus.

FIG. 62 illustrates waveforms at the time of data transfer on the I2C bus. Note that the I2C bus standard and CCI (I2C) are equivalent.

<Configuration Example Related to CCI in Communication System 701>

Figure 27:
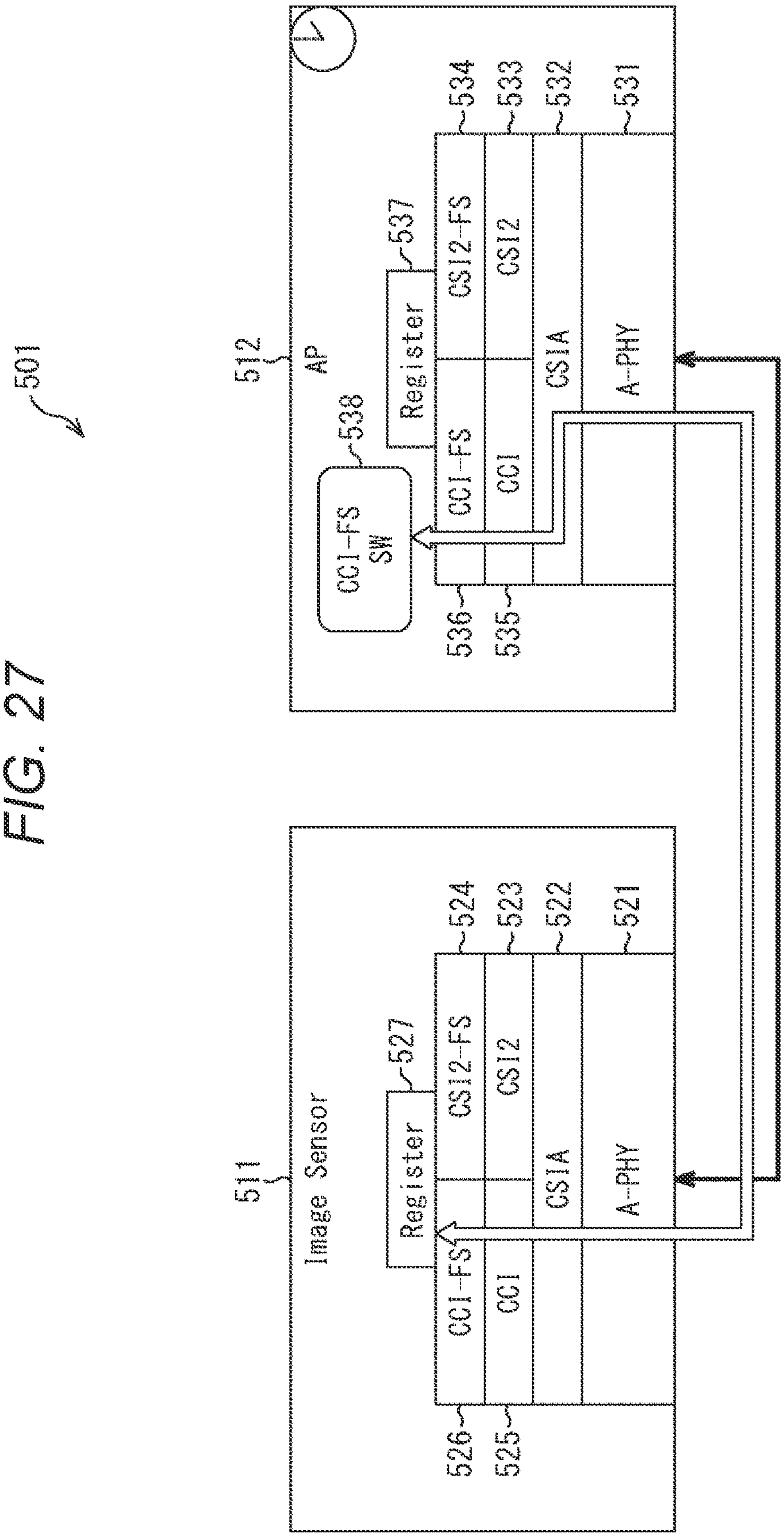
FIG. 27 is a block diagram illustrating a configuration example of a communication system in which an image sensor and an application processor are directly coupled.
Figure 63:
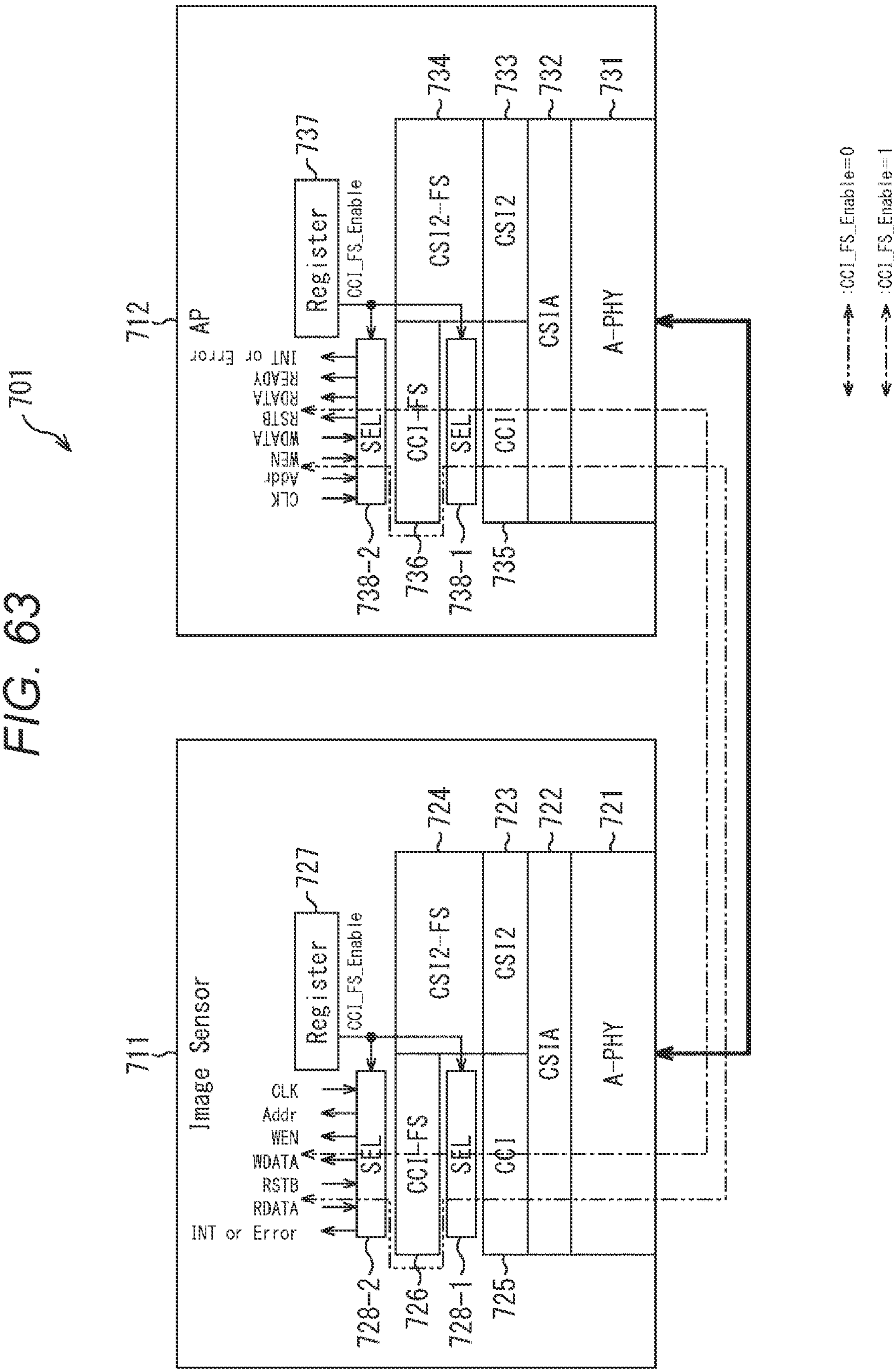
FIG. 63 is a block diagram illustrating a configuration example related to CCI in a communication system having an A-PHY direct-coupled configuration.

FIG. 63 is a block diagram illustrating a configuration example related to CCI in a communication system 701 having an A-PHY direct-coupled configuration, similarly to the communication system 501 illustrated in FIG. 27.

As illustrated in FIG. 63, in the communication system 701, an image sensor 711 and an application processor 712 are directly connected by A-PHY.

The image sensor 711 includes an A-PHY processing unit 721, a CSIA processing unit 722, a CSI2 processing unit 723, a CSI2-FS processing unit 724, a CCI processing unit 725, a CCI-FS processing unit 726, a register 727, and selectors 728-1 and 728-2. As illustrated, the selectors 728-1 and 728-2 are arranged so as to sandwich the CCI-FS processing unit 726, and can switch enable/disable of the CCI-FS processing unit 726 according to a CCI_FS_Enable signal of the register 727.

The application processor 712 includes an A-PHY processing unit 731, a CSIA processing unit 732, a CSI2 processing unit 733, a CSI2-FS processing unit 734, a CCI processing unit 735, a CCI-FS processing unit 736, a register 737, and selectors 738-1 and 738-2. As illustrated, the selectors 738-1 and 738-2 are arranged so as to sandwich the CCI-FS processing unit 736, and can switch enable/disable of the CCI-FS processing unit 736 according to a CCI_FS_Enable signal of the register 737.

For example, in a case where the CCI_FS_Enable signal indicates enabling of the CCI-FS (CCI_FS_Enable=1), data is transmitted and received via the CCI-FS processing unit 726 and the CCI-FS processing unit 736 as indicated by the alternate long and short dash line arrows. On the other hand, in a case where the CCI_FS_Enable signal indicates disabling of the CCI-FS (CCI_FS_Enable=0), data is transmitted and received without passing through the CCI-FS processing unit 726 and the CCI-FS processing unit 736 as indicated by the two-dot chain line arrows.

<Network Connection Form>

Figure 64:
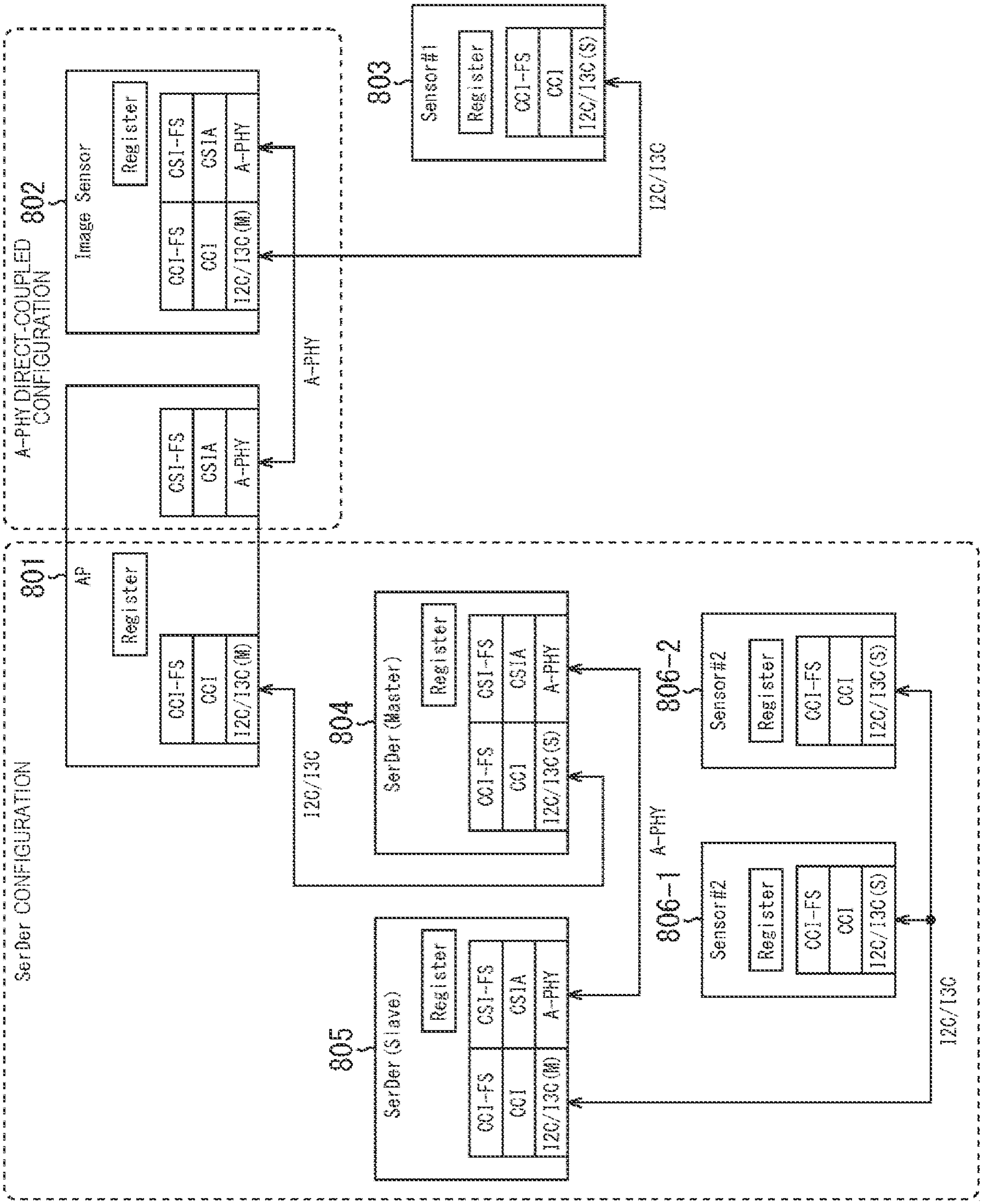
FIG. 64 is a diagram illustrating an example of a connection form of a network.

FIG. 64 illustrates an example of a network connection form (topology) of the A-PHY direct-coupled configuration and the SerDes connection configuration.

A connection form in which an application processor 801 is directly connected to an image sensor 802 via A-PHY, and the image sensor 802 is connected to a sensor 803 via I2C/I3C can be configured.

The application processor 801 is connected to a master-side SerDes device 804 via I2C/I3C, and the master-side SerDes device 804 and a slave-side SerDes device 805 are connected via A-PHY. The slave-side SerDes device 805 can configure a connection form of being connected to two sensors 806-1 and 806-2 via I2C/I3C.

<Circuit Configuration of CCI-FS Processing Unit>

Figure 65:
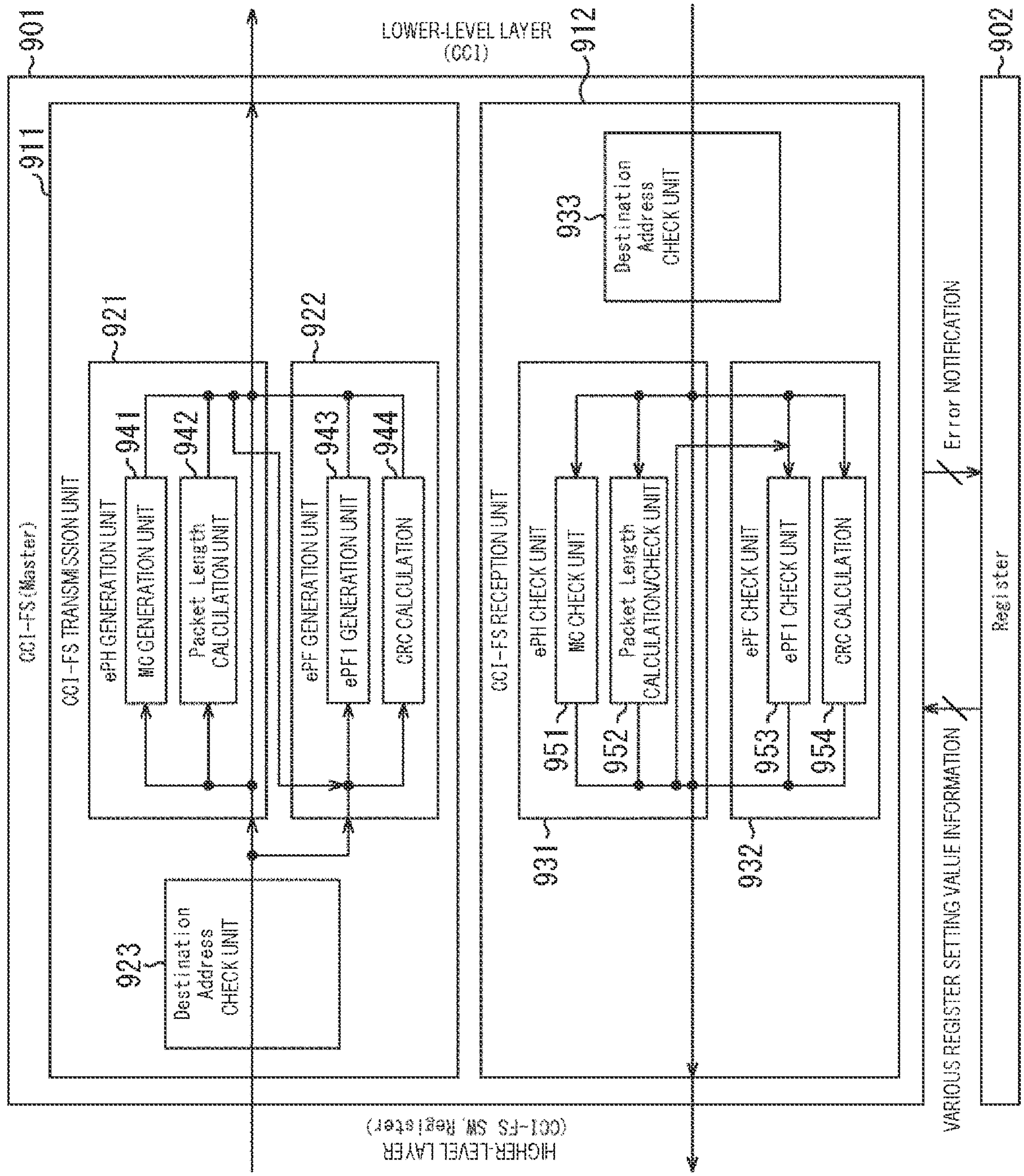
FIG. 65 is a block diagram illustrating an example of a circuit configuration of a CCI-FS processing unit.

FIG. 65 is a block diagram illustrating an example of a circuit configuration of the CCI-FS processing unit. A CCI-FS processing unit 901 and a register 902 illustrated in FIG. 65 are the CCI-FS processing unit and the register included in each device described above and are common configurations.

As illustrated in FIG. 65, the CCI-FS processing unit 901 is provided with a CCI-FS switch, a register, and the like at a higher-level layer, and a CCI processing unit is provided in a lower-level layer. The CCI-FS processing unit 901 includes a CCI-FS transmission unit 911 and a CCI-FS reception unit 912. Various types of register setting value information is supplied from the register 902 to the CCI-FS processing unit 901, and an Error notification is supplied from the CCI-FS processing unit 901 to the register 902.

The CCI-FS transmission unit 911 includes an extended packet header ePH generation unit 921, an extended packet footer ePF generation unit 922, and a Destination Address check unit 923.

The extended packet header ePH generation unit 921 includes an MC generation unit 941 that generates a Message Counter and a Packet Length calculation unit 942 that calculates a packet length. The extended packet footer ePF generation unit 922 includes an extended packet footer ePF1 generation unit 943 that generates the extended packet footer ePF1 and a CRC calculation unit 944 that calculates CRC to be stored in the extended packet footer ePF0.

The CCI-FS reception unit 912 includes an extended packet header ePH check unit 931, an extended packet footer ePF check unit 932, and a Destination Address check unit 933.

The extended packet header ePH check unit 931 includes an MC check unit 951 that checks the Message Counter and a Packet Length calculation/check unit 952 that calculates and checks the packet length. The extended packet footer ePF check unit 932 includes an extended packet footer ePF1 check unit 953 that checks the extended packet footer ePF1 and a CRC calculation unit 954 that calculates CRC to be stored in the extended packet footer ePF0.

The CCI-FS processing unit 901 can check the Destination Address of data from a higher-level layer by the CCI-FS transmission unit 911, generate the extended packet header ePH and the extended packet footer ePF, add the extended packet header ePH and the extended packet footer ePF to the data, and supply the data to a lower-level layer. The CCI-FS processing unit 901 can check the Destination Address of data from the lower-level layer by the CCI-FS reception unit 912, check the extended packet header ePH and the extended packet footer ePF, and supply the data to the higher-level layer.

Here, the operation of the CCI-FS processing unit of each device constituting the communication system 601 of the configuration example of the SerDes connection configuration illustrated in FIG. 40 will be described.

The application processor 614 has the Source ID indicating its own device in the extended packet header ePH in the application processor 614. Then, the CCI-FS processing unit 653 adds the above information and information including the Destination ID indicating a device to get intended access.

The slave-side SerDes device 612 and the master-side SerDes device 613 each has the Source ID indicating its own device by being preset or as an eigenvalue. The CCI-FS processing unit 636 and the CCI-FS processing unit 646 each performs presetting of the above information and information including the Destination ID indicating a connected device and a target device.

Furthermore, the CCI-FS processing unit 636 and the CCI-FS processing unit 646 each compares the received Desination ID of the extended packet header ePH with its own ID (Source ID), and determine whether or not the access is an access to its own device or to the (Desination ID) indicating the target device. For example, when the received Desination ID of the extended packet header ePH matches its own ID (Source ID), its own register access is performed as an access to an intermediate device (SerDes device). Meanwhile, when the received Desination ID of the extended packet header ePH does not match its own ID (Source ID), data transfer is performed toward the connected device (Desination ID) as an access to a subsequent device.

As described above, the data is transferred and the access is made to the target device on the basis of the Source ID and the Destination ID embedded in the extended packet header ePH, the Source ID preset or held as an eigenvalue in the intermediate device (SerDes device) or in the target device, and the preset connection destination information.

For example, when the received Destination ID of the extended packet header ePH matches its own ID (Source ID), the CSI2-FS processing unit 623 of the image sensor 611 performs its own register access as an access to the image sensor 611.

In this manner, as the Source ID held by each device, a value unique to each device, a preset value, or a combination thereof can be used.

FIGS. 66 to 68 are diagrams illustrating detailed configuration examples of the register 902.

FIG. 66 illustrates details of addresses 0x000 to 0x109 of the register 902. FIG. 67 illustrates a configuration example at the time of the Bridge configuration as details of addresses 0x110 to 0x125 of the register 902.

FIG. 68 illustrates the Error-related registers as details of an address 0x200 of the register 902. FIG. 68 illustrates the Error-related registers (debug) as details of an address 0x300 and an address 0x400 of the register 902. FIG. 68 illustrates an Error Injection-related register (debug) as details of an address 0x800 of the register 902.

<Modifications of Extended Packet Header ePH>

Modifications of the extended packet header ePH will be described with reference to FIGS. 69 and 70.

Figure 69:
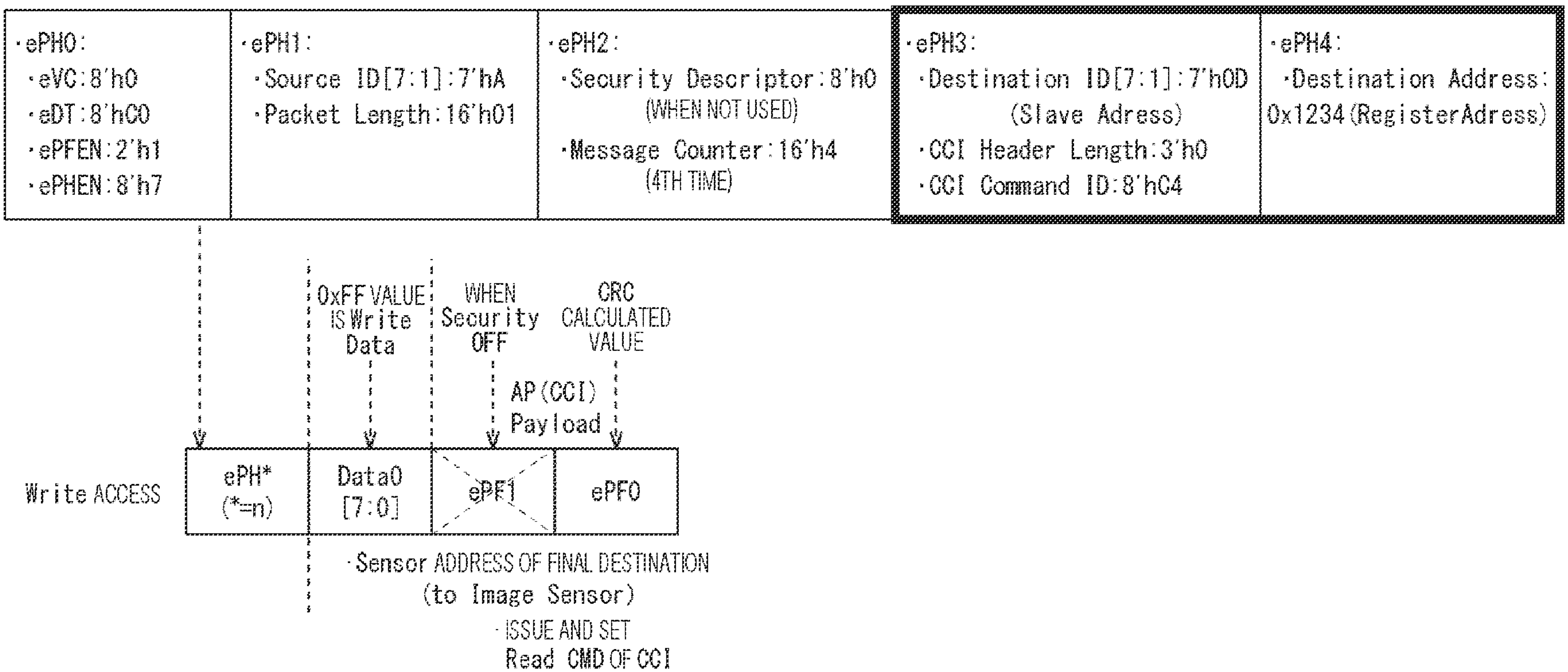
FIG. 69 is a diagram illustrating a modification of an extended packet header ePH in a packet configuration of write data generated on the application processor side.

FIG. 69 illustrates a modification of the extended packet header ePH in the packet configuration of the write data generated by the CCI-FS processing unit 536 of the application processor 512 at the time of write access as described with reference to FIG. 33. The extended packet header ePH illustrated in FIG. 69 is different from the above-described configuration example illustrated in FIG. 33 in the configurations of the extended packet header ePH3 and the extended packet header ePH4.

Figure 70:
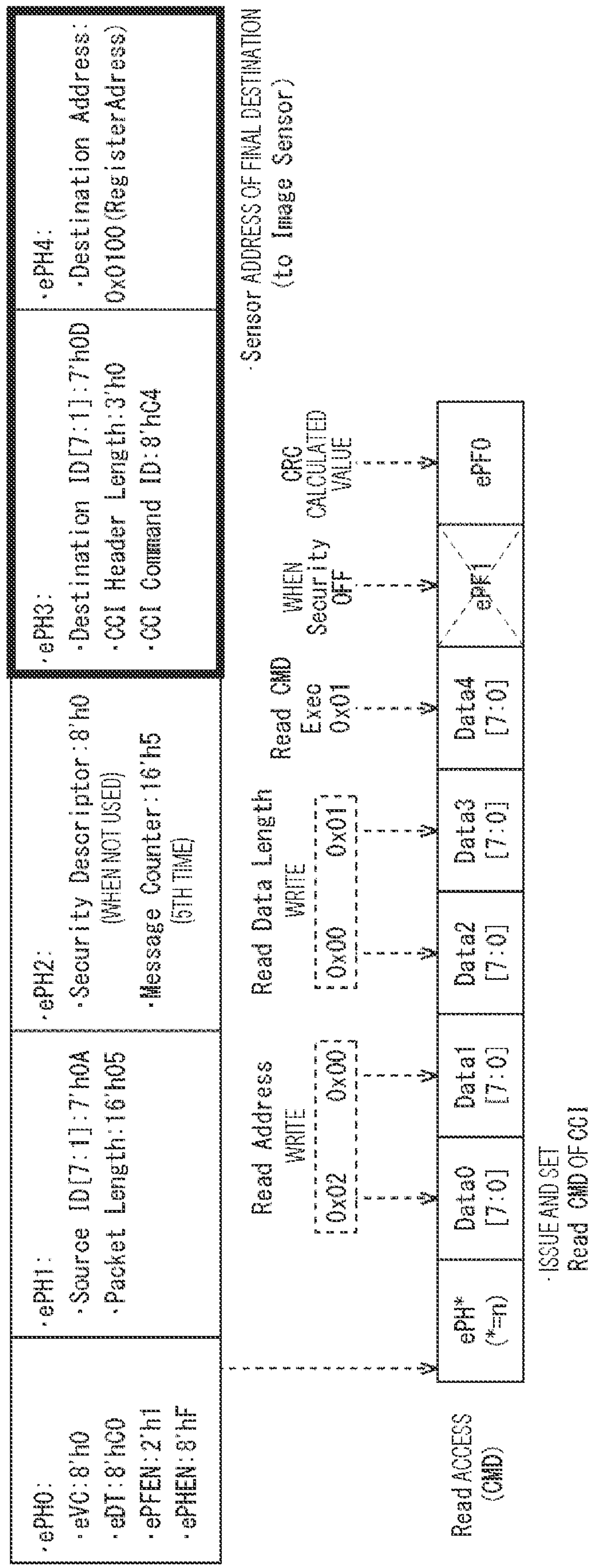
FIG. 70 is a diagram illustrating a modification of an extended packet header ePH in a packet configuration of a read command generated on the application processor side.

FIG. 70 illustrates a modification of the extended packet header ePH in the packet configuration of the write data generated in the CCI-FS processing unit 536 of the application processor 512 at the time of read access as described with reference to FIG. 28. The extended packet header ePH illustrated in FIG. 70 is different from the above-described configuration example illustrated in FIG. 28 in the configurations of the extended packet header ePH3 and the extended packet header ePH4.

For example, in the extended packet headers ePH illustrated in FIGS. 69 and 70, the following combination is assumed depending on implementation.

Read address information may be stored in the extended packet header ePH or may be stored in an AP (CCI) payload. Length information may be stored in the extended packet header ePH or may be stored in an AP (CCI) payload. CMD information may be stored in a CCI Command ID of the extended packet header ePH. Start, resume, and end information of a command is referred to on the basis of the CCI Command ID. CCI information (for example, Slave Address or the like) may be stored in the AP (CCI) payload, using CCI Header Length. The CCI Header Length is information indicating the header length of a CCI protocol (I2C).

Figure 71:
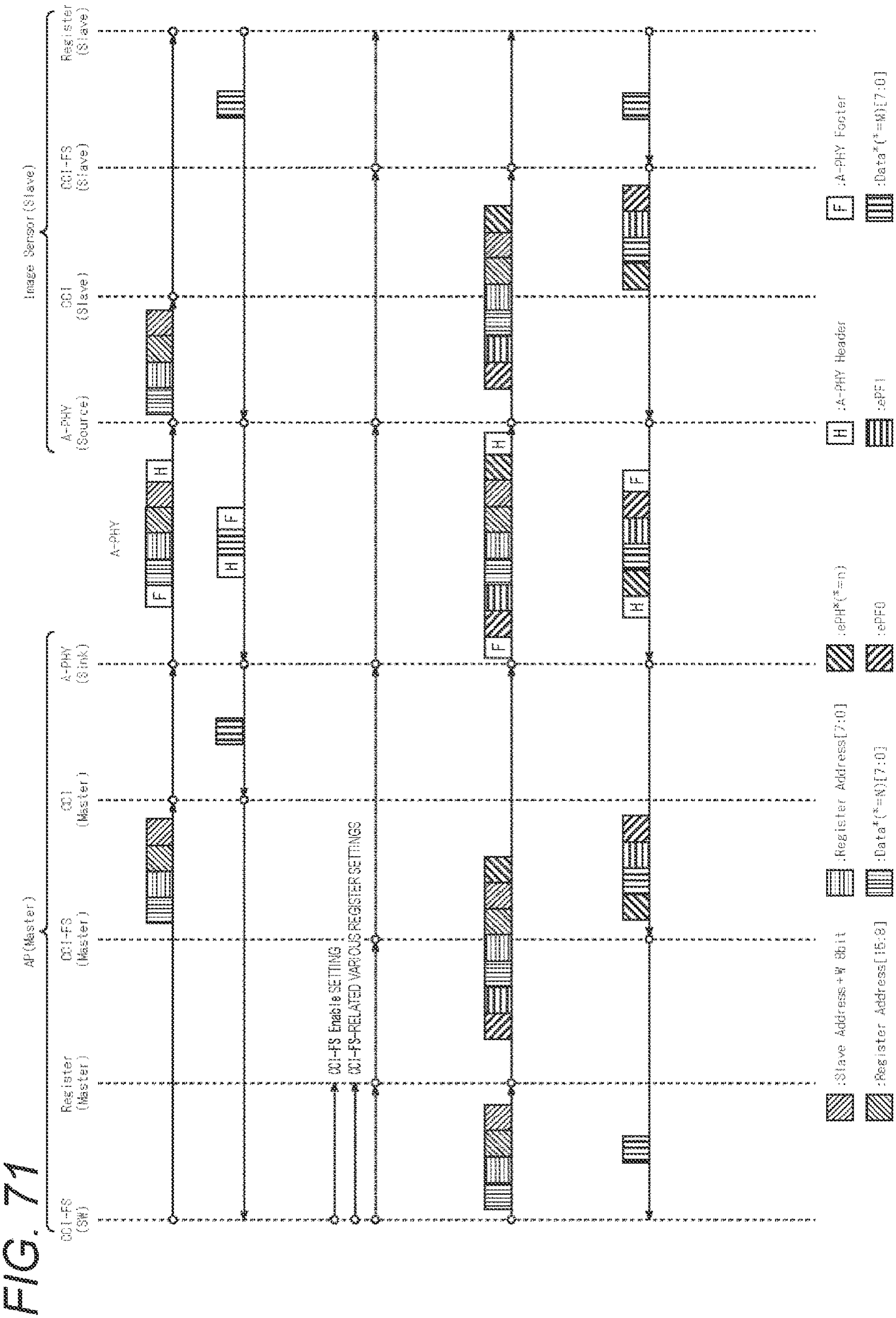
FIG. 71 is a diagram for describing a flow between an application processor and an image sensor in an A-PHY direct-coupled configuration.

FIG. 71 is a diagram illustrating a flow between the image sensor 511 and the application processor 512 in the A-PHY direct-coupled configuration as illustrated in FIG. 27.

In the application processor 512, the CCI-FS switch 538 issues the read command and the write command. The CCI-FS switch 538 supplies the slave address (Slave Address+W 8 bits), the register addresses (Register Address [15:8] and Register Address[7:0]), and data (Data*(*=N) [7:0]) to the CCI processing unit 535. The CCI processing unit 535 converts the supplied data into an AP (CCI) payload and supplies the converted payload to the A-PHY processing unit 531. The A-PHY processing unit 531 adds an A-PHY header and an A-PHY footer to the AP (CCI) payload and performs A-PHY transfer to the image sensor 511.

In the image sensor 511, the A-PHY processing unit 521 removes the A-PHY header and the A-PHY footer and supplies the AP (CCI) payload to the CCI processing unit 525. The CCI processing unit 525 converts the AP (CCI) payload, and writes data to the register 527 according to the write command and reads data from the register 527 according to the read command on the basis of the content of the payload.

At this time, initial setting of CCI-FS Enable is performed by the CCI processing unit 525, and bus conversion of a register interface, an AHB bus, and the like is performed. Then, check of the CCI-FS Enable setting is performed via the CCI processing unit 525 or the CCI-FS processing unit 526.

The CCI processing unit 525 converts the read data (Data*(*=M) [7:0]) read from the register 527 in response to the read command into an AP (CCI) payload and supplies the AP (CCI) payload to the A-PHY processing unit 521. The A-PHY processing unit 521 adds an A-PHY header and an A-PHY footer to the AP (CCI) payload and performs A-PHY transfer to the application processor 512.

In the application processor 512, the A-PHY processing unit 531 removes the A-PHY header and the A-PHY footer and supplies the AP (CCI) payload to the CCI processing unit 535. The CCI processing unit 535 converts the AP (CCI) payload and supplies the read data (Data*(*=M) [7:0]) to the CCI-FS switch 538.

The CCI-FS switch 538 performs CCI-FS Enable setting and CCI-FS related-various register settings on the register 537. The register access then depends on the implementation. The CCI-FS switch 538 performs the CCI-FS related-various register settings on the register 527 via the register 537, the CCI-FS processing unit 536, the A-PHY processing unit 531, the A-PHY processing unit 521, and the CCI-FS processing unit 526.

In the application processor 512, the CCI-FS switch 538 issues the read command. The CCI-FS switch 538 supplies the slave address (Slave Address+W 8 bits), the register addresses (Register Address[15:8] and Register Address[7:0]), and data (Data*(*=N) [7:0]) to the register 537. The CCI-FS processing unit 536 converts the supplied data into an AP (CCI) payload, adds an extended packet header ePH*(*=n), the extended packet footer ePF1, and the extended packet footer ePF0, and supplies the AP (CCI) payload to the A-PHY processing unit 531. The A-PHY processing unit 531 adds an A-PHY header and an A-PHY footer to the AP (CCI) payload, and performs A-PHY transfer to the image sensor 511.

In the image sensor 511, the A-PHY processing unit 521 removes the A-PHY header and the A-PHY footer, and supplies the extended packet header ePH*(*=n), the AP (CCI) payload, the extended packet footer ePF1, and the extended packet footer ePF0 to the CCI-FS processing unit 526. The CCI-FS processing unit 526 converts the AP (CCI) payload, and reads data from the register 527 according to the read command on the basis of the content of the AP (CCI) payload. At this time, the register access depends on the implementation, and bus conversion of a register interface, an AHB bus, and a CCI interface is performed.

The CCI-FS processing unit 526 converts the read data (Data*(*=M) [7:0]) read from the register 527 according to the read command into an AP (CCI) payload, adds an extended packet header ePH*(*=n), the extended packet footer ePF1, and the extended packet footer ePF0, and supplies the AP (CCI) payload to the A-PHY processing unit 521. The A-PHY processing unit 521 adds an A-PHY header and an A-PHY footer to the AP (CCI) payload and performs A-PHY transfer to the application processor 512.

In the application processor 512, the A-PHY processing unit 531 removes the A-PHY header and the A-PHY footer, and supplies the extended packet header ePH*(*=n), the AP (CCI) payload, the extended packet footer ePF1, and the extended packet footer ePF0 to the CCI-FS processing unit 536. The CCI-FS processing unit 536 converts the AP (CCI) payload and supplies the read data (Data*(*=M) [7:0]) to the CCI-FS switch 538.

Note that the above-described flow has been described by taking the generation of the I2C/I3C command by hardware as an example, but there are other combinations as follows.

In the case of software, Slave Address, Register address, Payload, ACK response reception, transmission, and various control codes (S, Sr, ACK, NACK, and P) are generated (for example, an image of GPIO control) by software as the I2C/I3C generation by software. As the I2C/I3C command generation by software, the Slave Address, the Register address, and the Payload are issued from a CPU in response to the ACK reception in the CPU bus setting.

In the case of hardware, transfer setting and data are set in an HW IP of I2C/I3C as the I2C/I3C generation by hardware. The various control codes automatically respond in hardware. As the I2C/I3C command generation by hardware, data is set in the HW IP of I2C/I3C with the transfer setting, and transmission is performed by the command. The various control codes automatically respond in hardware.

Figure 72:
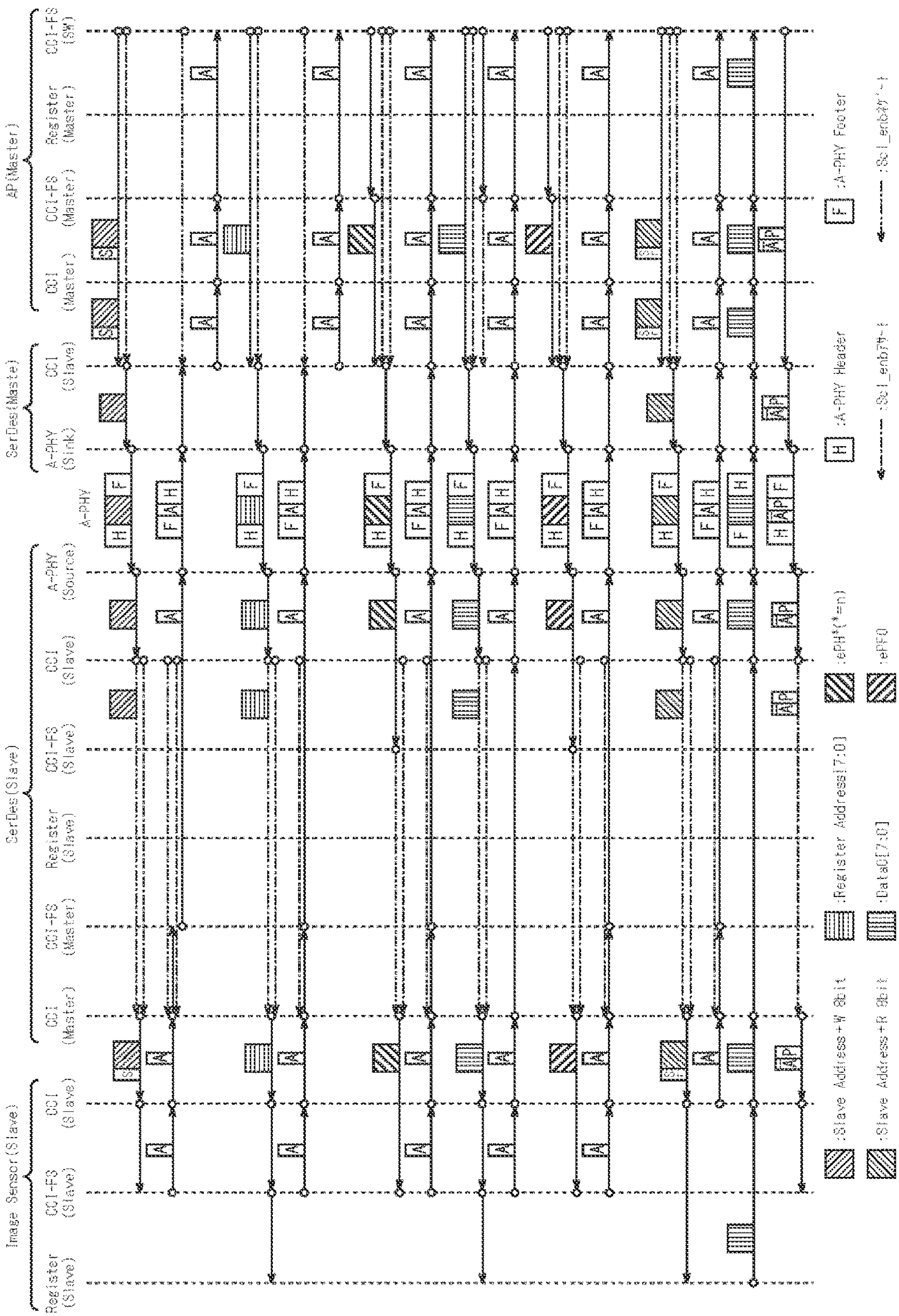
FIG. 72 is a diagram for describing a flow using a Clock Stretch method.

FIG. 72 is a diagram illustrating a flow using the Clock Stretch method in the Write access and the Read access between the image sensor 611 and the application processor 614 in the SerDes connection configuration as illustrated in FIG. 40.

The CCI-FS switch 655 of the application processor 614 supplies the start command and the write command (Slave Address+W 8 bits) to the CCI processing unit 645 of the master-side SerDes device 613, and asserts an Scl_enb signal. In the master-side SerDes device 613, the CCI processing unit 645 supplies the write command to the A-PHY processing unit 641, and the A-PHY processing unit 641 adds an A-PHY header and an A-PHY footer to the write command and performs A-PHY transfer to the slave-side SerDes device 612.

In the slave-side SerDes device 612, the A-PHY processing unit 631 removes the A-PHY header and the A-PHY footer, and supplies the write command to the CCI processing unit 635 (Slave). The CCI processing unit 635 (Slave) negates the Scl_enb signal and supplies the write command to the CCI processing unit 635 (Master). Here, the CCI processing unit 635 that performs communication with the master-side SerDes device 613 and functions as a slave is referred to as the CCI processing unit 635 (Slave), and the CCI processing unit 635 that performs communication with the image sensor 611 side and functions as a master is referred to as the CCI processing unit 635 (Master).

The CCI processing unit 635 (Master) transmits the start command and the write command to the image sensor 611.

In the image sensor 611, the CCI processing unit 622 receives the start command and the write command and supplies the commands to the CSI2-FS processing unit 623. The CSI2-FS processing unit 623 supplies an ACK response indicating that the reception is successful to the CCI processing unit 622, and the CCI processing unit 622 transmits the ACK response to the slave-side SerDes device 612.

In the slave-side SerDes device 612, when the CCI processing unit 635 (Master) receives the ACK response and the Scl_enb signal is negated from the CCI processing unit 635 (Slave), the ACK response is supplied to the CCI-FS processing unit 636. Thereafter, the CCI processing unit 635 (Slave) asserts the Scl_enb signal to the CCI processing unit 635 (Master).

The CCI-FS processing unit 636 supplies the ACK response to the A-PHY processing unit 631. The A-PHY processing unit 631 adds an A-PHY header and an A-PHY footer to the ACK response, and performs A-PHY transfer to the master-side SerDes device 613.

In the master-side SerDes device 613, the A-PHY processing unit 641 removes the A-PHY header and the A-PHY footer, and supplies the ACK response to the CCI processing unit 645. When the CCI-FS switch 655 of the application processor 614 negates the Scl_enb signal to the CCI processing unit 645, the CCI processing unit 645 transmits the ACK response to the application processor 614.

In the application processor 614, the CCI processing unit 652 receives the ACK response and supplies the ACK response to the CCI-FS switch 655 via the CCI-FS processing unit 653.

The CCI-FS switch 655 of the application processor 614 supplies the register address (Register Address[7:0]) to the CCI processing unit 645 of the master-side SerDes device 613, and asserts the Scl_enb signal. In the master-side SerDes device 613, the CCI processing unit 645 supplies the register address to the A-PHY processing unit 641, and the A-PHY processing unit 641 adds an A-PHY header and an A-PHY footer to the register address and performs A-PHY transfer to the slave-side SerDes device 612.

In the slave-side SerDes device 612, the A-PHY processing unit 631 removes the A-PHY header and the A-PHY footer, and supplies the register address to the CCI processing unit 635 (Slave). The CCI processing unit 635 (Slave) negates the Scl_enb signal and supplies the register address to the CCI processing unit 635 (Master). The CCI processing unit 635 (Master) transmits the register address to the image sensor 611. Thereafter, the CCI processing unit 635 (Slave) asserts the Scl_enb signal to the CCI processing unit 635 (Master).

In the image sensor 611, the CCI processing unit 622 receives the register address and supplies the register address to the CSI2-FS processing unit 623. The CSI2-FS processing unit 623 supplies an ACK response indicating that the reception is successful to the CCI processing unit 622, and the CCI processing unit 622 transmits the ACK response to the slave-side SerDes device 612.

Thereafter, similarly to the above-described processing, the ACK response is supplied to the CCI-FS switch 655.

In the application processor 614, the CCI-FS processing unit 653 transmits the extended packet header ePH*(*=n) to the master-side SerDes device 613 under the control of the CCI-FS switch 655.

In the master-side SerDes device 613, when the CCI processing unit 645 receives the extended packet header ePH*(*=n) and the Scl_enb signal is asserted from the CCI-FS switch 655, the extended packet header ePH*(*=n) is supplied to the A-PHY processing unit 641. Thereafter, the CCI-FS switch 655 negates the Scl_enb signal to the CCI processing unit 645. The A-PHY processing unit 641 adds an A-PHY header and an A-PHY footer to the extended packet header ePH*(*=n) and performs A-PHY transfer to the slave-side SerDes device 612.

In the slave-side SerDes device 612, the A-PHY processing unit 631 removes the A-PHY header and the A-PHY footer, and supplies the extended packet header ePH*(*=n) to the CCI-FS processing unit 636. The CCI-FS processing unit 636 negates the Scl_enb signal and supplies the extended packet header ePH*(*=n) to the CCI processing unit 635 (Master). The CCI processing unit 635 (Master) transmits the extended packet header ePH*(*=n) to the image sensor 611. Thereafter, the CCI processing unit 635 (Slave) asserts the Scl_enb signal to the CCI processing unit 635 (Master).

In the image sensor 611, the CSI2-FS processing unit 623 receives the extended packet header ePH*(*=n). The CSI2-FS processing unit 623 supplies an ACK response indicating that the reception is successful to the CCI processing unit 622, and the CCI processing unit 622 transmits the ACK response to the slave-side SerDes device 612.

Thereafter, similarly to the above-described processing, the ACK response is supplied to the CCI-FS switch 655.

The CCI-FS switch 655 of the application processor 614 supplies the write data (Dara0[7:0]) to the CCI processing unit 645 of the master-side SerDes device 613, and asserts the Scl_enb signal. In the master-side SerDes device 613, the CCI processing unit 645 supplies the write data to the A-PHY processing unit 641, and the A-PHY processing unit 641 adds an A-PHY header and an A-PHY footer to the write data and performs A-PHY transfer to the slave-side SerDes device 612.

In the master-side SerDes device 613, when the CCI processing unit 645 receives the write data and the Scl_enb signal is asserted from the CCI-FS switch 655, the write data is supplied to the A-PHY processing unit 641. Thereafter, the CSI2-FS processing unit 653 negates the Scl_enb signal to the CCI processing unit 645 under the control of the CCI-FS switch 655. The A-PHY processing unit 641 adds an A-PHY header and an A-PHY footer to the write data and performs the A-PHY transfer to the slave-side SerDes device 612.

In the slave-side SerDes device 612, the A-PHY processing unit 631 removes the A-PHY header and the A-PHY footer, and supplies the write data to the CCI processing unit 635. The CCI processing unit 635 negates the Scl_enb signal and supplies the write data to the CCI processing unit 635 (Master). The CCI processing unit 635 (Master) transmits the write data to the image sensor 611. Thereafter, the CCI processing unit 635 (Slave) asserts the Scl_enb signal to the CCI processing unit 635 (Master).

In the image sensor 611, the CCI processing unit 622 receives the write data and supplies the write data to the CSI2-FS processing unit 623, and the CSI2-FS processing unit 623 writes the write data in the register 624. The CSI2-FS processing unit 623 supplies an ACK response indicating that the write data is successfully written to the CCI processing unit 622, and the CCI processing unit 622 transmits the ACK response to the slave-side SerDes device 612.

Thereafter, similarly to the above-described processing, the ACK response is supplied to the CCI-FS switch 655.

In the application processor 614, the CCI-FS processing unit 653 transmits the extended packet footer ePF0 to the master-side SerDes device 613 under the control of the CCI-FS switch 655.

In the master-side SerDes device 613, when the CCI processing unit 645 receives the extended packet footer ePF0 and the Scl_enb signal is asserted from the CCI-FS switch 655, the extended packet footer ePF0 is supplied to the A-PHY processing unit 641. Thereafter, the CCI-FS switch 655 negates the Scl_enb signal to the CCI processing unit 645. The A-PHY processing unit 641 adds an A-PHY header and an A-PHY footer to the extended packet footer ePF0, and performs the A-PHY transfer to the slave-side SerDes device 612.

In the slave-side SerDes device 612, the A-PHY processing unit 631 removes the A-PHY header and the A-PHY footer and supplies the extended packet footer ePF0 to the CCI-FS processing unit 636. The CCI-FS processing unit 636 negates the Scl_enb signal and supplies the extended packet footer ePF0 to the CCI processing unit 635 (Master). The CCI processing unit 635 (Master) transmits the extended packet footer ePF0 to the image sensor 611. Thereafter, the CCI processing unit 635 (Slave) asserts the Scl_enb signal to the CCI processing unit 635 (Master).

In image sensor 611, the CSI2-FS processing unit 623 receives the extended packet footer ePF0. The CSI2-FS processing unit 623 supplies an ACK response indicating that the reception is successful to the CCI processing unit 622, and the CCI processing unit 622 transmits the ACK response to the slave-side SerDes device 612.

Thereafter, similarly to the above-described processing, the ACK response is supplied to the CCI-FS switch 655.

The CCI-FS switch 655 of the application processor 614 supplies the repeat command and the read command (Slave Address+R 8 bits) to the CCI processing unit 645 of the master-side SerDes device 613, and asserts an Scl_enb signal. In the master-side SerDes device 613, the CCI processing unit 645 supplies the read command to the A-PHY processing unit 641, and the A-PHY processing unit 641 adds an A-PHY header and an A-PHY footer to the read command and performs the A-PHY transfer to the slave-side SerDes device 612.

In the slave-side SerDes device 612, the A-PHY processing unit 631 removes the A-PHY header and the A-PHY footer, and supplies the read command to the CCI processing unit 635 (Slave). The CCI processing unit 635 (Slave) negates the Scl_enb signal and supplies the read command to the CCI processing unit 635 (Master). The CCI processing unit 635 (Master) transmits the repeat start command and the read command to the image sensor 611.

In the image sensor 611, the CCI processing unit 622 receives the repeat start command and the read command and accesses the register 624. The CCI processing unit 622 transmits the ACK response indicating that the reception is successful to the slave-side SerDes device 612.

Thereafter, similarly to the above-described processing, the ACK response is supplied to the CCI-FS switch 655.

In the image sensor 611, the CCI processing unit 622 reads the read data (Data0[7:0]) from the register 624 and transmits the read data to the slave-side SerDes device 612.

In the slave-side SerDes device 612, the CCI processing unit 635 (Master) receives the read data and supplies the read data to the CCI processing unit 635 (Slave), and the CCI processing unit 635 (Slave) supplies the read data to the A-PHY processing unit 631. The A-PHY processing unit 631 adds an A-PHY header and an A-PHY footer to the read data, and performs the A-PHY transfer to the master-side SerDes device 613.

In the master-side SerDes device 613, the A-PHY processing unit 641 removes the A-PHY header and the A-PHY footer and supplies the read data to the CCI processing unit 645, and the CCI processing unit 645 transmits the read data to the application processor 614.

In the application processor 614, the CCI processing unit 652 receives the read data and supplies the read data to the CCI-FS switch 655 via the CCI-FS processing unit 653.

The CCI-FS switch 655 transmits a NACK response and the stop command to the CCI processing unit 645. The CCI processing unit 645 supplies the NACK response and the stop command to the A-PHY processing unit 641. The A-PHY processing unit 641 adds an A-PHY header and an A-PHY footer to the NACK response and the stop command, and performs the A-PHY transfer to the slave-side SerDes device 612.

In the slave-side SerDes device 612, the A-PHY processing unit 631 removes the A-PHY header and the A-PHY footer, and supplies the NACK response and the stop command to the CCI processing unit 635 (Slave). The CCI processing unit 635 (Slave) supplies the NACK response and the stop command to the CCI processing unit 635 (Master), and the CCI processing unit 635 (Master) transmits the NACK response and the stop command to the image sensor 611.

In the image sensor 611, the CCI processing unit 622 receives the NACK response and the stop command, and supplies the NACK response and the stop command to the CSI2-FS processing unit 623.

Note that, in the flow described with reference to FIG. 72, each of the I2C control commands such as the start, repeat start, ACK response, NACK response, and stop indicates each code in which Control Code Indicator of the extended packet header ePH0 is set to 1, and which is allocated to one-byte payload.

<Detailed Configuration Examples of Image Sensor and Application Processor>

(Detailed Configuration Example of Image Sensor)

Figure 73:
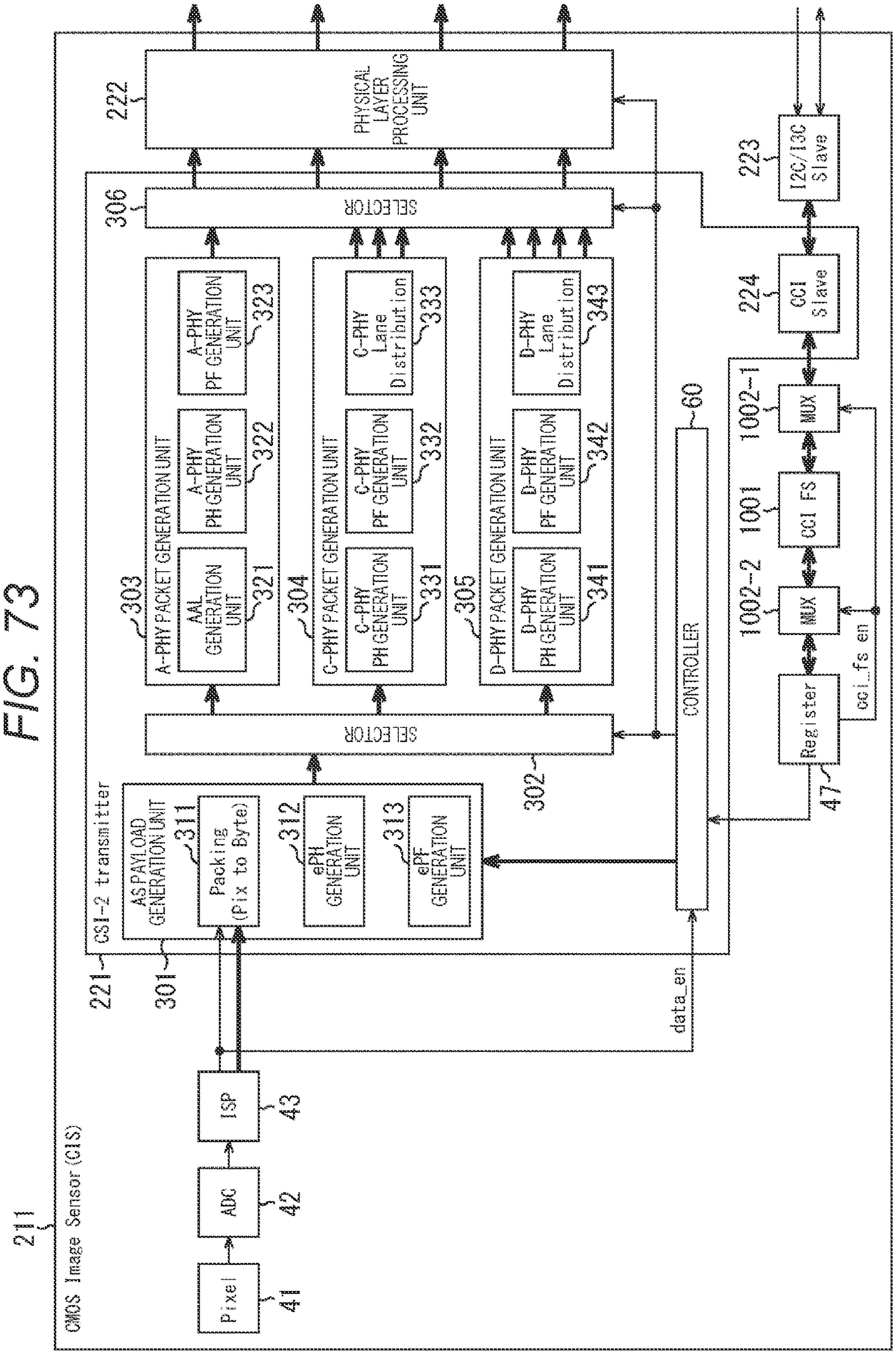
FIG. 73 is a block diagram illustrating a detailed configuration example of an image sensor including a CCI-FS processing unit.

FIG. 73 is a block diagram illustrating a configuration example of a configuration in which the above-described image sensor 211 illustrated in FIG. 25 includes a CCI-FS processing unit 1001. Note that, in the image sensor 211 illustrated in FIG. 73, configurations common to those of the image sensor 211 in FIG. 25 are denoted by the same reference numerals, description thereof is omitted.

As illustrated in FIG. 73, the CCI-FS processing unit 1001 is arranged between the CCI slave 224 and the register 47, and MUX units 1002-1 and 1002-2 are arranged so as to sandwich the CCI-FS processing unit 1001. In a case where the CCI-FS processing unit 1001 is enabled according to a cci_fs_en signal supplied from the register 47, the MUX units 1002-1 and 1002-2 transmit and receive data via the CCI-FS processing unit 1001. On the other hand, in a case where the CCI-FS processing unit 1001 is disabled according to the cci_fs_en signal supplied from the register 47, the MUX units 1002-1 and 1002-2 transmit and receive data without passing through the CCI-FS processing unit 1001.

(Detailed Configuration Example of Application Processor)

Figure 74:
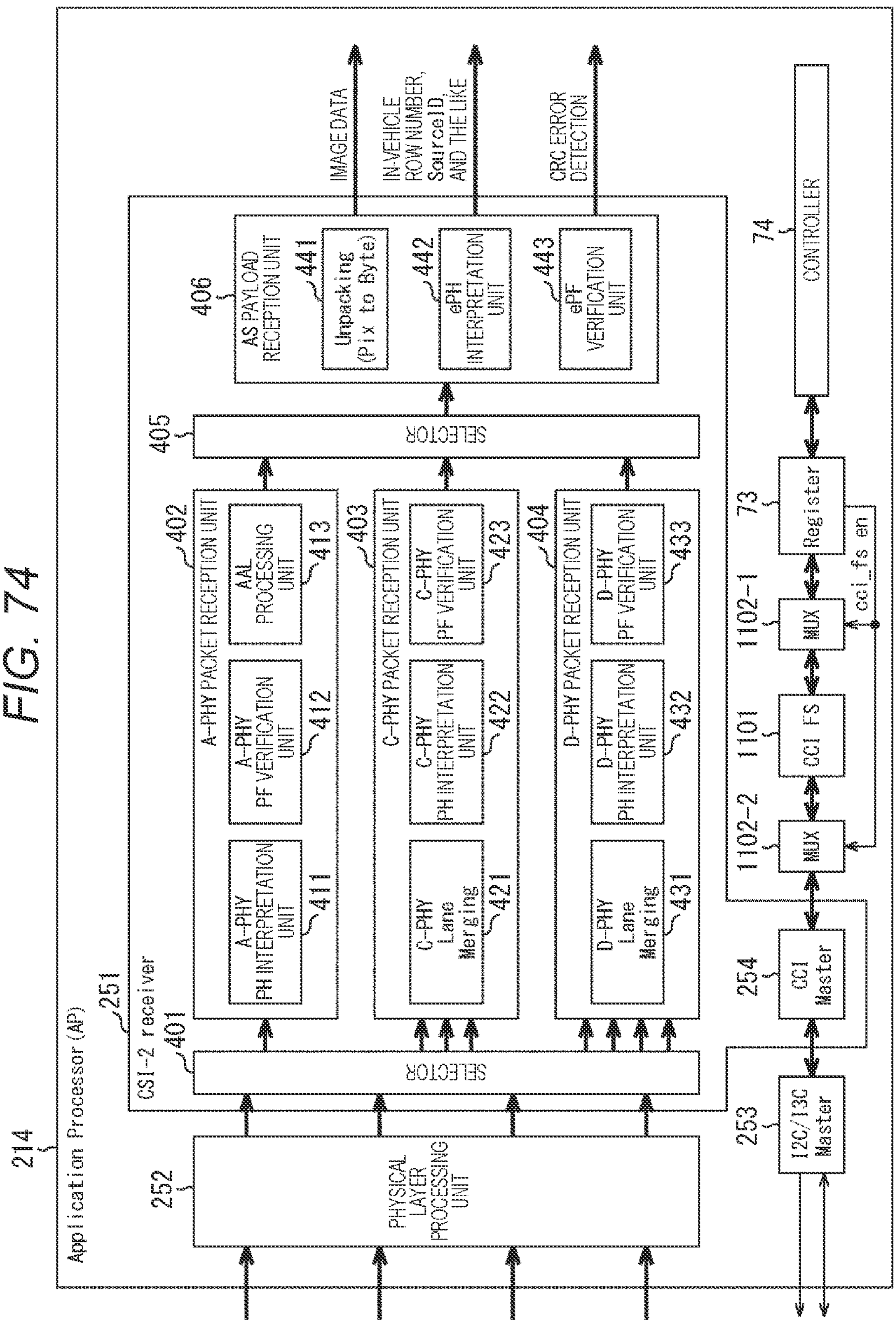
FIG. 74 is a block diagram illustrating a detailed configuration example of an application processor including a CCI-FS processing unit.

FIG. 74 is a block diagram illustrating a configuration example of a configuration in which the above-described application processor 214 illustrated in FIG. 26 includes a CCI-FS processing unit 1101. Note that, in the application processor 214 illustrated in FIG. 74, configurations common to those of the application processor 214 in FIG. 26 are denoted by the same reference numerals, and detailed description thereof is omitted.

As illustrated in FIG. 74, the CCI-FS processing unit 1101 is arranged between the CCI master 254 and the register 73, and MUX units 1102-1 and 1102-2 are arranged so as to sandwich the CCI-FS processing unit 1101. In a case where the CCI-FS processing unit 1101 is enabled according to the cci_fs_en signal supplied from the register 73, the MUX units 1102-1 and 1102-2 transmit and receive data via the CCI-FS processing unit 1101. On the other hand, in a case where the CCI-FS processing unit 1101 is disabled according to the cci_fs_en signal supplied from the register 73, the MUX units 1102-1 and 1102-2 transmit and receive data without passing through the CCI-FS processing unit 1101.

Note that the following configuration may be adopted as a method of implementing each field in the configuration of the extended packet header ePH.—The extended VC is unused in Safe CCI. (A similar configuration is used to match Header field with the extended header-related configuration in MIPI)

In the extended DT, the field may be embedded in information related to a command of a bus from a higher level or may have an implementation configuration of setting of a signal line from the register setting.—Although Protocol is described in I2C, similar matters can be implemented in an SDR mode of I3C.

<Configuration Example of Communication System>

A fourth embodiment of a communication system to which the present technology is applied will be described with reference to FIGS. 75A, 75B, 76, 77, 78, 79, 80, 81A, 81B, 81C, 81D, 82A, 82B, 82C, 82D, 83, 84, 85A, 85B, 86, 87, 88, 89, 90, 91, 92, 93, 94, 95, 96, 97, 98, 99, 100, 101, 102, 103, 104, 105, 106, 107, 108, 109, 110, 111, 112A, 112B, 113A, 113B, 113C, 113D, 113E, 114, 115, 116, 117A, and 117B.

Figure 75A:
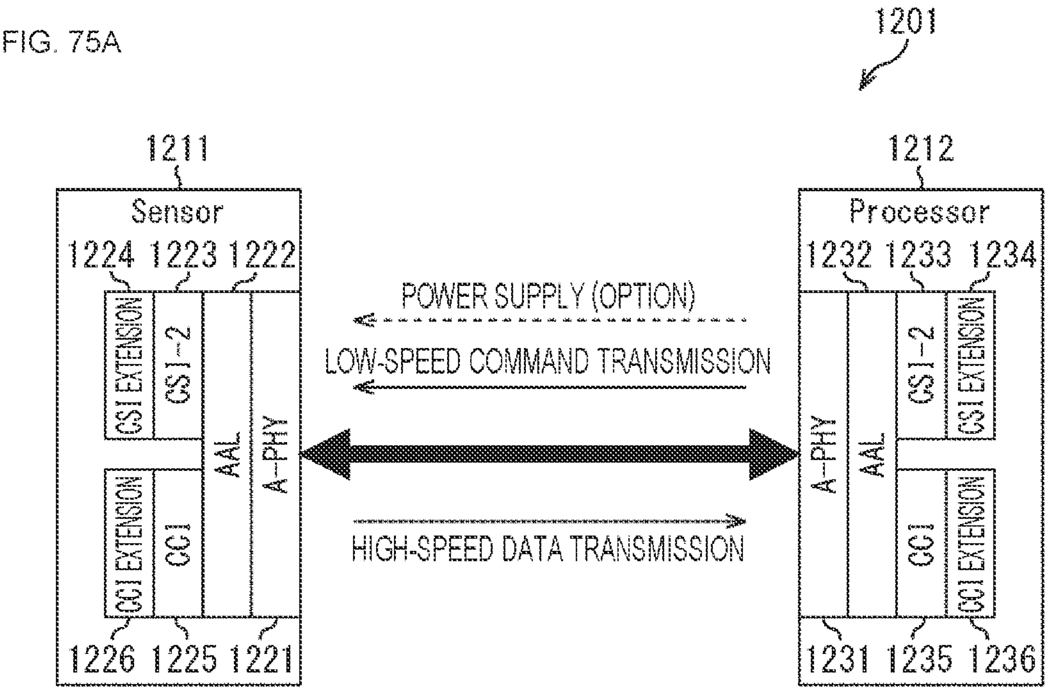
FIGS. 75A and 75B are block diagrams illustrating a configuration example of a fourth embodiment of a communication system to which the present technology is applied.
Figure 75B:
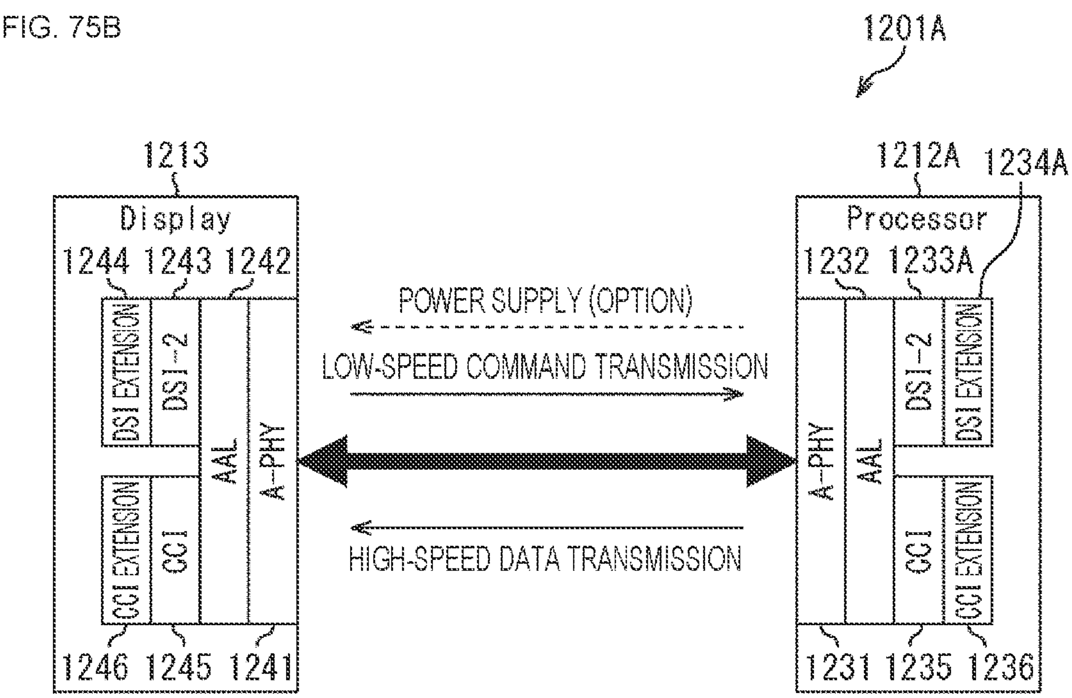

FIGS. 75A and 75B are block diagrams of the communication system according to the fourth embodiment. FIG. 75A illustrates a communication system 1201 as a first variation, and FIG. 75B illustrates a communication system 1201A as a second variation.

A communication system 1201 illustrated in-A of FIG. 75A is configured by directly connecting an image sensor 1211 and an application processor 1212.

The image sensor 1211 has a configuration in which an ALL layer 1222 is arranged on an A-PHY layer 1221, and a CSI-2 transmission unit 1223 and a CSI extension unit 1224, and a CCI slave 1225 and a CCI extension unit 1226 are arranged on the ALL layer 1222. The image sensor 1211 can support the extended standard by providing the CSI extension unit 1224 to the CSI-2 transmission unit 1223 and providing the CCI extension unit 1226 to the CCI slave 1225.

The application processor 1212 has a configuration in which an ALL layer 1232 is arranged on an A-PHY layer 1231, and a CSI-2 reception unit 1233 and a CSI extension unit 1234, and a CCI master 1235 and a CCI extension unit 1236 are arranged on the ALL layer 1232. The application processor 1212 can support the extended standard by providing the CSI extension unit 1234 to the CSI-2 reception unit 1233 and providing the CCI extension unit 1236 to the CCI master 1235. Note that the CSI extension may be referred to as Camera Service Extensions (CSE).

The communication system 1201A illustrated in FIG. 75B is configured by connecting a display 1213 and an application processor 1212A. Note that the application processor 1212 A includes a DSI-2 transmission unit 1233A and a DSI extension unit 1234A instead of the CSI-2 reception unit 1233 and the CSI extension unit 1234 of the application processor 1212 in-A of FIG. 75A, and the other blocks have a common configuration to the application processor 1212.

The display 1213 has a configuration in which an ALL layer 1242 is arranged on an A-PHY layer 1241, and a DSI-2 reception unit 1243 and a DSI extension unit 1244, and a CCI slave 1245 and a CCI extension unit 1246 are arranged on the ALL layer 1242. The display 1213 can support the extended standard by providing the DSI extension unit 1244 to the DSI-2 reception unit 1243 and the CCI extension unit 1246 to the CCI slave 1245. Note that the DSI extension may be referred to as Display Service Extensions (DSE).

The communication systems 1201 and 1201A configured as described above can perform at least high-speed data transmission of transmitting data of a frame including image data in one direction and low-speed command transmission (note that transmitting a command itself may be referred to as command transmission or transmitting a response to a command may be referred to as command transmission) of transmitting a command related to high-speed data transmission in a reverse direction. For example, in the low-speed command transmission, at least transmission of a high-speed data transmission start instruction that requests start of the high-speed data transmission is performed, but the present embodiment is not limited thereto. Furthermore, the high-speed data transmission is faster than the low-speed command transmission, and is started in response to reception of the high-speed data transmission start instruction, but the present embodiment is not limited thereto.

However, the communication system 1201 in which a communication partner of the application processor 1212 is the image sensor 1211 and the communication system 1201A in which the communication partner of the application processor 1212A is the display 1213 have different directions in the high-speed data transmission and the low-speed command transmission. That is, in the communication system 1201, the image data is transmitted from the image sensor 1211 to the application processor 1212, whereas in the communication system 1201A, the image data is transmitted from the application processor 1212A to the display 1213.

In the A-PHY of the physical layer standard, the high-speed data transmission and the low-speed command transmission are transmitted via a part or whole of a common communication path. Furthermore, the A-PHY supports an option that enables part or whole of power supply from the application processor 1212 to the image sensor 1211 and power supply from the application processor 1212A to the display 1213 to be transmitted via a common communication path.

By the way, the low-speed command transmission conforms to, for example, CCI of the CSI-2 standard, and communication is performed on the basis of the I2C or I3C standard. At this time, the low-speed command transmission can transmit a command by sharing not only an independent physical layer of I2C or I3C but also part or whole of any physical layer of D-PHY, C-PHY, and A-PHY. Meanwhile, the high-speed data transmission transmits data via part or whole of any physical layer of the D-PHY, C-PHY, and A-PHY.

Note that, in a case where the low-speed command transmission conforms to, for example, Unified Serial Link (USL) within the standard of CSI-2, a command can be transmitted via part or whole of the physical layer of either the D-PHY or the C-PHY. That is, the high-speed data transmission and the low-speed command transmission can perform transmission via part or whole of any physical layer of the D-PHY, C-PHY, A-PHY, I2C, and I3C.

Note that, in FIGS. 75A and 75B, the configuration examples including the application processors 1212 and 1201A have been described. However, the communication systems 1201 and 1201A may include, for example, an electronic control unit (ECU). That is, the processor is not limited to the application processor 1212 as long as the processor can communicate with the image sensor 1211, the display 1213, and the like through direct connection or indirect connection. Furthermore, various sensors other than the image sensor 1211 may be provided.

The communication systems 1201 and 1201A configured in this manner employ a nonce value transmission method or an initialization vector configuration including a nonce value as to be described below.

Specifically, a specific common key cryptographic algorithm (for example, AES-GCM/GMAC) requires an initialization vector including a nonce value. Therefore, a setting rule of the initialization vector and the nonce value is agreed in advance between the image sensor 1211 and the application processor 1212 or between the display 1213 and the application processor 1212A.

However, if misrecognition or falsification of the nonce value occurs in each of the image sensor 1211, the application processors 1212 and 1201A, and the display 1213, subsequent decryption of encrypted image data, authentication of a message, and the like fail. Therefore, to avoid a defect that the image data cannot be normally transmitted, a countermeasure technique related to the misrecognition and falsification of the nonce value has been required.

Meanwhile, as a new security specification for the MIPI Camera Serial Interface (CSI) standard or the MIPI Display Serial Interface (DSI) standard, definition of the initialization vector suitable for the CSI standard or the DSI standard has been required. Therefore, the present technology discloses an initialization vector configuration including a nonce value transmission method or a nonce value suitable for an imaging device conforming to the CSI standard, including the image sensor 1211, or a display device conforming to the DSI standard, including the display 1213.

Note that processing performed between the image sensor 1211 and the application processor 1212 will be described below, but similar processing can be performed between the display 1213 and the application processor 1212A.

<Detailed Configuration Example of Image Sensor in FIGS. 75A and 75B>

Figure 76:
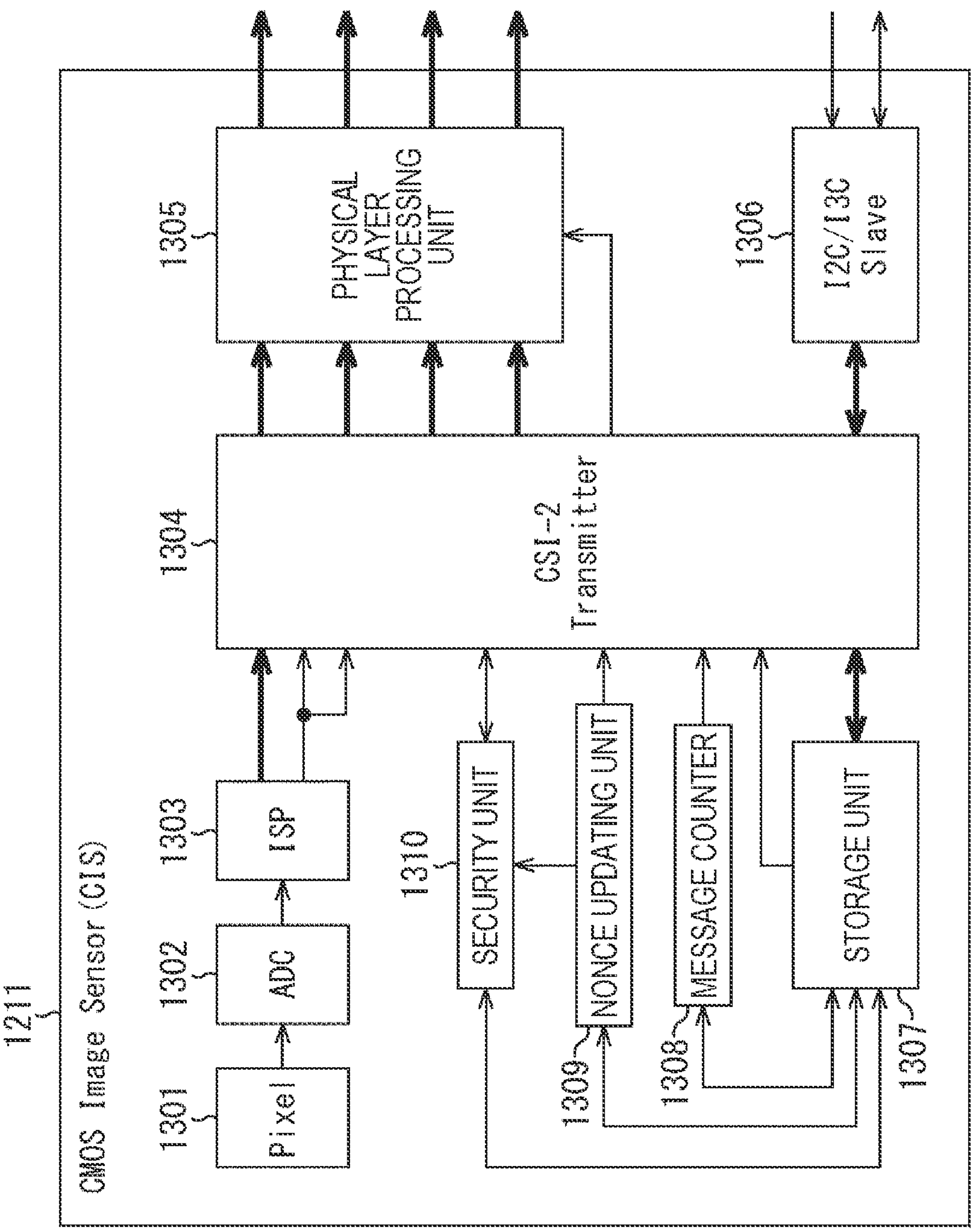
FIG. 76 is a block diagram illustrating a detailed configuration example of an image sensor.

FIG. 76 is a block diagram illustrating a detailed configuration example of the image sensor 1211.

The image sensor 1211 includes a pixel 1301, an AD converter 1302, an image processing unit 1303, an extension mode-compatible CSI-2 transmission circuit 1304, a physical layer processing unit 1305, an I2C/I3C slave 1306, a storage unit 1307, a message counter 1308, a nonce updating unit 1309, and a security unit 1310. Note that the pixel 1301, the AD converter 1302, the image processing unit 1303, the extension mode-compatible CSI-2 transmission circuit 1304, the physical layer processing unit 1305, the I2C/I3C slave 1306, and the storage unit 1307 are configured similarly to the corresponding respective blocks in the above-described other embodiments, and detailed description thereof is omitted.

The message counter 1308 updates a message count value in the image sensor 1211 each time an extended packet that satisfies a predetermined count condition is transmitted.

The security unit 1310 derives a session key in the image sensor 1211, and generates first protection data (for example, an integrity operation value calculated to protect integrity or encrypted data encrypted to protect confidentiality) of data to be transmitted at a high speed by using the session key.

The nonce updating unit 1309 updates a nonce (number used once) in the image sensor 1211 each time the security unit 1310 generates the first protection data.

The image sensor 1211 configured in this manner transmits part or whole of the nonce value and part or whole of the message count value to the application processor 1212 at a high speed. For example, part or whole of the nonce value may be a count value or a random number. Furthermore, part or whole of the nonce value is stored outside the extended packet header and transmitted, and the image data is stored in the packet data and transmitted.

In the image sensor 1211, the message counter 1308 and the nonce updating unit 1309 may be configured separately or integrally. For example, in a case where the message counter 1308 and the nonce updating unit 1309 are configured separately, update of the nonce value and the message count value can be asynchronous. This can increase the degree of freedom of the nonce value and the message count value.

Meanwhile, in a case where the message counter 1308 and the nonce updating unit 1309 are integrally configured, the update of the nonce value and the message count value can be synchronized. In that case, in a case where the count value is used as the nonce value, the message count value can be partially or entirely shared with the nonce value, so that a bit width of the message counter 1308 can be saved. That is, the message counter 1308 may be part or whole of the nonce updating unit 1309, and can be partially or entirely common to the nonce updating unit 1309.

<Detailed Configuration Example of Application Processor in FIGS. 75A and 75B>

Figure 77:
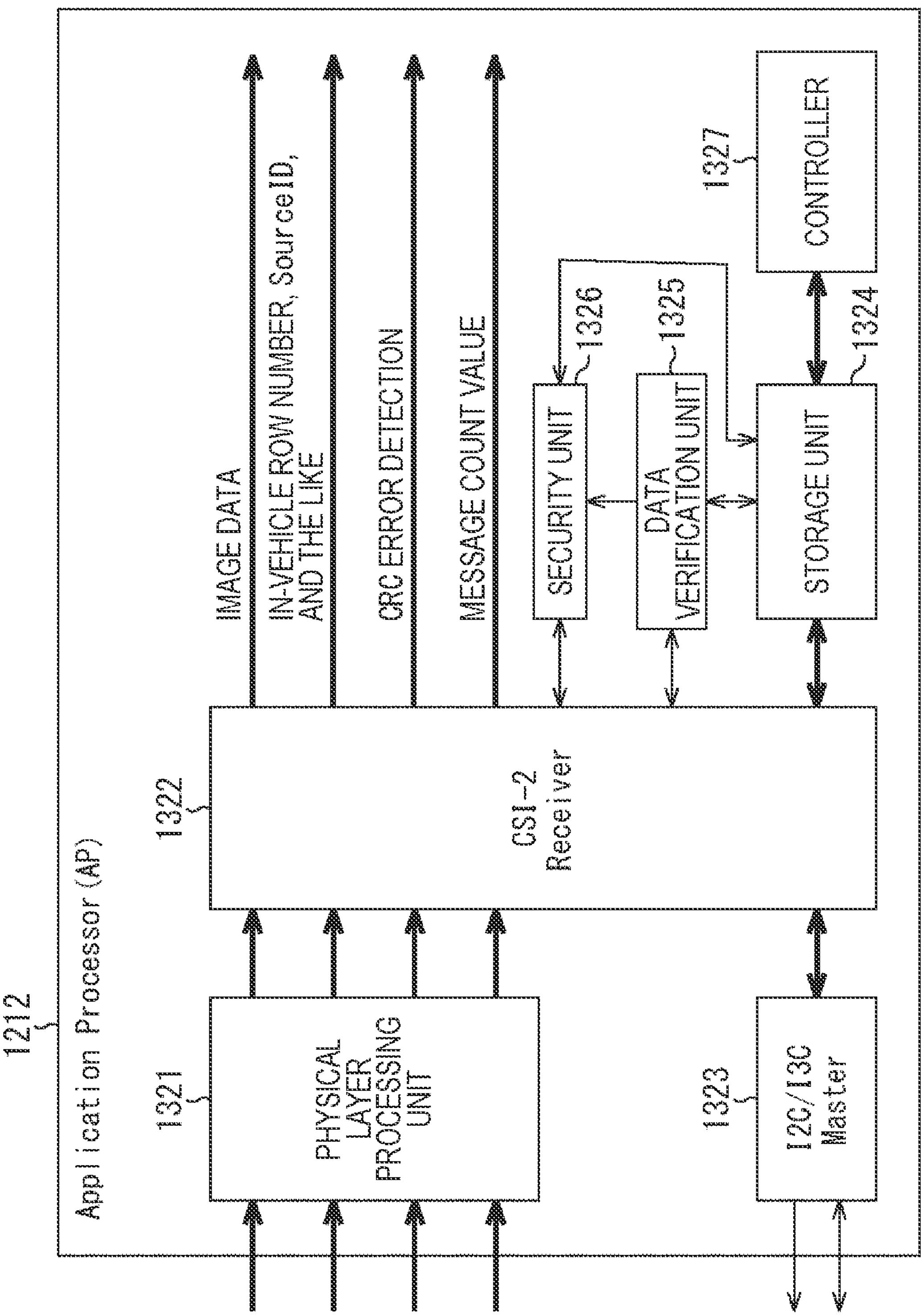
FIG. 77 is a block diagram illustrating a detailed configuration example of an application processor.

FIG. 77 is a block diagram illustrating a detailed configuration example of the application processor 1212.

The application processor 1212 includes a physical layer processing unit 1321, an extension mode-compatible CSI-2 reception circuit 1322, an I2C/I3C master 1323, a storage unit 1324, a data verification unit 1325, a security unit 1326, and a controller 1327. Note that the physical layer processing unit 1321, the extension mode-compatible CSI-2 reception circuit 1322, the I2C/I3C master 1323, and the storage unit 1324 are configured similarly to the corresponding respective blocks in the above-described other embodiments, and detailed description thereof is omitted.

The data verification unit 1325 verifies validity of the nonce value or the message count value transmitted from the image sensor 1211 to the application processor 1212.

The security unit 1326 derives a session key in the application processor 1212 corresponding to the session key in the image sensor 1211, and verifies (verifies integrity) or decrypts the first protected data of the image data using the session key in the application processor 1212.

In a case where data to be verified is the count value in the application processor 1212 configured as described above, the data verification unit 1325 can verify continuity. Furthermore, the data verification unit 1325 may include a counter, and comparison and verification may be performed by updating the count value similarly to the image sensor 1211. Note that, in a case where the data to be verified is a random number, the data verification unit 1325 may verify a random number property. Note that the data verification unit 1325 includes the nonce updating unit 1309 (or a message counter), and may verify or decrypt the first protection data using the nonce updating unit or may verify the data to be verified using the first protection data.

The image sensor 1211 and the application processor 1212 can be configured to be mounted on a desired mobile device. For example, the mobile device may be a portable mobile device, may be, for example, any of a mobile phone, a smartphone, a digital camera, a game device, or the like. The mobile device may be a propulsion device, and may be, for example, any of a vehicle, a robot, a drone, or the like capable of propulsion (any of moving, traveling, walking, flying, or the like). The mobile device may be any of an automated vehicle, an automated robot, an automated drone, or the like that can be propelled in an automated manner with an artificial intelligence (AI) function. Propulsion of the propulsion device may be controlled by a user of the propulsion device, and the propulsion device may provide instructions or warnings to the user as needed. Meanwhile, the propulsion device may be configured such that the propulsion device automatically controls the propulsion of the propulsion device.

The security units 1310 and 1326 may each include, for example, a security operation unit that executes operation for protecting image data. Therefore, the security units 1310 and 1326 can process any of encryption operation, decryption operation, hash value operation, message authentication code operation, digital signature operation, identification (ID) authentication, firmware measurement, encryption session key establishment, key exchange, key update, or the like by the security operation unit.

Meanwhile, any of the security units 1310 and 1326, the nonce updating unit 1309, the message counter 1308, and the data verification unit 1325 can be configured to be electrically directly connected to a memory. The memory may be electrically directly connected to a register, and any of the security units 1310 and 1326, the nonce updating unit 1309, the message counter 1308, and the data verification unit 1325 may be electrically directly connected to the register. The memory may be a memory protected from either leakage or falsification of information in the memory. Such a memory and a register are used as the storage units 1307 and 1324, respectively.

The storage units 1307 and 1324 may store any of key information (for example, a pre-shared key, a private key, a public key, or a session key), a certificate (for example, a root certificate, an intermediate certificate, or a leaf certificate), cryptographic algorithm information, or the like. The storage units 1307 and 1324 may store any of function information of the image sensor 1211 or the application processor 1212, ID information (for example, a source ID, a destination ID, a final destination ID, and the like) of the image sensor 1211 or the application processor 1212, firmware information of the image sensor 1211 or the application processor 1212, or the like. The storage units 1307 and 1324 may store any of session information (for example, a session ID) to be described below, an operation value (for example, an initial value, an intermediate value, or a final value) of the security operation unit, the initialization vector, the nonce value, the message count value, a frame number (frame count value), or the like.

Any of the security units 1310 and 1326, the nonce updating unit 1309, the message counter 1308, and the data verification unit 1325 becomes able to determine the presence or absence of a defect by, for example, the image sensor 1211 or the application processor 1212 storing any of the nonce values, the count values, the integrity operation values, encryption information, or the like corresponding to a plurality of times in the storage unit 1307 or 1324, and becomes able to take measures (for example, a request for retransmission of data of a defect point and transmission of an abnormality message) in response thereto. Furthermore, in a case where any of the nonce value, the count value, the integrity operation value, the encryption information, or the like is periodically stored in the protected storage unit 1307 or 1324, there is also an effect of easily specify the cause of the accident by analyzing the protected storage unit 1307 or 1324 if an accident of the mobile device occurs.

<Session>

A requester and a responder, that is, the application processor 1212 and the image sensor 1211, may have one or more communication channels through a session. Hereinafter, a session will be described by using a configuration in which the application processor 1212 is a requester and the image sensor 1211 is a responder as an example. Of course, the application processor 1212 may be a responder, and the image sensor 1211 may be a requester.

Furthermore, the requester and the responder can construct a secure communication channel by using temporarily fixed encryption information. Specifically, the session provides either encryption or message authentication, or both of them. The session includes, for example, three stages: a session handshake stage, an application stage, and a session termination stage.

The session handshake stage begins with, for example, a key exchange request (either PSK_EXCHANGE or KEY_EXCHANGE) from the requester, derives a session key, such as a session secret or encryption key, and protects communication using the session key. The purpose of this stage is, for example, to first establish trust between the responder and the requester before either side transmits application data (for example, image data). Moreover, synchronization between some degree of integrity of the handshake and the derived handshake secret may be secured.

In a case where an error occurs at this stage, the session may be immediately terminated and proceed to session end. If the handshake is successful, for example, this stage ends with a finish response (FINISH_RSP or PSK_FINISH_RSP) from the responder and the application stage begins. Once the handshake is completed and all verifications are passed, the session reaches the application stage where either the responder or requester may send application data.

The application stage ends, for example, when an end request (END_SESSION) is issued from the requester or when an error occurs. The next stage is the session termination stage.

The session termination stage is, for example, merely an internal stage, and there is no explicit message sent or received. Both the requester and the responder discard or clean up all the derived session secrets and the session keys such as the encryption key when the session ends. The requester and responder may have other internal data associated with this session and they may also be cleaned up.

The session secret is used, for example, to derive an encryption key and a salt to be used in an authenticated encryption with additional data (AEAD) function. The derivation of the encryption key may frequently use HMAC as defined in RFC 2104 and HKDF-Expand described in RFC 5869. The session secret may include a single secret or a plurality of types of secrets. The session key may include a single key or a plurality of types of keys.

<Processing Example of High-Speed Data Transmission and Low-Speed Command Transmission>

Communication processing in which the high-speed data transmission and the low-speed command transmission are performed between the image sensor 1211 and the application processor 1212 will be described with reference to FIGS. 78 to 80.

Figure 78:
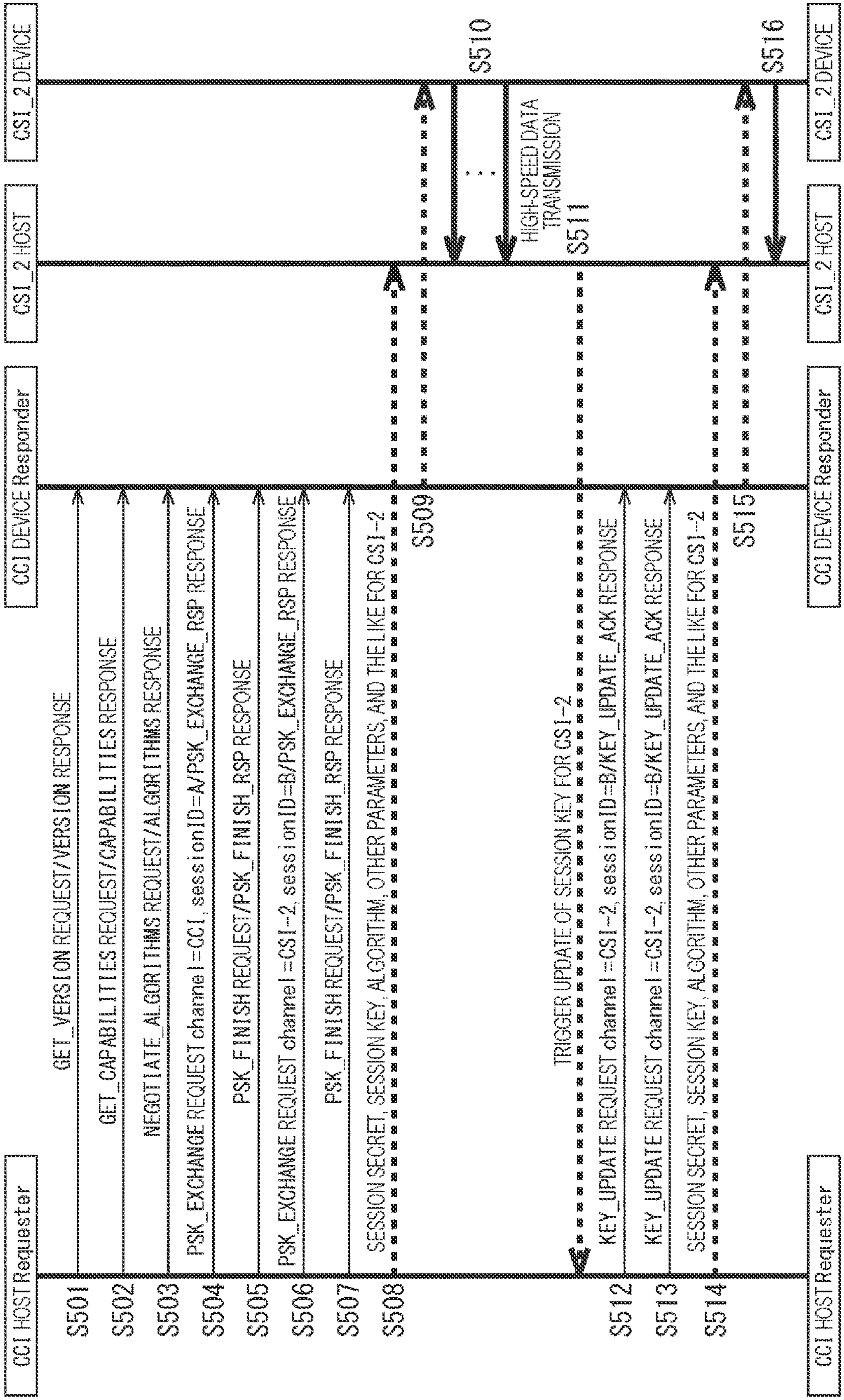
FIG. 78 is a flowchart illustrating a first processing example of communication processing.

FIG. 78 is a flowchart illustrating a first processing example of the communication processing.

Here, the extension mode-compatible CSI-2 reception circuit 1322 of the application processor 1212 has functions as a CCI host (requester) and a CSI-2 host. The extension mode-compatible CSI-2 transmission circuit 1304 of the image sensor 1211 has functions as a CCI device (responder) and a CSI-2 device. The CCI host transmits a request message to the CCI device, and the CCI device transmits a response message to the CCI host in response to reception of the request message.

In step S501, a GET_VERSION request and a VERSION response are performed between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 acquires a Security Protocol and Data Model (SPDM) version of an endpoint.

In step S502, a GET_CAPABILITIES request and a CAPABILITIES response are performed between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 acquires an SPDM function of the endpoint.

In step S503, a NEGOTIATE_ALGORITHMS request and an ALGORITHMS response are performed between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 negotiates a cryptographic algorithm with the extension mode-compatible CSI-2 transmission circuit 1304.

In step S504, a PSK_EXCHANGE request and a PSK_EXCHANGE_RSP response are performed between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 and the extension mode-compatible CSI-2 transmission circuit 1304 derive the session secret and the session key for CCI such as the encryption key.

In step S505, a PSK_FINISH request and a PSK_FINISH_RSP response are performed between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 knows pre-shared key (PSK) and proves to the responder that the session key for CCI derived in step S504 is correct.

In step S506, a PSK_EXCHANGE request and a PSK_EXCHANGE_RSP response are performed between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 and the extension mode-compatible CSI-2 transmission circuit 1304 derive the session secret and the session key for CSI-2 such as the encryption key.

In step S507, a PSK_FINISH request and a PSK_FINISH_RSP response are performed between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 knows pre-shared key (PSK) and proves to the responder that the session key for the CSI-2 derived in step S506 is correct.

Here, the proof of the session keys in steps S505 and S507 is implemented with a MAC value calculated with finished key of the requester and a message of this session. Then, subsequent CCI communication and CSI-2 communication are protected using the session keys derived in steps S504 and S506.

In step S508, in the extension mode-compatible CSI-2 reception circuit 1322, the session secret, the session keys, the algorithm, other parameters, and the like for CSI-2 are supplied from the CCI host to the CSI-2 host.

In step S509, in the extension mode-compatible CSI-2 transmission circuit 1304, the session secret, the session key, the algorithm, other parameters, and the like for CSI-2 are supplied from the CCI device to the CSI-2 device.

In step S510, the CSI-2 device in the extension mode-compatible CSI-2 transmission circuit 1304 transmits image data to the CSI-2 host in the extension mode-compatible CSI-2 reception circuit 1322 by high-speed data communication. For example, the high-speed data communication is continuously performed until it becomes time to update the session key for CSI-2.

In step S511, in the extension mode-compatible CSI-2 reception circuit 1322, a trigger for updating the session key for CSI-2 is supplied from the CSI-2 host to the CCI host. Note that a trigger may be provided to the CCI host from the CSI-2 device or the CCI device, or a self-trigger may be provided to the CCI host from the CCI host.

In step S512, a KEY_UPDATE request and a KEY_UPDATE ACK response are performed between the CCI host of the extension mode-compatible CSI-2 reception circuit 1322 and the CCI device of the extension mode-compatible CSI-2 transmission circuit 1304. This updates the session keys and discards some of the old session keys. Note that, in the case where the session key include a plurality of types of keys (a request direction key, a response direction key, or the like), some or all of the keys may be updated. Furthermore, the KEY_UPDATE request may be issued from the responder using a GET_ENCAPSULATED_REQUEST mechanism to be described below.

In step S513, processing similar to that in step S512 is performed, and the KEY_UPDATE request and the KEY_UPDATE ACK response are performed twice. As a result, the remaining (all) of the old session keys that have not been discarded only by the processing in step S512 are discarded.

In step S514, in the extension mode-compatible CSI-2 reception circuit 1322, the session secret, the session key (updated), the algorithm, other parameters, and the like for CSI-2 are supplied from the CCI host to the CSI-2 host.

In step S515, in the extension mode-compatible CSI-2 transmission circuit 1304, the session secret, the session key (updated), the algorithm, other parameters, and the like for CSI-2 are supplied from the CCI device to the CSI-2 device.

In step S516, transmission of image data by the high-speed data communication is started, similarly to step S510, and processing similar to that of steps S510 to S515 is repeatedly performed.

Note that, in the first processing example of the communication processing, the session key for CCI and the session key for CSI-2 are different, the session IDs are different between for CCI and for CSI-2, and the session secrets are different between for CCI and for CSI-2. The embodiment is not limited to the example, the session key for CCI and the session key for CSI-2 may be the same, the session ID may be the same for CCI and CSI-2, and the session secret may be the same for CCI and CSI-2, as in the second processing example of the communication processing.

Figure 79:
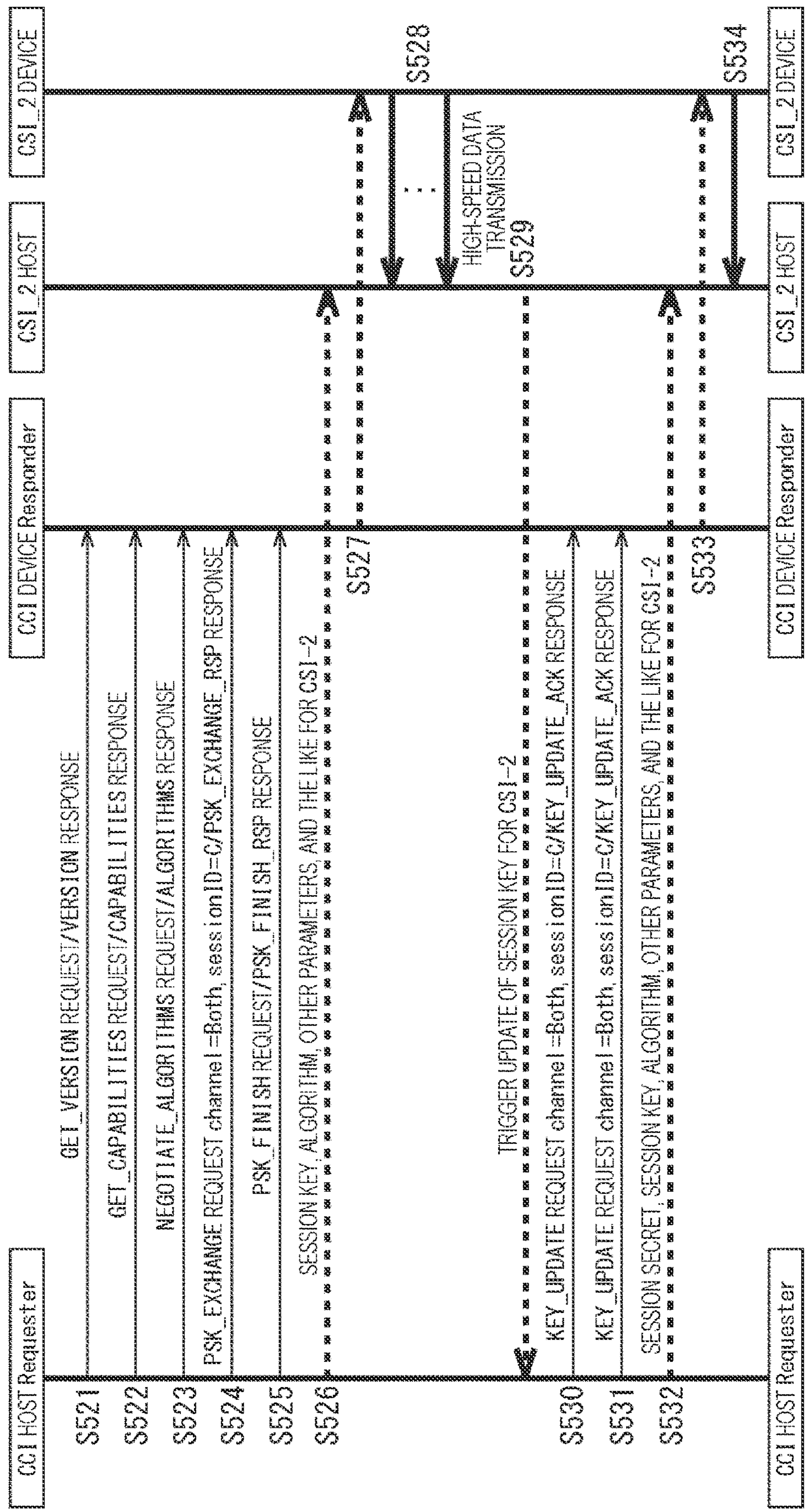
FIG. 79 is a flowchart illustrating the first processing example of the communication processing.

FIG. 79 is a flowchart illustrating a second processing example of the communication processing.

In steps S521 to S523, processing similar to that in steps S501 to S503 in FIG. 78 is performed.

In step S524, the PSK_EXCHANGE request and the PSK_EXCHANGE_RSP response are performed between the CCI host of the extension mode-compatible CSI-2 reception circuit 1322 and the CCI device of the extension mode-compatible CSI-2 transmission circuit 1304. Here, in the second processing example of the communication processing, the same session secret for CCI and the same session secret for CSI-2 are derived.

That is, the session key for CCI and the session key for CSI-2 can be derived from the same session secret. Alternatively, an uplink session key and a downlink (reverse direction to uplink) session key may be derived from the same session secret. Alternatively, a common session key for CCI and CSI-2 may be derived from the same session secret.

Note that even in the case where the sessions for CCI and the CSI-2 are the same, the session secrets, the session keys, and the like may be different between for CCI and for CSI-2.

Thereafter, in steps S525 to S534, processing similar to that in steps S507 to S516 in FIG. 78 is performed.

Here, the pre-shared key PSK key exchange scheme provides an option for the requester and the responder to perform mutual authentication and session key establishment with symmetric key cryptography. This option is particularly useful for endpoints that do not support asymmetric key cryptography or certificate processing. Even if the asymmetric key cryptography is supported, this option can also be exploited to speed up the session key establishment. This option requires the requester and responder to know in advance a common PSK before the handshake.

Basically, the PSK serves as a base for mutual authentication credentials and the session key establishment. Therefore, only two endpoints and potentially trusted third parties that provision PSK to the two endpoints may know the value of the PSK. The requester may be paired with a plurality of responders. Similarly, the responder may be paired with a plurality of requesters. A pair of the requester and the responder may be provisioned with one or more PSKs.

An endpoint may act as a requester for one device and simultaneously as a responder for another device. A transport layer needs to identify a peer (Peer) and establish communication between the two endpoints before the PSK-based session key exchange starts.

The PSK may be provisioned in a trusted environment, e.g., during a safe manufacturing process. The PSK may be agreed between the two endpoints using a secure protocol in an untrusted environment. The size of the provisioned PSK depends on security strength requirements of an application, but should be 128 bits or more, desirably 256 bits or more. During PSK provisioning, endpoint functions and supported algorithms may be communicated to the peers. Therefore, during session key establishment using the PSK option, GET_CAPABILITIES and NEGOTIATE_ALGORITHMS of SPDM commands are not required.

This option defines two message pairs: PSK_EXCHANGE/PSK_EXCHANGE_RSP and PSK_FINISH/PSK_FINISH_RSP. The PSK_EXCHANGE message has three roles: prompting the responder to obtain a specific PSK; exchanging context between the requester and the responder; and proving to the requester that the responder knows the correct PSK and has derived the correct session key.

Figure 80:
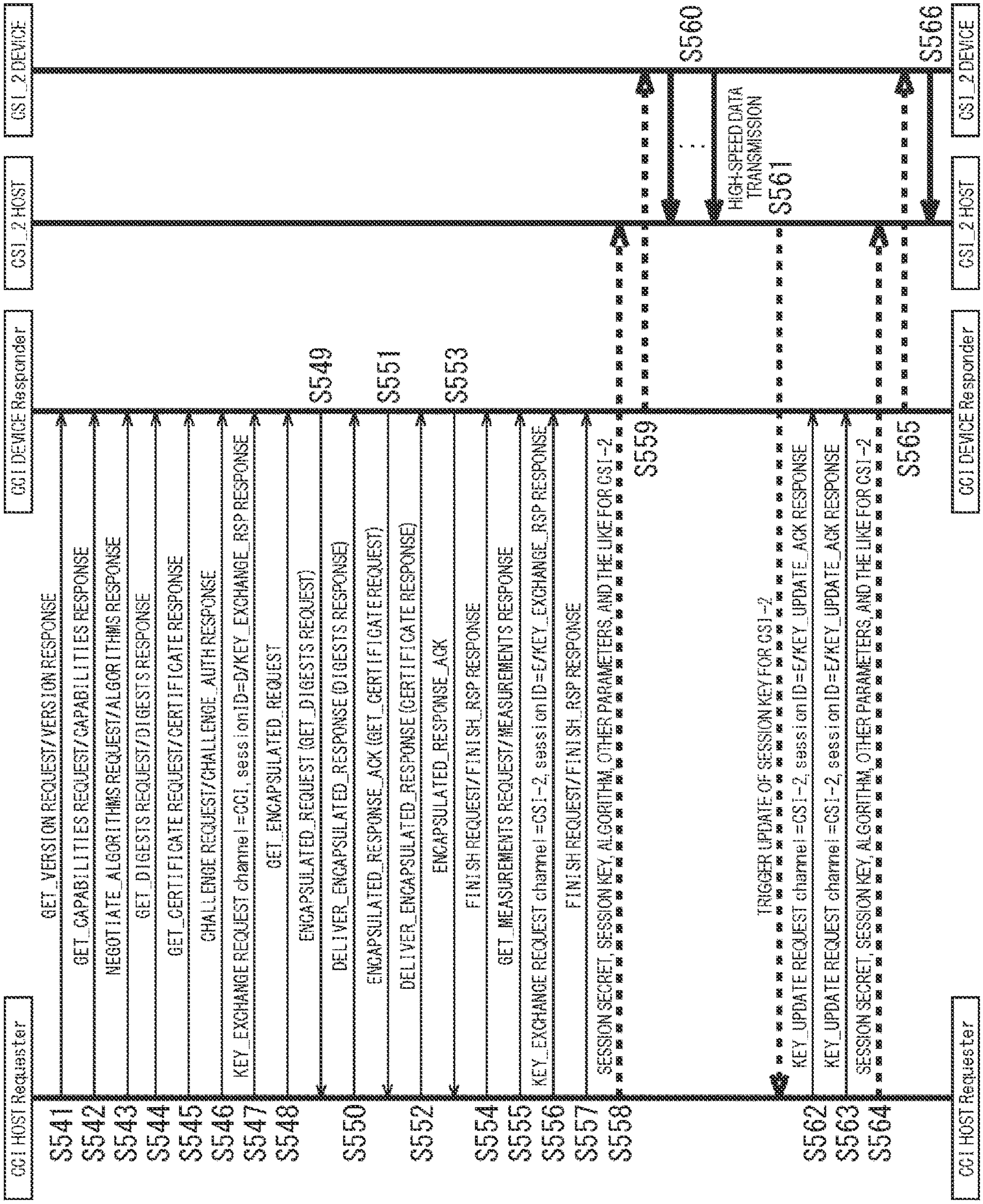
FIG. 80 is a flowchart illustrating the first processing example of the communication processing.

FIG. 80 is a flowchart illustrating a third processing example of the communication processing.

In steps S541 to S543, processing similar to that in steps S501 to S503 in FIG. 78 is performed.

In step S544, a GET DIGESTS request and a DIGESTS response are performed between the CCI host of the extension mode-compatible CSI-2 reception circuit 1322 and the CCI device of the extension mode-compatible CSI-2 transmission circuit 1304. Therefore, the extension mode-compatible CSI-2 reception circuit 1322 acquires a certificate chain digest from the extension mode-compatible CSI-2 transmission circuit 1304.

In step S545, a GET_CERTIFICATE request and a CERTIFICATE response are performed between the CCI host of the extension mode-compatible CSI-2 reception circuit 1322 and the CCI device of the extension mode-compatible CSI-2 transmission circuit 1304. Therefore, the extension mode-compatible CSI-2 reception circuit 1322 acquires a certificate chain from the extension mode-compatible CSI-2 transmission circuit 1304. Note that the acquisition of the certificate chain may be performed a plurality of times.

In step S546, a CHALLENGE request and a CHALLENGE_AUTH response are performed between the CCI host of the extension mode-compatible CSI-2 reception circuit 1322 and the CCI device of the extension mode-compatible CSI-2 transmission circuit 1304. As a result, the extension mode-compatible CSI-2 reception circuit 1322 can authenticate the extension mode-compatible CSI-2 transmission circuit 1304 through a challenge-response protocol.

In step S547, a KEY_EXCHANGE request (channel=CCI, session ID=D) and a KEY_EXCHANGE_RSP response are performed between the CCI host of the extension mode-compatible CSI-2 reception circuit 1322 and the CCI device of the extension mode-compatible CSI-2 transmission circuit 1304. This initiates a handshake between the requester and the responder for the purpose of authenticating the responder (or optionally both parties). Then, encryption parameters are negotiated in addition to the content negotiated in the last NEGOTIATE_ALGORITHMS/ALGORITHMS exchange, and shared key information is established.

In step S548, the CCI host of the extension mode-compatible CSI-2 reception circuit 1322 transmits GET_ENCAPSULATED_REQUEST to the CCI device of the extension mode-compatible CSI-2 transmission circuit 1304.

In step S549, the CCI device of the extension mode-compatible CSI-2 transmission circuit 1304 transmits ENCAPSULATED_REQUEST (GET DIGESTS request) to the CCI host of the extension mode-compatible CSI-2 reception circuit 1322.

In step S550, the CCI host of the extension mode-compatible CSI-2 reception circuit 1322 transmits DELIVER_ENCAPSULATED_RESPONSE (DIGESTS response) to the CCI device of the extension mode-compatible CSI-2 transmission circuit 1304. As a result, the CCI device of the extension mode-compatible CSI-2 transmission circuit 1304 obtains the certificate chain digest from the CCI host of the extension mode-compatible CSI-2 reception circuit 1322.

In step S551, the CCI device of the extension mode-compatible CSI-2 transmission circuit 1304 transmits ENCAPSULATED_RESPONSE_ACK (GET_CERTIFICATE request) to the CCI host of the extension mode-compatible CSI-2 reception circuit 1322.

In step S552, the CCI host of the extension mode-compatible CSI-2 reception circuit 1322 transmits the DELIVER_ENCAPSULATED_RESPONSE (CERTIFICATE response) to the CCI device of the extension mode-compatible CSI-2 transmission circuit 1304. Thereby, the CCI device (responder) may obtain the certificate chain from the CCI host (requester). Note that this processing may be executed a plurality of times.

In step S553, the CCI device of the extension mode-compatible CSI-2 transmission circuit 1304 transmits ENCAPSULATED_RESPONSE_ACK to the CCI host of the extension mode-compatible CSI-2 reception circuit 1322.

In step S554, a FINISH request and a FINISH_RSP response are performed between the CCI host of the extension mode-compatible CSI-2 reception circuit 1322 and the CCI device of the extension mode-compatible CSI-2 transmission circuit 1304. As a result, the handshake between the CCI host of the extension mode-compatible CSI-2 reception circuit 1322 and the CCI device of the extension mode-compatible CSI-2 transmission circuit 1304, which has been started by the KEY_EXCHANGE request in step S547, is completed.

In step S555, a GET_MEASUREMENTS request and a MEASUREMENTS response are performed between the CCI host of the extension mode-compatible CSI-2 reception circuit 1322 and the CCI device of the extension mode-compatible CSI-2 transmission circuit 1304. As a result, the CCI host of the extension mode-compatible CSI-2 reception circuit 1322 acquires measurement data from the CCI device of the extension mode-compatible CSI-2 transmission circuit 1304. Note that the GET_MEASUREMENTS request may be issued from the responder using the above-described GET_ENCAPSULATED_REQUEST mechanism. Similarly, other requests may be issued from the responder using the above-described GET_ENCAPSULATED_REQUEST mechanism.

Thereafter, in step S556, the KEY_EXCHANGE request (channel=CSI-2, session ID=E) and the KEY_EXCHANGE_RSP response are performed similarly to step S547, and in step S557, the FINISH request and the FINISH_RSP response are performed similarly to step S554. Then, in steps S558 to S566, processing similar to that in steps S508 to S516 in FIG. 78 is performed.

<Data Verification Processing>

Data verification processing using a verification packet and a packet to be verified will be described with reference to FIGS. 81A, 81B, 81C, 81D, 82A, 82B, 82C, 82D, and 83.

As illustrated in FIGS. 81A, 81B, 81C, 81D, 82A, 82B, 82C, and 82D, an extended packet includes a packet header PH, an extended packet header ePH, a packet data, an extended packet footer ePF, and a packet footer PF. With the extended packet having such a configuration, a frame start, embedded data, image data, user-defined data, a frame end, a write instruction (CCI Write), a read instruction (CCI Read), and a read response (CCI Read return value) can be configured. Note that some or all of the packet header PH, the extended packet header ePH, the packet data, the extended packet footer ePF, and the packet footer PF may be omitted. That is, a packet configuration including at least the extended packet header ePH and the packet data is defined as an extended packet.

Incidentally, there is a possibility that any of the extended packet header ePH, the packet data, and the extended packet footer ePF is not normally received (a message is lost) due to noise, interference, or an attack. Therefore, it is desirable to store, in the extended packet footer end ePF0, a verification packet for verifying the integrity of the extended packet header ePH, the packet data, and the extended packet footer remaining ePF1. For verification of the integrity, for example, CRC32 of cyclic redundancy check, which is a type of error detection codes, is used. As a generator polynomial of the CRC32, for example, $X^{32}+X^{26}+X^{23}+X^{22}+X^{16}+X^{12}+X^{11}+X^{10}+X^{8}+X^{7}+X^{5}+X^{4}+X^{2}+X+1$ is used.

The packet data can be used for the packet to be verified. Alternatively, the extended packet header and the packet data can be used for the packet to be verified. Alternatively, the packet data and the extended packet footer remaining (ePF1) can be used for the packet to be verified. Alternatively, the extended packet header, the packet data, and the extended packet footer remaining (ePF1) can be used for the packet to be verified. At least packet data is protected by such a packet to be verified.

That is, the image sensor 1211 includes a second protection unit (for example, a CRC operation unit) that generates second protection data (for example, a CRC operation value) of the packet data without using the session key. The second protection data is stored in, for example, the extended packet footer ePF of the high-speed data transmission. That is, the second protection data is stored in any of the frame start, embedded data, image data, user-defined data, frame end, write instruction (CCI Write), read instruction (CCI Read), read response (CCI Read return value), or the like.

A security function (security feature) may be defined in the extended packet footer ePF1 or ePF0. That is, a security operation unit (for example, an encryption operation unit, a decryption operation unit, a hash value operation unit, a message authentication code operation unit, and a digital signature operation unit) may be provided in the image sensor 1211. Then, a result of a security operation (for example, a hash value, a message authentication code, or a digital signature) may be stored in the extended packet footer ePF.

A result of the security operation may be stored only in the extended packet footer ePF1 instead of in the extended packet footer ePF0, or may be stored outside the extended packet footer instead of in the extended packet footer (for example, in the embedded data or in the read response). The security operation unit included in the image sensor 1211 is included in the security unit 1310.

As a Message Authentication Code (MAC), any of Galois MAC (GMAC), Cipher-based MAC (CMAC), Hash-based MAC (HMAC), or the like may be used. For example, any of AES-GMAC, AES-CMAC, SHA2-HMAC, SHA3-HMAC, or the like to which Advanced Encryption Standard (AES) or Secure Hash Algorithm (SHA) is applied may be used. Note that the block length of AES is 128 bits, and any of 128 bits, 192 bits, or 256 bits is selected as the key length of AES.

For example, any security information such as a hash (particularly, a cryptographic hash) value, a message authentication code, or a digital signature may be stored in the extended packet footer, using the packet data as the packet to be verified or the extended packet header and the packet data as the packet to be verified. In that case, it is possible to provide further resistance against malicious falsification from an attacker. Note that, in the extended packet footer "ePF1" or "ePF1 and ePF0", the CRC of cyclic redundancy check, which is a type of error detection codes, may be stored.

That is, the image sensor 1211 may include an integrity operation unit (for example, the first protection unit=the security operation unit and the second protection unit=the CRC operation unit), and the integrity operation values (for example, the first protection data and the second protection data) that are the results of calculating the integrity may be stored in the extended packet footer. Note that the CRC can be used for functional safety, and its integrity can be used to prevent detection of hardware failure. Meanwhile, the integrity of the security function can be used to detect intentional interference or attack. That is, the security operation unit calculates an integrity operation value based on encryption, and the CRC operation unit calculates an integrity operation value not based on encryption.

For example, the application processor 1212 can verify the integrity of the packet to be verified by using the verification packet. In a case where it is determined that there is an abnormality, for example, any processing such as transmission of a request message requesting retransmission of a packet including the packet to be verified and the verification packet, transmission of a request message inquiring the image sensor 1211 whether there is an abnormality in the image sensor 1211, transmission of a request message requesting the image sensor 1211 to stop a part or all of the functions of the image sensor 1211, propulsion stop of the propulsion device, change of propulsion control of the propulsion device, change of priority data to be used for the propulsion control, or the like may be executed.

Note that the integrity operation value may be stored in any of, for example, the embedded data, image data (packet data), user-defined data, write instruction, read instruction, read response, or the like. In this case, the integrity operation value may not be stored in the extended packet footer. For example, the integrity operation value may be stored not in units of lines of an image but in units of frames of an image, and in this case, the integrity is efficiently calculated. In that case, the integrity operation value is stored in, for example, the embedded data or in the read response after the image data is transmitted.

Figure 81A:
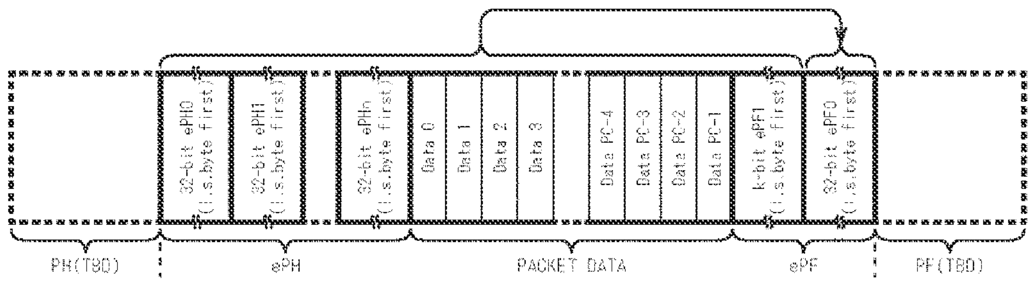
FIGS. 81A, 81B, 81C, and 81D are diagrams for describing a verification packet and a packet to be verified.

The extended packet illustrated in FIG. 81A has a configuration example in which the extended packet header ePH, the packet data, and the extended packet footer remaining ePF1 are set as the packet to be verified, and the extended packet footer end ePF0 storing a calculated value obtained by a security operation using the packet to be verified is set as the verification packet.

Figure 81B:
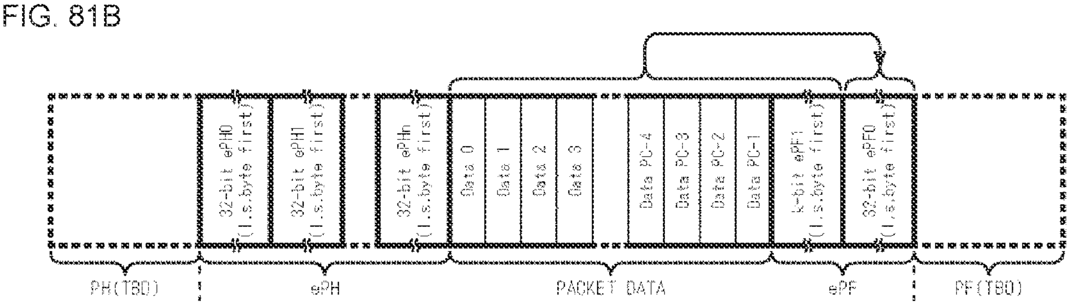

The extended packet illustrated in FIG. 81B has a configuration example in which the packet data and the extended packet footer remaining ePF1 are set as the packet to be verified, and the extended packet footer end ePF0 storing a calculated value obtained by a security operation using the packet to be verified is set as the verification packet.

Figure 81C:
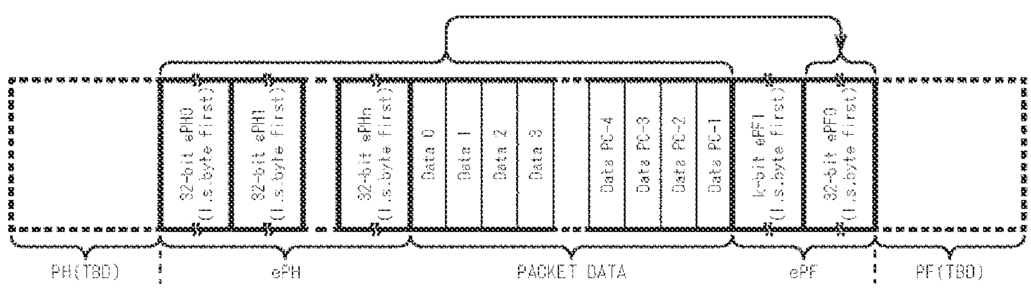

The extended packet illustrated in FIG. 81C has a configuration example in which the extended packet header ePH and the packet data are set as the packet to be verified, and the extended packet footer end ePF0 storing a calculated value obtained by a security operation using the packet to be verified is set as the verification packet.

Figure 81D:
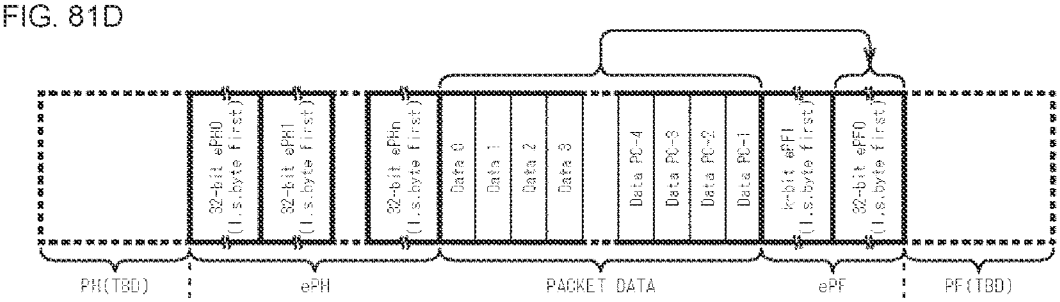

The extended packet illustrated in FIG. 81D has a configuration example in which the packet data is set as the packet to be verified, and the extended packet footer end ePF0 storing a calculated value obtained by a security operation using the packet to be verified is set as the verification packet.

Figure 82A:
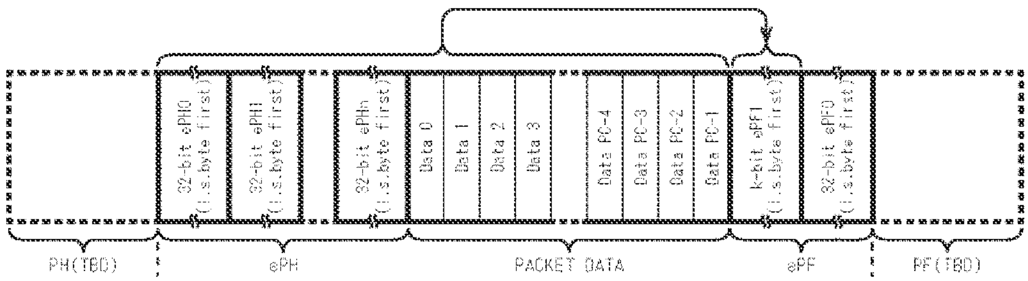
FIGS. 82A, 82B, 82C, and 82D are diagrams for describing a verification packet and a packet to be verified.

The extended packet illustrated in FIG. 82A has a configuration example in which the extended packet header ePH and the packet data are set as the packet to be verified, and the extended packet footer remaining ePF1 storing a calculated value obtained by a security operation using the packet to be verified is set as the verification packet.

Figure 82B:
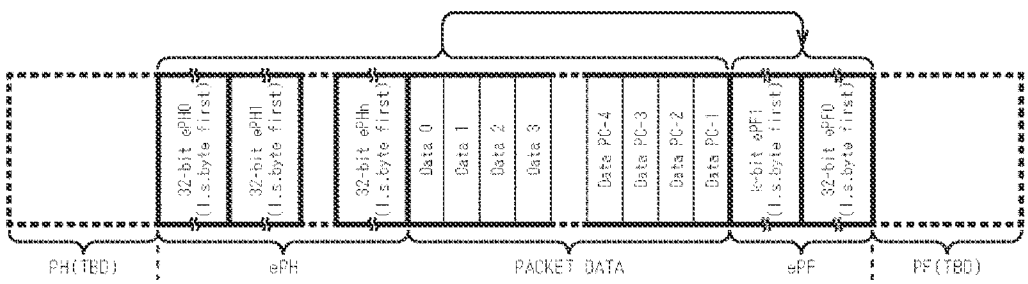

The extended packet illustrated in FIG. 82B has a configuration example in which the extended packet header ePH and the packet data are set as the packet to be verified, and the extended packet footer remaining ePF1 storing a calculated value obtained by a security operation using the packet to be verified and the extended packet footer end ePF0 are set as the verification packet.

Figure 82C:
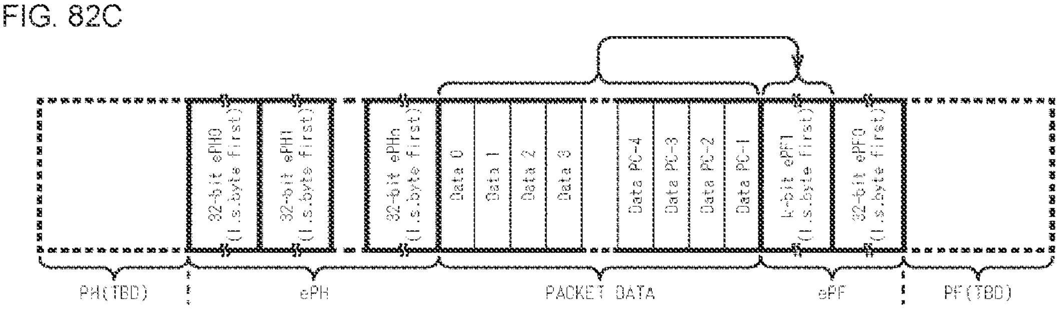

The extended packet illustrated in FIG. 82C has a configuration example in which the packet data is set as the packet to be verified, and the extended packet footer remaining ePF1 storing a calculated value obtained by a security operation using the packet to be verified is set as the verification packet.

Figure 82D:
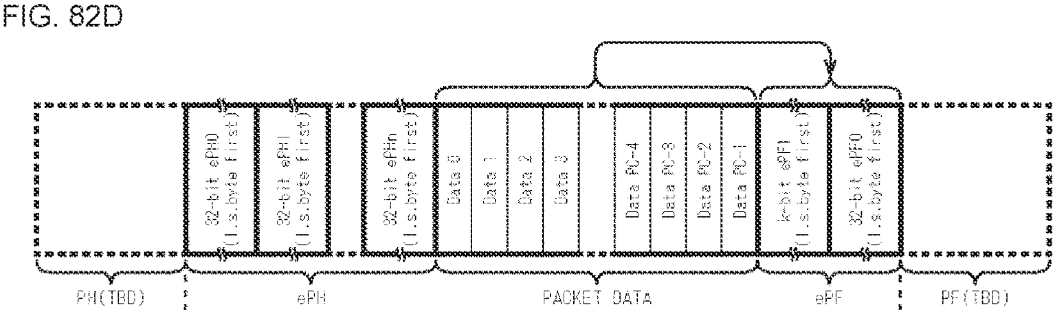

The extended packet illustrated in FIG. 82D has a configuration example in which the packet data is set as the packet to be verified, and the extended packet footer remaining ePF1 storing a calculated value obtained by a security operation using the packet to be verified and the extended packet footer end ePF0 are set as the verification packet.

Figure 83:
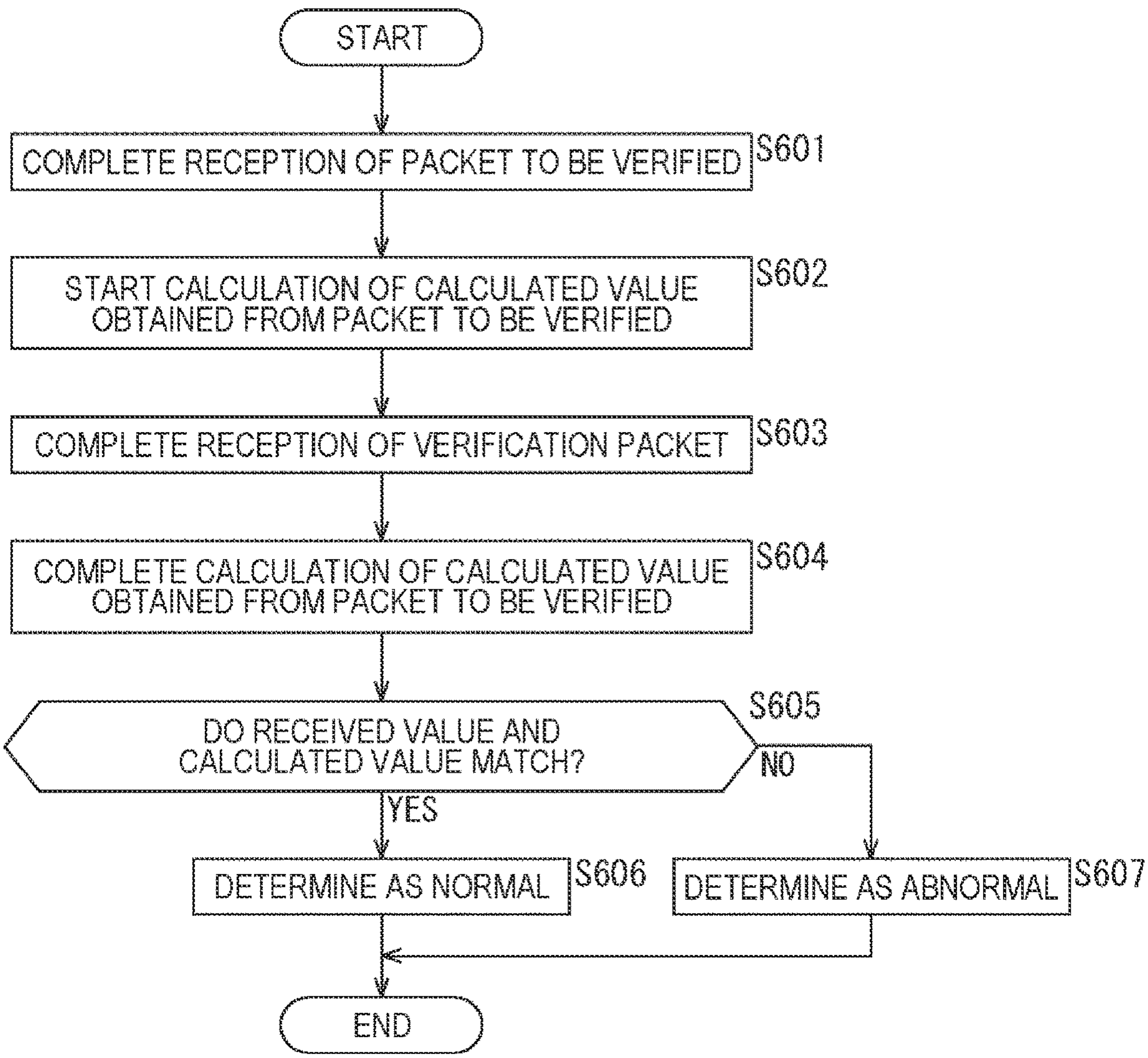
FIG. 83 is a flowchart for describing data verification processing.

FIG. 83 is a flowchart for describing the data verification processing performed in the application processor 1212.

In step S601, when the extended packet transmitted from the image sensor 1211 is received by the extension mode-compatible CSI-2 reception circuit 1322, the security unit 1326 receives the packet to be verified of the extended packet. Then, when the security unit 1326 completes the reception of the packet to be verified, the processing proceeds to step S602. Note that even if the reception of the entire packet to be verified is not completed, the processing may proceed to step S602 if the reception of at least a part (for example, 128 bits) of which calculation of the security operation can be started is completed. In that case, the rest of the packet to be verified is continuously received until the reception of the entire packet to be verified is completed.

In step S602, the security unit 1326 starts calculation of a calculated value obtained by a security operation using at least a part of the packet to be verified received in step S601.

In step S603, the security unit 1326 receives the verification packet transmitted from the image sensor 1211 via the extension mode-compatible CSI-2 reception circuit 1322. Then, when the security unit 1326 completes the reception of the verification packet and acquires a received value (the calculated value calculated by the image sensor 1211) stored in the verification packet, the processing proceeds to step S604.

In step S604, when the calculation of the calculated value obtained by the security operation using the packet to be verified started in step S602 is completed (that is, the entire packet to be verified has been received and the calculation using the entire packet to be verified is completed), the security unit 1326 proceeds to step S605.

In step S605, the security unit 1326 determines whether or not the received value received in step S603 matches the calculated value obtained in step S604.

In step S605, in a case where the security unit 1326 determines that the received value matches the calculated value, the processing proceeds to step S606. In this case, in step S606, the security unit 1326 determines that the extended packet received by the extension mode-compatible CSI-2 reception circuit 1322 is normal, and the processing is terminated.

On the other hand, in step S605, in a case where the security unit 1326 determines that the received value and the calculated value do not match, the processing proceeds to step S607. In this case, in step S607, the security unit 1326 determines that an abnormality has occurred in the extended packet received by the extension mode-compatible CSI-2 reception circuit 1322, and the processing is terminated.

<Securement of Functional Safety Using Message Count Value>

The image sensor 1211 may store the message count value counted by the message counter 1308 in the extended packet header or the extended packet footer to secure functional safety (for example, detecting and properly treating missing messages). For example, the message counter 1308 included in the image sensor 1211 can store the message count value that is incremented or decremented each time a message is transmitted from the image sensor 1211. Note that the image sensor 1211 may have a configuration in which the independent message counter 1308 is provided for each virtual channel (virtual channel) or a configuration in which the message counter 1308 common to virtual channels is provided.

The message counter 1308 sets the message count value to an initial value (for example, 0 or a maximum value) in a first packet including the extended packet header of a certain virtual channel, and increments or decrements the message count value each time data including the extended packet header of the certain virtual channel is transmitted. Furthermore, for example, in a case where data not including the extended packet header is transmitted, the message counter 1308 does not increment or decrement the message count value and resumes counting when data including the extended packet header is next transmitted.

The message counter 1308 may continue counting regardless of frame start or frame end. Then, in a case where the message count value is counted to a specified value (for example, a maximum value or 0), the message counter 1308 returns the next message count value to the initial value (for example, 0 or the maximum value) and performs counting. Note that a part of the extended packet header may store a part of the nonce value.

Note that, in a case where a message is missing, the reception side (the image sensor 1211 or the application processor 1212) that receives the message count value can immediately detect the missing. For example, a Denial-of-service (DoS) attack or the like that invades availability of the image sensor 1211 or the application processor 1212 by intentionally mixing an enormous amount of messages is also immediately detected on the reception side. Therefore, the message count value is desirably stored in the extended packet header. By enabling detection of such missing, attacks, and the like in a shorter time, the reception side can start responding to the missing and attacks in a shorter time, which is particularly advantageous for propulsion devices capable of high-speed traveling or high-speed movement, for example.

Note that the message count value or the integrity operation value may also be stored for the write instruction (CCI Write), the read instruction (CCI Read), or the read response (CCI Read return value), and an element related to the extended packet may be applied. In that case, it becomes possible to cope with the functional safety, to protect the integrity, and the like for the write instruction, the read instruction, or the read response.

Figure 84:
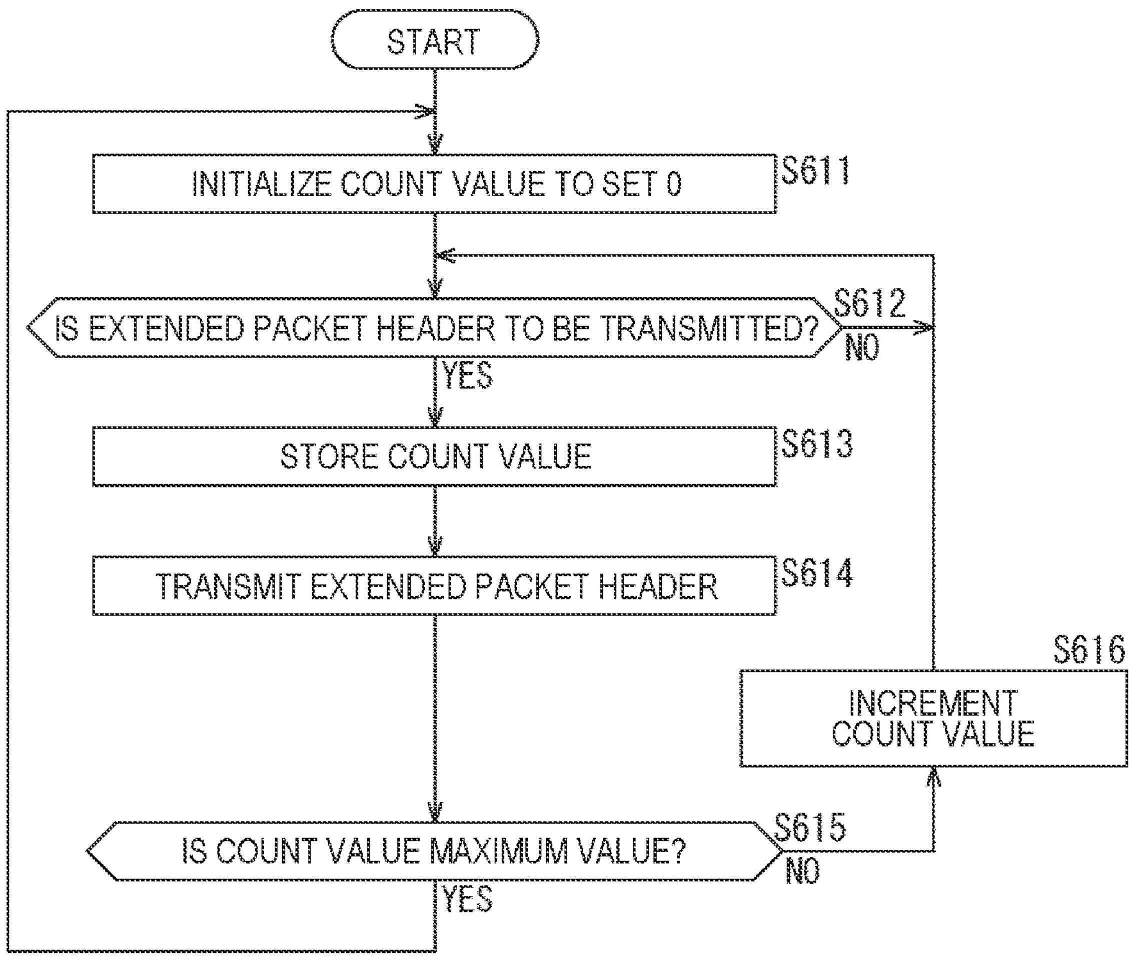
FIG. 84 is a flowchart for describing message count value transmission processing.

FIG. 84 is a flowchart illustrating message count value transmission processing in which the image sensor 1211 transmits the message count value.

In step S611, the message counter 1308 initializes and sets the message count value to 0.

In step S612, the extension mode-compatible CSI-2 transmission circuit 1304 determines whether or not to transmit the extended packet header, and the processing waits until it is determined to transmit the extended packet header. Then, in step S612, in a case where the extension mode-compatible CSI-2 transmission circuit 1304 determines to transmit the extended packet header, the processing proceeds to step S613.

In step S613, the extension mode-compatible CSI-2 transmission circuit 1304 acquires the message count value from the message counter 1308 and stores the message count value in the extended packet header.

In step S614, the extension mode-compatible CSI-2 transmission circuit 1304 transmits the extended packet header that has stored the message count value in step S613.

In step S615, the message counter 1308 determines whether or not the message count value has been counted up to the maximum value. In step S615, in a case where the message counter 1308 determines that the message count value has not been counted up to the maximum value, the processing proceeds to step S616.

In step S616, the message counter 1308 increments the message count value. Thereafter, the processing returns to step S612, and similar processing is repeatedly performed thereafter.

On the other hand, in step S615, in a case where the message counter 1308 determines that the message count value has been counted up to the maximum value, the processing returns to step S611 and initializes the message count value, and thereafter, similar processing is repeatedly performed.

Note that, in addition to incrementing the message count value in this manner, for example, the message count value may be initialized and set to the maximum value, and decrement may be performed.

<Embedded Data>

The embedded data will be described with reference to FIGS. 85A, 85B, 86, 87, and 88.

The image sensor 1211 can include additional information such as device setting information in a data stream by using the embedded data. The embedded data includes one or more lines (rows), and can include any of configuration data of the image sensor 1211, a register value conforming to a standard, a vendor-specific register value, description of a frame format, a statistical value, or the like.

Figures 85A, 85B:
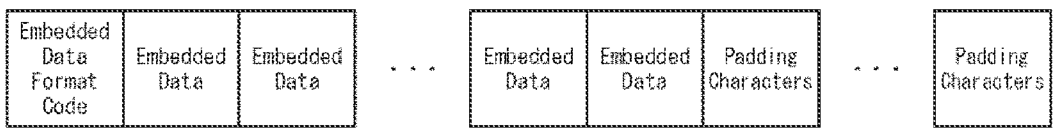
FIGS. 85A and 85B are diagrams for describing embedded data.

FIG. 85A illustrates embedded data of one line, and has a configuration in which embedded data of a desired data amount is continuously arranged following an embedded data format code, and a padding character is arranged in the rest of the data.

The embedded data includes information related to the image data or the user-defined data. Therefore, the image data or the user-defined data may be compressed data, but the embedded data is desirably uncompressed data (uncompressed data). Therefore, in a case where data compression is used, compressed data (image data or user-defined data) and uncompressed data (embedded data) are mixed in a frame for the high-speed data transmission.

In the embedded data, a plurality of lines (rows) of the embedded data can be provided according to the number of register values added to the embedded data. Furthermore, the number of rows of the embedded data can be specified by a part of the description in the frame format in the first embedded data row in the frame. The line length of the embedded data may be shorter than the line length of the image data or the user-defined data, but it is not favorable to exceed the line length of the image data or the user-defined data, and it is favorable that the line length of the embedded data is the same as the line length of the image data or the user-defined data. A first pixel value of the embedded data may indicate a format used for the embedded data.

A part or whole of the nonce value may be stored in at least a part of the embedded data indicating a vendor-specific code (Vendor specific) or a reserved code (Reserved for future use) as illustrated in FIG. 85B. The embedded data in the frame is stored either between the frame start and the first image data or the user-defined data, or between the last image data or the user-defined data and the frame end. Note that the embedded data between the last image data or the user-defined data and the frame end may be omitted.

Figure 86:
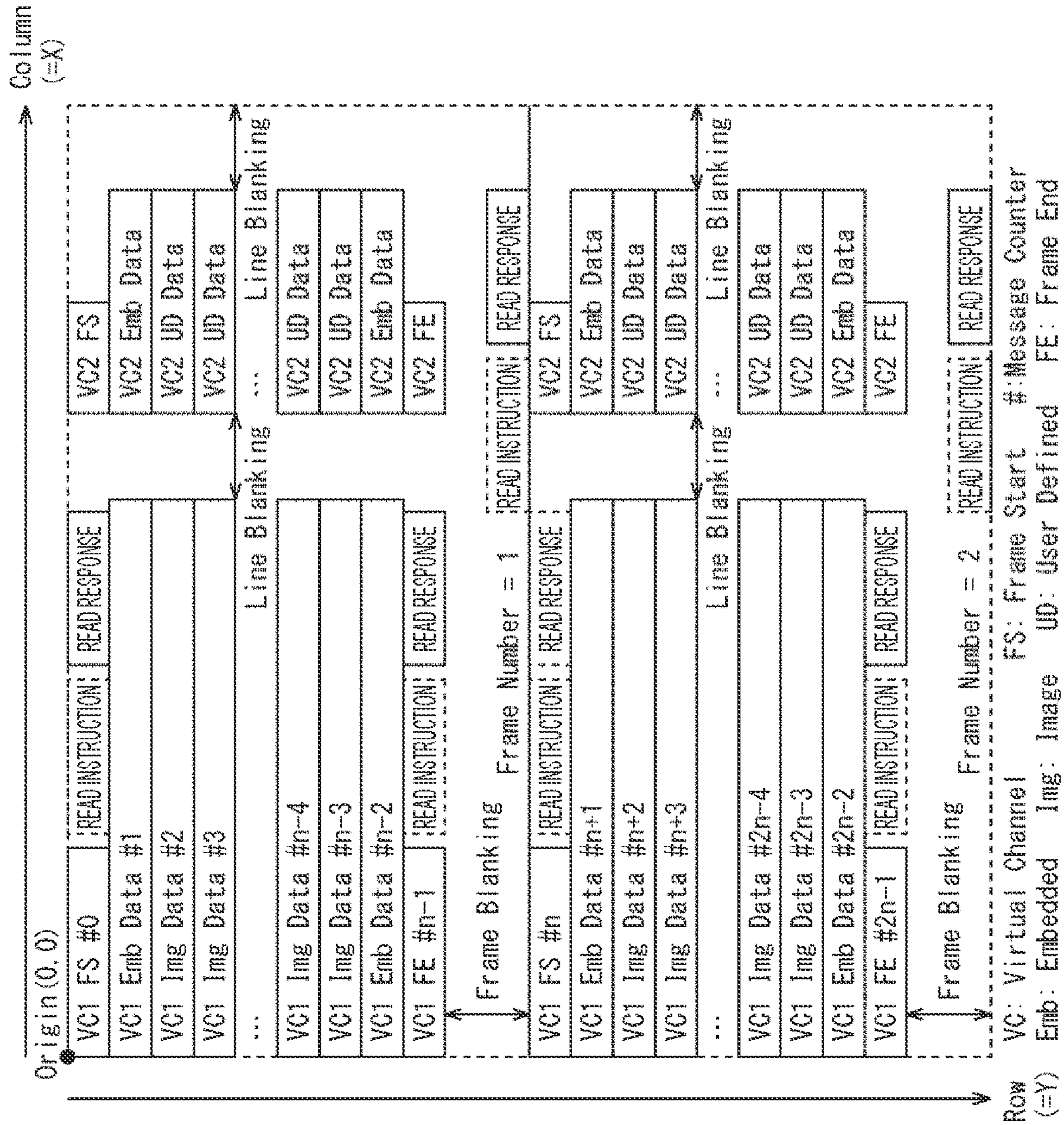
FIG. 86 is a diagram illustrating an example of a data structure of image data.

FIG. 86 illustrates an example of a data structure of the image data for two frames transmitted from the image sensor 1211.

As illustrated in FIG. 86, after frame start (VC1 FS) of a first virtual channel is transmitted, frame start (VC2 FS) of a second virtual channel is transmitted following the read instruction and the read response. Next, first embedded data (VC1 Emb Data) of the first virtual channel and first embedded data (VC2 Emb Data) of the second virtual channel are transmitted. Then, image data (VC1 Img Data) of the first virtual channel and the user-defined data (VC2 UD Data) of the second virtual channel for one frame are transmitted. When the transmission for one frame is completed, second embedded data (VC1 Emb Data) of the first virtual channel and second embedded data (VC2 Emb Data) of the second virtual channel are transmitted. Thereafter, after frame end (VC1 FE) of the first virtual channel is transmitted, frame end (VC2 FE) of the second virtual channel is transmitted following the read instruction and the read response.

FIG. 86 illustrates an example in which the message count value is made common between the first virtual channel and the second virtual channel. At this time, independent sage counters may be provided in the first virtual channel and the second virtual channel. Furthermore, the user-defined data may be image data or the like.

Here, a part or whole of the nonce value is stored in, for example, a period from the frame start to the frame end, or a period from the frame end to the frame start (frame blanking period). Furthermore, the period from the frame start to the frame end in which the nonce value can be stored is, for example, any of in the embedded data, in the image data, in non-image data, or in a line blanking period. Alternatively, the nonce value may be stored in the second virtual channel.

By defining the frame start and the frame end, for example, it becomes possible to notify a processor of start and end of the high-speed data transmission from the image sensor. Furthermore, the image sensor can keep a frame transmission cycle constant. Note that the embedded data is data in which an attribute indicating the image data, information (metadata) related to the image data, and the like are stored.

In the present embodiment, an example in which the high-speed data transmission of the nonce value is executed without hindering the high-speed data transmission of the image data will be described. That is, an example in which the high-speed data transmission of the image data and the high-speed data transmission of the nonce value are executed in series instead of in parallel will be described. Note that, in a case where the communication path is different between the high-speed data transmission of the image data and the transmission of the nonce value (high-speed data transmission or low-speed command transmission), the transmissions may be executed in parallel.

Note that since the high-speed data transmission and the low-speed command transmission can be separated in frequency by a filter, part or whole of the transmissions may be duplicated (executed in parallel) as long as power consumption is not a cause for concern. A part or whole of the nonce value may be transmitted every multiple frames but is desirably transmitted every frame, for example, for reasons such as frame missing. For example, a frame start (Frame Start; FS) packet includes Frame Start Code (Data Type=0x00), and a frame end (Frame End; FE) packet includes a Frame End Code (Data Type=0x01).

Figure 87:
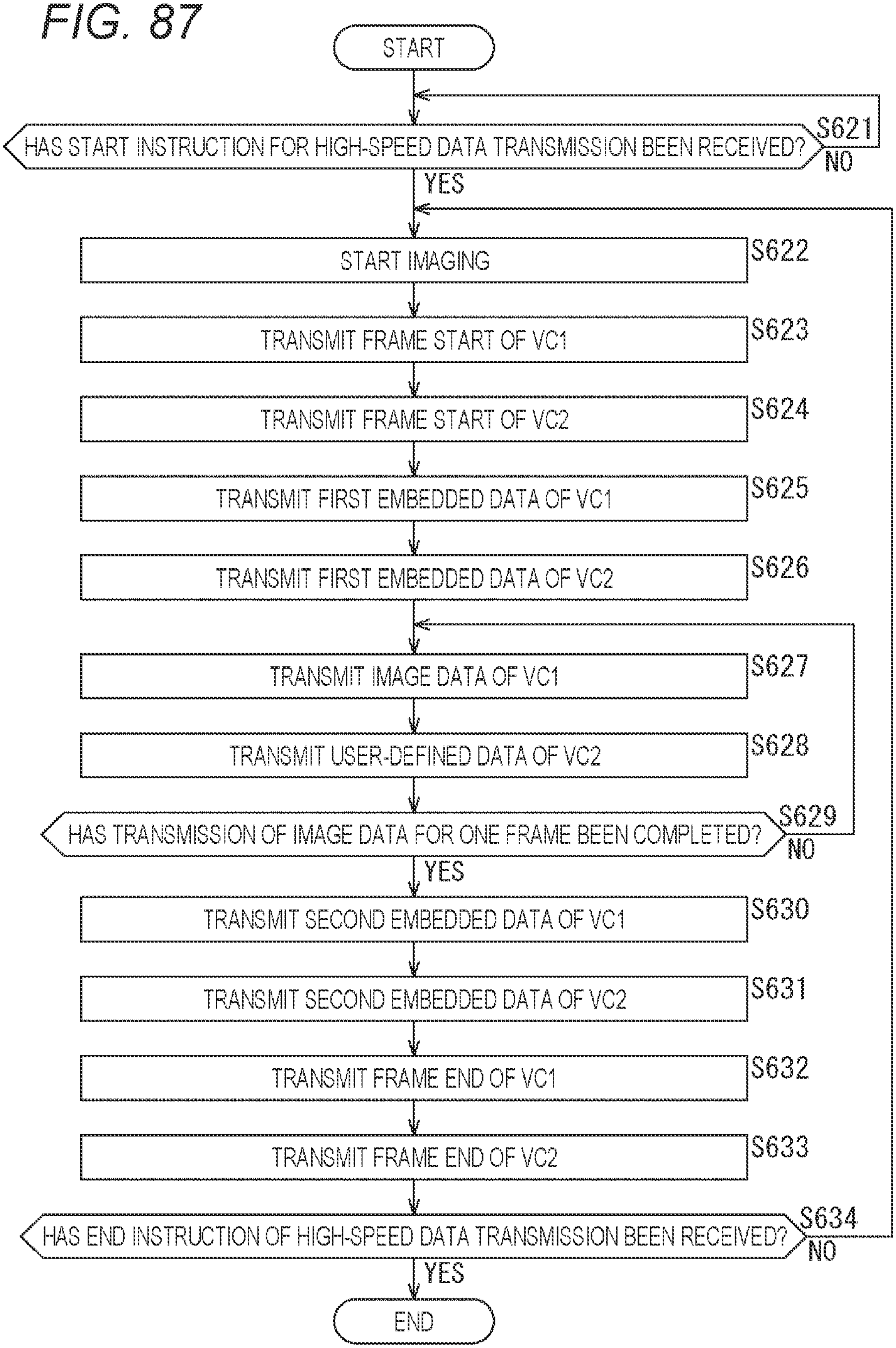
FIG. 87 is a flowchart for describing image data transmission processing.

FIG. 87 is a flowchart for describing image data transmission processing in which the image sensor 1211 transmits image data.

In step S621, the extension mode-compatible CSI-2 transmission circuit 1304 determines whether or not a start instruction for the high-speed data transmission has been received, and the processing waits until it is determined that the start instruction for the high-speed data transmission has been received. Then, in step S621, in a case where the extension mode-compatible CSI-2 transmission circuit 1304 determines that the start instruction for the high-speed data transmission has been received, the processing proceeds to step S622.

In step S622, the pixel 1301 starts imaging, and the image data output from the pixel 1301 is supplied to the extension mode-compatible CSI-2 transmission circuit 1304 via the AD converter 1302 and the image processing unit 1303.

In step S623, the extension mode-compatible CSI-2 transmission circuit 1304 transmits the frame start of the first virtual channel.

In step S624, the extension mode-compatible CSI-2 transmission circuit 1304 transmits the frame start of the second virtual channel.

In step S625, the extension mode-compatible CSI-2 transmission circuit 1304 transmits the first embedded data of the first virtual channel.

In step S626, the extension mode-compatible CSI-2 transmission circuit 1304 transmits the first embedded data of the second virtual channel.

In step S627, the extension mode-compatible CSI-2 transmission circuit 1304 transmits the image data of the first virtual channel.

In step S628, the extension mode-compatible CSI-2 transmission circuit 1304 transmits the user-defined data of the second virtual channel.

In step S629, the extension mode-compatible CSI-2 transmission circuit 1304 determines whether or not the transmission of the image data for one frame has been completed.

In step S629, in a case where the extension mode-compatible CSI-2 transmission circuit 1304 determines that the transmission of the image data for one frame has not been completed, the processing returns to step S627, and similar processing is repeatedly performed thereafter. On the other hand, in step S629, in a case where the extension mode-compatible CSI-2 transmission circuit 1304 determines that the transmission of the image data for one frame has been completed, the processing proceeds to step S630.

In step S630, the extension mode-compatible CSI-2 transmission circuit 1304 transmits the second embedded data of the first virtual channel.

In step S631, the extension mode-compatible CSI-2 transmission circuit 1304 transmits the second embedded data of the second virtual channel.

In step S632, the extension mode-compatible CSI-2 transmission circuit 1304 transmits the frame end of the first virtual channel.

In step S633, the extension mode-compatible CSI-2 transmission circuit 1304 transmits the frame end of the second virtual channel.

In step S634, the extension mode-compatible CSI-2 transmission circuit 1304 determines whether or not an end instruction for the high-speed data transmission has been received.

In step S634, in a case where the extension mode-compatible CSI-2 transmission circuit 1304 determines that the end instruction for the high-speed data transmission has not been received, the processing returns to step S622, and similar processing is repeated thereafter. On the other hand, in step S634, in a case where the extension mode-compatible CSI-2 transmission circuit 1304 determines that the end instruction for the high-speed data transmission has been received, the processing is terminated.

The start of imaging may be continuously executed until the end instruction for the high-speed data transmission is received, or may be executed each time the start instruction for the high-speed data transmission is received.

Figure 88:
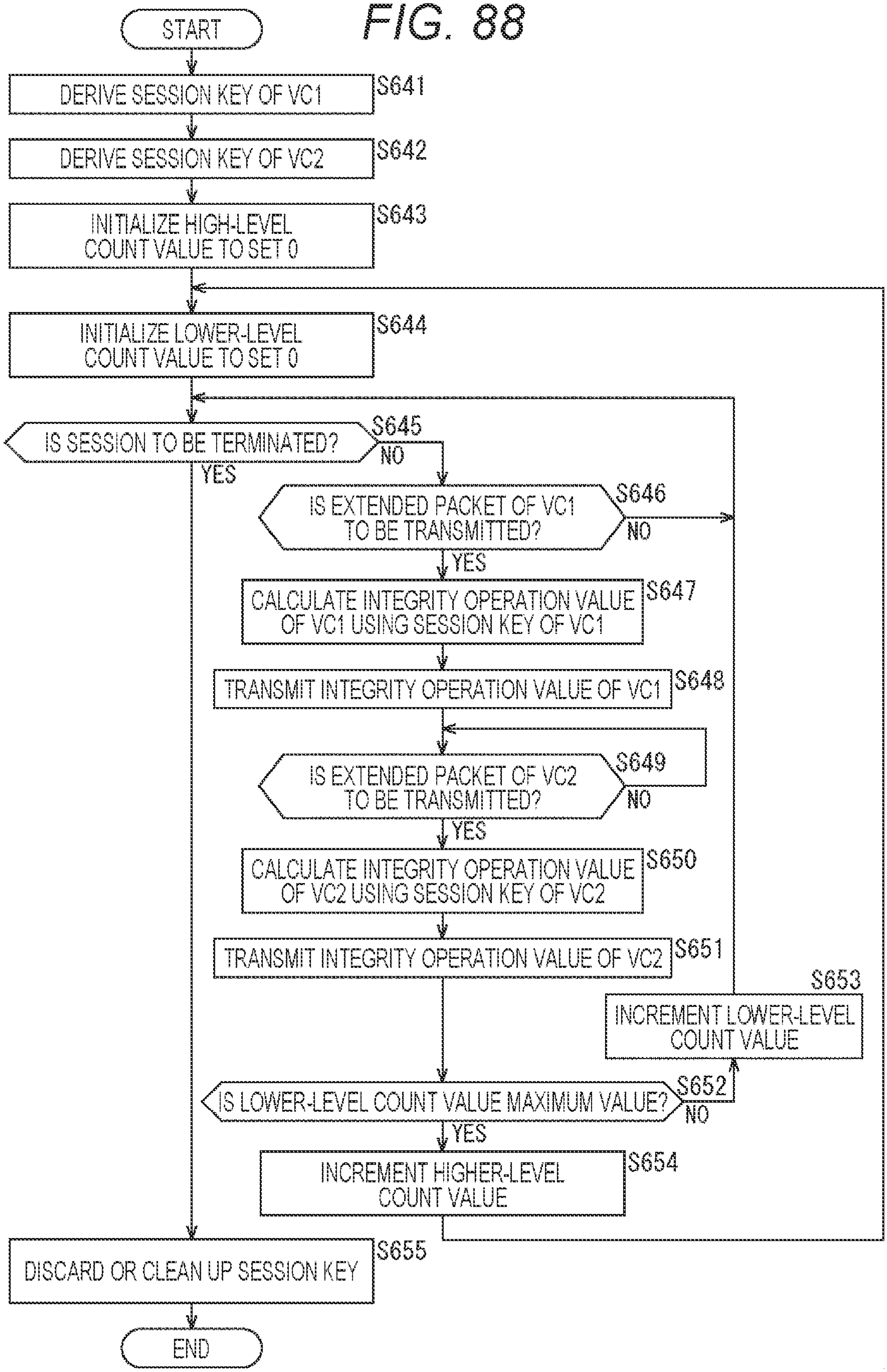
FIG. 88 is a flowchart for describing integrity operation value transmission processing.

FIG. 88 is a flowchart for describing integrity operation value transmission processing in which the image sensor 1211 transmits the integrity operation value.

In step S641, the security unit 1310 derives the session key of the first virtual channel.

In step S642, the security unit 1310 derives the session key of the second virtual channel.

In step S643, the message counter 1308 initializes and sets a higher-level count value of the message count value to 0.

In step S644, the message counter 1308 initializes and sets a lower-level count value of the message count value to 0.

In step S645, the extension mode-compatible CSI-2 transmission circuit 1304 determines whether or not to terminate the session, and in a case where it is determined not to terminate the session, the processing proceeds to step S646.

In step S646, the extension mode-compatible CSI-2 transmission circuit 1304 determines whether or not to transmit the extended packet of the first virtual channel.

In step S646, in a case where the extension mode-compatible CSI-2 transmission circuit 1304 determines not to transmit the extended packet of the first virtual channel, the processing returns to step S645, and similar processing is repeatedly performed thereafter. On the other hand, in step S646, in a case where the extension mode-compatible CSI-2 transmission circuit 1304 determines to transmit the extended packet of the first virtual channel, the processing proceeds to step S647.

In step S647, the security unit 1310 calculates the integrity operation value of the first virtual channel using the session key of the first virtual channel derived in step S641.

In step S648, the extension mode-compatible CSI-2 transmission circuit 1304 arranges the integrity operation value calculated in step S647 in the extended packet of the first virtual channel, and transmits the extended packet of the first virtual channel.

In step S649, the extension mode-compatible CSI-2 transmission circuit 1304 determines whether or not to transmit the extended packet of the second virtual channel, and waits for the processing until it is determined to transmit the extended packet of the second virtual channel. Then, in step S649, in a case where the extension mode-compatible CSI-2 transmission circuit 1304 determines to transmit the extended packet of the second virtual channel, the processing proceeds to step S650.

In step S650, the security unit 1310 calculates the integrity operation value of the second virtual channel using the session key of the second virtual channel derived in step S642.

In step S651, the extension mode-compatible CSI-2 transmission circuit 1304 arranges the integrity operation value calculated in step S650 in the extended packet of the second virtual channel, and transmits the extended packet of the second virtual channel.

In step S652, the message counter 1308 determines whether or not the lower-level count value of the message count value has been counted up to the maximum value.

In step S652, in a case where the message counter 1308 determines that the lower-level count value of the message count value has not been counted up to the maximum value, the processing proceeds to step S653. In step S653, after the message counter 1308 increments the lower-level count value of the message count value, the processing returns to step S645, and similar processing is repeatedly performed thereafter.

On the other hand, in step S652, in a case where the message counter 1308 determines that the lower-level count value of the message count value has been counted up to the maximum value, the processing proceeds to step S654. In step S654, after the message counter 1308 increments the higher-level count value of the message count value, the processing returns to step S644, and similar processing is repeatedly performed thereafter.

Then, in step S645, in a case where the extension mode-compatible CSI-2 transmission circuit 1304 determines to terminate the session, the processing proceeds to step S655.

In step S655, the security unit 1310 discards or cleans up the session key of the first virtual channel and the session key of the second virtual channel, and then the processing is terminated.

<Modification of Data Structure of Image Data>

The data structure of the image data will be described with reference to FIGS. 89 to 91.

Figure 89:
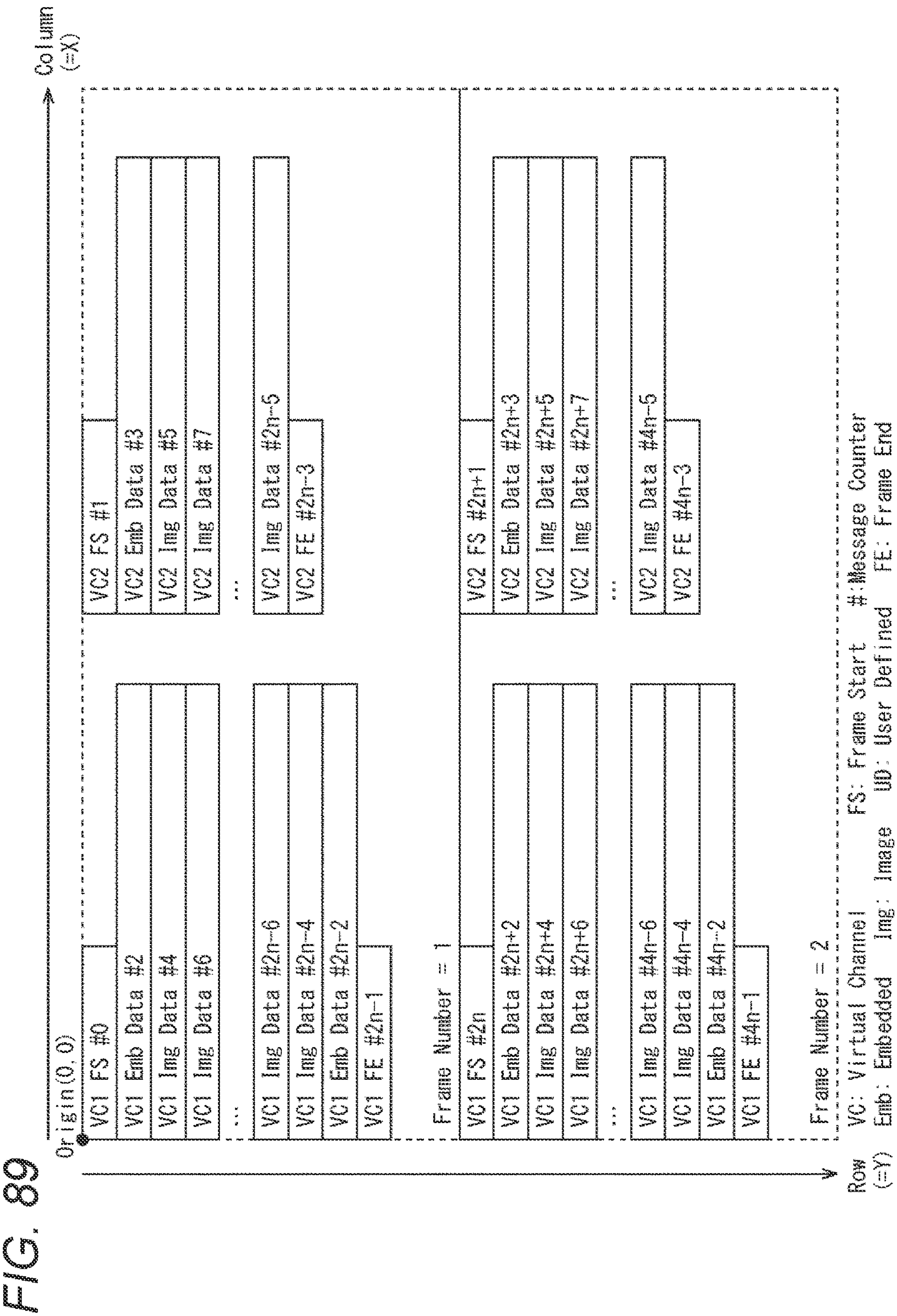
FIG. 89 is a diagram illustrating a first modification of a data structure of image data.

FIG. 89 illustrates a first modification of the data structure of the image data.

In the data structure of the image data illustrated in FIG. 89, the message count value made common to the first virtual channel and the second virtual channel is used.

Note that the session key or the message counter may be made common to the first virtual channel and the second virtual channel. Furthermore, the image data or the embedded data may be replaced with other data. For example, the embedded data may be replaced with the image data. Meanwhile, the message counter may be made common by performing counting across virtual channels (VC).

Figure 90:
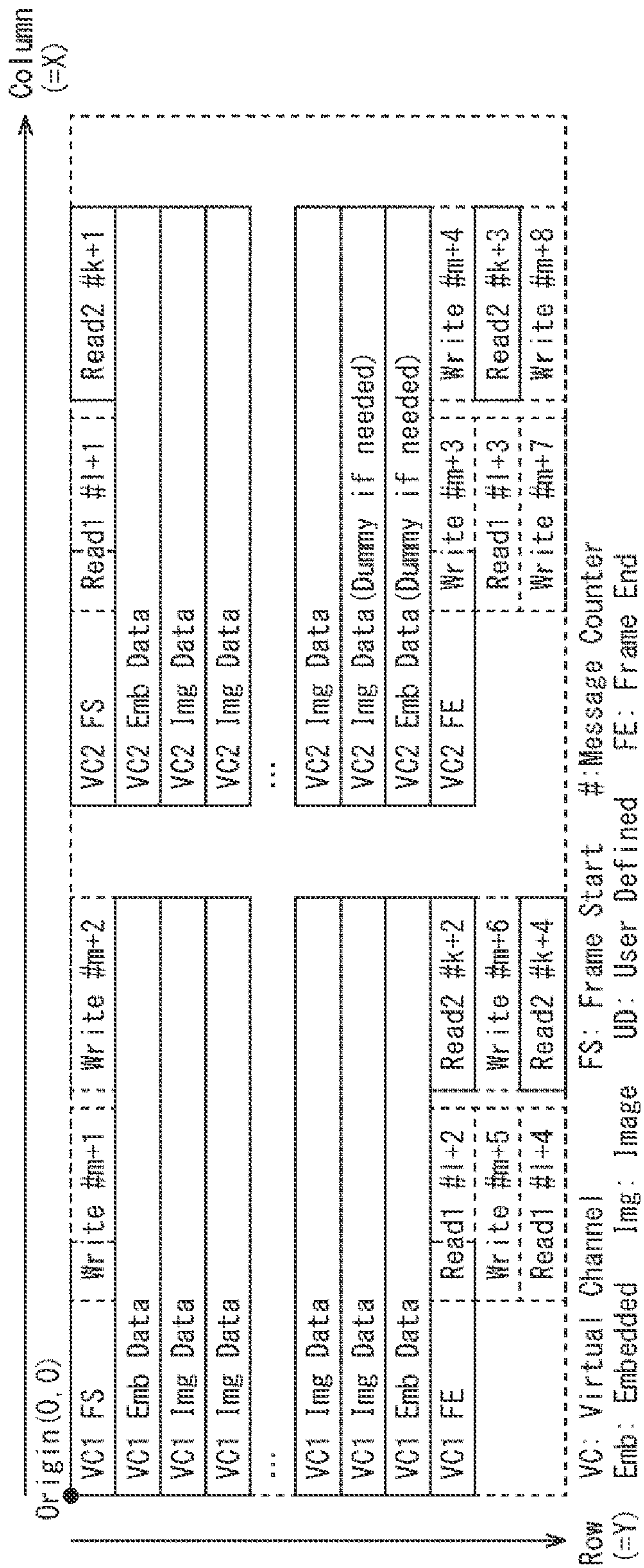
FIG. 90 is a diagram illustrating a second modification of a data structure of image data.

FIG. 90 illustrates a second modification of the data structure of the image data.

In the data structure of the image data illustrated in FIG. 90, independent message count values are respectively used in Write (CCI write instruction), Read1 (CCI read instruction), and Read2 (CCI read response).

Figure 91:
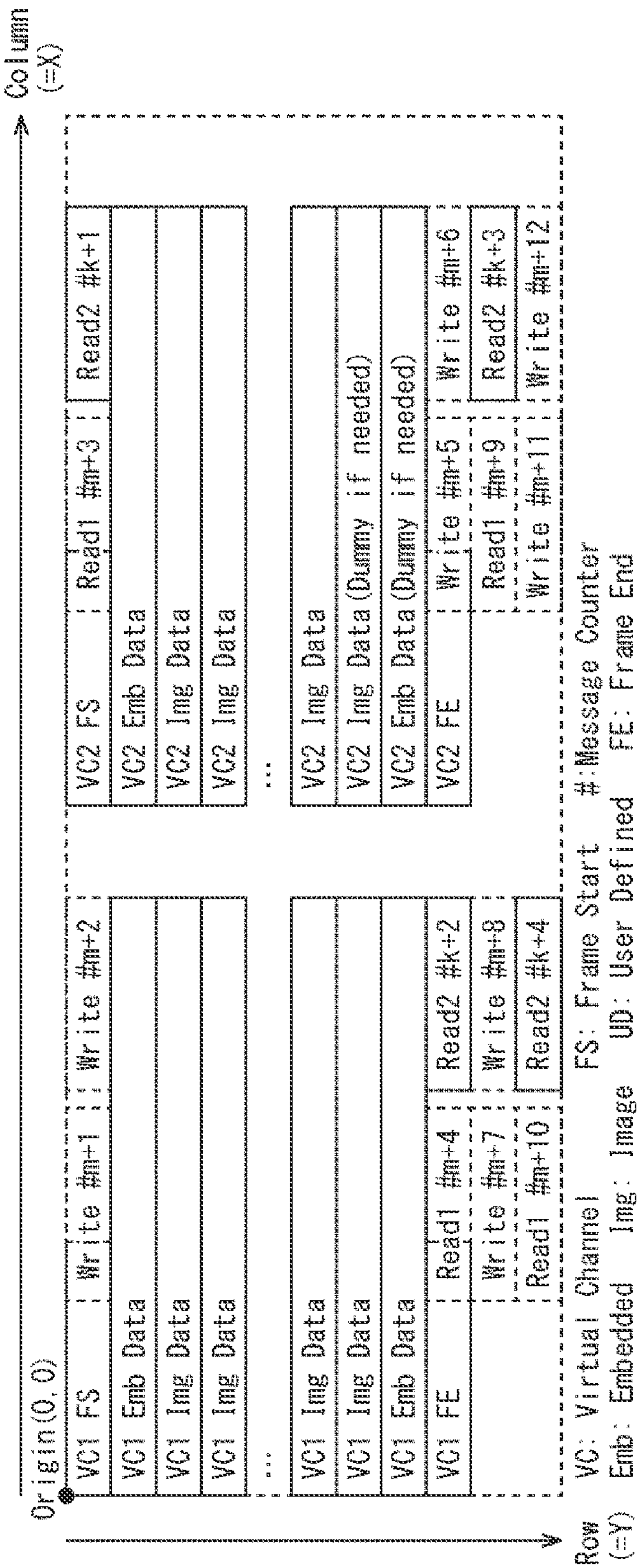
FIG. 91 is a diagram illustrating a third modification of a data structure of image data.

FIG. 91 illustrates a third modification of the data structure of the image data.

In the data structure of the image data illustrated in FIG. 91, independent message count values are respectively provided in CCI uplink (Write and Read1) and CCI downlink (Read2). That is, the message count value may be made common to Write (CCI write instruction) and Read1 (CCI read instruction).

<Nonce Value>

Since the nonce value is, for example, a number used once for the same session key, the nonce value is used as a part or whole of an initialization vector of an encryption operation or a decryption operation using the session key. Therefore, the nonce used by the image sensor 1211 for the encryption operation is transmitted from the image sensor 1211 and received by the application processor 1212, so that the application processor 1212 can obtain the nonce value necessary for the decryption operation.

That is, it is desirable that the image sensor 1211 transmit the nonce value before transmitting the image data. Specifically, a part or whole of the nonce value corresponding to the image data in a certain frame is stored in any of a read response, user-defined data, embedded data (immediately after the image data), frame end, frame start, embedded data (immediately before the image data), or the like after completion of transmission of the last image data in a previous frame before the start of transmission of the first image data in the certain frame.

For example, the application processor 1212, which is a master of the low-speed command transmission, may transmit, by the low-speed command transmission, a read instruction for requesting read of the nonce value in the image sensor 1211 to the application processor 1212 in response to reception start or reception completion of any of the frame start, embedded data, image data, user-defined data, frame end, or the like transmitted by the high-speed data transmission from the image sensor 1211, which is a slave of the low-speed command transmission.

The image sensor 1211 receives the read instruction transmitted from the application processor 1212 and transmits the nonce value corresponding thereto by the high-speed data transmission. Then, the nonce value can be notified from the image sensor 1211 to the application processor 1212 by the application processor 1212 receiving the read response.

Since the nonce value notified from the image sensor 1211 is used in the application processor 1212, it is desirable that a part or whole of the nonce value is transmitted within the frame blanking period between the frame end and the next frame start, in which the image data is not transmitted. Note that, for the first frame (Frame Number=1), the first nonce value (initial value) may be agreed in advance between the image sensor 1211 and the application processor 1212, or a part or whole of the first nonce value may be received by the application processor 1212 before the start of transmission of the image data.

This read instruction corresponds to, for example, Read of Read/Write in the I2C or I3C standard. Meanwhile, the read response corresponds to the Read return value. Note that, to adjust the timing of the read response, a timer that waits for a predetermined time may be provided in a period from reception of the high-speed data transmission to transmission of the read instruction by the application processor 1212.

<I2C and I3C>

An inter-integrated circuit serial bus, sometimes referred to as an I2C bus or an $I^2C$ bus, is a serial single-ended computer bus intended to be used in connecting a low-speed peripheral to the application processor 1212. The I2C bus is a multi-master bus on which each device can act as a master and a slave for various messages transmitted on the I2C bus.

The I2C bus can transmit data using only two bi-directional open drain connectors including a serial data line (SDA) and a serial clock line (SCL). The connectors typically include signal lines terminated by pull-up resistors. A protocol that manages operation of the I2C bus defines a basic type of messages, and each of those messages starts with START and ends with STOP. The I2C bus uses 7-bit addressing and defines two types of nodes.

A master node is a node that generates a clock and initiates communication with a slave node. A slave node is a node that receives a clock and responds when addressed by the master. The I2C bus is a multi-master bus, which means that any number of master nodes can be present. Moreover, the roles of the master and the slave may be changed between messages (that is, after STOP is sent). In the present embodiment, which is camera implementation, unidirectional transmission may be used to capture images from a sensor and transmit such image data to a memory in a baseband processor, while control data may be exchanged between the baseband processor and the sensor as well as other peripheral devices.

In one example, a camera control interface (CCI) protocol may be used for such control data between the baseband processor and the image sensor (or one or more slave nodes). In one example, the CCI protocol may be implemented via an I2C serial bus between the image sensor and the baseband processor. Conventional I2C systems, i.e., camera control interface-based camera systems, use a separate interrupt (IRQ) line for each slave device to allow the slave node to indicate to the master node that the slave node desires to use the bus.

Meanwhile, the communication standard of I3C is a standard for performing communication via two signal lines of an SDA line for transmitting data and an SCL line for transmitting a clock signal. In this standard, devices (such as a processor) are classified into a device that operates as a master or a slave and a device that operates only as a slave. For example, the processor operates as a master or a slave, and the sensor operates only as a slave.

Here, the master is a device that controls the slave, and the slave is a device that operates according to the control of the master. Furthermore, in I3C, a plurality of slaves can be connected to one master. Furthermore, a plurality of masters can transmit a signal to one slave, and this communication is hereinafter referred to as "multi-master communication". Moreover, communication can be performed between the slaves without passing through the master, and this communication is referred to as "peer-to-peer communication". Furthermore, while the SDA line is in communication (busy) by communication of another device, the slave can interrupt the communication to perform communication, and this interruption is referred to as "in-band interrupt".

In the above-described multi-master communication, in-band interrupt, and peer-to-peer communication, signals simultaneously transmitted by a plurality of devices may collide on the SDA line. For example, when a certain slave performs the in-band interrupt and transmits a signal to the master while the master transmits a signal to another slave, the signal from the master and the signal from the slave collide with each other. Therefore, the device in I3C has a function to detect a collision and arbitrate the devices.

Since synchronization with the application processor 1212 is easy by using the above interrupt function, nonce related information is transmitted according to timing determined by the image sensor 1211 by executing the interrupt at timing determined by the image sensor 1211. Note that the image sensor 1211 may trigger the read instruction by the in-band interrupt and transmit the read response accordingly, or may omit the read instruction by the in-band interrupt and transmit the read response.

<Integrity Operation Value Processing>

Integrity operation value processing will be described with reference to FIGS. 92 to 95.

Figure 92:
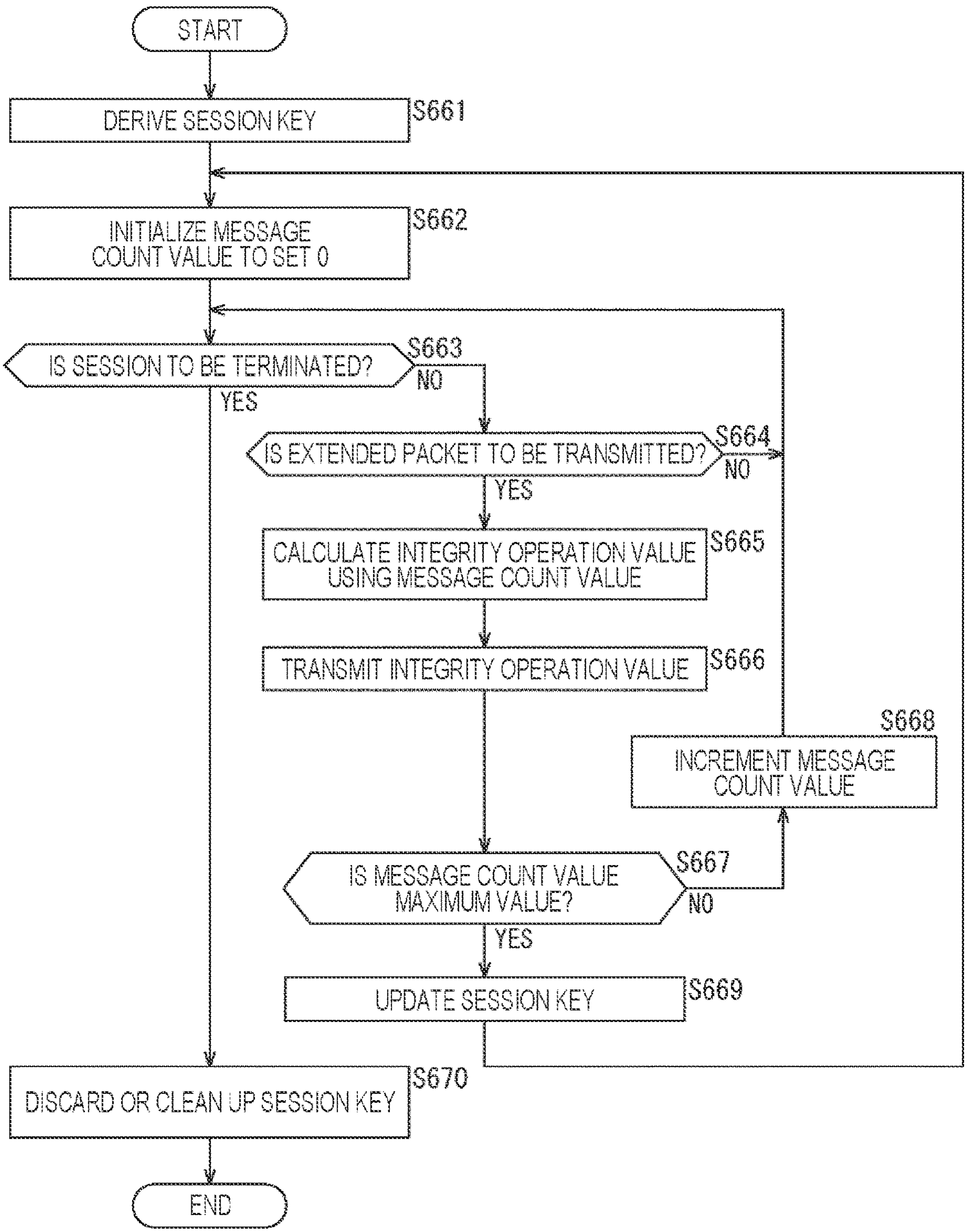
FIG. 92 is a flowchart for describing a first processing example of integrity operation value processing.

FIG. 92 is a flowchart for describing a first processing example of the integrity operation value processing in which the image sensor 1211 transmits the integrity operation value.

In step S661, the security unit 1310 derives the session key.

In step S662, the message counter 1308 initializes and sets the message count value to 0.

In step S663, the extension mode-compatible CSI-2 transmission circuit 1304 determines whether or not to terminate the session, and in a case where it is determined not to terminate the session, the processing proceeds to step S664.

In step S664, the extension mode-compatible CSI-2 transmission circuit 1304 determines whether or not to transmit the extended packet.

In step S664, in a case where the extension mode-compatible CSI-2 transmission circuit 1304 determines not to transmit the extended packet, the processing returns to step S663, and similar processing is repeatedly performed thereafter. On the other hand, in step S664, in a case where the extension mode-compatible CSI-2 transmission circuit 1304 determines to transmit the extended packet, the processing proceeds to step S665.

In step S665, the security unit 1310 calculates the integrity operation value using the message count value.

In step S666, the extension mode-compatible CSI-2 transmission circuit 1304 arranges the integrity operation value calculated in step S665 in the extended packet, and transmits the extended packet.

In step S667, the message counter 1308 determines whether or not the message count value has been counted up to the maximum value. In step S667, in a case where the message counter 1308 determines that the message count value has not been counted up to the maximum value, the processing proceeds to step S668.

In step S668, the message counter 1308 increments the message count value. Thereafter, the processing returns to step S663, and similar processing is repeatedly performed thereafter.

On the other hand, in step S667, in a case where the message counter 1308 determines that the message count value has been counted up to the maximum value, the processing proceeds to step S669. In step S669, after the security unit 1310 updates the session key, the processing returns to step S662, and similar processing is repeatedly performed thereafter.

Then, in step S663, in a case where the extension mode-compatible CSI-2 transmission circuit 1304 determines to terminate the session, the processing proceeds to step S670.

In step S670, the security unit 1310 discards or cleans up the session key, and then the processing is terminated.

As described above, in the case where the MAC value for each image line is calculated, stored in the extended packet footer, and transmitted, the message count value is incremented by 1 every time the extended packet is transmitted, and thus the message count value goes around in $2^{16}$ times. For example, in a case of transmitting 4K data with a frame rate of 60 fps and the number of pixels of 4096×2160 (horizontal×vertical), the message count value goes around in $(2^{16})/(60\times2163)\approx0.5$ seconds, assuming transmission of the extended packet of 2163 lines obtained by adding 3 lines of the frame start, the embedded data, and the frame end in one frame.

For example, in a case where the image sensor 1211 calculates the MAC value such as a Galois Message Authentication Code (GMAC) value for a message, using the same initialization vector value with the same session key, and transmits the message and the MAC value, an attacker can easily obtain the session key by calculating simultaneous equations for the message and the MAC value. In that case, the attacker becomes able to freely falsify the MAC value and can perform attacks such as message spoofing, falsification, and replay. Therefore, in a case where the message count value is used as a variable portion of the initialization vector, that is, the nonce value, it is necessary to update the session key before the message count value goes round. For example, by utilizing the frame blanking or line blanking period, the session key may be updated before the nonce value goes round (rollover).

Figure 93:
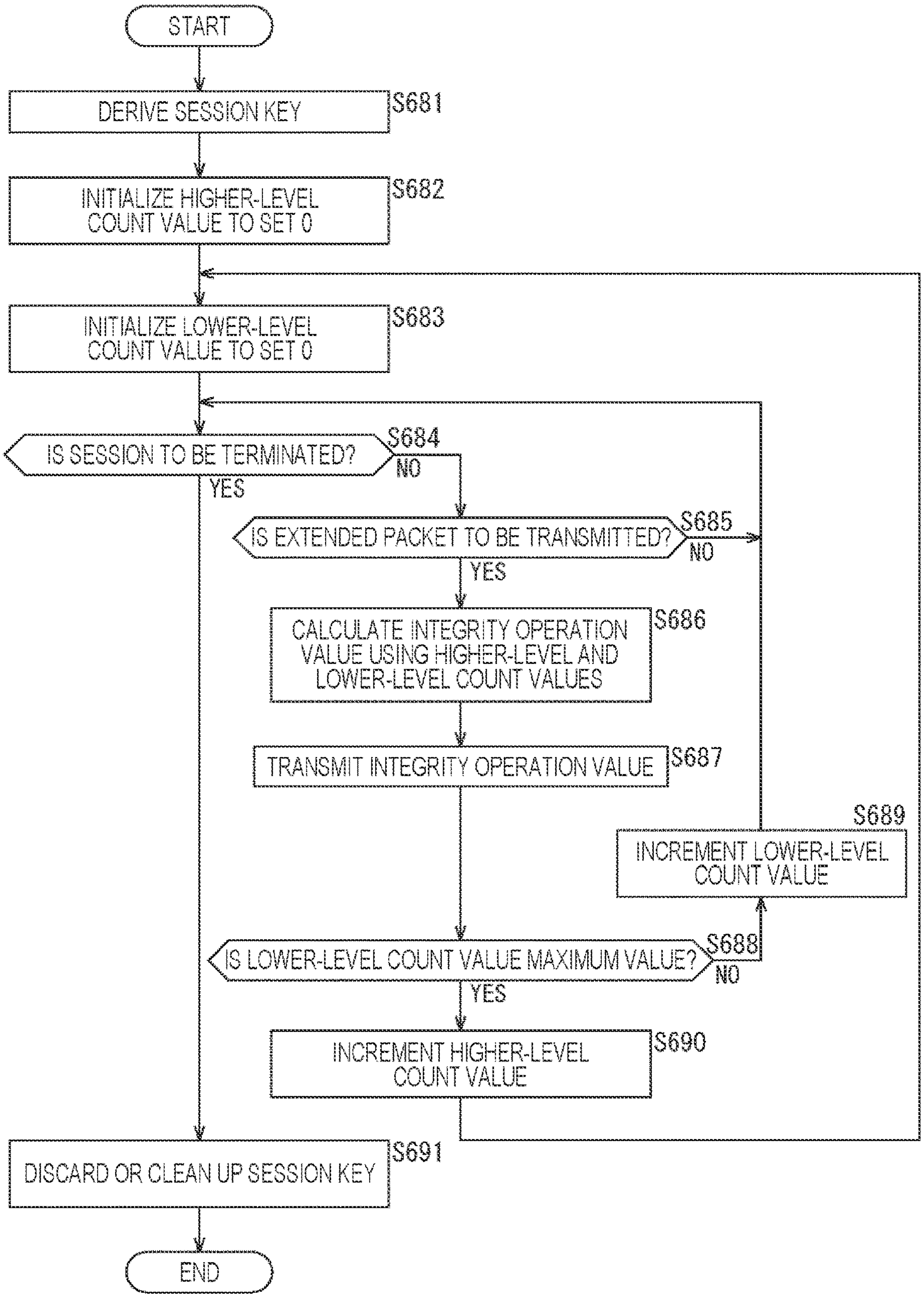
FIG. 93 is a flowchart for describing a second processing example of integrity operation value processing.

FIG. 93 is a flowchart for describing a second processing example of the integrity operation value processing in which the image sensor 1211 transmits the integrity operation value.

In step S681, the security unit 1310 derives the session key.

In step S682, the message counter 1308 initializes and sets a higher-level count value of the message count value to 0.

In step S683, the message counter 1308 initializes and sets a lower-level count value of the message count value to 0.

In step S684, the extension mode-compatible CSI-2 transmission circuit 1304 determines whether or not to terminate the session, and in a case where it is determined not to terminate the session, the processing proceeds to step S685.

In step S685, the extension mode-compatible CSI-2 transmission circuit 1304 determines whether or not to transmit the extended packet.

In step S685, in a case where the extension mode-compatible CSI-2 transmission circuit 1304 determines not to transmit the extended packet, the processing returns to step S684, and similar processing is repeatedly performed thereafter. On the other hand, in step S685, in a case where the extension mode-compatible CSI-2 transmission circuit 1304 determines to transmit the extended packet, the processing proceeds to step S686.

In step S686, the security unit 1310 calculates the integrity operation value using the higher-level count value and the lower-level count value of the message count value.

In step S687, the extension mode-compatible CSI-2 transmission circuit 1304 arranges the integrity operation value calculated in step S686 in the extended packet, and transmits the extended packet.

In step S688, the message counter 1308 determines whether or not the lower-level count value of the message count value has been counted up to the maximum value. In step S688, in a case where the message counter 1308 determines that the lower-level count value of the message count value has not been counted up to the maximum value, the processing proceeds to step S689.

In step S689, the message counter 1308 increments the lower-level count value of the message count value. Thereafter, the processing returns to step S684, and similar processing is repeatedly performed thereafter.

On the other hand, in step S688, in a case where the message counter 1308 determines that the lower-level count value of the message count value has been counted up to the maximum value, the processing proceeds to step S690. In step S690, after the message counter 1308 increments the higher-level count value of the message count value, the processing returns to step S683, and similar processing is repeatedly performed thereafter.

Then, in step S684, in a case where the extension mode-compatible CSI-2 transmission circuit 1304 determines to terminate the session, the processing proceeds to step S691.

In step S691, the security unit 1310 discards or cleans up the session key, and then the processing is terminated.

In this manner, in the case where the message count value is used as a part of the initialization vector, that is, a part of the nonce value (for example, the lower-level count value), it is possible to make the update of the session key unnecessary and to reduce the update frequency of the session key by also using the rest of the nonce value (for example, the higher-level count value) in combination.

For example, in the case of transmitting 4K data with the frame rate of 60 fps and the number of pixels of 4096×2160 (horizontal×vertical), the nonce value goes around

- in $2^{32}\div60\div2163\approx9$ hours when using the higher-level count value with a 16-bit width together,
- in $2^{36}\div60\div2163\approx6$ days when using the higher-level count value with a 20-bit width together,
- in $2^{40}\div60\div2163\approx98$ days when using the higher-level count value with a 24-bit width together,
- in $2^{44}\div60\div2163\approx4$ years when using the higher-level count value with 28-bit width together, or
- in $2^{48}\div60\div2163\approx69$ years when using the higher-level count value with a 32-bit width together.

Here, in a case where a power supply of the image sensor 1211 or the application processor 1212 is restarted (turned ON after being turned OFF), key exchange is required before the protected image data is transmitted again, and the session key is updated accordingly. For example, in general in-vehicle applications, a possibility that the power supply is not restarted for 6 days or more is low, and a possibility that the power supply is not restarted for 4 years or more is extremely low. Therefore, a 20-bit to 28-bit width is sufficient for the higher-level count value. Of course, the present embodiment is not limited thereto, and a bit width larger than the above bit width may be used.

For example, in a case of an oil-supply-type vehicle, the power supply is simply turned OFF at the time of oil supply, and even in a case of an oil-supply-type or rechargeable vehicle, when the power supply is turned OFF at the time of vehicle inspection, key replacement is required before the protected image data is transmitted again, so that the session key is updated accordingly. For example, in a case where an image sensor for Internet of Things or Intelligence of Things (IoT) is assumed, it is also assumed that the power supply is not restarted. Therefore, a 32-bit width is sufficient for the higher-level count value. Of course, the present embodiment is not limited thereto, and a bit width larger than the above bit width may be used.

Figure 94:
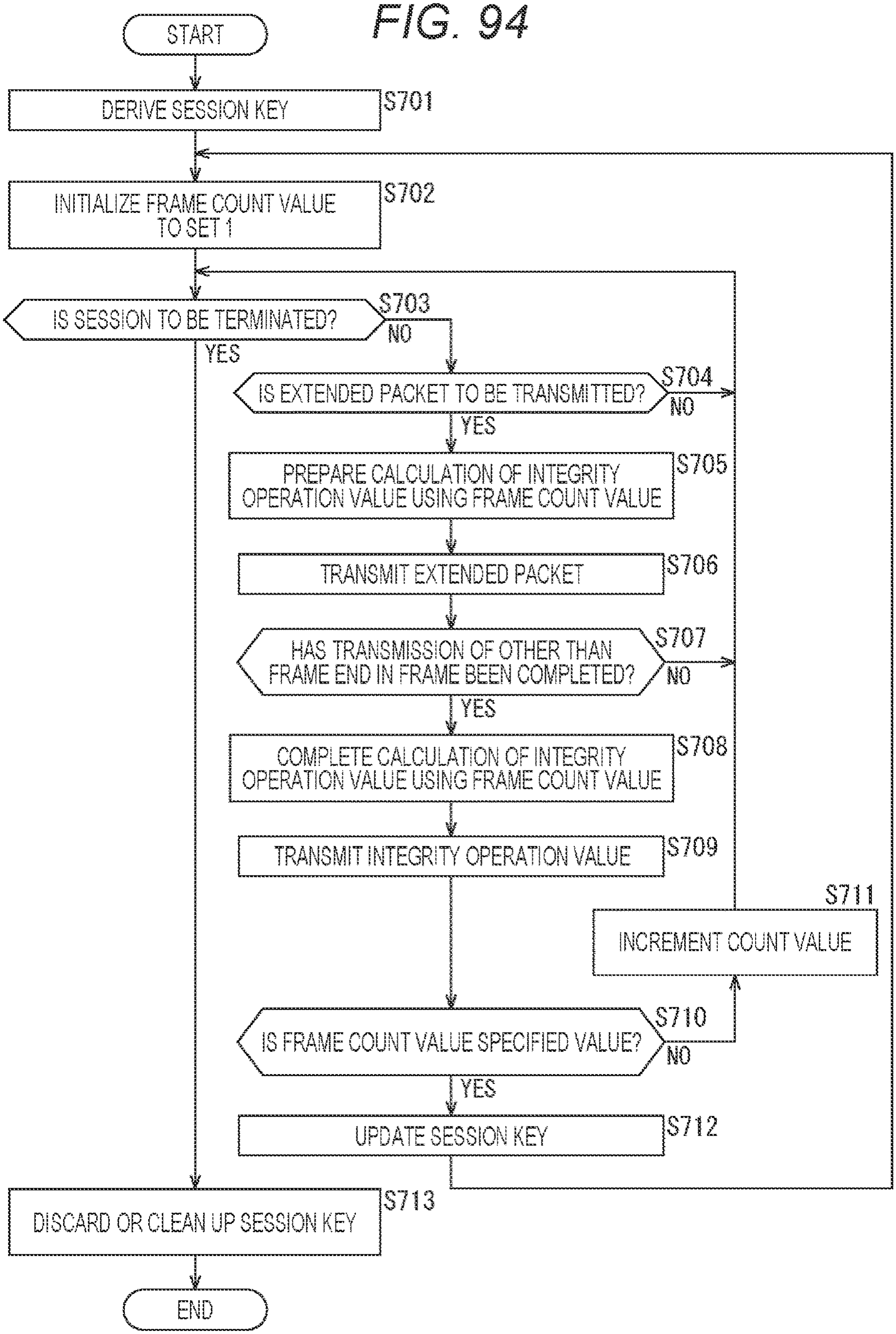
FIG. 94 is a flowchart for describing a third processing example of integrity operation value processing.

FIG. 94 is a flowchart for describing a third processing example of the integrity operation value processing in which the image sensor 1211 transmits the integrity operation value.

In step S701, the security unit 1310 derives the session key.

In step S702, the message counter 1308 initializes and sets the frame count value to 1.

In step S703, the extension mode-compatible CSI-2 transmission circuit 1304 determines whether or not to terminate the session, and in a case where it is determined not to terminate the session, the processing proceeds to step S704.

In step S704, the extension mode-compatible CSI-2 transmission circuit 1304 determines whether or not to transmit the extended packet.

In step S704, in a case where the extension mode-compatible CSI-2 transmission circuit 1304 determines not to transmit the extended packet, the processing returns to step S703, and similar processing is repeatedly performed thereafter. On the other hand, in step S704, in a case where the extension mode-compatible CSI-2 transmission circuit 1304 determines to transmit the extended packet, the processing proceeds to step S705.

In step S705, the security unit 1310 prepares calculation of the integrity operation value performed using the frame count value.

In step S706, the extension mode-compatible CSI-2 transmission circuit 1304 transmits the extended packet.

In step S707, the extension mode-compatible CSI-2 transmission circuit 1304 determines whether or not transmission other than the frame end in the frame has been completed. In step S707, in a case where the extension mode-compatible CSI-2 transmission circuit 1304 determines that the transmission other than the frame end in the frame has not been completed, the processing returns to step S703, and similar processing is repeatedly performed thereafter. On the other hand, in step S707, in a case where the extension mode-compatible CSI-2 transmission circuit 1304 determines that the transmission other than the frame end in the frame has been completed, the processing proceeds to step S708.

In step S708, the security unit 1310 completes the calculation of the integrity operation value performed using the frame count value.

In step S709, the extension mode-compatible CSI-2 transmission circuit 1304 transmits the integrity operation value together with the frame end.

In step S710, the message counter 1308 determines whether or not the frame count value has been counted up to a specified value. In step S710, in a case where the message counter 1308 determines that the frame count value has not been counted up to the specified value, the processing proceeds to step S711.

In step S711, the message counter 1308 increments the frame count value. Thereafter, the processing returns to step S703, and similar processing is repeatedly performed thereafter.

On the other hand, in step S710, in a case where the message counter 1308 determines that the frame count value has been counted up to the specified value, the processing proceeds to step S712. In step S712, after the security unit 1310 updates the session key, the processing returns to step S702, and similar processing is repeatedly performed thereafter.

Then, in step S703, in a case where the extension mode-compatible CSI-2 transmission circuit 1304 determines to terminate the session, the processing proceeds to step S713.

In step S713, the security unit 1310 discards or cleans up the session key, and then the processing is terminated.

As described above, the image sensor 1211 may calculate the integrity operation value for each image frame and collectively transmit the integrity operation values. The integrity operation value in that case is stored in the embedded data after the image data, in the user-defined data, or in the read response, and transmitted.

The frame start or the frame end may include, for example, a 16-bit frame number. This frame number may be the same between the frame start and the frame end corresponding to a predetermined frame. When using the 16-bit frame number, it is desirable, but not limited to, a non-zero value to distinguish the frame number from use cases where the frame number does not work and remains set to 0.

The frame number is incremented by 1 or 2 for each frame start packet having the same virtual channel, and is periodically reset to 1. For example, in a case where an image frame is masked (that is, not transmitted) due to damage, the frame number may be incremented by 2.

To cope with such a case, increment by 1 and increment by 2 may be freely mixed in a sequence of frame numbers as necessary. That is, in a case where the frame number is incremented by 1, the frame number goes around in $2^{16}-1$ times. Furthermore, in a case where the frame rate is 60 fps, the frame number goes around in $(2^{16}-1)\div 60\approx 18$ minutes.

For example, in a case where the image sensor 1211 calculates the MAC value such as a Galois Message Authentication Code (GMAC) value for a message, using the same initialization vector value with the same session key, and transmits the message and the MAC value, an attacker can easily obtain the session key by calculating simultaneous equations for the message and the MAC value. In that case, the attacker becomes able to freely falsify the MAC value and can perform attacks such as message spoofing, falsification, and replay.

Therefore, in a case where the frame number is used as the initialization vector, that is, the nonce value, it is necessary to update the session key before the frame number goes around. For example, by utilizing the frame blanking or line blanking period, the session key may be updated before the nonce value goes round (rollover).

Figure 95:
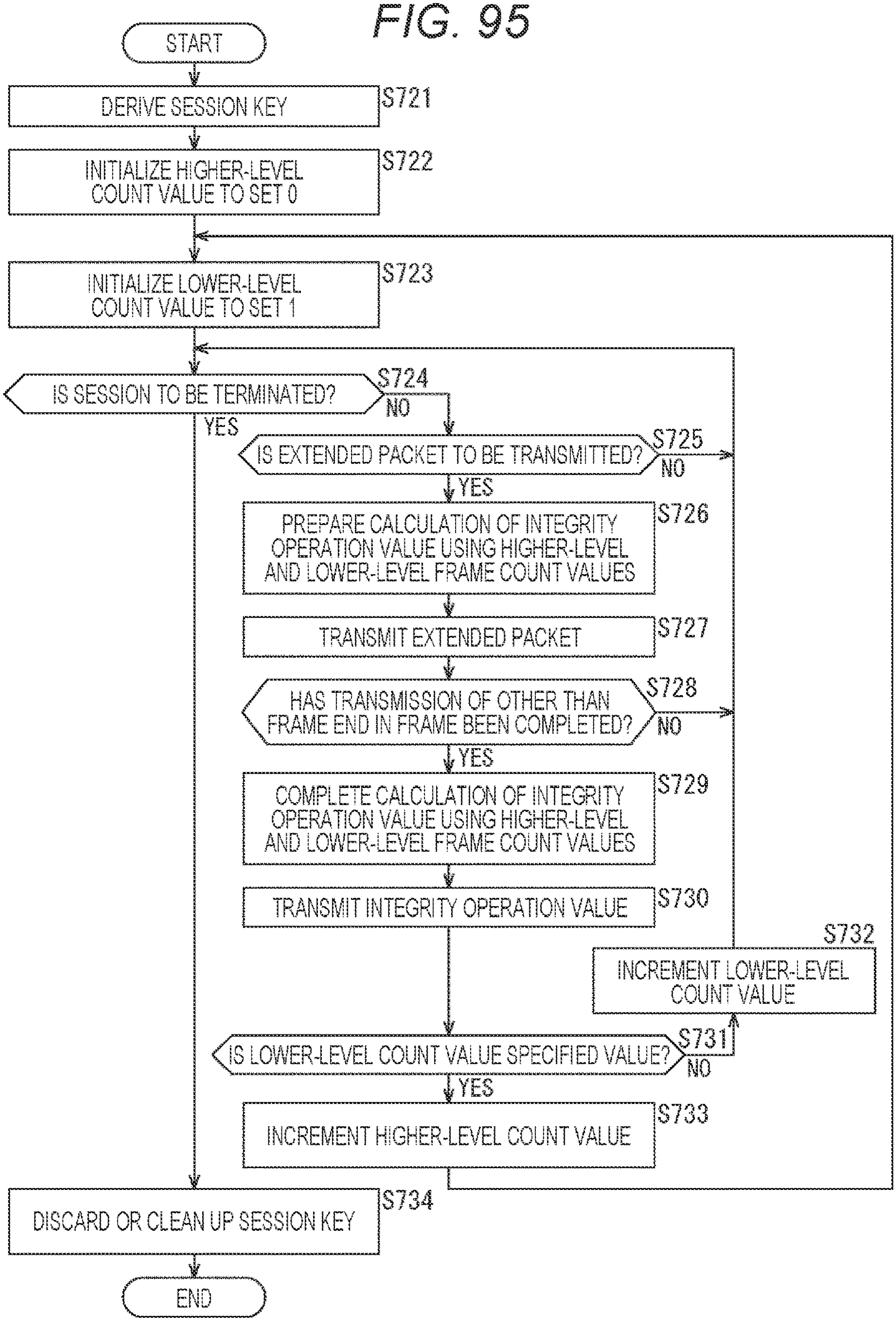
FIG. 95 is a flowchart for describing a fourth processing example of integrity operation value processing.

FIG. 95 is a flowchart for describing a fourth processing example of the integrity operation value processing in which the image sensor 1211 transmits the integrity operation value.

In step S721, the security unit 1310 derives the session key.

In step S722, the message counter 1308 initializes and sets a higher-level count value of the frame count value to 0.

In step S723, the message counter 1308 initializes and sets a lower-level count value of the frame count value to 1.

In step S724, the extension mode-compatible CSI-2 transmission circuit 1304 determines whether or not to terminate the session, and in a case where it is determined not to terminate the session, the processing proceeds to step S725.

In step S725, the extension mode-compatible CSI-2 transmission circuit 1304 determines whether or not to transmit the extended packet.

In step S725, in a case where the extension mode-compatible CSI-2 transmission circuit 1304 determines not to transmit the extended packet, the processing returns to step S724, and similar processing is repeatedly performed thereafter. On the other hand, in step S725, in a case where the extension mode-compatible CSI-2 transmission circuit 1304 determines to transmit the extended packet, the processing proceeds to step S726.

In step S726, the security unit 1310 prepares calculation of the integrity operation value performed using the higher-level count value and the lower-level count value of the frame count value.

In step S727, the extension mode-compatible CSI-2 transmission circuit 1304 transmits the extended packet.

In step S728, the extension mode-compatible CSI-2 transmission circuit 1304 determines whether or not transmission other than the frame end in the frame has been completed. In step S728, in a case where the extension mode-compatible CSI-2 transmission circuit 1304 determines that the transmission other than the frame end in the frame has not been completed, the processing returns to step S724, and similar processing is repeatedly performed thereafter. On the other hand, in step S728, in a case where the extension mode-compatible CSI-2 transmission circuit 1304 determines that the transmission other than the frame end in the frame has been completed, the processing proceeds to step S729.

In step S729, the security unit 1310 completes the calculation of the integrity operation value performed using the higher-level count value and the lower-level count value of the frame count value.

In step S730, the extension mode-compatible CSI-2 transmission circuit 1304 transmits the integrity operation value together with the frame end.

In step S731, the message counter 1308 determines whether or not the lower-level count value of the frame count value has been counted up to the specified value. In step S731, in a case where the message counter 1308 determines that the lower-level count value of the frame count value has not been counted up to the specified value, the processing proceeds to step S732.

In step S732, the message counter 1308 increments the lower-level count value of the frame count value. Thereafter, the processing returns to step S724, and similar processing is repeatedly performed thereafter.

On the other hand, in step S731, in a case where the message counter 1308 determines that the lower-level count value of the frame count value has been counted up to the specified value, the processing proceeds to step S733. In step S733, after the security unit 1310 increments the high-level count value of the frame count value, the processing returns to step S723, and thereafter, similar processing is repeatedly performed.

Then, in step S724, in a case where the extension mode-compatible CSI-2 transmission circuit 1304 determines to terminate the session, the processing proceeds to step S734.

In step S734, the security unit 1310 discards or cleans up the session key, and then the processing is terminated.

In this manner, in the case where the frame number is used as a part of the initialization vector, that is, a part of the nonce value (for example, the lower-level count value), it is possible to make the update of the session key unnecessary and to reduce the update frequency of the session key by also using the rest of the nonce value (for example, the higher-level count value) in combination.

For example, in the case of increment of 1 and 60 fps, the nonce value goes around

- in $(2^{20}-1)\div 60\approx 5$ hours when using the higher-level count value with a 4-bit width together,
- in $(2^{24}-1)\div 60\approx 78$ hours when using the higher-level count value with an 8-bit width together,
- in $(2^{28}-1)\div 60\approx 52$ days when using the higher-level count value with a 12-bit width together
- in $(2^{32}-1)\div 60\approx 828$ days when using the higher-level count value with a 16-bit width together
- in $(2^{36}-1)\div 60\approx 36$ years when using the higher-level count value with a 20-bit width together, or
- in $(2^{40}-1)\div 60\approx 581$ years when using the higher-level count value with a 24-bit width together.

Here, in a case where a power supply of the image sensor 1211 or the application processor 1212 is restarted (turned ON after being turned OFF), key exchange is required before the protected image data is transmitted again, and the session key is updated accordingly. For example, in general in-vehicle applications, a possibility that the power supply is not restarted for 3 days or more is low, and a possibility that the power supply is not restarted for 2 years or more is extremely low. Therefore, a 8-bit to 16-bit width is sufficient for the higher-level count value. Of course, the present embodiment is not limited thereto, and a bit width larger than the above bit width may be used.

For example, in a case of an oil-supply-type vehicle, the power supply is simply turned OFF at the time of oil supply, and even in a case of an oil-supply-type or rechargeable vehicle, when the power supply is turned OFF at the time of vehicle inspection, key replacement is required before the protected image data is transmitted again, so that the session key is updated accordingly. For example, in a case where an image sensor for Internet of Things or Intelligence of Things (IoT) is assumed, it is also assumed that the power supply is not restarted. Therefore, a 20-bit to 24-bit width is sufficient for the higher-level count value. Of course, the present embodiment is not limited thereto, and a bit width larger than the above bit width may be used.

<Encryption and Decryption>

Encryption and decryption will be described with reference to FIGS. 96 to 100.

Figure 96:
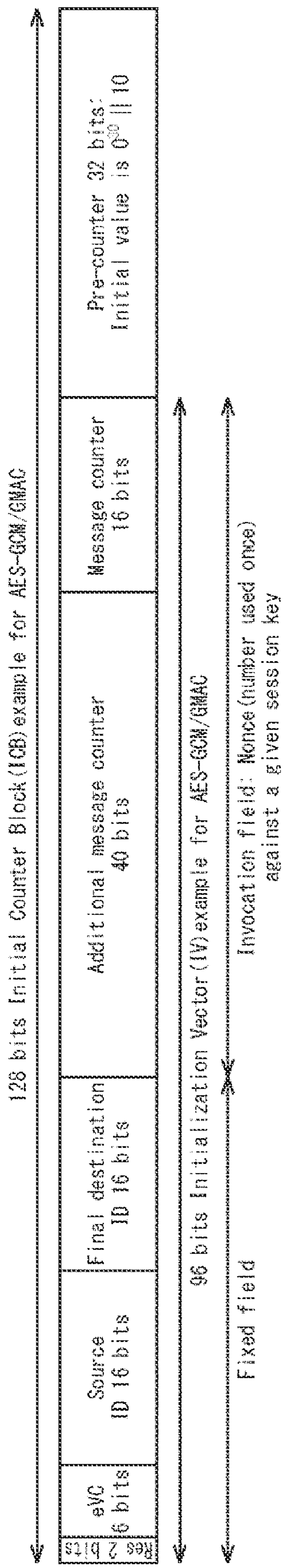
FIG. 96 is a diagram illustrating an example of an initial counter block in which an initialization vector is stored.

FIG. 96 illustrates an example of an initial counter block in which the initialization vector is stored.

As illustrated in FIG. 96, by making the structure of the initialization vector common while making the value different among the virtual channels, it is possible to enable simpler implementation. Furthermore, a common session key or count value is used between the virtual channels of the CSI-2.

A 128-bit initial counter block is used for encryption or message authentication by Advanced Encryption Standard (AES)-Galois/Counter Mode (GCM) or Galois Message Authentication Code (AES-GMAC).

Figure 97:
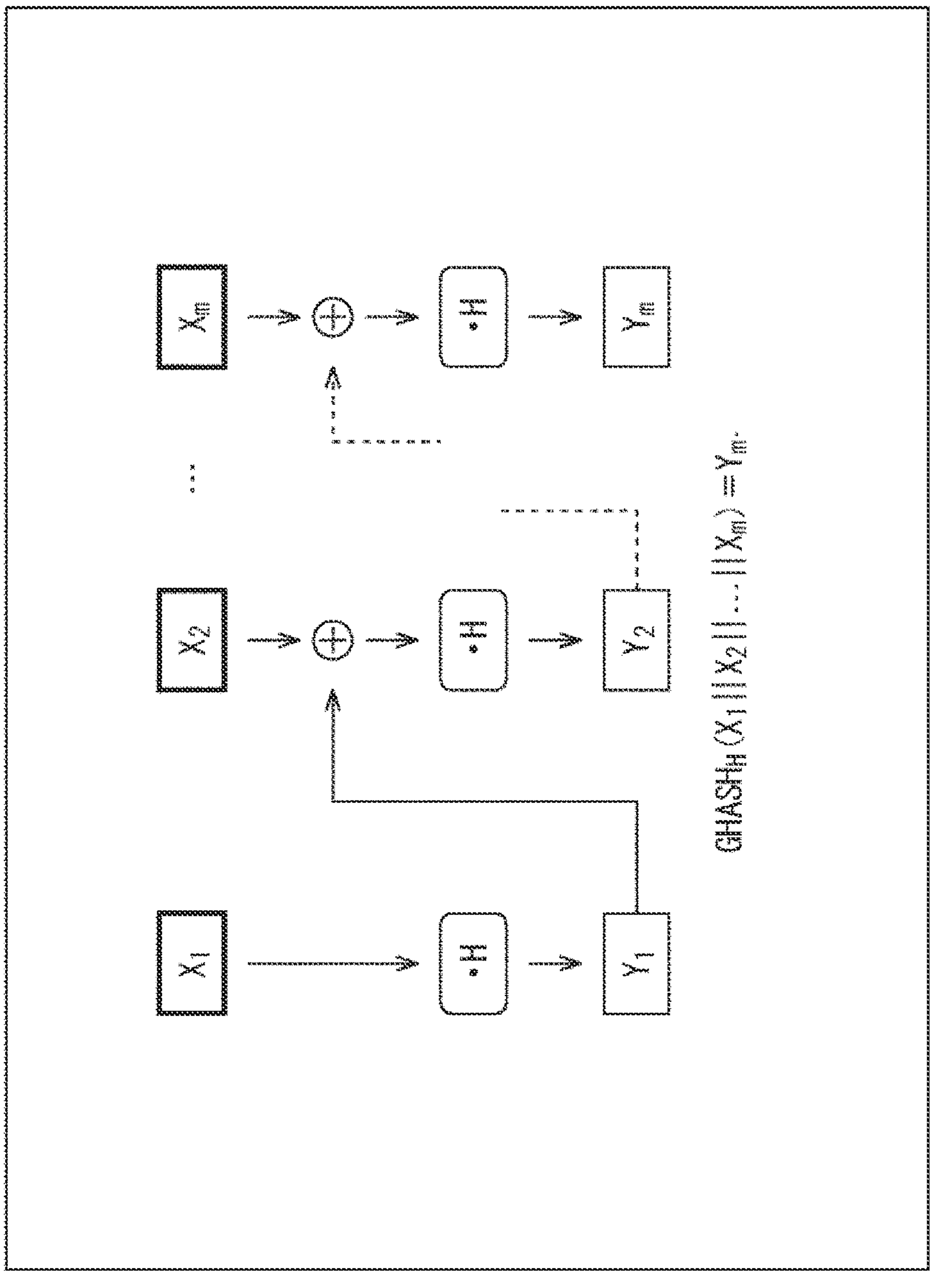
FIG. 97 is a diagram illustrating a GHASH function.
Figure 98:
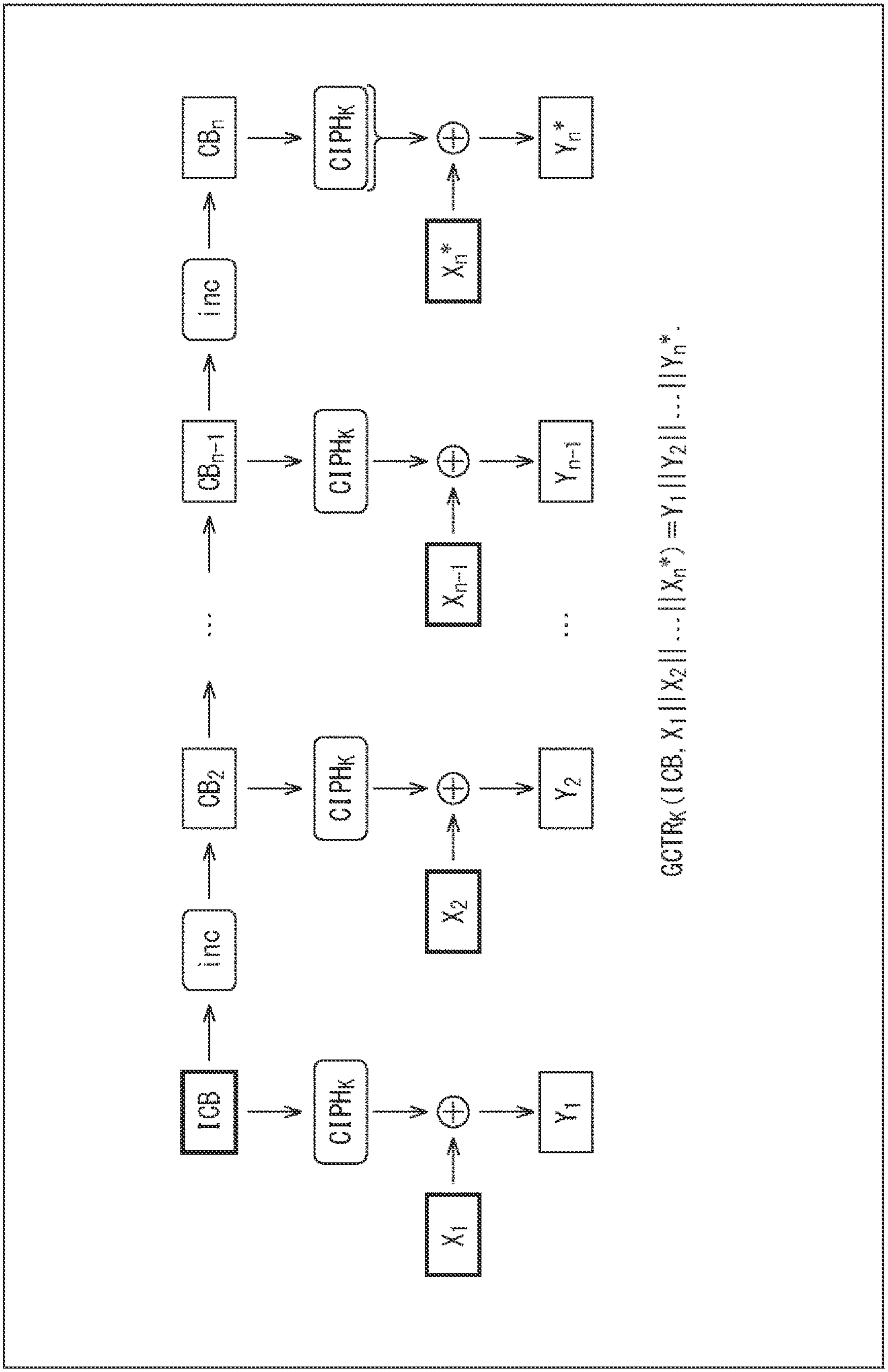
FIG. 98 is a diagram illustrating a GCTR function.

For example, a GHASH function as illustrated in FIG. 97, a GCTR function as illustrated in FIG. 98, or the like can be used to encrypt the initial counter block.

Figure 99:
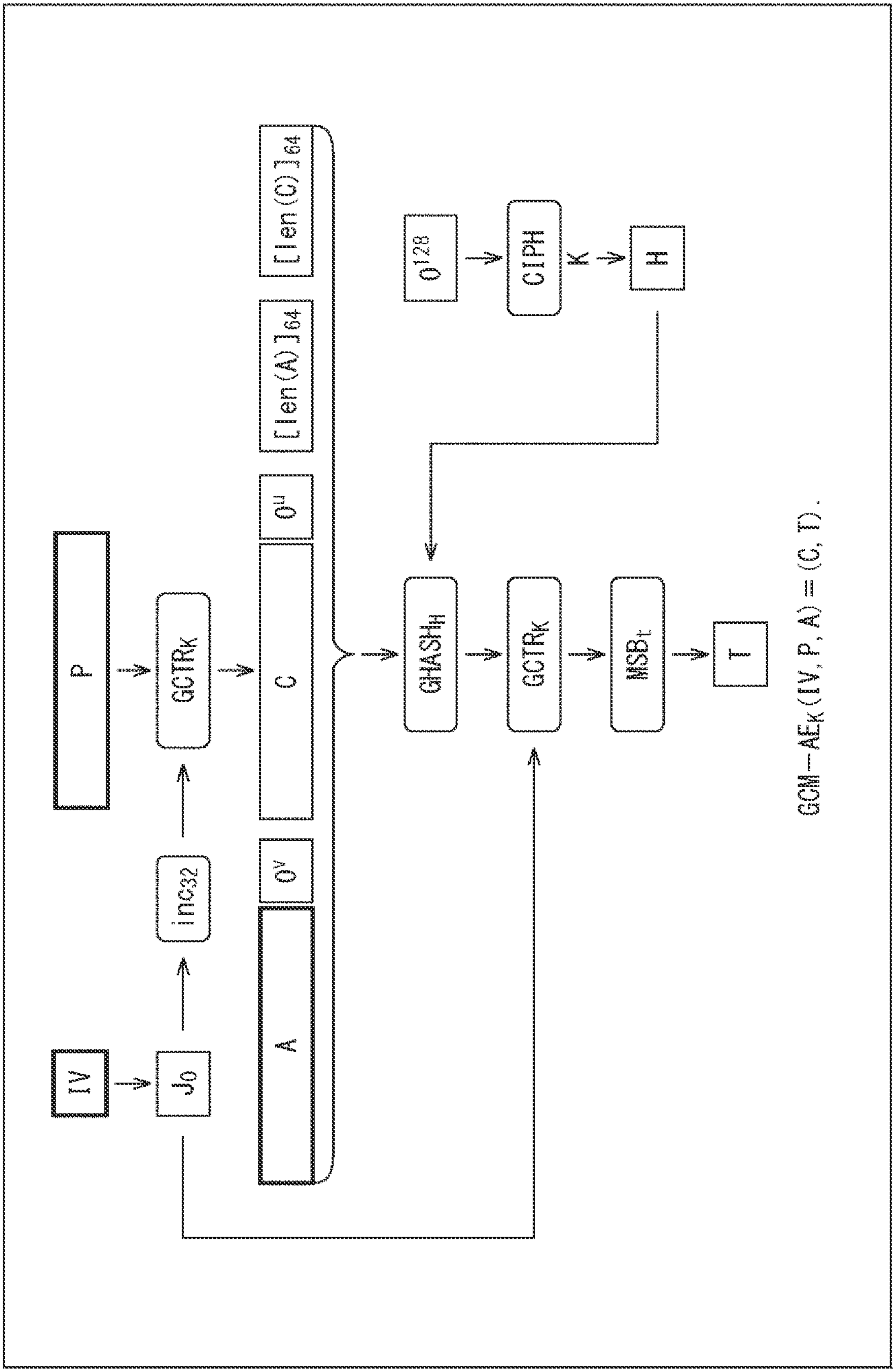
FIG. 99 is a diagram illustrating a GCM-AE function.
Figure 100:
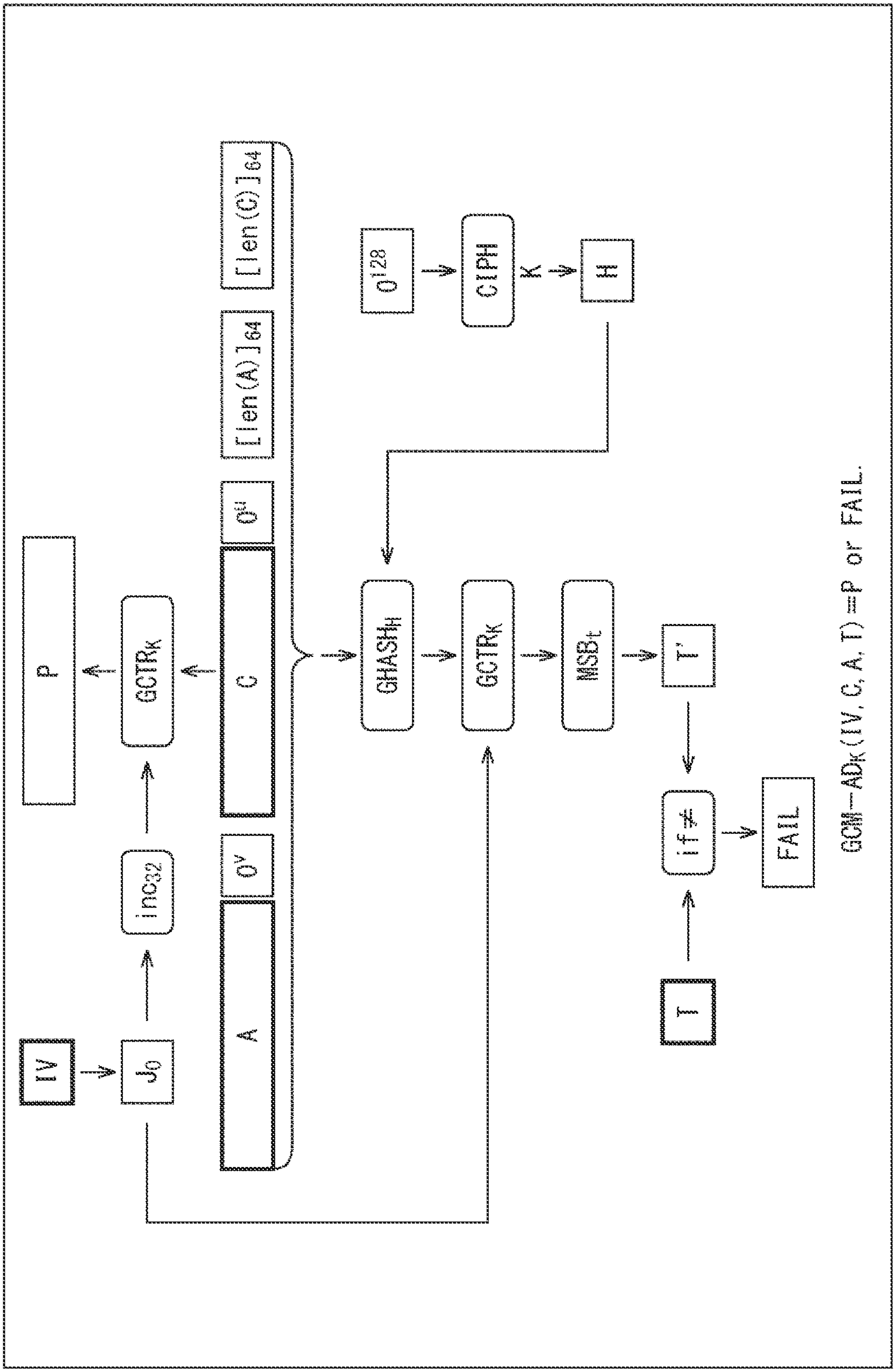
FIG. 100 is a diagram illustrating a GCM-AD function.

The initialization vector is used for encryption using an authenticated encryption (GCM-AE) function having an authenticated encryption function as illustrated in FIG. 99 and decryption using an authenticated decryption (GCM-AD) function having an authenticated decryption function as illustrated in FIG. 100. Note that use of the initialization vector may be limited to either one of the encryption (decryption) or the message authentication.

For example, when an initialization vector IV, a plaintext P, and an additional authentication data A are input to the GCM-AE function, the plaintext P is encrypted, and as a result, an encrypted text C and an authentication tag T are output.

Meanwhile, when the initialization vector IV, the encrypted text C, the additional authentication data A, and the authentication tag T are input to the GCM-AD function, the encrypted text C is decrypted and the plaintext P is output, and in a case where the authentication tag T and the authentication tag T' do not match, a result (FAIL) indicating that the authentication has failed is output.

<First Transmission Method of Integrity Operation Value>

A first transmission method of the integrity operation value MAC will be described with reference to FIGS. 101 to 105.

Figure 101:
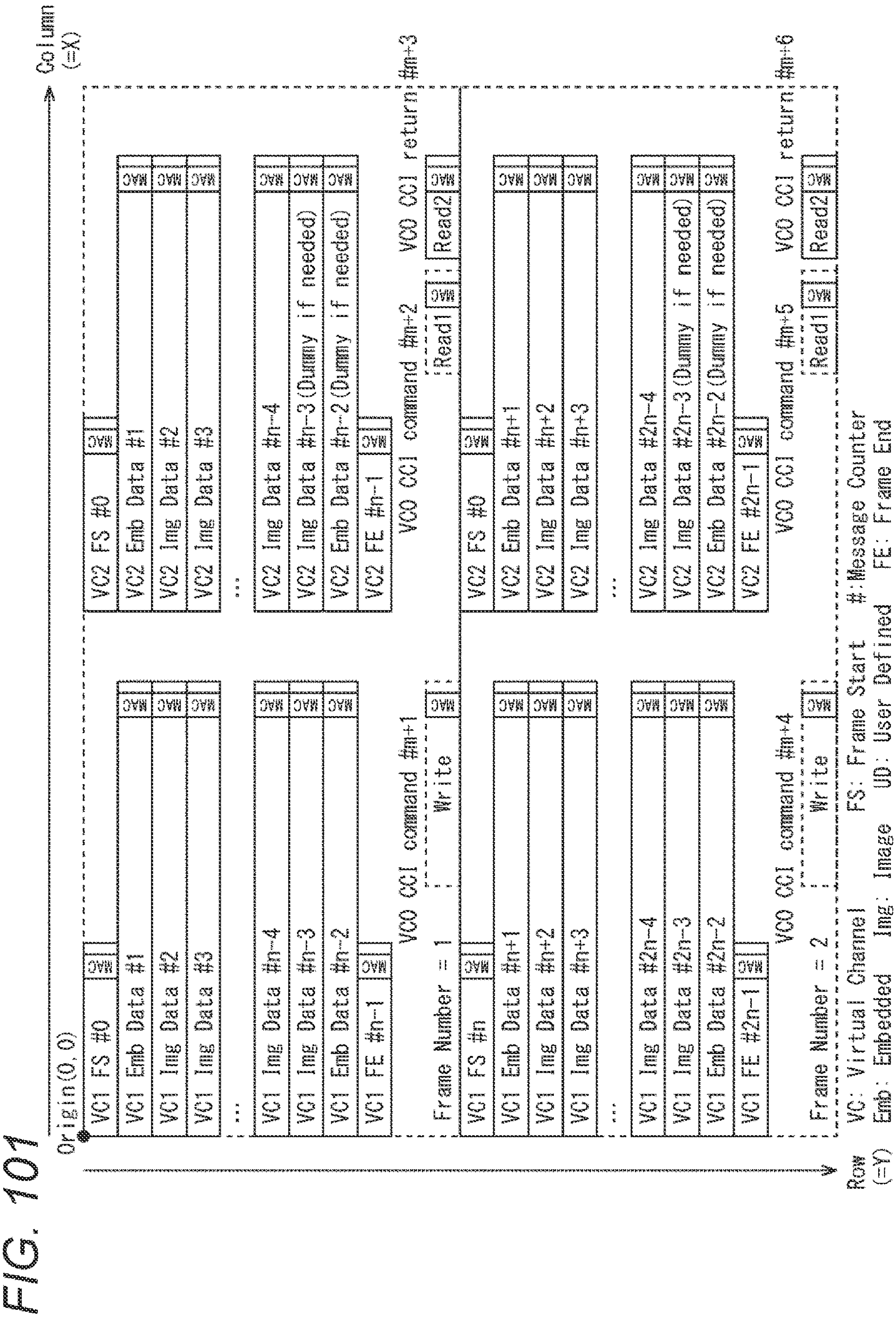
FIG. 101 is a diagram illustrating an example of a data structure of image data in which an integrity operation value MAC is transmitted for each line.

FIG. 101 illustrates a data structure of image data in which the integrity operation value MAC is transmitted for each line. The transmission method for transmitting the integrity operation value MAC for each line in this manner is hereinafter appropriately referred to as a line MAC method.

As illustrated, the integrity operation value MAC is transmitted for each line of the CSI-2, each CCI command, or each CCI return. In a case where the initialization vectors have the same value among them in this manner, more session keys are required.

For example, it is assumed that use of the same initialization vector and the same session key becomes a cause of falsification of the integrity operation value MAC.

Therefore, for the same initialization vector, it is proposed to use a total of four session keys for each VC0 command, VC0 return, VC1, and VC2.

Meanwhile, for different initialization vectors, it is proposed to use no more than three session keys.

In a first case, a first session key for the uplink is used in the VC0 command, and a second session key for the downlink is used in the VC0 return, VC1, and VC2. In a second case, the first session key for CCI is used in VC0, and the second session key for CSI-2 is used in the VC1 and VC2. In a third case, one session key for all is used in the VC0, VC1, and VC2.

Furthermore, a total of two message count values are used. A common message count value in the CSI-2 is used between the VC1 and VC2, and an independent message count value in the CCI is used in the VC0.

Note that an example in which the common message counter is used between the virtual channels of the CSI-2 is illustrated, but the independent message counter may be used between the virtual channels of the CSI-2. In this case, a part of a flowchart may be deleted. Furthermore, in this case, the message counter may be synchronized or asynchronous between the virtual channels of the CSI-2. For example, it may be desirable to make the message counter common from the viewpoint of implementation efficiency, or it may be desirable to make the message counter independent from the viewpoint of safety.

Figure 102:
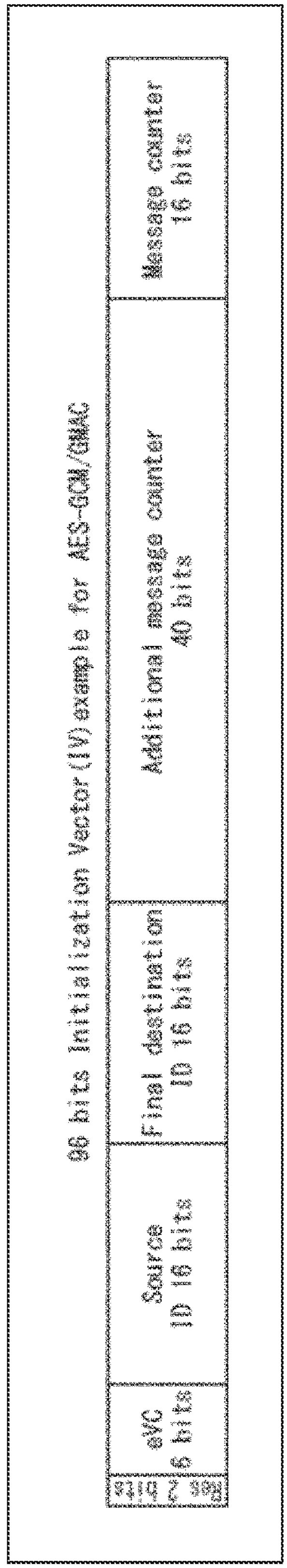
FIG. 102 is a diagram illustrating an example of an initialization vector.
Figure 103:
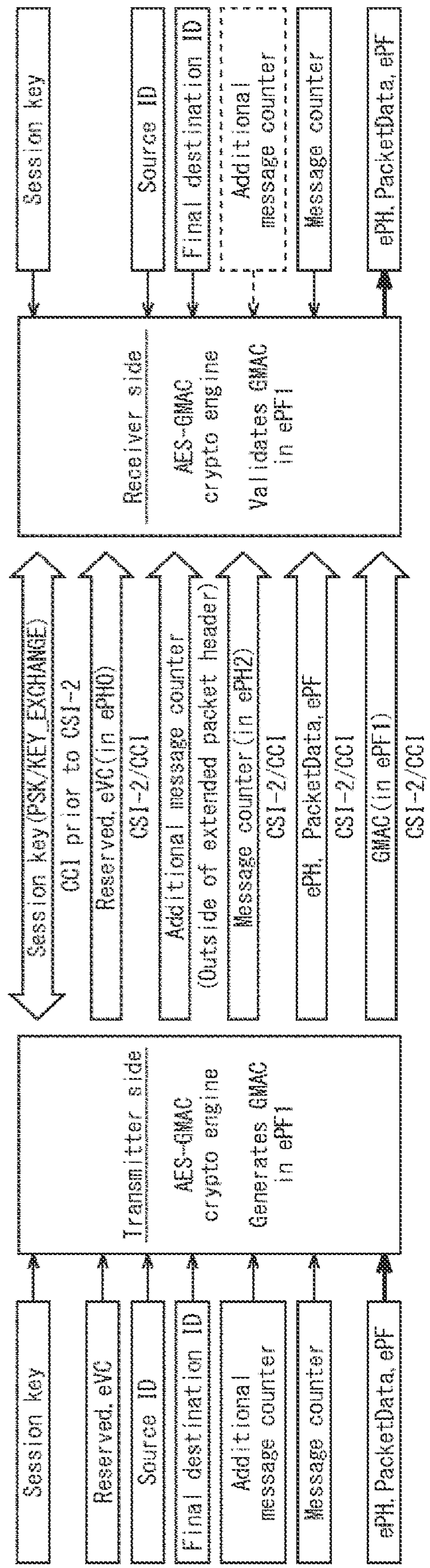
FIG. 103 is a diagram illustrating an example of transmitting an initialization vector from a transmission side to a reception side.

For example, the initialization vector of the structure illustrated in FIG. 102 is common to all the virtual channels (CSI-2 and CCI). Then, a part or whole of the initialization vector is transmitted from the transmission side to the reception side as illustrated in FIG. 103. Note that a specified value (for example, $0^2$ or $1^2$) may be used as Reserved (Res) 2 bits. Furthermore, a value exchanged in advance may be used as the Source ID or a Final Destination ID. Furthermore, the reception side may use a value grasped by the reception side instead of the value transmitted from the transmission side to the reception side as the part or whole of the initialization vector. Furthermore, in a case where a part or whole of the initialization vector is transmitted from the transmission side to the reception side, it is desirable that the part or whole of the initialization vector is transmitted without being encrypted (in plaintext), but the present embodiment is not limited thereto.

Although FIG. 103 illustrates an example in which an additional message count value is stored outside the extended packet header and transmitted, the additional message count value and the message count value may be stored outside the extended packet header and transmitted. In this case, the message count value may also be stored in the extended packet header and transmitted. Note that only a part of the additional message count value may be used. For example, in a case where the additional message count value in the initialization vector is 40 bits, the actual additional message count value may be a 16-bit counter, and the count value may be stored in a part (for example, 16 bits on the LSB side) of the additional message count value in the initialization vector, and a specified value (for example, $0^{24}$ or $1^{24}$) may be stored in the rest (for example, 24 bits on the MSB side) of the additional message count value in the initialization vector. Furthermore, a specified value (for example, $0^{40}$ or $1^{40}$) may be stored in all the additional message count values in the initialization vector.

Furthermore, a part or whole of the initialization vector transmitted and set from the image sensor 1211 to the application processor 1212 may be configured not to be transmitted from the image sensor 1211 to the application processor 1212, and may be set on the basis of pre-agreement, register setting, or the like.

FIG. 104 illustrates an example of an extension format of the CSI-2 or CCI.

For example, a head bit (Reserved and eVC) or a quasi-head bit (eVC) of the required extended packet header ePH0 is used as the initialization vector. Then, immediately after receiving the bit, the application processor 1212 can start the calculation of the GCTR function illustrated in FIG. 98 described above. That is, the transmission side and the reception side may be configured to be able to determine values of initialization vector components other than the eVC before transmitting or receiving an eVC value.

Transmission processing by the line MAC method in which the image sensor 1211 transmits the integrity operation value MAC for each line will be described with reference to the flowchart illustrated in FIG. 105.

In step S741, the security unit 1310 derives a common session key.

In step S742, the message counter 1308 initializes and sets a higher-level count value of the message count value to 0.

In step S743, the message counter 1308 initializes and sets a lower-level count value of the message count value to 0.

In step S744, the extension mode-compatible CSI-2 transmission circuit 1304 determines whether or not to terminate the session, and in a case where it is determined not to terminate the session, the processing proceeds to step S745.

In step S745, the extension mode-compatible CSI-2 transmission circuit 1304 determines whether or not to transmit the extended packet of the first virtual channel.

In step S745, in a case where the extension mode-compatible CSI-2 transmission circuit 1304 determines not to transmit the extended packet of the first virtual channel, the processing returns to step S744, and similar processing is repeatedly performed thereafter. On the other hand, in step S745, in a case where the extension mode-compatible CSI-2 transmission circuit 1304 determines to transmit the extended packet of the first virtual channel, the processing proceeds to step S746.

In step S746, the security unit 1310 calculates the integrity operation value of the first virtual channel using the common session key derived in step S741.

In step S747, the extension mode-compatible CSI-2 transmission circuit 1304 arranges the integrity operation value calculated in step S746 in the extended packet of the first virtual channel, and transmits the extended packet of the first virtual channel.

In step S748, the extension mode-compatible CSI-2 transmission circuit 1304 determines whether or not to transmit the extended packet of the second virtual channel, and waits for the processing until it is determined to transmit the extended packet of the second virtual channel. Then, in step S748, in a case where the extension mode-compatible CSI-2 transmission circuit 1304 determines to transmit the extended packet of the second virtual channel, the processing proceeds to step S749.

In step S749, the security unit 1310 calculates the integrity operation value of the second virtual channel using the common session key derived in step S741.

In step S750, the extension mode-compatible CSI-2 transmission circuit 1304 arranges the integrity operation value calculated in step S749 in the extended packet of the second virtual channel, and transmits the extended packet of the second virtual channel.

In step S751, the message counter 1308 determines whether or not the lower-level count value of the message count value has been counted up to the maximum value.

In step S751, in a case where the message counter 1308 determines that the lower-level count value of the message count value has not been counted up to the maximum value, the processing proceeds to step S752. In step S752, after the message counter 1308 increments the lower-level count value of the message count value, the processing returns to step S744, and similar processing is repeatedly performed thereafter.

On the other hand, in step S751, in a case where the message counter 1308 determines that the lower-level count value of the message count value has been counted up to the maximum value, the processing proceeds to step S753. In step S753, after the message counter 1308 increments the higher-level count value of the message count value, the processing returns to step S743, and similar processing is repeatedly performed thereafter.

Then, in step S744, in a case where the extension mode-compatible CSI-2 transmission circuit 1304 determines to terminate the session, the processing proceeds to step S754.

In step S754, the security unit 1310 discards or cleans up the common session key, and then the processing is terminated.

As described above, the initialization vector configuration includes an extended virtual channel eVC or the virtual channel VC, so that the session key and the message counter can be made common among a plurality of types of CSI-2 virtual channels. Furthermore, the session key can be made common between the CSI-2 and the CCI. Note that, in a case where the substantial number of lines is different between the CSI-2 virtual channels, for example, the message counter can be made common by unifying the number of lines using dummy data.

Figure 105:
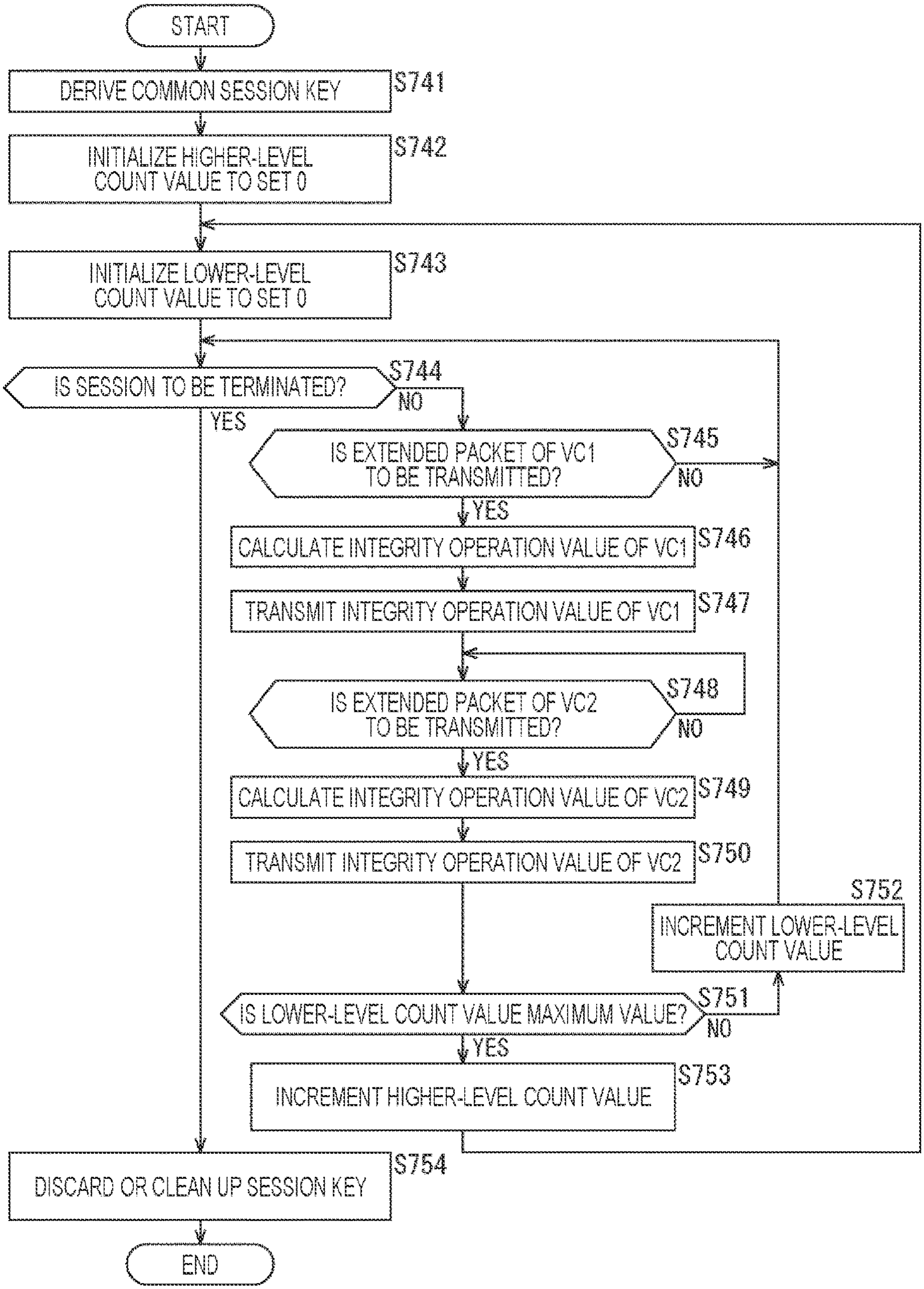
FIG. 105 is a flowchart illustrating transmission processing by a line MAC method.

The processing described with reference to FIG. 105 is an example in which the message count value is set as the lower-level count value and the additional message count value is set as the higher-level count value, and is an example in a case where there are two types of CSI-2 virtual channels.

Meanwhile, the initialization vector configuration may include an extended data type eDT or a data type DT. In this case, similarly, the session key and the message counter can be made common among a plurality of data types.

Note that, since Reserved, the extended virtual channel eVC, and the extended data type eDT are stored as the head bit of the CSI-2/CCI extension format example, the processor can immediately start calculation of a part ($CIPH_K$) of the GCTR operation when some or all of them are received. Furthermore, in a case where the frame configuration is agreed in advance between the image sensor 1211 and the application processor 1212, the application processor 1212 can start the calculation of a part ($CIPH_K$) of the GCTR calculation without receiving them. That is, these initialization vector configurations are advantageous in terms of operation time.

Note that by transmitting the additional message count value from the image sensor 1211 to the application processor 1212, the application processor 1212 can use this value as the initialization vector. Therefore, the application processor 1212 may be configured not to provide an additional message counter from the viewpoint of implementation efficiency, or may be configured to provide the additional message counter from the viewpoint of safety. Furthermore, in a case where the application processor 1212 is configured to provide the additional message counter, the image sensor 1211 may be configured not to transmit the additional message count value. That is, in a case where the initialization vector includes the extended virtual channel eVC, transmission of the additional message count value is not essential.

<Second Arrangement Example of Integrity Operation Value>

A second arrangement example of the integrity operation value MAC will be described with reference to FIGS. 106 to 109.

Figure 106:
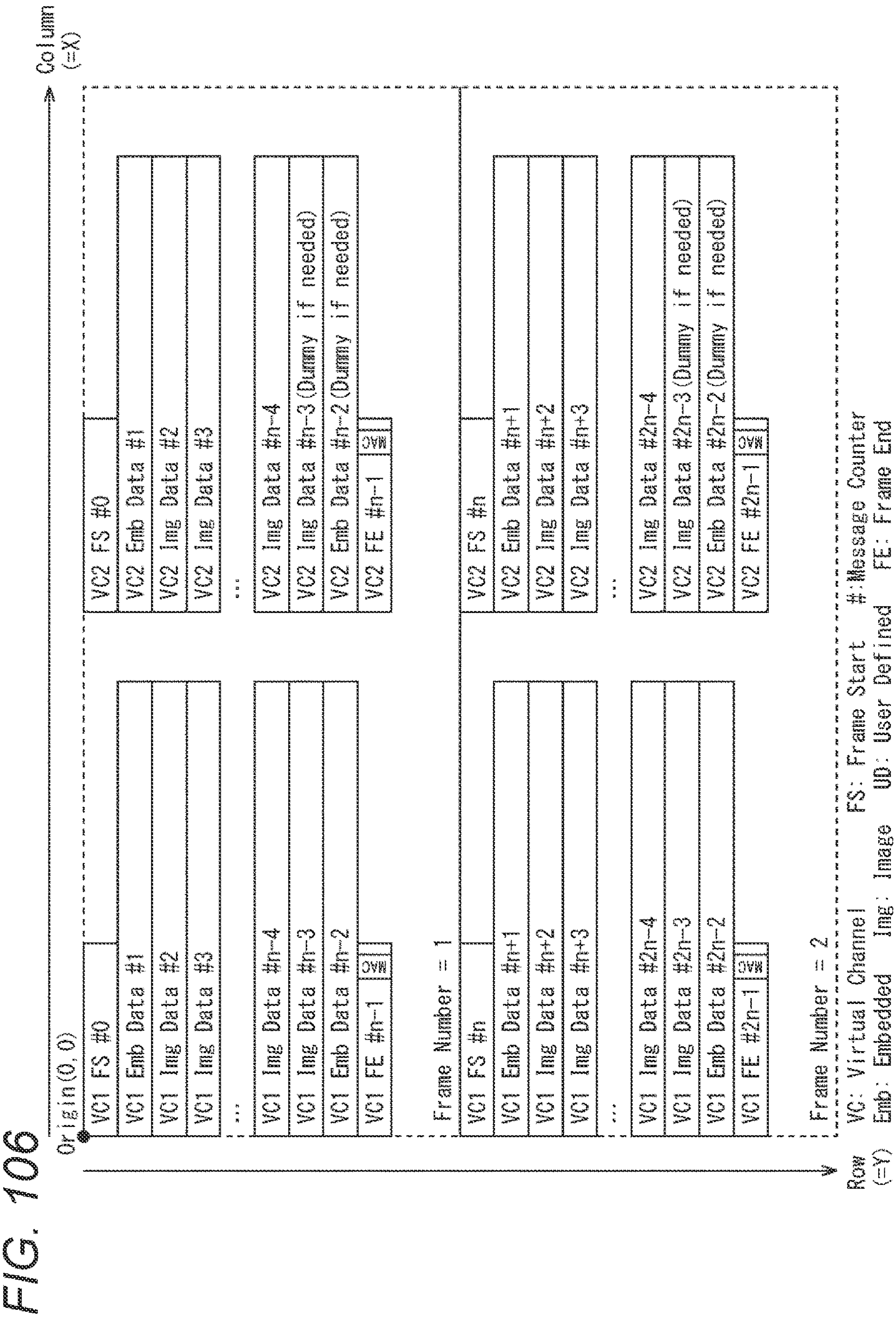
FIG. 106 is a diagram illustrating an example of a data structure of image data in which an integrity operation value MAC is arranged for each frame.

FIG. 106 illustrates a data structure of image data in which the integrity operation value MAC is arranged for each frame. The transmission method for transmitting the integrity operation value MAC for each frame in this manner is hereinafter appropriately referred to as a frame MAC method.

As illustrated, only the integrity operation value MAC arranged in the extended packet footer remaining ePF1 of the frame end is valid, and the other integrity operation values MAC are invalid. Furthermore, the integrity operation value MAC is derived from the extended packet header ePH, the packet data, and the extended packet footer ePF of each line except the last extended packet footer ePF of the frame.

Figure 107:
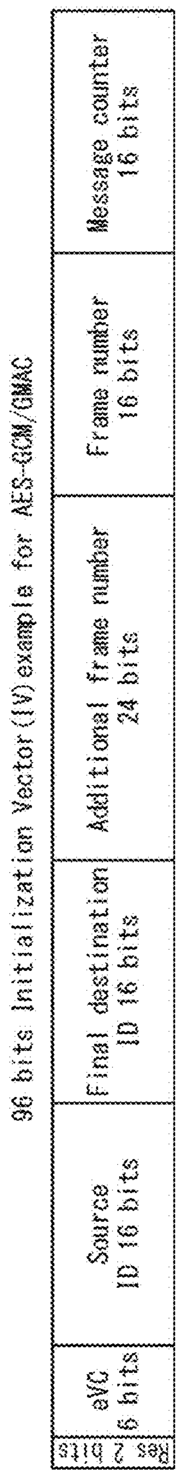
FIG. 107 is a diagram illustrating an example of an initialization vector.

For example, the initialization vector of the structure illustrated in FIG. 107 is common to the line MAC and the frame MAC (only CSI-2). Then, as illustrated in FIG. 108, the initialization vector is transmitted from the transmission side to the reception side.

Figure 108:
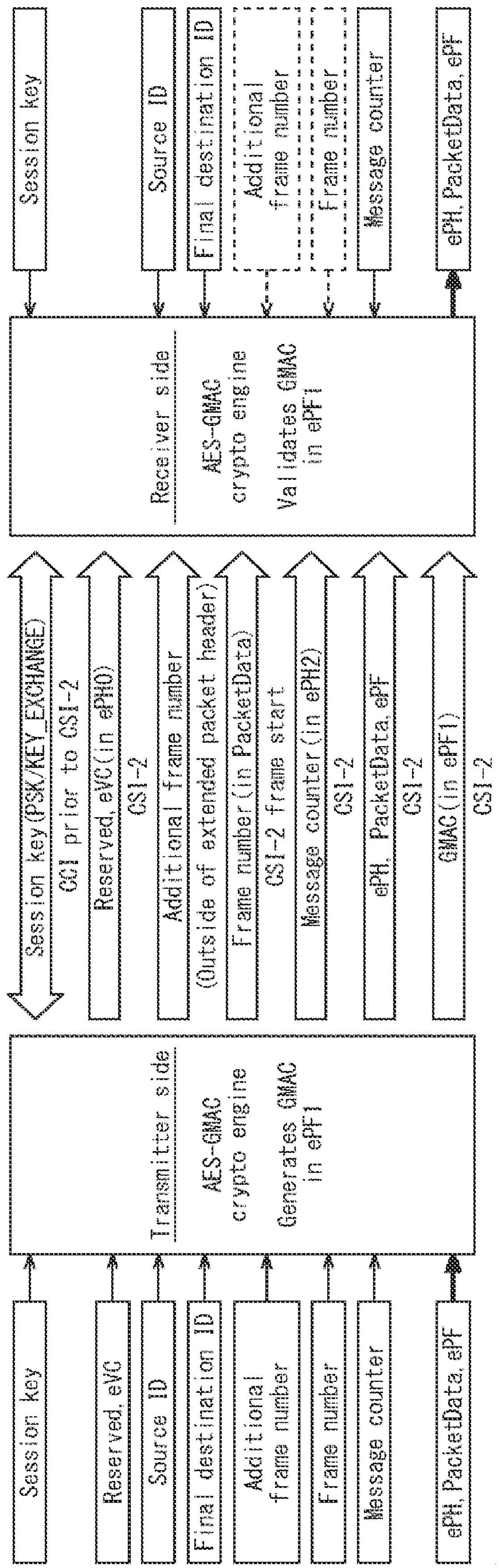
FIG. 108 is a diagram illustrating an example of transmitting an initialization vector from the transmission side to the reception side.

FIG. 108 illustrates an example in which an additional frame number is stored outside the extended packet header and transmitted. In addition, the additional frame number and the frame number may be stored outside the extended packet header and transmitted. In that case, the frame number may also be stored in the frame start and transmitted. Note that only a part of the additional frame number may be used. For example, in a case where the additional frame number in the initialization vector is 24 bits, the actual additional frame number may be a 16-bit counter, and the count value may be stored in a part (for example, 16 bits on the LSB side) of the additional frame number in the initialization vector, and a specified value (for example, $0^8$ or $1^8$) may be stored in the rest (for example, 8 bits on the MSB side) of the additional frame number in the initialization vector. Furthermore, a specified value (for example, $0^{24}$ or $1^{24}$) may be stored in all the additional frame numbers in the initialization vector.

Furthermore, a part or whole of the initialization vector transmitted and set from the image sensor 1211 to the application processor 1212 may be configured not to be transmitted from the image sensor 1211 to the application processor 1212, and may be set on the basis of pre-agreement, register setting, or the like.

Transmission processing by the frame MAC method in which the image sensor 1211 transmits the integrity operation value MAC for each frame will be described with reference to the flowchart illustrated in FIG. 109.

In step S761, the security unit 1310 derives the session key.

In step S762, the message counter 1308 initializes and sets a high-level count value for which the additional frame number is used to 0.

In step S763, the message counter 1308 initializes and sets a lower-level count value for which the frame number is used to 1.

In step S764, the extension mode-compatible CSI-2 transmission circuit 1304 determines whether or not to terminate the session, and in a case where it is determined not to terminate the session, the processing proceeds to step S765.

In step S765, the extension mode-compatible CSI-2 transmission circuit 1304 determines whether or not to transmit the extended packet.

In step S765, in a case where the extension mode-compatible CSI-2 transmission circuit 1304 determines not to transmit the extended packet, the processing returns to step S764, and similar processing is repeatedly performed thereafter. On the other hand, in step S765, in a case where the extension mode-compatible CSI-2 transmission circuit 1304 determines to transmit the extended packet, the processing proceeds to step S766.

In step S766, the extension mode-compatible CSI-2 transmission circuit 1304 transmits the extended packet.

In step S767, the message counter 1308 determines whether or not the message count value has been counted up to the maximum value.

In step S767, in a case where the message counter 1308 determines that the message count value has been counted up to the maximum value, the processing proceeds to step S768. In step S768, the message counter 1308 initializes and sets the message count value to 0.

On the other hand, in step S767, in a case where the message counter 1308 determines that the message count value has not been counted up to the maximum value, the processing proceeds to step S769. In step S769, the message counter 1308 increments the message count value.

After the processing in steps S768 and S769, the processing proceeds to step S770, and the extension mode-compatible CSI-2 transmission circuit 1304 determines whether or not transmission of all the extended packets in the frame has been completed.

In step S770, in a case where the extension mode-compatible CSI-2 transmission circuit 1304 determines that transmission of all the extended packets in the frame has not been completed, the processing returns to step S764, and similar processing is repeatedly performed thereafter.

On the other hand, in step S770, in a case where the extension mode-compatible CSI-2 transmission circuit 1304 determines that transmission of all the extended packets in the frame has been completed, the processing proceeds to step S771.

In step S771, the message counter 1308 determines whether or not the lower-level count value has been counted up to a specified value.

In step S771, in a case where the message counter 1308 determines that the lower-level count value has not been counted up to the specified value, the processing proceeds to step S772. In step S772, after the message counter 1308 increments the lower-level count value, the processing returns to step S764, and similar processing is repeatedly performed thereafter.

On the other hand, in step S771, in a case where the message counter 1308 determines that the lower-level count value has been counted up to the specified value, the processing proceeds to step S773. In step S773, after the message counter 1308 increments the higher-level count value, the processing returns to step S763, and similar processing is repeatedly performed thereafter.

Then, in step S764, in a case where the extension mode-compatible CSI-2 transmission circuit 1304 determines to terminate the session, the processing proceeds to step S774.

In step S774, the security unit 1310 discards or cleans up the common session key, and then the processing is terminated.

Figure 109:
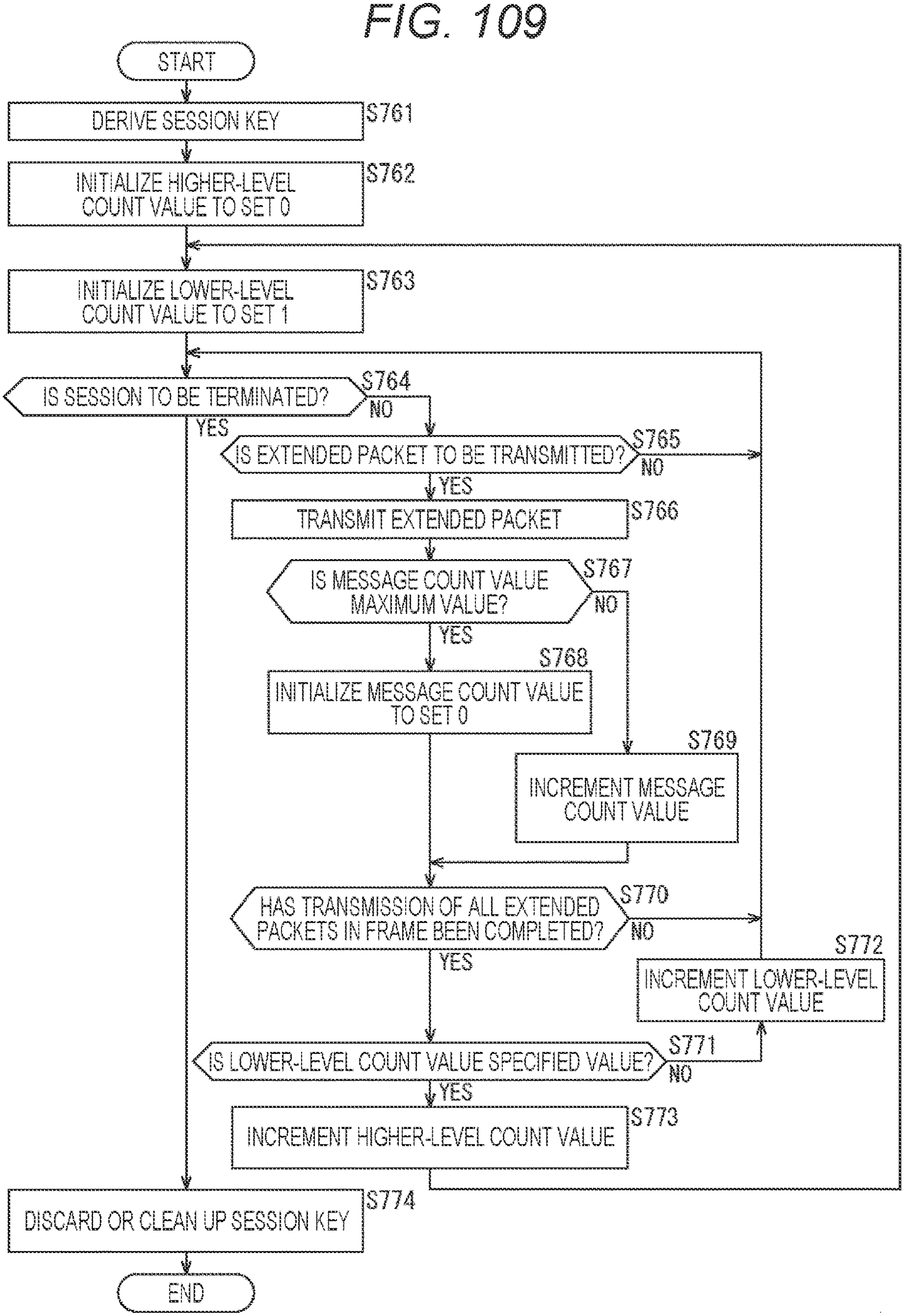
FIG. 109 is a flowchart illustrating transmission processing by a frame MAC method.

As described above, the processing described with reference to FIG. 109 is an example in which the frame number is set as the lower-level count value and the additional frame number is set as the higher-level count value. Note that the calculation and transmission of the integrity operation value, the virtual channel, the session key update, and the like are omitted, but may be combined with some or all of the above-described flowcharts. The same similarly applies to other flowcharts.

Note that, since there is a possibility that increments of 1 or 2 are mixed in the frame number, it is desirable to increment the higher-level count value in a case where the lower-level count value is a specified value (for example, the maximum or maximum value−1). However, if the frame number is incremented by 1 only, the higher-level count value may be incremented when the lower-level count value is the maximum value.

Note that by transmitting the frame number from the image sensor 1211 to the application processor 1212, the application processor 1212 can use this value as the initialization vector. Therefore, the application processor 1212 may be configured not to provide a frame counter from the viewpoint of implementation efficiency, or may be configured to provide the frame counter from the viewpoint of safety. Furthermore, in a case where the application processor 1212 is configured to provide the frame counter, the image sensor 1211 may be configured not to transmit the frame number. That is, in a case where the initialization vector includes the extended virtual channel eVC, transmission of the frame number is not essential.

Furthermore, by transmitting the additional frame number from the image sensor 1211 to the application processor 1212, the application processor 1212 can use this value as the initialization vector. Therefore, the application processor 1212 may be configured not to provide an additional frame counter from the viewpoint of implementation efficiency, or may be configured to provide the additional frame counter from the viewpoint of safety. Furthermore, in a case where the application processor 1212 is configured to provide the additional frame counter, the image sensor 1211 may be configured not to transmit the additional frame number.

In the case of the frame MAC method, a specified value (for example, $0^{16}$ or $1^{16}$) may be stored as the message count value in the initialization vector, or the message count value of a specific extended packet (for example, the frame start or the frame end) may be stored. Meanwhile, in the case of the line MAC method, the message count value is stored as the message count value in the initialization vector.

<Selection of Transmission Method of Integrity Operation Value MAC>

Selection of the transmission method of the integrity operation value MAC will be described with reference to FIGS. 110 and 111.

Figure 110:
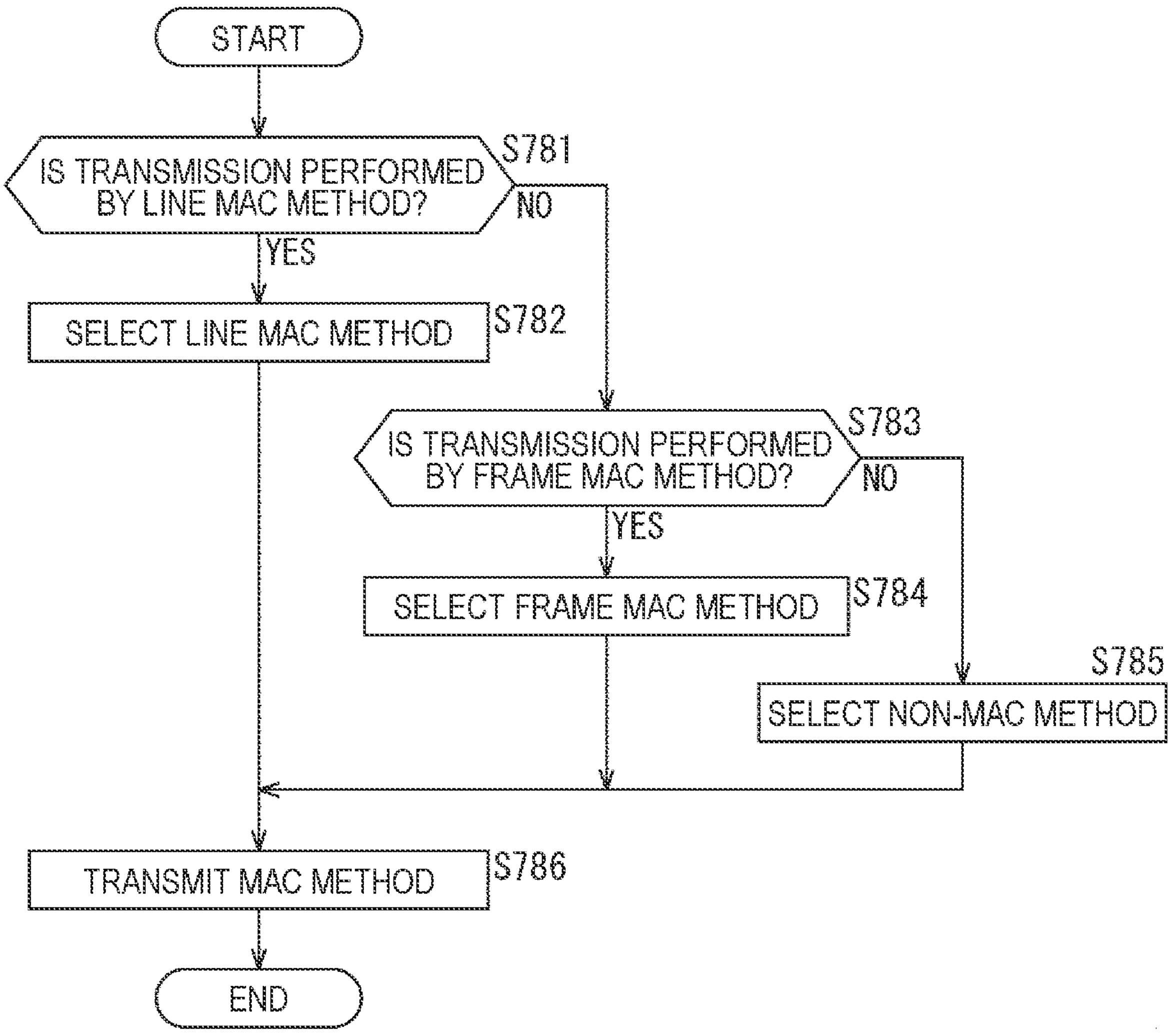
FIG. 110 is a flowchart for describing selection processing.

FIG. 110 is a flowchart for describing selection processing in which the image sensor 1211 selects a transmission method of the integrity operation value MAC.

In step S781, the extension mode-compatible CSI-2 transmission circuit 1304 determines whether or not to transmit the integrity operation value MAC by the line MAC method.

In step S781, when the extension mode-compatible CSI-2 transmission circuit 1304 determines to transmit the integrity operation value MAC by the line MAC method, the processing proceeds to step S782. In step S782, the extension mode-compatible CSI-2 transmission circuit 1304 selects the line MAC method.

On the other hand, in step S781, in a case where the extension mode-compatible CSI-2 transmission circuit 1304 determines not to transmit the integrity operation value MAC by the line MAC method, the processing proceeds to step S783.

In step S783, the extension mode-compatible CSI-2 transmission circuit 1304 determines whether or not to transmit the integrity operation value MAC by the frame MAC method.

In step S783, when the extension mode-compatible CSI-2 transmission circuit 1304 determines to transmit the integrity operation value MAC by the frame MAC method, the processing proceeds to step S784. In step S784, the extension mode-compatible CSI-2 transmission circuit 1304 selects the frame MAC method.

On the other hand, in step S783, in a case where the extension mode-compatible CSI-2 transmission circuit 1304 determines not to transmit the integrity operation value MAC by the frame MAC method, the processing proceeds to step S785. In step S785, the extension mode-compatible CSI-2 transmission circuit 1304 selects a non-MAC method in which the integrity operation value MAC is not transmitted.

After the processing of step S782, step S784, or step S785, the processing proceeds to step S786. In step S786, the extension mode-compatible CSI-2 transmission circuit 1304 transmits security MAC information (see FIG. 111) indicating one of the line MAC method, the frame MAC method, or the non-MAC method, and then the processing is terminated. Note that the security MAC information of 2-bit allocation is illustrated in FIG. 111, but different bit depth may be allocated (for example, 1 bit or 8 bits). Furthermore, not transmitting the MAC value (for example, No MAC) may be allocated to a reserved area data (Reserved for future use).

As described above, the image sensor 1211 can freely select whether or not to transmit the MAC value by the line MAC method (select the line MAC method), to transmit the MAC value by the frame MAC method (select the frame MAC method), or not to transmit the MAC value (select the non-MAC method). Alternatively, the image sensor 1211 may select one of the above methods with mutual pre-agreement with the application processor 1212. For example, the image sensor 1211 may first select the line MAC method and switch the method to another method (for example, the frame MAC method) in a case where a predetermined condition is satisfied. For example, the frame MAC method may be selected first, and switched to another method (for example, the line MAC method) in a case where a predetermined condition is satisfied. For example, the non-MAC method may be selected first, and switched to another method (for example, the frame MAC method) in a case where a predetermined condition is satisfied.

Then, whether or not to select the line MAC method, the frame MAC method, or the non-MAC method is stored in, for example, Security Descriptor in the extended packet header (for example, ePH2), in the embedded data, in the user-defined data, in the read response, or the like, and transmitted from the image sensor 1211. The application processor 1212 may cope with switching of the transmission method of the integrity operation value MAC in response to the reception.

Note that, to avoid confusion of the initialization vector, it is desirable to transmit the transmission method to be switched from the image sensor in a period from the start of the frame end transmission to before the completion of the frame start transmission when switching the transmission method of the integrity operation value MAC. However, the present embodiment is not limited thereto.

Note that the security MAC information that identifies whether the transmission method is the line MAC method or the frame MAC method may be included in the initialization vector. In that case, the initialization vectors do not reliably overlap between the line MAC method and the frame MAC method, switching of the transmission method of the integrity operation value MAC is facilitated. Without the security MAC information, for example, it may be necessary to specify a value to be stored in the message counter 1308 in order to avoid overlapping of the initialization vectors depending on the switching timing of the transmission method of the integrity operation value MAC.

<Message Count Value and Frame Count Value>

The message count value and the frame count value will be described with reference to FIGS. 112A, 112B, 113A, 113B, 113C, 113D, 113E, 114, and 115.

FIGS. 112A and 112B illustrate examples of cycles in which the message count value and the frame count value roll over.

As illustrated in FIG. 112A, in the case of 60 fps and 2160 rows of a pixel, the message count value rolls over in about 9 hours by setting the higher-level count value to 16 bits and the lower-level count value to 16 bits. Similarly, the message count value rolls over in about 6 days with the higher-level count value of 20 bits and the lower-level count value of 16 bits, in about 96 days with the higher-level count value of 24 bits and the lower-level count value of 16 bits, in about 4 years with the higher-level count value of 28 bits and the lower-level count value of 16 bits, and in about 69 years with the higher-level count value of 32 bits and the lower-level count value of 16 bits.

As illustrated in FIG. 112B, in the case of 60 fps and increment by 1 at a time, the frame count value rolls over in about 5 hours by setting the higher-level count value to 4 bits and the lower-level count value to 16 bits. Similarly, the message count value rolls over in about 78 hours with the higher-level count value of 8 bits and the lower-level count value of 16 bits, in about 52 days with the high-level count value of 12 bits and the low-level count value of 16 bits, in about 828 days with the high-level count value of 16 bits and the low-level count value of 16 bits, in about 36 years with the high-level count value of 20 bits and the low-level count value of 16 bits, and in about 581 years with the high-level count value of 24 bits and the low-level count value of 16 bits.

Figures 113A, 113B, 113C, 113D, 113E:
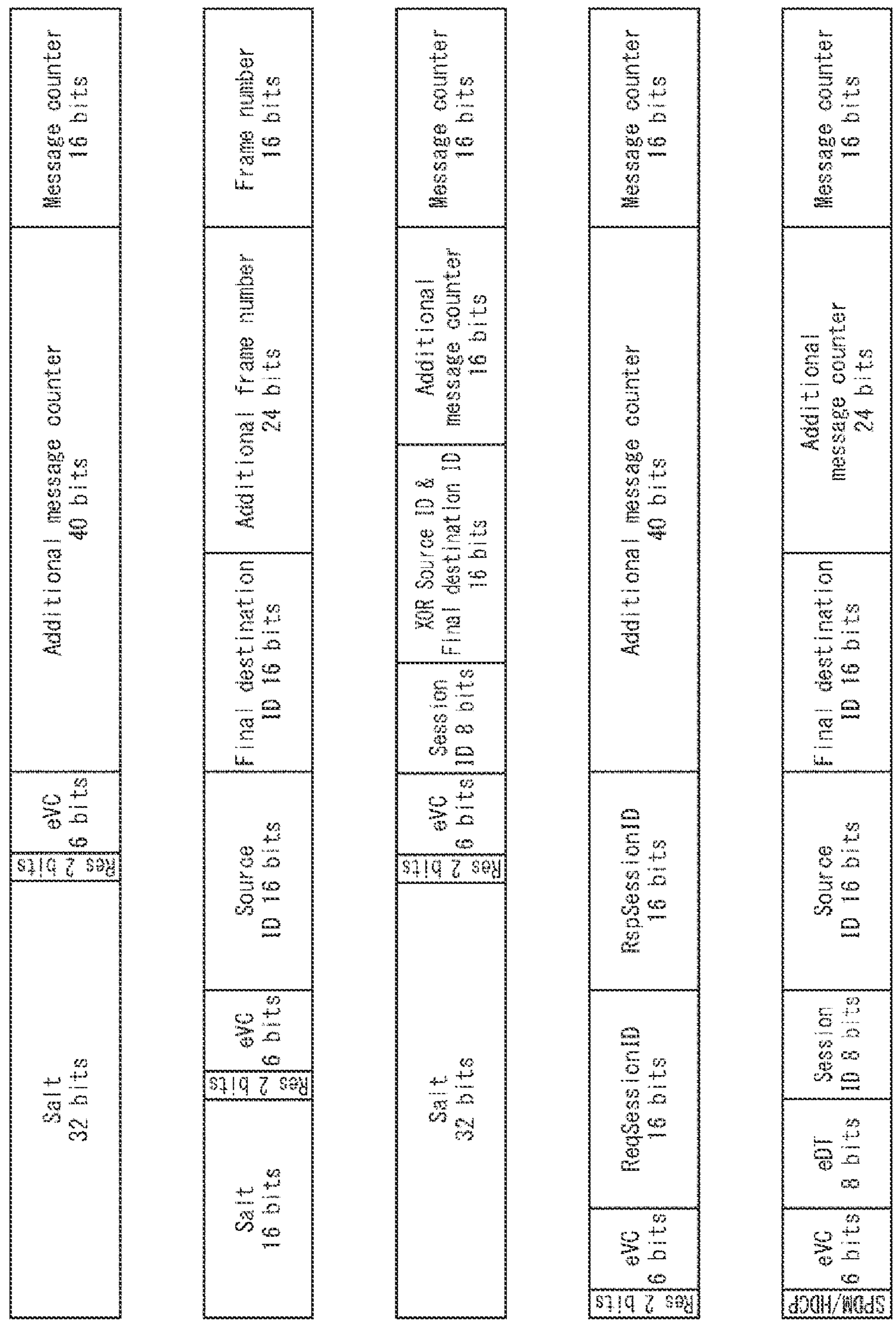
FIGS. 113A, 113B, 113C, 113D, and 113E are diagrams for describing configurations of an initialization vector.

As illustrated in FIG. 113A, the initialization vector configuration may include a salt including a random number. Note that, for example, in a case where a random number is not generated, the salt may be a specified value (for example, 032 or 132).

As illustrated in FIG. 113B, the initialization vector configuration may be configured without including the message count value (including the frame count value). Furthermore, the initialization vector may include the Source ID or the Final destination ID. Note that the frame number may include the additional frame number, the frame number, the additional message count value, and the message count value.

As illustrated in FIG. 113C, the initialization vector configuration may include a SPDM session ID. Meanwhile, an XOR result of the Source ID and the Final destination ID, which can save a bit width, may be included.

As illustrated in FIG. 113D, the SPDM session ID may include ReqSessionID and RspSessionID to be described below.

As illustrated in FIG. 113E, the initialization vector configuration may include security protocol information (for example, SPDM/HDCP), an extended data type, or a data type.

Note that the arrangement order of the elements illustrated in FIG. 133 may be changed. The MSB side (higher-level count value) and the LSB side (lower-level count value) may be changed. Some elements may be replaced with other elements (for example, some or all of the salt, the parameter in the ePH, the initialization vector configuration described above, and the like.).

Figure 114:
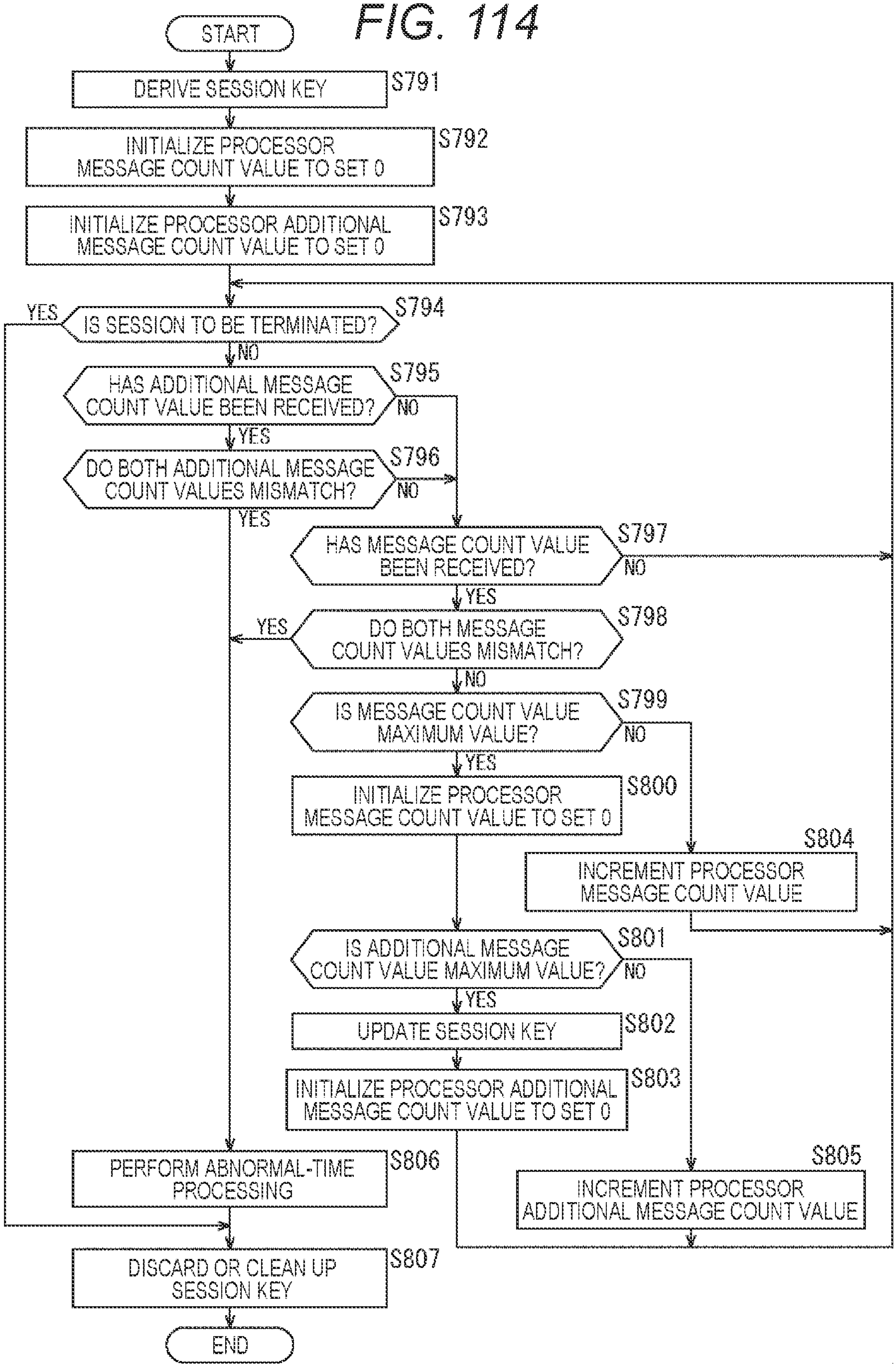
FIG. 114 is a flowchart for describing data verification processing.

FIG. 114 is a flowchart for describing data verification processing in which the application processor 1212 performs data verification using the message count value.

In step S791, the security unit 1326 derives the session key.

In step S792, the data verification unit 1325 initializes and sets the processor message count value to 0.

In step S793, the data verification unit 1325 initializes and sets a processor additional message count value to 0.

In step S794, the extension mode-compatible CSI-2 reception circuit 1322 determines whether or not to terminate the session, and in a case where it is determined not to terminate the session, the processing proceeds to step S795.

In step S795, the data verification unit 1325 determines whether or not the additional message count value has been received from the image sensor 1211. In step S795, in a case where the data verification unit 1325 determines that the additional message count value has been received from the image sensor 1211, the processing proceeds to step S796.

In step S796, the data verification unit 1325 determines whether or not both the processor additional message count value and the additional message count value of the image sensor 1211 do not match.

In step S796, in a case where the data verification unit 1325 determines that both the processor additional message count value and the additional message count value of the image sensor 1211 do not mismatch (match), the processing proceeds to step S797. Meanwhile, in step S795, in a case where the data verification unit 1325 determines that the additional message count value has not been received from the image sensor 1211, the processing also proceeds to step S797.

In step S797, the data verification unit 1325 determines whether or not the message count value has been received from the image sensor 1211. In step S797, in a case where the data verification unit 1325 determines that the message count value has been received from the image sensor 1211, the processing proceeds to step S798.

In step S798, the data verification unit 1325 determines whether or not both the processor message count value and the message count value of the image sensor 1211 do not match.

In step S798, in a case where the data verification unit 1325 determines that both the processor message count value and the message count value of the image sensor 1211 do not mismatch (match), the processing proceeds to step S799.

In step S799, the data verification unit 1325 determines whether or not the processor message count value has been counted up to the maximum value. In step S799, in a case where the data verification unit 1325 determines that the processor message count value has been counted up to the maximum value, the processing proceeds to step S800.

In step S800, the data verification unit 1325 initializes and sets the processor message count value to 0.

In step S801, the data verification unit 1325 determines whether or not the processor additional message count value has been counted up to the maximum value. In step S801, in a case where the data verification unit 1325 determines that the processor additional message count value has been counted up to the maximum value, the processing proceeds to step S802.

In step S802, the security unit 1326 updates the session key.

In step S803, the data verification unit 1325 initializes and sets the processor additional message count value to 0. Thereafter, the processing returns to step S794, and similar processing is repeatedly performed thereafter.

Meanwhile, in step S797, in a case where the data verification unit 1325 determines that the message count value has not been received from the image sensor 1211, the processing returns to step S794, and similar processing is repeatedly performed thereafter.

Meanwhile, in step S799, in a case where the data verification unit 1325 determines that the processor message count value has not been counted up to the maximum value, the processing proceeds to step S804. In step S804, the data verification unit 1325 increments the processor message count value, and thereafter, the processing returns to step S794, and similar processing is hereinafter repeatedly performed.

Meanwhile, in step S801, in a case where the data verification unit 1325 determines that the processor additional message count value has not been counted up to the maximum value, the processing proceeds to step S805. In step S805, the data verification unit 1325 increments the processor additional message count value, and thereafter, the processing returns to step S794, and similar processing is hereinafter repeatedly performed.

Meanwhile, in step S796, in a case where the data verification unit 1325 determines that both the processor additional message count value and the additional message count value of the image sensor 1211 do not match, the processing proceeds to step S806. Furthermore, in step S798, in a case where the data verification unit 1325 determines that both the processor message count value and the message count value of the image sensor 1211 do not match, the processing also proceeds to step S806.

In step S806, the data verification unit 1325 performs abnormal-time processing assuming that an abnormality has occurred, and the processing proceeds to step S807. Furthermore, in step S794, in a case where the extension mode-compatible CSI-2 reception circuit 1322 determines to terminate the session, the processing also proceeds to step S807.

In step S807, the security unit 1326 discards or cleans up the session key, and then the processing is terminated.

Figure 115:
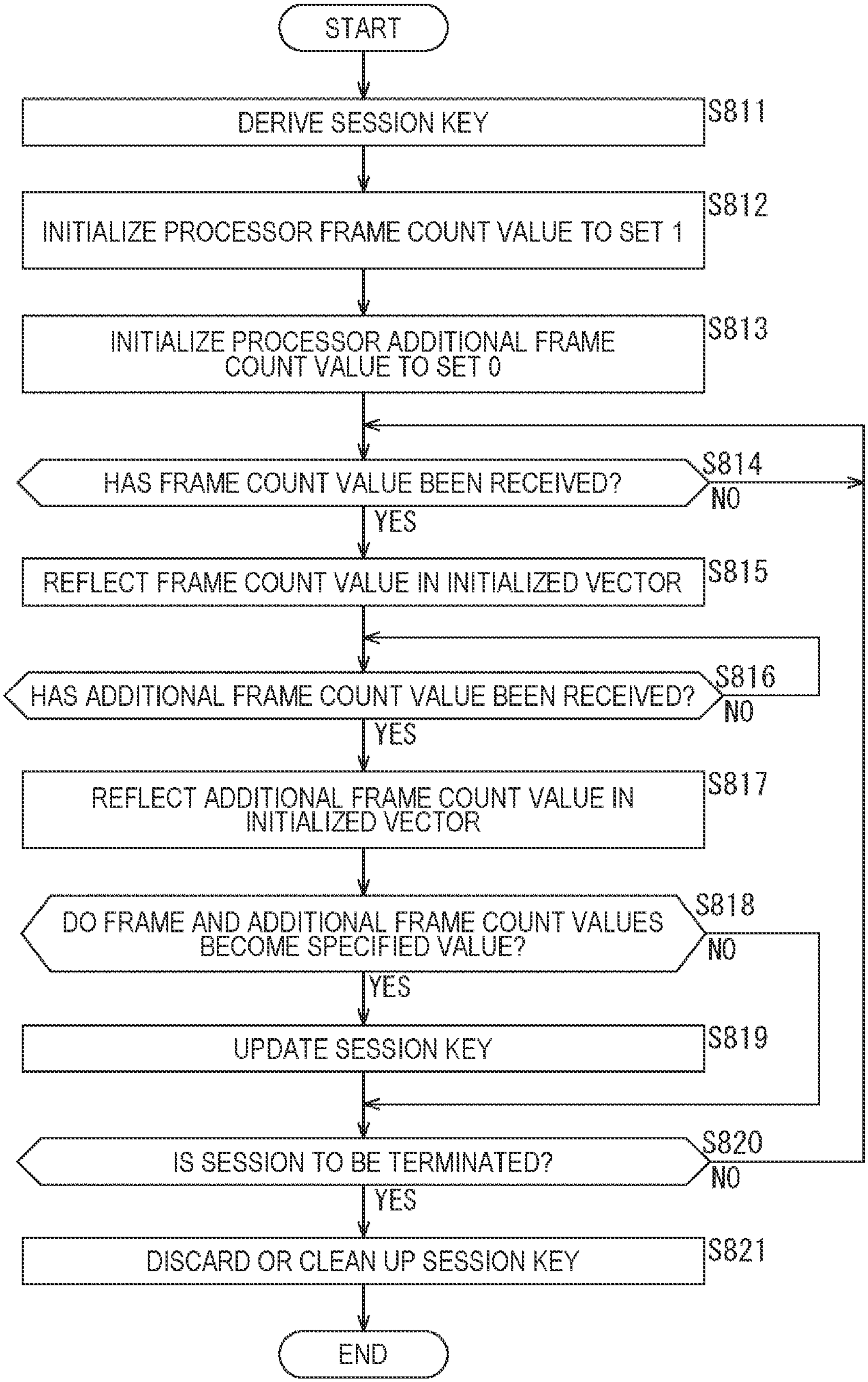
FIG. 115 is a diagram illustrating reflection processing.

FIG. 115 is a diagram for describing reflection processing in which the application processor 1212 reflects the frame count value and the additional frame count value to the initialization vector.

In step S811, the security unit 1326 derives the session key.

In step S812, the data verification unit 1325 initializes and sets the processor frame count value to 1.

In step S813, the data verification unit 1325 initializes and sets the processor additional frame count value to 0.

In step S814, the data verification unit 1325 determines whether or not the frame count value has been received from the image sensor 1211, and waits for the processing until it is determined that the frame count value has been received from the image sensor 1211. Then, in step S814, in a case where the data verification unit 1325 determines that the frame count value has been received from the image sensor 1211, the processing proceeds to step S815.

In step S815, the security unit 1326 reflects the frame count value to the initialization vector.

In step S816, the data verification unit 1325 determines whether or not the additional frame count value has been received from the image sensor 1211, and waits for the processing until it is determined that the additional frame count value has been received from the image sensor 1211. Then, in step S816, in a case where the data verification unit 1325 determines that the frame addition count value has been received from the image sensor 1211, the processing proceeds to step S817.

In step S817, the security unit 1326 reflects the additional frame count value to the initialization vector.

In step S818, the data verification unit 1325 determines whether or not the frame count value and the additional frame count value have been counted up to a specified value. In step S818, in a case where the data verification unit 1325 determines that the frame count value and the additional frame count value have been counted up to the specified value, the processing proceeds to step S819.

In step S819, the security unit 1326 updates the session key.

After the processing of step S819 or in a case where the data verification unit 1325 determines that the frame count value and the additional frame count value have not been counted up to the specified value in step S818, the processing proceeds to step S820.

In step S820, the extension mode-compatible CSI-2 reception circuit 1322 determines whether or not to terminate the session, and in a case where it is determined not to terminate the session, the processing returns to step S814, and similar processing is repeatedly performed thereafter.

On the other hand, in step S820, in a case where the extension mode-compatible CSI-2 reception circuit 1322 determines to terminate the session, the processing proceeds to step S821.

In step S821, the security unit 1326 discards or cleans up the session key, and then the processing is terminated.

Note that although the message count value is incremented by 1, the increment of the frame count value (frame number) may be freely mixed with the increment of 1 or 2 in the sequence. Therefore, it is desirable to preferentially use the values transmitted from the image sensor for the frame count value and the additional frame count value.

On the other hand, for the message count value and the additional message count value, a value counted by the application processor 1212 may be preferentially used over a value transmitted from the image sensor 1211 in order to promptly start the decryption operation. Note that the processing described with reference to the flowcharts of FIGS. 114 and 115 may be configured not to update the session key.

Abbreviations are eP: extended Packet, eVC: extended Virtual Channel, and eDT: extended Data Type, respectively. Although the initialization vector example for AES-GCM/GMAC has been described, the present technology may be applied to block ciphers (for example, Data Encryption Standard: DES, Triple DES) other than AES, algorithms (for example, Counter with Cipher block chaining-MAC: CCM) other than GCM/GMAC, different key lengths (for example, other than 128 bits), or different IV lengths (for example, other than 96 bits), after components, arrangement order, numerical values, and the like are adjusted as necessary.

Some or all of RandomData or OpaqueData in KEY_EXCHANGE request message in SPDMs specification, RandomData in Successful KEY_EXCHANGE_RSP response message, RequesterContext or OpaquePSKData in PSK_EXCHANGE request message, and ResponderContext in PSK_EXCHANGE_RSP message, in Distributed Management Task Force (DMTF), which are publicly available, may be used as the salt.

Meanwhile, the session ID is stored as 1 Byte in, for example, Param2 in the PSK_EXCHANGE_RSP message or in the KEY_EXCHANGE_RSP response message, and is transmitted from the SPDM-responder (for example, the image sensor) to the SPDM-requester. Note that PSK_EXCHANGE_RSP message and KEY_EXCHANGE_RSP response message are SPDM-options, but PSK_EXCHANGE_RSP message corresponding to a common key encryption method or KEY_EXCHANGE_RSP response message corresponding to a public key encryption method is substantially essential in order to derive an SPDM-session key, and the session ID of the session key may be included in the initialization vector. Note that it is desirable that the session ID is different from previous five sessions or active sessions for the same endpoint.

Furthermore, PSK_EXCHANGE request message or KEY_EXCHANGE request message may include ReqSessionID (for example, 2 bytes) as the requester-side session ID, PSK_EXCHANGE_RSP response message or Successful KEY_EXCHANGE_RSP response message may include RspSessionID (for example, 2 bytes) as the responder-side session ID, and (for example, 4 bytes of) session ID=Concatenate (ReqSessionID, RspSessionID) obtained by concatenating the two IDs may be used as a unique session ID between the requester and the responder. In this case, the session key or the message counter can be made common among a plurality of types of sessions.

Meanwhile, in display applications (for example, DSI-2), High-bandwidth Digital Content Protection (HDCP) may be used as a security protocol instead of SPDM. Therefore, security protocol information (see FIG. 116) that can identify whether the security protocol is the SPDM or the HDCP may be included in the initialization vector. Note that the security protocol information of 2-bit allocation is illustrated in FIG. 116, but different bit depth may be allocated (for example, 1 bit or 8 bits). Furthermore, not supporting a security protocol (for example, No security protocol) may be allocated to the reserved area data (Reserved for future use).

For example, bits dedicated to SPDM or HDCP may be allocated and defined in a new format, in an ePH format (for example, Reserved, eVC, eDT, or Security Descriptor), in the session ID, or the like, and may be included in the initialization vector. In this case, the session key or the message counter can be made common among a plurality of types of security protocols. Similarly, a part of the extended packet header may be included in the initialization vector, for example, Security Descriptor (for example, may be referred to as Service Descriptor) may be included in the initialization vector. In this case, the session key or the message counter can be made common among different Security Descriptors.

Figure 117A:
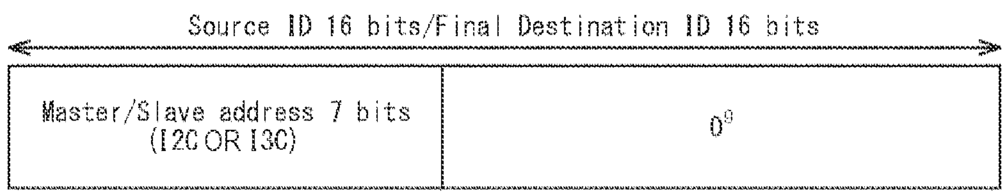
FIGS. 117A and 117B are diagrams illustrating examples of a Source ID or a Final Destination ID.
Figure 117B:
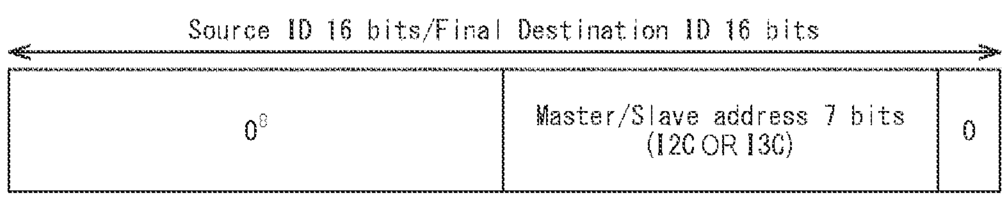

The image sensor 1211 or the application processor 1212 may use a value stored and received in the extended packet header (for example, ePH4) instead of pre-exchange as the Source ID or the Final Destination ID as illustrated in FIGS. 117A and 117B.

Note that, as a connection form in which three or more devices (for example, a plurality of cameras and a plurality of displays) are connected by cables for communication, there is a daisy chain method in which a next device is connected to a previous device by "linking them together in sequence", and the Source ID (source ID) and the Final Destination ID (final destination ID) are included in the initialization vector, so that the session key or the message counter can be made common among a plurality of devices.

Note that the Source ID and the Final Destination ID switch around depending on, for example, a command to the image sensor or data from the image sensor. To avoid this, the Source ID and the Final Destination ID in the initialization vector may be defined as, for example, a Host ID and a Device ID. Note that, for example, since the image sensor can be a host or a device (non-host), it may be desirable that the Source ID and the Final Destination ID are defined as Source ID and Final Destination ID.

Therefore, for example, an ID obtained by performing a logical operation (for example, XOR) for the Source ID and the Final destination ID may be used. This case also has an effect that the bit width defined in the initialization vector is saved. Note that, in the case of I2C or I3C, a Master address or a Slave address may be stored for the Source ID or the Final Destination ID, as illustrated in FIGS. 117A and 117B described above.

Note that, for example, in a case where image data is transmitted from the image sensor 1211 to the application processor 1212 in the data structure of FIG. 86 described above, the device ID of the image sensor 1211 is stored as the Source ID and the device ID of the application processor 1212 is stored as the Final Destination ID in order to implement the E2E protection.

Meanwhile, for example, in a case where a command instruction is transmitted from the application processor 1212 to the image sensor 1211 in the data structure of FIG. 86 described above, the device ID of the application processor 1212 is stored as the Source ID and the device ID of the image sensor 1211 is stored as the Final Destination ID in order to implement the E2E protection. In this case, the device ID of the SerDes device 25 or the SerDes device 26 as illustrated in FIG. 2 is an intermediate Destination ID, and is desirably distinguished from the Final Destination ID in some cases. Note that, in some cases, the Final Destination ID in an IV format may be replaced with the Destination ID. Furthermore, the eVC may be replaced with the VC, and the eDT may be replaced with the DT.

Furthermore, the eVC or the VC may be any ID (Stream ID) of Video stream, Audio stream, Camera stream, Display Stream, or the like. Furthermore, since the Audio stream may be used as a stream instead of the Video stream, stream information that can identify whether the stream is the Video stream or the Audio stream may be included in the initialization vector. In this case, the session key or the message counter can be made common between the Video stream and the Audio stream.

A part or whole of the nonce value may be stored and transmitted in data of different virtual channels (for example, in the frame start, in the embedded data, in the image data, or in the frame end). This is effective in a case where, for example, there is no room to store the part or whole of the nonce value in data of a specific virtual channel.

Meanwhile, a part or whole of the nonce value may be stored and transmitted in at least a part of the packet data (Generic Short Packet Data Types or Generic Long Packet Data Types), the user-defined data (User Defined Byte-based Data), or the reserved area data (Reserved for future use) in a virtual channel different from the virtual channel for image data transmission. That is, the data may be stored in the non-image data.

Note that, in the above description, the start of imaging has been specified but the end of imaging is not specified. This is because an imaging method differs depending on a global shutter method or a rolling shutter method. For example, in the case of the global shutter method, since all of pixels can be imaged at the same time, the imaging may be ended before next processing, or the imaging may be ended before first image data in a frame is transmitted. Meanwhile, in the case of the rolling shutter method, at least a part of the imaging and high-speed data transmission executed in rows of a pixel may be redundantly executed (executed in parallel), and thus the imaging is only required to be ended before last image data in a frame is transmitted. Furthermore, the position of the start of imaging is an example, and may be executed with a delay to a position before first image data in a frame is transmitted.

<Detailed Configuration Example of Image Sensor That Detects Presence or Absence of Abnormality and Transmits Message According to Detection Result as Unique Message to Application Processor>

There is disclosed a technique of an imaging device that is mounted on a vehicle and enables detection of a failure in an imaging element having a structure in which a plurality of substrates is stacked, in which a row drive unit provided on a second substrate detects the failure according to whether or not timing at which a control signal for controlling accumulation and reading of pixel signals of a pixel array provided on a first substrate is output coincides with timing at which the control signal output from the row drive unit passes through the pixel array and is detected (see WO 2017/209221 A).

However, during driving assist processing or automated driving processing, an abnormality of a sensor causes a state directly leading to a fatal accident. Therefore, when the abnormality of the sensor is detected by the above-described failure detection, it is necessary to warn the vehicle from the sensor as soon as possible. Furthermore, in the case where the above-described failure detection is executed, if the sensor suddenly stops stream of image data when the abnormality of the sensor is detected, the image data is interrupted during driving depending on the timing, and thus the driving assist processing and the automated driving processing are interrupted and there is a risk of inducing danger.

Meanwhile, to provide a solid-state imaging device capable of outputting a more accurate abnormality detection signal, there is disclosed a technique including: a pixel that outputs a pixel signal that is an analog signal; a reading unit that converts the pixel signal into a digital signal to generate a digital pixel signal; a storage unit that stores the digital pixel signal; and a first inspection signal output unit that outputs a first inspection signal to the storage unit and causes the storage unit to store the first inspection signal, in which the first inspection signal stored in the storage unit is output from the storage unit in a period after output of the digital pixel signal of a certain frame is completed and before output of the digital pixel signal of a next frame is started (see JP 2018-121325 A).

In a case of applying such a technique, an image processing unit outside the imaging device determines coincidence between the first inspection signal and an expected value, but it takes time to determine the coincidence. Furthermore, a determination result of the image processing unit is not known to the imaging device. In addition, there is a possibility that the first inspection signal is falsified by at least one of noise, interference, and an attack by an attacker, and there is a possibility that it is determined that there is an abnormality even though it is normal, or it is determined that there is a normal even though it is abnormal.

That is, in any case, in a propulsion device that controls propulsion of a vehicle, a robot, a drone, or the like capable of traveling, walking, flying, or the like, there is a possibility that an appropriate response to an abnormality of a sensor cannot be made and safety is lowered.

Therefore, the image sensor 1211 may detect the presence or absence of abnormality, and transmit a message according to the detection result to the application processor 1212 by high-speed data communication for transmitting image data as a unique message.

With such a configuration, it becomes possible to promptly notify the application processor 1212 of the unique message that is a message related to the presence or absence of abnormality of the image sensor 1211.

As a result, the application processor 1212 becomes able to promptly and appropriately cope with the abnormality of the image sensor 1211, and further improve safety.

Figure 118:
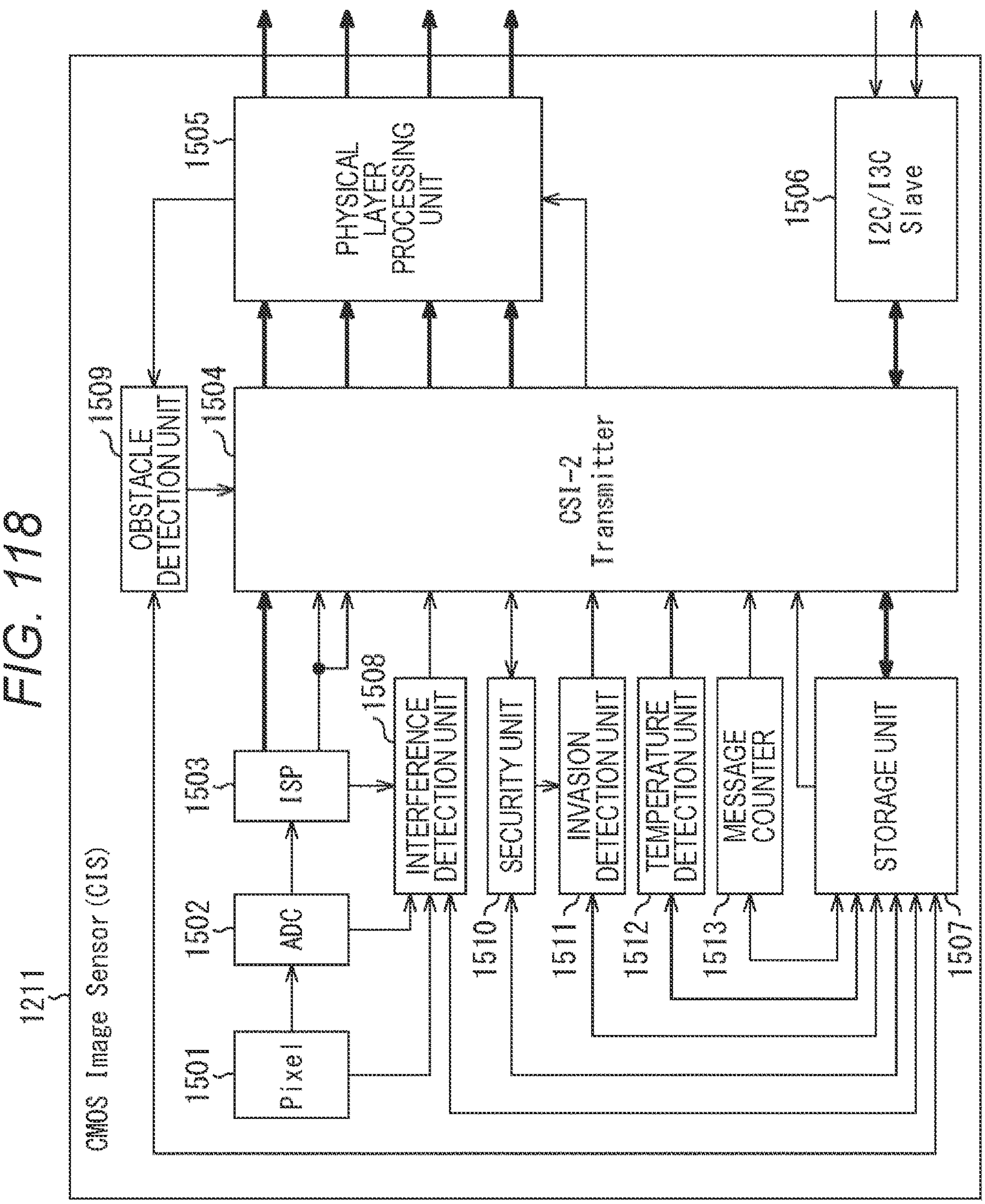
FIG. 118 is a block diagram illustrating a detailed configuration example of an image sensor that diagnoses presence or absence of abnormality of the image sensor.

Here, a detailed configuration example of the image sensor 1211 that detects the presence or absence of abnormality and transmits a message corresponding to a detection result to the application processor as a unique message will be described with reference to FIG. 118. FIG. 118 is a block diagram illustrating a detailed configuration example of the image sensor 1211 that detects the presence or absence of abnormality and transmits a message corresponding to a detection result to the application processor as a unique message.

The image sensor 1211 in FIG. 118 includes a pixel 1501, an AD converter 1502, an image processing unit 1503, an extension mode-compatible CSI-2 transmission circuit 1504, a physical layer processing unit 1505, an I2C/I3C slave 1506, a storage unit 1507, an interference detection unit 1508, an obstacle detection unit 1509, a security unit 1510, an invasion detection unit 1511, and a temperature detection unit 1512.

Note that the pixel 1501, the AD converter 1502, the image processing unit 1503, the extension mode-compatible CSI-2 transmission circuit 1504, the physical layer processing unit 1505, the I2C/I3C slave 1506, and the storage unit 1507 have configurations provided with similar functions to those of the corresponding pixel 1301, AD converter 1302, image processing unit 1303, extension mode-compatible CSI-2 transmission circuit 1304, physical layer processing unit 1305, I2C/I3C slave 1306, and storage unit 1307 in other embodiments, and thus detailed description thereof is omitted.

Figure 119:
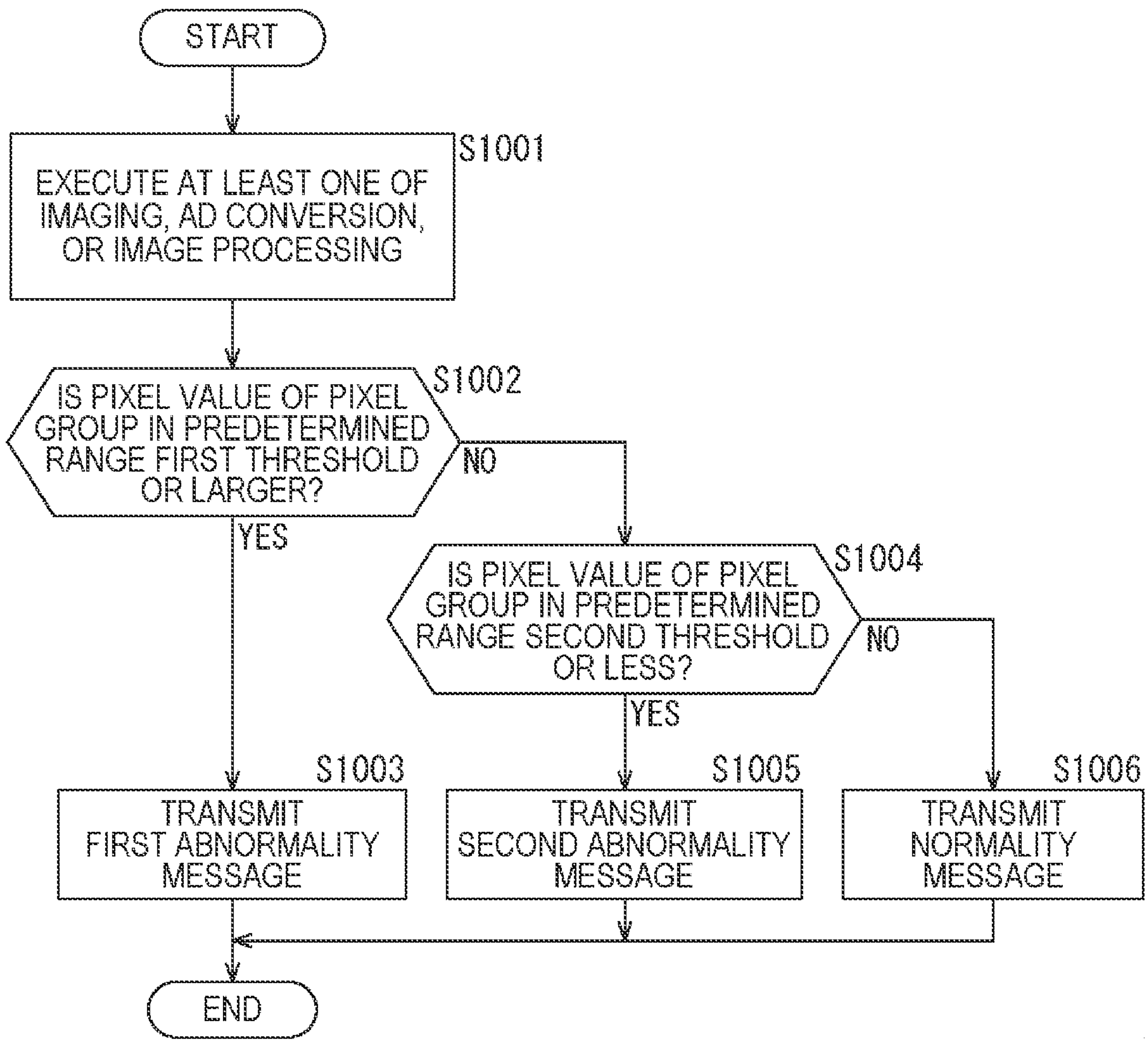
FIG. 119 is a flowchart for describing interference detection processing (part 1) by an interference detection unit.

The interference detection unit 1508 is electrically directly or indirectly connected to at least one of the pixel 1501, the AD converter 1502, and the image processing unit 1503. Note that FIG. 119 illustrates an example in which the interference detection unit 1508 is connected to all of the pixel 1501, the AD converter 1502, and the image processing unit 1503, but it is sufficient that the interference detection unit is connected to at least one of them.

The interference detection unit 1508 detects an abnormality from the presence or absence of a light irradiation attack (interference) that substantially invalidates or falsifies the image of the image sensor 1211 on the basis of an output result of at least one of a pixel signal including an analog signal output by photoelectric conversion according to the amount of light received in the pixel 1501, a pixel signal converted into a digital signal by the AD converter 1502, and image data subjected to image processing output from the image processing unit 1503, and notifies the application processor 1212 of the unique message based on a detection result by high-speed data communication that transmits image data.

With such a configuration, the application processor 1212 acquires the unique message according to the presence or absence of interference by high-speed data communication, thereby promptly responding to the unique message.

The obstacle detection unit 1509 is electrically directly or indirectly connected to, for example, a communication path or the physical layer processing unit 1505.

The obstacle detection unit 1509 detects the presence or absence of an injection attack such as disabling or causing a malfunction in some or all operations in the image sensor 1211, or causing false information to flow into or causing information to flow out from the image sensor 1211, by, for example, any of power injection, electromagnetic irradiation (injection), and laser irradiation (injection) with respect to the image sensor, and notifies the application processor 1212 of the unique message based on a detection result by high-speed data communication for transmitting image data.

The obstacle detection unit 1509 detects the presence or absence of an insertion attack such as disabling or causing a malfunction in some or all operations in the image sensor 1211, or causing false information to flow into or causing information to flow out from the image sensor by inserting a hardware trojan (that is, a foreign substance) that adversely affects the image sensor 1211, and notifies the application processor 1212 of the unique message based on a detection result by high-speed data communication for transmitting image data.

With such a configuration, the application processor 1212 acquires the unique message according to the presence or absence of obstacle by high-speed data communication, thereby promptly responding to the unique message.

For example, the invasion detection unit 1511 is electrically directly or indirectly connected to the security unit 1510, detects an abnormality of the security unit 1510, and notifies the application processor 1212 of the unique message based on a detection result by high-speed data communication for transmitting image data.

The security unit 1510 has a possibility of receiving an analysis attack (power analysis attack or electromagnetic analysis attack) that causes information in the image sensor 1211 to flow out by analyzing power used for the image sensor 1211 or electromagnetic generated from the image sensor 1211, in addition to the injection attack such as disabling or causing a malfunction in some or all operations in the image sensor 1211, or causing false information to flow into or causing information to flow out from the image sensor.

Therefore, the invasion detection unit 1511 logically detects the presence or absence of falsification in the security unit 1510 due to the injection attack or physically detects whether or not an attack object (for example, a probe) necessary for power analysis or electromagnetic analysis exists in the vicinity of the security unit 1510, and notifies the application processor 1212 of the unique message based on a detection result by high-speed data communication for transmitting image data.

With such a configuration, the application processor 1212 acquires the unique message according to the presence or absence of invasion by high-speed data communication, thereby promptly responding to the unique message.

The temperature detection unit 1512 detects a temperature of the image sensor 1211, and notifies the application processor 1212 of the unique message by high-speed data communication for transmitting the image data on the basis of whether or not the temperature is in a state of being lower than an upper limit value (first threshold) and higher than a lower limit value (second threshold) of an operation guarantee temperature.

With such a configuration, the application processor 1212 can promptly respond to the unique message by the image sensor 1211 receiving the unique message according to the operation temperature by high-speed data communication.

The message counter 1513 has a basic function similar to message counter 1308 (FIG. 76), but further uses a first counter that is incremented or decremented and a second counter that is incremented or decremented as the message count value. By using the first counter and the second counter, the message counter 1513 improves resistance to defect or falsification with respect to the message count value. Note that details of the message counter 1513 will be described below with reference to FIGS. 150 to 152. Of course, the message counter 1308 (only one of the first counter and the second count) may be used instead of the message counter 1513.

<Interference Detection by Interference Detection Unit (Part 1)>

For example, when the image sensor 1211 is irradiated with any of visible light, infrared light, laser light, or the like having an intensity higher than a predetermined intensity, an image captured by the image sensor 1211 is substantially invalidated or falsified.

Therefore, in the case where any of visible light, infrared light, laser light, or the like having an intensity higher than a predetermined intensity is detected, for example, it can be considered that an abnormality caused by a light irradiation attack (interference) has occurred.

Therefore, in the case where any one of visible light, infrared light, laser light, or the like having an intensity higher than a predetermined intensity is detected on the basis of an output result, the interference detection unit 1508 notifies the application processor 1212 of a message indicating that an abnormality has occurred as the unique message by high-speed data communication for transmitting image data.

As a result, the unique message indicating that the abnormality has occurred in the image sensor 1211 is notified by high-speed data communication for transmitting the image data. Therefore, the application processor 1212 can promptly respond to the unique message.

More specifically, in a case where the image sensor 1211 receives interference of invalidation, at least any one of pixel values of R, G, B, IR, and the like of each pixel group within a predetermined range (part or whole of an effective pixel region) approaches saturation.

That is, the pixel value of the pixel group within the predetermined range becomes equal to or larger than the first threshold (upper limit value). Therefore, in the case where it is detected that the pixel value of the pixel group within the predetermined range is equal to or more than the first threshold (upper limit value), for example, an abnormality message indicating that the pixel value of the pixel of the image sensor 1211 is approaching saturation is transmitted to the application processor 1212 as the unique message.

Note that, in addition to the light irradiation attack, in a case where pixel values of pixels in a wide range (predetermined range) are approaching saturation, an abnormality message indicating that an abnormality has occurred in the pixels in the wide range may be transmitted as the unique message. Such a notification of the unique message is effective even in a case where, for example, the image sensor 1211 is accidentally irradiated with interference light.

Meanwhile, for example, there is also a light shielding attack (interference) in which a surface (light receiving surface) of the image sensor 1211 is shielded by at least any of paint, a blackout curtain, a haze, a shielding material, or the like, and the image captured by the image sensor 1211 is substantially invalidated.

Therefore, in a case where it is detected that the surface of the image sensor 1211 is shielded, the unique message is notified from the image sensor 1211 to the application processor 1212 as a message indicating an abnormality.

Therefore, the application processor 1212 that receives the unique message can promptly respond to the unique message.

More specifically, in the case where the image sensor 1211 receives interference of invalidation due to shielding, at least any one of pixel values of R, G, B, IR, and the like of each pixel group within a predetermined range approaches the second threshold (lower limit value).

In other words, in the case where the image sensor 1211 receives interference of invalidation due to shielding, the pixel value of the pixel group within the predetermined range becomes equal to or less than the second threshold, and is detected to be shielded. Therefore, in the case where shielding is detected, for example, the image sensor 1211 transmits an abnormality message indicating an abnormality in which the pixel value approaches the second threshold as the unique message.

Note that, in addition to the light shielding attack, in a case where pixel values in a wide range (predetermined range) approach the second threshold (lower limit value), the abnormality message may be transmitted. Such a notification of the unique message is effective even in a case where the surface (light receiving surface) of the image sensor 1211 is accidentally shielded (disturbed), for example.

Note that, in a case where the abnormality indicating interference of invalidation of the image sensor 1211 is not detected on the basis of the detection result of the interference detection unit 1508, a message indicating normality may be transmitted as the unique message or no unique message may be transmitted.

Furthermore, the first threshold (upper limit value) and the second threshold (lower limit value) used by the interference detection unit 1508 may be stored in advance in the storage unit 1507, for example. In this case, the interference detection unit 1508 may read and use the first threshold (upper limit value) and the second threshold (lower limit value) stored in the storage unit 1507. The first threshold (upper limit value) and the second threshold (lower limit value) may be arbitrarily set.

(Interference Detection Processing by Interference Detection Unit (Part 1))

Next, interference detection processing (part 1) by the interference detection unit 1508 will be described with reference to a flowchart in FIG. 119.

In step S1001, at least one of imaging processing by the pixel 1501, AD conversion processing by the AD converter 1502, or image processing by the image processing unit 1503 is executed, and a processing result is output to the interference detection unit 1508.

In step S1002, the interference detection unit 1508 determines whether or not the pixel value of the pixel group within the predetermined range is equal to or larger than the first threshold (upper limit value) (larger than the upper limit value) on the basis of the processing result of at least one of the imaging processing by the pixel 1501, the AD conversion processing by the AD converter 1502, or the image processing by the image processing unit 1503.

In step S1002, in a case where it is determined that the pixel value of the pixel group within the predetermined range is equal to or larger than the first threshold (upper limit value), the processing proceeds to step S1003.

In step S1003, the interference detection unit 1508 transmits, to the application processor 1212, the unique message including a first abnormality message indicating that the pixel value of the pixel group within the predetermined range is equal to or larger than the first threshold (upper limit value), any of visible light, infrared light, laser light, or the like having an intensity higher than a predetermined intensity has been detected, and an abnormality caused by a light irradiation attack (interference) has occurred.

Furthermore, in step S1002, in a case where it is determined that the pixel value of the pixel group within the predetermined range is not equal to or larger than the first threshold (upper limit value), the processing proceeds to step S1004.

In step S1004, the interference detection unit 1508 determines whether or not the pixel value of the pixel group within the predetermined range is equal to or less than the second threshold (lower limit value) (smaller than the lower limit value) on the basis of the processing result of at least one of the imaging processing by the pixel 1501, the AD conversion processing by the AD converter 1502, or the image processing by the image processing unit 1503.

In step S1004, in a case where it is determined that the pixel value of the pixel group within the predetermined range is equal to or less than the second threshold (lower limit value), the processing proceeds to step S1005.

In step S1005, the interference detection unit 1508 transmits, to the application processor 1212, the unique message including a second abnormality message indicating that the pixel value of the pixel group in the predetermined range is equal to or less than the second threshold value (lower limit value), and for example, the surface (light receiving surface) of the image sensor 1211 is shielded by at least one of paint, a blackout curtain, a haze, a shielding material, or the like, and an abnormality caused by a light shielding attack (interference) that substantially invalidates the image captured by the image sensor 1211 has occurred.

Moreover, in step S1004, in a case where it is determined that the pixel value of the pixel group within the predetermined range is not equal to or less than the second threshold (lower limit value), the processing proceeds to step S1006.

In step S1006, the interference detection unit 1508 transmits, to the application processor 1212, the unique message including a normality message indicating that no abnormality has occurred due to an attack (interference) that substantially invalidates the image captured by the image sensor 1211.

By the above processing, in a case where an attack (interference) on the image sensor 1211 occurs, a notification is made by high-speed data communication for transmitting image data, and thus the application processor 1212 can implement a prompt and appropriate response.

<Interference Detection by Interference Detection Unit (Part 2)>

In the above, an example in which the presence or absence of an attack (interference) due to a change in light intensity on the image sensor 1211 is detected and notified as a unique message has been described.

When the image sensor 1211 functions as a distance measuring sensor using a time of flight (ToF) method, the distance measuring sensor detects a light receiving pattern according to a light emission pattern of laser light emitted from a light source to recognize the light as reflected light of the light source emitted by the distance measuring sensor itself, and distinguishes the light receiving pattern from light receiving patterns from other light sources. At this time, the distance measuring sensor implements distance measurement in units of pixels according to a round-trip time based on a difference between irradiation timing and light reception timing of the light emitted from its own light source, and generates a distance image from a distance measurement result.

Here, the distance image refers to an image including a distance pixel signal based on a detected distance obtained by detecting a distance in a depth direction of an object from the distance measuring sensor for each pixel. In this case, the distance measuring sensor is implemented as a configuration including, for example, an illumination unit, an imaging unit, a control unit, a display unit, and a storage unit.

However, when the light emission pattern (light receiving pattern) is falsified for some reason, the light emission pattern emitted from its own light source cannot be recognized, so that appropriate distance measurement cannot be implemented, and an abnormality occurs.

Therefore, the interference detection unit 1508 may store a light emission pattern (light receiving pattern) as a storage pattern in advance in the storage unit 1507, and detect the presence or absence of occurrence of an abnormality by comparison between the storage pattern with the light receiving pattern actually received by the image sensor 1211.

The illumination unit includes an illumination control unit and a laser light source. The illumination control unit controls a pattern in which the laser light source emits irradiation light (laser light) on the basis of control of the control unit. For example, the illumination control unit controls a pattern (light emission pattern) in which the laser light source emits the irradiation light according to an irradiation code included in an irradiation signal supplied from the control unit.

The imaging unit includes a lens, an imaging element, and a signal processing circuit. The lens forms an image of incident light on an imaging surface of the imaging element. The configuration of the lens is arbitrary and may be configured by a plurality of lens groups, for example. The imaging element is implemented by, for example, the image sensor 1211 including a complementary metal oxide semiconductor (CMOS) image sensor using the ToF method. The imaging element images the object on the basis of control of the control unit, and supplies an image signal obtained as a result to the signal processing circuit. For example, the imaging element generates a pixel signal indicating a correlation between a reference signal supplied from the control unit and reception light including the reflected light that is the irradiation light emitted from the laser light source is reflected by the object, and supplies the pixel signal to the signal processing circuit. The reference signal includes a reference code indicating a pattern to be used to detect the correlation with the reception light.

Here, in a case where there is an abnormality in the result extracted by the image sensor 1211 from the reception light for any of the light receiving patterns such as a light receiving waveform pattern, a light receiving spot pattern, a light receiving dot pattern, and a light receiving locus pattern, the abnormality message may be transmitted from the imaging unit (corresponding to the image sensor 1211) including the imaging element (corresponding to the pixel and the converter) and the signal processing circuit (corresponding to the image processing unit) to the control unit (corresponding to the application processor 1212).

On the other hand, the light receiving pattern may be transmitted as the unique message without storing the storage pattern in the storage unit in the image sensor 1211. In this case, the storage pattern is stored in a storage unit (for example, the application processor 1212) outside the image sensor 1211, comparison between the storage pattern and the light receiving pattern is performed, and whether or not the light receiving pattern is normal or abnormal is determined.

<Light Receiving Pattern>

Figure 120:
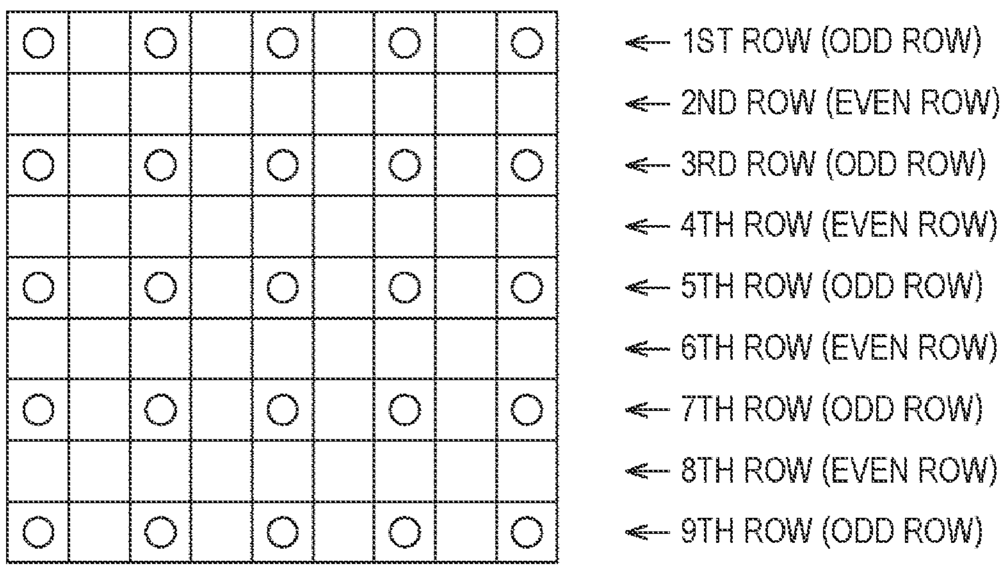

When the light receiving pattern itself is transmitted, information related to pixels that are not receiving light may not be transmitted at high speed. For example, when a pixel indicated by a white circle as illustrated in FIG. 120 is a dot pattern indicating a pixel that receives light, only information related to the received dot pattern indicated by the white circle may be transmitted at high speed. For example, pixels that are not receiving light are used to determine whether or not the light receiving spot pattern or the light receiving dot pattern are normal or abnormal. In this case, the image sensor 1211 can determine whether or not the light receiving pattern is normal or abnormal while minimizing the data amount to be transmitted at high speed.

Figure 121:
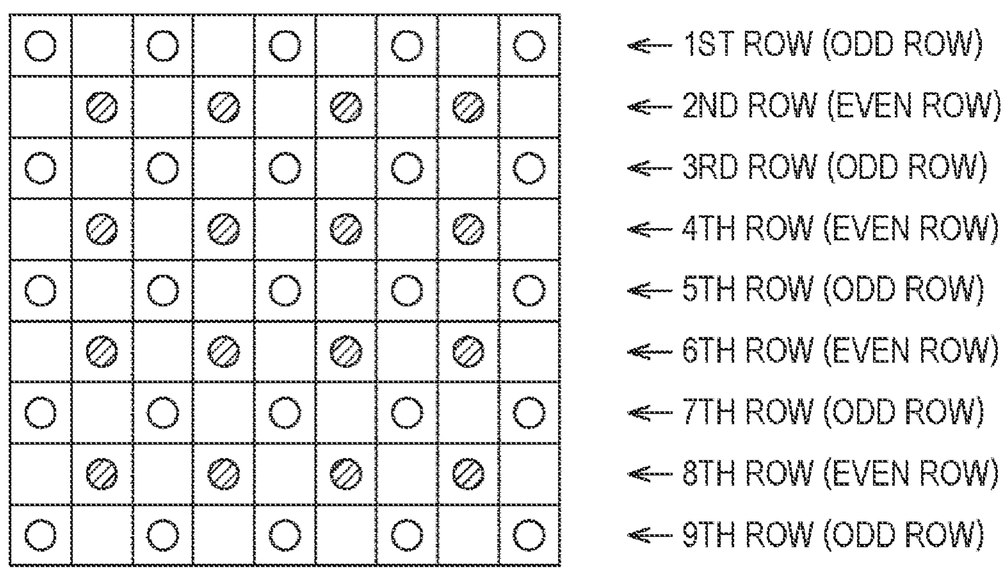

Furthermore, in a case of a periodical light receiving dot pattern, the number of types of storage patterns stored in the storage unit can be reduced. For example, in a case where a pixel that receives light with a first pixel value indicated by a white circle and a pixel that receives light with a second pixel value indicated by a hatched circle as illustrated in FIG. 121 are the dot patterns indicating the pixels that receive light, it is possible to determine whether or not the actual light receiving pattern is normal or abnormal as long as the dot patterns for two rows, that is, the dot pattern for an odd row and the dot pattern for an even row, are stored in the storage unit 1507. As described above, in the periodical light receiving dot pattern and the like, the storage pattern is stored by storing only the dot patterns for the number of rows that are repeatedly expressed in the storage unit 1507, so that storage capacity can be reduced.

Moreover, whether or not the light receiving waveform pattern is normal or abnormal may be determined by storing the storage pattern in the storage unit 1507, but the light receiving waveform pattern is irrelevant to image data and image pattern. Therefore, by determining the presence or absence of abnormality using the light receiving waveform pattern, it becomes possible to reduce the influence on the capacity of the storage unit 1507 even if any pattern such as the light receiving spot pattern, the light receiving dot pattern, or the light receiving locus pattern is complicated.

(Interference Detection Processing by Interference Detection Unit (Part 2))

Figure 122:
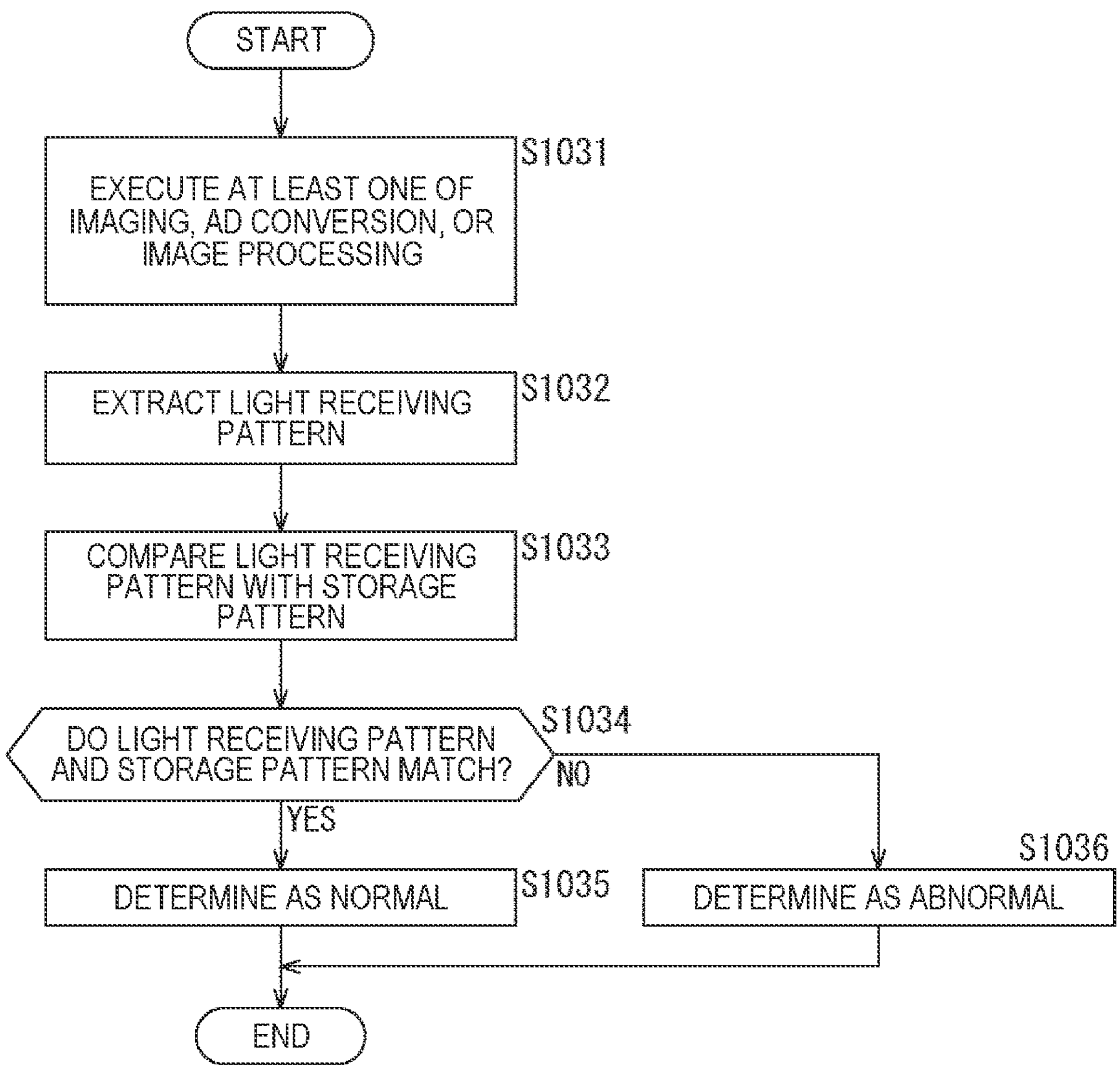

Next, interference detection processing (part 2) using light receiving patterns by the interference detection unit 1508 will be described with reference to a flowchart in FIG. 122.

In step S1031, at least one of the imaging processing by the pixel 1501, the AD conversion processing by the AD converter 1502, or the image processing by the image processing unit 1503 is executed, and a processing result is output to the interference detection unit 1508.

In step S1032, the interference detection unit 1508 extracts the light receiving pattern on the basis of the processing result of at least one of the imaging processing by the pixel 1501, the AD conversion processing by the AD converter 1502, or the image processing by the image processing unit 1503.

In step S1033, the interference detection unit 1508 reads the storage pattern, which is the light receiving pattern at normal time stored in advance in the storage unit 1507, and compares the storage pattern with the light receiving pattern.

In step S1034, the interference detection unit 1508 determines whether or not the light receiving pattern matches the storage pattern on the basis of a comparison result between the light receiving pattern and the storage pattern.

In step S1034, in a case where it is determined that the light receiving pattern matches the storage pattern, the processing proceeds to step S1035.

In step S1035, the interference detection unit 1508 considers that no abnormality has occurred in the distance measuring sensor implemented by the image sensor 1211, and transmits the unique message including the normality message indicating that no abnormality has occurred to the application processor 1212.

On the other hand, in step S1034, in a case where it is determined that the light receiving pattern does not match the storage pattern, the processing proceeds to step S1036.

In step S1036, the interference detection unit 1508 considers that an abnormality has occurred in the distance measuring sensor implemented by the image sensor 1211, and transmits the unique message including the abnormality message indicating that the abnormality has occurred to the application processor 1212.

In a case where the distance measuring sensor is implemented by the image sensor 1211 by the above processing, when an abnormality occurs in the light receiving pattern, the application processor 1212 is notified of a corresponding unique message by high-speed data communication for transmitting image data. As a result, the application processor 1212 can implement a prompt and appropriate response to the abnormality that has occurred in the image sensor 1211.

<Obstacle Detection by Obstacle Detection Unit>

Next, obstacle detection by the obstacle detection unit 1509 will be described.

In a case where the image sensor 1211 receives the injection attack such as disabling or causing a malfunction in some or all operations in the image sensor 1211, or causing false information to flow into or causing information to flow out from the image sensor, an abnormal change occurs in a voltage state or a clock state of a physical layer.

Therefore, the obstacle detection unit 1509 detects a change in the voltage state or a change in the clock state of the physical layer.

In a case of detecting an abnormal change in the voltage state of the physical layer, for example, the obstacle detection unit 1509 notifies the application processor 1212 of the unique message including a first abnormality message indicating that power abnormality or voltage abnormality (for example, voltage amplitude, voltage polarity, or IR drop), or the like has occurred in the image sensor 1211 by high-speed data communication for transmitting image data.

Furthermore, in a case of detecting an abnormal change in the clock state of the physical layer, the obstacle detection unit 1509 notifies the application processor 1212 of the unique message including a second abnormality message indicating that the clock abnormality (for example, frequency, periodicity, the number of times, or jitter of a clock) has occurred by high-speed data communication for transmitting the image data.

Note that the obstacle detection unit 1509 may transmit a message indicating an abnormality as the unique message in a case where an abnormality occurs due to not only the injection attack but also accidental noise, interference, or the like.

Moreover, for example, there is an insertion attack such as disabling or causing a malfunction in some or all operations in the image sensor 1211, or causing false information to flow into or causing information to flow out from the image sensor by inserting a hardware trojan (that is, a foreign substance) that adversely affects the image sensor 1211, which is activated in a case where a specific condition is satisfied.

In a case where the image sensor 1211 receives the insertion attack, an abnormal change occurs in electrical characteristics (for example, a Z value of an impedance value, an R value of a resistance value, an L value of an inductance value, a C value of a capacitance value, or a Q value of a quality factor), transmission characteristics (for example, data transmission quality, insertion loss, or reflection loss), or the like.

Therefore, in the case of detecting the electrical characteristics and detecting an abnormal change in the electrical characteristics, for example, the obstacle detection unit 1509 notifies the application processor 1212 of a third abnormality message indicating that the abnormality in the electrical characteristics has occurred in the image sensor 1211 as the unique message by high-speed data communication for transmitting image data.

Furthermore, in the case of detecting the transmission characteristics and detecting an abnormal change in the transmission characteristics, for example, the obstacle detection unit 1509 notifies the application processor 1212 of a fourth abnormality message indicating that the abnormality in the transmission characteristics has occurred in the image sensor 1211 as the unique message by high-speed data communication for transmitting image data.

Note that the obstacle detection unit 1509 may detect the presence or absence or a possibility of opening or short circuit, that is, disconnection or compression, of the communication path or the physical layer processing unit 1505, and transmit the unique message indicating that the abnormality has occurred in a case where the abnormality has occurred according to the detection result.

Furthermore, the obstacle detection unit 1509 may transmit a message indicating an abnormality as the unique message even in a case where an abnormality occurs due to not only the insertion attack but also any of accidental damage, secular change, temperature change, or the like.

Note that, in a case where no abnormality is detected, the obstacle detection unit 1509 may transmit the unique message including a normality message or may not transmit the unique message.

(Obstacle Detection Processing by Obstacle Detection Unit)

Figure 123:
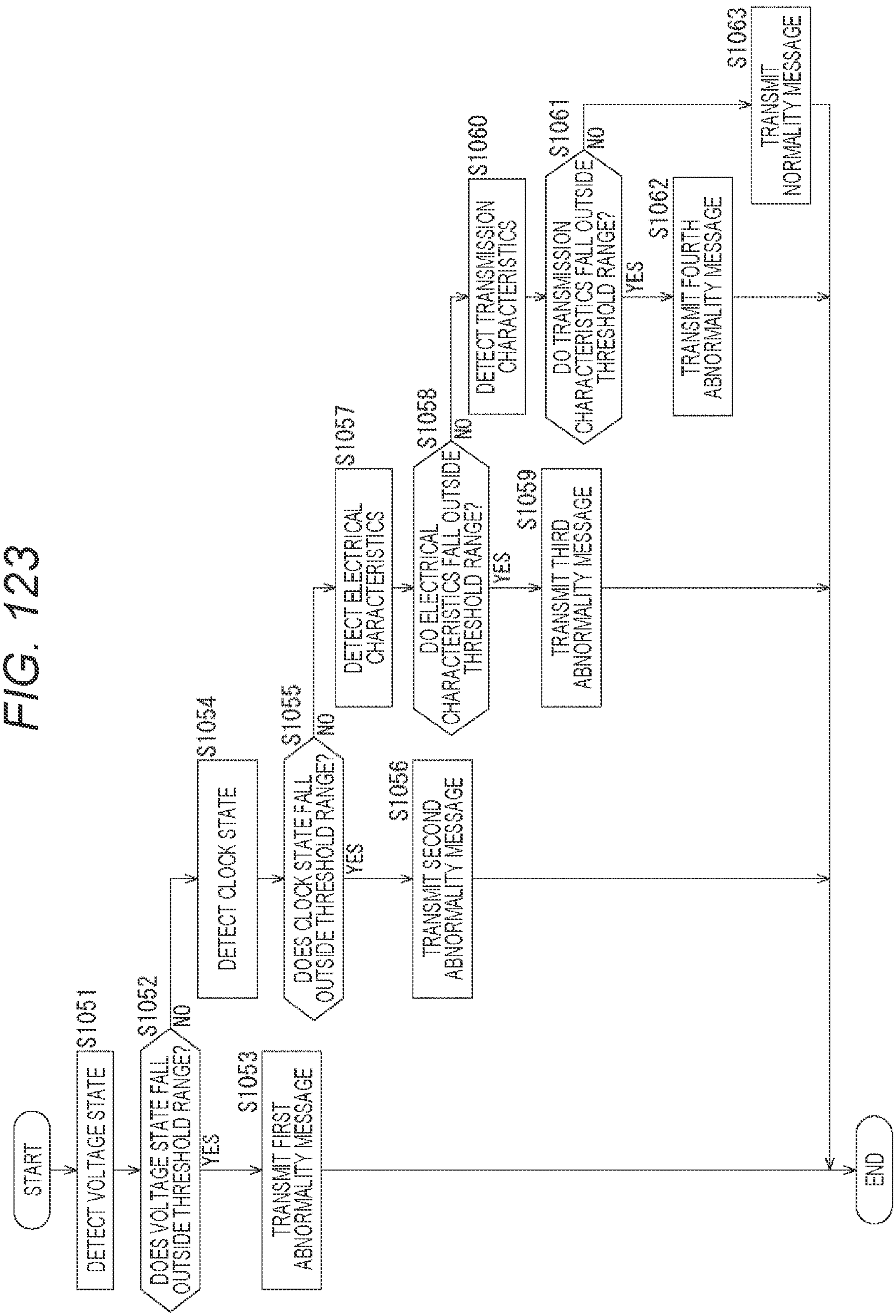

Next, obstacle detection processing by the obstacle detection unit 1509 will be described with reference to a flowchart of FIG. 123.

In step S1051, the obstacle detection unit 1509 detects the voltage state of the physical layer.

In step S1052, the obstacle detection unit 1509 determines whether or not the voltage state of the physical layer is outside a threshold range, that is, whether or not an abnormal change has occurred.

In step S1052, in a case where it is determined that the voltage state of the physical layer is outside the threshold range and an abnormal change has occurred, the processing proceeds to step S1053.

In step S1053, the obstacle detection unit 1509 notifies the application processor 1212 of the unique message including the first abnormality message indicating that the power abnormality or voltage abnormality (for example, voltage amplitude, voltage polarity, or IR drop), or the like has occurred in the image sensor 1211 by high-speed data communication for transmitting image data.

Furthermore, in step S1052, in a case where it is determined that the voltage state of the physical layer is not outside the threshold range, the processing proceeds to step S1054.

In step S1054, the obstacle detection unit 1509 detects the clock state of the physical layer.

In step S1055, the obstacle detection unit 1509 determines whether or not the clock state of the physical layer is outside the threshold range, that is, whether or not an abnormal change has occurred.

In step S1055, in a case where it is determined that the clock state of the physical layer is outside the threshold range and an abnormal change has occurred, the processing proceeds to step S1056.

In step S1056, the obstacle detection unit 1509 notifies the application processor 1212 of the unique message including the second abnormality message indicating that the clock abnormality (for example, frequency, periodicity, the number of times, or jitter of a clock) has occurred by high-speed data communication for transmitting the image data.

Moreover, in step S1055, in a case where it is determined that the clock state of the physical layer is not outside the threshold range, the processing proceeds to step S1057.

In step S1057, the obstacle detection unit 1509 detects the electrical characteristics.

In step S1058, the obstacle detection unit 1509 determines whether or not the electrical characteristics are outside a threshold range, that is, whether or not an abnormal change has occurred.

In step S1058, in a case where it is determined that the electrical characteristics are outside the threshold range and an abnormal change has occurred, the processing proceeds to step S1059.

In step S1059, the obstacle detection unit 1509 notifies the application processor 1212 of the third abnormality message indicating that the abnormality in the electrical characteristics has occurred in the image sensor 1211 as the unique message by high-speed data communication for transmitting image data.

Moreover, in step S1058, in a case where it is determined that an abnormal change has not occurred in the electrical characteristics, the processing proceeds to step S1060.

In step S1060, the obstacle detection unit 1509 detects the transmission characteristics.

In step S1061, the obstacle detection unit 1509 determines whether or not the transmission characteristics are outside a threshold range, that is, whether or not an abnormal change has occurred.

In step S1061, in a case where it is determined that the transmission characteristics are outside the threshold range and an abnormal change has occurred, the processing proceeds to step S1062.

In step S1062, the obstacle detection unit 1509 notifies the application processor 1212 of the fourth abnormality message indicating that the abnormality in the transmission characteristics has occurred in the image sensor 1211 as the unique message by high-speed data communication for transmitting image data.

Moreover, in step S1061, in a case where it is determined that an abnormal change has not occurred in the transmission characteristics, the processing proceeds to step S1063.

In step S1063, the obstacle detection unit 1509 notifies the application processor 1212 of the message indicating that the image sensor 1211 is normal as the unique message by high-speed data communication for transmitting image data.

By the above processing, it becomes possible to notify the application processor 1212 of the unique message including a message indicating that an abnormality has occurred in the case of detecting the presence or absence of the injection attack or the insertion attack, and detecting the injection attack or the insertion attack.

As a result, the application processor 1212 acquires the unique message according to the presence or absence of obstacle by high-speed data communication, thereby promptly and appropriately responding to the unique message.

<Abnormality Detection of Security Unit by Invasion Detection Unit>

Next, abnormality detection of the security unit 1510 by the invasion detection unit 1511 will be described.

The security unit 1510 has a possibility of receiving an analysis attack (power analysis attack or electromagnetic analysis attack) that causes information in the image sensor 1211 to flow out by analyzing power used for the image sensor 1211 or electromagnetic generated from the image sensor 1211, in addition to the injection attack such as disabling or causing a malfunction in some or all operations in the image sensor 1211, or causing false information to flow into or causing information to flow out from the image sensor.

Therefore, the invasion detection unit 1511 detects the presence or absence of an abnormality related to invasion by logically detecting the presence or absence of falsification in the security unit 1510 due to the injection attack or physically detects whether or not an attack object (for example, a probe) necessary for power analysis or electromagnetic analysis exists in the vicinity of the security unit 1510, in addition to the above-described abnormality detection, and transmits the abnormality message as the unique message in a case of detecting the abnormality.

<Abnormality Detection Processing of Security Unit by Invasion Detection Unit>

Figure 124:
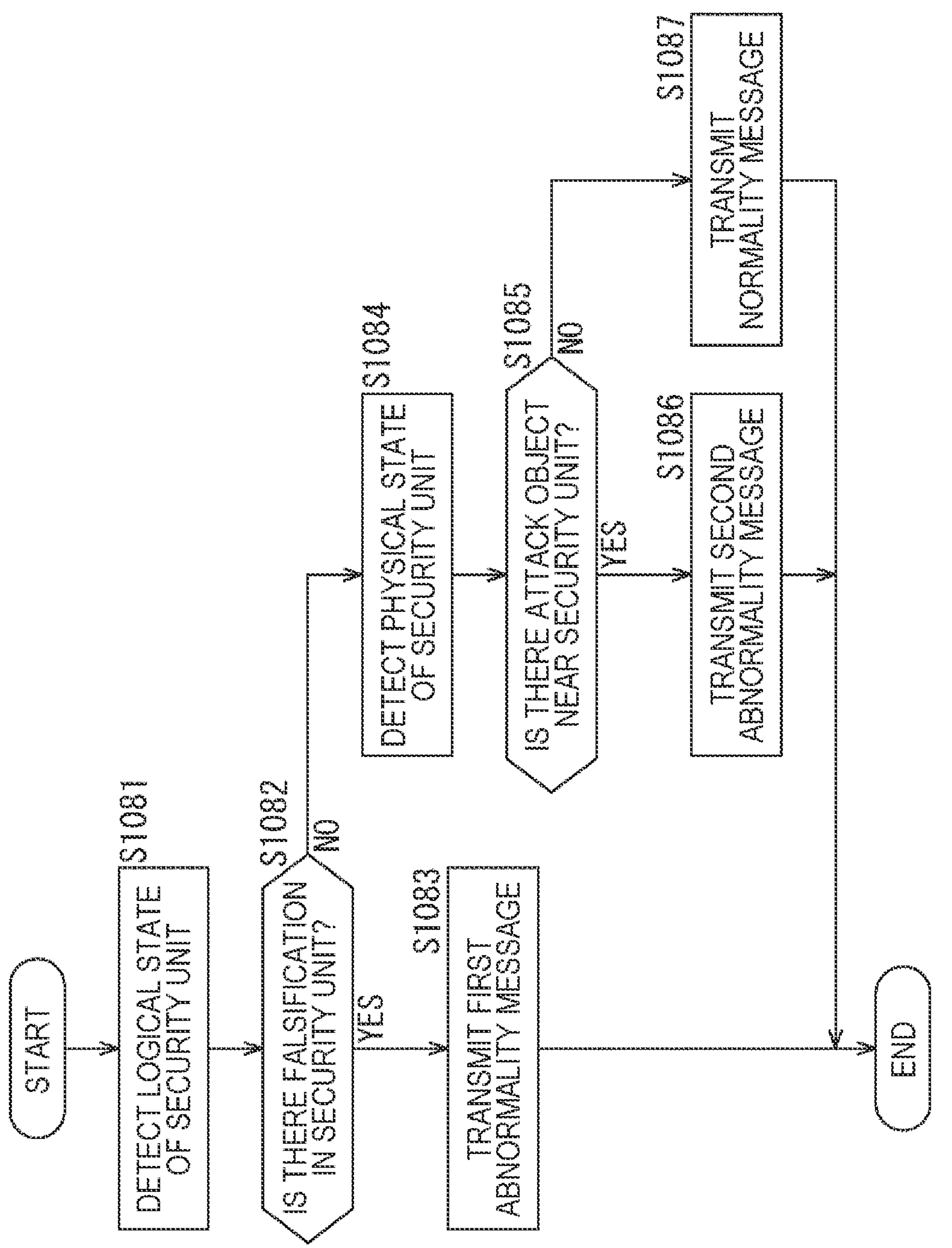

Next, abnormality detection processing of the security unit 1510 by the invasion detection unit 1511 will be described with reference to a flowchart of FIG. 124.

In step S1081, the invasion detection unit 1511 detects information indicating a logical state of the security unit 1510.

In step S1082, the invasion detection unit 1511 determines whether or not falsification has occurred inside the security unit 1510 on the basis of the detected information indicating the logical state of the security unit 1510.

In step S1082, in a case where it is determined that falsification has occurred inside the security unit 1510, the processing proceeds to step S1083.

In step S1083, the invasion detection unit 1511 notifies the application processor 1212 of the first abnormality message indicating that falsification in the security unit 1510 associated with the injection attack has occurred as the unique message by high-speed data communication for transmitting image data.

In step S1082, in a case where it is determined that falsification has not occurred inside the security unit 1510, the processing proceeds to step S1084.

In step S1084, the invasion detection unit 1511 detects information indicating a physical state of the security unit 1510.

In step S1085, the invasion detection unit 1511 determines whether or not an attack object (for example, a probe) necessary for power analysis or electromagnetic analysis exists in the vicinity of the security unit 1510 on the basis of the detected information indicating the physical state of the security unit 1510.

In step S1085, in a case where it is determined that the attack object (for example, a probe) necessary for power analysis or electromagnetic analysis to be used for an analysis attack exists in the vicinity of the security unit 1510, the processing proceeds to step S1086.

In step S1086, the invasion detection unit 1511 notifies the application processor 1212 of the second abnormality message indicating that there is a possibility of receiving the attack object (for example, a probe) necessary for power analysis or electromagnetic analysis exists in the vicinity of the security unit 1510 as the unique message by high-speed data communication for transmitting image data.

In step S1085, in a case where it is determined that the attack object (for example, a probe) necessary for power analysis or electromagnetic analysis does not exist in the vicinity of the security unit 1510, the processing proceeds to step S1087.

In step S1087, the invasion detection unit 1511 notifies the application processor 1212 of the message indicating that the image sensor 1211 is normal as the unique message by high-speed data communication for transmitting image data.

By the above processing, in a case where the invasion such as the presence or absence of the logical falsification of the security unit 1510 associated with the injection attack or the presence or absence of the possibility of the analysis attack is detected, the unique message including a message indicating that an abnormality associated with the invasion has occurred can be notified to the application processor 1212.

As a result, the application processor 1212 acquires the unique message according to the presence or absence of invasion by high-speed data communication, thereby promptly and appropriately responding to the unique message.

<Abnormality Detection by Temperature Detection Unit>

Next, abnormality detection by the temperature detection unit 1512 will be described.

There is a temperature attack that causes the image sensor 1211 to malfunction such that the internal temperature of the image sensor 1211 or the external temperature of the image sensor 1211, the internal temperature of the communication path, or the external temperature of the communication path is intentionally forced to cause the operation guarantee temperature of the image sensor 1211 or the communication path to fall outside the range.

Therefore, the temperature detection unit 1512 detects the presence or absence of the temperature attack on the image sensor 1211 and the communication path.

That is, since the image sensor 1211 has the upper limit value (first threshold) and the lower limit value (second threshold) of the operation guarantee temperature, when the temperature of the image sensor 1211 is higher than the first threshold (upper limit value) or lower than the second threshold (lower limit value), the temperature detection unit 1512 notifies the application processor 1212 of the message indicating that an abnormality has occurred as the unique message.

Note that in a case where the temperature detected by the temperature detection unit 1512 is within the operation guarantee range, the temperature detection unit 1512 may transmit the unique message indicating normality or may not transmit the unique message. Furthermore, instead of the abnormality message or the normality message, the detected value itself of the temperature may be transmitted as the unique message.

Moreover, a plurality of the temperature detection units 1512 may be provided for functional safety, and the unique message indicating an abnormality may be transmitted in a case where each detection result falls outside the range of each threshold. In that case, even if an abnormality occurs in some of the temperature detection units 1512, it can be handled.

Furthermore, the application processor 1212 that receives the unique message can grasp a range and a position where the abnormality has occurred in the temperature detection unit 1512 by analyzing a unique message group acquired a plurality of times.

(Abnormality Detection Processing by Temperature Detection Unit)

Figure 125:
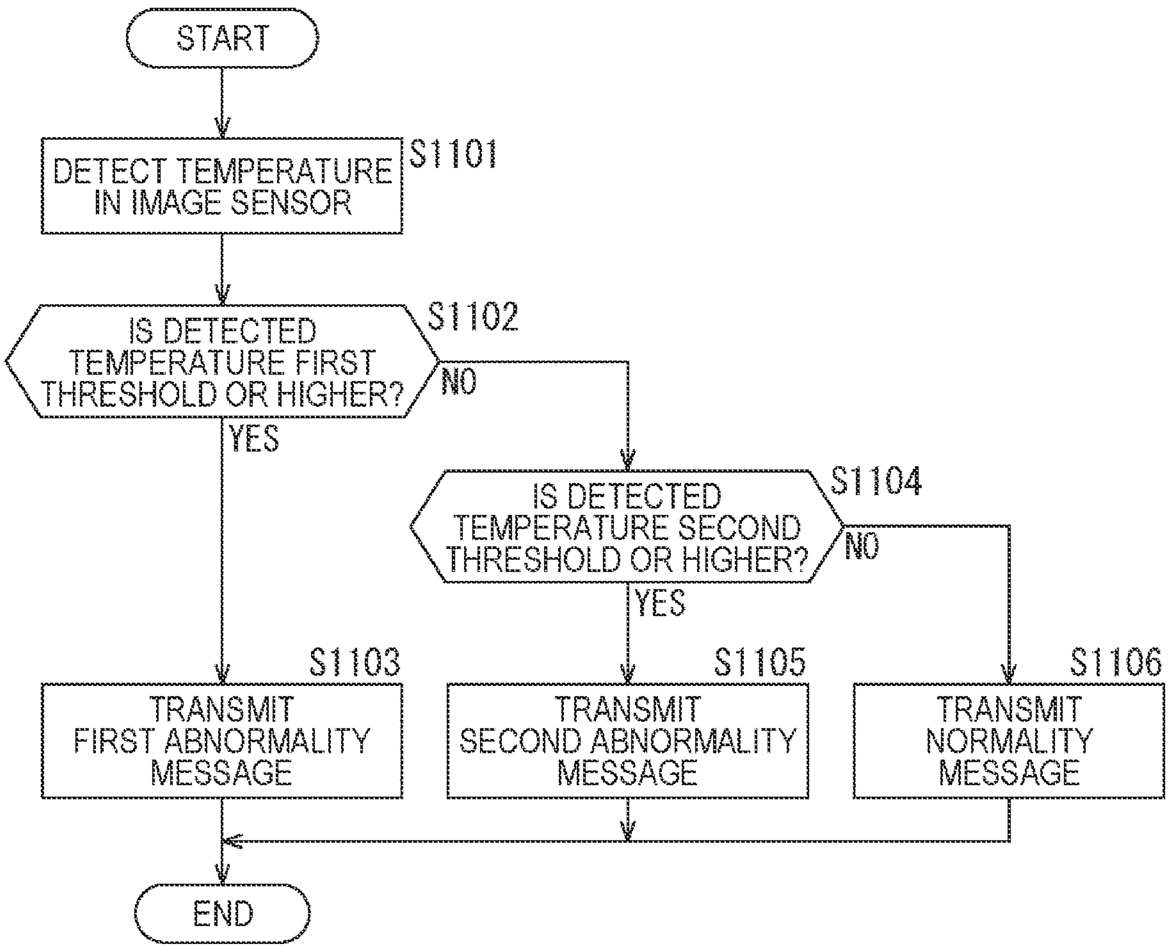

Next, abnormality detection processing by the temperature detection unit 1512 will be described with reference to the flowchart of FIG. 125.

In step S1101, the temperature detection unit 1512 detects the temperature in the image sensor 1211.

In step S1102, the temperature detection unit 1512 determines whether or not the detected temperature of the image sensor 1211 is equal to or higher than the first threshold (upper limit value) (is higher than the first threshold).

In step S1102, in a case where it is determined that the detected temperature of the image sensor 1211 is equal to or higher than the first threshold (upper limit value), the processing proceeds to step S1103.

In step S1103, the temperature detection unit 1512 notifies the application processor 1212 of the unique message including the first abnormality message indicating that the image sensor 1211 is at the operation guarantee temperature or higher and the abnormality has occurred by high-speed data communication for transmitting image data.

Furthermore, in step S1102, in a case where it is determined that the detected temperature of the image sensor 1211 is not equal to or higher than the first threshold (upper limit value), the processing proceeds to step S1104.

In step S1104, the temperature detection unit 1512 determines whether or not the detected temperature of the image sensor 1211 is equal to or lower than the second threshold (lower limit value) (is lower than the second threshold).

In step S1104, in a case where it is determined that the detected temperature of the image sensor 1211 is equal to or lower than the second threshold (lower limit value), the processing proceeds to step S1105.

In step S1105, the temperature detection unit 1512 notifies the application processor 1212 of the unique message including the second abnormality message indicating that the image sensor 1211 is at the operation guarantee temperature or lower and that the abnormality has occurred by high-speed data communication for transmitting image data.

In step S1104, in a case where it is determined that the detected temperature of the image sensor 1211 is not equal to or lower than the second threshold (lower limit value), the processing proceeds to step S1106.

In step S1106, the temperature detection unit 1512 transmits, to the application processor 1212, the unique message including the normality message indicating that the temperature of the image sensor 1211 is within the operation guarantee temperature and no abnormality has occurred.

With the above processing, in a case where a temperature attack on the image sensor 1211 occurs, a notification is made by high-speed data communication for transmitting image data, and thus the application processor 1212 can implement a prompt and appropriate response.

<Detailed Configuration Example of Application Processor that Detects Presence or Absence of Abnormality on Basis of State and Characteristics of Image Sensor>

In the above, an example in which the image sensor 1211 detects the presence or absence of its own abnormality and transmits the unique message corresponding to the detection result to the application processor 1212 has been described.

However, the application processor 1212 may acquire the state and characteristics of the image sensor 1211 and detect the presence or absence of an abnormality.

Figure 126:
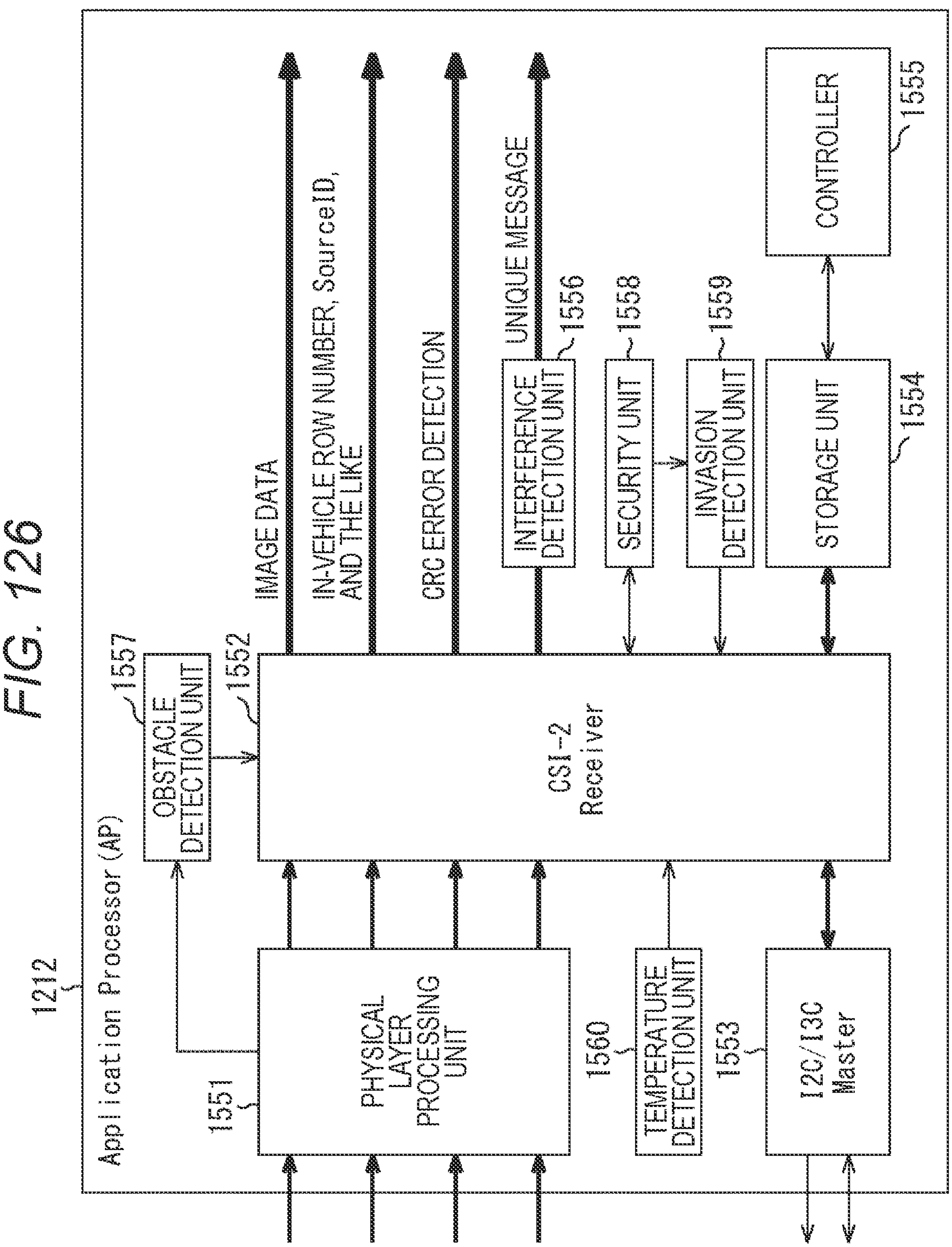

FIG. 126 illustrates a configuration example of the application processor 1212 that acquires the state and characteristics of the image sensor 1211 and detects the presence or absence of an abnormality.

The application processor 1212 in FIG. 126 includes a physical layer processing unit 1551, an extension mode-compatible CSI-2 reception circuit 1552, an I2C/I3C master 1553, a storage unit 1554, a controller 1555, an interference detection unit 1556, an obstacle detection unit 1557, a security unit 1558, an invasion detection unit 1559, and a temperature detection unit 1560.

Note that all the interference detection unit 1556, the obstacle detection unit 1557, the security unit 1558, the invasion detection unit 1559, and the temperature detection unit 1560 execute processing according to the state and characteristics supplied from the image sensor 1211. However, basic functions are similar to those of the interference detection unit 1508, the obstacle detection unit 1509, the security unit 1510, the invasion detection unit 1511, and the temperature detection unit 1512 in FIG. 118, respectively.

Furthermore, the physical layer processing unit 1551, the extension mode-compatible CSI-2 reception circuit 1552, the I2C/I3C master 1553, the storage unit 1554, the security unit 1558, and the controller 1555 are configured similarly to the blocks corresponding to the physical layer processing unit 1321, the extension mode-compatible CSI-2 reception circuit 1322, the I2C/I3C master 1323, the storage unit 1324, the security unit 1326, and the controller 1327 in FIG. 77, and detailed description thereof is omitted.

The interference detection unit 1556 determines whether or not the image sensor 1211 or the image data is normal or abnormal by comparing any one of the light receiving waveform pattern, the light receiving spot pattern, the light receiving dot pattern, the light receiving locus pattern, or the like with the storage pattern stored in advance in the storage unit 1554 on the basis of the image data supplied from the image sensor 1211 via the extension mode-compatible CSI-2 reception circuit 1552.

The interference detection unit 1556 may output a determination result as to whether the image sensor 1211 or the image data is normal or abnormal to a subsequent stage as the unique message.

Furthermore, the interference detection units 1508 and 1556 may be provided in the image sensor 1211 and the application processor 1212, respectively. In a case where both the interference detection units 1508 and 1556 are respectively provided, for example, it is possible to double determine the presence or absence of an abnormality. Therefore, even if either the interference detection unit 1508 in the image sensor 1211 or the interference detection unit 1556 in the application processor 1212 is attacked, it is possible to detect the presence or absence of interference with the image sensor 1211.

The obstacle detection unit 1557 is electrically directly or indirectly connected to the communication path or the physical layer processing unit 1551 in the application processor 1212.

Furthermore, the obstacle detection units 1509 and 1557 may be provided in the image sensor 1211 and the application processor 1212, respectively.

For example, the image sensor 1211 measures its own electrical characteristics and transmits the electrical characteristics as the unique message to the application processor 1212 by high-speed data communication for transmitting image data.

The obstacle detection unit 1557 recognizes the electrical characteristics in the communication path by calibration processing by measuring the electrical characteristics in "the image sensor 1211+the communication path (physical layer) ".

Since the hardware trojan can be inserted into the communication path (for example, in a wire), the presence or absence of the hardware trojan can be detected with high accuracy by detecting a change in the electrical characteristics in the communication path.

Similarly, the security unit 1558, the invasion detection unit 1559, and the temperature detection unit 1560 may be provided not only in the application processor 1212 but also in the image sensor 1211.

That is, the security units 1510 and 1558, the invasion detection units 1511 and 1559, and the temperature detection units 1512 and 1560 may be provided in the image sensor 1211 and the application processor 1212, respectively.

Any of the interference detection unit 1556, the obstacle detection unit 1557, the security unit 1558, the invasion detection unit 1559, and the temperature detection unit 1560 may be electrically directly connected to a memory.

This memory may be electrically directly connected to the above-described register, and any of the interference detection unit 1556, the obstacle detection unit 1557, the security unit 1558, the invasion detection unit 1559, and the temperature detection unit 1560 may be electrically directly connected to the register.

The memory may be a memory protected from either leakage or falsification of information in the memory. Here, the memory and the register are collectively referred to as the storage unit 1554. Any of the interference detection unit 1556, the obstacle detection unit 1557, the security unit 1558, the invasion detection unit 1559, and the temperature detection unit 1560 can determine that any of continuous interference, continuous obstacle, and continuous invasion has been received in a short time or that there has been a temperature load for a long time by storing a plurality of detection results in the storage unit 1554, for example, and an abnormality message indicating such a status may be transmitted.

Note that any of the storage pattern, the threshold value, the first threshold, or the second threshold may be read from the storage unit 1554. Furthermore, the application processor 1212 may write any of the storage pattern, the threshold, the first threshold, or the second threshold into the storage unit 1507 in the image sensor 1211 via at least I2C or I3C.

As described above, the detection result is periodically stored in the protected storage unit 1507 outside the application processor 1212, for example, in the image sensor 1211. Therefore, when an accident occurs in the application processor 1212, it becomes possible to easily specify the cause of occurrence of the accident by analyzing the protected storage unit 1507 in the external image sensor 1211. Similarly, the detection result is periodically stored outside the image sensor 1211, for example, in the protected storage unit 1554 in the application processor 1212. Therefore, when an accident occurs in the image sensor 1211, it becomes possible to easily specify the cause of occurrence of the accident by analyzing the protected storage unit 1554 in the external application processor 1212.

Any of the interference detection unit 1556, the obstacle detection unit 1557, the security unit 1558, the invasion detection unit 1559, and the temperature detection unit 1560 may be electrically directly connected to the extension mode-compatible CSI-2 reception circuit 1552, and each detection result may be directly transmitted from the extension mode-compatible CSI-2 reception circuit 1552.

Furthermore, any of the interference detection unit 1556, the obstacle detection unit 1557, the security unit 1558, the invasion detection unit 1559, and the temperature detection unit 1560 may be electrically indirectly connected to the extension mode-compatible CSI-2 reception circuit 1552 via the storage unit 1554 or the like, and each detection result may be indirectly transmitted from the extension mode-compatible CSI-2 reception circuit 1552.

Moreover, the unique message may be directly output from the extension mode-compatible CSI-2 reception circuit 1552, or may be indirectly output from the extension mode-compatible CSI-2 reception circuit 1552 via the storage unit 1554 or the like.

Furthermore, any of the interference detection unit 1556, the obstacle detection unit 1557, the security unit 1558, the invasion detection unit 1559, and the temperature detection unit 1560 may be electrically directly connected to the communication path, or may be electrically indirectly connected to the communication path via the storage unit 1554 or the like.

Note that the communication path used at least for high-speed data transmission is considered to have higher sensitivity to attack detection because the communication path is superior in high-frequency characteristics to the communication path used only for low-speed command transmission.

Furthermore, in a case where power is supplied to the image sensor 1211 via a part or whole of the communication path used for high-speed data transmission, the operation of the image sensor 1211 and an image data stream can be invalidated only by at least temporarily invalidating the power supply.

For example, a part or whole of the communication path used for high-speed data transmission is replaced with a communication path into which a hardware trojan is inserted, and the hardware trojan is simply activated wirelessly or with a timer, so that an accident of the mobile device (propulsion device) is easily induced. That is, the obstacle detection unit 1557 is more suitable for the physical layer used at least for high-speed data transmission than the communication path specialized for low-speed command transmission, and is particularly suitable for the physical layer also used for power transmission.

Any of the interference detection units 1508 and 1556, the obstacle detection units 1509 and 1557, the security units 1510 and 1558, the invasion detection units 1511 and 1559, and the temperature detection units 1512 and 1560 may be included in another block.

For example, at least a part of the interference detection unit 1508 may be included in any of the pixel 1501, the AD converter 1502, the image processing unit 1503, the storage unit 1507, or the extension mode-compatible CSI-2 transmission circuit 1504.

Furthermore, for example, at least a part of the interference detection unit 1556 may be included in either the extension mode-compatible CSI-2 reception circuit 1552 or the storage unit 1554.

Furthermore, for example, at least a part of the obstacle detection unit 1509 may be included in any of the physical layer processing unit 1505, the storage unit 1507, or the extension mode-compatible CSI-2 transmission circuit 1504.

Furthermore, for example, at least a part of the obstacle detection unit 1557 may be included in either the extension mode-compatible CSI-2 reception circuit 1552 or the storage unit 1554.

Moreover, for example, at least a part of any of the security unit 1510, the invasion detection unit 1511, or the temperature detection unit 1512 may in either the storage unit 1507 or the extension mode-compatible CSI-2 transmission circuit 1504.

Furthermore, for example, at least a part of any of the security unit 1558, the invasion detection unit 1559, or the temperature detection unit 1560 may be included in either the storage unit 1554 or the extension mode-compatible CSI-2 reception circuit 1552.

Furthermore, any of the pixel 1501, the AD converter 1502, the image processing unit 1503, the physical layer processing unit 1505, the extension mode-compatible CSI-2 transmission circuit 1504, the extension mode-compatible CSI-2 reception circuit 1552, the storage units 1507 and 1554, the I2C/I3C slave 1506, the I2C/I3C master 1553, the interference detection units 1508 and 1556, the obstacle detection units 1509 and 1557, the security units 1510 and 1558, the invasion detection units 1511 and 1559, and the temperature detection units 1512 and 1560 may be directly or indirectly controlled by a controller or a control unit of the mobile device (propulsion device) or a new control unit (not illustrated).

<Processing of Detecting Presence or Absence of Abnormality of Image Sensor by Application Processor>

Next, processing of detecting the presence or absence of an abnormality of the image sensor by the application processor will be described with reference to the flowcharts of FIGS. 127 and 128.

Figure 127:
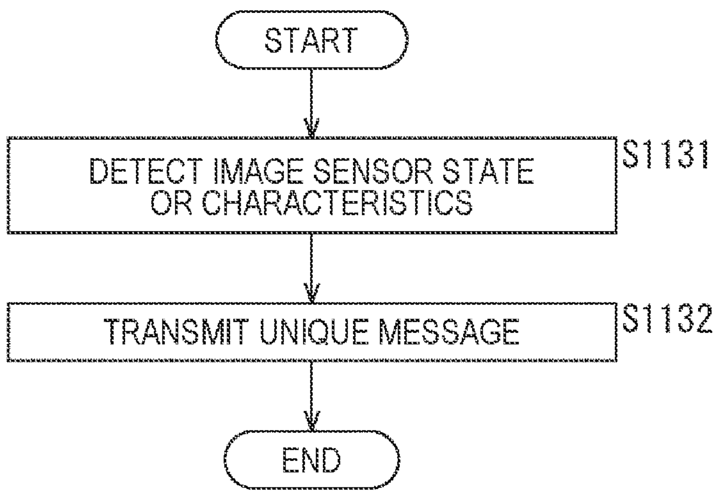
Figure 128:
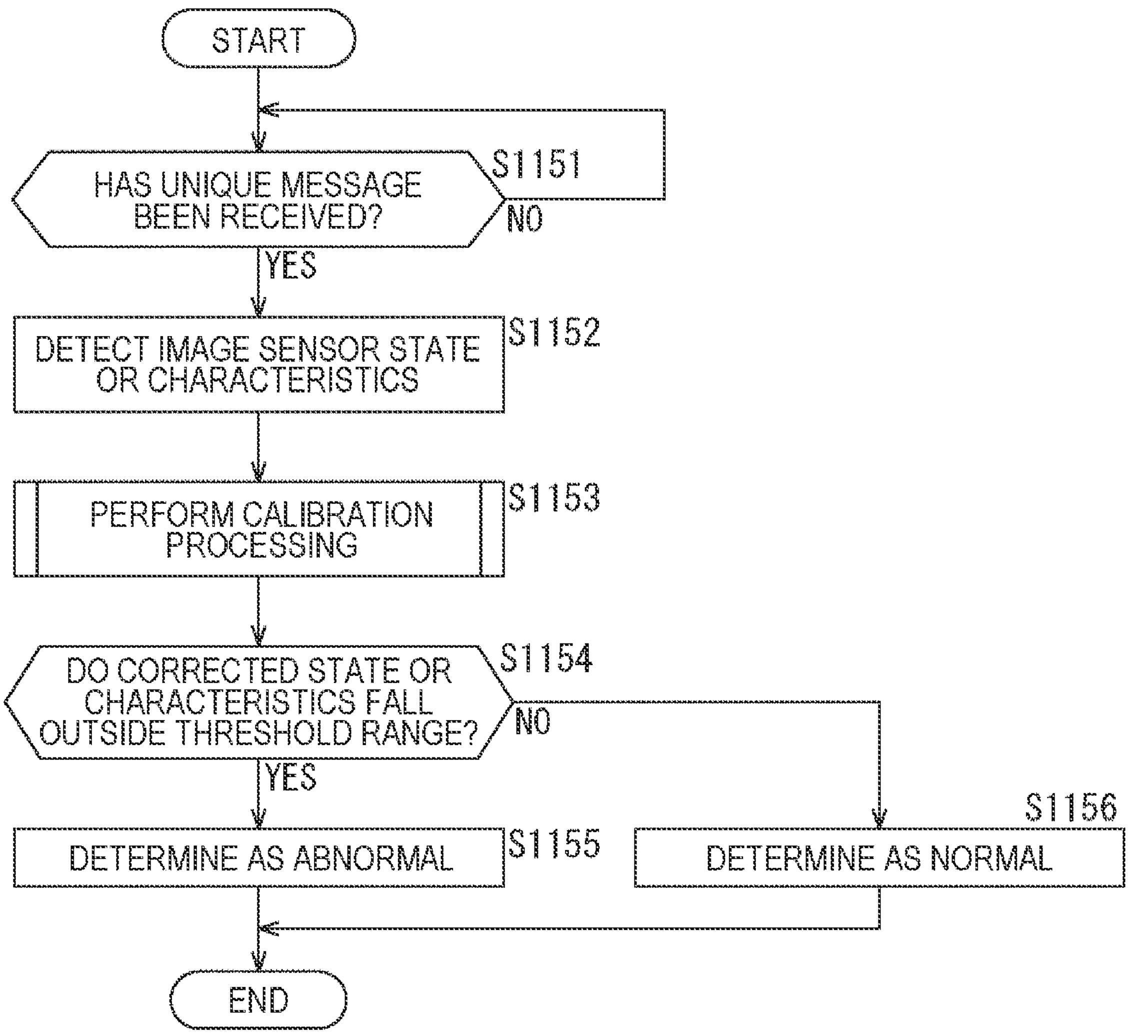

Note that the flowchart of FIG. 127 represents processing of the image sensor 1211, and the flowchart of FIG. 128 represents processing of the application processor 1212.

In step S1131 (FIG. 127), the image sensor 1211 detects its own state or characteristics required to determine the presence or absence of an abnormality.

More specifically, the state or characteristics required when each of the interference detection unit 1508, the obstacle detection unit 1509, the invasion detection unit 1511, and the temperature detection unit 1512 in the image sensor 1211 described above detects the presence or absence of an abnormality in the image sensor 1211.

Note that, in this processing, only various states or characteristics are detected, and the presence or absence of an abnormality is not determined.

In step S1132, the image sensor 1211 transmits the detected its own state or characteristics as the unique message by high-speed data communication for transmitting image data.

More specifically, the state or characteristics required when each of the interference detection unit 1508, the obstacle detection unit 1509, the invasion detection unit 1511, and the temperature detection unit 1512 detects the presence or absence of an abnormality in the image sensor 1211 is transmitted as the unique message by high-speed data communication for transmitting image data.

Note that the processing performed by the interference detection unit 1508, the obstacle detection unit 1509, the invasion detection unit 1511, and the temperature detection unit 1512 of the image sensor 1211 as described above is hereinafter simply expressed in a simplified manner such that the image sensor 1211 detects its own state or characteristics, and the image sensor 1211 transmits the detected its own state or characteristics to the application processor 1212.

In step S1151 (FIG. 128), the application processor 1212 determines whether or not the unique message transmitted from the image sensor 1211 has been received.

More specifically, whether or not the interference detection unit 1556, the obstacle detection unit 1557, the invasion detection unit 1559, or the temperature detection unit 1560 of the application processor 1212 has received the unique message from at least any of the interference detection unit 1508, the obstacle detection unit 1509, the invasion detection unit 1511, or the temperature detection unit 1512 of the image sensor 1211 is determined. Note that whether or not any of the security unit 1558, the controller 1555, the extension mode-compatible CSI-2 reception circuit 1552, the physical layer processing unit 1551, or the like has received the unique message from at least any of the interference detection unit 1508, the obstacle detection unit 1509, the invasion detection unit 1511, or the temperature detection unit 1512 of the image sensor 1211 may be determined.

In step S1151, in a case where it is determined that the unique message has been received, the processing proceeds to step S1152.

In step S1152, the application processor 1212 detects the state or characteristics of the image sensor 1211 transmitted as the unique message.

More specifically, at least any of the interference detection unit 1556, the obstacle detection unit 1557, the invasion detection unit 1559, or the temperature detection unit 1560 of the application processor 1212 detects the state or characteristics for detecting each abnormality included in the received unique message.

In step S1153, the application processor 1212 corrects the detected state or characteristics of the image sensor 1211 by applying calibration processing.

More specifically, at least any of the interference detection unit 1556, the obstacle detection unit 1557, the invasion detection unit 1559, or the temperature detection unit 1560 of the application processor 1212 applies the calibration processing to the detected state or characteristics to correct the detected state or characteristics. Note that any of the security unit 1558, the controller 1555, the extension mode-compatible CSI-2 reception circuit 1552, the physical layer processing unit 1551, or the like may apply the calibration processing to the detected state or characteristics to correct the detected state or characteristics.

In step S1154, the application processor 1212 determines whether or not the state or characteristics of the image sensor 1211 corrected by the calibration processing falls outside the threshold range, which is regarded as normal.

More specifically, at least any of the interference detection unit 1556, the obstacle detection unit 1557, the invasion detection unit 1559, or the temperature detection unit 1560 of the application processor 1212 determines whether or not the state or characteristics corrected by the calibration processing falls outside the threshold range that is regarded as normal. Note that any of the security unit 1558, the controller 1555, the extension mode-compatible CSI-2 reception circuit 1552, the physical layer processing unit 1551, or the like may determine whether or not the state or characteristics corrected by the calibration processing falls outside the threshold range that is regarded as normal. Note that specific processing regarding the determination as to whether or not each state or characteristics falls outside the threshold range that is regarded as normal is the processing described with reference to the flowcharts of FIG. 119 and FIGS. 122 to 125.

In step S1154, in a case where it is determined that the state or characteristics falls outside the threshold range that is regarded as normal, the processing proceeds to step S1155.

In step S1155, the application processor 1212 considers that the image sensor 1211 is abnormal.

Furthermore, in step S1154, in a case where it is determined that the state or characteristics does no fall outside the threshold range that is regarded as normal, the processing proceeds to step S1156.

In step S1156, the application processor 1212 considers that the image sensor 1211 is normal.

That is, in a case where at least any of the security unit 1558, the controller 1555, the extension mode-compatible CSI-2 reception circuit 1552, the physical layer processing unit 1551, the interference detection unit 1556, the obstacle detection unit 1557, the invasion detection unit 1559, or the temperature detection unit 1560 of the application processor 1212 determines that the state or characteristics corrected by the calibration processing falls outside the threshold range that is regarded as normal, the image sensor 1211 is regarded as abnormal, and in a case where it is determined that the state or characteristics does not fall outside the threshold range, the image sensor 1211 is regarded as normal.

By the above processing, the application processor 1212 becomes also able to determine the presence or absence of an abnormality in the image sensor 1211, and even if an abnormality occurs in the image sensor 1211, the application processor 1212 can quickly and appropriately respond.

Note that the above-described processing of determining the presence or absence of an abnormality of the image sensor 1211 by the interference detection unit 1556, the obstacle detection unit 1557, the invasion detection unit 1559, and the temperature detection unit 1560 of the application processor 1212 is simply referred to as processing or abnormality diagnosis (processing) in which the application processor 1212 determines the presence or absence of an abnormality of the image sensor 1211 on the basis of the state or characteristics of the image sensor 1211. Note that the application processor 1212 may detect the presence or absence of an abnormality without acquiring the state and characteristics of the image sensor 1211. That is, each of the interference detection unit 1556, the obstacle detection unit 1557, the invasion detection unit 1559, and the temperature detection unit 1560 of the application processor 1212 may detect the state or characteristics required when determining the presence or absence of an abnormality in the application processor 1212 and determine the presence or absence of an abnormality.

<Example in Which High-speed Data Transmission of Unique Message is Executed Without Hindering High-speed Data Transmission of Image Data>

In the above description, it is assumed that the unique message is transmitted at high speed of image data. However, if the high speed data transmission is performed without considering transmission timing, there is a possibility that the high speed data transmission of the image data is hindered.

Therefore, an example of implementing the high-speed data transmission of the unique message without hindering the high-speed data transmission of image data will be described.

To implement the high-speed data transmission of the unique message without hindering the high-speed data transmission of image data, it is necessary to perform transmission in accordance with transmission timing of various data of the high-speed data transmission of the image data.

Therefore, the unique message needs to be transmitted within a period from the frame start to the frame end or within a period from the frame end to the frame start (frame blanking period) when the image data is transmitted.

Figure 129:
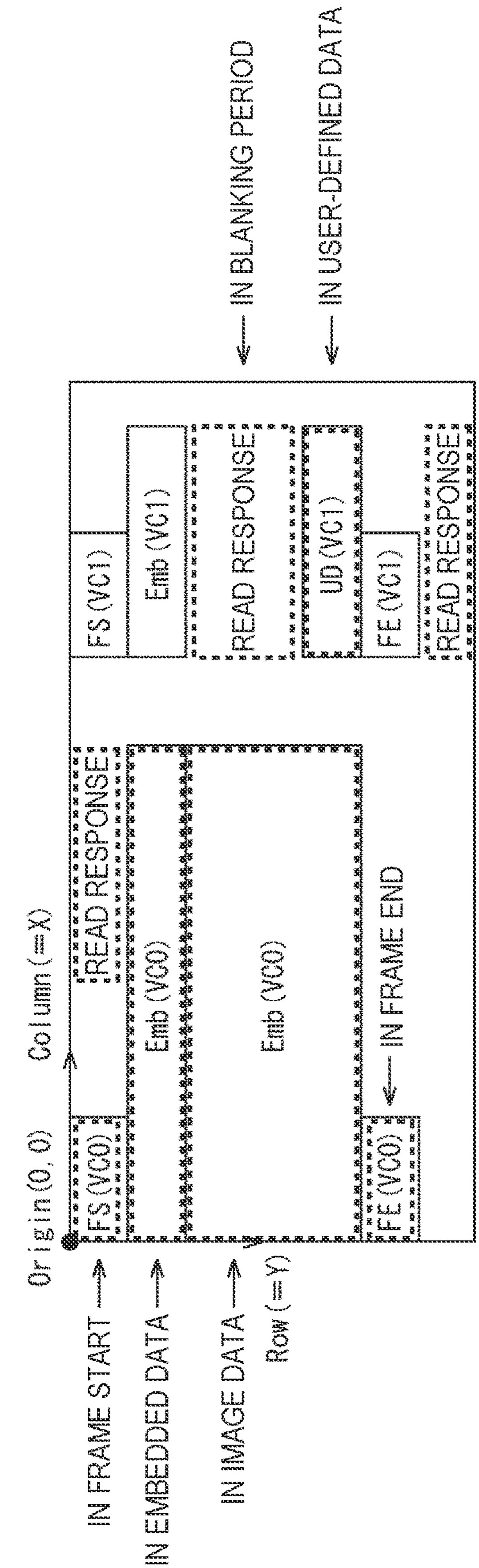

Here, the period from the frame start to the frame end in which the unique message can be transmitted is, for example, any of in the frame start, in the embedded data, in the image data, in the non-image data (read response and user-defined data), in the frame end, and in the line blanking period, as illustrated in FIG. 129. For example, in a case where a CCI channel is allocated to VC0, VC0 in FIG. 129 may be replaced with VC1, and VC1 in FIG. 129 may be replaced with VC2.

Note that, hereinafter, an example in which the high-speed data transmission of the image data and the high-speed data transmission of the unique message are executed in series instead of in parallel will be described. Note that, in a case where the communication path is different between the high-speed data transmission of the image data and the transmission of the unique message (high-speed data transmission or low-speed command transmission), the transmissions may be executed in parallel.

Furthermore, since the high-speed data transmission and the low-speed command transmission can be separated in frequency by a filter, part or whole of the transmissions may be duplicated (executed in parallel) as long as power consumption is not a cause for concern.

Moreover, the above-described processing of detecting the presence or absence of its own abnormality by the image sensor 1211 and the processing of detecting the presence or absence of the abnormality of the image sensor 1211 by the application processor 121 on the basis of the state or characteristics from the image sensor 1211 will be hereinafter referred to as abnormality diagnosis (processing) by the image sensor 1211 and abnormality diagnosis (processing) by the application processor 1212, respectively.

Here, regarding the abnormality diagnosis (processing) in the image sensor 1211, in the case where the image sensor 1211 determines the presence or absence of an abnormality on the basis of its own state or characteristics, the series of processing in which the image sensor 1211 determines the presence or absence of its own abnormality is the abnormality diagnosis (processing).

Meanwhile, in the case where the abnormality diagnosis (processing) of the image sensor 1211 is performed by the application processor 1212 on the basis of the state or characteristics of the image sensor 1211, the abnormality diagnosis (processing) in the image sensor 1211 is processing of only detecting its own state or characteristics (in which the presence or absence of an abnormality diagnosis is not determined).

Furthermore, the abnormality diagnosis performed at a predetermined time interval or a predetermined operation interval is referred to as periodical abnormality diagnosis, and the abnormality diagnosis performed at the beginning of processing is referred to as initial abnormality diagnosis.

The unique message that is a result of the periodical abnormality diagnosis may be stored in at least a part of the embedded data indicating a vendor-specific code (Vendor specific), a reserved code (Reserved for future use), or a code newly defined as the unique message from the reserved code, and transmitted.

Furthermore, the unique message may be stored in a newly defined packet and transmitted, or may be stored in a user-defined area packet or a reserved area packet and transmitted.

For example, a part or whole of the reserved area in the extended packet header may be newly defined as the unique message. Furthermore, for example, a part or whole of the user-defined area (for example, User defined metadata) of the extended packet header may be newly defined as the unique message.

Furthermore, for example, a part or whole of each of the already defined extended packet header and extended packet footer may be diverted as the unique message.

Note that the unique message stored in the extended packet header has higher immediacy than that stored in the extended packet footer (the abnormality can be immediately recognized in the processing of the mobile device). The unique message may be a part or whole of the extended packet footer ePF1 or ePF0. In a case where the unique message is stored in the extended packet header or the extended packet footer, there is also an effect of obtaining backward compatibility.

<Processing of Case in Which High-speed Data Transmission of Unique Message is Executed Without Hindering High-speed Data Transmission of Image Data>

Figure 130:
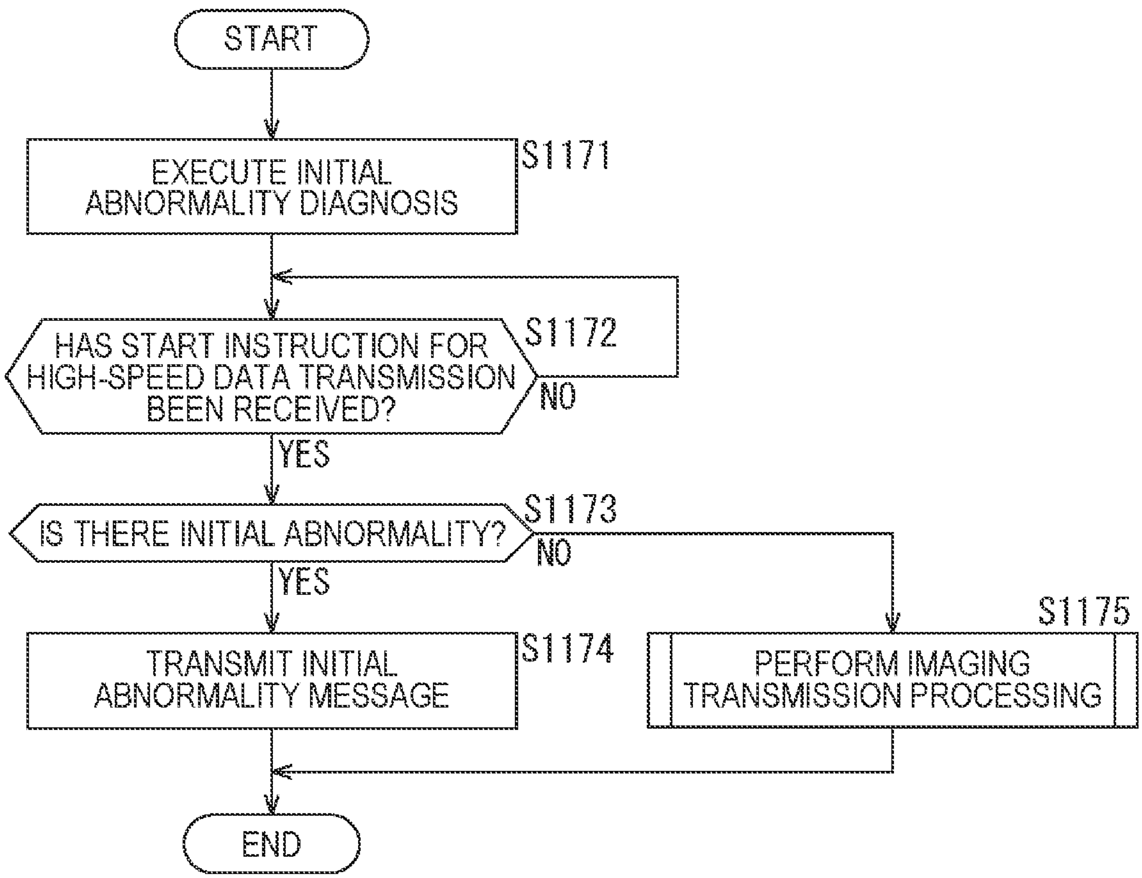

Next, processing of the image sensor 1211 in the case of executing the high-speed data transmission of the unique message without hindering the high-speed data transmission of image data will be described with reference to the flowchart of FIG. 130.

In step S1171, the image sensor 1211 executes the initial abnormality diagnosis.

In step S1172, (the extension mode-compatible CSI-2 transmission circuit 1504 of) the image sensor 1211 determines whether or not a start instruction for the high-speed data transmission has been received, and the processing waits until it is determined that the start instruction for the high-speed data transmission has been received. Then, in step S1172, in a case where the extension mode-compatible CSI-2 transmission circuit 1504 determines that the start instruction for the high-speed data transmission has been received, the processing proceeds to step S1173.

In step S1173, the image sensor 1211 determines whether or not an initial abnormality has occurred in the image sensor 1211 by the initial abnormality diagnosis.

In step S1173, in a case where it is determined that there is the initial abnormality, the processing proceeds to step S1174.

In step S1174, (the extension mode-compatible CSI-2 transmission circuit 1504 of) the image sensor 1211 transmits an initial abnormality message.

That is, in this case, imaging transmission processing is not performed thereafter.

On the other hand, in step S1173, in a case where it is determined that no initial abnormality has occurred, the processing proceeds to step S1175.

In step S1175, the image sensor 1211 executes the imaging transmission processing, and the image data captured by the pixel 1501, AD-converted by the AD converter 1502, and image-processed by the image processing unit 1503 is supplied to the extension mode-compatible CSI-2 transmission circuit 1504 and transmitted to the application processor 1212.

<Imaging Transmission Processing (Part 1)>

Here, the imaging transmission processing (part 1) will be described with reference to the flowchart of FIG. 131.

In step S1191, the pixel 1501 starts imaging, and the image data output from the pixel 1501 is supplied to the extension mode-compatible CSI-2 transmission circuit 1504 via the AD converter 1502 and the image processing unit 1503.

In step S1192, the image sensor 1211 executes the periodical abnormality diagnosis.

In step S1193, the extension mode-compatible CSI-2 transmission circuit 1504 transmits the frame start of a virtual channel.

In step S1194, the extension mode-compatible CSI-2 transmission circuit 1504 transmits the embedded data of the virtual channel. At this time, the extension mode-compatible CSI-2 transmission circuit 1504 includes the unique message serving as a diagnosis result of the periodical abnormality diagnosis in the embedded data of the virtual channel and transmitted.

In step S1195, the extension mode-compatible CSI-2 transmission circuit 1504 transmits the image data of the virtual channel.

In step S1196, the extension mode-compatible CSI-2 transmission circuit 1504 determines whether or not the transmission of the image data for one frame has been completed.

In step S1196, in a case where the extension mode-compatible CSI-2 transmission circuit 1504 determines that the transmission of the image data for one frame has not been completed, the processing returns to step S1195, and similar processing is repeatedly performed thereafter. On the other hand, in step S1196, in a case where the extension mode-compatible CSI-2 transmission circuit 1504 determines that the transmission of the image data for one frame has been completed, the processing proceeds to step S1197.

In step S1197, the extension mode-compatible CSI-2 transmission circuit 1504 transmits the frame end of the virtual channel.

In step S1198, the extension mode-compatible CSI-2 transmission circuit 1504 determines whether or not the end instruction for the high-speed data transmission has been received.

In step S1198, in a case where the extension mode-compatible CSI-2 transmission circuit 1504 determines that the end instruction for the high-speed data transmission has not been received, the processing returns to step S1191, and similar processing is repeated thereafter. On the other hand, in step S1198, in a case where the extension mode-compatible CSI-2 transmission circuit 1504 determines that the end instruction for the high-speed data transmission has been received, the processing is terminated.

The imaging transmission processing may be continuously executed until the end instruction for the high-speed data transmission is received, or may be executed each time the start instruction for the high-speed data transmission is received.

With the above processing, it becomes possible to transmit the unique message at high speed without hindering the high-speed data transmission of the image data.

<Application Example of Imaging Transmission Processing>

In the above description, an example in which the imaging transmission processing is terminated in the case where the end instruction for the high-speed data transmission has been received has been described, but the processing may be terminated in a case where the start instruction for the high-speed data transmission has not been received.

The flowchart of FIG. 132 illustrates an application example of the imaging transmission processing in which the processing is terminated in the case where the start instruction for the high-speed data transmission has not been received.

Figure 131:
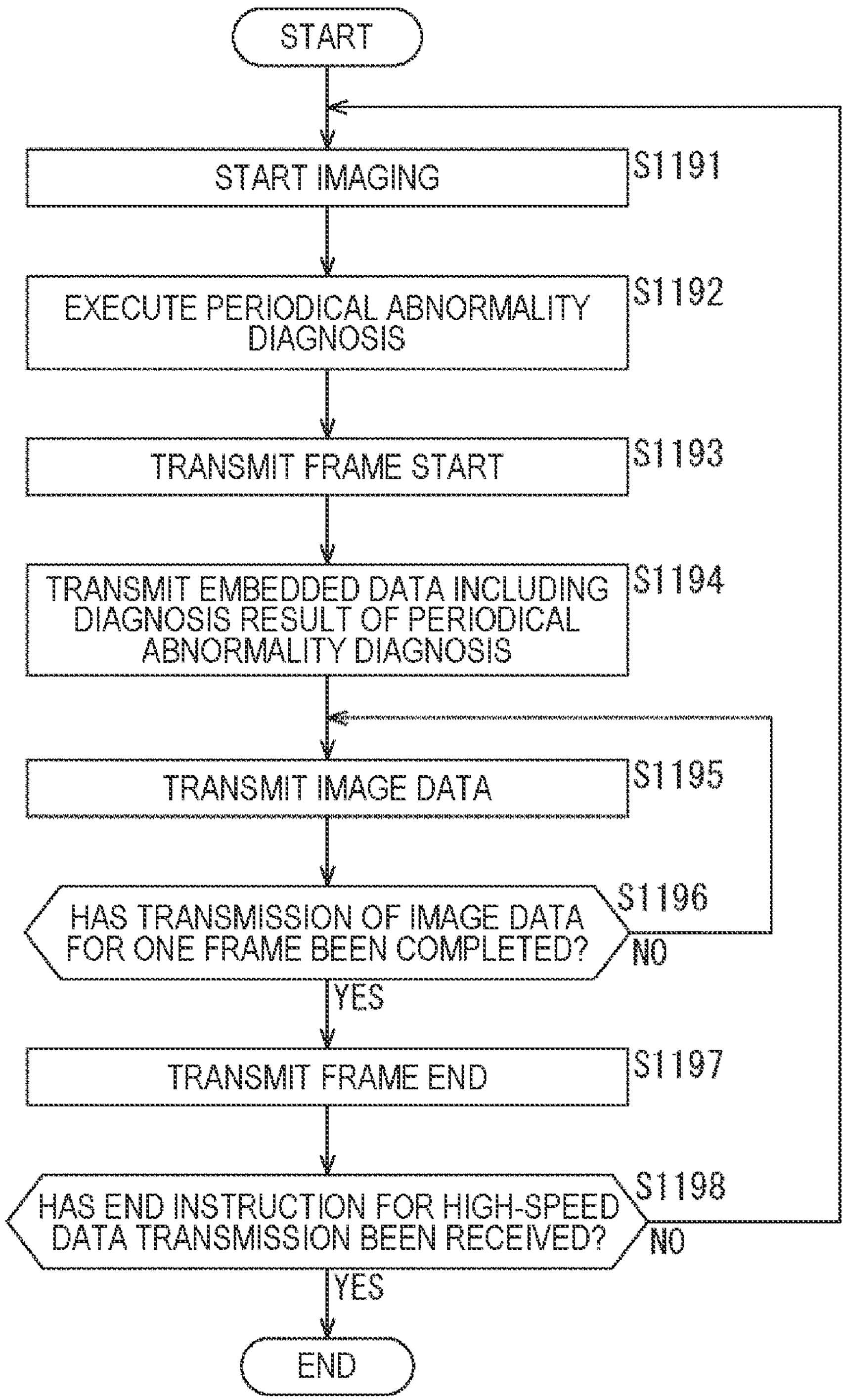

Note that the processing in steps S1211 to S1217 in FIG. 132 is similar to the processing in steps S1191 to S1197 in FIG. 131, and thus description thereof is omitted.

That is, in step S1218, in a case where the extension mode-compatible CSI-2 transmission circuit 1504 determines that the start instruction for the high-speed data transmission has been received, the processing returns to step S1211, and similar processing is repeated thereafter. On the other hand, in step S1218, in a case where the extension mode-compatible CSI-2 transmission circuit 1504 determines that the start instruction for the high-speed data transmission has not been received, the processing is terminated.

With the above processing, it becomes possible to transmit the unique message at high speed without hindering the high-speed data transmission of the image data.

<Imaging Transmission Processing (Part 2)>

In the above, an example in which the unique message serving as the diagnosis result of the periodical abnormality diagnosis is included in the embedded data and transmitted has been described. However, the second periodical abnormality diagnosis (second periodical abnormality diagnosis) may be executed, and the unique message may be included in second embedded data and transmitted.

FIG. 133 is a flowchart for describing the imaging transmission processing in which the second periodical abnormality diagnosis (second periodical abnormality diagnosis) is executed, and the unique message serving as a diagnosis result of the second periodical abnormality diagnosis is included in the second embedded data and transmitted.

Note that, since the processing in steps S1231, S1233, S1235, S1236, S1239, and S1240 in FIG. 133 is similar to the processing in steps S1191, S1193, and S1195 to S1198 in FIG. 131, description thereof is omitted.

That is, when the image data is supplied to the extension mode-compatible CSI-2 transmission circuit 1504 by the processing in step S1231, the image sensor 1211 performs the first periodical abnormality diagnosis (first periodical abnormality diagnosis) in step S1232.

When the frame start of the virtual channel is transmitted in step S1233, the extension mode-compatible CSI-2 transmission circuit 1504 transmits the first embedded data of the virtual channel in step S1234. At this time, the extension mode-compatible CSI-2 transmission circuit 1504 includes the unique message serving as the diagnosis result of the first periodical abnormality diagnosis in the first embedded data of the virtual channel and transmitted.

When the transmission of the image data for one frame has been completed in steps S1235 and S1236, the image sensor 1211 executes the second periodical abnormality diagnosis (second periodical abnormality diagnosis) in step S1237.

In step S1238, the extension mode-compatible CSI-2 transmission circuit 1504 transmits the second embedded data of the virtual channel. At this time, the extension mode-compatible CSI-2 transmission circuit 1504 includes the unique message serving as the diagnosis result of the second periodical abnormality diagnosis in the second embedded data of the virtual channel and transmitted.

Then, when the frame end of the virtual channel is transmitted in step S1239 and the end instruction for the high-speed data transmission is received in step S1240, the processing is terminated.

With the above processing, it becomes possible to transmit the unique message at high speed without hindering the high-speed data transmission of the image data.

Furthermore, in the above processing, since the second periodical abnormality diagnosis is executed during the line blanking period, the maximum value of the power consumption is not affected (the periodical abnormality diagnosis is not simultaneously performed with the transmission). Moreover, the periodical abnormality diagnosis may be executed outside the line blanking period.

Furthermore, since the unique message corresponding to the diagnosis result of the periodical abnormality diagnosis is stored in the embedded data immediately after the frame start and immediately before the frame end, the mobile device (propulsion device) can determine abnormality occurrence timing. For example, it is possible to determine whether an abnormality occurs continuously, before the image data transmission, or after the image data transmission. Note that the first embedded data may not be configured. Alternatively, the first periodical abnormality diagnosis may not be executed, and only the second periodical abnormality diagnosis may be executed.

<Imaging Transmission Processing (Part 3)>

In the above description, an example in which the second periodical abnormality diagnosis (second periodical abnormality diagnosis) is executed, and the unique message corresponding to the diagnosis result of the second periodical abnormality diagnosis is included in the second embedded data and transmitted has been described. However, the diagnosis result of the periodical abnormality diagnosis may be included in the read response and transmitted.

That is, in a case where a frame start signal transmitted by the high-speed data transmission is received from the image sensor 1211 that is a slave of the low-speed command transmission, the application processor 1212 that is a master of the low-speed command transmission transmits, by the low-speed command transmission, the read instruction for requesting the application processor 1212 to read the unique message in the image sensor 1211.

The image sensor 1211 receives the read instruction transmitted from the application processor 1212, and transmits the read response including the unique message according to the read instruction by the high-speed data transmission.

The application processor 1212 can receive a notification of the unique message from the image sensor 1211 by receiving the read response including the unique message.

That is, the unique message may be transmitted within the line blanking period between the frame start and the frame end, during which no image data is transmitted, and in particular, the unique message is desirably transmitted within the period between the frame start and the image data. This read instruction corresponds to, for example, Read of Read/Write in the I2C or I3C standard. The read response corresponds to the Read return value. Therefore, it becomes possible to promptly notify an abnormality before the transmission of the image data without affecting the maximum value of the power consumption.

Here, the imaging transmission processing in which the diagnosis result of the periodical abnormality diagnosis is included in the read response and transmitted will be described with reference to the flowcharts of FIGS. 134 and 135.

Note that the flowchart of FIG. 134 represents processing of the image sensor 1211, and the flowchart of FIG. 135 represents processing of the application processor 1212.

Furthermore, since processing of steps S1251 to S1253 and steps S1257 to S1260 is similar to the processing of steps S1191 to S1193 and steps S1195 to S1198 of FIG. 131, description thereof is omitted.

That is, in steps S1251 to S1253 (FIG. 134), imaging is started, the periodical abnormality diagnosis is executed, and the frame start is transmitted. Furthermore, in step S1271 (FIG. 135), the extension mode-compatible CSI-2 reception circuit 1552 of the application processor 1212 determines whether or not the frame start transmitted from the image sensor 1211 has been received, and repeats similar processing until it is determined that the frame start has been received.

Then, in step S1271, in a case where it is determined that the frame start transmitted from the image sensor 1211 has been received, the processing proceeds to step S1272.

In step S1272, the extension mode-compatible CSI-2 reception circuit 1552 transmits the read instruction to the image sensor 1211 by the low-speed command transmission.

In response, in step S1254 (FIG. 134), the extension mode-compatible CSI-2 transmission circuit 1504 of the image sensor 1211 determines whether or not the read instruction transmitted from the application processor 1212 has been received, and repeats similar processing until it is determined that the read instruction has been received.

Then, in step S1254, in a case where it is determined that the read instruction has been received, the processing proceeds to step S1255.

In step S1255, the extension mode-compatible CSI-2 transmission circuit 1504 transmits the read response including the unique message serving as the diagnosis result of the periodical abnormality diagnosis to the application processor 1212 by the high-speed data transmission for transmitting image data.

In response, in step S1273 (FIG. 135), the extension mode-compatible CSI-2 reception circuit 1552 of the application processor 1212 determines whether or not the read response including the unique message serving as the diagnosis result of the periodical abnormality diagnosis transmitted from the image sensor 1211 has been received, and repeats similar processing until it is determined that the read response has been received.

Then, in step S1273, in a case where it is determined that the read response including the unique message serving as the diagnosis result of the periodical abnormality diagnosis transmitted from the image sensor 1211 has been received, the processing proceeds to step S1274.

In step S1274, the application processor 1212 determines whether or not the image sensor 1211 is normal or abnormal on the basis of the unique message included in the received read response.

In step S1275, the application processor 1212 determines whether or not to transmit the end instruction for the high-speed data transmission, and in a case where it is determined not to terminate the high-speed data transmission, the processing returns to step S1271, and the subsequent processing is repeated.

Then, in a case where it is determined to transmit the end instruction for the high-speed data transmission in step S1275, the extension mode-compatible CSI-2 reception circuit 1552 transmits the end instruction for the high-speed data transmission to the image sensor 1211 in step S1276, and the processing ends.

Note that, in this processing, in step S1256, the embedded data may be transmitted in a state where the unique message serving as the diagnosis result of the periodical abnormality diagnosis is not included.

By the above processing, it becomes possible to include the diagnosis result of the periodical abnormality diagnosis in the read response and transmit the read response.

<Imaging Transmission Processing (Part 4)>

In the above description, an example in which the read instruction is transmitted according to the frame start, and the unique message serving as the diagnosis result of the periodical abnormality diagnosis is included in the read response and transmitted has been described. However, the read instruction may be transmitted according to the frame end, and the diagnosis result of the periodical abnormality diagnosis may be included in the read response and transmitted.

In a case where a frame end signal transmitted by the high-speed data transmission is received from the image sensor 1211 that is a slave of the low-speed command transmission, the application processor 1212 that is a master of the low-speed command transmission transmits, by the low-speed command transmission, the read instruction for requesting the application processor 1212 to read the unique message in the image sensor 1211.

The image sensor 1211 receives the read instruction transmitted from the application processor 1212, and transmits the unique message (read response) according to the read instruction by the high-speed data transmission.

Then, the application processor 1212 acquires the notification of the unique message from the image sensor 122 by receiving the read response.

That is, the unique message is transmitted within the frame blanking period between the frame end and the next frame start, in which no image data is transmitted.

Here, the imaging transmission processing in which the read instruction is transmitted according to the frame end, and the diagnosis result of the periodical abnormality diagnosis is included in the read response and transmitted will be described with reference to the flowcharts of FIGS. 136 and 137.

The flowchart of FIG. 136 represents processing of the image sensor 1211, and the flowchart of FIG. 137 represents processing of the application processor 1212.

Furthermore, since processing of steps S1291 to S1297 and S1300 of FIG. 136 is similar to the processing of steps S1251 to S1253 and S1256 to S1260 of FIG. 134, description thereof is omitted.

Moreover, since processing of steps S1312 to S1316 of FIG. 137 is similar to the processing of steps S1272 to S1276 of FIG. 135, description thereof is omitted.

That is, in the image sensor 1211, an image is captured by the processing in steps S1291 to S1297 (FIG. 136), the periodical abnormality diagnosis is executed, and the frame start, embedded data, image data, and frame end are transmitted.

In response, in step S1311 (FIG. 137), the extension mode-compatible CSI-2 reception circuit 1552 of the application processor 1212 determines whether or not the frame end transmitted from the image sensor 1211 has been received, and repeats similar processing until it is determined that the frame start has been received.

Then, in step S1311, in a case where it is determined that the frame end transmitted from the image sensor 1211 has been received, the processing proceeds to step S1312.

In step S1312, the extension mode-compatible CSI-2 reception circuit 1552 transmits the read instruction to the image sensor 1211 by the low-speed command transmission.

In response, in step S1298 (FIG. 136), the extension mode-compatible CSI-2 transmission circuit 1504 of the image sensor 1211 determines whether or not the read instruction transmitted from the application processor 1212 has been received, and repeats similar processing until it is determined that the read instruction has been received.

Then, in step S1298, in a case where it is determined that the read instruction has been received, the processing proceeds to step S1299.

In step S1299, the extension mode-compatible CSI-2 transmission circuit 1504 transmits the read response including the unique message serving as the diagnosis result of the periodical abnormality diagnosis to the application processor 1212 by the high-speed data transmission for transmitting image data.

In response, by the processing of steps S1313 to S1316 (FIG. 135), in the application processor 1212, the read response including the unique message serving as the diagnosis result of the periodical abnormality diagnosis transmitted from the image sensor 1211 is received, the normality or abnormality of the image sensor 1211 is determined, and the processing ends when the end instruction for the high-speed data transmission is transmitted.

By the above processing, it becomes possible to transmit the read instruction according to the frame end and include the diagnosis result of the periodical abnormality diagnosis in the read response and transmit the read response.

As a result, the unique message can be transmitted within the frame blanking period between the frame end and the next frame start, in which no image data is transmitted.

<Imaging Transmission Processing (Part 5)>

In the above description, an example in which the read instruction is transmitted according to the frame end, and the diagnosis result of the periodical abnormality diagnosis is included in the read response and transmitted has been described. However, the read response including the unique message may be transmitted immediately before frame start transmission.

That is, for example, in the image sensor 1211, the periodical abnormality diagnosis is executed between the transmission of the frame end and the transmission of the next frame start. Then, the application processor 1212 waits for a predetermined time until the periodical abnormality diagnosis is completed in the image sensor 1211 after the frame end is received, and then transmits the read instruction. Note that a timer for counting time may be provided, and a waiting time may be counted by the timer.

By such processing, it becomes possible to notify that there is a possibility of occurrence of an abnormality in the operation of the image sensor 1211 or that the abnormality has occurred from the image sensor 1211 to the application processor 1212 without affecting the maximum value of the power consumption in the shortest time before transmitting the image data of second and subsequent frames.

Here, the imaging transmission processing in which the read instruction is transmitted according to the frame end, and the diagnosis result of the periodical abnormality diagnosis is included in the read response and transmitted will be described with reference to the flowcharts of FIGS. 138 and 139.

The flowchart of FIG. 138 represents processing of the image sensor 1211, and the flowchart of FIG. 139 represents processing of the application processor 1212.

Furthermore, processing of steps S1331 to S1336 and S1339 to S1340 of FIG. 138 is similar to the processing of steps S1291 and S1293 to S1299 of FIG. 136, and thus the thereof is omitted.

Moreover, processing of steps S1351 and S1353 to S1357 of FIG. 139 is similar to the processing of steps S1311 to S1316 of FIG. 137, description thereof is omitted.

That is, when an image is captured, and the frame start, embedded data, image data, and frame end are transmitted in steps S1331 to S1336 (FIG. 138), the pixel 1501 starts imaging in step S1337, and the image data output from the pixel 1501 is supplied to the extension mode-compatible CSI-2 transmission circuit 1504 via the AD converter 1502 and the image processing unit 1503.

In step S1338, the image sensor 1211 executes the periodical abnormality diagnosis.

Meanwhile, when the frame end is received in step S1351 (FIG. 139), the application processor 1212 waits for a predetermined time in step S1352. This predetermined time is a time until the processing of the periodical abnormality diagnosis in step S1338 in the image sensor 1211 is completed.

Then, after waiting for the processing time by the processing in step S1352, the processing proceeds to step S1353, and the read instruction is transmitted to the image sensor 1211.

In the image sensor 1211, the read response including the unique message according to the diagnosis result of the periodical abnormality diagnosis is transmitted to the application processor 1212 by the high-speed data transmission for transmitting image data in response to the read instruction by the processing of steps S1339 and S1340 (FIG. 138). Note that, in a case where the end instruction for the high-speed data transmission is not received in step S1341, the processing returns to the processing of step S1332, and the subsequent processing is repeated. Then, in step S1341, when the end instruction for the high-speed data transmission is received, the processing ends.

By the above processing, it becomes possible to promptly notify the application processor 1212 of the possibility of the operation abnormality or the operation abnormality of the image sensor 1211 without affecting the maximum value of the power consumption before transmitting the image data of the second and subsequent frames.

<Imaging Transmission Processing (Part 6)>

In the above description, an example for enabling transmission of the read response including the unique message immediately before the frame start transmission has been described. However, the read instruction transmission or the read response transmission may be performed within the line blanking period after the embedded data transmission.

By the above processing, it becomes possible to promptly notify the application processor 1212 of the possibility of the operation abnormality or occurrence of the operation abnormality of the image sensor 1211 without affecting the maximum value of the power consumption before transmitting the image data.

Here, imaging transmission processing in which the read instruction transmission or the read response transmission is performed within the line blanking period after the embedded data transmission will be described with reference to the flowcharts of FIGS. 140 and 141.

The flowchart of FIG. 140 represents processing of the image sensor 1211, and the flowchart of FIG. 141 represents processing of the application processor 1212.

Furthermore, processing of steps S1371 to S1373 and S1375 to S1380 of FIG. 140 is similar to the processing of steps S1251 to S1255 and S1257 to S1260 of FIG. 134, and thus description thereof is omitted.

Moreover, since processing of steps S1392 to S1396 of FIG. 141 is similar to the processing of steps S1272 to S1276 of FIG. 135, description thereof is omitted.

That is, by the processing of steps S1371 to S1373 (FIG. 140), when an image is captured, the periodic abnormality diagnosis is executed, and the frame start is transmitted, the extension mode-compatible CSI-2 transmission circuit 1504 transmits the embedded data of a virtual channel in step S1374.

Meanwhile, in the application processor 1212, in step S1391 (FIG. 141), the extension mode-compatible CSI-2 reception circuit 1552 of the application processor 1212 determines whether or not the packet footer of the embedded data transmitted from the image sensor 1211 has been received, and repeats similar processing until it is determined that the packet footer has been received.

Then, in step S1391, in a case where it is determined that the packet footer of the embedded data transmitted from the image sensor 1211 has been received, the processing proceeds to step S1392.

In step S1392, the extension mode-compatible CSI-2 reception circuit 1552 transmits the read instruction to the image sensor 1211 by the low-speed command transmission.

In the image sensor 1211, the read response including the unique message according to the diagnosis result of the periodical abnormality diagnosis is transmitted to the application processor 1212 by the high-speed data transmission for transmitting image data in response to the read instruction by the processing of steps S1375 and S1376 (FIG. 140).

By the above processing, it becomes possible to promptly notify the possibility of operation abnormality or occurrence of the operation abnormality of the image sensor 1211 to the application processor 1212 without affecting the maximum value of the power consumption before transmitting the image data, and promptly respond to the unique message.

<Imaging Transmission Processing (Part 7)>

In the above description, an example in which the read instruction transmission and the read response transmission are performed within the line blanking period after the embedded data transmission has been described. However, the read instruction transmission and the read response transmission may be performed within the line blanking period after the image data transmission.

In this case, since the image sensor 1211 performs the periodical abnormality diagnosis for each line of the image data and transmits the unique message, it becomes possible to promptly notify the application processor 1212 of the unique message corresponding to the image data of each line without affecting the maximum value of the power consumption.

Here, imaging transmission processing in which the read instruction transmission and the read response transmission are performed within the line blanking period after the image data transmission will be described with reference to the flowcharts of FIGS. 142 and 143.

The flowchart of FIG. 142 represents processing of the image sensor 1211, and the flowchart of FIG. 143 represents processing of the application processor 1212.

Furthermore, processing of steps S1411 to S1413, S1416, S1417, S1419, and S1420 of FIG. 142 is similar to the processing of steps S1371, S1373 to S1376, S1379, and S1380 of FIG. 140, and thus description thereof is omitted.

Moreover, since the processing of steps S1432 to S1436 of FIG. 143 is similar to the processing of steps 1392 to 51396 of FIG. 141, description thereof is omitted.

That is, when an image is captured, the frame start is transmitted, and the embedded data is transmitted by the processing in steps S1411 to S1413 (FIG. 142), the extension mode-compatible CSI-2 transmission circuit 1504 transmits the image data of a virtual channel in step S1414.

In step S1415, the image sensor 1211 executes the periodical abnormality diagnosis.

Meanwhile, in the application processor 1212, in step S1431 (FIG. 143), the extension mode-compatible CSI-2 reception circuit 1552 of the application processor 1212 determines whether or not the packet footer of the image data transmitted from the image sensor 1211 has been received, and repeats similar processing until it is determined that the packet footer has been received.

Then, in step S1431, in a case where it is determined that the packet footer of the image data transmitted from the image sensor 1211 has been received, the processing proceeds to step S1432.

In step S1432, the extension mode-compatible CSI-2 reception circuit 1552 transmits the read instruction to the image sensor 1211 by the low-speed command transmission.

In the image sensor 1211, the read response including the unique message according to the diagnosis result of the periodical abnormality diagnosis is transmitted to the application processor 1212 by the high-speed data transmission for transmitting image data in response to the read instruction by the processing of steps S1416 and S1417 (FIG. 142).

Moreover, in step S1418, the extension mode-compatible CSI-2 transmission circuit 1504 determines whether or not the transmission of the image data for one frame has been completed.

In step S1418, in a case where the extension mode-compatible CSI-2 transmission circuit 1504 determines that the transmission of the image data for one frame has not been completed, the processing returns to step S1414, and similar processing is repeatedly performed thereafter. On the other hand, in step S1418, in a case where the extension mode-compatible CSI-2 transmission circuit 1504 determines that the transmission of the image data for one frame has been completed, the processing proceeds to step S1419.

By the above processing, since the image sensor 1211 performs the periodical abnormality diagnosis for each line of the image data and transmits the unique message, it becomes possible to promptly notify the application processor 1212 of the unique message corresponding to the image data of each line without affecting the maximum value of the power consumption.

As a result, the application processor 1212 can promptly respond to the unique message.

<Imaging Transmission Processing (Part 8)>

In the above description, an example in which the read instruction transmission and the read response transmission are performed within the line blanking period after the image data transmission has been described. However, the unique message may be transmitted using an interrupt function.

Since the image sensor 1211 can be easily synchronized with the application processor 1212 in the case of using the interrupt function, it becomes possible to transmit the unique message according to timing determined by the image sensor 1211 by executing interrupt at the timing determined by the image sensor 1211.

Note that the image sensor 1211 may trigger the read instruction by the in-band interrupt and transmit the read response accordingly, or may omit the read instruction by the in-band interrupt and transmit the read response.

Here, imaging transmission processing in which the unique message is transmitted using the interrupt function will be described with reference to the flowcharts of FIGS. 144 and 145.

The flowchart of FIG. 144 represents processing of the image sensor 1211, and the flowchart of FIG. 145 represents processing of the application processor 1212.

Furthermore, processing of steps S1451 to S1453, S1455, S1456, and S1458 to S1461 of FIG. 144 is similar to the processing of steps S1371 to S1373, and S1375 to S1380 of FIG. 140, and thus description thereof is omitted.

Moreover, since processing of steps S1472 to S1476 of FIG. 145 is similar to the processing of steps 1392 to 51396 of FIG. 141, description thereof is omitted.

That is, by the processing of steps S1451 to S1453 (FIG. 144), an image is captured, the periodical abnormality diagnosis is executed, and the frame start is transmitted in the image sensor 1211.

In step S1454, the extension mode-compatible CSI-2 transmission circuit 1504 notifies the application processor 1212 of the start of interrupt execution.

Meanwhile, in the application processor 1212, in step S1471 (FIG. 145), the extension mode-compatible CSI-2 reception circuit 1552 of the application processor 1212 determines whether or not the notification indicating the start of interrupt execution transmitted from the image sensor 1211 has been received, and repeats similar processing until it is determined that the notification has been received.

Then, in step S1471, in a case where it is determined that the notification indicating the start of interrupt execution transmitted from the image sensor 1211 has been received, the processing proceeds to step S1472.

In step S1432, the extension mode-compatible CSI-2 reception circuit 1552 transmits the read instruction to the image sensor 1211 by the low-speed command transmission.

In the image sensor 1211, the read response including the unique message according to the diagnosis result of the periodical abnormality diagnosis is transmitted to the application processor 1212 by the high-speed data transmission for transmitting image data in response to the read instruction by the processing of steps S1455 and S1456 (FIG. 144).

Moreover, in step S1457, the extension mode-compatible CSI-2 transmission circuit 1504 transmits the embedded data.

By the above processing, it becomes possible to use the interrupt function, and thus it becomes possible to transmit the unique message to the application processor 1212 at the timing determined by the image sensor 1211 by executing interrupt at the timing determined by the image sensor 1211.

Note that the image sensor 1211 may trigger the read instruction by the in-band interrupt and transmit the read response accordingly, or may omit the read instruction by the in-band interrupt and transmit the read response.

<Imaging Transmission Processing (Part 9)>

In the above description, an example in which the unique message is transmitted using the interrupt function has been described, but the unique message may be stored in data of a virtual channel different from a virtual channel for image data transmission (for example, in the embedded data) and transmitted.

By storing and transmitting the unique message in data of the virtual channel different from the virtual channel for the image data transmission, it becomes possible to transmit the unique message even in a case where there is no room to store the unique message in the embedded data of the virtual channel for the image data transmission.

Note that since the periodical abnormality diagnosis is executed within the frame blanking period, the periodical abnormality diagnosis cannot be performed at the same time with transmission, and thus does not affect the maximum value of the power consumption. Furthermore, the periodical abnormality diagnosis may be executed outside the frame blanking period.

Therefore, it becomes possible to promptly notify the application processor 1212 of the possibility of the operation abnormality or occurrence of the operation abnormality of the image sensor 1211 before transmitting the image data.

Here, imaging transmission processing in which the unique message is stored in data of the virtual channel different from the virtual channel of the image data transmission by the image sensor 1211 and transmitted will be described with reference to the flowchart of FIG. 146.

Note that, here, processing of transmitting the image data in the first virtual channel (VC1) and transmitting the embedded data including the unique message in the second virtual channel (VC2) will be described.

In step S1491, the pixel 1501 starts imaging, and the image data output from the pixel 1501 is supplied to the extension mode-compatible CSI-2 transmission circuit 1504 via the AD converter 1502 and the image processing unit 1503.

In step S1492, the image sensor 1211 executes the periodical abnormality diagnosis.

In step S1493, the extension mode-compatible CSI-2 transmission circuit 1504 transmits the frame start of the first virtual channel.

In step S1494, the extension mode-compatible CSI-2 transmission circuit 1504 transmits the frame start of the second virtual channel.

In step S1495, the extension mode-compatible CSI-2 transmission circuit 1504 transmits the embedded data of the first virtual channel.

In step S1496, the extension mode-compatible CSI-2 transmission circuit 1504 transmits the embedded data of the second virtual channel. At this time, the extension mode-compatible CSI-2 transmission circuit 1504 transmits the embedded data of the second virtual channel including the unique message corresponding to the diagnosis result of the periodical abnormality diagnosis.

In step S1497, the extension mode-compatible CSI-2 transmission circuit 1504 transmits the image data of the first virtual channel.

In step S1498, the extension mode-compatible CSI-2 transmission circuit 1504 determines whether or not the transmission of the image data for one frame has been completed.

In step S1498, in a case where the extension mode-compatible CSI-2 transmission circuit 1504 determines that the transmission of the image data for one frame has not been completed, the processing returns to step S1497, and similar processing is repeatedly performed thereafter. On the other hand, in step S1498, in a case where the extension mode-compatible CSI-2 transmission circuit 1504 determines that the transmission of the image data for one frame has been completed, the processing proceeds to step S1499.

In step S1499, the extension mode-compatible CSI-2 transmission circuit 1504 transmits the user-defined data of the second virtual channel.

In step S1500, the extension mode-compatible CSI-2 transmission circuit 1504 transmits the frame end of the first virtual channel.

In step S1501, the extension mode-compatible CSI-2 transmission circuit 1504 transmits the frame end of the second virtual channel.

In step S1502, the extension mode-compatible CSI-2 transmission circuit 1504 determines whether or not the end instruction for the high-speed data transmission has been received.

In step S1502, in a case where the extension mode-compatible CSI-2 transmission circuit 1504 determines that the end instruction for the high-speed data transmission has not been received, the processing returns to step S1491, and similar processing is repeated thereafter. On the other hand, in step S1502, in a case where the extension mode-compatible CSI-2 transmission circuit 1504 determines that the end instruction for the high-speed data transmission has been received, the processing is terminated.

By the above processing, it becomes possible to transmit the unique message even in a case where there is no room to store the unique message in the embedded data of the virtual channel for the image data transmission.

<Imaging Transmission Processing (Part 10)>

In the above description, an example in which the unique message is stored in data (for example, in the embedded data) of the virtual channel different from the virtual channel for image data transmission and transmitted has been described. However, the unique message may be stored in at least a part of non-image data of a virtual channel different from the virtual channel for image data transmission and transmitted.

The non-image data is, for example, packet data (for example, Generic Short Packet Data Types and Generic Long Packet Data Types), user-defined data (User Defined Byte-based Data), or reserved area data (Reserved for future use).

In the case where the unique message is stored in at least a part of the non-image data in the virtual channel different from the virtual channel for image data transmission, the image sensor 1211 transmits the unique message for each line of the image data, and thus it becomes possible to promptly transmit the unique message corresponding to the image data of each line.

Therefore, the application processor 1212 that receives the unique message can promptly respond to the unique message.

Since the periodical abnormality diagnosis is executed within the line blanking period before the image data transmission, the periodical abnormality diagnosis is not performed at the same time with the transmission, and thus does not affect the maximum value of the power consumption. Moreover, the periodical abnormality diagnosis may be executed outside the line blanking period.

Here, imaging transmission processing in which data is stored in at least a part of non-image data in the virtual channel different from the virtual channel for image data transmission and transmitted will be described will reference to the flowchart of FIG. 147.

Note that, here, processing of transmitting the image data in the first virtual channel (VC1) and transmitting the user-defined data including the unique message in the second virtual channel (VC2) will be described.

Furthermore, processing of steps S1521 to S1525 and steps S1530 to S1532 of the flowchart of FIG. 147 is similar to the processing of steps S1491, S1493 to S1496, and S1500 to S1502 of the flowchart of FIG. 146, and thus description thereof is omitted. Note that the processing of step S1525 is different from the processing of step S1496 in that the diagnosis result of the periodical abnormality diagnosis is not included.

That is, when imaging is started by the processing of steps S1521 to S1525 and the frame start and the embedded data of each of the first virtual channel and the second virtual channel are transmitted, the processing proceeds to step S1526.

In step S1526, the image sensor 1211 executes the periodical abnormality diagnosis.

In step S1527, the extension mode-compatible CSI-2 transmission circuit 1504 transmits the image data of the first virtual channel.

In step S1528, the extension mode-compatible CSI-2 transmission circuit 1504 transmits the user-defined data of the second virtual channel. At this time, the extension mode-compatible CSI-2 transmission circuit 1504 transmits the user-defined data of the second virtual channel including the unique message corresponding to the diagnosis result of the periodical abnormality diagnosis.

In step S1529, the extension mode-compatible CSI-2 transmission circuit 1504 determines whether or not the transmission of the image data for one frame has been completed.

In step S1529, in a case where the extension mode-compatible CSI-2 transmission circuit 1504 determines that the transmission of the image data for one frame has not been completed, the processing returns to step S1526, and similar processing is repeatedly performed thereafter. On the other hand, in step S1529, in a case where the extension mode-compatible CSI-2 transmission circuit 1504 determines that the transmission of the image data for one frame has been completed, the processing proceeds to step S1530.

Then, in steps S1530 and S1531, the frame ends of the first virtual channel and the first virtual channel are transmitted.

By the above processing, since the image sensor transmits the unique message for each line of the image data, it is possible to promptly transmit the unique message corresponding to the image data of each line.

As a result, the application processor 1212 that receives the unique message can promptly respond to the unique message.

Furthermore, in the above description, an example in which the user-defined data including the unique message is transmitted has been described. However, any data other than the user-defined data may be used as long as the data is non-image data including the unique message, and may be, for example, the packet data or the reserved area data including the unique message.

<Imaging Transmission Processing (Part 11)>

In the above description, an example in which the unique message is stored in at least a part of non-image data in the virtual channel different from the virtual channel for image data transmission and transmitted has been described. However, the unique message may be stored in image data and transmitted.

In a case where the unique message is stored in the image data and transmitted, the image sensor 1211 transmits the unique message for each line of the image data. Therefore, it is possible to promptly transmit the unique message corresponding to the image data of each line.

Therefore, the application processor 1212 that receives the unique message can promptly respond to the unique message.

Furthermore, since the periodical abnormality diagnosis is executed within the line blanking period, the periodical abnormality diagnosis is not performed at the same time with the transmission, and thus does not affect the maximum value of the power consumption.

Moreover, the periodical abnormality diagnosis may be executed outside the line blanking period.

Furthermore, in a case where the unique message is stored in the image data, a visible digital watermark message or an invisible digital watermark message may be superimposed and stored.

For example, a predetermined message (for example, warning display) may be stored as the unique message using the visible digital watermark. Furthermore, a count message (predetermined message) indicating a countdown or a countup until the image sensor 1211 ends the high-speed data transmission may be stored using the visible digital watermark.

These may be expressions that can be recognized by a person (for example, a fixed pattern) or expressions that cannot be recognized by a person (for example, a random pattern). Furthermore, the message may be stored using the invisible digital watermark that is difficult to visually recognize with naked eyes due to a minute image change.

Here, imaging transmission processing in which the unique message is stored in the image data and transmitted will be described with reference to the flowchart of FIG. 148.

Note that processing in steps S1551 and S1552 and steps S1557 and S1558 in the flowchart of FIG. 148 is similar to the processing in steps S1191, S1193, S1197, and S1198 in the flowchart of FIG. 131, and thus description thereof is omitted.

That is, when the imaging is started and the frame start is transmitted by the processing of steps S1551 and S1552, and the embedded data is transmitted by the processing of step S1553, the processing proceeds to step S1554.

In step S1554, the image sensor 1211 executes the periodical abnormality diagnosis.

In step S1555, the extension mode-compatible CSI-2 transmission circuit 1504 transmits the image data of the virtual channel. At this time, the extension mode-compatible CSI-2 transmission circuit 1504 includes the unique message corresponding to the diagnosis result of the periodical abnormality diagnosis to the image data of the virtual channel and transmits the image data.

In step S1556, the extension mode-compatible CSI-2 transmission circuit 1504 determines whether or not the transmission of the image data for one frame has been completed.

In step S1556, in a case where the extension mode-compatible CSI-2 transmission circuit 1504 determines that the transmission of the image data for one frame has not been completed, the processing returns to step S1554, and similar processing is repeatedly performed thereafter. On the other hand, in step S1556, in a case where the extension mode-compatible CSI-2 transmission circuit 1504 determines that the transmission of the image data for one frame has been completed, the processing proceeds to step S1557.

Then, in step S1557, the frame end of the virtual channel is transmitted.

By the above processing, the image sensor 1211 becomes able to transmit the unique message for each line of the image data, and promptly transmit the unique message corresponding to the image data for each line to the application processor 1212.

Therefore, the application processor 1212 that receives the unique message can promptly respond to the unique message.

Note that, in the above description, the start of imaging has been specified but the end of imaging is not specified. This is because an imaging method differs depending on a global shutter method or a rolling shutter method.

For example, in the case of the global shutter method, since all of pixels can be imaged at the same time, the imaging may be ended before the next processing, or the imaging may be ended before the transmission of the first image data in a frame.

Meanwhile, in the case of the rolling shutter method, at least a part of the imaging and high-speed data transmission executed in rows of a pixel may be redundantly executed (executed in parallel), and thus the imaging is only required to be ended before the transmission of the last image data in the frame.

Furthermore, the imaging start timing is an example, and may be executed with a delay until the timing before the transmission of the first image data in the frame, for example.

Moreover, the timing of the periodical abnormality diagnosis is also an example, and for example, the periodical abnormality diagnosis may be executed with a delay until the timing before the transmission of the unique message.

<Message Count Value>

The message counter 1513 generates the message counter (message count value) by incrementing or decrementing either Humming Distance (HD)≥1 count (binary code) or the HD=1 count (gray code).

Note that FIG. 149 illustrates an example of the message count value including a binary code of the Humming Distance (HD)≥1 on the left side in the drawing, and an example of the message count value including the gray code of HD=1 on the right side in the drawing, both of which are incremented downward in the drawing.

In particular, in the case where the message counter (message count value) is a gray code, the Hamming distance associated with the increment or the decrement is constant. Therefore, resistance to power observation attacks and electromagnetic observation attacks can be improved.

The message count value may be switched between a first code method and a second code method (for example, a binary code method and a gray code method) as a counting method.

Furthermore, in a case where the counting method of the message count value is switched as necessary, additional information can be transmitted from the image sensor 1211 to the application processor 1212 without changing the data amount to be transmitted itself.

For example, in a case where an abnormality is detected in the image sensor 1211, the counting method of the message count value may be switched, and abnormality information (for example, the presence or absence of an abnormality) can be transmitted from the image sensor 1211 to the application processor 1212 according to the counting method.

In particular, in a case where the binary code and the gray code are switched, it is possible to transmit the additional information while maintaining the increment or decrement of the message counter.

In a case where the image sensor 1211 switches the binary code and the gray code, it is desirable to switch the code at timing in consideration of a code period (the left is an example of 4 bits and the code period of 16 counts) in order to enable the application processor 1212 to determine whether it is count switching or a defect of message transmission and reception, but the present embodiment is not limited thereto.

In a case where the image sensor 1211 includes the first counter and the second counter that are related to each other, the image sensor can verify the presence or absence of a defect or falsification of the message counter.

For example, the presence or absence of a defect or falsification of the counter may be verified from a result of calculation (for example, addition) of the first counter to be incremented and the second counter to be decremented.

That is, for example, in the case where the first counter that increments the binary code and the second counter that decrements the binary code are used, as illustrated in FIG. 150, each addition result is always "1111" unless there is a defect or falsification. Therefore, in the case where each addition result is "1111", since the first counter and the second counter have normal values, it is possible to verify the presence or absence of a defect or falsification depending on whether or not the addition result is a normal value including "1111".

Furthermore, the presence or absence of a defect or falsification of the counter may be verified from a result of calculation (for example, subtraction) of the first counter and the second counter having the same counting direction.

That is, for example, in the case where the first counter that increments the gray code and the second counter that decrements the gray code are used, as illustrated in FIG. 151, each subtraction result is always "0000" unless there is a defect or falsification. Therefore, in the case where each subtraction result is "0000", since the first counter and the second counter have normal values, it is possible to verify the presence or absence of a defect or falsification depending on whether or not the subtraction result is a normal value including “0000”.

<Message Counting Processing>

Next, message counting processing will be described with reference to the flowchart of FIG. 152.

In step S1571, the message counter 1513 initializes a first count value and a second count value.

In step S1572, the extension mode-compatible CSI-2 transmission circuit 1504 determines whether or not to transmit the extended packet header, and waits for the processing until it is determined to transmit the extended packet header.

In step S1572, in a case where it is determined to transmit the extended packet header, the processing proceeds to step S1573.

In step S1573, the extension mode-compatible CSI-2 transmission circuit 1504 acquires the first count value as the message count value from the message counter 1513 and stores the first count value in the extended packet header.

In step S1574, the extension mode-compatible CSI-2 transmission circuit 1504 transmits the extended packet header to the application processor 1212.

In step S1575, the message counter 1513 determines whether or not the first count value is the maximum value.

In step S1575, in a case where it is determined that the first count value is the maximum value, the processing returns to step S1571, and the first count value and the second count value are initialized.

Furthermore, in step S1575, in a case where it is determined that the first count value is not the maximum value, the processing proceeds to step S1576.

In step S1576, the message counter 1513 updates (increments or decrements) the first count value of the first message counter.

In step S1577, the message counter 1513 updates (increments or decrements) the second count value of the second message counter.

In step S1578, the message counter 1513 calculates (adds or subtracts) the first count value and the second count value.

In step S1579, the message counter 1513 determines whether or not the calculation result is a normal value.

In step S1579, in a case where it is determined that the calculation result is a normal value, the processing proceeds to step S1580.

In step S1580, the message counter 1513 determines that the first count value and the second count value are normal.

In step S1579, in a case where it is determined that the calculation result is not a normal value, the processing proceeds to step S1581.

In step S1581, the message counter 1513 determines that at least either the first count value or the second count value is abnormal.

By the above processing, it becomes possible to improve resistance to a defect or falsification with respect to the count value of the message counter.

Note that the image sensor 1211 may transmit a normality message in the case where it is determined as normal or transmit an abnormality message in the case where it is determined as abnormal, as the unique message. Furthermore, the message count value may be diverted as the unique message such as the abnormality message.

Meanwhile, the unique message may be stored in the extended packet footer outside the frame end (for example, in the frame start, in the embedded data, or in the image data.). Furthermore, the cipher-based integrity operation value of data including the unique message may be stored in the extended packet footer in the frame end. Moreover, the cipher-based integrity operation value of data including the unique message may be stored in the packet data in the embedded data, rather than in the extended packet footer.

As described above, the description has been given using an example in which the unique message and the additional information are transmitted from the image sensor 1211 to the application processor 1212, but the unique message and the additional information may be transmitted from the application processor 1212 to the image sensor 1211 or the display 1213 according to a similar idea.

<Storage of Information for Identifying Abnormality>

In the extended packet header or the extended packet footer, for example, Warning Descriptor (unique message) may be stored, which is defined to identify any of Fatal warning (detection of a serious abnormality), Sensor-internal warning (detection of an abnormality caused inside the sensor), Sensor-external warning (detection of an abnormality caused outside the sensor), Power-source warning (detection of an abnormality caused by a power supply), Clock-source warning (detection of an abnormality caused by a clock source), The others warning (detection of an abnormality caused by the others), Physical warning (detection of a physical abnormality), Logical warning (detection of a logical abnormality), Power warning (detection of a power abnormality), Voltage warning (detection of a voltage abnormality), Current warning (detection of a current abnormality), Electromagnetic warning (detection of an electromagnetic abnormality), Clock warning (detection of a clock abnormality), Thermal warning (detection of a temperature abnormality), Channel warning (detection of a transmission channel abnormality), Message warning (detection of a message abnormality), Attack warning (detection of an attack), Tamper warning (for example, detection of invasion), Blind warning (for example, detection of interference), Saturation warning (for example, detection of interference), Fake warning (for example, detection of interference), Foreign object warning (for example, detection of an obstacle), Probe warning (for example, detection of invasion or obstacle), DOS warning (for example, detection of a message count abnormality), or the like.

The Warning Descriptor (unique message) may be stored in at least a part of a vendor-specific area (Vendor specific), a user-defined area (User Defined), or a reserved area (Reserved for future use).

Furthermore, any item in the Warning Descriptor (unique message) may be defined in any of the extended packet header (for example, Security Descriptor), the extended packet footer (for example, ePF1), the embedded data, the read response, or the like.

Note that FIG. 153 illustrates a configuration example of the extended packet header ePH2 when Warning Descriptor is set in the reserved area (Reserved) in the extended packet header ePH2 of FIG. 58.

Furthermore, FIG. 154 illustrates a description example of identification information using each bit of Warning Descriptor (unique message).

<Separation of Unique Message>

The transmission of the unique message may be separated into transmission of a first unique message and transmission of a second unique message.

Since the extended packet header is transmitted every high-speed data transmission of a line (row) such as image data, a short bit width is desirable. However, since the immediacy is high, for example, a part of warning flash (for example, Physical attack detection) or warning information may be allocated and stored as the first unique message.

Meanwhile, for example, information (warning details) indicating details of the warning information is allocated to the second unique message, stored outside the extended packet header, and transmitted.

FIG. 155 illustrates an example of when the warning flash (for example, Physical attack detection) is set as the first unique message in the extended packet header.

<Transmission Processing when Separating and Transmitting Unique Message>

Next, transmission processing when separating and transmitting the unique message will be described with reference to the flowcharts of FIGS. 156 and 157.

Note that the flowchart of FIG. 156 represents processing of the image sensor 1211, and the flowchart of FIG. 157 represents processing of the application processor 1212.

In step S1591 (FIG. 156), the image sensor 1211 executes the abnormality diagnosis.

In step S1592, the extension mode-compatible CSI-2 transmission circuit 1504 transmits the extended packet header including warning flash that is the first unique message.

In step S1593, the extension mode-compatible CSI-2 transmission circuit 1504 includes and transmits the embedded data outside the extended packet header including the warning details that are the second unique message, for example.

Meanwhile, in step S1611, the application processor 1212 determines whether or not the extended packet header including the warning flash has been received, and repeats similar processing until the extended packet header including warning flash is received.

In step S1611, in a case where it is determined that the extended packet header including the warning flash has been received, the processing proceeds to step S1612.

In step S1612, the application processor 1212 starts the abnormal-time processing on the basis of the warning flash.

In step S1613, the application processor 1212 determines whether or not the extended packet header of the embedded data or the like including the warning details has been received, and repeats similar processing until it is determined that the extended packet header has been received.

Then, in step S1613, in a case where it is determined that the extended packet header of the embedded data or the like including the warning details has been received, the processing proceeds to step S1614.

In step S1614, the application processor 1212 reflects information of the warning details in the abnormal-time processing.

By the above processing, in a case where an abnormality is detected by abnormality diagnosis, it becomes possible to promptly transmit the warning flash (for example, Physical attack detection) with high immediacy to the application processor 1212, and to promptly start the abnormal-time processing.

<Modification of Transmission Processing when Separating and Transmitting Unique Message>

In the above description, an example in which the warning flash is transmitted as the first unique message has been described. Moreover, after the warning flash is transmitted, the read instruction for the warning details may be transmitted, and the warning details may be transmitted as the read response from the image sensor 1211.

Next, transmission processing when separating and transmitting the unique message in the case of transmitting the read instruction for the warning details after transmitting the warning flash will be described with reference to the flowchart of FIG. 158.

Note that processing of steps S1631, S1632, S1634, and S1635 in the flowchart of FIG. 158 is similar to the processing of steps S1611 to S1613 in the flowchart of FIG. 157, and thus description thereof is omitted.

That is, when the warning flash is received and the abnormal-time processing is started by the processing in steps S1631 and S1632, the application processor 1212 transmits the read instruction in step S1633.

In response, the image sensor 1211 transmits the read response to the application processor 1212 in response to the read instruction.

Then, by the processing of steps S1634 and S1635, the warning details are received and reflected in the abnormal-time processing.

By the above processing, in a case where an abnormality is detected by abnormality diagnosis, it becomes possible to promptly transmit the warning flash (for example, Physical attack detection) with high immediacy to the application processor 1212, and moreover to promptly reflect the warning details in the abnormal-time processing.

<Security Descriptor>

In the extended packet header or the extended packet footer, Security Descriptor (for example, it may be referred to as Service Descriptor) may be stored, in which any of the presence or absence of encryption of packet data (payload), the presence or absence of a hash value, a message authentication code, or a digital signature in the extended packet footer, algorithm types of the hash value, the message authentication code, or the digital signature in the extended packet footer, or the like is defined.

Furthermore, the image sensor 1211 may use this Security Descriptor to notify the application processor 1212 of any unique message such as the presence or absence of an abnormality inside and outside the image sensor 1211, the presence or absence of interference or attack on the image sensor 1211, or the like.

As Message Authentication Code (MAC), any of Galois MAC (GMAC), Cipher-based MAC (CMAC), Hash-based MAC (HMAC), or the like may be used. For example, any of AES-GMAC, AES-CMAC, SHA2-HMAC, SHA3-HMAC, or the like to which Advanced Encryption Standard (AES) or Secure Hash Algorithm (SHA) is applied may be used.

FIG. 159 illustrates an example in which any unique message such as the presence or absence of an abnormality inside or outside the image sensor 1211, the presence or absence of interference or attack on the image sensor 1211, or the like is set in the Security Descriptor in FIG. 153.

<Example Mounted on Propulsion Device>

The image sensor 1211 and the application processor 1212 can be configured to be mounted on a desired propulsion device.

The propulsion device may be, for example, any of a vehicle, a robot, a drone, or the like capable of performing propulsion (any of moving, traveling, walking, flying, or the like), or any of an automated vehicle, an automated robot, an automated drone, or the like capable of performing automated propulsion with an artificial intelligence (AI) function mounted thereon.

Propulsion of the propulsion device may be controlled by a user of the propulsion device, and the propulsion device may provide instructions or warnings to the user as needed.

Meanwhile, the propulsion device may be configured such that the propulsion device itself automatically controls its own propulsion.

FIG. 160 is a block diagram illustrating a schematic configuration example of a propulsion control system, which is an example of a control system of the propulsion device on which the image sensor 1211 and the application processor 1212 described above are mounted.

A propulsion control system 1600 includes a plurality of electronic control units connected through a communication network 1601. In the example illustrated in FIG. 160, the propulsion control system 1600 includes a drive system control unit 1615, a body system control unit 1616, an external information detection unit 1617, an internal information detection unit 1619, and an integrated control unit 1611. Furthermore, as functional configurations of the integrated control unit 1611, a microcomputer 1631, a sound image output unit 1632, and an in-vehicle network interface (UF) 1633 are illustrated.

The drive system control unit 1615 controls operations of devices regarding a drive system of the propulsion device according to various programs.

The body system control unit 1616 controls operations of various devices equipped in the propulsion device according to various programs.

The external information detection unit 1617 detects information outside the propulsion device that mounts the propulsion control system 1600. For example, an imaging unit 1618 is connected to the external information detection unit 1617. The external information detection unit 1617 causes the imaging unit 1618 to capture an image outside the propulsion device, and receives the captured image. The external information detection unit 1617 may perform object detection processing or distance detection processing of persons, vehicles, obstacles, signs, letters on a road surface, or the like on the basis of the received image. Furthermore, the external information detection unit 1617 may have a configuration corresponding to the application processor 1212.

The imaging unit 1618 has a configuration corresponding to the image sensor 1211, and is an optical sensor that receives light and outputs an electrical signal according to a reception amount of the light. The imaging unit 1618 can output the electrical signal as an image and can output the electrical signal as information of distance measurement. Furthermore, the light received by the imaging unit 1618 may be visible light or may be non-visible light such as infrared light.

The internal information detection unit 1619 detects information inside the propulsion device. A detection unit 1620 that detects the information inside the propulsion device may be connected to the internal information detection unit 1619. Here, the information inside the propulsion device is, for example, information such as a temperature and an ambient humidity of the propulsion device.

The microcomputer 1631 can calculate various control target values on the basis of information inside and outside the propulsion device acquired by the external information detection unit 1617 or the internal information detection unit 1619, and output a control command to the drive system control unit 1615. Furthermore, the microcomputer 1631 may have a configuration corresponding to the application processor 1212.

Furthermore, the microcomputer 1631 controls the propulsion on the basis of information around the propulsion device acquired by the external information detection unit 1617 or the internal information detection unit 1619, thereby to perform cooperative control for the purpose of automated driving or the like in which the vehicle autonomously travels without depending on the operation of the user.

As described above, since the imaging unit 1618 has a configuration corresponding to the image sensor 1211 and the external information detection unit 1617 and/or the microcomputer 1631 has a configuration corresponding to the application processor 1212, the imaging unit 1618 and the external information detection unit 1617 and/or the microcomputer 1631 mutually implement high-speed data communication.

Moreover, the microcomputer 1631 can output a control command to the body system control unit 1616 on the basis of the information outside the propulsion device acquired by the external information detection unit 1617.

The sound image output unit 1632 transmits an output signal of at least one of a sound or an image to an output device that can visually and aurally notify information to the occupant of the propulsion device or outside the propulsion device. In the example in FIG. 160, as the output device, an audio speaker 1612, a display unit 1613, and an instrument panel 1614 are exemplarily illustrated. The display unit 1613 may include, for example, at least one of an on-board display or a head-up display.

<Propulsion Control Processing (Part 1)>

The propulsion device may investigate a propulsion status (for example, the propulsion speed of the propulsion device and the presence or absence of an obstacle around the propulsion device) of the propulsion device in a case where an abnormality message is received (for example, received one time, received a plurality of times, or continuously received) by the propulsion control system 1600 of FIG. 160, and terminate the high-speed data transmission when the propulsion status satisfies a safety condition, or change the propulsion control (for example, decelerates or guides the propulsion device to a position where there are few obstacles) when the propulsion status does not satisfy the safety condition.

Here, the above-described propulsion control processing by the propulsion control system 1600 will be described with reference to a flowchart of FIG. 161.

In step S1651, the external information detection unit 1617 and/or the microcomputer 1631 corresponding to the application processor 1212 determines whether or not (the unique message including) the abnormality message indicating that an abnormality has occurred has been received from the imaging unit 1618 corresponding to the image sensor 1211, and repeats similar processing until it is determined that the abnormality message has been received.

In this processing, whether or not the unique message including the abnormality message has been received may be determined on the basis of whether the unique message has been received one time, a plurality of times, or continuously received.

In step S1651, in a case where it is determined that the abnormality message has been received, the processing proceeds to step S1652.

In step S1652, the external information detection unit 1617 and/or the microcomputer 1631 investigates the propulsion status. More specifically, the external information detection unit 1617 and/or the microcomputer 1631 investigate, for example, the propulsion speed of the propulsion device, the presence or absence of an obstacle around the propulsion device, and the like as the propulsion status.

In step S1653, the external information detection unit 1617 and/or the microcomputer 1631 determines whether or not the propulsion status satisfies the safety condition. That is, whether or not the propulsion status satisfies the safety condition is determined according to whether or not the propulsion speed of the propulsion device is higher than a predetermined speed, whether or not an obstacle around the propulsion device exists within a predetermined distance, and the like.

In step S1653, in a case where it is determined that the propulsion status does not satisfy the safety condition, the processing proceeds to step S1654.

In step S1654, the external information detection unit 1617 and/or the microcomputer 1631 changes the control of the propulsion such that the propulsion status satisfies the safety condition, and the processing returns to step S1652.

That is, for example, the external information detection unit 1617 and/or the microcomputer 1631 controls the drive system control unit 1615 and the body system control unit 1616 until the propulsion status satisfies the safety condition, and repeats, for example, processing of changing the propulsion control so that the propulsion speed of the propulsion device becomes lower than a predetermined speed or changing the propulsion control so that an obstacle around the propulsion device does not exist within a predetermined distance.

Then, in step 1653, in a case where it is determined that the propulsion status satisfies the safety condition, the processing proceeds to step S1655.

In step S1655, the external information detection unit 1617 and/or the microcomputer 1631 corresponding to the application processor 1212 terminates the high-speed data transmission with the imaging unit 1618 corresponding to the image sensor 1211.

By the above processing, the external information detection unit 1617 and/or the microcomputer 1631 corresponding to the application processor 1212 does not immediately terminate the high-speed data transmission even if the abnormality message is supplied from the imaging unit 1618 corresponding to the image sensor 1211, and terminates the high-speed data transmission after changing the propulsion control until the propulsion status satisfies the safety condition.

Therefore, even if it is known that an abnormality has occurred in the imaging unit 1618 corresponding to the image sensor 1211, the high-speed data transmission is not immediately terminated and the image data required for the propulsion control is not suddenly transmitted, and it is possible to prevent the propulsion control from falling into a fatal state.

<Propulsion Control Processing (Part 2)>

The application processor 1212 of the propulsion control system 1600 that controls the propulsion device may include an image device (a first sensor that communicates with a first information processing device or a first processor) that captures or displays image data and another data device (a second sensor that communicates with a second information processing device, the first processor, or a second processor) that acquire or display another data.

The propulsion control system 1600 may investigate the status of the image device (first sensor) and preferentially use image data of the image device (data acquired by the first sensor) for the propulsion control in a case where no abnormality occurs in the image device (first sensor).

Furthermore, in a case where an abnormality has occurred in the image device (first sensor), the propulsion control system 1600 may notify the user of the propulsion device of a small warning. Then, the propulsion control system may investigate the status of the another data device (second sensor) and preferentially use another data (data acquired by the second sensor) of the another data device for the propulsion control in a case where no abnormality has occurred in the another data device (second sensor).

Moreover, in a case where an abnormality has occurred in the another data device (second sensor), the propulsion control system 1600 may notify the user of the propulsion device of a large warning and then transfer the propulsion control to the user to terminate the high-speed data transmission.

Note that the image device (first sensor) and the another data device (second sensor) may have the same type of configuration or different types of configurations. That is, the image device (first sensor) and the another data device (second sensor) may be any of image sensors such as a visible light sensor, an infrared light sensor, an ultraviolet light sensor, a polarization sensor, a distance measuring sensor, a ToF sensor, or a LiDAR sensor, a millimeter wave radar sensor, an ultrasonic radar sensor, a GPS sensor, a GNSS sensor, an RF distance measuring sensor, an RF positioning sensor, or the like.

Here, the above-described propulsion control processing by the propulsion control system 1600 will be described with reference to a flowchart of FIG. 162.

In step S1671, the external information detection unit 1617 and/or the microcomputer 1631 corresponding to the application processor 1212 investigate the status of the image device (first sensor). More specifically, the external information detection unit 1617 and/or the microcomputer 1631 investigate the status by, for example, acquiring a diagnosis result of abnormality diagnosis in the image device (first sensor).

In step S1672, the external information detection unit 1617 and/or the microcomputer 1631 determines whether or not an abnormality has occurred in the image device (first sensor) on the basis of the status of the image device (first sensor).

In step S1672, in a case where it is determined that no abnormality has occurred in the image device (first sensor), the processing proceeds to step S1673.

In step S1673, the external information detection unit 1617 and/or the microcomputer 1631 preferentially uses the data acquired by the image device (first sensor) to control the propulsion of the propulsion device, and the processing returns to step S1671 and the subsequent processing is repeated.

That is, the propulsion of the propulsion device is controlled using the data acquired by the image device (first sensor) as long as no abnormality has occurred in the image device (first sensor).

In step S1672, in a case where it is determined that an abnormality has occurred in the image device (first sensor), the processing proceeds to step S1674.

In step S1674, the external information detection unit 1617 and/or the microcomputer 1631 controls the sound image output unit 1632 to present information of a small warning indicating that an abnormality has occurred in the image device (first sensor) to the user of the propulsion device using at least either a sound or an image using at least one of the audio speaker 1612, the display unit 1613, and the instrument panel 1614.

In step S1675, the external information detection unit 1617 and/or the microcomputer 1631 investigate the status of the another data device (second sensor). More specifically, the external information detection unit 1617 and/or the microcomputer 1631 investigate the status by acquiring the diagnosis result of the abnormality diagnosis in the another data device (second sensor).

In step S1676, the external information detection unit 1617 and/or the microcomputer 1631 determines whether or not an abnormality has occurred in the another data device (second sensor) on the basis of the status of the another data device (second sensor).

In step S1676, in a case where it is determined that no abnormality has occurred in the another data device (second sensor), the processing proceeds to step S1677.

In step S1677, the external information detection unit 1617 and/or the microcomputer 1631 preferentially uses the data acquired by the another data device (second sensor) to control the propulsion of the propulsion device, and the processing returns to step S1671 and the subsequent processing is repeated.

That is, even if an abnormality occurs in the image device (first sensor), the propulsion of the propulsion device is controlled using the data acquired by the another data device (second sensor) as long as no abnormality has occurred in the another data device (second sensor).

In step S1676, in a case where it is determined that an abnormality has occurred in the another data device (second sensor), the processing proceeds to step S1678.

In step S1678, the external information detection unit 1617 and/or the microcomputer 1631 controls the sound image output unit 1632 to present information of a large warning indicating that an abnormality has occurred in both the image device (first sensor) and the another data device (second sensor) to the user of the propulsion device using at least either a sound or an image using at least one of the audio speaker 1612, the display unit 1613, and the instrument panel 1614.

At this time, since the automated propulsion is difficult, information prompting the user to execute the propulsion control of the propulsion device may be presented in the large warning.

In step S1679, the external information detection unit 1617 and/or the microcomputer 1631 shifts the propulsion control of the propulsion device to control according to an operation signal generated by an operation of an operation unit (not illustrated) or the like by the user. Note that, before the processing of step S1679, the propulsion control of the propulsion device may be shifted to the control according to the operation signal generated by the operation of the operation unit (not illustrated) or the like by the user.

In step S1680, the external information detection unit 1617 and/or the microcomputer 1631 terminates the high-speed data transmission with the image device (first sensor) and the another data device (second sensor) corresponding to the image sensor 1211, and stops receiving input of the image data from the image device (first sensor) and the data from the another data device (second sensor).

By the above processing, when an abnormality occurs in the image device (first sensor) corresponding to the image sensor 1211, a small warning is presented to present the occurrence of the abnormality, and the propulsion control is executed on the basis of data acquired by the another data device (second sensor).

Furthermore, when an abnormality occurs in the another data device (second sensor) in addition to the imaging device (first sensor), a large warning is presented to present that the automated propulsion control is disabled due to the occurrence of the abnormality, so that the control is switched to the propulsion control by the user and the high-speed data communication is terminated.

Therefore, even if an abnormality occurs in some sensors (image devices (first sensors)) that acquire data required for propulsion control, propulsion control based on data acquired by other sensors (another data devices (second sensor)) can be performed, so that propulsion control with higher safety can be implemented.

Furthermore, in a case where an abnormality occurs in all the sensors, the propulsion control is shifted to the user, so that the propulsion control is not continued with uncertain data acquired by the sensors in which the abnormality has occurred, and safe propulsion control can be implemented.

<Propulsion Control Processing (Part 3)>

In a case where the abnormality message is received (for example, received one time, received a plurality of times, or continuously received) as the unique message, (the external information detection unit 1617 and/or the microcomputer 1631 corresponding to the application processor 1212 of) the propulsion control system 1600 that controls the propulsion of the propulsion device may investigate the propulsion status and terminate the high-speed data transmission in a case of a state where the high-speed data transmission can be terminated.

Furthermore, in a case of a state where the high-speed data transmission cannot be terminated, (the external information detection unit 1617 and/or the microcomputer 1631 corresponding to the application processor 1212 of) the propulsion control system 1600 that controls the propulsion of the propulsion device may request the image sensor 1211 to maintain the high-speed data transmission.

Therefore, the high-speed data transmission is terminated not by the imaging unit 1618 (corresponding to the image sensor 1211) of the propulsion control system 1600 but by the external information detection unit 1617 and/or the microcomputer 1631 (corresponding to the application processor 1212) that controls the propulsion of the propulsion device. Therefore, it is possible to avoid a defect caused by unilaterally terminating the high-speed data transmission on the image sensor 1211 side.

Furthermore, the imaging unit 1618 corresponding to the image sensor 1211 may transmit the abnormality message as the unique message in a case where termination of the high-speed data transmission is necessary, and may terminate the high-speed data transmission in a case where the propulsion device does not request maintenance of the high-speed data transmission after the abnormality message satisfies the predetermined condition (for example, after a predetermined time has elapsed, after a predetermined number of abnormality messages has been transmitted, or after the abnormality message having a countdown function or a countup function has reached a predetermined value).

Meanwhile, in a case where maintenance of the high-speed data transmission is requested from the propulsion device ((corresponding to the application processor 1212 of) the external information detection unit 1617 and/or the microcomputer 1631), the imaging unit 1618 corresponding to the image sensor 1211 may extend termination schedule of the high-speed data transmission. For example, a predetermined time or a predetermined number of times may be extended, or a count value indicating a countdown or a countup may be reset (for example, reset to an initial value).

Note that (the imaging unit 1618 corresponding to) the image sensor 1211 may want to terminate the high-speed data transmission in order to perform any high-speed data transmission disabling processing such as updating, initializing, resetting, restarting, or completely blocking some function, for example. However, if the high-speed data transmission is terminated without permission from the external information detection unit 1617 and/or the microcomputer 1631 corresponding to the application processor 1212, an accident of the propulsion device may occur.

By the above-described processing, since the imaging unit 1618 corresponding to the image sensor 1211 does not terminate the high-speed data transmission without permission from the external information detection unit 1617 and/or the microcomputer 1631 corresponding to the application processor 1212, a defect caused by the sudden termination of the high-speed data transmission from the imaging unit 1618 to the application processor 1212 is avoided.

As such, the image device and processor may be part of the propulsion device with the propulsion unit in which propulsion is controlled, either directly or indirectly, as needed, using the image data.

Next, the above-described propulsion control processing will be described with reference to flowcharts of FIGS. 163 and 164.

Note that the flowchart of FIG. 163 represents processing of the external information detection unit 1617 and/or the microcomputer 1631 corresponding to the application processor 1212 in the propulsion control system 1600 that controls the propulsion device, and the flowchart of FIG. 164 represents processing of the imaging unit 1618 corresponding to the image sensor 1211.

In step S1691 (FIG. 163), the external information detection unit 1617 and/or the microcomputer 1631 determines whether or not (the unique message including) the abnormality message has been received from the imaging unit 1618 corresponding to the image sensor 1211, and repeats similar processing until it is determined that the abnormality message has been received.

In step S1691, in a case where it is determined that the abnormality message has been received, the processing proceeds to step S1692.

In step S1692, the external information detection unit 1617 and/or the microcomputer 1631 investigates the propulsion status.

In step S1693, the external information detection unit 1617 and/or the microcomputer 1631 determines whether or not it is a state where the high-speed data transmission can be terminated on the basis of the propulsion status.

In step S1693, it is the state where the high-speed data transmission can be terminated, the processing proceeds to step S1694.

In step S1694, the external information detection unit 1617 and/or the microcomputer 1631 terminates the high-speed data communication, stops receiving the supply of the image data from the imaging unit 1618 corresponding to the image sensor 1211, and terminates the processing.

On the other hand, in step S1963, it is not the state where the high-speed data transmission can be terminated, the processing proceeds to step S1695.

In step S1695, the external information detection unit 1617 and/or the microcomputer 1631 transmits information requesting maintenance of the high-speed data transmission to the imaging unit 1618 corresponding to the image sensor 1211.

Meanwhile, in step S1711, the imaging unit 1618 corresponding to the image sensor 1211 determines whether or not an abnormality has occurred and it is a state where termination of the high-speed data transmission is necessary, and repeats similar processing until it is determined to be necessary.

In step S1711, in a case where it is determined that termination of the high-speed data transmission is necessary, the processing proceeds to step S1712.

In step S1712, the imaging unit 1618 transmits the unique message including the abnormality message to the external information detection unit 1617 and/or the microcomputer 1631 corresponding to the application processor 1212.

In step S1713, the imaging unit 1618 determines whether or not the abnormality message satisfies a predetermined condition. The predetermined condition is, for example, whether or not a predetermined time has elapsed, whether or not a predetermined number of abnormality messages have been transmitted, whether or not the abnormality message having a countdown function or a countup function has reached a predetermined value, or the like.

In step S1713, in a case where it is determined that the abnormality message satisfies the predetermined condition, the processing proceeds to step S1714.

In step S1714, the imaging unit 1618 determines whether or not there is a request for the maintenance of the high-speed data transmission from the external information detection unit 1617 and/or the microcomputer 1631 corresponding to the application processor 1212.

In step S1714, in a case where it is determined that there is a request for the maintenance of the high-speed data transmission, the processing proceeds to step S1715.

In step S1715, the imaging unit 1618 extends the termination schedule of the high-speed data transmission, and the processing returns to step S1711.

On the other hand, in step S1714, in a case where it is determined that there is no request for the maintenance of the high-speed data transmission, the processing proceeds to step S1716.

In step S1716, the imaging unit 1618 terminates the high-speed data transmission, and stops transmitting the image data to the external information detection unit 1617 and/or the microcomputer 1631 corresponding to the application processor 1212.

By the above processing, the high-speed data transmission is terminated not by the imaging unit 1618 (corresponding to the image sensor 1211) but by the external information detection unit 1617 and/or the microcomputer 1631 (corresponding to the application processor 1212) of the propulsion control system 1600 that controls the propulsion of the propulsion device. Therefore, it is possible to avoid a defect caused by unilaterally terminating the high-speed data transmission on the image sensor 1211 side.

Note that the description has been given using an example in which the possibility of occurrence of or occurrence of the abnormality (negative situation) in the imaging unit 1618 corresponding to the image sensor 1211 is warned, but the present embodiment is not limited thereto.

For example, a possibility of occurrence of or occurrence of a positive status may be transmitted to the imaging unit 1618 corresponding to the image sensor 1211. Furthermore, a possibility of occurrence of or occurrence of a change in a status that is not negative or not positive in the imaging unit 1618 corresponding to the image sensor 1211 may be transmitted.

Therefore, the above-described abnormality message may be a message different from the normal time or usual time, such as an improvement message or a change message. As described above, at the normal time or usual time, a normality message or a usuality message may be transmitted as the unique message. Furthermore, only in a case different from the normal time or usual time, the unique message may be transmitted. Furthermore, although the description has been given using an example in which the unique message is used in the propulsion control system 1600 in the propulsion device, the present embodiment is not limited thereto, and the unique message may be used in any mobile device such as a smartphone or a digital camera. Furthermore, the description has been given using an example in which the unique message is transmitted while maintaining an image data stream, but the present embodiment is not limited thereto, and for example, the unique message may be configured to be transmitted after the image data transmission is stopped.

The timing or position of an element constituting any drawing such as a block diagram or a flowchart is an example, and may be configured to be different. The embodiment described in each example has various modifications. That is, the components of each example described above may be partially omitted, partially or entirely changed, or partially or entirely altered.

Furthermore, some of the components may be replaced with other components, or some or all of the components may be added with other components. Moreover, a part or all of the components may be divided into a plurality of components, the part or all may be separated into a plurality of components, or at least some of the plurality of divided or separated components may have different functions or characteristics.

Moreover, at least a part of the components may be moved to form different embodiments. Moreover, a coupling element or a relay element may be added to at least some of combinations of the component to form different embodiments.

In addition, a switching function may be added to at least some of the combinations of the components to form different embodiments. The present embodiments are not limited to the above-described embodiments, and various modifications can be made without departing from the gist of the present technology. Note that the effects described in the present specification are merely examples and are not limited, and other effects may be exhibited.

In the present specification, the processing performed by the computer in accordance with the program does not necessarily have to be performed in chronological order in accordance with the order described as the flowchart. In other words, the processing performed by the computer according to the program also includes processing executed in parallel or individually (for example, parallel processing or processing by an object).

Furthermore, the program may be processed by one computer (processor) or may be processed in a distributed manner by a plurality of computers. Moreover, the program may be transferred to a remote computer and executed. Moreover, in the present specification, the term "system" means a group of a plurality of components (devices, modules (parts), and the like), and whether or not all the configuration elements are in the same housing is irrelevant.

Therefore, a plurality of devices housed in separate housings and connected via a network, and one device that houses a plurality of modules in one housing are both systems.

Furthermore, for example, the configuration described as one device (or processing unit) may be divided into and configured as a plurality of devices (or processing units). On the contrary, the configuration described as a plurality of devices (or processing units) may be collectively configured as one device (or processing unit).

Moreover, a configuration other than the above-described configuration may be added to the configuration of each device (or each processing unit). Furthermore, a part of the configuration of a certain device (or processing unit) may be included in the configuration of another device (or another processing unit) as long as the configuration and operation of the system as a whole are substantially the same.

Moreover, for example, in the present technology, a configuration of cloud computing in which one function is shared and processed in cooperation by a plurality of devices via a network can be adopted. Furthermore, for example, the above-described program can be executed by an arbitrary device.

In that case, the device is only required to have necessary functions (functional blocks and the like) and obtain necessary information. Furthermore, for example, the steps described in the above-described flowcharts can be executed by one device or can be executed by a plurality of devices in a shared manner.

Moreover, in a case where a plurality of processes is included in one step, the plurality of processes included in the one step can be executed by one device or can be shared and executed by a plurality of devices. In other words, the plurality of processes included in one step can be executed as processes of a plurality of steps. Conversely, the processing described as a plurality of steps can be collectively executed as one step.

Note that, in the program executed by the computer, the processing of the steps describing the program may be executed in chronological order according to the order described in the present specification, or may be individually executed in parallel or at necessary timing when a call is made, for example. That is, the processing of each step may be executed in an order different from the above-described order as long as no contradiction occurs.

Moreover, the processing of the steps describing the program may be executed in parallel with the processing of another program, or may be executed in combination with the processing of another program.

Furthermore, the plurality of present technologies described in the present specification can be implemented independently of one another as a single unit as long as there is no inconsistency. Of course, an arbitrary number of the present technologies can be implemented together. For example, part or whole of the present technology described in any of the embodiments can be implemented in combination with part or whole of the present technology described in another embodiment. Furthermore, part or whole of the above-described arbitrary present technology can be implemented in combination with another technology not described above.

<Method for Stopping Data Stream>

(HEARTBEAT Function)

The HEARTBEAT function is used to determine whether or not a session needs to continue in a case where the function is supported by both the requester and the responder.

Here, the requester and the responder are configurations respectively corresponding to the application processor 1212 and the image sensor 1211, may have one or more communication channels through a session.

Hereinafter, description will be given using an example in which a session is formed using a configuration in which the external information detection unit 1617 and/or the microcomputer 1631 corresponding to the application processor 1212 is the requester and the imaging unit 1618 corresponding to the image sensor 1211 is the responder in the propulsion control system 1600 that controls the propulsion of the propulsion device as an example. Of course, the external information detection unit 1617 and/or the microcomputer 1631 may be the responder, and the imaging unit 1618 may be the requester.

While in a session, the requester or the responder transmits a HEARTBEAT request message within a HEART- BEAT period (HeartbeatPeriod). The HeartbeatPeriod is stored and specified by the Responder in Param1 in the PSK_EXCHANGE_RSP response message or in the Successful KEY_EXCHANGE_RSP response message, for example.

The HEARTBEAT request message transmission side terminates the session in a case where no HEARTBEAT_ACK response message or ERROR response message from the HEARTBEAT request message reception side is received within "a predetermined value (for example, 2)×a HEARTBEAT period (=a first time)".

The HEARTBEAT request message transmission side may retry transmission of the HEARTBEAT request message and waits for a response from the HEARTBEAT request message reception side for a predetermined time before retrying.

The HEARTBEAT request message reception side terminates the session in a case where no HEARTBEAT request message is received within "the predetermined value (or example, 2)×the HEARTBEAT period".

In such a case, there is a possibility that the data stream is stopped due to the operation of the imaging unit 1618 due to an attack or a malfunction on the imaging unit 1618 corresponding to the image sensor 1211.

For example, in a case where the imaging unit 1618 corresponding to the image sensor 1211 is mounted on the propulsion device such as a vehicle, a drone, or a robot, and the data stream from the imaging unit 1618 is used in the external information detection unit 1617 and/or the microcomputer 1631 of the propulsion control system 1600 that controls propulsion of the propulsion device, the propulsion control is affected if the data stream suddenly stops, and in the worst case, a fatal accident may be caused.

Therefore, in a case where the data stream is stopped, the HEARTBEAT function is disabled (HBEAT_CAP=0), and the data stream is prevented from being stopped by the responder (the imaging unit 1618 corresponding to the image sensor 1211) without permission of the requester (the external information detection unit 1617 and/or a microcomputer 1631 corresponding to the application processor 1212).

By preventing the data stream from being stopped without permission of the requester (the external information detection unit 1617 and/or a microcomputer 1631 corresponding to the application processor 1212.), it is possible to avoid the stop of the data stream caused by the operation of the responder (the imaging unit 1618 corresponding to the image sensor 1211).

Furthermore, the requester (the external information detection unit 1617 and/or a microcomputer 1631 corresponding to the application processor 1212.) may determine whether or not the session needs to continue on the basis of the count value (for example, the value of the message counter) transmitted from the responder (the imaging unit 1618 corresponding to the image sensor 1211).

Moreover, in a case where the data stream suddenly stops, the HEARTBEAT function is enabled (HBEAT_CAP=1), and session termination regarding the HEARTBEAT period may not be set as a mandatory requirement (for example, it is expressed as "shall" or "must") but may be set outside the mandatory requirement (any requirement expressed by, for example, "should" or "may"). Specifically, the session termination regarding the HEARTBEAT period may be set as a mandatory requirement for the HEARTBEAT request message transmission side, whereas the session termination may be set outside the mandatory requirement for the HEARTBEAT request message reception side. Furthermore, the session termination regarding the HEARTBEAT period may be set outside the mandatory requirement for the HEARTBEAT request message transmission side, whereas the session termination may be set as the mandatory requirement for the HEARTBEAT request message reception side. Furthermore, the session termination regarding the HEARTBEAT period may be set outside the mandatory requirement for the HEARTBEAT request message transmission side, and the session termination may be set outside the mandatory requirement for the HEARTBEAT request message reception side. Note that a publicly available SPDM-standard may define the session termination regarding the HEARTBEAT period not as the mandatory requirement but as outside the mandatory requirement, a security standard that refers to a part or all of the SPDM-standard may define the session termination regarding the HEARTBEAT period not as the mandatory requirement but as outside the mandatory requirement, or a security standard that does not refer to the SPDM-standard may define the session termination regarding the HEARTBEAT period not as the mandatory requirement but as outside the mandatory requirement.

Furthermore, the responder (the imaging unit 1618 corresponding to the image sensor 1211) may include a detection circuit or a prediction circuit for an attack or a malfunction with respect to the responder itself, and may detect or predict that there is a possibility of occurrence of a unique status in the responder itself or in the image data (including the unique situation has already occurred).

For example, when the responder (the imaging unit 1618 corresponding to the image sensor 1211) transmits a HEARTBEAT_NAK response message to the requester (the external information detection unit 1617 and/or a microcomputer 1631 corresponding to the application processor 1212) as a communication host, occurrence of a defect of the responder (imaging unit 1618) can be notified. Therefore, the requester (the external information detection unit 1617 and/or the microcomputer 1631) can determine necessity of stop of its own data stream (for example, as Value, Reserved areas of 0x00, 0x05-0x5F, 0x62, 0x6D-0x7D can be newly allocated).

When determining to stop the data stream, the requester (the external information detection unit 1617 and/or the microcomputer 1631) transmits an END_SESSION request to the responder (the imaging unit 1618), and stops the high-speed data communication for transmitting the data stream. Note that the transmission of the END_SESSION request may be executed after a predetermined time has elapsed since the determination to stop the data stream (for example, reception of the HEARTBEAT_NAK response message, reception of an ERROR response message, or elapse of the first time) or may be suspended until the propulsion status satisfies the safety condition.

As a result, the requester (the external information detection unit 1617 and/or the microcomputer 1631) can stop the data stream, for example, after a safe situation is obtained even if the data stream is stopped, and thus, it is possible to suppress the occurrence of the fatal accident caused by the influence on the propulsion control.

FIG. 165 illustrates a configuration example of Responder flag fields definitions for setting enabling (HBEAT_CAP=1) or disabling (HBEAT_CAP=0) of a HEARTBEAT function. Although this is a configuration example of the responder, similarly, the requester may support Requester flag fields definitions, and may support HBEAT_CAP in which the Value in Responder flag fields definitions is replaced from Responder to Requester. FIG. 166 illustrates a configuration example of the HEARTBEAT request message. FIG. 167 illustrates a configuration example of the HEARTBEAT_ACK response message. FIG. 168 illustrates a configuration example of the HEARTBEAT_NAK response message. FIG. 169 illustrates a configuration example of the END_SESSION request message. Note that a configuration example in which the Value of SPDMVersion is V1.1 or TBD is illustrated, but other Values (for example, V1.2 (=0x12), V1.3 (=0x13), V2.0 (=0x20)) may be used. Furthermore, in a case where there is a change from the publicly available SPDMVersion 1.1.0, for example, SPDMVersion may be set as another Value in a case where the session termination regarding the HEARTBEAT period is set as outside the mandatory requirement, not as the mandatory requirement. That is, at least any description of Offset, Bytes, or Value of SPDMVersion may conform to the latest specification of the publicly available SPDM-standard. Similarly, at least any description of Offset, Field, Bytes (Size in bytes), Value, Size, Bit, Description, Name, Error code, Error data, ExtendedErrorData, ID, Vendor ID length, Registry or standards body name, bit assign, Remarks, eDT, eVC, Addr, Initial Value, Setting Data, Attribute, Detail, Embedded Data Format Code, Security MAC, Security protocol, or the like used in the chart or description regarding the present application may conform to the SPDM standard, the standard in DMTF, the standard in MIPI, or the latest specification of another standard.

The HEARTBEAT_NAK response message is a unique message of the abnormality message. Furthermore, in the HEARTBEAT_NAK response message, the unique status may be notified by newly defining an area such as Param1 or Param2 and allocating corresponding bits. That is, any other unique message described above may be stored in the HEARTBEAT_NAK response message.

<HEARTBEAT Processing (Part 1)>

Next, HEARTBEAT processing (part 1) will be described with reference to the timing chart of FIG. 170.

Here, the left part of FIG. 170 illustrates operation timing of the external information detection unit 1617 and/or the microcomputer 1631 corresponding to the application processor 1212, which is the CCI host (requester).

Furthermore, the right part of FIG. 170 illustrates operation timing of the imaging unit 1618 corresponding to the image sensor 1211, which is the CCI device (responder).

That is, the CCI host (requester) transmits a PSK_FINISH request message to the CCI device (responder) by the processing of steps S1731 and S1751 (similar to a part of step S507 or S525).

By the processing of steps S1752 and S1732, the CCI device (responder) transmits a PSK_FINISH_RSP response message to the CCI host (requester) (similar to a part of step S507 or S525).

This processing enables the HEARTBEAT function.

By the processing of steps S1733 and S1753, the CCI host (requester) transmits the HEARTBEAT request message to the CCI device (responder).

In response to this, the CCI device (responder) transmits the HEARTBEAT_ACK response message to the CCI host (requester) by the processing of steps S1754 and S1734.

Thereafter, processing in which the CCI host (requester) transmits the HEARTBEAT request message to the CCI device (responder) every HEARTBEAT period (HeartbeatPeriod), and in response to this, the CCI device (responder) transmits the HEARTBEAT_ACK response message to the CCI host (requester) is repeated.

That is, as illustrated in steps S1733 to S1736 and S1753 to S1756, it is recognized that the communication state is normally established as long as this processing is continuously repeated.

Here, it is assumed that when an abnormality is detected in the CCI device (responder), that is, a communication state cannot be established. Then, the CCI device (responder) transmits the HEARTBEAT_NAK response message to the CCI host (requester) as in the processing in steps S1758 and S1738 with respect to the HEARTBEAT request message transmitted to the CCI host (requester) by the processing in steps S1737 and S1757. Note that, in a state where the communication state can be established, the HEARTBEAT_NAK response message may be transmitted to the CCI host (requester) as the abnormality message.

When the CCI host (requester) receives the HEARTBEAT_NAK response message by the processing of step S1738, the END_SESSION request message declaring the end of the session (and the high-speed data communication) is transmitted to the CCI device (responder) by the processing of step S1739, and the session key is discarded or cleaned up. Note that the CCI host (requester) may discard or clean up the session key after a predetermined time has elapsed since transmitting the END_SESSION request message, after receiving an END_SESSION_ACK response message, an END_SESSION_NAK response message, or the ERROR response message described below, from the CCI device (responder).

In response to this, when the CCI device (responder) receives the END_SESSION request message in step S1759, the CCI device (responder) transmits the END_SESSION_ACK response message to the CCI host (requester) in step S1760, discards or cleans up the session key, and terminates the session (and the high-speed data communication).

This processing disables the HEARTBEAT function.

By the above-described series of processing, even if an abnormality occurs in the CCI device, the HEARTBEAT_NAK response message is supplied to the CCI host, and after the series of processing is performed, the session (and the high-speed data communication) is terminated and the data stream is stopped. Therefore, the CCI device is prevented from stopping the data stream without permission from the CCI host.

Note that, in a case where the CCI device (responder) cannot receive the HEARTBEAT request message for each HEARTBEAT period (HeartbeatPeriod) for some reason, the CCI host (requester) transmits the END_SESSION request message to the CCI device (responder), and terminates the session (and the high-speed data communication).

That is, also in this case, the end of the session (and the high-speed data communication) is implemented by transmitting the END_SESSION request message according to the determination of the CCI host (requester), so that the CCI device is prevented from stopping the data stream without permission of the CCI host.

<HEARTBEAT Processing (Part 2)>

Even in a case where the CCI device (responder) detects an abnormality or a case where the HEARTBEAT request message is not received within a predetermined time (=the first time), the END_SESSION request message from the CCI host (requester) may not be received in the CCI device (responder) within a predetermined time (=a second time). Here, the first time is a time corresponding to "the predetermined value (for example, 2)×HEARTBEAT period (HeartbeatPeriod)", and the second time is a further elapsed time from when the time corresponding to "the predetermined value (for example, 2)×HEARTBEAT period (HeartbeatPeriod)" elapses until the END_SESSION request message is transmitted.

Therefore, in a case where the END_SESSION request message is not received by the CCI device (responder) within a predetermined time (=the second time), an END_SESSION_NAK response message indicating that the END_SESSION request message is not received by the CCI device (responder) within the predetermined time (=the second time) may be defined, and the CCI device (responder) may notify the CCI host (requester) of the END_SESSION_NAK response message.

FIG. 171 illustrates a configuration example of the END_SESSION_NAK response message indicating that the END_SESSION request message is not received by the CCI device (responder) within a predetermined time (=the second time).

Furthermore, in the END_SESSION_NAK response message, the unique status may be notified by newly defining an area such as Param1 or Param2 of FIG. 171 and allocating corresponding bits. That is, any of the above-described unique message, abnormality messages, or additional information may be stored.

Next, the HEARTBEAT processing (part 2) will be described with reference to the flowcharts of FIGS. 172 and 173.

Note that the flowchart of FIG. 172 represents processing of the CCI host (requester), and the flowchart of FIG. 173 represents processing of the CCI device (responder).

In step S1771 (FIG. 172), the CCI host (requester) transmits the PSK_FINISH request message to the CCI device (responder).

In response, in step S1791 (FIG. 173), the CCI device (responder) determines whether or not to transmit the PSK_FINISH_RSP response message to the CCI host (requester) on the basis of whether or not the PSK_FINISH request message has been transmitted, and repeats similar processing until determining to transmit the PSK_FINISH_RSP response message.

Then, in step S1791, in a case where it is determined to transmit the PSK_FINISH_RSP response message, the CCI device (responder) transmits the PSK_FINISH_RSP response message to the CCI host (requester) in step S1792.

Here, in step S1772, the CCI host (requester) determines whether or not the PSK_FINISH_RSP response message has been received from the CCI device (responder), and repeats similar processing until it is determined that the PSK_FINISH_RSP response message has been received.

In step S1772, in a case where it is determined that the PSK_FINISH_RSP response message has been received, the processing proceeds to step S1773.

In step S1773, the CCI host (requester) transmits the HEARTBEAT request message to the CCI device (responder).

In response, in step S1793 (FIG. 173), the CCI device (responder) determines whether or not the HEARTBEAT request message has been received.

In step S1793, in a case where it is determined that the HEARTBEAT request message has been received, the processing proceeds to step S1794.

In step S1794, the CCI device (responder) transmits the HEARTBEAT_ACK response message to the CCI host (requester), and the processing returns to step S1793.

Here, in step S1774 (FIG. 172), the CCI host (requester) determines whether or not the HEARTBEAT_ACK response message has been received.

In step S1774, in a case where it is determined that the HEARTBEAT_ACK response message has been received, the processing returns to step S1773.

The processing of steps S1773 and S1774 (FIG. 172) and steps S1793 and S1794 (FIG. 173) is repeated as long as the processing in which the CCI host (requester) transmits the HEARTBEAT request to the CCI device (responder) and the CCI device (responder) returns the HEARTBERAT_ACK response message to the CCI host (requester) in response is repeated.

That is, the processing in which the CCI host (requester) transmits the HEARTBEAT request message to the CCI device (responder) in the HEARTBEAT period (HeartbeatPeriod), and the CCI device (responder) returns the HEARTBERAT_ACK response message to the CCI host (requester) in response is repeated as long as the state where the communication between the CCI host (requester) and the CCI device (responder) is established is maintained.

On the other hand, in step S1793 (FIG. 173), in a case where it is determined that the HEARTBEAT request message is not received, the processing proceeds to step S1795.

In step S1795, the CCI device (responder) determines whether or not an abnormality has been detected by the abnormality diagnosis.

In step S1795, in a case where it is determined that an abnormality has been detected, the processing proceeds to step S1796.

In step S1796, the CCI device (responder) transmits the HEARTBERAT_NAK response message to the CCI host (requester).

In response, in step S1774 (FIG. 172), in a case where it is determined that the HEARTBERAT_ACK response message is not received, the processing proceeds to step S1775.

In step S1775, the CCI device (responder) determines whether or not the HEARTBERAT_NAK response message has been received.

In step S1775, in a case where it is determined that the HEARTBERAT_NAK response message has been received, the processing proceeds to step S1777.

In step S1777, the CCI host (requester) transmits the END_SESSION request message to the CCI device (responder).

In step S1778, the CCI host (requester) discards or cleans up the session key, and terminates the session (and the high-speed data communication).

In response, in step S1798 (FIG. 173), the CCI device (responder) determines whether or not the END_SESSION request message has been received after the first time has elapsed and before the second time has further elapsed.

In step S1798, in a case where it is determined that the END_SESSION request message has been received, the processing proceeds to step S1799.

In step S1799, the CCI device (responder) transmits the END_SESSION_ACK response message to the CCI host (requester).

In step S1800, the CCI device (responder) discards or cleans up the session key and terminates the session (and the high-speed data communication).

That is, when an abnormality is detected in the CCI device (responder), the HEARTBERAT_NAK response message is transmitted to the CCI host (requester), the END_SESSION request message is transmitted to the CCI device (responder), and the ENDSESSION_ACK response message is transmitted to the CCI host (requester) in response, so that in both the CCI host (requester) and the CCI device (responder), the session key is discarded or cleaned up, and the session (and the high-speed data communication) ends.

Furthermore, in step S1795 (FIG. 173), in a case where no abnormality is detected, the processing proceeds to step S1797.

In step S1797, the CCI device (responder) determines whether or not the first time has elapsed since receiving the immediately preceding HEARTBERAT request message.

In step S1797, in a case where it is determined that the first time period has not elapsed since receiving the immediately preceding HEARTBERAT request message, the processing returns to step S1793.

Meanwhile, in step S1775, in a case where it is determined that the HEARTBERAT_NAK response message is not received, the processing proceeds to step S1776.

In step S1776, the CCI device (responder) determines whether or not the first time has elapsed since transmitting the immediately preceding HEARTBERAT request.

In step S1776, in a case where it is determined that the first time corresponding to "the predetermined value (for example, 2)×the HEARTBEAT period (HeartbeatPeriod)" has not elapsed since transmitting the immediately preceding HEARTBERAT request message, the processing returns to step S1774.

That is, in a case where no abnormality is detected in the state where the CCI device (responder) cannot receive the HEARTBEAT request message, the processing of steps S1774 to S1776 (FIG. 172) and the processing of steps S1793, S1795, and S1797 (FIG. 173) are repeated until the first time elapses.

Then, in step S1776 (FIG. 172), when the first time has elapsed, the processing proceeds to steps S1777 and S1778, and the CCI host (requester) transmits the END_SESSION request message, discards or cleans up the session key, and terminates the session (and the high-speed data communication).

Furthermore, in the CCI device (responder), in step S1797 (FIG. 173), when the first time has elapsed, the processing proceeds to step S1798.

In this case, the processing of steps S1798 to S1800 is performed.

Therefore, even in a state where no abnormality is detected in the CCI device (responder), when a state where the HEARTBEAT request message cannot be received for the first time or longer continues in the CCI device (responder), the session (and the high-speed data communication) is terminated on the basis of the END_SESSION request message from the CCI host (requester).

Moreover, in step S1798, in a case where it is determined that the END_SESSION request message is not received after the first time elapses and before the second time elapses from when the HEARTBEAT request message is received last time, the processing proceeds to step S1801.

In step S1801, the CCI device (responder) transmits the END_SESSION_NAK response message to the CCI host (requester).

As a result, in a case where the state where the END_SESSION request message cannot be received in the CCI device (responder) for some reason continues for the second time or longer after the first time elapses from when the HEARTBEAT request message is received last time, the END_SESSION_NAK response message is transmitted to the CCI host (requester), and the session (and the high-speed data communication) is terminated.

In this case, the CCI device (responder) terminates the high-speed data communication at its own discretion, but since the END_SESSION_NAK response message is transmitted to the CCI host (requester), the CCI host (requester) can recognize that the high-speed data communication is terminated in the CCI device (responder).

Furthermore, in this processing, in a case where an abnormality is detected, the abnormality is immediately notified from the CCI device (responder) to the CCI host (requester) before waiting for a predetermined time (=the first time). Moreover, the HEARTBEAT_NAK response message may be replaced with the above-described unique message, abnormality message, or additional information. Note that processing similar to step S1796 (transmitting the HEARTBEAT_NAK response) may be added between the processing of step S1797 (first time has elapsed?) and the processing of step S1798 (END_SESSION request has been received within the second time?). That is, in a case where the first time has elapsed, the HEARTBEAT_NAK response may be transmitted. Furthermore, a part (for example, Param1 or Param2) or whole of the message may be different between the HEARTBEAT_NAK response in the case where an abnormality is detected and the HEARTBEAT_NAK response in the case where the first time has elapsed.

<HEARTBEAT Processing (Part 3)>

At least one of the HEARTBEAT_NAK response or the END_SESSION_NAK response message may be omitted.

Here, the HEARTBEAT processing (part 3) in which both the HEARTBEAT_NAK response message and the END_SESSION_NAK response message are omitted will be described with reference to the flowcharts of FIGS. 174 and 175.

Note that the flowchart of FIG. 174 represents processing of the CCI host (requester), and the flowchart of FIG. 175 represents processing of the CCI device (responder).

Here, since the processing of steps S1811 to S1817 of FIG. 174 corresponds to the processing of steps S1771 to S1774 and steps S1776 to S1778 of FIG. 172, description thereof is omitted. Furthermore, since processing of steps S1831 to S1838 of FIG. 175 corresponds to the processing of steps S1791 to S1794 and steps S1797 to S1800 of FIG. 173, description thereof is omitted.

That is, in the processing of the CCI host (requester) in FIG. 174, in the case where the first time has elapsed since the previous reception of the HEARTBEAT request message, it is considered that the communication with the CCI device (responder) is disabled, regardless of the presence or absence of the abnormality based on the abnormality diagnosis result, the END_SESSION request message is transmitted, and the session (and the high-speed data communication) is terminated.

Furthermore, in the processing of the CCI device (responder) of FIG. 175, in a case where the next HEARTBEAT_ACK response message cannot be received until the first time elapses after the previous reception of the HEARTBEAT_ACK response message, it is considered that the communication with the CCI host (requester) is disabled, and further, in a case where the END_SESSION request message is transmitted before the second time elapses, the END_SESSION_ACK response message is transmitted, and the session (and the high-speed data communication) is terminated.

Meanwhile, when the END_SESSION request message is not transmitted until the second time elapses, the session (and the high-speed data communication) is terminated as it is.

Also in the above processing, in a case where the CCI device (responder) cannot receive the HEARTBEAT request message for each HEARTBEAT period (HeartbeatPeriod)

for some reason, the session (and the high-speed data communication) can be terminated.

Furthermore, also in this processing, the end of the session (and the high-speed data communication) is basically implemented by transmitting the END_SESSION request message according to the determination of the CCI host (requester), so that the CCI device is prevented from stopping the data stream without permission of the CCI host. However, in this processing, in a case where the END_SESSION request message cannot be received for the second time or longer, the session including the high-speed data communication is terminated by the determination of the CCI device (responder).

Application Example 1 of HEARTBEAT Processing

The CCI device (responder) may transmit the ERROR response message to the CCI host (requester) in a case where an abnormality such as an error or a defect occurs.

That is, the CCI device (responder) may transmit, to the CCI host (requester), the ERROR response message corresponding to the error or the defect related to the HEARTBEAT function instead of at least one of the HEARTBEAT_NAK response message or the END_SESSION_NAK response message.

The ERROR response message has a configuration illustrated in FIG. 176, for example. As illustrated in FIG. 176, in the ERROR response message, for example, areas of Param1 (Error code), Param2 (Error data), and ExtendedErrorData are defined, and corresponding bits are allocated so that a unique status may be notified.

That is, at least one of the above-described unique message, abnormality message, or additional information may be stored. Furthermore, an existing Error code (for example, Unspecified, InvalidSession (Value:0x02, Description: The record layer used an invalid session ID., error data: This shall be the invalid session ID., ExtendedErrorData: No extended error data is provided.)) may be used as the ERROR response message corresponding to the error or the defect related to the HEARTBEAT function, the END_SESSION request message, or the like.

FIG. 177 illustrates a setting example of Error code and Error data. Note that Reserved area or Vendor/Other Standards Defined area may be newly defined as error areas corresponding to the error or the defect related to the HEARTBEAT function, the END_SESSION request message, or the like. Furthermore, a setting in the Error code and error data table in the SPDM-specification defined by the publicly available SPDM-standard may be used. FIG. 178 illustrates a setting example of ExtendedErrorData.

Application Example 2 of HEARTBEAT Processing

The HEARTBEAT function may be implemented in a pseudo manner by pseudo-defining the HEARTBEAT request message in the VENDOR_DEFINED_REQUEST request message and pseudo-defining the HEARTBEAT_ACK response (and the HEARTBEAT_NAK response) message in the VENDOR_DEFINED_RESPONSE response message instead of the HEARTBEAT request and the HEARTBEAT_ACK response.

Hereinafter, the pseudo HEARTBEAT function implemented by the VENDOR_DEFINED_REQUEST request message and the VENDOR_DEFINED_RESPONSE response message is simply referred to as a pseudo HEARTBEAT function.

That is, in a case where the pseudo HEARTBEAT function is used, the HEARTBEAT function can be disabled (HBEAT_CAP=0).

Note that FIG. 179 illustrates a setting example of Registry or standards body ID in the case where the pseudo HEARTBEAT function is implemented. Note that the setting in the Registry or standards body ID table in the SPDMs specification defined by the publicly available SPDMs standard may be used. That is, the present technology may be applied to a standard defined by at least any of standards bodies of Distributed Management Task Force (DMTF), Trusted Computing Group (TCG), Universal Serial Bus (USB), Peripheral Component Interconnect Special Interest Group (PCI-SIG), Internet Assigned Numbers Authority (IANA), HDBaseT, Mobile Industry Processor Interface (MIPI), Compute Express Link (CXL), Joint Electron Device Engineering Council (JEDEC), or the like, or may be applied to a HEARTBEAT equivalent function or an END_SESSION equivalent function in a standard defined by at least any of these standards bodies or other standards bodies. Furthermore, FIGS. 180 and 181 illustrate setting examples of the VENDOR_DEFINED_REQUEST request message and the VENDOR_DEFINED_RESPONSE response message in a case where the pseudo HEARTBEAT functions are implemented, respectively. Note that the pseudo HEARTBEAT function may be defined by other messages conforming to the SPDM standard, messages conforming to the CCI standard, messages conforming to other standards, or the like. Similarly, the END_SESSION function may be implemented in a pseudo manner by pseudo-defining the END_SESSION request message in the VENDOR_DEFINED_REQUEST request message and pseudo-defining the END_SESSION_ACK response (and the END_SESSION_NAK response) message in the VENDOR_DEFINED_RESPONSE response message instead of the END_SESSION request and the END_SESSION_ACK response. Hereinafter, the pseudo END_SESSION function implemented by the VENDOR_DEFINED_REQUEST request message and the VENDOR_DEFINED_RESPONSE response message is simply referred to as a pseudo END_SESSION function. Note that the pseudo END_SESSION function may be defined by other messages conforming to the SPDM standard, messages conforming to the CCI standard, messages conforming to other standards, or the like.

<Configuration Example of Computer>

FIG. 182 is a block diagram illustrating a configuration example of hardware of a computer that executes the above-described series of processing by a program.

In the computer, a central processing unit (CPU) 2201, a read only memory (ROM) 2202, a random access memory (RAM) 2203, and an electronically erasable programmable read only memory (EEPROM) 2204 are mutually connected by a bus 2205. An input/output interface 2206 is further connected to the bus 2205, and the input/output interface 2206 is connected to the outside.

In the computer configured as described above, the CPU 2201 loads, for example, a program stored in the ROM 2202 and the EEPROM 2204 into the RAM 2203 via the bus 2205 and executes the program, so that the above-described series of processing is performed. Furthermore, the program executed by the computer (CPU 2201) can be written in advance in the ROM 2202, installed in the EEPROM 2204 from the outside via the input/output interface 2206, or updated.

Here, in the present specification, the processing performed by the computer in accordance with the program does not necessarily have to be performed in chronological order in accordance with the order described as the flowchart. In other words, the processing performed by the computer according to the program also includes processing executed in parallel or individually (for example, parallel processing or processing by an object).

Furthermore, the program may be processed by one computer (processor) or may be processed in a distributed manner by a plurality of computers. Moreover, the program may be transferred to a remote computer and executed.

Moreover, in the present specification, the term "system" means a group of a plurality of components (devices, modules (parts), and the like), and whether or not all the configuration elements are in the same housing is irrelevant. Therefore, a plurality of devices housed in separate housings and connected via a network, and one device that houses a plurality of modules in one housing are both systems.

Furthermore, for example, the configuration described as one device (or processing unit) may be divided into and configured as a plurality of devices (or processing units). On the contrary, the configuration described as a plurality of devices (or processing units) may be collectively configured as one device (or processing unit). Furthermore, a configuration other than the above-described configuration may be added to the configuration of each device (or each processing unit). Moreover, a part of the configuration of a certain device (or processing unit) may be included in the configuration of another device (or another processing unit) as long as the configuration and operation of the system as a whole are substantially the same.

Furthermore, for example, in the present technology, a configuration of cloud computing in which one function is shared and processed in cooperation by a plurality of devices via a network can be adopted.

Furthermore, for example, the above-described program can be executed by an arbitrary device. In that case, the device is only required to have necessary functions (functional blocks and the like) and obtain necessary information.

Furthermore, for example, the steps described in the above-described flowcharts can be executed by one device or can be executed by a plurality of devices in a shared manner. Moreover, in a case where a plurality of processes is included in one step, the plurality of processes included in the one step can be executed by one device or can be shared and executed by a plurality of devices. In other words, the plurality of processes included in one step can be executed as processes of a plurality of steps. Conversely, the processing described as a plurality of steps can be collectively executed as one step.

Note that, in the program executed by the computer, the processing of the steps describing the program may be executed in chronological order according to the order described in the present specification, or may be individually executed in parallel or at necessary timing when a call is made, for example. That is, the processing of each step may be executed in an order different from the above-described order as long as no contradiction occurs. Moreover, the processing of the steps describing the program may be executed in parallel with the processing of another program, or may be executed in combination with the processing of another program.

Note that the plurality of present technologies described in the present specification can be implemented independently of one another as a single unit as long as there is no inconsistency. Of course, an arbitrary number of the present technologies can be implemented together. For example, part or whole of the present technology described in any of the embodiments can be implemented in combination with part or whole of the present technology described in another embodiment. Furthermore, part or whole of the above-described arbitrary present technology can be implemented in combination with another technology not described above.

<Combination Example of Configuration>

Note that the present technology can also have the following configurations.

<1> An information processing device including:

a communication unit configured to transmit, to another information processing device, or receive, from the another information processing device, when performing communication with the another information processing device to perform high-speed data transmission of transmitting data of a frame including image data in a predetermined direction between the information processing device and the another information processing device, an extended packet including an extended packet header and packet data, and a unique message capable of notifying that at least one of the information processing device, the another information processing device, or the image data is in a state different from a normal time or a usual time; and a protection unit configured to derive a session key and execute at least one of generation, verification, or decryption of protection data of the unique message, in which the image data is stored in the packet data, and the image data and the unique message are transmitted at different timings via a part or whole of a common communication path regarding the communication.

<2> The information processing device according to <1>, in which the communication unit transmits or receives low-speed command transmission in a reverse direction to the predetermined direction regarding the high-speed data transmission, the high-speed data transmission is faster than the low-speed command transmission, and at least transmission of frame start indicating that the frame is started and transmission of frame end indicating that the frame is ended are performed, and a plurality of the frames is continuously and periodically transmittable, and the frame includes frame blanking in which the image data is not transmitted between the frame end and the next frame start.

<3> The information processing device according to <2>, in which the low-speed command transmission includes transmission of a write instruction for requesting the information processing device or the another information processing device to write information, a read instruction for requesting the information processing device or the another information processing device to read information, or a read response according to the read instruction, and the unique message is transmitted as the write instruction, the read instruction, or the read response within a period of the frame blanking.

<4> The information processing device according to <2>, in which the frame includes embedded data that is transmitted by the high-speed data transmission within a period between the frame start and the frame end, the embedded data includes metadata related to the image data, and the unique message is stored in the embedded data and transmitted.

<5> The information processing device according to <2>, in which the low-speed command transmission includes transmission of a write instruction for requesting the information processing device or the another information processing device to write information, a read instruction for requesting the information processing device or the another information processing device to read information, or a read response according to the read instruction, the frame includes line blanking in which the image data is not transmitted between the frame start and the frame end, and the unique message is transmitted as the write instruction, the read instruction, or the read response within a period of the line blanking.

<6> The information processing device according to <2>, in which the unique message is stored inside the frame start or inside the frame end and transmitted.

<7> The information processing device according to any one of <1> to <6>, in which the frame includes data of a second virtual channel different from the image data that is a first virtual channel, and the unique message is stored in the data of the second virtual channel and transmitted.

<8> The information processing device according to any one of <1> to <7>, in which the extended packet further comprises an extended packet footer, the unique message is stored in the extended packet header in the extended packet in which the image data is stored, and the protection data is stored in the extended packet footer in the extended packet in which the image data is stored and transmitted.

<9> The information processing device according to any one of <1> to <8>, in which the communication unit includes transmission or reception of a HEARTBEAT request or a pseudo-HEARTBEAT request, and reception or transmission of a HEARTBEAT_ACK response or a pseudo-HEARTBEAT_ACK response within a predetermined time in response to the HEARTBEAT request or the pseudo-HEARTBEAT request, and the information processing device or the another information processing device transmits the unique message to a partner of the communication within the predetermined time as necessary.

<10> The information processing device according to any one of <1> to <8>, in which the communication unit includes transmission or reception of a HEARTBEAT request or a pseudo-HEARTBEAT request, and reception or transmission of a HEARTBEAT_ACK response or a pseudo-HEARTBEAT_ACK response within a predetermined time in response to the HEARTBEAT request or the pseudo-HEARTBEAT request, and the communication unit does not stop the high-speed data transmission and stops the transmission of the HEARTBEAT_ACK response or the pseudo-HEARTBEAT_ACK response in a case where the HEARTBEAT request or the pseudo-HEARTBEAT request is not normally received.

<11> The information processing device according <10>, in which a bit flag indicating non-support of the HEARTBEAT request and the HEARTBEAT_ACK response is set in at least one of the information processing device or the another information processing device, and the communication unit includes transmission or reception of the pseudo-HEARTBEAT request, and reception or transmission of the pseudo-HEARTBEAT_ACK response within a predetermined time in response to the pseudo-HEARTBEAT request.

<12> The information processing device according to any one of <1> to <11>, further including:

a pixel configured to capture or display the image data; and an interference detection unit configured to detect presence or absence of an interference or a possibility of the interference with the pixel or the image data, in which the unique message is a message related to a detection result of the interference detection unit.

<13> The information processing device according to any one of <1> to <12>, further including:

an obstacle detection unit configured to detect presence or absence of an obstacle or a possibility of the obstacle with respect to the communication path, in which the unique message is a message related to a detection result of the obstacle detection unit.

<14> The information processing device according to any one of <1> to <13>, further including:

an invasion detection unit configured to detect presence or absence of an invasion or a possibility of the invasion with respect to the protection unit, in which the unique message is a message related to a detection result of the invasion detection unit.

<15> The information processing device according to any one of <1> to <14>, further including:

a temperature detection unit configured to detect an internal temperature of the information processing device, in which the unique message is a message related to a detection result of the temperature detection unit.

<16> The information processing device according to any one of <1> to <15>, in which the high-speed data transmission is stopped by the information processing device after the unique message satisfies a predetermined stop condition.

<17> The information processing device according to any one of <1> to <16>, in which the information processing device and the another information processing device are a part of a propulsion device including a propulsion unit that directly or indirectly controls propulsion as necessary using the image data, and the high-speed data transmission is stopped by the propulsion device after the propulsion device satisfies a predetermined stop condition.

<18> The information processing device according to any one of <1> to <17>, in which the information processing device and the another information processing device are a part of a propulsion device including a propulsion unit that directly or indirectly controls propulsion as necessary using the image data, the propulsion device has a processing configuration that acquires or displays another data different from the image data, and the propulsion unit controls propulsion by preferentially using the another data over the image data in a case where the unique message is received.

<19> A mobile device including:

an information processing device including a communication unit configured to transmit, to another information processing device, or receive, from the another information processing device, when performing communication with the another information processing device to perform high-speed data transmission of transmitting data of a frame including image data in a predetermined direction between the information processing device and the another information processing device, an extended packet including an extended packet header and packet data, and a unique message capable of notifying that at least one of the information processing device, the another information processing device, or the image data is in a state different from a normal time or a usual time, and a protection unit configured to derive a session key and execute at least one of generation, verification, or decryption of protection data of the unique message, in which the image data is stored in the packet data, and the image data and the unique message are transmitted at different timings via a part or whole of a common communication path regarding the communication.

<20> A communication system including:

an information processing device including a communication unit configured to transmit, to another information processing device, or receive, from the another information processing device, when performing communication with the another information processing device to perform high-speed data transmission of transmitting data of a frame including image data in a predetermined direction between the information processing device and the another information processing device, an extended packet including an extended packet header and packet data, and a unique message capable of notifying that at least one of the information processing device, the another information processing device, or the image data is in a state different from a normal time or a usual time, and a protection unit configured to derive a session key and execute at least one of generation, verification, or decryption of protection data of the unique message, in which the image data is stored in the packet data, and the image data and the unique message are transmitted at different timings via a part or whole of a common communication path regarding the communication.

Note that the present embodiments are not limited to the above-described embodiments, and various modifications can be made without departing from the gist of the present disclosure. Furthermore, the effects described in the present specification are merely examples and are not limited, and other effects may be exhibited.

REFERENCE SIGNS LIST

1201 Communication system
1211 Image sensor
1212 Application processor
1213 Display
1301 Pixel
1302 AD converter
1303 Image processing unit
1304 Extension mode-compatible CSI-2 transmission circuit
1305 Physical layer processing unit
1306 I2C/I3C slave
1307 Storage unit
1308 Message counter
1309 Nonce updating unit
1310 Security unit
1321 Physical layer processing unit
1322 Extension mode-compatible CSI-2 reception circuit
1323 I2C/I3C master
1324 Storage unit
1325 Data verification unit
1326 Security unit
1327 Controller
1501 Pixel
1502 AD converter
1503 Image processing unit
1504 Extension mode-compatible CSI-2 transmission circuit
1505 Physical layer processing unit
1506 I2C/I3C slave
1507 Storage unit
1508 Interference detection unit
1509 Obstacle detection unit
1510 Security unit
1511 Invasion detection unit
1512 Temperature detection unit
1513 Message counter
1551 Physical layer processing unit
1552 Extension mode-compatible CSI-2 reception circuit
1553 I2C/I3C master
1554 Storage unit
1555 Controller
1556 Interference detection unit
1557 Obstacle detection unit
1558 Security unit
1559 Invasion detection unit
1560 Temperature detection unit

The invention claimed is:

1. An information processing device, comprising:

a communication unit configured to one of:

transmit transmitting data of a frame to an another information processing device; or receive the transmitting data from the another information processing device based on communication with the another information processing device to perform high-speed data transmission of the transmitting data, wherein the transmitting data includes:

image data in a specific direction between the information processing device and the another information processing device, an extended packet including an extended packet header and packet data, and a unique message that notifies at least one of the information processing device or the another information processing device that the image data is in a state different from a normal time or a usual time; and a protection unit configured to:

derive a session key; and execute at least one of generation, verification, or decryption of protection data of the unique message, wherein the image data is stored in the packet data, and the image data and the unique message are transmitted at different timings through one of a part or whole of a communication path regarding the communication.

2. The information processing device according to claim 1, wherein the communication unit is further configured to one of transmit or receive low-speed command transmission in a reverse direction to the specific direction regarding the high-speed data transmission, the high-speed data transmission is faster than the low-speed command transmission, at least one of a transmission of a frame start indicating that the frame is started or a transmission of a frame end indicating that the frame is ended is performed, a plurality of the frames is continuously and periodically transmittable, and the frame includes frame blanking in which the image data is not transmitted between the frame end and the frame start.

3. The information processing device according to claim 2, wherein the low-speed command transmission includes transmission of a write instruction and a read instruction, the write instruction requests one of the information processing device or the another information processing device to write information, the read instruction requests one of the information processing device or the another information processing device to read information, or a read response based on the read instruction, and the unique message is transmitted as one of the write instruction, the read instruction, or the read response within a period of the frame blanking.

4. The information processing device according to claim 2, wherein the frame includes embedded data that is transmitted by the high-speed data transmission within a period between the frame start and the frame end, the embedded data includes metadata related to the image data, and the unique message is stored in the embedded data.

5. The information processing device according to claim 2, wherein the low-speed command transmission includes transmission of a write instruction and a read instruction, the write instruction requests one of the information processing device or the another information processing device to write information, the read instruction requests one of the information processing device or the another information processing device to read information, or a read response based on the read instruction, the frame includes line blanking in which the image data is not transmitted between the frame start and the frame end, and the unique message is transmitted as one of the write instruction, the read instruction, or the read response within a period of the line blanking.

6. The information processing device according to claim 2, wherein the unique message is stored inside the frame start or inside the frame end.

7. The information processing device according to claim 1, wherein the frame includes data of a second virtual channel different from the image data that is a first virtual channel, and the unique message is stored in the data of the second virtual channel.

8. The information processing device according to claim 1, wherein the extended packet further includes an extended packet footer, the unique message is stored in the extended packet header in the extended packet in which the image data is stored, and the protection data is stored in the extended packet footer in the extended packet in which the image data is stored.

9. The information processing device according to claim 1, wherein the communication unit includes transmission or reception of a HEARTBEAT request or a pseudo-HEARTBEAT request, the reception or the transmission of a HEARTBEAT_ACK response or a pseudo-HEARTBEAT_ACK response within a specific time is based on the HEARTBEAT request or the pseudo-HEARTBEAT request, and one of the information processing device or the another information processing device transmits the unique message to a partner of the communication within the specific time.

10. The information processing device according to claim 1, wherein the communication unit includes transmission or reception of a HEARTBEAT request or a pseudo-HEARTBEAT request, the reception or the transmission of a HEARTBEAT_ACK response or a pseudo-HEARTBEAT_ACK response within a specific time is based on the HEARTBEAT request or the pseudo-HEARTBEAT request, and the communication unit is further configured to stop the transmission of the HEARTBEAT_ACK response or the pseudo-HEARTBEAT_ACK response based on the HEARTBEAT request or the pseudo-HEARTBEAT request is not normally received.

11. The information processing device according to claim 10, wherein a bit flag indicates non-support of the HEARTBEAT request, the HEARTBEAT_ACK response is set in at least one of the information processing device or the another information processing device, and the communication unit includes:

the transmission or the reception of the pseudo-HEARTBEAT request, and the reception or the transmission of the pseudo-HEARTBEAT_ACK response within the specific time is based on the pseudo-HEARTBEAT request.

12. The information processing device according to claim 1, further comprising:

a pixel configured to capture or display the image data; and an interference detection unit configured to detect one of presence or absence of an interference or a possibility of the interference with the pixel or the image data, wherein the unique message is a message related to a detection result of the interference detection unit.

13. The information processing device according to claim 1, further comprising an obstacle detection unit configured to detect one of presence or absence of an obstacle or a possibility of the obstacle with respect to the communication path, wherein the unique message is a message related to a detection result of the obstacle detection unit.

14. The information processing device according to claim 1, further comprising an invasion detection unit configured to detect one of presence or absence of an invasion or a possibility of the invasion with respect to the protection unit, wherein the unique message is a message related to a detection result of the invasion detection unit.

15. The information processing device according to claim 1, further comprising a temperature detection unit configured to detect an internal temperature of the information processing device, wherein the unique message is a message related to a detection result of the temperature detection unit.

16. The information processing device according to claim 1, wherein the high-speed data transmission is stopped by the information processing device after the unique message satisfies a specific stop condition.

17. The information processing device according to claim 1, wherein the information processing device and the another information processing device are a part of a propulsion device including a propulsion unit that directly or indirectly controls propulsion as necessary based on the image data, and the high-speed data transmission is stopped by the propulsion device after the propulsion device satisfies a predetermined stop condition.

18. The information processing device according to claim 1, wherein the information processing device and the another information processing device are a part of a propulsion device including a propulsion unit that directly or indirectly controls propulsion based on the image data, the propulsion device has a processing configuration that acquires or displays another data different from the image data, and the propulsion unit controls propulsion based on the another data and the unique message is received.

19. A mobile device, comprising:

an information processing device including:

a communication unit configured to one of:

transmit transmitting data of a frame to an another information processing device, or receive the transmitting data from the another information processing device based on communication with the another information processing device to perform high-speed data transmission of the transmitting data, wherein the transmitting data includes:

image data in a specific direction between the information processing device and the another information processing device, an extended packet including an extended packet header and packet data, and a unique message that notifies at least one of the information processing device or the another information processing device that the image data is in a state different from a normal time or a usual time; and a protection unit configured to:

derive a session key; and execute at least one of generation, verification, or decryption of protection data of the unique message, wherein the image data is stored in the packet data, and the image data and the unique message are transmitted at different timings through one of a part or whole of a communication path regarding the communication.

20. A communication system, comprising:

an information processing device including:

a communication unit configured to one of:

transmit transmitting data of a frame to an another information processing device; or receive the transmitting data from the another information processing device based on communication with the another information processing device to perform high-speed data transmission of the transmitting data, wherein the transmitting data includes:

image data in a specific direction between the information processing device and the another information processing device, an extended packet including an extended packet header and packet data, and a unique message that notifies at least one of the information processing device or the another information processing device that the image data is in a state different from a normal time or a usual time; and a protection unit configured to:

derive a session key; and execute at least one of generation, verification, or decryption of protection data of the unique message, wherein the image data is stored in the packet data, and the image data and the unique message are transmitted at different timings through one of a part or whole of a communication path regarding the communication.

* * * * *